US011003839B1

(12) United States Patent
Hatch

(10) Patent No.: US 11,003,839 B1
(45) Date of Patent: May 11, 2021

(54) SMART INTERFACE WITH FACILITATED INPUT AND MISTAKE RECOVERY

(71) Applicant: I.Q. JOE, LLC, Wilmington, CA (US)

(72) Inventor: Jeffrey James Hatch, Wilmington, CA (US)

(73) Assignee: I.Q. JOE, LLC, Wilmington (CA)

( * ) Notice: Subject to any disclaimer, the term of this patent is extended or adjusted under 35 U.S.C. 154(b) by 62 days.

(21) Appl. No.: 15/965,619

(22) Filed: Apr. 27, 2018

Related U.S. Application Data

(60) Provisional application No. 62/492,005, filed on Apr. 28, 2017.

(51) Int. Cl.
*G06F 40/166* (2020.01)
*G10L 15/22* (2006.01)
*G06F 3/0488* (2013.01)

(52) U.S. Cl.
CPC ........ *G06F 40/166* (2020.01); *G06F 3/04886* (2013.01); *G10L 15/22* (2013.01); *G10L 2015/221* (2013.01)

(58) Field of Classification Search
CPC .. G06F 3/0237; G06F 17/2785; G06F 16/332; G06F 3/0412; G06F 17/276; G06F 3/0482
See application file for complete search history.

(56) References Cited

U.S. PATENT DOCUMENTS 4,481,598 A 11/1984 Ishiwata
4,545,022 A 10/1985 Hughins
5,025,403 A 6/1991 Stephens
5,089,980 A 2/1992 Bunsen et al.
6,854,001 B2 2/2005 Good et al.
8,074,172 B2 12/2011 Kocienda et al.
8,232,973 B2 7/2012 Kocienda et al.
8,504,600 B2 8/2013 Hatch
8,788,548 B2 7/2014 Hatch
8,904,309 B1 * 12/2014 Zhai .................. G06F 3/0482 715/773
2005/0179665 A1 8/2005 Kuo
2008/0168366 A1 * 7/2008 Kocienda ............. G06F 3/0237 715/764
2011/0202876 A1 * 8/2011 Badger ................ G06F 3/0237 715/816

(Continued)

OTHER PUBLICATIONS

PCT International Search Report, App. No. PCT/US2009/032448, dated Jun. 22, 2009, in 3 pages.

(Continued)

*Primary Examiner* — Toan H Vu
(74) *Attorney, Agent, or Firm* — Knobbe Martens Olson & Bear LLP

(57) ABSTRACT

Systems, methods, and devices including smart interfaces with facilitated input and mistake recovery are described. For example, a smart interface system can identify one or more portions of user input as alterable decisions, and, for each of the one or more alterable decisions, store, in a memory, information about one or more alternative options for the alterable decision. The system can also identify one of the alterable decisions as the currently alterable decision, and upon receiving an input indicative of an actuation of the alteration key, alter the currently alterable decision to another of the one or more alternative options based on the stored information.

20 Claims, 56 Drawing Sheets

(56) References Cited

U.S. PATENT DOCUMENTS

| | | | | |
|---|---|---|---|---|
| 2013/0120267 A1* | 5/2013 | Pasquero | G06F 17/276 | 345/168 |
| 2015/0100524 A1* | 4/2015 | Pantel | G06F 16/332 | 706/12 |
| 2016/0098098 A1* | 4/2016 | St. Clair | G06F 3/0412 | 345/173 |
| 2018/0210874 A1* | 7/2018 | Fuxman | G06F 17/2785 | |

OTHER PUBLICATIONS http://web.archive.org/web/20040401164706/http://ftp.casio.co.jp/pub/world_manual/edu/en/fx115MS_991MS_E.pdf; CASIO Manual; Apr. 1, 2004; pp. 1-42.

http://web.archive.org/web/20010304195513/http://users.ece.gatech.edu/~bonnie/book/TUTORIAL/tut_1.html; MatLab Tutorial; Oct. 30, 2001.

FX-570es User's Guide, Casio, Dec. 31, 2009, http://support.casio.com/pdf/004/fx057ES_Eng.pdf, in 75 pages, See pp. E-8, E-21, E-22.

* cited by examiner

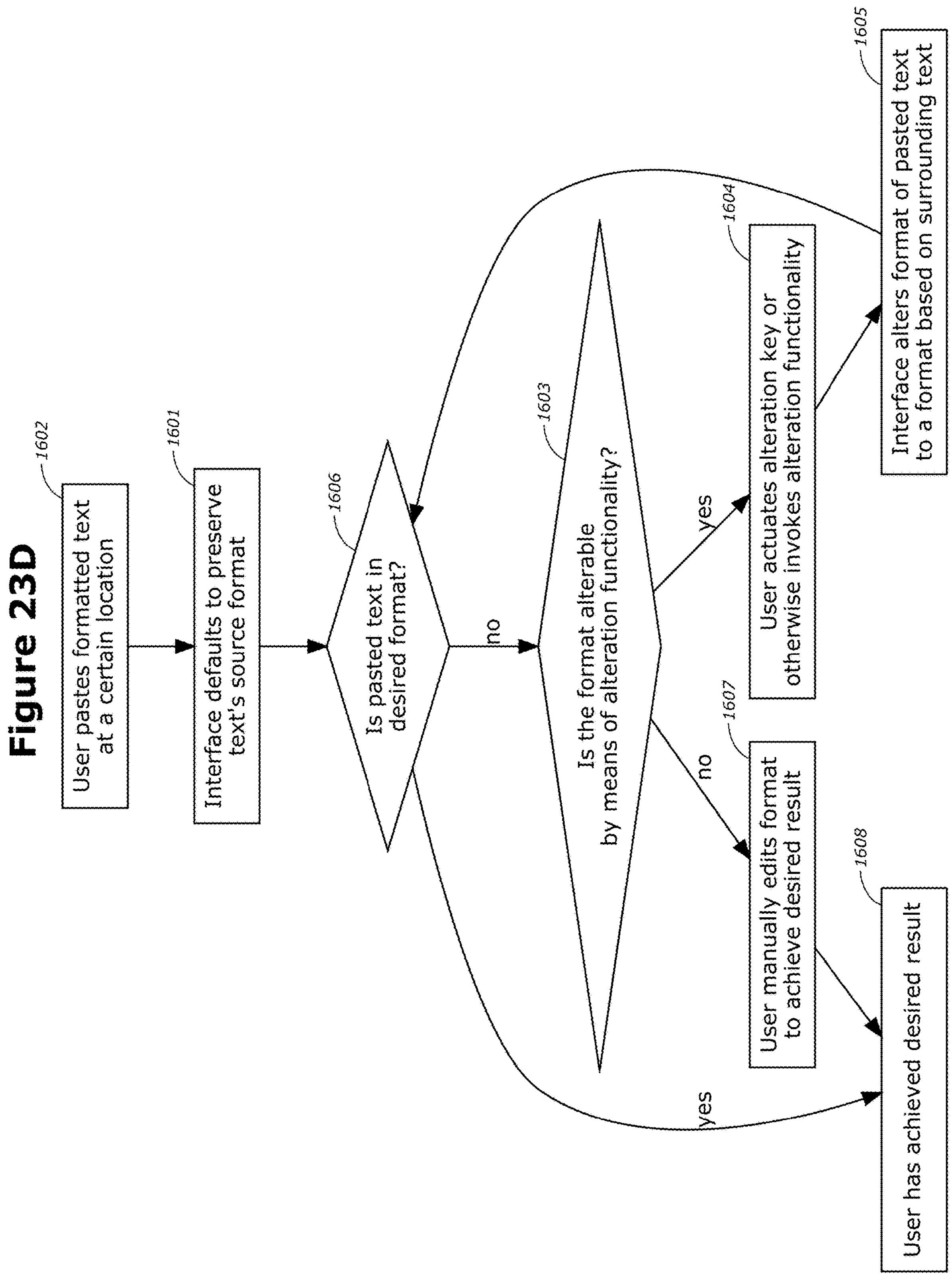
Figure 23D
User pastes formatted text at a certain location
1602
Interface defaults to preserve text's source format
1601
Is pasted text in desired format?
1606
no
Is the format alterable by means of alteration functionality?
1603
yes
User actuates alteration key or otherwise invokes alteration functionality
1604
Interface alters format of pasted text to a format based on surrounding text
1605
no
User manually edits format to achieve desired result
1607
yes
User has achieved desired result
1608

SMART INTERFACE WITH FACILITATED INPUT AND MISTAKE RECOVERY

INCORPORATION BY REFERENCE TO ANY PRIORITY APPLICATIONS

This application claims priority to U.S. Provisional Application No. 62/492,005, filed Apr. 28, 2017, which is incorporated herein by reference. Any and all applications for which a foreign or domestic priority claim is identified in the Application Data Sheet as filed with the present application are hereby incorporated by reference under 37 CFR 1.57. U.S. application Ser. No. 11/925,560, filed Oct. 26, 2007, now U.S. Pat. No. 8,788,548, and U.S. application Ser. No. 12/363,590, filed Jan. 30, 2009, now U.S. Pat. No. 8,504,600, which are incorporated herein by reference.

BACKGROUND

Field

This application relates to interfaces for electronic devices such as desktop computers, laptops, tablet computers, smartphones, or voice computers, among others. In particular, this application relates to smart interfaces with facilitated input and mistake recovery.

Description

Electronic devices commonly include interfaces that allow users to interact with the devices. Such interfaces often allow users to enter information into the devices and allow the devices to display information to the users. Commonly, interfaces include one or more input devices, for example, keyboards, touchscreens, etc., and a display device, such as a screen. The devices may also include a software component for controlling the interfaces.

SUMMARY

This application relates to systems, methods, and devices including smart interfaces with facilitated input and mistake recovery. For example, in an embodiment, a system having a smart interface can include an input device configured to receive user input from a user. The input device can include an alteration key, which can be implemented as a physical key or on a touchscreen. The system can also include a display for displaying information to the user. The system also includes at least one non-transitory computer readable medium having stored thereon executable instructions, and at least one processor in communication with the at least one non-transitory computer readable medium and configured to execute the instructions. When executed by the processor, the instructions cause the system to provide one or more of the interface functions described throughout this application. For example, the instructions can cause the system to: identify one or more portions of user input as one or more alterable decisions; for each of the one or more alterable decisions, store, in a memory, information about one or more alternative options for the alterable decision; identify one of the one or more alterable decisions as the currently alterable decision; upon receiving an input indicative of an actuation of the alteration key, alter the currently alterable decision to another of the one or more alternative options based on the stored information; and display, on the display, the altered currently alterable decision to the user. Other implementations and interface functionality are described in greater detail below.

For purposes of summarizing the invention and the advantages achieved over the prior art, certain objects and advantages are described herein. Of course, it is to be understood that not necessarily all such objects or advantages need to be achieved in accordance with any particular embodiment. Thus, for example, those skilled in the art will recognize that the invention may be embodied or carried out in a manner that can achieve or optimize one advantage or a group of advantages without necessarily achieving other objects or advantages.

BRIEF DESCRIPTION OF THE DRAWINGS

The features of the present disclosure will become more fully apparent from the following description, taken in conjunction with the accompanying drawings. Understanding that these drawings depict only some embodiments in accordance with the disclosure and are, therefore, not to be considered limiting of its scope, the disclosure will be described with additional specificity and detail through use of the accompanying drawings.

FIG. 23D is a flowchart demonstrating interface use of contextual data to inform pasted text format determinations as alterable format decisions, according to an embodiment.

DETAILED DESCRIPTION

Figure 1A:
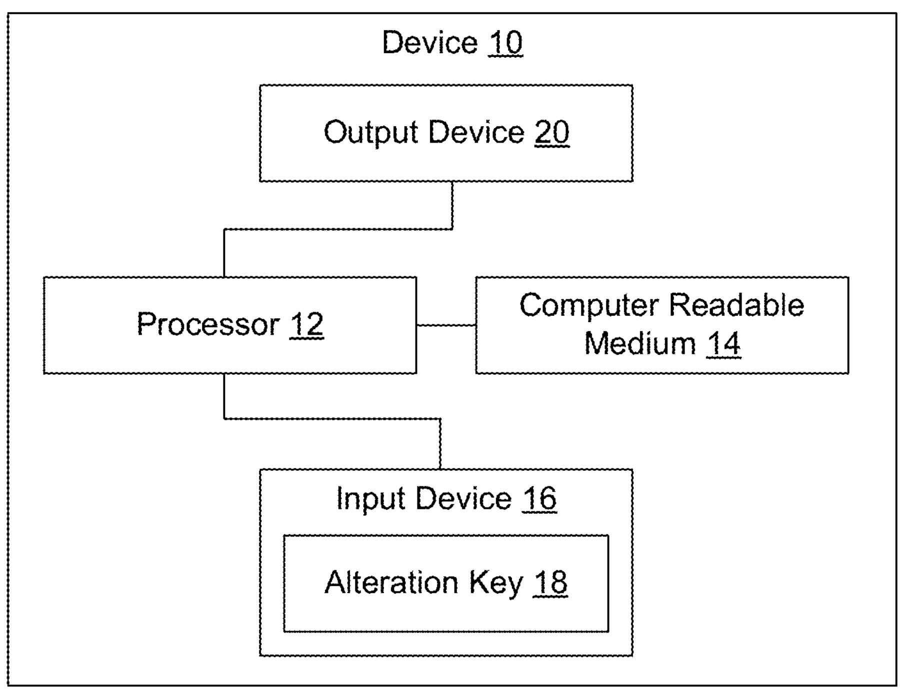
FIG. 1A is a block diagram of an embodiment of a device including an interface as described herein.

This detailed description discusses features and advantages of systems and methods related to smart interfaces with facilitated input and mistake recovery in relation to certain described embodiments, some of which are illustrated in the figures. Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Chapter 1: Introduction

How the Present Specification Is Organized

For the convenience of the reader, the present specification is organized into numbered chapters. In some cases, where the present specification refers to a topic that is explained in more detail at a location that is many pages distant, it may reference the number of the chapter where the topic is explained.

The chapters within the present specification generally include section headings that are not numbered. For the most part, chapter titles are intended to broadly summarize the content of the chapters, and section headings are intended to broadly summarize the content of the paragraphs that follow the section headings. However, such chapter titles and section headings are intended only for the convenience of the reader, and are not intended to characterize the invention in a limiting way. For example, the chapter title that says "Alterable Formatting" does not limit the invention to embodiments that have alterable formatting functionality as described in that section. In fact, the chapter title that says "Alterable Formatting" is not even intended to characterize the contents of that chapter itself in a limiting way: certain of the formatting behaviors that are described in that chapter may be quite useful even in an embodiment that includes no alteration functionality whatsoever.

The present specification may be divided into three large sections, along with a smaller amount of additional material at the beginning and at the end. Part I consists of Chapters 2 to 15, which explain various interface features that may facilitate altering "alterable decisions" in order to efficiently recover from mistakes. Part II consists of Chapters 16 to 23, which explain interface features that may tend to prevent the interface from yielding undesired results and interface features that may help educate the user how to achieve desired results more efficiently. Part III consists of Chapters 24 to 52, which explain interface improvements that are applicable to specific situations, and which explain various circumstances in which the interface may make alterable decisions; for example, Chapter 36 explains interface improvements that are applicable when editing a spreadsheet.

The preceding paragraph is intended to summarize the most prominent topic within each of the three large sections of the patent, but is not intended to characterize the invention in a limiting way. Each large section may include descriptions of additional features that do not fit the summaries provided in the preceding paragraph, and such features may be advantageous even in an embodiment that has none of the functionality mentioned in the preceding paragraph. For example, Part I includes explanations of improvements to undo functionality that may be advantageous even in an embodiment that has no functionality pertaining to alterable decisions or to anything else that was mentioned in the preceding paragraph. Each large section itself begins with a summary of the contents of that large section; such summaries may be more detailed and comprehensive than the brief summaries provided above, but still are to be construed in a nonlimiting way. In order to understand the scope of a particular section, it is necessary to actually read the section itself, not just a summary.

An Embodiment May be Described as a Device, Method, or Interface

In some embodiments, the invention that is disclosed herein comprises a computing device that has an improved user interface. Phrased another way, the invention that is disclosed herein comprises an improved method by which a computing device responds to user input actions. Phrased yet another way, the invention that is disclosed herein comprises an improved user interface for a computing device.

Various ways of characterizing some embodiments of the invention may simultaneously be equally valid. A programmer who reads the present specification may observe that the present specification describes an improved method by which a computing device will respond to user input actions; if the programmer then programs a computing device accordingly, then the change that the programmer makes to the computing device will consist of an improvement of the user interface of the computing device; a user may then correctly perceive that the result is an improved computing device.

Embodiments of the invention will generally be described herein in terms of a detailed explanation of how "the interface" will behave in response to various user input actions in certain embodiments. Sufficient information about such interface behaviors will be provided that those of ordinary skill in the art will be able to configure a computing device to follow methods that cause its user interface to behave as described herein.

Various Embodiments are Possible

It is possible for an embodiment to include nearly all the new interface behaviors that are disclosed herein, or to include only a few. Whenever the present specification begins a sentence or paragraph by saying "In an embodiment," this does not necessarily mean that the embodiment whose behavior is described in that sentence or paragraph does or does not include any of the other interface behaviors described elsewhere.

However, in some cases the present specification will describe two or more distinct and incompatible approaches to a particular situation. When the present specification begins a sentence or paragraph by saying, "In an alternative embodiment," in some cases this may mean that the behavior that is described for that alternative embodiment is incompatible with a behavior described prior to that sentence or paragraph. In such cases, this does not necessarily mean that the alternative embodiment is inferior to any such previously described embodiment: it only means that it may be incompatible.

A variety of computing devices may be improved by integrating various interface behaviors that are disclosed herein. For example, an embodiment may be a desktop computer, smartphone, or graphing calculator. However, some of the new interface behaviors that are disclosed herein may be more readily applicable to some computing devices than to others. For example, if a computing device has a touchscreen or mouse or some other means of quickly indicating a location on the display of the computing device, it will be relatively straightforward to implement a feature that is invoked by means of a "touch gesture" that requires the user to indicate a specific location on the display of the computing device. As another example, the present specification may suggest that a particular interface behavior may be applicable "in an embodiment that is a computing device that has a mouse" in order to indicate that the description of that particular interface behavior makes reference to a mouse, and that the behavior may be more readily implemented on a computing device that has a mouse. (Such phrasing emphasizes the configuration of the interface hardware for a particular embodiment, but the phrase "in an embodiment that is an interface that has mouse functionality" would have a substantially identical meaning, since it is equally valid to characterize the invention as an improved interface for a computing device as well as characterizing it as a computing device with an improved interface.)

Internal Implementation Variations do not Distinguish Features

Generally, an interface behavior may be conceived of as a mapping of circumstances and sequences of user input actions to interface responses. In other words, anyone who knows exactly how an interface will respond to every possible sequence of user input actions in all circumstances has a complete understanding of all the interface's behaviors. If two distinct interface algorithms are guaranteed to always yield exactly the same results in response to the same sequence of user input actions in all circumstances, then these two algorithms implement the exact same interface behavior. Internal implementation details do not distinguish one interface behavior from another. For example, if one interface algorithm responds to the backspace key by deleting the character to the left of the input cursor, and another interface algorithm responds to the backspace key by first moving the input cursor past the character to its left and then immediately deleting the character that is now to the right of the input cursor, then these two algorithms implement the exact same interface behavior: they work differently, but yield the same results.

Generally, interface behaviors that make it easier for users to achieve desired results faster may nevertheless be relatively complex and difficult to understand. For example, a user may find that prior art autocorrection functionality makes it easier to achieve desired results faster even if the algorithm that determines the behavior of the autocorrection functionality is too complex for the user to understand.

The present specification describes in detail various interface behaviors that may enable users to achieve desired results faster. Certain of these interface behaviors are relatively complex. In many cases, in order to fully define a complex interface behavior, the present specification will specify a particular means by which a particular embodiment will determine how to respond to a sequence of user input actions. In other words, the present specification will often specify a complex interface behavior by means of explaining how to construct one particular algorithm that implements the interface behavior.

However, those of ordinary skill in the art will understand that it is always possible to create various equivalent algorithms that implement the exact same interface behavior. If a programmer implements an interface feature that will always respond to a sequence of user input actions in exactly the same way as an interface feature that is described herein, but the programmer implements such an interface feature by means of an algorithm that operates in an entirely different way than is suggested herein, then those of ordinary skill in the art will understand that the feature that the programmer has implemented still constitutes exactly the same feature as the one that is described herein. Furthermore, those of ordinary skill in the art will understand that it is possible to create various algorithms that implement interface features that are mostly equivalent to interface features that are described herein, but that behave slightly differently in rare cases.

For example, the present specification describes an embodiment in which a key is configured so that in certain circumstances if a user actuates that key then the interface will move a plus sign that is immediately after a mathematical structure into the mathematical structure. A programmer may instead create an embodiment such that if a user actuates the same key in the same circumstances then the interface will first insert a plus sign within the mathematical structure and will then delete the plus sign that is immediately after the mathematical structure. If a programmer were to do so, then the interface feature the programmer thus implemented would always appear to respond to a user's input actions in exactly the same way as if it moved the plus sign from immediately after the mathematical structure into the mathematical structure, and those of ordinary skill in the art would understand that such use of a distinct yet equivalent algorithm would not distinguish the feature that the programmer thus implemented from the feature that is described herein.

Improvements May be Implemented in Various Software Domains

Those of ordinary skill in the art will understand that various improvements that are described herein may be implemented in the interface of an individual application, or in the interface functionality of a code library, or in the interface layer of the operating system of a computing device, or in some other software domain.

Certain specific improvements that are described herein are applicable when editing text documents, or when editing spreadsheets, or in other specific situations that typically occur within the context of an individual application. Such improvements may of course be implemented within the interface of a particular application, so that a computing device will embody the invention whenever that application is installed on the computing device. However, even improvements such as these may instead be implemented in the interface layer of the operating system of a computing device, within the library of functionality that is available to applications that run on the computing device, so that various applications can easily make use of the improvements. When improvements are implemented in the operating system, in some cases this may enable certain applications to automatically take advantage of such improvements, without necessarily requiring the programmers of such applications to make an explicit effort to integrate these improvements. For example, if the autocorrection functionality within the interface layer of the operating system of a computing device is replaced with improved autocorrection functionality that is described herein, then any application that uses such autocorrection functionality may automatically be improved. It may even be advantageous for relatively specialized functionality to be implemented within the library of functionality that is available to applications that run on a computing device; for example, it may be advantageous for a tablet computer to have an operating system that includes math input interface functionality with math input interface improvements that are described herein, so that programmers of applications for such a tablet computer can easily take advantage of such math input interface functionality.

Some of the improvements that are described herein pertain to functionality that is typically the responsibility of the interface layer of the operating system of a computing device, such as functionality for moving the mouse cursor, for switching the keyboard focus from one application to another, for superimposing a window over an application window, and so forth. Such improvements may of course be implemented within the interface layer of the operating system of a computing device, so that the computing device will embody the invention whenever that operating system is installed on the computing device, regardless of what applications are installed. However, many operating systems include functionality that enables applications to essentially modify the operation of the operating system itself, so that even functionality that is the responsibility of the interface layer of the operating system of the computing device can be improved by installing an appropriately configured application. For example, installing a prior art speech recognition application on a computer with a Microsoft Windows operating system may make it possible for a user to move the mouse cursor by means of spoken commands, as though the operating system functionality pertaining to the mouse cursor had itself been modified; likewise, those of ordinary skill in the art will understand that an application can be created such that installing the application on a computer with a Microsoft Windows operating system may cause the computer to embody the present invention in essentially the same way as if certain improvements were implemented within the interface layer of Microsoft Windows itself.

Putting Features in Perspective

The present specification describes numerous features. An embodiment of the invention may have significant advantages over prior art even if it has only one or two of these features. However, many of these features may have a great deal of synergy with one another, so that an embodiment that has several of the features that are described herein may have advantages that exceed the sum of the advantages of the individual features.

In various places throughout the present specification, in order to put various features in perspective, the present specification will include brief discussions of how certain features compare to prior art, or how the features relate to other features that are described herein, or both. Such a discussion may consist of a single paragraph at the end of a section, or an entire section within a chapter. Such a discussion may point out how a certain feature or group of features has advantages over prior art in its own right, may explain synergistic advantages that a certain feature has in conjunction with other features, may suggest ways to ensure that an embodiment that lacks a certain feature still retains most of the advantages of its other features, and so forth. At the end of the present specification there is a longer discussion of additional possible advantages of some embodiments. Such discussions are intended to be helpful, but are not intended as exhaustive explanations of advantages, synergies, or interrelationships of features; if a particular feature is never specifically mentioned in any such discussion, then this does not mean that the feature does not have any synergy with other features.

Keyboards

In some embodiments, the computing device has a hardware keyboard. In particular, in some embodiments the computing device has a keyboard with an individual physical key that serves as an alteration key as described in the following chapter. FIG. 1B shows a computer keyboard featuring an alteration key labeled "Oops!" (100) as well as featuring an F12 Key (102) which is also referenced in FIG. 25B. FIG. 1C shows a calculator keypad featuring an alteration key labeled "Oops!" (100), an ANS key (103), an Enter key (104), a Log key (105), a "Right" arrow key (106), a "Left" arrow key (107), a "÷" Key (108) that may serve as a fraction initialization key as defined in Chapter 44, a "−" Key (109), and a "+" Key (110).

Key Actuations

For purposes of the following discussion of key actuations, an "invocable function" is an interface function that a user can invoke that takes no parameters. In other words, an invocable function is an interface function that can be assigned to a single key, without any need for the user to supply additional information before the function is invoked. For example, many application interfaces have a Print function such that invoking the function opens a Print dialog box; this is an invocable function that is often assigned to the key combination Ctrl-P, and can often be invoked by other means as well.

In most cases, on most computing devices, most of the invocable functions that are referred to in the present specification can be invoked by pressing a single physical key or a single depiction of a key on a virtual keyboard. In some cases, however, on certain computing devices, certain invocable functions that are referred to in the present specification cannot be invoked by pressing a single physical key or a single depiction of a key, but must instead be accessed by some other means. For example, a TI-84 Plus graphing calculator does not have a dedicated square root key, so on a TI-84 the invocable function of inputting a square root symbol cannot be invoked by pressing a single key, but is instead invoked by means of first pressing the key labeled 2nd and then pressing the key labeled $x^2$.

Generally, for the sake of simplicity, the present specification will not refer to invocations of specific invocable functions, but will instead refer to "actuations" of specific "keys." Those of ordinary skill in the art will understand that any reference to "keys" or "keystrokes" in the present specification applies equally to other means for invoking specific invocable functions; in most cases, the details of how specific invocable functions are invoked are not essential to the present invention. Thus, in the present specification, the word "key" may refer to any means whereby the user of an interface can invoke a single specific invocable function, without regard to whether such means actually consists of pressing a single physical key on a keyboard. Likewise, "actuating a key" refers to invoking such a function, "having a key" refers to having a means for invoking such a function, "keystroke" refers to an invocation of such a function, and so forth.

For example, on a typical desktop computer keyboard, pressing the 2 key while holding down the Shift key constitutes "actuating the @ key" because this combination of actions invokes the function that causes the character @ to be entered into the user's input. Such a keyboard may be said to "have an @ key."

Similarly, in many computer software applications, pressing the S key while holding down the Ctrl key constitutes "actuating the Save key," because this combination of actions invokes the function that causes the software to save the file that the user is currently editing. Likewise, using a computer mouse to open a menu of options and choose the Save option constitutes "actuating the Save key" according to the definition used in the present specification. Similarly, many software applications have a toolbar that can be displayed that includes a depiction of a Save button, and clicking on such a depiction of a button or otherwise actuating such a depiction of a button constitutes "actuating the Save key" according to the definition used in the present specification.

On certain graphing calculators, the sequence of actions consisting of first pressing a key labeled 2nd and then pressing a key labeled $x^2$ has the effect of entering a square root into the user's input; thus, such a sequence of actions constitutes "actuating the square root key" according to the definition used in the present specification, and such a calculator may be said to "have a square root key."

On certain cell phones that have text messaging capabilities and do not have touchscreens, in certain circumstances it is possible to type the letter a by pressing a key labeled 2; thus, pressing the 2 key in such circumstances constitutes "actuating the a key" according to the definition used in the present specification. On certain such cell phones, in certain circumstances, it is possible to type the letter b by pressing the key that is labeled 2 twice rapidly: the first time the key is pressed, the letter a appears, and the second time the key is pressed, the letter a is replaced with the letter b. From the user's perspective, pressing the 2 key twice rapidly is the means of typing the letter b; when the user types the letter b, the temporary appearance of the letter a serves no purpose that the user then desires other then enabling the user to access the letter b, so pressing the 2 key twice rapidly is, from the user's perspective, equivalent to "actuating the b key" according to the definition used in the present specification.

Several examples have now been given in which a user performs more than one action in order to "actuate a key." In each of these examples, the first action that the user performs—such as holding down the Shift key or Ctrl key on a computer keyboard, or opening a menu of options, or pressing the 2nd key on a graphing calculator—has no effect that the user desires other than enabling the user to subsequently perform an action that then causes the invocation of the function that the user desires to invoke. Thus, in each case, although the user may perform a plurality of actions, the user has in view the invocation of a single function.

If a user performs a sequence of actions that has the same result as if the user had invoked a single function, but this sequence of actions consists of a plurality of independent actions each of which causes the invocation of an independent function that yields a portion of the desired result, then this sequence of actions is not a single key actuation according to the definition used in the present specification. For example, if an interface has a cosine key such that actuating the cosine key causes the three letters "cos" to be inserted into the user's input, but a user of the interface instead sequentially types the same three letters by means of actuating three individual letter keys, then the user will not be said to have "actuated the cosine key." As another example, a TI-84 Plus graphing calculator has a cubed function that causes an exponent of 3 to be entered into the user's input, and a user can access this function as the #3 option within the calculator's MATH menu, so if a user presses the calculator's MATH key and then presses the 3 key, this sequence of actions constitutes "actuating the cubed key" according to the definition used in the present specification; but if a user instead enters an exponent of 3 by pressing the ^ key and then pressing the 3 key, this latter sequence of actions does not constitute "actuating the cubed key."

(In a user interface that has Undo functionality, a single invocation of the Undo function will typically reverse a single invocation of an invocable function other than a cursor navigation function; thus, the intutions of an experienced user as to how an Undo function will operate can serve as an approximate guide to what constitutes a single invocation of an invocable function and thus constitutes a single "key actuation" according to the definition used in the present specification. For example, a user of a TI-84 Plus graphing calculator can press the calculator's MATH key to cause the MATH menu to appear and then press the 3 key to choose the cubed function from the MATH menu, thus causing the MATH menu to disappear and an exponent of 3 to be entered into the user's input; if an experienced user of computing devices were then asked what would happen if an Undo function were to be invoked a single time, the user would answer that the exponent of 3 would be removed from the input that was entered. Such a user would not answer that the exponent of 3 would be removed and the MATH menu would reappear; thus, the user's answer indicates that the user would expect a single invocation of an Undo function to undo the entire cumulative effect of pressing the MATH key and then pressing the 3 key, and not to undo only the effect of pressing the 3 key. The user's intuition thus confirms that such a sequence of two keystrokes may be considered to constitute a single invocation of an invocable function.)

Because a "key actuation" as defined above may actually involve a sequence of several actions, reducing the number of key actuations required to accomplish a particular editing task may not always make it easier for a user to perform the task: the ease of accomplishing a task depends not only on how many key actuations are required but also on how easy it is to perform those key actuations. Nevertheless, reducing the number of key actuations required to accomplish various editing tasks will generally tend to make it easier to perform those tasks. Furthermore, reducing the number of actuations of distinct keys required to accomplish various editing tasks will generally tend to make it easier to accomplish those tasks: double-clicking a single key is usually easier than finding and pressing two distinct keys. The present specification will explain specific means by which specific editing tasks can be made more efficient by reducing the number of key actuations or reducing the number of distinct key actuations that are needed in order to accomplish the tasks.

In the present specification, a "first actuation" of a particular key is any actuation of that key such that the most recent user action prior to that actuation was not also an actuation of that key. In other words, any actuation of a key is a first actuation of that key if it is not at least the second consecutive actuation of that key.

Naming of Keys

A "key," as defined above, may serve as a means to invoke a function that determines based on current circumstances which other function to invoke from among a plurality of other functions. When the present specification refers to a particular key, the present specification will typically name the key in terms of the function it invokes; however, because the function that a key invokes may at times be a means for invoking some other particular function, such a key may at times be named in terms of another function it may invoke, and thus a single key may have more than one name in the present specification. For example, a typical desktop computer keyboard has a physical key that could be called the "numeric keypad 2 key" which invokes the same function as a "2 key" when the keyboard is operating in Num Lock mode and invokes the same function as a "down arrow key" at other times; this "numeric keypad 2 key" thus may also be referred to as a "2 key" or as a "down arrow key" under the appropriate circumstances.

Under circumstances where the function that a key invokes is currently a means for invoking some other particular function, that key may be named in terms of the other function it currently invokes; thus, the "numeric keypad 2 key" may be referred to as the "2 key" when the keyboard is operating in Num Lock mode. Under such circumstances, however, a key that serves a simpler function will not be named in terms of the more complex function that currently yields the same result. For example, a "2 key" that never serves any purpose other than entry of a 2 character will not be referred to as a "numeric keypad 2 key" even under circumstances where a "numeric keypad 2 key" would happen to serve the purpose of entry of a 2 character. As another example, it is possible to devise circumstances in a typical text document editing program such that either invoking the Undo function or invoking the Paste function will result in the entry of a 2 character, but a "2 key" that never serves any purpose other than entry of a 2 character will not be referred to as an "Undo key" or a "Paste key" even under such circumstances.

Touch Gestures

The details of how a particular location on the screen of a computing device is indicated by the user are not generally essential, and will not always be explicitly specified in the present specification. Thus, in the present specification, except as otherwise specified, the word "touch" may refer to any means whereby the user of an interface indicates a specific location on the screen of a computing device, without regard to whether or not said means actually consists of touching the screen with a finger or stylus. For example, on a computing device that does not have a touch-sensitive display but that does have a mouse, positioning the mouse cursor over a highlighted region on the screen of a computing device and clicking the mouse button may constitute "touching a highlighted region."

In the present specification, whenever an interface action is described that is invoked by a touch of a specific location, it is to be understood that various alternative embodiments may require various means of "touch" in order to invoke the specified interface action. For example, if an interface action is described that is invoked by "touching a highlighted region," then in one alternative embodiment the interface action may be invoked only if the user rapidly double-clicks the mouse button when the mouse cursor is on the highlighted region, and in another alternative embodiment the interface action may be invoked only if the user presses the highlighted region with a finger and holds the touch for at least one second, and so forth. Various such alternative touch gestures will be obvious to those of ordinary skill in the art.

Embodiment-Specific Terminology

In the discussion of specific features of certain embodiments of the present invention, many terms are defined. In some cases, a term is defined that is said to have a certain meaning "in an embodiment" or is said to pertain to a certain circumstance "in an embodiment," and the specification makes use of that term when describing a feature that is present in certain embodiments. In such cases, for purposes of any feature that is described using that term, that meaning of the term is applicable in at least one embodiment, but it is not necessarily applicable in all embodiments.

For example, in Chapter 11, the present specification details certain functionality pertaining to "significant interface interventions" in certain embodiments. Chapter 11 also says, "In an embodiment, for purposes of the following paragraphs, a 'significant interface intervention' is an alterable interface intervention that does not currently have its non-intervention option selected, and that has a probability of alteration that is above a certain 'undoable intervention threshold.'" It is to be understood that it may also be possible to create an alternative embodiment that still includes functionality pertaining to significant interface interventions, but uses a different definition for "significant interface interventions." (In fact, one such alternative embodiment is also described in Chapter 11: "In an alternative embodiment, a 'significant interface intervention' is any alterable interface intervention that does not currently have its non-intervention option selected, regardless of its probability of alteration.")

Example Device or System

Figure 1B:
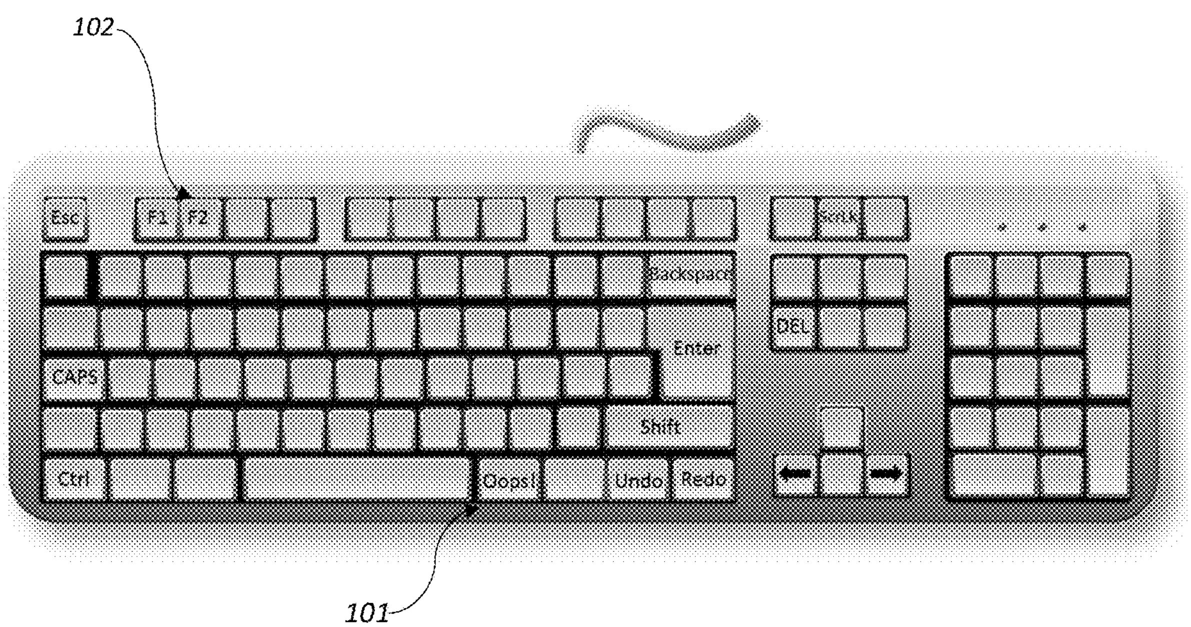
FIG. 1B illustrates an embodiment of a keyboard including an alteration key.
Figure 1C:
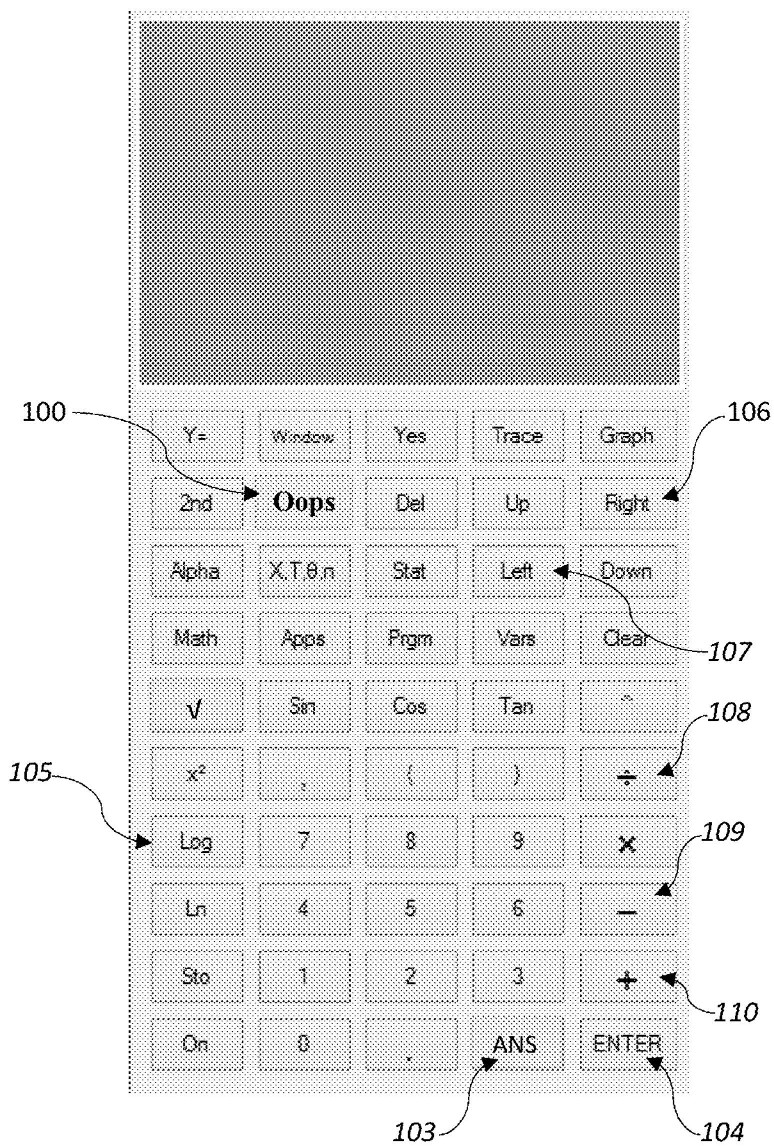
FIG. 1C illustrates an embodiment of a calculator including an alteration key.

FIG. 1A is a block diagram of an embodiment of a device 10 including an interface as described herein. The device 10 can be any type of electronic or computing device including, for example, a desktop computer, a laptop, a tablet, a smartphone, a voice computer, or a calculator, among others. The interface allows a user to interact with the device 10. For example, the interface allows a user to input information into the device 10 and view or receive information from the device 10.

In the illustrated embodiment, the device 10 includes a processor 12 and a computer readable medium 14. The computer readable medium 14 can include instructions that, when executed by the processor 12, cause the device 10 to implement one or more of the many interface functions described herein. The computer readable medium 14 can also be used to store information, as necessary, for use by the interface.

As shown, the device 10 includes an input device 16. The input device 16 allows the user to input information into and interact with the device 10. Many types of input devices 16 are possible, including keyboards, mice, touchscreens, microphones (for voice commands), etc. The input device 16 can include an alteration key 18. The alteration key 18 can be used, for example, to alter an alterable decision made by the interface as described below, as well as for additional functionality as described throughout this application. In some embodiments, the alteration key 18 is a dedicated key or button. In some embodiments, the alteration key 18 is a soft-key implanted on a touch screen. In some embodiments, the alteration key 18 can be implemented by having a user click or press on an alterable decision to alter it. In some embodiments, the alteration key 18 can be a voice command. Additional examples of the alteration key 18 are found throughout this application.

The device 10 also includes an output device 20. The output device 20 can be configured to display or otherwise communicate information to a user. For example, the output device 20 can be a monitor or screen. In some embodiments, the output device 20 can comprise a speaker for audibly communicating information to the user.

As noted previously, the interface of the device 10 can be configured to implement one or more of the various interface functions described herein.

Chapter 2: Alterable Decisions and the Alteration Key

About Part I

Part I of the present specification includes Chapters 2 to 15. Part I explains various features that may facilitate mistake recovery, including features that pertain to "alterable decisions" as described below, and also including features that pertain to undo functionality and autocorrection functionality.

Farther below, Part II explains features that may tend to prevent the interface from repeating mistakes and features that may tend to prevent users from wasting time. Part III explains for various situations interface improvements that may make it easier for a user to achieve desired results quickly; in particular, Part III explains for various situations various specific circumstances in which the interface may make alterable decisions.

Alterable Decisions

Various embodiments include various features that pertain to "alterable decisions." As used in the present specification, an "alterable decision" or "alterable interface decision" can be an interface decision such that the interface either saves sufficient information to subsequently identify the portion of input that the decision pertained to, or sufficient information to later determine what the user's input would then be if the outcome of the earlier decision had been different, or both. For example, in an embodiment, when the interface decides to autocorrect a word that a user typed, the decision to autocorrect the word will be an alterable decision, which means that the interface will either save sufficient information to subsequently identify the word that was autocorrected as the portion of input that this alterable decision pertained to, or sufficient information to later determine what the user's input would be if the word's uncorrected spelling were retroactively restored, or both.

However, the term "alterable decision" may be a misnomer in some embodiments because not all embodiments will necessarily facilitate altering such decisions: some embodiments may, and others may not. For example, an embodiment is described in Chapter 5 in which the interface highlights the outcomes of "alterable decisions" in order to call attention to possible mistakes, and such an embodiment may yield significant advantages over prior art even if it does not also facilitate the correction of such mistakes. Also, the term "alterable decision" may be a misnomer for certain types of alterable decisions because when a user performs an action that causes the interface to "make an alterable decision," the interface will not necessarily have any real choice as to how it initially responds to the user's action. For example, an embodiment is described in Chapter 33 such that if a user pauses for a long time while the interface is in Caps Lock mode, the interface may "alterably decide to remain in Caps Lock mode." In such an embodiment, even though the interface makes a so-called "alterable decision" in such circumstances, it has no real choice: arguably, a long pause is not a sufficient reason for the interface to automatically exit Caps Lock mode. Thus, the term "alterable decision" should be understood in light of the entirety of the present specification, and should not be strictly construed.

Above, and in various other places, the present specification mentions the "portion of input" that an interface decision pertains to. However, in some embodiments, the interface functionality that is specified herein may also interact with software output or interact with something else that is not input. Throughout the present specification, where appropriate, the word "input" should be understood to also refer to software output or to anything else that interface functionality may display and modify. For example, in an embodiment where the interface makes a decision whether to display the output of a calculation as a fraction or as a decimal, the so-called "portion of input" that this interface decision pertains to is actually the output of the calculation.

Alterable Decisions in Perspective

In the present specification, alterable decisions are often associated with potential user mistakes: in some embodiments, if an interface decision has an outcome that a user does not expect and does not desire, then in many cases the user will be able to correct the mistake by altering the decision. However, even though alteration functionality is often associated with mistake recovery herein, it is to be understood that alteration functionality need not be exclusively used for mistake recovery. For example, in some cases, a user who is familiar with alteration technology may deliberately make a "mistake" and then alter an interface decision because this is an efficient way to achieve a desired outcome.

The most common mistakes that a typical user of a computing device will encounter are word entry mistakes, which are typographical errors or spelling mistakes that are the user's fault. In some interfaces autocorrection functionality will often, but not always, correct word entry mistakes. Arguably, the most frustrating mistakes that a typical user of a computing device will commonly encounter are "undesired interface interventions," which are the mistakes that occur when the computing device performs an autocorrection or automatic formatting action that the user does not desire.

An interface decision regarding whether or not to autocorrect a word is a familiar example of an interface decision that is reasonably likely to have an outcome that a user regrets, and for that reason, autocorrection decisions are frequently used herein as convenient examples of alterable decisions. However, autocorrection decisions are not the only possible type of alterable decision: in Part III the present specification explains many other types of interface decisions that are alterable decisions in some embodiments.

Where prior art interfaces include specialized mistake recovery features (other than generic undo functionality), those features typically only facilitate recovery from word entry mistakes or undesired interface interventions. For that reason, when the present specification compares new mistake recovery features to prior art mistake recovery features, the present specification will generally emphasize how new mistake recovery features may do better at facilitating recovery from word entry mistakes or undesired interface interventions. Despite this emphasis on word entry mistakes and undesired interface interventions, it is to be understood that the new mistake recovery features described herein may also do better than prior art at facilitating recovery from various other types of mistakes, since prior art interfaces generally lack functionality that especially facilitates recovery from the other types of mistakes that are described herein.

An embodiment that has even just one feature that interacts with alterable decisions and has just one type of alterable decision may have significant advantages. For example, in a very early prototype, the only feature that interacted with alterable decisions was a simple alteration key, and the only alterable decisions that the alteration key could interact with were alterable structure exiting decisions; even in that relatively simple embodiment, the alteration key was useful.

However, the more interface decisions are alterable decisions, the more useful it will be to add functionality pertaining to such decisions, and conversely, the more functionality an embodiment has pertaining to alterable interface decisions, the more useful it will be to make interface decisions be alterable decisions. Alterable decisions may thus be at the core of a synergistic virtuous cycle.

Much of the present specification is devoted to explaining features that interact with alterable decisions in certain circumstances and features that cause the interface to make alterable decisions in certain circumstances. Other features are explained herein that do not directly pertain to alterable decisions, but may be more advantageous in an embodiment that has alterable decision functionality. For example, if a particular feature usually facilitates faster input, but careless users occasionally tend to make a certain type of mistake when using that feature, then such a feature may be advantageous on its own, but may be more advantageous in an embodiment that has alterable decision functionality that is specifically configured to facilitate correcting that type of mistake.

An Alteration Key Example

Figure 2A:
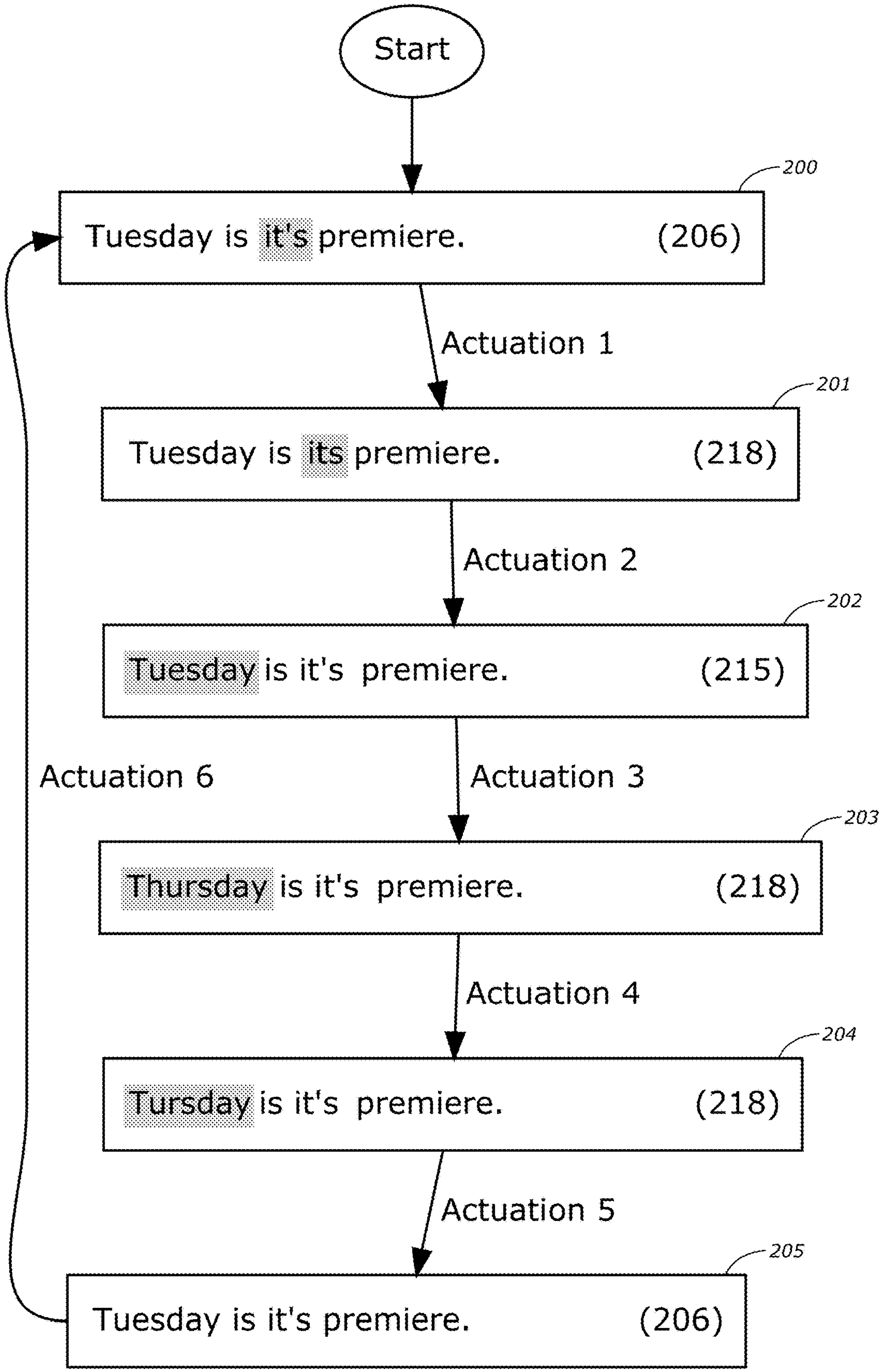
FIG. 2A is a flowchart illustrating repeated consecutive actuations of an alteration key, according to one embodiment.

FIG. 2A illustrates what may happen as a result of repeated consecutive actuations of the alteration key in an embodiment that has an alteration key as described below and in which additional consecutive actuations of the alteration key may have additional effects as described below. Each block of the figure illustrates what the user's input will be after a certain number of consecutive actuations of the alteration key. In each block, the text that the currently alterable decision pertains to is highlighted (if there is a currently alterable decision). In each block, the number in parentheses corresponds to an interface state from FIG. 2B, and thus indicates what state the interface is in at that point. The effect of each actuation can be seen by comparing the block above that actuation's arrow to the block below it.

Figure 2B:
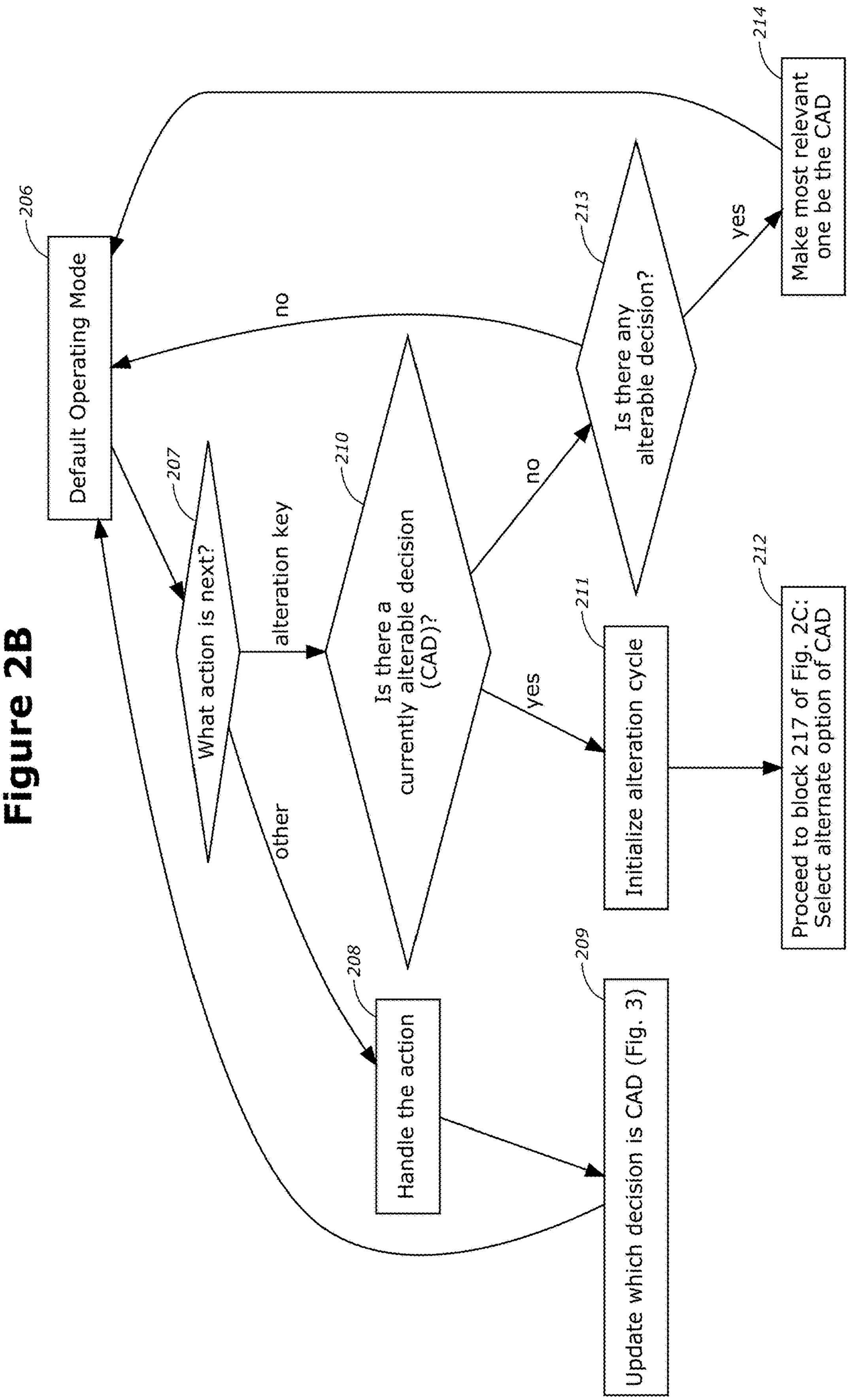
FIGS. 2B and 2C are flowcharts illustrating an embodiment of a method for a smart interface.

At the beginning of the example in FIG. 2A, the user has typed "Tursday is its premiere" but the interface has made an alterable decision to autocorrect "Tursday" to read "Tuesday" and an alterable decision to autocorrect "its" to read "it's." The text thus reads "Tuesday is it's premiere," as shown in Block 200. The alterable decision pertaining to the word "it's" is the currently alterable decision. The interface is in default operating mode as shown in FIG. 2B, Block 206.

Figure 2C:
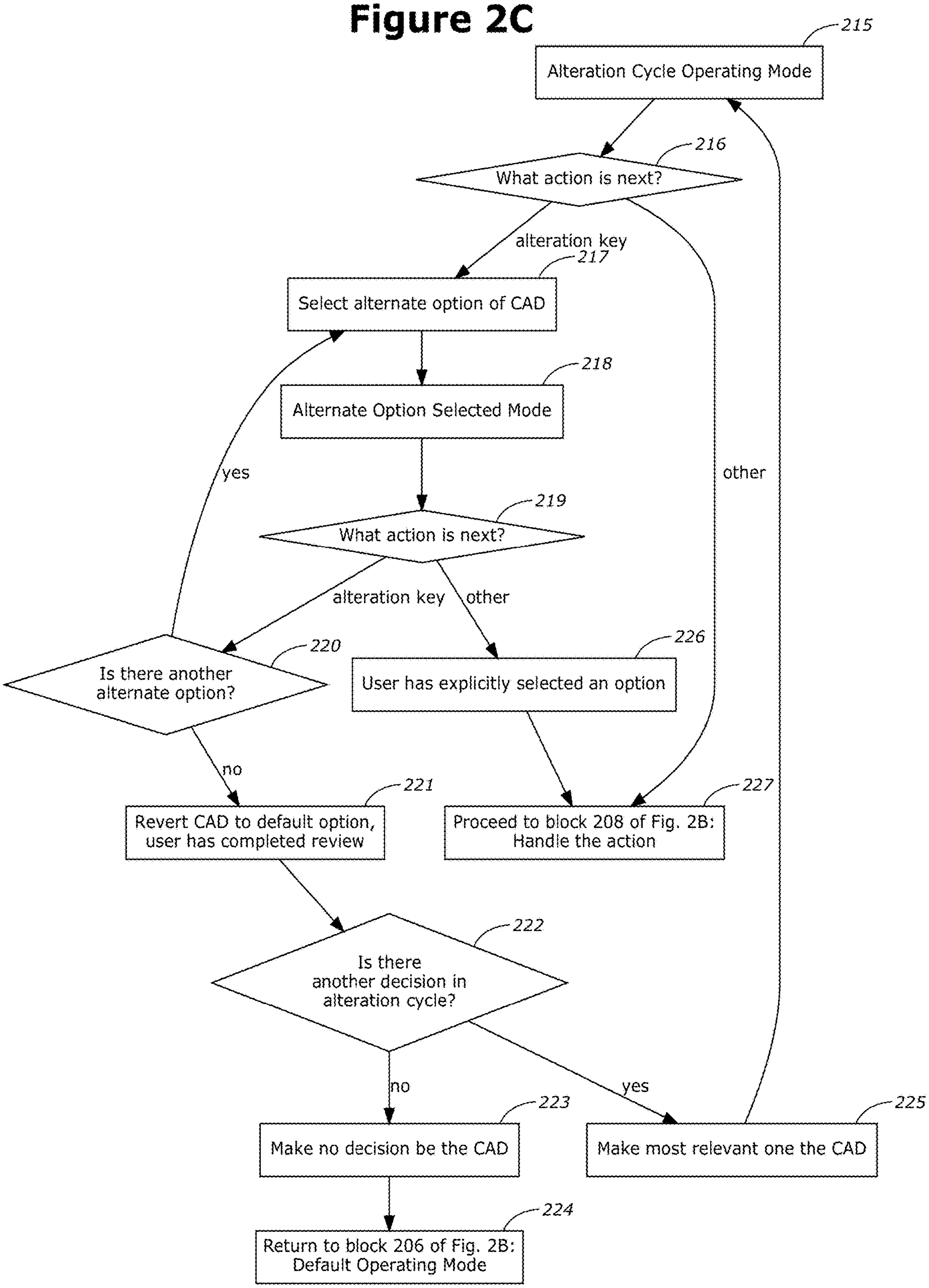

The user then actuates the alteration key a first time. The interface alters the currently alterable decision, yielding "Tuesday is its premiere," as shown in Block 201. The alterable decision pertaining to the word "its" is still the currently alterable decision. The interface is now in alternate option selected mode as shown in FIG. 2C, Block 218.

The user then actuates the alteration key a second consecutive time. The interface alters the currently alterable decision again and thus reverts it to its default option, yielding "Tuesday is it's premiere," as shown in Block 202. The interface then causes the alterable decision pertaining to the word "Tuesday" to become the currently alterable decision, as indicated by the highlighting of that word in Block 202. The interface is now in alteration cycle operating mode as shown in FIG. 2C, Block 215.

The user then actuates the alteration key a third consecutive time and a fourth consecutive time. This yields "Thursday is it's premiere" as shown in Block 203 and then "Tursday is it's premiere" as shown in Block 204. After these actuations, the alterable decision pertaining to the word "Thursday" or "Tursday" is the currently alterable decision, and the interface is in alternate option selected mode as shown in FIG. 2C, Block 218.

The user then actuates the alteration key a fifth consecutive time. The interface reverts the currently alterable decision to its default option, yielding "Tuesday is it's premiere" as shown in Block 205. There is now no currently alterable decision, as indicated by the lack of highlighting in Block 205. The interface has returned to default operating mode as shown in FIG. 2B, Block 206.

The user then actuates the alteration key a sixth consecutive time. Because there is no currently alterable decision, this actuation of the alteration key does not affect the user's input; instead, it causes the alterable decision pertaining to the word "it's" to become the currently alterable decision again. The arrow labeled "Actuation 6" that points from Block 205 to Block 200 indicates that this sixth consecutive actuation of the alteration key causes the interface to return to the same state it was in prior to the first of these consecutive actuations of the alteration key. Subsequently, a seventh consecutive actuation of the alteration key would again yield the result shown in Block 201, and an eighth consecutive actuation would again yield the result shown in Block 202, and so on.

An Alteration Key Algorithm

FIGS. 2B and 2C are flowcharts that illustrate one possible algorithm for an embodiment that has an alteration key as described below, and in which additional consecutive actuations of the alteration key may have additional effects as described below. This algorithm yields the interface behavior that is illustrated in FIG. 2A.

In an embodiment that behaves as indicated by these flowcharts, whenever the user's most recent action was not an actuation of the alteration key (and in certain other circumstances), the interface is in a "default operating mode" as shown in FIG. 2B, Block 206. While the interface is in default operating mode, each time the user performs an editing action (Block 207) other than an actuation of the alteration key, the interface will handle that action (Block 208) and remain in default operating mode. Whenever the interface handles an editing action other than an actuation of the alteration key, this may cause the interface to update which decision is the currently alterable decision or "CAD" (Block 209): in particular, if the interface makes an alterable decision in response to an editing action, then in certain circumstances this new alterable decision will become the currently alterable decision.

While the interface is in default operating mode (Block 206), if a user actuates the alteration key (Block 210) when there is no currently alterable decision (Block 213), this actuation of the alteration key will cause the most relevant alterable decision to become the currently alterable decision (Block 214) if there is any alterable decision, or will have no effect if there are no alterable decisions; in either case, the interface will remain in default operating mode and return to Block 206.

While the interface is in default operating mode (Block 206), if the user actuates the alteration key when there is a currently alterable decision (Block 210), then the interface will add the other alterable decisions to the alteration cycle (Block 211). The interface will then select an alternate option of the currently alterable decision (Block 212, leading to FIG. 2C, Block 217) and enter an "alternate option selected mode" (Block 218). While the interface is in alternate option selected mode, each time the user actuates the alteration key (Block 220), if the currently alterable decision is a multi-alternative decision and there is an alternate option that has not yet been selected, then the interface will select such an option (Block 217) and remain in alternate option selected mode (Block 218).

While the interface is in alternate option selected mode (Block 218), if the user performs an action other than an actuation of the alteration key, then the user has explicitly selected an alternate option of the currently alterable decision (Block 226), which has effects that are described in Chapter 3. The interface will handle the action (Block 227) and revert to default operating mode (Block 206).

While the interface is in alternate option selected mode (Block 218), if the user actuates the alteration key (Block 219) when there is no alternate option (Block 220) for the currently alterable decision that has not yet been selected, the interface will revert the currently alterable decision to its default option (Block 221). The user has completed review of the currently alterable decision, which has effects that are described in Chapter 3. The interface will then move on to the next decision in the alteration cycle (Block 222), as described in the following paragraphs.

When the interface moves on to the next decision in the alteration cycle, if any alterable decisions are remaining in the alteration cycle, then the most relevant such decision will be removed from the alteration cycle and will become the new currently alterable decision (Block 225). The interface will then enter an "alteration cycle operating mode" (Block 215). The alteration cycle operating mode (Block 215) and the default operating mode (Block 206) are quite similar, but when the interface is in the alteration cycle operating mode (Block 215) it already has an alteration cycle in mind, so if the user's next action is an actuation of the alteration key (Block 216) then the interface will not need to initialize the alteration cycle before proceeding to alter the currently alterable decision (Block 217) and enter alternate option selected mode (Block 218). When the interface is in the alteration cycle operating mode (Block 215), if the user's next action is not an actuation of the alteration key, the interface will handle the action (Block 227, leading to Block 208), update which decision is the CAD (Block 209), and revert to default operating mode (Block 206).

When the interface moves on to the next decision in the alteration cycle, if no alterable decisions are remaining in the alteration cycle, there will then be no currently alterable decision (Block 223) and the interface will revert to default operating mode (Block 224, leading to Block 206).

Other algorithms that implement the same interface behavior or similar behavior will be evident to those of ordinary skill in the art.

Altering Decisions

In the present specification, the "default option" of an alterable interface decision can be the actual initial outcome of that decision, and an "alternate option" can be some other outcome that the user might prefer for that decision, except as otherwise specified. For example, in an embodiment, if the interface has automatically corrected the spelling of a word that a user typed, and the interface's decision to correct this word's spelling is an alterable interface decision, then the corrected spelling is the default option and the user's original uncorrected spelling is an alternate option.

In an embodiment, when the interface makes an alterable decision, in addition to saving enough information for the interface to subsequently identify the portion of input that the decision pertained to, the interface will also save enough information about the alternate options of that decision that the interface can later determine what the user's input would then be if an alternate option were chosen instead of the default option. For example, in an embodiment, when the interface makes an alterable decision to automatically correct a word that a user typed, the interface will save enough information to later be able to determine what the user's input would then be if the user's original uncorrected spelling were restored retroactively.

Below, various embodiments are specified in which the interface will "alter an alterable interface decision" in certain circumstances. Except as otherwise specified, when the interface alters an alterable interface decision, it replaces that decision's default option with an alternate option, without prompting the user for any additional confirmation or clarification; however, various other ways that the interface may alter an alterable interface decision in certain circumstances are specified below. In an embodiment, when the interface alters an alterable interface decision, it will retain enough information to be able to subsequently revert that decision to its default option.

In an embodiment, after a user has caused the interface to alter a decision so that an alternate option of that decision is selected, if the user then performs some action that does not cause the interface to alter that decision, this constitutes "explicitly selecting an option" of that alterable interface decision. Unless otherwise specified, when the user's most recent action caused the interface to alter a decision, the user has not yet explicitly selected an option of that alterable interface decision—not until the user performs some other action.

In an embodiment, once a user has explicitly selected an alternate option of an alterable interface decision, if the decision is still alterable, then for purposes of the alteration functionality described herein, the interface will subsequently treat the option the user explicitly selected as the default option of that particular alterable decision and will treat the former default option of that decision as an alternate option. For example, in an embodiment, after the interface makes an alterable decision to automatically replace the word "goof" with the word "good" but then the user explicitly selects the alternate option "goof," if the decision is still alterable, then "goof" will subsequently be treated as the default option of that particular decision for purposes of alteration functionality and "good" will be treated as an alternate option. (This does not mean that explicitly selecting the alternate option "goof" necessarily has any effect on future interface decisions regarding whether or not to automatically replace the word "goof": it only means that "goof" will subsequently be treated as the default option of the alterable decision the interface already made.)

In the present specification, any mention of "alteration features" or "alteration functionality" may refer to features that are disclosed herein that are specifically designed to interact with alterable interface decisions. Any mention of "altering" an alterable interface decision generally refers only to altering such a decision by means of such alteration features, and generally does not refer to manual editing of the portion of the user's input that an alterable interface decision pertains to, unless otherwise specified. For example, if the interface has made an alterable decision to automatically insert an apostrophe in the word "its," then if the user manually deletes the apostrophe, the user will not be considered to have "altered" an alterable interface decision.

The Alteration Key

In an embodiment, in certain circumstances an alterable interface decision is the "currently alterable decision" for purposes of alteration functionality. In Chapter 3, methods and systems are described for determining which alterable interface decision, if any, is the currently alterable decision at any given time. (In an embodiment, the currently alterable decision is often, but not always, the most recent alterable decision, as is explained in Chapter 3. In an embodiment, it may be possible to alter an alterable decision by various means even when it is not the so-called currently alterable decision.)

In an embodiment, the computing device has an alteration key such that when the alteration key is actuated, if there is a currently alterable decision, then the interface will immediately alter that decision. For example, if the interface has made an alterable decision to automatically insert an apostrophe in the word "its" and that decision is the currently alterable decision, then actuating the alteration key will cause that apostrophe to be deleted, regardless of the input cursor's current location, without prompting the user for any additional confirmation or clarification. Such an alteration key will often enable a user to correct an undesired outcome of an interface decision with a single keystroke, without the need to go back and manually correct the interface decision.

In an embodiment, when the alteration key is actuated, if there is then no currently alterable decision but at least one alterable decision exists, then in response to that actuation of the alteration key the interface will cause the "most relevant decision" as defined in Chapter 3 to become the currently alterable decision, and no other effect will occur. (In such an embodiment, it may be particularly advantageous for the interface to then highlight the currently alterable decision, as is described in Chapter 5, so that the user can see the effect of such an actuation of the alteration key.) This behavior is illustrated by Actuation 6 of FIG. 2A.

As is discussed in Chapter 1, the alteration "key" need not necessarily be an individual key on a hardware keyboard, but may be any means of invoking the function that is specified above in the description of the alteration key. For example, in various embodiments, a key labeled "Oops" on a hardware keyboard may be the alteration key, or the F12 key may be the alteration key, or the key combination Ctrl-T may be the alteration key, or a specific virtual key on a virtual keyboard may be the alteration key, and so forth.

Deleting Alterable Decisions

In the present specification, when an alterable interface decision is said to "cease to exist," this means that subsequently none of the functionality disclosed herein that pertains to alterable interface decisions will treat that decision as an alterable interface decision, unless otherwise specified. For example, if an alterable interface decision has "ceased to exist," then that alterable interface decision cannot be the currently alterable decision and actuating the alteration key will not alter that decision. This does not mean that the portion of input that the decision pertained to ceases to exist. After an alterable interface decision has ceased to exist, information about the alterable interface decision may still be retained in the memory of the computing device for various purposes, such as for purposes of the automatic decision variation feature described in Chapter 17 and the manual alteration detection feature described in Chapter 18. In the present specification, if an alterable interface decision is said to be "deleted," this means that the alterable interface decision ceases to exist.

In an embodiment, if an action that causes an alterable interface decision to cease to exist is subsequently undone by means of the Undo key, then the alterable interface decision will be made to exist once again.

In an embodiment, an alterable interface decision will immediately cease to exist if the portion of input that it pertains to is deleted, because that alterable interface decision is no longer applicable. For example, when the interface has made an alterable decision to automatically convert the word "friday" to "Friday," that alterable interface decision will cease to exist if the entire sentence containing the word "Friday" is deleted.

In an embodiment, an alterable interface decision will immediately cease to exist if the portion of input that it pertains to is modified in some way other than by means of altering that particular interface decision, if the modification is sufficiently relevant to the nature of the alterable decision. For example, in an embodiment, when the interface has made an alterable decision to automatically convert the word "friday" to "Friday," that alterable interface decision will cease to exist if the user manually changes the word to "Friendly," but not if the user italicizes the word. In such an embodiment, in certain circumstances, the interface may make more than one alterable decision that pertains to the same portion of input, and altering one such decision need not necessarily cause all the other decisions that pertain to the same portion of input to cease to exist. For example, in an embodiment, if the interface makes an alterable decision to convert the word "friday" to "Friday," and the interface also makes an alterable decision whether or not to italicize this word, then the user can alter either, both, or neither of these two decisions.

In an alternative embodiment, an alterable interface decision will immediately cease to exist if the portion of input that it pertains to is modified in some way other than by means of altering that particular interface decision, regardless of whether or not the modification is relevant to the nature of the alterable decision.

In an alternative embodiment, an alterable interface decision will not necessarily cease to exist immediately as soon as the portion of input that it pertains to is deleted or modified: instead, as soon as it becomes relevant whether or not a particular alterable interface decision still exists, the interface will determine whether the portion of input that alterable decision pertains to appears to have been deleted or modified. For example, in such an embodiment, if a certain portion of input that an alterable interface decision pertains to is deleted and is then retyped exactly as before, the interface may not notice that such activity occurred and may not delete the alterable decision in response to such activity.

In an embodiment, when an alterable interface decision is altered, no other alterable interface decision will be deleted in response to the alteration of that alterable interface decision until the user has explicitly selected an option of that decision, and then only if deletion of the other decision is appropriate based on the option the user selected. In other words, in such an embodiment, if for example a user cycles past various options of an alterable interface decision by repeatedly actuating the alteration key as is described below, then no option that is only temporarily selected will cause any other alterable interface decision to permanently cease to exist.

In implementing an embodiment, a programmer should ensure by some means that if the interface makes an alterable decision and saves information regarding that alterable decision, subsequent editing actions do not cause that information to become inaccurate while it is still possible for the user to cause the interface to alter the decision. For example, if the interface alterably decides to capitalize the word "friday" and saves the information that it alterably chose to capitalize the 100th character in the document the user was editing, then this is sufficient information for the interface to be able to alter that decision by locating that letter F and converting it back to lowercase, but if subsequently the user moves the input cursor to the beginning of the document and inserts additional text there, then that letter F is no longer the 100th character of the document, so the interface should either update its information or delete the alterable decision. Those of ordinary skill in the art will understand how to implement an embodiment that updates location data for alterable decisions when appropriate. However, in an alternative embodiment, the interface deletes every alterable decision whenever a user either performs an action that directly affects input that precedes the current input cursor location or performs an action that moves the input cursor to an earlier location; in such an alternative embodiment, it is thus impossible to edit a portion of the document that is prior to the location of any alterable decision without deleting the alterable decision, and so it may never be necessary to update location data for alterable decisions. Such an alternative embodiment may be somewhat less advantageous, but may still have advantages over prior art, and may take less effort to implement.

The Alteration Key in Perspective

The alteration key as described herein is an unusually efficient means of recovering from a mistake. Generally, prior art mistake recovery features require a user to perform at least two gestures: one gesture to indicate the location of the mistake and cause the interface to display one or more possible corrections, and another gesture to select the desired correction. A single actuation of the alteration key is faster than that two-step process; in fact, for a user who has become accustomed to the alteration key, a single actuation of the alteration key will probably be faster than the first step of that process in most cases.

In many prior art interfaces, a user can fully recover from an undesired interface intervention by means of a single actuation of the Undo key in most cases provided that the user has not performed any other action since the undesired interface intervention occurred. However, if a user performs even one action before noticing an undesired interface intervention, then fully recovering from the mistake by means of the Undo key will require a three-step process: the user must undo everything he did after the undesired interface intervention occurred, and then must actuate the Undo key once more to undo the undesired interface intervention, and then must repeat everything he did after the undesired interface intervention occurred. It is quite common to not notice an undesired interface intervention right away, so in many cases the alteration key will be more efficient than prior art, even for correcting undesired interface interventions.

The present specification includes many illustrative examples of altering decisions, and many of these examples refer to the alteration key. In particular, in various places, in order to show that it may be advantageous to make some particular type of interface decision be an alterable interface decision, the present specification provides an example scenario in which a user who makes a particular type of mistake can easily correct the mistake with just a single actuation of the alteration key. Such examples are not intended to imply that an embodiment must necessarily have an alteration key in order for it to be possible to alter decisions; on the contrary, other means of altering decisions are described below, including means that may be more convenient than the alteration key in certain circumstances. It is to be understood that it may be useful to make various types of interface decisions be alterable decisions even in an embodiment that does not have an alteration key. For that reason, the behavior that constitutes "altering a decision" is defined herein in terms that do not explicitly refer to the alteration key.

Multi-Alternative Decisions

In an embodiment, in certain circumstances, when the interface makes an alterable decision in which the interface selects among more than two relevant available options, the interface will save enough information to later replace the option that was selected with any of the plurality of options that were not selected. In such a case, the alterable decision will have more than one alternate option. In the present specification, an alterable interface decision that has more than one alternate option will be referred to as a "multi-alternative decision"; an alterable interface decision that has only one alternate option will be referred to as a "single-alternative decision." (These terms thus refer to the number of alternate options of an alterable decision, not counting the default option.)

In an embodiment, after the interface has made an alterable interface decision, in certain circumstances, the interface may later add more alternate options to that alterable interface decision or may later remove alternate options from that alterable interface decision. In such an embodiment, it may be possible for a single-alternative decision to later become a multi-alternative decision, or vice versa.

In an embodiment, when the interface first alters a multi-alternative decision, in addition to selecting an alternate option of the decision, the interface will create a list of alternate options of that decision that have been selected. In an embodiment, when the interface alters a multi-alternative decision that the interface has previously altered, if an alternate option currently exists that has not been selected, then interface will replace the selected alternate option with an alternate option that has not yet been selected and will then add the newly selected alternate option to the list of alternate options that have been selected. For example, in a certain embodiment, when a user types the word "Tursday" and presses the space bar key the interface may make a decision between three options: leaving the word as "Tursday," correcting the word to read "Tuesday," or correcting the word to read "Thursday"; if the interface initially decides to correct the word to read "Tuesday," such a correction may be a multi-alternative decision such that if the user then actuates the alteration key once the word will be changed to "Thursday" and if the user then actuates the alteration key a second consecutive time the word will be changed to "Tursday." This example corresponds to Actuations 3 and 4 of FIG. 2A. Thus, in such an embodiment, if the interface responds to a first actuation of the alteration key by selecting an alternate option that is not the particular alternate option a user desired, then the user can simply continue to actuate the alteration key repeatedly until the desired alternate option becomes selected.

Reverting Alterable Decisions

In an embodiment, when the interface alters a single-alternative decision, if the decision already has its alternate option selected, then the interface reverts that decision to its default option. For example, if the currently alterable decision is the interface's decision to insert an apostrophe in the word "it's," and if this decision is a single-alternative decision, then after the user actuates the alteration key once and thus causes the apostrophe to be deleted, actuating the alteration key a second consecutive time will cause the apostrophe to be inserted again, as is illustrated by Actuation 2 of FIG. 2A. Similarly, in an embodiment, when the interface alters a multi-alternative decision, if the decision has already been altered sufficiently many times that it is no longer possible for the interface to again replace the selected alternate option with a different alternate option that has not been selected yet, then the interface will instead revert that decision to its default option, as is illustrated by Actuation 5 of FIG. 2A. Thus, in such an embodiment, if in response to an actuation of the alteration key the interface actually introduces a new mistake by changing a decision that the user did not want to change, then the user can correct this mistake by continuing to actuate the alteration key repeatedly until the decision reverts to its default option.

In an embodiment, once a user causes the interface to alter an alterable decision sufficiently many times that the decision reverts to its default option, the user has "completed review" of that alterable interface decision. When a user causes the interface to alter an alterable decision sufficiently many times that every alternate option of that decision has been selected at some point, the user still has not "completed review" of that decision until the user causes that decision to revert to its default option.

In an embodiment, after the interface reverts a multi-alternative alterable decision to its default option, the interface will discard or empty its list of alternate options of that decision that have been selected, which means that the interface will subsequently regard each alternate option as though it had not been selected yet, and so continuing to repeatedly alter that particular decision will cause the interface to cycle through the various alternate options again.

The Alteration Cycle

In an embodiment, for purposes of the interface behaviors described in the following paragraphs, the alteration key is an "alteration-cycle-related key." Other alteration-cycle-related keys are described in Chapter 9.

In an embodiment, except as otherwise specified, whenever the user's most recent action was not an actuation of an alteration-cycle-related key, the currently alterable decision is the "most relevant" alterable interface decision as defined below. (In an embodiment, the most relevant alterable decision is often, but not always, the most recent alterable decision, as is explained in Chapter 3.)

In an embodiment, when a user actuates the alteration key or some other alteration-cycle-related key, if the user's most recent previous action was not an actuation of an alteration-cycle-related key, then the interface will determine an "alteration cycle" that initially includes every alterable decision other than the currently alterable decision. The interface will continue to remember this alteration cycle until the user performs an action that is not an actuation of an alteration-cycle-related key, except as otherwise specified below. (Once the user performs an action that is not an actuation of an alteration-cycle-related key this alteration cycle is no longer relevant, so after that, the next time the user actuates an alteration-cycle-related key, the interface will determine a new, updated alteration cycle.)

In an embodiment, when a user performs an actuation of the alteration key that causes the currently alterable decision to revert to its default option, the interface will "move on to the next decision in the alteration cycle." When the interface moves on to the next decision in the alteration cycle, this means that if any decisions remain in the alteration cycle, then the most relevant decision that is in the alteration cycle will be removed from the alteration cycle and will become the new currently alterable decision. This is illustrated by Actuation 2 of FIG. 2A, which not only causes an alterable decision to revert to its default option but also causes a different alterable decision to become the new currently alterable decision. Thus, in an embodiment, if a user does not notice that a particular alterable decision had an undesired outcome until after the interface has made other alterable decisions, then as long as that particular decision is still alterable, it is still possible for the user to correct the mistake by means of the alteration key: the user can repeatedly press the alteration key sufficiently many times to cycle past any more relevant alterable decisions (which are, in most cases, the more recent alterable decisions) and then press the alteration key again to alter the decision that had the undesired outcome.

In an alternative embodiment, when a user performs an actuation of the alteration key that causes the currently alterable decision to revert to its default option, if any decisions remain in the alteration cycle, then the interface will move on to the next decision in the alteration cycle as described in the preceding paragraph, and will also alter the new currently alterable decision (if any). (In such an embodiment, it may be particularly advantageous to have a No key or Escape key that can revert the currently alterable decision to its default option without affecting any other alterable decision, as is described in Chapter 9.)

In an embodiment, if no decisions are in the alteration cycle when the interface moves on to the next decision in the alteration cycle, then there will cease to be a currently alterable decision and this alteration cycle will no longer be relevant, as is illustrated by Actuation 5 in FIG. 2A. In an embodiment, after this happens, if the user's next action is an actuation of the alteration key, then that actuation of the alteration key will have the same effect as though it were a nonconsecutive actuation of the alteration key: the most relevant alterable decision will become the currently alterable decision, and the interface will determine a new, updated alteration cycle. This behavior is illustrated by Actuation 6 in FIG. 2A, which returns the user's input to its initial state so that a seventh consecutive actuation of the alteration key would have the same effect that Actuation 1 had. Thus, in such an embodiment, by continuing to actuate the alteration key consecutively, a user may repeatedly cycle through alterable interface decisions.

In an alternative embodiment, if no decisions are in the alteration cycle when the interface moves on to the next decision in the alteration cycle, then there will cease to be a currently alterable decision, and any further consecutive actuations of the alteration key will have no effect: there will be no currently alterable decision until after the user performs an action that is not an actuation of an alteration-cycle-related key.

In another alternative embodiment, if no decisions are in the alteration cycle when the interface moves on to the next decision in the alteration cycle, then the most relevant alterable decision will become the new currently alterable decision (even if it was the previous currently alterable decision) and the interface will add every alterable decision other than that decision to the alteration cycle. In such an embodiment, by continuing to actuate the alteration key consecutively, a user may repeatedly cycle through alterable interface decisions without arriving at any intermediate state in which there is no currently alterable decision.

In an embodiment that behaves as described in the preceding paragraphs, when a user is actuating the alteration key repeatedly, the alteration cycle contains all the alterable decisions that have not yet become the currently alterable decision. It will be evident to those of ordinary skill in the art that alternative embodiments can be constructed where the interface behaves the same way as an embodiment that has an alteration cycle as described above, but where this interface behavior is achieved by a slightly different means. For example, in one alternative embodiment, instead of keeping track of an alteration cycle that contains all the alterable decisions that have not yet become the currently alterable decision, the interface keeps track of a "used decision list" of all the alterable decisions that have already become the currently alterable decision, and when the interface "moves on to the next decision in the alteration cycle," this means that first the currently alterable decision is added to the used decision list, and then if there are any remaining alterable decisions that are not in the used decision list then the most relevant remaining alterable decision becomes the new currently alterable decision.

Specialized Alteration Cycles

Farther below, certain user actions are described such that when a user performs the action, the interface will alter an alterable interface decision that fits certain criteria, in some embodiments. Unless otherwise specified, when performing an action is said to cause the interface to alter an alterable interface decision that fits certain criteria, this means that the action serves the purpose of an alteration key that affects only alterable decisions that fit the criteria, in an embodiment (regardless of whether the embodiment has an alteration key).

In other words, if performing an action is said to cause the interface to alter an alterable interface decision that fits certain criteria, this means that in an embodiment, when the user performs such an action, if the user's previous action was not the exact same action, then the interface will alter the most relevant alterable decision that fits the criteria, and will determine and remember a specialized alteration cycle that includes any other alterable decisions that fit the same criteria. If the user then performs the exact same action several more times consecutively, then after the interface reverts the most relevant decision that fits the criteria to its default option, the interface will begin to cycle through the options of the other alterable decisions in the specialized alteration cycle.

For example, in an embodiment that is described in Chapter 25, a spoken alteration command exists such that if a user says "Alter 'its'" then the interface will alter an alterable interface decision pertaining to an occurrence of the word "its," if any such alterable decision exists. Where that interface behavior is explained, it is not explicitly specified what will happen if a user says "Alter 'its'" when more than one alterable decision exists that pertains to an occurrence of the word "its"; nevertheless, even though it is not explicitly specified below, in light of the above paragraphs it is to be understood that, in an embodiment, in such circumstances the interface will alter the most relevant alterable decision that pertains to an occurrence of the word "its," and then if the user repeats the same spoken command sufficiently many times consecutively, the interface will eventually cycle through every alterable decision that pertains to an occurrence of the word "its."

Repeated Alteration Features in Perspective

In some embodiments, a user may be able to correct a wide variety of mistakes with just a single actuation of the alteration key, with no need to explicitly specify what mistake to correct or what correction is desired, because in many cases the currently alterable decision will be the mistake the user wishes to correct and the first alternate option will be the desired correction. The alteration key may therefore be advantageous even in an embodiment where only a first actuation of the alteration key has any effect.

However, the alteration key may be significantly more advantageous in an embodiment where additional consecutive actuations of the alteration key have additional effects as described above. In such an embodiment, when a first actuation of the alteration key makes a different change than the one a user desires, additional consecutive actuations of the alteration key may revert the undesired change and/or make the desired change. It is usually possible to actuate a single key multiple consecutive times relatively quickly, so actuating the alteration key several consecutive times in order to achieve a desired result may still be a fairly efficient way to achieve that result. Likewise, for similar reasons, various other means of alteration that are described below may be more advantageous in an embodiment where additional consecutive alterations may have additional effects.

Chapter 3: Alteration Probability

Alteration Probability

In an embodiment, when the interface makes an alterable decision, the interface will assign to that decision a "probability of alteration" that reflects the approximate ratio of the mathematical probability that a user will wish to select the single most desirable alternate option of the decision to the mathematical probability that the user will wish the default option to remain selected, insofar as the interface is able to determine such a ratio. Such an embodiment will be said to have "the alteration probability feature."

(For most purposes, the probability of alteration of an alterable decision may be thought of as reflecting the approximate probability that a user will wish to alter that decision, insofar as the interface is able to determine such a probability. This is a simpler explanation of the probability of alteration than the one given in the preceding paragraph, and works out to be essentially the same thing except when there is a reasonably high probability that a user will wish to select an alternate option of the decision other than the most desirable alternate option of the decision.)

In an embodiment, the "most relevant" alterable interface decision is the alterable decision that has the highest probability of alteration; if more than one alterable decision is tied for the highest probability of alteration, the "most relevant" alterable interface decision is the most recent decision among the decisions that have the highest probability of alteration. In such an embodiment, an alterable decision is "more relevant" than another decision if it has a higher probability of alteration or if it has an equal probability of alteration and is more recent. Thus, in such an embodiment, if the embodiment has an alteration key, then a first actuation of the alteration key will alter the most recent alterable interface decision unless some other alterable interface decision currently has a higher probability of alteration.

In an alternative embodiment, the "most relevant" alterable interface decision is simply the most recent alterable decision, and an alterable decision is "more relevant" than another decision if it is more recent.

Figure 3:
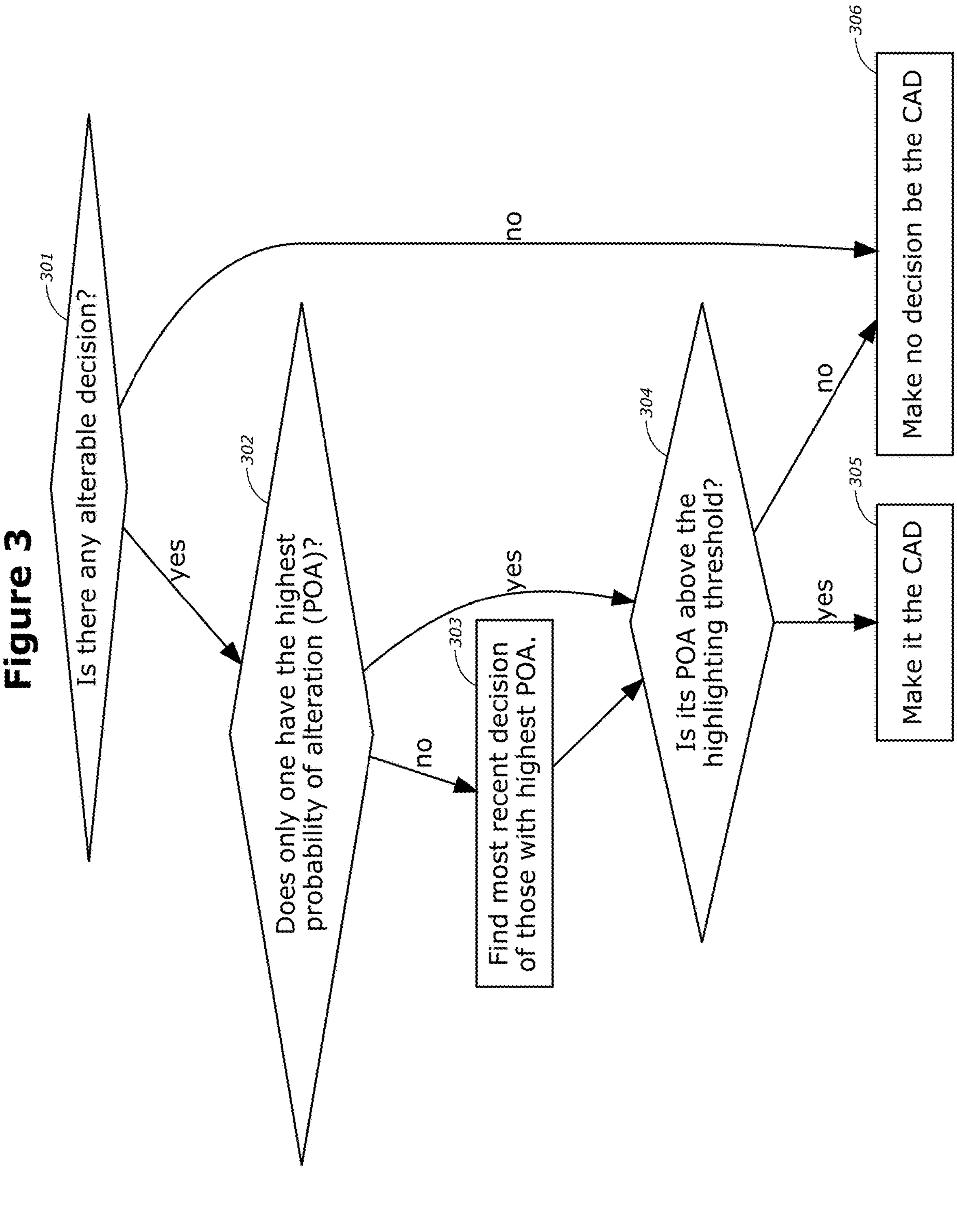
FIG. 3 is a flowchart that illustrates in detail how the currently alterable decision is determined, according to one embodiment.

FIG. 3 is a flowchart that illustrates in detail how the currently alterable decision is determined, in an embodiment. Block 301 asks, "Is there any alterable decision?" If the answer is yes, then the algorithm proceeds to Block 302, which asks, "Does only one have the highest probability of alteration (POA)?" If more than one alterable decision is tied for the highest probability of alternation, then the answer is no, and the algorithm proceeds to Block 303, which states "Find most recent decision of those with highest POA." The most recent decision is then evaluated using the question in Block 304, "Is its POA above the highlight threshold?" If only one alterable decision has the highest probability of alteration, the answer to the question in Block 302 is yes, and that alterable decision is evaluated using the question in Block 304. If the answer to the question in Block 304 is yes, the alterable decision being considered becomes the currently alterable decision (Block 305). If the answer is no, then no decision will be the currently alterable decision (Block 306). Similarly, if there is no alterable decision initially, then the answer to the question in Block 301 is no and the algorithm proceeds directly to Block 306, which states, "Make no decision be the CAD."

Alteration Probability in Perspective

Generally, if there is a high probability that an interface decision had an undesirable outcome, then it is desirable for the interface to make it as easy as possible for the user to notice the outcome and to alter the outcome if necessary. If there is a moderately low probability that an interface decision had an undesirable outcome, then it is still desirable for the interface to make it easy for the user to alter the outcome if necessary, but it is not as high a priority: for such a decision, it may be more important for the interface to ensure that alteration functionality pertaining to such a decision does not inconvenience the user in any way. It may thus be advantageous to treat alterable decisions somewhat differently depending on their probabilities of alteration.

In various places, the present specification will explain features that treat alterable decisions differently depending on their probabilities of alteration. For example, in an embodiment that has various features that are described in Chapter 13, if, say, the interface has made an alterable autocorrection decision pertaining to a text message, and at the moment when the user attempts to send the message the interface estimates that there is still about a 40% chance that the user wishes to alter that decision, then the interface will prominently highlight the outcome of the decision and will delay sending the message so as to give the user ample opportunity to alter the decision if desired. If the interface estimates that there is only a 4% chance that the user wishes to alter a decision, then it will highlight the outcome of the decision more subtly and will not delay sending a message on account of the decision. If the interface estimates that there is only a 0.4% chance that the user wishes to alter a decision, then it will not even highlight the decision unless the user enters a special alterable decision review mode. In an embodiment that has such functionality, it may be quite advantageous for probabilities of alteration to be roughly accurate in the aggregate, so that it will be quite common for users to wish to alter decisions that have very high probabilities of alteration and not at all common for users to wish to alter decisions that have very low probabilities of alteration.

However, even though it may be advantageous for probabilities of alteration to be roughly accurate in the aggregate, it may not be necessary for probabilities of alteration to be especially fine-tuned. As is mentioned in the preceding paragraph, in an embodiment, there may be an easily noticeable distinction in the way the interface treats an alterable decision depending on whether the interface estimates that there is a 40% chance or a 4% chance or a 0.4% chance that the user wishes to alter the decision; however, there need not be much distinction between the way the interface treats an alterable decision when the interface estimates that there is, say, a 10% chance that the user wishes to alter the decision versus the way it treats a decision when it estimates there is a 20% chance. For that reason, probabilities of alteration may be quite serviceable even if they are only roughly accurate. Besides, even if the probability of alteration that is assigned to a particular alterable decision is wildly unrealistic, this will not directly cause a mistake: at worst, a probability of alteration that is far too high will cause the interface to unnecessarily distract and delay the user; and at worst, a probability of alteration that is far too low will prevent the interface from calling the user's attention to a potential mistake, or may make it slightly less convenient for the user to correct the mistake by means of alteration functionality if it is indeed a mistake, but generally will not present any disadvantages compared to prior art interfaces that do not have alteration functionality at all.

Generally, in discussing functionality that pertains to probabilities of alteration, the present specification will describe quite precisely what the factors are that affect probabilities of alteration in some embodiments, but will not necessarily quantify the degree to which these factors affect probabilities of alteration with especial precision. It is to be understood that such functionality generally need not necessarily be calibrated carefully in order to yield significant advantages over prior art; however, those of ordinary skill in the art will understand how to calibrate such functionality carefully if desired. For example, an interface behavior is described below such that each time time a user inputs a character or otherwise performs an editing action that does not pertain to alteration functionality or undo functionality, the interface will slightly decrease all probabilities of alteration. In an embodiment that has such functionality, if an alterable decision is highlighted because its probability of alteration is above a certain highlighting threshold (as is described in Chapter 5), and a user sees that the alterable decision is highlighted but ignores it and keeps on typing, after a while the alterable decision will no longer be highlighted. Whether the relevant functionality is calibrated in such a way that an alterable decision that originally has a very high probability of alteration remains highlighted for five keystrokes, or whether it is calibrated in such a way that the decision remains highlighted for 50 keystrokes, such functionality may be advantageous in that it may call a user's attention to potential mistakes yet will not continue to distract the user indefinitely. Those of ordinary skill in the art will understand how to ask users their preferences and how to calibrate such highlighting functionality so as to suit the preferences of an average user of a particular computing device, but such careful calibration may not be necessary in order to yield significant advantages.

In various places throughout the present specification, descriptions of various features include explanations of how the features interact with the probabilities of alteration of alterable decisions, under the implicit assumption that such features will be included in an embodiment that also has the alteration probability feature. Such features may be especially advantageous in an embodiment that has the alteration probability feature, but many of these features may still be advantageous even in an embodiment that does not have the alteration probability feature. Where the description of a feature in the present specification implicitly assumes that alterable decisions have probabilities of alteration, it will be obvious to those of ordinary skill in the art how such a feature can be simplified for inclusion in an embodiment that does not have the alteration probability feature. Generally, in an embodiment that does not have the alteration probability feature, every alterable decision can always be treated as though it had, say, a medium probability of alteration, even though alterable decisions do not actually have individual probabilities of alteration in such an embodiment. In such an embodiment, any circumstances that are said herein to cause the interface to substantially reduce a decision's probability of alteration may instead cause the interface to delete the decision outright (which means that the decision will no longer be alterable). In such an embodiment, any interface decision that is described herein as an alterable decision with a very low probability of alteration may instead be implemented as an interface decision that is not alterable. For example, features are described below such that in an embodiment, an alterable decision is highlighted only when its probability of alteration exceeds a certain threshold, and probabilities of alteration tend to gradually decrease over time; in an alternative embodiment that does not have the alteration probability feature, such features can be simplified so that in an embodiment, every alterable decision is always highlighted, and each alterable decision ceases to be alterable after, say, 10 seconds.

Option Probability

In an embodiment, when an alterable interface decision is a multi-alternative decision, the interface may assign individual probabilities of alteration to the various alternate options of that multi-alternative decision, where each such probability of alteration reflects the approximate ratio of how probable it is that a user will wish to select that alternate option to how probable it is that the user will wish the default option to remain selected, insofar as the interface is able to determine such a ratio. Such an embodiment will be said to have "the individual option probability feature." For example, if the interface makes a decision among five options and determines that the five options are approximately equally desirable, then regardless of which option becomes the default option, all four of the alternate options will be assigned very high probabilities of alteration. In an embodiment, the probability of alteration that is assigned to a multi-alternative decision will equal the probability of alteration of its alternate option that has the greatest probability of alteration.

In an embodiment, for some or all multi-alternative decisions, the sequence in which the various alternate options of a multi-alternative decision will be selected if the interface repeatedly alters the decision is determined by the probability of alteration of the various alternate options: each time the interface alters the decision, it will replace the currently selected option with the alternate option that has the highest probability of alteration among the options that have not been selected yet, or select an alternate option that is tied for the highest probability of alteration among the options that have not been selected yet, until every option has been selected. Such an embodiment may more frequently enable a user to achieve a desired outcome with fewer keystrokes.

In various places, the present specification will explain how to assign appropriate probabilities of alteration to the alternate options of various multi-alternative decisions. It is to be understood that whenever the present specification explains how to assign appropriate probabilities of alteration to alternate options, such explanations may alternatively be interpreted as explanations of how to arrange alternate options in an appropriate sequence, and so these explanations may also be applicable (with appropriate modifications) even in an embodiment that does not have the individual option probability feature.

In an embodiment that has the alteration probability feature but does not have the individual option probability feature, every alternate option of any particular alterable interface decision may be treated as having the same probability of alteration that is assigned to the decision itself. Thus, whenever the present specification explains interface behaviors that take into account the probabilities of alteration of individual options of alterable interface decisions, it is to be understood that in an alternative embodiment that has the alteration probability feature but does not have the individual option probability feature, each reference in the present specification to the probability of alteration of an individual option of an alterable interface decision may instead be interpreted as a reference to the probability of alteration of the decision itself. For example, for such an embodiment, where the present specification refers to "each alternate option that has a probability of alteration that is above the alteration hint threshold," this may be understood to mean "each alternate option that is an option of an alterable interface decision that has a probability of alteration that is above the alteration hint threshold."

Representing Probabilities of Alteration

In order to implement the alteration probability feature, it is not necessary to represent a probability of alteration in terms of an actual mathematical probability between 0% and 100%; it is necessary only to represent a probability of alteration in a form such that it is possible to distinguish between relatively high probabilities and relatively low probabilities. For example, in an embodiment, the probability of alteration of each alterable interface decision is initially an integer value between 1 and 5 inclusive, where 1 represents a very low probability of alteration and 5 represents a very high probability of alteration.

For certain purposes that are described below, it may occasionally be advantageous for the interface to be able to determine an approximate mathematical probability that corresponds to a particular probability of alteration. Therefore, in an embodiment, the interface will have a conversion table or some other conversion algorithm for converting a probability of alteration from its usual representation to a representation in terms of the mathematical percentage chance that a user who desires either that particular alternate option or the default option will prefer that particular alternate option over the default option. For example, in an embodiment, the interface will determine that a probability of alteration of 5 or more corresponds to approximately a 50% chance that a user will prefer that particular alternate option over the default option (provided that the user does not prefer some other alternate option over the both of them), a probability of alteration of at least 4 but less than 5 corresponds to approximately a 25% chance that a user will prefer that particular alternate option over the default option, a probability of alteration of at least 3 but less than 4 corresponds to approximately a 10% chance, and so forth.

Conversely, in an embodiment, the interface will have a conversion table or some other conversion algorithm for converting a mathematical percentage chance back to a probability of alteration represented in its usual form. For example, in an embodiment, if the interface has somehow determined that there is at least a 20% chance but less than a 40% chance that a user will prefer a particular alternate option over the default option, then the interface will assign that alternate option a probability of alteration of 4.

Those of ordinary skill in the art will understand that any such conversion algorithms can be made more accurate by collecting usage data. For example, an interface designer may initially estimate that for any single-alternative interface decision that has a probability of alteration equal to 3.0 there is approximately a 10% chance that a user will select the alternate outcome of that decision, but may later collect usage data that indicates that users actually select alternate outcomes of such decisions only 2.4% of the time. However, many features described herein were designed with the expectation that probabilities of alteration will be approximate, so conversion algorithms may be quite serviceable even if the interface designer does not go to great lengths to maximize their accuracy.

In an embodiment, for a multi-alternative alterable decision, in certain circumstances, the interface will determine the overall percentage chance that a user will prefer each particular option over all the other options of the decision (as opposed to just the percentage chance the user will prefer that option over the default option provided that the user does not prefer some other option over the both of them). These overall percentage chances may be derived from the mathematical percentage chance that the user will prefer each particular option over the default option; for example, if an alterable decision has two alternate options, and for one of the alternate options there is a 10% chance that a user who desires either that option or the default option will desire that option (and thus a 90% chance that the user will prefer the default option), and for the other there is a 20% chance that the user will prefer that option over the default option (and thus an 80% chance that the user will prefer the default option), then the ratio of the first option's overall percentage chance to the default option's overall percentage chance equals the ratio 10%:90%, and the ratio of the second option's overall percentage chance to the default option's overall percentage chance equals the ratio 20%:80%, and the sum of these three overall percentage chances equals 100%; from this information three equations can be constructed that involve the three overall percentage chances of the three options, and this system of three equations with three variables can be solved by straightforward algebra. Conversely, in an embodiment, for a multi-alternative alterable decision, in certain circumstances, the interface will determine the percentage chance that a user will prefer each particular option over the default option by deriving this from the ratio of the overall percentage chance that the user will prefer that option over all the others to the overall percentage chance that the user will prefer the default option over all the others.

Probability Reduction

In an embodiment, the interface may change the probability of alteration of an alterable interface decision that was previously created, for various reasons.

In an embodiment, when a user explicitly selects an option of an alterable interface decision, or when a user completes review of an alterable interface decision, the interface will drastically decrease the probability of alteration of that decision (and each of its options) so that decision's probability of alteration will become extremely low. In an embodiment, the interface will decrease the probability of alteration by a sufficient amount in such circumstances that even if a first alterable interface decision initially has a very high probability of alteration and a second alterable interface decision initially has a very low probability of alteration, once a user has explicitly selected an option of the first decision or completed review of the first decision but has not yet thus interacted with the second decision, the first decision will have an even lower probability of alteration than the second decision.

In an embodiment, the amount by which the interface reduces probabilities of alteration when a user explicitly selects an option of an alterable interface decision is substantially more than the amount by which the interface reduces probabilities of alteration when a user completes review of an alterable interface decision.

Whenever the present specification describes an embodiment in which the interface will greatly reduce a decision's probability of alteration in certain circumstances, it is to be understood that in an alternative embodiment, the interface will instead delete a decision in such circumstances. For example, the preceding paragraphs are to be understood to mean that in an alternative embodiment, when a user explicitly selects an option of an alterable interface decision or completes review of an alterable interface decision, the interface will delete the decision.

In Chapter 12, other circumstances are described in which the interface will reduce probabilities of alteration, in some embodiments. For example, in an embodiment, each time the user inputs a character or otherwise performs an editing action that does not pertain to alteration functionality or undo functionality, the interface will slightly decrease all probabilities of alteration. As a result, the interface may sometimes consider a recent alterable decision to be more relevant than an alterable decision that is not very recent even if the recent decision has a lower probability of alteration than the other decision initially had. This behavior and other behaviors that pertain to reducing probabilities of alteration are described in more detail in Chapter 12.

For example, in one possible embodiment, every probability of alteration is represented in the memory of a computing device as a signed numeral that is initially an integer between 1 and 5 inclusive. When a user explicitly selects an option of an alterable interface decision, the probability of alteration of that decision (and each of its options) decreases by 20. When a user completes review of an alterable interface decision, the probability of alteration of that decision (and each of its options) decreases by 10. When a user inputs a character or otherwise performs an editing action that does not pertain to alteration functionality or undo functionality, the probability of alteration of all previously existing alterable decisions (and each of their options) decreases by 0.2.

Identical Options

In an embodiment, if options of two distinct alterable interface decisions would yield the same result—that is, if selecting a particular option of one alterable interface decision would happen to yield a result that is exactly identical to the result that would be yielded by selecting a particular option of a different alterable interface decision—then whenever the interface changes the probability of alteration of either one of these options, the interface will also make a corresponding change to the probability of alteration of the other. In particular, when the user explicitly selects an option of either decision or completes review of either decision without selecting an option that yields the particular result, the interface will drastically decrease the probability of alteration of both options that would yield that result.

Deleting Irrelevant Options

In an embodiment, when the probability of alteration of an alterable interface decision becomes lower than a certain "deletion threshold," the interface will automatically delete the decision. In an embodiment, when the probability of alteration of an option of an alterable interface decision becomes lower than the deletion threshold, the interface will automatically delete that option, and if the alterable decision then has no remaining options other than the one that is currently selected, the interface will automatically delete the decision. Of course, in order for alterable decisions that initially have a "very low" probability of alteration to actually be alterable for a while, the deletion threshold should be even lower than a "very low" probability of alteration. In an embodiment, the deletion threshold will be equal to the probability of alteration that would be assigned to an alterable decision after the user completed review of the decision if the decision's probability of alteration had been very low before the user completed review.

In an embodiment, as an exception, when a user performs an action that pertains to alteration functionality, the interface will not delete any alterable decisions or options of alterable decisions due to their probabilities of alteration becoming lower than the deletion threshold until the user performs an action that does not pertain to alteration functionality.

In an embodiment, as another exception, if in some circumstances the only possible way for a user to achieve a certain result is by means of altering a particular alterable interface decision in order to select a particular option, then the interface will ensure that in such circumstances such an option and such a decision will not be deleted while they may still be relevant, either by ensuring that their probabilities of alteration will not fall below the deletion threshold, or by preventing the option or decision from being deleted even if its probability of alteration falls below the deletion threshold. For example, in an embodiment that is a calculator interface where a user can convert an answer to percentage form only by means of altering a particular alterable interface decision in order to select a particular option of that decision, the interface will prevent that option of that decision from being deleted until the user has moved on to the next problem.

In an alternative embodiment, the interface will instead simply delete an alterable decision after a certain minimum amount of time passes during which the user does not alter the decision (such as, in an embodiment, a minute). In another alternative embodiment, the user will delete an alterable decision after a certain minimum number of user actions occur during which the user does not alter the decision (such as, in an embodiment, 50 actions).

Automatic Alteration

In the present specification, every reference to "alteration" refers only to alteration of an alterable interface decision that occurs after the decision was made, in response to a subsequent user action; a single user action will not both cause the interface to make an alterable decision and also cause the interface to immediately alter that decision. "Automatic alteration" refers to what happens if a user action causes the interface to make an alterable decision and then a subsequent user action causes the interface to increase the probability of that alterable decision to a level that is so high that the interface decides to automatically alter the decision on its own initiative.

In the present specification, the "implicit default option probability" is the probability of alteration that would be assigned to an alternate option of an alterable interface decision if the interface determined that the alternate option was exactly as desirable an outcome as the default option. Ordinarily, a decision's probability of alteration will not exceed the implicit default option probability, because that would mean that the interface considered an alternate option to be more desirable than the default option, and that is not usually possible because the interface usually chooses the most desirable option to be the default option. However, in an embodiment, in some cases, after the interface makes an alterable interface decision, subsequent user actions may cause the interface to reevaluate the probability of alteration of the decision in light of new circumstances, which in some cases may cause a probability of alteration to exceed the implicit default option probability.

In an embodiment, after an alterable interface decision is made, if the probability of alteration of any alternate option of the decision subsequently becomes higher than a certain automatic alteration probability threshold, then the interface will automatically alter the decision so that the alternate option that had the highest probability of alteration becomes selected. (In case of a tie, the interface will alter the decision so that any such alternate option becomes selected.) Such an embodiment will be said to have "the automatic alteration feature."

In an embodiment, the automatic alteration probability threshold will be extremely high, so that it is very rare for an undesired automatic alteration to occur. In particular, in an embodiment, the automatic alteration probability threshold will be somewhat higher than the implicit default option probability, so that even if the interface comes to believe there is slightly above a 50% chance that a user desires for the alternate option of a previously made single-alternative alterable decision to become selected, the interface will not take the initiative to automatically alter the decision until it becomes even more confident that the user desires the alternate option. For example, in an embodiment, the implicit default option probability is 5.0, and no alterable interface decision will have a probability of alteration that initially exceeds 5.0, and the automatic alteration probability threshold is 6.0.

In most cases, after an interface has made an alterable interface decision, it will not be possible for subsequent user actions to cause the interface to increase the probability of alteration of that decision or any of its options very much. Furthermore, in an embodiment, the interface will generally tend to gradually decrease probabilities of alteration, as is described in Chapter 12. Therefore, in an embodiment where the probability threshold for the automatic alteration feature is very high, it may be very unusual for the interface to automatically alter a decision after the user has entered much more input—which may be advantageous: a very belated automatic alteration is very likely to be quite unexpected.

In an embodiment, after the interface automatically alters a decision, the option that becomes selected will subsequently be treated as the default option of that decision, and the former default option of that decision will be treated as an alternate option. However, when the interface automatically alters a decision, this does not mean that the user has "explicitly selected an option" of that decision, and so the interface will not drastically decrease the probability of alteration of that decision; on the contrary, such a decision will typically have a high probability of alteration after it is automatically altered, as is explained in the following paragraph.

In an embodiment, after the interface automatically alters a decision, the alternate option that had been the default option before the automatic alteration occurred will be assigned a probability of alteration that equals a very high probability of alteration minus the amount by which the decision's probability of alteration exceeded the automatic alteration probability threshold. Because a decision's probability of alteration will rarely exceed the automatic alteration probability threshold by much, after the interface automatically alters a decision, the option that had been the default option before the automatic alteration occurred will usually have a very high probability of alteration. (Of course, its probability of alteration will not be so high that a second automatic alteration will occur immediately and thus undo the first automatic alteration.) A very high probability of alteration may be desirable in such circumstances, not because it is especially likely that the user will wish to select that previously selected option—on the contrary, if it were likely, then automatic alteration would not have occurred—but because in the event that the user does wish to select that option, the user may be especially frustrated that the interface belatedly introduced a mistake, and so it may be especially desirable to facilitate noticing and correcting any such mistake.

Where the present specification recommends that an alterable interface decision be assigned a probability of alteration that is "very high," this should not be taken to mean that the interface might automatically alter that decision at any point—not unless the present specification explicitly mentions such a possibility.

The automatic alteration feature may generally be advantageous in an embodiment that has certain specific types of alterable decisions such that immediately subsequent user input can make it obvious that the original outcome of the alterable decision was the wrong outcome. For example, after the interface makes an alterable autocorrection decision, it is possible that the next word a user types could make it obvious to an autocorrection algorithm that the interface probably made the wrong decision, if the autocorrection algorithm makes use of data regarding how common certain word combinations are.

Score-Based Decisions

In an embodiment, in some cases, in order for the interface to decide between two or more possible outcomes, the interface will calculate for each outcome a value that is based on circumstances, and then the interface will select the outcome that has the highest such calculated value. Each such calculated value will be referred to herein as a "decision score," and such a decision will be referred to as a "score-based decision." The "score gap" of an option of such a decision equals the decision score of the default option minus the decision score of that option; the score gap of the default option thus equals zero.

In an embodiment, when the interface makes a score-based decision that is an alterable decision, the probability of alteration that is assigned to an alternate option of that decision will be high when the score gap of that alternate option is relatively low, and will be low when the score gap of that alternate option is relatively high; that is, if an option's decision score is almost as high as the decision score of the default option, then that option will be assigned a high probability of alteration, or if an option's decision score is much lower than the decision score of the default option, then that option will be assigned a low probability of alteration.

In an embodiment, for some or all score-based decisions, when such a decision is made, for each outcome that does not have the highest option score, that outcome will become an alternate option of the decision only if its option score is within a certain amount of the highest option score; in other words, if an outcome's score gap is more than a certain amount, then that outcome will not become an alternate option. Such a score-based decision will be an alterable decision if and only if it has at least one alternate option. Such a score-based decision will be referred to herein as a "conditionally alterable score-based decision."

In an embodiment, the exact details of the calibration of probabilities of alteration of score-based decisions are different for some types of score-based decisions than for others. For example, for one type of decision it may be common for decision scores to vary by hundreds of points, so when the decision score of an option of such a decision is just 20 points less than the default option's decision score, that option will be assigned a very high probability of alteration; for another type of decision, when the decision score of an option of such a decision is 20 points less than the default option's decision score, that option will be assigned a very low probability of alteration or eliminated altogether.

In an embodiment, in certain circumstances the interface may recalculate the decision scores of the options of a score-based decision after the user has performed additional actions. If the interface does so, then the interface will accordingly recalculate the probabilities of alteration of the alternate options of that decision. If an alternate option then comes to have a decision score that is higher than the decision score of the default option, then its score gap will be negative, and that alternate option will be assigned an extremely high probability of alteration. In an embodiment that has the automatic alteration feature, if an alternate option comes to have a decision score that exceeds the decision score of the default option by more than a certain amount, then that alternate option may be assigned such a high probability of alteration that the interface will automatically alter the decision, in which case the interface will recalculate the probabilities of alteration of the new alternate options of that decision based on how their decision scores compare to the decision score of the new default option. In an embodiment, after the interface automatically alters a score-based decision, it will add a bonus to the probability of alteration of the alternate option that had been the default option before the automatic alteration occurred (but not such a large bonus that a second automatic alteration will occur immediately).

Threshold Decisions

In an embodiment, in some cases, in order for the interface to decide between exactly two possible outcomes, the interface will calculate a value that is based on circumstances, and then the interface will select one outcome if that value exceeds a certain threshold value or the other outcome if it does not. Such a calculated value will be referred to herein as a "decision score," and such a decision will be referred to as a "threshold decision." For example, in an embodiment, if a user actuates the space bar twice consecutively, the interface will determine the amount of time that elapsed between the two consecutive actuations and will make a threshold decision whether to replace the first space character with a period character: the interface will replace the first space character with a period character if and only if the amount of time that elapsed is below a certain threshold value.

A threshold decision is essentially just a score-based decision that has exactly two possible outcomes where one outcome's decision score is based on circumstances and the other outcome's decision score serves as the threshold value. In the present specification, the term "decision score" in reference to a threshold decision will refer to the particular decision score that is based on circumstances and will not refer to the threshold value, unless otherwise specified.

Whenever a score-based decision is a decision between exactly two possible outcomes, any circumstances that increase the interface's tendency to choose one outcome will necessarily decrease the interface's tendency to choose the other outcome; increasing the decision score of one of the outcomes has essentially the same effect as decreasing the decision score of the other outcome. Any score-based decision between exactly two possible outcomes can therefore be implemented as a threshold decision: one outcome's decision score may be held constant and may thus serve as the threshold value, and the other outcome's decision score may be increased or decreased according to circumstances.

Because a threshold decision is a score-based decision, various interface behaviors pertaining to score-based decisions that are described above are applicable to threshold decisions. In particular, in an embodiment, when the interface makes a threshold decision that is an alterable decision, the score gap is the magnitude of the difference between the decision score and the threshold value, and so the probability of alteration that is assigned to that decision will be high if the decision score is very close to the threshold value, or low if the decision score is much lower or much higher than the threshold value. In an embodiment, for certain threshold decisions, if the score gap is extremely high, then the decision will not be alterable; any such threshold decision will be referred to herein as a "conditionally alterable threshold decision." In an embodiment, in certain circumstances the interface may recalculate the decision score of a threshold decision after the user has performed additional actions, and if the decision score crosses the threshold value then the decision may be assigned an extremely high probability of alteration. In an embodiment that has the automatic alteration feature, if a recalculated decision score moves far enough across the threshold value, then the interface will automatically alter the decision. In an embodiment, after the interface automatically alters a threshold decision, it will add a bonus to the probability of alteration of the decision (but not such a large bonus that a second automatic alteration will occur immediately).

Various types of alterable decisions that are described farther below are explicitly said to be threshold decisions or otherwise score-based decisions. Adaptation functionality that is described in Part II may work quite well with threshold decisions: after a threshold decision has a non-beneficial outcome, such adaptation functionality may adjust the threshold value so as to potentially yield better results in the future.

Chapter 4: Rearranging Options

Contingent Decisions

In some cases, depending on the details of a particular embodiment, an interface may make an alterable decision in which at least one possible outcome of the decision has the consequence that the interface makes another alterable decision, and at least one other possible outcome of the decision does not have the consequence that the interface makes that other alterable decision. For example, in an embodiment that has an alterable spelling correction feature and also has the feature that whenever a user types a day of the week in lowercase letters the interface makes an alterable decision whether or not to capitalize the day of the week, if a user types "tursday" and the interface makes an alterable decision whether or not to change "tursday" to "tuesday," then if the interface decides to change "tursday" to "tuesday," the interface may also immediately make another alterable decision—namely, the decision whether or not to capitalize "tuesday"—but if the interface decides not to change "tursday" to "tuesday," the interface will not make this other alterable decision. Thus, in some cases the existence or nonexistence of an alterable decision may depend upon the outcome of another alterable decision.

In the present specification, when the outcome of one alterable decision determines whether or not the interface makes another alterable decision, the former alterable decision will be referred to as an "antecedent decision" and the latter will be referred to as a "contingent decision." When information that is sufficient to alter the outcome of a contingent decision is stored in the memory of the computing device and is marked as pertaining to an alterable decision—in other words, when the contingent decision is currently an actual alterable interface decision—the contingent decision is said to "exist."

A contingent decision need not occur immediately after its antecedent decision: additional keystrokes may intervene. For example, an embodiment could have a feature such that when a user types "ht" at the beginning of a word the interface immediately makes an alterable decision whether or not to replace those letters with "th" and also have the feature that whenever a user types a day of the week in lowercase letters the interface makes an alterable decision whether or not to capitalize the day of the week; in such an embodiment, if a user types "htursday," then if the interface immediately decides to replace "ht" with "th," the interface will later make an alterable decision whether or not to capitalize "thursday."

In an embodiment, for some or all single-alternative antecedent decisions, altering the antecedent decision will toggle the existence or nonexistence of the corresponding contingent decision. In other words, if the initial outcome of a single-alternative antecedent decision was such that the interface did not make the contingent decision, then altering the antecedent decision will cause the interface to make the contingent decision exist; if the initial outcome of the antecedent decision was such that the interface did make the contingent decision, then altering the antecedent decision will cause the interface to make the contingent decision cease to exist. For example, if the interface initially decides to change "teusday" to "tuesday" and immediately follows this decision with an alterable decision whether or not to capitalize "tuesday," then altering the first decision so that "tuesday" (or now "Tuesday") is changed back to "teusday" will also cause the alterable decision about whether or not to capitalize "tuesday" to cease to exist. Conversely, if the interface initially does not change "teusday" to "tuesday," then altering this decision so that "teusday" is changed to "tuesday" will also cause the alterable decision about whether or not to capitalize "tuesday" to exist.

Likewise, in an embodiment, for some or all multi-alternative antecedent decisions, altering the antecedent decision will toggle the existence or nonexistence of the corresponding contingent decision when appropriate. However, an antecedent decision that is a multi-alternative antecedent decision will necessarily have either a plurality of options in which the corresponding contingent decision should exist or a plurality of options in which the corresponding contingent decision should not exist (or both), so altering such an antecedent decision will not toggle the existence or nonexistence of the corresponding contingent decision if the option that was previously selected and the option that becomes selected are both options in which the corresponding contingent decision should exist, or if they are both options in which the corresponding contingent decision should not exist.

(In Chapter 2, an embodiment is described in which an alterable interface decision will cease to exist if the portion of input that it pertains to is deleted or is modified by some means other than by altering the decision, unless the deletion or modification of that portion of input is subsequently undone by some means. In such an embodiment, altering an antecedent decision will always cause its corresponding contingent decision to cease to exist if appropriate. However, it may require additional effort to ensure that altering an antecedent decision will always cause its corresponding contingent decision to exist if appropriate; depending on the circumstances of implementation, it may instead be preferable to implement such behavior on an ad hoc basis, so that altering an antecedent decision sometimes may not cause its corresponding contingent decision to exist even when it would be theoretically appropriate to do so. For example, in an embodiment, altering an antecedent decision regarding whether to autocorrect the spelling of a word will cause a contingent decision to exist if appropriate regarding whether to automatically capitalize the word, but in other cases altering an antecedent decision will not cause its corresponding contingent decision to exist.)

Calculating Probability Combinations

In an embodiment, in certain circumstances that are described below, the interface will calculate probabilities of alteration for combinations of options of multiple alterable decisions and these probabilities of alteration will be calculated based on the probabilities of alteration of the individual options of the individual alterable decisions. For example, in an embodiment, if a user types "its" and the interface alterably decides to automatically capitalize the word and this decision has a low probability of alteration, and the interface also alterably decides not to insert an apostrophe and this decision has a high probability of alteration, then four possible combinations of options are possible for these two decisions, corresponding to the outcomes "Its," "It's," "its," and "it's." If these combinations of options are assigned probabilities of alteration that are relative to the default combined outcome "Its," then the probability of alteration of "Its" will equal the implicit default option probability (which is very high); the probability of alteration of "It's" will be high, but not as high; the probability of alteration of "its" will be low; and the probability of alteration of "it's" will be lower.

In an embodiment, when options of multiple alterable interface decisions are combined, the interface will convert the probabilities of alteration of the individual alterable decisions to actual mathematical percentages by means of a conversion algorithm, then perform precise calculations, and then convert the resulting percentages back to probabilities of alteration by means of a conversion algorithm. For example, in an embodiment, if two alternate options of two different single-alternative alterable decisions each have a probability of alteration of 3.0, then the interface will calculate that the probability of alteration of 3.0 corresponds to an estimated 10% chance that a user will prefer such an alternate option, and a 90% chance the user will prefer the default option. There is thus a 1% chance the user will desire the combination of those two alternate options (on the assumption that the probabilities are independent probabilities), and an 81% chance the user will desire the combination of the two default options. The ratio of the chance the user will desire the combination of those two alternate options to the chance the user will desire either that combination or the default combination is a ratio of 1%:82%, which equals approximately 1.22%; this is the percentage chance that the user will prefer that combination over the default combination, if the user definitely does not desire any combination other than those two. The interface will calculate that an estimated 1.22% chance corresponds to a probability of alteration of 1.0, and so the combination of those two options will be assigned a probability of alteration that equals 1.0.

In an alternative embodiment, when options of multiple alterable interface decisions are combined, the interface will consult an internal table that determines what probability of alteration to assign to a combination of options based on the probabilities of alteration that are assigned to each of the individual options. For example, in an embodiment, if two individual options each have a probability of alteration that is at least 2.5 but less than 3.5, then the combination of those two options will be assigned a probability of alteration that equals 1.0. Such a table can be constructed in such a way that it will yield results that are generally similar to the results that would be yielded by the approach described in the preceding paragraph, and it may not be necessary for probabilities of alteration to be especially precise, so such an embodiment may yield acceptable results.

In another alternative embodiment, when options of multiple alterable interface decisions are combined, the interface will simply assign the combination a probability of alteration that is slightly less than the lower of the two probabilities of alteration of the two options.

In yet another alternative embodiment, when options of multiple alterable interface decisions are combined, if all the alterable interface decisions happen to be score-based decisions that are on the same point scale or comparable point scales, the interface will calculate the sum of the score gaps of those options, and will assign the combination a probability of alteration that is based on the combined score gap, as though the combined score gap were an ordinary score gap. For example, in an embodiment, if the interface makes an antecedent decision not to display a number in the form of a fraction, and this decision's alternate option has a score gap of 3.5, and had the interface decided to display the number in the form of a fraction then it would have made a contingent decision not to display the number in the form of an improper fraction, and that decision's alternate option would have had a score gap of 0.5, and these decisions are on comparable point scales, then when the options of those decisions are combined, the option corresponding to both displaying the number in the form of a fraction and displaying the number in the form of an improper fraction will be assigned a probability of alteration based on the combined score gap of 4.0, which means that it will have a lower probability of alteration than the antecedent decision (which had a score gap of only 3.5), but not much lower.

Contingent Duplicate Decisions

In an embodiment, whenever the options of a contingent decision are identical to the options of its antecedent decision, the interface will delete the contingent decision. Such a decision may be referred to as a "contingent duplicate decision." For example, in an embodiment, if a user types "Smith vs." and then begins to type a word without explicitly actuating the Shift key, the interface will make a first alterable decision whether to automatically capitalize that word (because it is after the abbreviation "vs."). If the outcome of that first alterable decision is that the interface does not capitalize the word the user types, and then that word turns out to be "jones," then the interface will make a second alterable decision whether to capitalize that word (because it appears to be a name). Thus, in such circumstances, the second alterable decision whether or not to capitalize "jones" is a contingent decision that has options that are identical to the options of its antecedent decision; in an embodiment, the interface will delete that second decision.

In an embodiment, when the interface deletes a contingent duplicate decision as described in the preceding paragraph, it will update the probability of alteration of the remaining antecedent decision to reflect the fact that that decision now essentially represents a combination of two consecutive decisions, each of which had its own probability of alteration. For example, if the interface has previously made a first decision not to capitalize a word and currently estimates that there is a 70% chance that that was the correct decision, and now the interface makes a second decision not to capitalize the word and estimates that there is a 70% chance that this too is the correct decision, then there is only an estimated 49% chance that both decisions were correct, so there is actually an estimated 51% chance that the user wants the word to be capitalized, and for that reason, when the contingent duplicate decision is deleted, the antecedent decision will be assigned an extremely high probability of alteration. (Although this example discusses probabilities of alteration in terms of actual mathematical percentages for the sake of clarity, in some embodiments the interface will instead determine a probability of alteration for a combination of outcomes by means that do not involve actual mathematical percentages, as is discussed above.)

In an embodiment, after the interface deletes a contingent duplicate decision, for purposes of analyzing the outcomes of the antecedent decision and the contingent decision as described in Chapter 19, if the outcome that the user selects is an outcome that could have been achieved by means of more than one combination of outcomes of individual decisions, then the interface will make no determination regarding whether or not each individual decision had a beneficial outcome. For example, if the interface makes an antecedent decision whether or not to capitalize "jones," and makes a contingent decision whether or not to capitalize "jones" only if it did not already capitalize "jones" due to the antecedent decision, then if the outcome the user selects is the lowercase outcome "jones" then each decision's outcome should have been to not capitalize the word and so the interface can determine whether or not each decision had a beneficial outcome, but if the outcome the user selects is the capitalized outcome "Jones" then the interface cannot determine whether it is the case that the first decision's outcome should have been to capitalize the word and the second decision was irrelevant or whether it is the case that the first decision's outcome should have been to not capitalize the word but the second decision's outcome should have been to capitalize the word, and so the interface will make no determination regarding whether or not each decision had a beneficial outcome in such circumstances.

Combining Decisions

In an embodiment, in certain circumstances alterable decisions will be "combined" for purposes of the behaviors described in the following paragraphs. This means that various combinations of options of the decisions may be presented to the user in such a way that the user does not need to be aware that the decisions are actually distinct decisions (as is described below), but does not necessarily mean that the interface will combine the data pertaining to the decisions in such a way that they actually become a single alterable decision.

Generally, it may be desirable to combine alterable decisions that are sufficiently closely related that a user may not necessarily think of them as distinct decisions. In an embodiment, any alterable decisions that pertain to the exact same portion of input will be combined. In an embodiment, any antecedent decision will be combined with its contingent decision. In an embodiment, any alterable decisions that are triggered by the same user action will be combined.

In an embodiment, if a user explicitly selects an option of an alterable decision without explicitly selecting an option of an alterable decision that it was combined with, then those two decisions will no longer be combined.

In an embodiment, whenever a group of two or more combined alterable decisions exists, the individual decisions will not be directly affected by actuations of the alteration key, and will not be included in the alteration cycle. Instead, the interface will create a "combination decision," which is a special alterable decision such that every possible combination of options of the individual alterable decisions that are combined is an option of the combination decision. Such a combination decision may be included in the alteration cycle and may become the currently alterable decision as though it were an ordinary alterable decision. The interface may determine probabilities of alteration for the combinations of alternate options by various means, as is discussed in Chapter 3. Thus, for example, in an embodiment, if a user types the word "its" and the interface both alterably decides not to insert an apostrophe and alterably decides not to capitalize the word, and the user wishes to alter both of these decisions, then the user can simply press the alteration key repeatedly: the interface will not only yield the individual alternate options "it's" and "Its" but also will eventually yield the combined alternate option "It's."

Similarly, in an embodiment, when a user performs an action that causes the interface to alter an alterable interface decision that fits certain criteria, if two or more alterable decisions that fit the criteria are combined with one another, then the interface will create a combination decision and either alter the combination decision or include it in the specialized alteration cycle. However, when a user performs an action that causes the interface to alter an alterable interface decision that fits certain criteria, it may happen that one alterable decision fits the criteria while another alterable decision that it is combined with does not fit the criteria; in that case, for purposes of that particular action, the alterable decisions will not be treated as combined decisions, and if the user then explicitly selects an option of one of those decisions without explicitly selecting an option of the other, then the decisions will no longer be combined at all.

In an embodiment, when a particular alternate option of a combination decision has a probability of alteration that is below a certain threshold, that alternate option will be deleted. For example, in an embodiment, if the interface somehow creates a combination decision that is a combination of four single-alternative decisions that each individually have low probabilities of alteration, then the combination decision will not have all 16 possible combinations of outcomes: any combination option that corresponds to simultaneously altering three or four of the decisions will have such a low probability of alteration that it will be deleted. Such a deletion will not affect the original alterable decisions that the combination decision is derived from; it will merely prevent the interface from including that particular combination of options in the alteration cycle.

In an embodiment, when a user completes review of a combination decision, this counts as completing review of its individual independent decisions. When a user explicitly selects the default option of a combination decision, this counts as explicitly selecting the default option of its individual independent decisions. However, when a user explicitly selects an alternate option of a combination decision, this may not count as explicitly selecting an option of all of its individual independent decisions: it counts as explicitly selecting an option of only those individual independent decisions that are actually altered when the user selects the alternate option of the combination decision, and subsequently, those independent decisions that were actually altered are no longer combined with the decisions that were not actually altered. (If more than one independent decision was simultaneously altered this way, then the ones that were altered are still combined with each other.) For example, if a user types the word "its" and the interface both decides not to insert an apostrophe and decides not to capitalize the word, and the interface combines these two alterable decisions, and the user actuates the alteration key sufficiently many times to yield the result "it's," and the user then continues typing so that the user has explicitly selected the option "it's" of the combination decision, then this counts as explicitly selecting an option of the individual decision whether or not to insert an apostrophe, but does not count as explicitly selecting an option of the individual decision whether or not to capitalize the word, and the two decisions are no longer combined, so the currently alterable decision may now be the decision to not capitalize the word.

In an embodiment, when the interface determines an alteration cycle, in addition to initially including every alterable decision other than the currently alterable decision, the alteration cycle will also include a special combination decision such that every possible combination of options of the currently alterable decision and the individual alterable decisions in the alteration cycle is an alternate option of the special combination decision, unless either that combination of options has already been included in the alteration cycle, or that combination of options has a probability of alteration that is below a certain threshold. Such a special combination decision will be treated as less relevant than all other alterable decisions, so that repeatedly pressing the alteration key will not cause the interface to alter such a special combination decision until after the interface has cycled through all other alterable decisions. In such an embodiment, the user can eventually reach any combination of options by pressing the alteration key sufficiently many times consecutively, unless the combination of options has too low a probability of alteration. For example, if three single-alternative decisions exist, and none of these decisions are combined, and all of them have very high probabilities of alteration, then if the user begins to actuate the alteration key repeatedly, the first six actuations of the alteration key will cause each of the three individual decisions to be altered and then to revert to its default option, but then the next four actuations of the alteration key will cause the interface to present the user with four new outcomes in some order: one in which the alternate options of both the first and second decisions are simultaneously selected, one in which the alternate options of both the first and third decisions are simultaneously selected, one in which the alternate options of both the second and third decisions are simultaneously selected, and one in which the alternate options of all three decisions are simultaneously selected. After that, if the user actuates the alteration key one more time, the combination decision will revert to its default option and the alteration cycle will be complete.

The interface behavior described in the preceding paragraph has the theoretical potential to cause the alteration cycle to include a combination decision that has an extremely high number of options. For example, if 10 single-alternative decisions exist, then a combination decision that included every possible combination of options of those 10 decisions would include over 1000 options. For that reason, if an embodiment behaves as described in the preceding paragraph, and if it is reasonably common for quite a few alterable decisions to simultaneously exist in the embodiment, then it may be especially desirable for such an embodiment to include the alteration probability feature and to include a minimum probability threshold (as described in the preceding paragraph) that is sufficiently high that it will be rare for dozens of combinations of options to be included in the alteration cycle. It may also be especially desirable for such an embodiment to include a No key or an Escape key that can revert a decision to its default option (as described in Chapter 9) so that a user who gets tired of cycling through combinations of options can easily cancel the changes he has caused.

In an alternative embodiment, alterable decisions that pertain to the exact same portion of input are not combined as described above, but are instead "connected." When the interface moves on to the next decision in the alteration cycle, if there is at least one alterable decision remaining in the alteration cycle that is connected to the decision that was the currently alterable decision, then the most relevant of such decisions will be removed from the alteration cycle and will become the new currently alterable decision, and the interface will immediately alter that other decision. For example, in an embodiment, if the interface made a decision not to insert an apostrophe in "its" and also made a decision not to capitalize "its," and these are connected decisions, then pressing the alteration key twice consecutively may yield "it's" and then yield "Its," without reverting to "its" between these two outcomes. Such behavior may be easier to implement than combining decisions and may still yield advantages.

Splitting Decisions

In an embodiment, when a multi-alternative decision is the currently alterable decision or is in the alteration cycle and there is at least one alterable decision in the alteration cycle that has a lower probability of alteration than that multi-alternative decision, the interface will calculate a "split threshold" which equals the greatest probability of alteration of any alterable decision in the alteration cycle that has a lower relevance than the multi-alternative decision, minus a specific fixed amount; then if at least one of the alternate options of the multi-alternative decision has a probability of alteration below the split threshold, then the multi-alternative decision will be split into "partial decisions" as described in the following paragraph. In an embodiment, the specific fixed amount mentioned in the preceding sentence is fairly large, so that an alterable decision will not be split unless one of its alternate options has a probability of alteration that is quite a bit lower than the probability of alteration of a later decision in the alteration cycle. For example, in an embodiment, alterable decisions have probabilities of alteration that are initially between 1.0 and 5.0 inclusive, and a multi-alternative decision will be split into partial decisions only when one of its alternate options has a probability of alteration that is at least 3.0 less than the probability of alteration of a later decision in the alteration cycle.

In an embodiment, when the interface splits a multi-alternative decision into partial decisions in the circumstances described in the preceding paragraph, the interface will separate the multi-alternative decision into a first partial decision and a second partial decision such that each of the two partial decisions has the same default option as the original multi-alternative decision, but the first partial decision has only those alternate options of the original multi-alternative decision that have a probability of alteration that is above the split threshold and the second partial decision has only those alternate options that have a probability of alteration that is below the split threshold. The second partial decision will thus have a significantly lower probability of alteration than the first partial decision, and will come later in the alteration cycle.

For example, in an embodiment, if two alterable interface decisions exist, and one is a single-alternative decision that has a high probability of alteration, and the other is a multi-alternative decision with one alternate option that has a very high probability of alteration and three other alternate options that each have a very low probability of alteration, then that multi-alternative decision will be separated into partial decisions. One of the partial decisions will have the alternate option that has a very high probability of alteration, and the other will have the three alternate options that each have a very low probability of alteration. If the user decides to alter the single-alternative decision by actuating the alteration key repeatedly, he will only need to actuate the alteration key three times: once to alter the first partial decision, a second time to revert it to its default option, and a third time to alter the single-alternative decision. In an embodiment that did not split a multi-alternative decision in such circumstances, the user would need to actuate the alteration key several more times in order to also cycle past the low-probability options of the multi-alternative decision before reaching the single-alternative decision.

Other circumstances in which a multi-alternative decision may be separated into partial decisions are described in Chapter 14, in the explanation of the targeted alteration feature.

In an embodiment, when a user completes review of a partial decision, this causes the probabilities of alteration of all the alternate options that are in that partial decision to be drastically decreased in the original multi-alternative decision, by the same amount as if the user had completed review of the original multi-alternative decision, but does not cause the probabilities of alteration of the alternate options that are in the other partial decision to be decreased.

In an embodiment, when a user explicitly selects an option of a partial decision, this counts as explicitly selecting that option of the original multi-alternative decision, which thus causes the probabilities of alteration of that decision (and all its alternate options) to be drastically decreased, which affects the probability of alteration of the other partial decision as well. In an embodiment, when a user explicitly selects an option of a first partial decision, the second partial decision will be removed from the alteration cycle (but may become included in the alteration cycle again the next time the interface determines a new, updated alteration cycle).

Rearranging Options in Perspective

In certain circumstances, it may be advantageous for an embodiment to handle contingent decisions as described above, and to combine alterable decisions in certain circumstances as described above, and to split alterable decisions in certain circumstances as described above. However, in some embodiments, the interface behaviors described in the present chapter are likely to be relevant to only a minority of alterable decisions. An embodiment with alterable decision functionality that does not have any of the functionality that is described in the present chapter may still have significant advantages over prior art.

Chapter 5: Visuals for Interface-Specified Changes

Highlighting Blocks

In the following paragraph, and throughout the present specification, where appropriate, the word "input" should be understood to also refer to the software's output or to anything else that interface functionality may interact with; for example, in an embodiment where the interface makes an alterable decision whether to display the output of a calculation as a fraction or as a decimal, the "portion of input" that this alterable decision pertains to is actually the output of the calculation.

In the following paragraphs, a "highlighted block" is a portion of input that the interface distinctively highlights for some reason. For example, in an embodiment, when a user searches for a particular word within a document, the interface highlights each occurrence of that word in yellow, and each such highlighted word is thus a highlighted block.

In various embodiments, in certain circumstances, various portions of input will be distinctively highlighted for various reasons. Various such circumstances are described below. It is to be understood that various means of distinctively highlighting a portion of input will be evident to those of skill in the art; for example, a highlighted portion of input may be bold, or may be italicized, or may be underlined, or may have a different foreground color than the surrounding input, or may have a different background color than the surrounding input. Other means of distinctively highlighting a portion of input will be evident to those of ordinary skill in the art.

In an embodiment, a highlighted block may be displayed in a way that changes over time even when the user is not taking any action. For example, a highlighted block may shimmer, or may cycle through various colors, or may slowly become brighter and then dimmer, or may rapidly alternate between black text on a white background and white text on a black background, or may periodically be magnified for a little while and then revert to its original size. Other means of displaying a highlighted block in a way that changes over time will be evident to those of ordinary skill in the art.

In an embodiment, a highlighted block will have a minimum average distinctiveness from its surroundings: when the user is not taking any action, such a highlighted block will in most cases be displayed in a way that does not change very much over time, but the highlighted block will be displayed in a way that changes more over time when necessary in order to sufficiently distinguish the highlighted block from its surroundings. In particular, in an embodiment, if a particular type of highlighted block is surrounded with text that has a white background, then the highlighted block will be highlighted with a particular non-white default background color that does not vary, but if the color differential between the default background color of the highlighted block and the background color of any adjacent text is below a certain threshold, then the background color of the highlighted block will vary between a range of colors that are sufficiently diverse that the average color differential between the highlighted block and its surroundings will remain above a certain threshold. For example, a highlighted block may be highlighted with a light blue background color when it is surrounded by text that has a white background, but may oscillate between a purplish blue and a greenish blue when it is adjacent to any other text that has a light blue background. For purposes of the present paragraph, the "color differential" may be defined as the sum of the differences of the red, green, and blue values of two colors, or may be defined in any other appropriate way such that two colors are guaranteed to be quite distinct visually when their color differential is sufficiently large.

In an embodiment, even when the relevant interface output is in audio form rather than video form, a changeable block may still be "highlighted" for purposes of the interface functionality that is described herein; various means of highlighting audio output are described in Chapter 29.

Changeable Blocks

In the present specification, an "alterable block" is the portion of input that an alterable interface decision pertains to. Such a portion of input may also be referred to as an "alterable decision" herein, but will generally be referred to herein as an alterable block. The term "alterable block" should not be taken to mean that functionality pertaining to alterable blocks will be present only in embodiments that facilitate altering alterable interface decisions: on the contrary, highlighting alterable blocks as described below may be advantageous even in an embodiment that does not facilitate altering decisions. In an embodiment, the alterable block of a particular alterable interface decision may include additional input that was not affected by the outcome of the decision; for example, when the interface has made an alterable decision to automatically convert the word "friday" to "Friday," the alterable block for that decision may consist of the entire word "Friday" rather than consisting of only its first letter.

In the present specification, the "undoable block" is the portion of input that will change if the user's next action is an actuation of the Undo key, if any such portion of input exists, and the "redoable block" is the portion of input that will change if the user's next action is an actuation of the Redo key, if any such portion of input exists. However, in an embodiment that is described below, in certain circumstances a single actuation of the Undo key will not cause the interface to undo anything; in such an embodiment, in such circumstances, the "undoable block" is the portion of input that will change if the user's next two actions are two consecutive actuations of the Undo key, if any such portion of input exists. Similarly, in such an embodiment, in circumstances where a single actuation of the Redo key will not cause the interface to redo anything, the "redoable block" is the portion of input that will change if the user's next two actions are two consecutive actuations of the Redo key, if any such portion of input exists.

In some interfaces, certain multi-click keys exist such that an actuation of the multi-click key that is at least a second consecutive actuation of that key may have a special multi-click effect: that is, rather than performing substantially the same function as the first actuation of that key, the actuation may instead cause the interface to change previously typed input in some way. For example, the TI-36X Pro scientific calculator has a certain key such that a first actuation of this key will yield the letter x, but a second consecutive actuation of this key will not yield the letter x: instead, it will cause the interface to replace the previously entered letter x with the letter y. For some multi-click keys in some interfaces, an actuation of the multi-click key that is at least the second consecutive actuation of that key will always have a special multi-click effect; for other multi-click keys, an actuation of the multi-click key that is at least the second consecutive actuation of that key will have a special multi-click effect if and only if a sufficiently small amount of time has elapsed since the most recent previous actuation of that key. In the present specification, the "multi-click block" is the portion of previously typed input that the interface will change if the user's next action causes such a special multi-click effect to occur. When it is not possible for a user's next action to cause a special multi-click effect to occur, a multi-click block will not exist; for example, immediately after a user actuates a key that is not a multi-click key, a multi-click block will not exist.

In the present specification, an "autocorrection block" is the portion of input that an autocorrection or automatic formatting action pertains to. An autocorrection block may include some input that does not change when the autocorrection or automatic formatting occurs; for example, when the interface automatically capitalizes the word "friday," the autocorrection block may consist of the entire word rather than consisting of only its first letter.

In the present specification, a "changeable block" is an alterable block, undoable block, redoable block, multi-click block, or autocorrection block.

Highlighting Changeable Blocks

In an embodiment, when changeable blocks are highlighted, different types of changeable blocks are distinctively highlighted in different ways; for example, in an embodiment, a highlighted alterable block is displayed with a light green background, a highlighted undoable block is displayed with a light pink background, a highlighted multi-click block is displayed with a light purple background, and a highlighted autocorrection block is displayed with a light blue background. In an embodiment, if a portion of input would be highlighted for multiple reasons, other types of highlighting take precedence over alterable block highlighting; for example, if a highlighted undoable block happens to contain the same portion of input as a highlighted alterable block, then that input will be highlighted as an undoable block, not an alterable block.

In an alternative embodiment, autocorrection blocks are distinctively highlighted in the same way as alterable blocks. In another alternative embodiment, all changeable blocks are distinctively highlighted in the same way, and whenever any changeable block that is not an alterable block is highlighted, alterable blocks are not highlighted.

In an embodiment, a changeable block may sometimes contain no input at all. For example, in Chapter 48, the present specification describes circumstances where, in an embodiment, the interface may make an alterable decision whether or not to interpolate a degree symbol after a trigonometric operand; therefore, in an embodiment, after the interface makes such a decision, if the interface decided to interpolate a degree symbol then the alterable block will contain that degree symbol, but if the interface decided not to interpolate a degree symbol then the alterable block will contain no input at all. When a changeable block contains no input at all, such a changeable block still may have a definite location (or locations); for example, if the interface makes an alterable decision whether or not to interpolate a degree symbol after a trigonometric operand, then the alterable block of this decision is located after the trigonometric operand even when the alterable block contains no input. As another example, when actuating the Redo key would cause input to be inserted and would have no other effect, the redoable block contains no input and is located where input will be inserted if the user's next action is an actuation of the Redo key.

In an embodiment, when a highlighted changeable block contains no input, a small region around the location (or locations) of the changeable block may be displayed in the appropriate visually distinctive way to indicate the location of the changeable block. For example, in an embodiment, if the interface has made a highlighted alterable decision not to interpolate a degree symbol after a trigonometric operand, and the alterable block of this decision contains no input, then the interface will highlight a small region after the trigonometric operand where the degree symbol could have been interpolated. In an alternative embodiment, if a highlighted changeable block contains no input, then a small empty space will be temporarily inserted in the user's input at the location of the changeable block and displayed in the appropriate visually distinctive way to indicate the location of the changeable block.

However, in an embodiment, in some cases the interface will cause the alterable block of an alterable interface decision to include additional input that was not affected by the outcome of the decision in order to ensure that the alterable block will contain some input. For example, in an embodiment, when the interface decides whether or not to interpolate a degree symbol after a trigonometric operand, the alterable block of that decision will consist of the trigonometric operand in addition to any degree symbol that may or may not be present, so then even if the degree symbol is not present, the alterable block of that decision can be highlighted without recourse to the behavior described in the preceding paragraph.

Also, in an embodiment, in certain cases the interface will cause a "block descriptor" to appear for a highlighted changeable block that contains no input, and in such cases it may be unnecessary to highlight a small region around the location of the changeable block. Block descriptors are explained in detail in Chapter 8.

In an embodiment, in certain circumstances a change that has not yet occurred but may occur in response to the user's next action is a "proximate change" for purposes that are described below. In such circumstances, the portion of input that will change if the user's next action does cause the proximate change to occur is the "proximate block" for purposes that are described below.

Figure 4A:
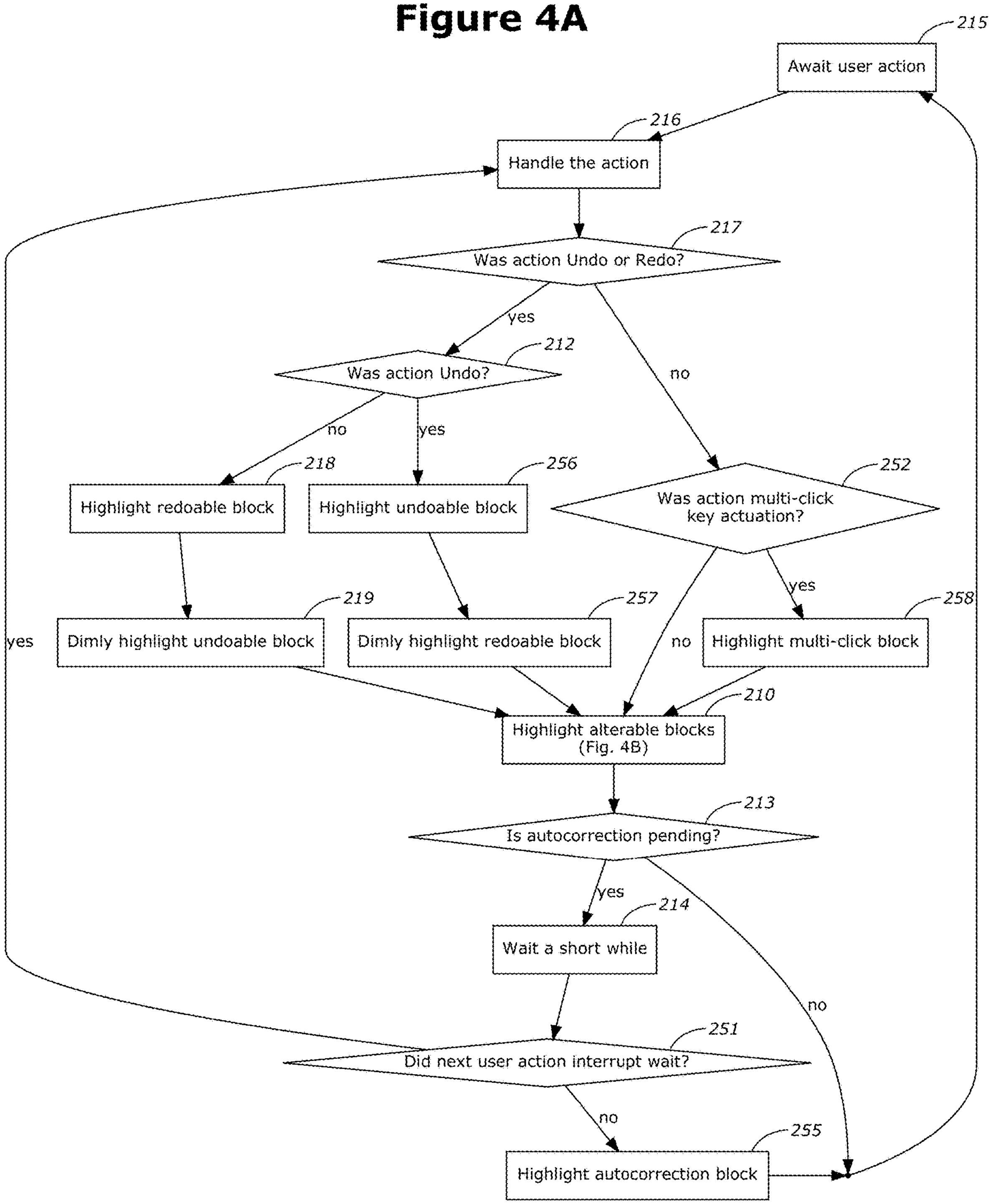
FIGS. 4A and 4B illustrate an embodiment of a method for determining what to highlight after each user action.

In an embodiment, the interface will highlight changeable blocks as explained in FIG. 4A, which is an illustration of an algorithm for determining what to highlight after each user action. Block 401 says "Await user action" and proceeds to Block 402 which states, "Handle the action." Block 403 asks, "Was action Undo or Redo?" If the answer is yes, then the algorithm proceeds to Block 404, which asks, "Was action Undo?" If the answer is yes, the interface will highlight the undoable block and dimly highlight the redoable block, as shown in Blocks 412 and 413 of the flowchart. If the answer to the question in Block 404 is no, the interface will highlight the redoable block and dimly highlight the undoable block, as shown in Blocks 405 and 406 of the flowchart.

Continuing with the explanation of FIG. 4A, if the user's action was not Undo or Redo, then the answer to the question in Block 403 is no and the algorithm proceeds to Block 414, which asks, "Was action multi-click key actuation?" If the answer is yes, the interface will highlight the multi-click block as shown in Block 415.

In FIG. 4A, after any user action, regardless of what key the user actuated or what other action the user performed, the interface may highlight alterable blocks (Block 407), as is described in more detail below. In an embodiment, if an autocorrection is pending (Block 408) then the interface will not highlight the autocorrection block immediately, but if the user pauses for a little while (Block 409) then the interface will highlight the autocorrection block (Block 411). Such highlighting behaviors are described in more detail below. However, if the user takes another action and interrupts the wait time, then the answer to the question in Block 410 ("Did next user action interrupt wait?") is yes, and the algorithm will handle the action (Block 402).

Highlighting behavior is described in more detail below.

Highlighting Alterable Blocks

In an embodiment, in certain circumstances, an alterable interface decision will be "highlighted," which means that its alterable block will be distinctively highlighted in some way. In the present specification, the alterable block of such a decision will be referred to as a "highlighted alterable block." For example, when the interface has made an alterable decision to automatically convert the word "tuesday" to "Tuesday" and that decision is a highlighted alterable interface decision, the displayed word "Tuesday" is a highlighted alterable block.

In an embodiment, an alterable interface decision will be highlighted when its probability of alteration is above a certain "highlighting threshold." In an alternative embodiment, only the currently alterable decision will be highlighted. In another alternative embodiment, every alterable interface decision will be highlighted.

In an embodiment, an alterable interface decision that would otherwise be highlighted will not be highlighted if its highlighted alterable block overlaps the highlighted alterable block of a more relevant highlighted alterable interface decision. Of course, in such circumstances, the overlapping portion will appear highlighted because it is part of the highlighted alterable block of the other decision; however, even if the less relevant decision's entire alterable block consists of the overlapping portion, the less relevant decision still will not be treated as a highlighted alterable decision.

In an embodiment, when the currently alterable decision is highlighted, it will be distinctively highlighted in a different way than any other alterable decision. For example, the highlighting of its alterable block may have a clearly defined boundary while the highlighting of an alterable block of any other alterable decision has a boundary that gradually blends into the background, or the alterable block of the currently alterable decision may be displayed with a light green background color while the alterable block of any other highlighted alterable interface decision is displayed with an even lighter green background color that more closely resembles the white background color of non-highlighted input. Other means of distinctively highlighting the currently alterable decision in a different way than any other alterable decision will be evident to those of ordinary skill in the art. In an embodiment, whenever any special circumstances obtain such that actuating the alteration key would cause the interface to alter more than one alterable decision, each such decision will be distinctively highlighted as though it were the currently alterable decision. Thus, for example, in an embodiment where repeatedly actuating the alteration key may eventually cause the interface to cycle through various alternate options of a combination decision (as is described in Chapter 2), distinctive highlighting will continue to indicate which alterable block or blocks will change the next time the user actuates the alteration key.

In an embodiment, when the currently alterable decision has a probability of alteration that is below the highlighting threshold, it will be highlighted nonetheless. However, in an embodiment, when the most relevant alterable decision has a probability of alteration that is below the highlighting threshold, there will be no currently alterable decision unless the user's most recent action pertained to alteration functionality. Thus, in such an embodiment, when the most relevant alterable decision has a probability of alteration that is below the highlighting threshold and the user's most recent action did not pertain to alteration functionality, if the user actuates the alteration key, then that actuation of the alteration key will not cause the interface to alter a decision, but will instead cause the most relevant alterable decision to become the currently alterable decision, which will cause the interface to highlight that decision; subsequently, if the user's next action is another actuation of the alteration key, then the interface will alter that decision.

In an embodiment, a highlighted alterable block will be displayed in a way that varies according to the magnitude of its "highlight intensity score," so that highlighting will be more intense for an alterable block that has a relatively high highlight intensity score, and more subtle for an alterable block that has a relatively low highlight intensity score; when an alterable block has a highlight intensity score of 0, it will not be highlighted. For example, in one embodiment, a highlighted alterable block that has a highlight intensity score of 5.0 will be highlighted a bright color, while a highlighted alterable block that has a highlight intensity score of 1.0 will be be highlighted a pastel color; as another example, in another embodiment, a highlighted alterable block that has a highlight intensity score of 5.0 will cycle rapidly through various bright colors, while a highlighted alterable block that has a highlight intensity score of 1.0 will cycle slowly through various pastel colors.

In an embodiment, in ordinary circumstances, the highlight intensity score of a highlighted alterable block is equal to a certain minimum amount plus the amount by which the probability of alteration of its alterable decision exceeds the highlighting threshold. (Below, special circumstances are described in which the interface may override this default behavior.) For example, in an embodiment, the maximum probability of alteration of an alterable decision is 5.0, the highlighting threshold equals 2.0, and the minimum highlight intensity score of a highlighted alterable block is 1.0. In such an embodiment, the highlight intensity score of a highlighted alterable block is equal to 1.0 plus the amount by which the probability of alteration of its alterable decision exceeds 2.0, so the maximum highlight intensity score of a highlighted alterable block equals 1.0 plus 5.0 minus 2.0, which equals 4.0; therefore, in such an embodiment, in ordinary circumstances, highlight intensity scores for highlighted alterable blocks will range from a minimum of 1.0 to a maximum of 4.0.

In an alternative embodiment, the highlight intensity score of a highlighted alterable block is simply equal to the probability of alteration of its alterable decision, except that if that probability of alteration is negative then the highlight intensity score is zero.

In an embodiment, whenever the user's most recent action caused the interface to alter a decision, if repeating the same action would cause the interface to alter the same decision again, then the proximate change is the change that will occur if the interface alters that decision again, and the proximate block is that decision's alterable block. In an embodiment, whenever the user's most recent action caused the interface to alter a decision, if repeating the same action would cause the interface to alter some other decision (such as because the user's most recent action was an actuation of the alteration key and a different alterable decision is now the currently alterable decision), then the proximate change is the change that will occur if the user repeats the same action, and the proximate block is that other decision's alterable block.

In an embodiment, while the proximate change is an alteration of some alterable interface decision (as described in the preceding paragraph), the interface will treat that decision as the most relevant alterable interface decision, and so that decision will be the currently alterable decision even if other decisions are more recent and/or have a higher probability of alteration. For example, in an embodiment, if a user alters a decision a first time by means of the touch alteration feature, then the decision that the user thus altered will become the currently alterable decision if it was not already the currently alterable decision, at least until the user performs some other action.

Alterable Decision Review Mode

In an embodiment, the rules that the interface uses in determining what alterable interface decisions to highlight will vary depending on circumstances. In an embodiment, the rules that the interface uses in calculating highlight intensity scores will vary depending on circumstances.

In particular, in an embodiment, when the interface is in a normal mode the interface will highlight only alterable decisions that have a probability of alteration above the highlighting threshold, and when the interface enters an "alterable decision review mode" the interface will highlight all alterable decisions without regard to the highlighting threshold. Therefore, in such an embodiment, any alterable decision that has a probability of alteration that is below the highlighting threshold will be highlighted when and only when the interface is in alterable decision review mode.

In an embodiment, while the interface is in alterable decision review mode, the interface will highlight alterable decisions more intensely than they would otherwise be highlighted. In particular, in an embodiment, while the interface is in alterable decision review mode, each alterable decision will be treated as though its probability of alteration for purposes of highlighting either equals a certain minimum amount or equals its actual probability of alteration plus a certain additional "review mode intensification value," whichever is greater. For example, in an embodiment, the maximum probability of alteration of an alterable decision is 5.0, and the review mode intensification value is 1.0. While the interface is not in alterable decision review mode, an alterable interface decision is highlighted if its probability of alteration is at least 2.0, and its highlight intensity score equals its probability of alteration minus 1.0, so in ordinary circumstances highlight intensity scores will range from 1.0 to 4.0. While the interface is in alterable decision review mode, though, each alterable decision will be treated as though its probability of alteration for purposes of highlighting equals either a minimum of 2.0 or equals its actual probability of alteration plus 1.0, whichever is greater, so highlight intensity scores may then be as high as 5.0, and even an alterable decision that has an extremely low probability of alteration will have a highlight intensity score of 1.0.

Figure 4B:
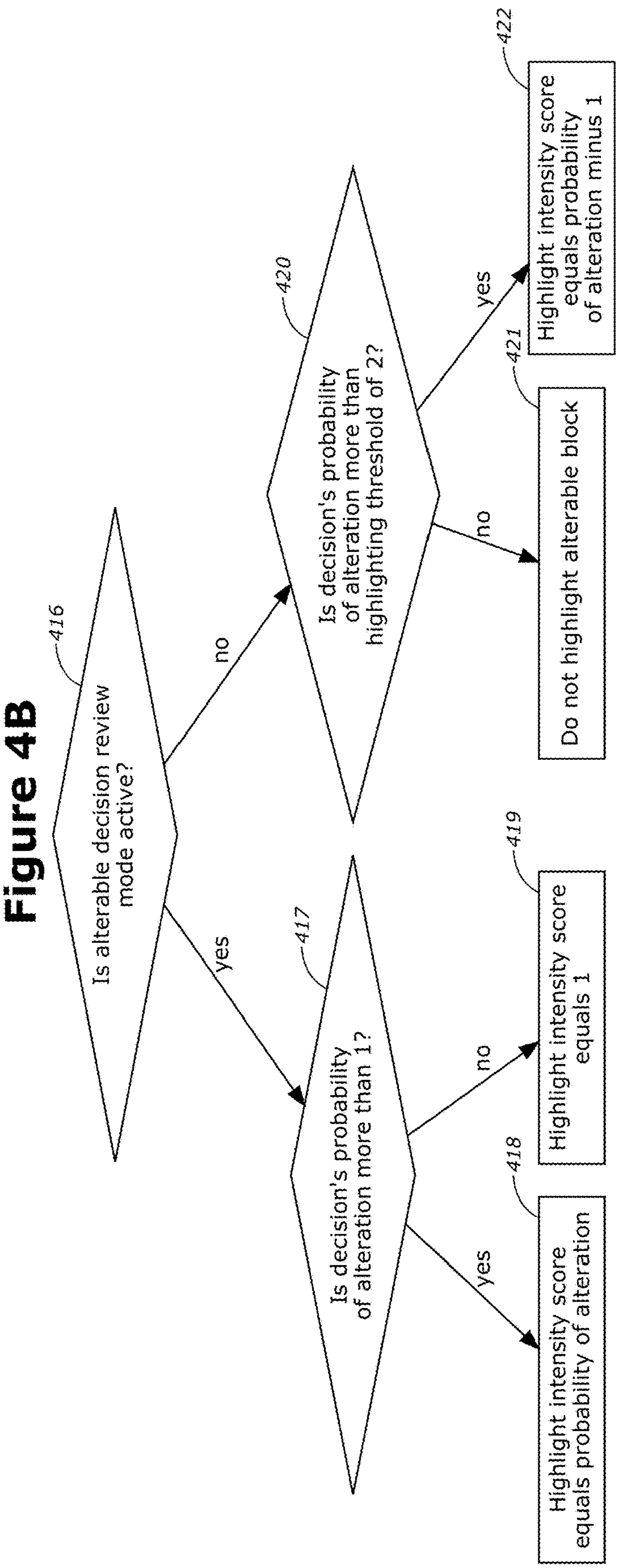

FIG. 4B is a flowchart that illustrates an algorithm for determining how intensely the interface will highlight alterable decisions, in an embodiment. Block 416 asks, "Is alterable decision review mode active?" If the answer to the question is yes, then the algorithm proceeds to Block 417, which asks, "Is decision's probability of alteration more than 1?" If the answer is yes, then the decision's highlight intensity score equals its probability of alteration (Block 418). If the answer is no, then the decision's highlight intensity score equals 1 (Block 419). If the interface is not in alterable decision review mode, then the answer to the question in Block 416 is no and the algorithm proceeds to Block 420, which asks, "Is decision's probability of alteration more than highlighting threshold of 2?" If the answer is yes, then the decision's highlight intensity score equals its probability of alteration minus 1. If the answer is no, then the alterable block is not highlighted (Block 421).

In an embodiment, the interface also has an intensified alterable decision review mode, in which every portion of the display that is not a highlighted alterable block is slightly dimmed in brightness so that highlighted alterable blocks stand out even more.

In an embodiment, whenever the interface is in alterable decision review mode, if a user performs an editing action that does not pertain to alteration functionality, the interface will exit alterable decision review mode, except as otherwise specified.

In an embodiment, when a user actuates the alteration key or invokes any other interface function that is explicitly intended to interact with alterable interface decisions, the interface will enter alterable decision review mode (in addition to any other effects).

In an embodiment, a user may enter alterable decision review mode by invoking a particular interface command that exists specifically for that purpose. It may be particularly advantageous for such an interface command to be readily available in an embodiment where it is relatively difficult to actuate the alteration key (and where it may thus be relatively difficult to cause the interface to enter alterable decision review mode by the means specified in the preceding paragraph). For example, in one embodiment, double-tapping a status line at the top of the screen will cause the interface to enter alterable decision review mode; in another embodiment, simultaneously pressing two buttons on the side of the computing device will cause the interface to enter alterable decision review mode; in another embodiment, touching the lower left corner of the display of the computing device will cause the interface to enter alterable decision review mode, but releasing that touch will cause the interface to immediately exit alterable decision review mode. Other possible means of invoking a particular interface command that causes the interface to enter alterable decision review mode will be evident to those of ordinary skill in the art.

In an alternative embodiment, as an additional means or alternative means of entering alterable decision review mode, simply performing no action for a certain minimum amount of time will cause the interface to automatically enter alterable decision review mode if any alterable decisions exist.

In an embodiment, when the interface is in alterable decision review mode, if the user explicitly selects an option of an alterable interface decision or if the user completes review of an alterable interface decision, then the interface will cease to highlight that decision until the interface exits alterable decision review mode (at which point presumably that decision's probability of alteration will be quite low and so the interface still will not highlight that decision until the interface enters alterable decision review mode again). Thus, in such an embodiment, if the user continues to interact with alterable interface decisions that are highlighted, such as by continuing to repeatedly actuate the alteration key, the number of alterable interface decisions that are highlighted will decrease. In such an embodiment, when no alterable interface decision is highlighted, the interface will exit alterable decision review mode (at which point presumably every decision's probability of alteration will be quite low and so still no alterable interface decision will be highlighted until the interface makes another alterable decision or enters alterable decision review mode again).

Highlighting Undoable Blocks

In an embodiment, when a user's previous action was an actuation of the Undo key, the undoable block will be distinctively highlighted in some way, and when the user's previous action was an actuation of the Redo key, the redoable block will be distinctively highlighted in some way. In an embodiment, undoable blocks will be distinctively highlighted in a different way than redoable blocks; for example, undoable blocks may be highlighted light pink and redoable blocks may be highlighted light orange.

In an embodiment, when a user's previous action was an actuation of the Undo key, the redoable block will be distinctively highlighted in a way that resembles the way in which the redoable block is distinctively highlighted after an actuation of the Redo key, but is more subtle. For example, in an embodiment where the redoable block is displayed with a light orange background when the user's previous actuation was an actuation of the Redo key, the redoable block may be displayed with an even lighter orange background when the user's previous action was an actuation of the Undo key. Similarly, in an embodiment, when the user's previous action was an actuation of the Redo key, the undoable block will be distinctively highlighted in a way that resembles the way in which the undoable block is distinctively highlighted after an actuation of the Undo key, but is more subtle.

On certain smartphones, in order to access the Undo command, a user must call up an Undo window that has a Cancel button and an Undo button and in some circumstances also has a Redo button. In an embodiment of the present invention, for purposes of the highlighting features disclosed in the preceding two paragraphs, while any such Undo window is displayed, if the user's previous action was not an actuation of the Undo key or the Redo key, then the interface will nevertheless highlight the undoable block (and, in an embodiment, the redoable block) as though the user's previous action were an actuation of the Undo key.

In an embodiment, when a user's previous action was an actuation of the Undo key, the proximate change is the change that will occur if the user's next action is another actuation of the Undo key, and the proximate block is thus the undoable block. In an embodiment, when a user's previous action was an actuation of the Redo key, the proximate change is the change that will occur if the user's next action is another actuation of the Redo key, and the proximate block is thus the redoable block.

Highlighting Multi-Click Blocks

In an embodiment, when a multi-click block exists, the multi-click block will be distinctively highlighted in some way. In such an embodiment, if a multi-click key has a special multi-click effect only when a sufficiently small amount of time elapses between consecutive actuations of that key, then after the user actuates such a multi-click key, the multi-click block will be distinctively highlighted until either the user performs another action or until enough time elapses that the user's next action can no longer yield a special multi-click effect. After that much time has elapsed, no multi-click block will exist, so the portion of input that previously constituted the multi-click block will no longer be distinctively highlighted in that way.

In an alternative embodiment, when a multi-click block exists, instead of or in addition to highlighting the multi-click block as described in the preceding paragraph, the interface will cause the input cursor to have a distinctive appearance while the multi-click block exists. For example, in an embodiment, after a user actuates a multi-click key, the cursor will be purple (instead of black) until either the user performs another action or until enough time elapses that the user's next action can no longer yield a special multi-click effect.

In an embodiment, if a multi-click key has a special multi-click effect only when a sufficiently small amount of time elapses between consecutive actuations of that key, then after the user actuates that multi-click key, if the user performs no other action, then at a certain time that is a small amount of time before the time when the multi-click block will no longer be distinctively highlighted, the interface will cause the distinctive highlighting of the multi-click block to begin to fade, so that the transition from highlighting the block to no longer highlighting the block will be rapid yet gradual. Such behavior may make it easier for a user to predict whether or not a consecutive actuation of a multi-click key will have a special multi-click effect.

In an embodiment, when it is possible for a user's next action to be an actuation that yields a special multi-click effect, the proximate change is the change to the user's input that would occur as a result of that special multi-click effect, and the proximate block is thus the multi-click block. (However, depending on the details of a particular embodiment, it may never actually matter that the proximate block is the multi-click block, because in some embodiments the existence of a proximate block will have no effect until after a certain amount of time elapses since the user's last action and any multi-click block will cease to be a multi-click block before that time.)

In an embodiment, the above behaviors pertaining to multi-click functionality are applicable only for certain multi-click keys. In such an embodiment, if it is unnecessary to indicate to a user that a consecutive actuation of a particular multi-click key would have a special multi-click effect (in the judgment of the interface designer), then a multi-click block pertaining to such a key will not be highlighted and will not be the proximate block.

Highlighting Autocorrection Blocks

When pressing the space bar would trigger an autocorrection or automatic formatting action that would not change the space character but would change the word preceding the space character, or when pressing Enter would trigger an autocorrection or automatic formatting action, or in any other circumstances where it is possible that the user's next keystroke may trigger an autocorrection or autoformatting action that affects only input that was typed prior to the user's next keystroke, such an autocorrection or automatic formatting action is "pending" for purposes of the following paragraphs.

In an embodiment, after a certain minimum threshold amount of time has elapsed since the user's last action, if circumstances are such that an autocorrection or automatic formatting action is pending, then that pending action's autocorrection block will be distinctively highlighted in some way. In an embodiment, such a threshold amount of time is a very small amount of time (a fraction of a second), so that after even a slight pause a user will receive a visual indication that an autocorrection or automatic formatting action is pending. In an alternative embodiment, no minimum amount of time is required at all: whenever circumstances are such that an autocorrection or automatic formatting action is pending, that autocorrection block will be highlighted immediately.

In an embodiment, when an autocorrection or automatic formatting action is pending, the proximate change is the change that will occur if the user's next action triggers the pending autocorrection or automatic formatting action, and the proximate block is that autocorrection block (the portion of input that will change if that autocorrection or automatic formatting action occurs).

Animating Interface-Specified Changes

In the present specification, an "alteration" is the change to the user's input that occurs when an alterable interface decision is altered. An "undo change" is the change that occurs in response to an actuation of either the Undo key or the Redo key. A "multi-click change" is the change to the user's input that occurs as a special multi-click effect in response to at least the second consecutive actuation of a multi-click key. An "autocorrection change" is a change that occurs due to autocorrection or automatic formatting.

In the present specification, an "interface-specified change" is a change that is an alteration, undo change, multi-click change, or autocorrection change. In an embodiment, when an interface-specified change occurs, the interface will animate the change; however, possible exceptions to this behavior are specified in the following two paragraphs.

In some circumstances, a user may not perceive an automatic formatting action as a distinct interface behavior, and may not wish to perceive the automatic formatting action as a distinct interface behavior. For example, when the present writer types a quotation mark in Microsoft Word, the result technically consists of the entry of a straight quotation mark instantly followed by an automatic formatting action that converts the straight quotation mark to a slanted quotation mark, but the present writer is content to perceive the result as though it merely consisted of the direct entry of a slanted quotation mark. In an embodiment, when the interface performs an automatic formatting action that a user is unlikely to wish to perceive as a distinct interface behavior (in the judgment of the interface designer), the interface will not animate the change.

In an embodiment, when the interface performs an autocorrection or automatic formatting action and the decision to perform this action is an alterable interface decision that has a probability of alteration that is below a certain threshold, the interface will not animate the change. For example, in an embodiment, the replacement of the word "dont" with the word "don't" will not be animated because its probability of alteration is very low, but the replacement of the word "its" with the word "it's" will be animated because its probability of alteration is relatively high.

Animation Methods

In an embodiment, while an animated interface-specified change is occurring, the portion of input that is changing will be distinctively highlighted in some way. In an embodiment, the way of distinctively highlighting such a portion of input will vary depending on whether the interface-specified change is an alteration, an undo change, a multi-click change, or an autocorrection change. In an embodiment, an animated alteration will be highlighted in the same way as the alterable block of the currently alterable decision. In an embodiment, an animated undo change will be highlighted in the same way as a highlighted undoable block if the change is occurring in response to an actuation of the Undo key or will be highlighted in the same way as a highlighted redoable block if the change is occurring in response to an actuation of the Redo key. In an embodiment, an animated multi-click change will be highlighted in the same way as a highlighted multi-click block. In an embodiment, an autocorrection change will be highlighted in the same way as a highlighted autocorrection block.

In the following paragraphs, any reference to a "gradual" change in appearance may be taken to refer to a visual transition that is gradual yet quite rapid. In an embodiment, any such visual transition will be fast enough that it usually is completed before the next keystroke or other user action. In an embodiment, if such a visual transition is not yet complete when the user's next action occurs, then the interface will complete the transition immediately rather than continuing to proceed gradually.

In an embodiment, when a change is animated, rather than instantaneously changing that portion of input, the interface will make the change gradual if possible so that the user may more easily identify the change that is occurring. Therefore, in an embodiment, when a change is animated, if the change causes a portion of input to move, the movement will be rapid but not instantaneous. In an embodiment, even when a change that is animated causes the movement of input other than the portion of input that is being changed, that movement will be gradual; for example, when a change that is animated causes a previously typed word to be replaced with a longer word, any movement of later words to make room for the longer word will be gradual. In an embodiment, when a change that is animated causes a portion of input to be deleted, the deleted portion of input will gradually disappear, and then other input will gradually move to close the gap if appropriate. In an embodiment, when a change that is animated causes input to be inserted, other input will gradually move to open a space for the inserted input if appropriate, and then the inserted input will gradually appear.

In an embodiment, when a change is animated, if the changing portion of input is noncontiguous, then the interface will animate the change to each contiguous subsection of that input simultaneously and independently. In an embodiment, when a change is animated, if in the middle of the changing portion of input there is a sufficiently large subsection that will be the same after the change as it was before the change, then the interface will animate the change as though such a subsection is excluded from the portion of input that is changing, so for purposes of change animation the relevant portion of input will be noncontiguous; the interface will thus simultaneously and independently animate the change to each contiguous subsection that is actually changing. For example, in an embodiment, if a change replaces a three-word phrase with a different three-word phrase that has the same second word, the interface will animate this change by animating the replacement of the first word with a different first word and simultaneously animating the replacement of the third word with a different third word. In an embodiment, a subsection will not be thus excluded from the portion of the input that is changing if the subsection's length is less than one full word.

Animating Changes that Affect Dependent Output

Various software interfaces may display output that depends in some way on the current state of a user's input or on some other output, so that changing that input or changing that other output will immediately cause the dependent output to change. For example, in spreadsheet applications it is possible for the value of a cell to be calculated by the spreadsheet application based on the value in another cell, so changing the contents of one spreadsheet cell may immediately cause the value displayed in another cell to change. As another example, the inventor has created a calculator app prototype in which a user's input may still be alterable even after the user has pressed Enter and the calculator has displayed the answer, and so altering the user's input may immediately cause a displayed answer to change.

In an embodiment of the present invention, when a change is animated, if the animated change has the potential to immediately cause some dependent output to change, the interface will cause that output to instantaneously disappear before the animated change occurs, and will cause that output to instantaneously reappear with its updated value after the animated change occurs. For example, in an embodiment, if the interface has displayed the answer to sin 2.4° and then an actuation of the alteration key occurs that will cause the degree symbol to be deleted, then first the answer to sin 2.4° will disappear, and then the degree symbol will be deleted, and then the answer to sin 2.4 will appear.

Animating Transitions

In an embodiment, if the currently alterable decision is highlighted in a different way than other alterable interface decisions, then when a new alterable interface decision becomes the currently alterable decision, the resulting change in highlighting of both the previous currently alterable decision and the new currently alterable decision will be gradual. For example, in an embodiment where the portion of input pertaining to the currently alterable decision is green and all other input is black, when a new alterable interface decision becomes the currently alterable decision, the previous currently alterable decision will gradually change from green to black and the new currently alterable decision will gradually change from black to green, either in that order or simultaneously. In an embodiment, if a user action causes the interface to alter the currently alterable decision and then to change which decision is the currently alterable decision, the alteration will be completed before any change in highlighting occurs. For example, in an embodiment, if a user actuates the alteration key and the interface responds by reverting the currently alterable decision to its default option and then causing a new alterable interface decision to become the currently alterable decision, then this will occur in a sequence of two visually distinct steps: first the selected alternate option of the currently alterable decision will be replaced with the default option of that decision, and then that decision's alterable block will become non-highlighted to indicate that it is no longer the currently alterable decision while simultaneously the new currently alterable decision's alterable block will become highlighted to indicate that it is now the currently alterable decision.

Scrolling Changes into View

In certain applications, a document will not necessarily consist of a single continuous stream of content, so when a certain portion of input is not in view, in order to cause that portion of input to come into view it may be necessary to navigate in some way other than merely scrolling the display. For example, in a list management application, a document may consist of a set of lists such that when the contents of some particular first list are in view, in order to cause some particular portion of input that is at the bottom of a second list to come into view, it may be necessary to exit the first list and enter the second list and then scroll to the bottom of the second list. In the following paragraphs, every mention of "scrolling the display" is to be understood to refer to whatever means of document navigation is necessary in order to bring a portion of input into view, whether or not such means actually consists of merely scrolling.

In prior art, in Microsoft Word, if an actuation of the Undo key causes a portion of input to change that is not currently in view, Microsoft Word will rapidly scroll up or down as necessary to bring the changed portion of input into view; in such circumstances, a user can usually discern in which direction Microsoft Word scrolls. Similarly, in an embodiment of the present invention, when the interface "scrolls the display" to bring a portion of input into view for any of the reasons specified in the following paragraphs, the scrolling (or other document navigation) will be animated: that is, such scrolling will be rapid but not instantaneous, so it will be possible for a user to discern the difference between scrolling up and scrolling down, for example.

In an embodiment, when an interface-specified change is to occur, if the portion of input that will change is not in view, then the interface will scroll the display so that this portion of input is in view; furthermore, if the portion of input that will change is not fully in view, then the interface will scroll the display so that this portion of input is fully in view if possible. In an embodiment, such scrolling will occur before the interface-specified change occurs, so the user can see the change when it occurs.

In an embodiment, in response to an actuation of the alteration key or Undo key or Redo key, the interface will scroll the display if necessary as disclosed in the preceding paragraph as though an interface-specified change were to occur in response to that key actuation even if the interface-specified change does not actually occur in response to that key actuation for any of the reasons that are specified in the following paragraph.

In an embodiment, in certain circumstances where it may be relatively difficult to identify the portion of input that will change in response to an actuation of the alteration key or Undo key or Redo key, in response to an actuation of the alteration key or Undo key or Redo key, the interface will make it easier to identify the portion of input that will change in response to the next actuation of that key, but will not change any input in response to that particular key actuation. For example, in certain circumstances, in response to an actuation of the Undo key, the interface will highlight the undoable block, but will not actually undo anything. In particular, in an embodiment, when a user actuates the alteration key, if the alterable block of the currently alterable decision is not even partially in view or if the alterable block of the currently alterable decision is not highlighted, then the interface will scroll the display if necessary and will highlight the alterable block of the currently alterable decision, but the interface will not alter the currently alterable decision in response to that actuation of the alteration key. In an embodiment, when a user actuates the Undo key, if the undoable block is not even partially in view, or if the undoable block is not highlighted and the input cursor is no longer at the location where it was after the most recent editing action and a certain minimum amount of time has passed since the last editing action, then the interface will scroll the display if necessary and will move the cursor to the location where it was immediately after the most recent editing action, but the interface will not undo the most recent editing action in response to that actuation of the Undo key. In such an embodiment, if a user who has been editing a large document scrolls to view a different portion of the document so that the location of the most recent change to the document is not even partially in view, then the user can quickly return to the location where the most recent change to the document occurred by actuating the Undo key once, without actually undoing the most recent change. In an embodiment, when a user actuates the Redo key, if the redoable block is not even partially in view, then the interface will scroll the display if necessary and will move the cursor to the location where it was immediately before the original occurrence of the editing action that would be redone, but the interface will not redo an editing action in response to that actuation of the Redo key.

In various prior art interfaces, an Undo menu option or Undo button may include a brief description of the nature of the editing action that will be undone if the Undo function is invoked; for example, a menu option may say "Undo Typing" or "Undo Highlighting" rather than simply saying "Undo." In an embodiment, in circumstances where the interface would not undo the most recent editing action in response to an actuation of the Undo key but either would just move the cursor or would move the cursor and scroll the display so that the undoable block is in view, such an Undo menu option or Undo button will say "Undo Cursor Movement" or "Undo Scrolling" or something to that effect. Similarly, in circumstances where the interface would not redo anything in response to an actuation of the Redo key, a Redo menu option or Redo button will say "Redo Scrolling" or something to that effect.

In an embodiment, after an actuation of the alteration key or Undo key or Redo key is handled, if the proximate block is not fully in view then the interface will scroll the display so that the proximate block is in view to the maximum extent possible, except that if a portion of input changed as a result of this actuation of the alteration key or Undo key or Redo key then the interface will not scroll the display in a way that would reduce the amount of that portion of input that is visible. Thus, in such an embodiment, when a user repeatedly actuates the alteration key or Undo key or Redo key, the interface will constantly attempt to keep in view both the portion of input that changed in response to the previous key actuation and the portion of input that will change in response to the next key actuation. In an embodiment, any such scrolling will occur after any change occurs that is a result of the actuation of the alteration key or Undo key or Redo key.

An Algorithm for Scrolling Undo Changes into View

Figure 5:
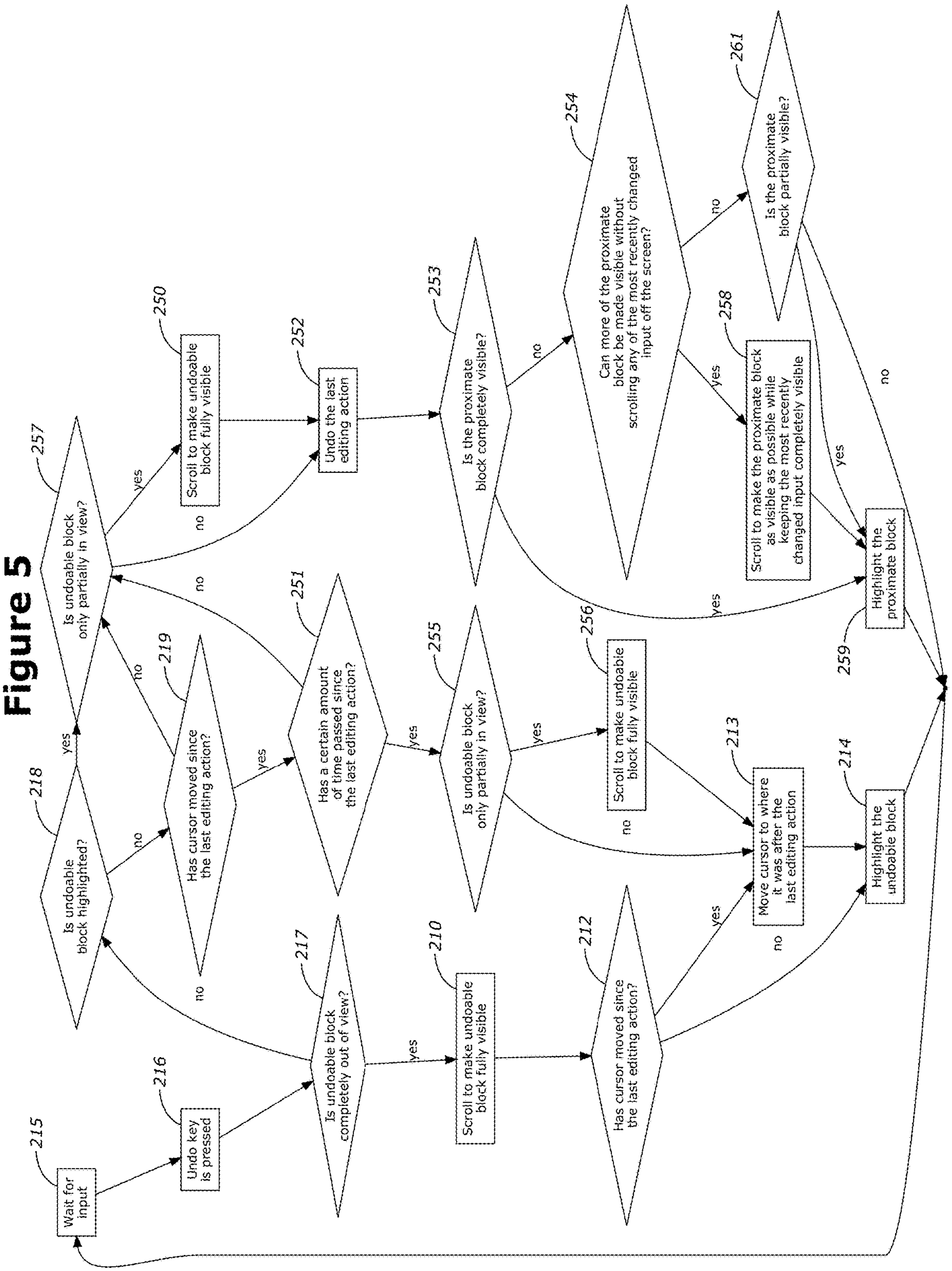
FIG. 5 is a flowchart that illustrates, according to one embodiment, how an interface will react when an Undo key is pressed, with particular attention to how the interface will attempt to make undo changes visible for the user.

FIG. 5 is a flowchart that illustrates, in an embodiment, how the interface will react when the Undo key is pressed, with particular attention to how the interface will attempt to make undo changes visible for the user. This flowchart does not illustrate what happens in response to any user action other than an actuation of the Undo key.

Block 501 says "Wait for input" and proceeds to Block 502 under the assumption that the Undo key is pressed. Block 502 states, "Undo key is pressed." From there, the flowchart proceeds to Block 503 which asks, "Is undoable block completely out of view?" If the answer is yes, then the interface will scroll the display so that this portion of input is in view (Block 504).

Subsequently, the algorithm will proceed to Block 505, which asks, "Has cursor moved since the last editing action?" If the answer is no, the interface will highlight the undoable block (Block 507). If the answer is yes, then the interface will move the cursor to the location where it was immediately after the most recent editing action (Block 506), and it will highlight the undoable block (Block 507) but will not actually undo anything. From there, the algorithm returns to Block 501 and waits for the user's next action.

Continuing with the explanation of FIG. 5, if the undoable block is not completely out of view, then the answer to the question in Block 503 is no and the algorithm proceeds to Block 508, which asks, "Is undoable block highlighted?" If the undoable block is not highlighted, then the answer is no, and the algorithm will proceed to Block 509, which asks, "Has cursor moved since the last editing action?" If the answer to the question in Block 509 is yes, the algorithm will proceed to Block 510, which asks, "Has a certain amount of time passed since the last editing action?" If the answer to the question in either Block 509 or Block 510 is no, the algorithm will proceed to Block 513 and continue as described in the following paragraph. If the answer to the question in Block 510 is yes, the algorithm will proceed to Block 511, which asks, "Is undoable block only partially in view?" If the answer is no, then the interface will immediately move the cursor to the location where it was after the last editing action (Block 506). If the answer is yes, then the interface will first scroll to make the undoable text fully visible (Block 512) and then move the cursor to the location where it was after the last editing action (Block 506). As described previously, the interface will then highlight the undoable block (Block 507) but will not actually undo anything. From there, the interface will wait for the user's next action (Block 501).

If the undoable block is not completely out of view and the undoable block is highlighted, then the answer to the question in Block 508 is yes, and the algorithm proceeds to Block 513, which asks, "Is undoable block only partially in view?" If the answer is no and the undoable block is fully visible, then the interface will immediately undo the last editing action (Block 515). If the answer is yes, then the interface will first scroll to make the undoable text fully visible (Block 514) and then undo the last editing action (Block 515). Subsequently, the algorithm proceeds to Block 516, which asks, "Is the proximate block completely visible?" If the answer is yes, the interface will highlight the proximate block (Block 519). If the answer is no, the algorithm proceeds to Block 517, which asks, "Can more of the proximate block be made visible without scrolling any of the most recently changed input off the screen?" If the answer to the question in Block 517 is yes, then the interface will scroll to make the proximate block as visible as possible while keeping the most recently changed input completely visible (Block 518) and then highlight the proximate block (Block 519) and wait for the user's next action (Block 501). If the answer to the question in Block 517 is no, then the algorithm will proceed to Block 520, which asks, "Is the proximate block partially visible?" If the answer is yes, the interface will highlight the proximate block (Block 519) and wait for the user's next action (Block 501). If the answer is no, the interface will wait for the user's next action without highlighting the proximate block.

Coordinated Key Appearance

In an embodiment, the computing device has a keyboard that includes a key that acts as an alteration key, and the color of the alteration key matches the color that is used to indicate a highlighted alterable block, or the distinctive appearance of the alteration key is similar to the distinctive appearance of a highlighted alterable block in some other way. For example, in an embodiment, the computing device is a smartphone that has a virtual keyboard with an alteration key that is labeled "Alter" in green letters, and highlighted alterable blocks are displayed with a light green highlight.

In an embodiment, the computing device has a keyboard that includes an Undo key and a Redo key, and the colors of such keys match the color or colors that are used to indicate a highlighted undoable block and a highlighted redoable block (respectively), or the distinctive appearance of such keys is similar to the distinctive appearance of a highlighted undoable block and a highlighted redoable block in some other way. For example, in an embodiment, the computing device has a keyboard with a key that is labeled "Undo" in light pink letters, and after a user presses this key once, the portion of input that will change if the user then presses this key a second consecutive time is displayed with a light pink highlight.

In an embodiment, the computing device has a keyboard that includes one or more multi-click keys, and each such multi-click key has a label that includes text that indicates in some way what special multi-click effect can occur as a result of repeatedly actuating the key, and the color of such text matches the color that is used to indicate a highlighted multi-click block, or the distinctive appearance of such text is similar to the distinctive appearance of a highlighted multi-click block in some other way. In an embodiment, each such multi-click key also includes text that does not have a distinctive appearance; such text indicates what effect will occur the first time the key is actuated. For example, in an embodiment, the computing device is a graphing calculator that has a key labeled $x^{2,3\cdots}$, and on this key $x^2$ is black but the remaining text is purple; when a user presses this key once, an exponent of 2 is entered into the user's input and is displayed with a light purple highlight for a certain amount of time or until the user presses a key, and if the user then presses the same key again while the exponent is highlighted, then as a special multi-click effect the interface will increment the highlighted exponent rather than entering a new exponent of 2.

In an embodiment, the computing device has a keyboard that includes a key that acts as a Yes key as described in Chapter 9, and the color of the Yes key matches the color that is used to indicate a highlighted autocorrection block, or the distinctive appearance of the Yes key is similar to the distinctive appearance of a highlighted autocorrection block in some other way. For example, in an embodiment, the computing device has a key that is labeled "Yes" in light blue letters, and highlighted autocorrection blocks are displayed with a light blue highlight.

Interface Visuals in Perspective

In various prior art interfaces, text is occasionally highlighted, and changes are occasionally animated; however, such behaviors in combination with various behaviors that are described herein may represent significant advantages over prior art. In particular, various prior art interfaces underline supposed spelling mistakes and/or supposed grammar mistakes in order to alert users to such potential mistakes, but some embodiments may have significant advantages over prior art in that they not only highlight potential spelling or grammar mistakes but also highlight various other types of potential mistakes, or in that they also cause such highlighting to disappear eventually so as to not continue to distract users indefinitely, and so forth.

In an embodiment that has an alteration key, it may be especially advantageous to highlight the currently alterable decision, so that a user has some indication what will happen if he actuates the alteration key. In an embodiment that has the touch alteration feature that is described in the following chapter, it may be especially advantageous to highlight all alterable decisions that the touch alteration feature is applicable to, so that a user knows where the touch alteration feature is applicable. More generally, in any embodiment that facilitates altering alterable decisions, it may be especially advantageous to highlight alterable decisions (at least when their probabilities of alteration are not very low), so as to visually indicate that the functionality that facilitates altering alterable decisions is applicable to the highlighted alterable decisions.

However, it may be advantageous to facilitate altering alterable decisions even in an embodiment that does not highlight alterable decisions. Conversely, it may be advantageous to highlight alterable decisions even an embodiment that does not facilitate altering alterable decisions, so as to alert the user to potential mistakes.

Generally, interface behaviors that are described herein that pertain to interface-specified changes may be advantageous when applied to one particular type of interface-specified change, but may have an additional synergistic advantage when applied to multiple types of interface-specified changes. That is, interface behaviors that are described in the present specification that pertain to alterations may be advantageous even in an embodiment that lacks any similar interface behaviors that pertain to undo changes, autocorrection changes, and/or multi-click changes; and likewise, interface behaviors that pertain to undo changes or autocorrection changes or multi-click changes may be advantageous on their own, without similar interface behaviors that pertain to other types of interface-specified changes; but there may be a synergy in incorporating interface behaviors that treat multiple distinct types of interface-specified changes in similar ways, because then for example a user who has become accustomed to the interface behaviors that pertain to undo changes may find it relatively easy to understand similar interface behaviors that pertain to alterations. In the following paragraph, the point that is made in the present paragraph is applied specifically to certain interface behaviors that are described in the present chapter; this same point is also mentioned in later chapters with respect to the interface behaviors that are described in those later chapters.

When a user alters an alterable decision, the user may not know in advance exactly what effect will occur; for example, the first time a user alters an alterable decision that has multiple alternate options, the user may not know which alternate option will become selected. Certain interface behaviors that are described in the present chapter may help users keep track of the effects of alterations, which may be advantageous even in an embodiment that does not help users keep track of undo changes. Conversely, when a user actuates the Undo key, the user may not know in advance exactly what action will be undone, and certain interface behaviors that are described in the present chapter may help users keep track of the effects of undo changes, which may be advantageous even in an embodiment has no alteration functionality whatsoever. However, there may be an additional synergistic advantage in helping users keep track of both alterations and undo changes, because for example a user who has become accustomed to the interface behaviors that facilitate keeping track of undo changes may then find it relatively easy to understand similar interface behaviors that facilitate keeping track of alterations.

Chapter 6: Touch Controls

Touch Changes

The interface behavior described in the following paragraph will be referred to as "the touch alteration feature" in the present specification.

In an embodiment, if a user touches a highlighted alterable block, then the interface will alter that particular alterable interface decision. Therefore, in such an embodiment, if alteration works as described in Chapter 2, then the first time a user touches a highlighted alterable block that has not previously been altered, the interface will immediately alter that decision by replacing its default option with an alternate option, without prompting the user for any additional confirmation or clarification. In an embodiment, if after touching a highlighted alterable block the user's next action does not cause the interface to again alter that decision, then performing that next action constitutes "explicitly selecting an option" of that alterable interface decision. In an embodiment, if a user touches a highlighted alterable decision's alterable block more than once consecutively, then after any touch that caused the interface to select an alternate option, the next touch will cause the interface to select a different alternate option that was not selected yet if any such alternate option exists, or will cause the interface to revert the decision to its default option otherwise.

Figure 6A:
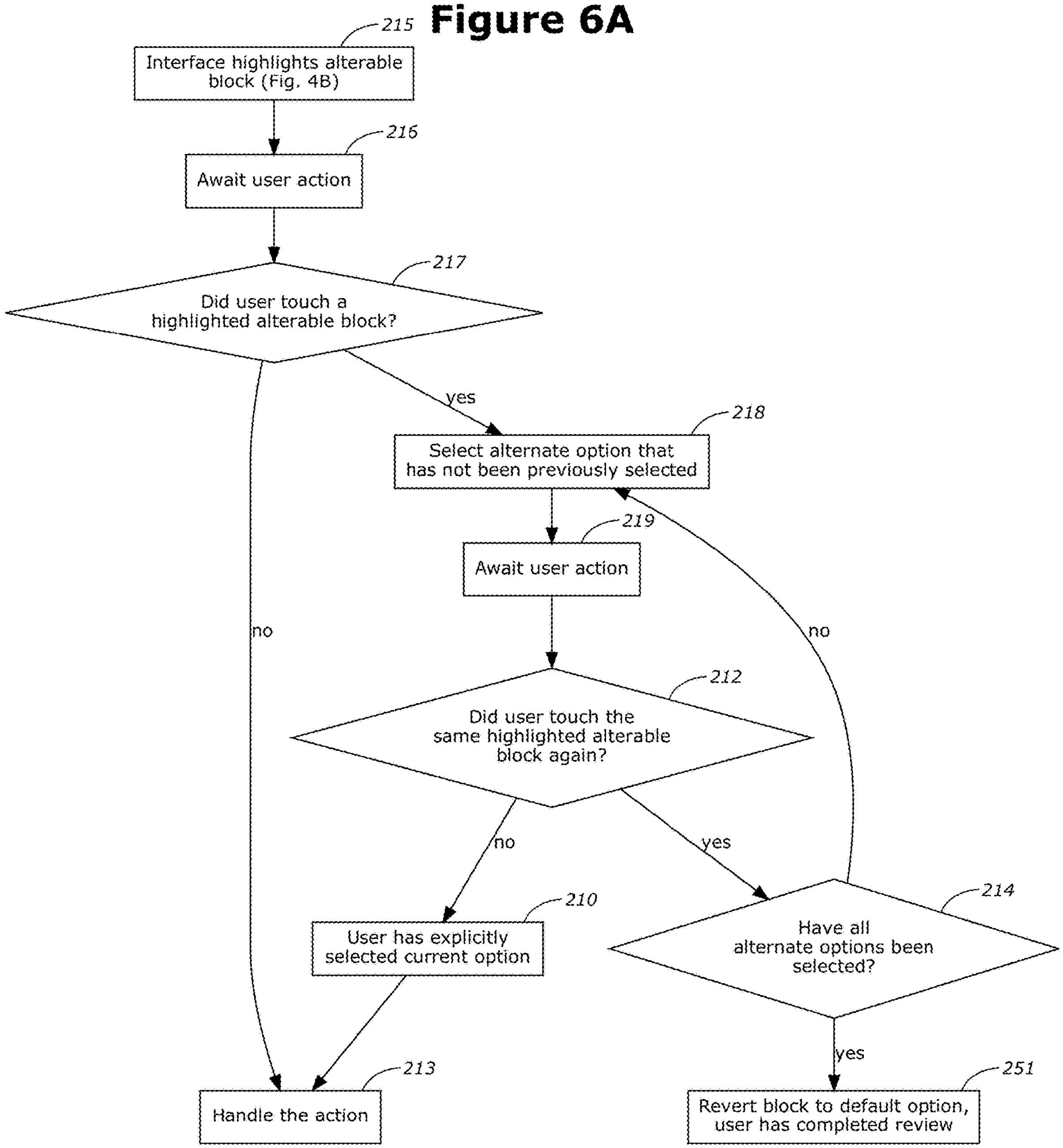
FIG. 6A is a flowchart that illustrates the behavior of an embodiment of an interface that has a touch alteration feature.

FIG. 6A is a flowchart that illustrates the behavior of an embodiment that has the touch alteration feature as described in the preceding paragraph. Block 601 says, "Interface highlights alterable block (FIG. 4B)" and proceeds to Block 602, which states, "Await user action." From there, the algorithm proceeds to Block 603, which asks, "Did user touch a highlighted alterable block?" If the answer is no, the interface simply handles the user action (Block 608). If the answer is yes, the algorithm proceeds to Block 604, which says, "Select alternate option that has not been previously selected" and then to Block 605, which says, "Await user action." From there, the algorithm proceeds to Block 606, which asks, "Did user touch the same highlighted alterable block again?" If the answer is no, the user has explicitly selected the current option of the alterable decision (Block 607) and the interface handles the action (Block 608). If the answer is yes, the algorithm proceeds to Block 609, which asks, "Have all alternate options been selected?" If the answer is no, the algorithm goes back to Block 604 and selects an alternate option that has not been previously selected and continues through the process as described above. If the answer is yes, the interface reverts the block to the default option, and the user has completed review of the alterable decision (Block 610).

In an alternative embodiment, the touch alteration feature will apply only when a user touches the highlighted alterable block of a highlighted alterable interface decision whose probability of alteration is above a certain threshold. In an embodiment, such a highlighted alterable block will be displayed differently than the highlighted alterable block of a highlighted alterable interface decision whose probability of alteration is below the threshold, so that a user can visually distinguish whether or not the touch alteration feature is applicable to any particular highlighted alterable decision.

In an embodiment, if a user touches a highlighted undoable block, the interface will respond as though the user actuated the Undo key; if a user touches a highlighted redoable block, the interface will respond as though the user actuated the Redo key. In an embodiment, if a user touches a highlighted multi-click block, the interface will respond as though the user actuated the relevant multi-click key again. In an embodiment, if a user touches a highlighted autocorrection block, the interface will perform that pending autocorrection. The interface behaviors described in the present paragraph, along with the touch alteration feature, are collectively referred to herein as "touch change features."

In an embodiment, if a highlighted changeable block contains no input and so the interface highlights a small region around the location of the changeable block in lieu of highlighting the changeable block itself, then touching that region counts as touching the highlighted changeable block for purposes of touch change features.

Touch Change Toggling

In an embodiment, in many cases, after a user touches a highlighted changeable block and thus invokes a touch change feature, a highlighted changeable block will then be present at the location the user just touched, and touching this highlighted changeable block will reverse the effect of the previous touch. For example, after a user touches a highlighted alterable block, in many cases that highlighted alterable block will continue to be present at the same location, and if it is the alterable block of a single-alternative alterable decision then touching the highlighted alterable block again will reverse the effect of the previous touch. After a user touches a highlighted undoable block, in many cases a highlighted redoable block will then be present where the highlighted undoable block previously was (in an embodiment where the redoable block is highlighted after an actuation of the Undo key), and touching the highlighted redoable block will reverse the effect of the previous touch. After a user touches a highlighted autocorrection block, in many cases a highlighted alterable block will then be present where the highlighted autocorrection block previously was (in an embodiment where autocorrections are alterable decisions), and touching the highlighted alterable block will reverse the effect of the previous touch. It may be desirable to enable a user to undo the invocation of a touch change feature by such means in even more cases, as is described in the following two paragraphs.

In an embodiment, after the touch alteration feature causes the interface to alter a particular alterable interface decision so that an alternate option of that decision becomes selected, if within a sufficiently short amount of time the user again touches the same location the user just touched, then the interface will again alter the same decision the interface just altered, even if for some reason that decision's alterable block is no longer at that location. For example, in such an embodiment, if the alteration that is triggered by touching a highlighted alterable block causes the highlighted alterable block to be entirely deleted, then for a short while, it will still be possible for the user to cause that alterable decision to revert to its default option by means of the touch alteration feature. In an embodiment, during this short amount of time in which touching the same location will cause the interface to alter the same decision, that location will be highlighted by some means; for example, that location may be a different color than surrounding input.

In an embodiment, when a user touches a highlighted autocorrection block and the interface performs the pending autocorrection, the resulting interface decision to perform that autocorrection is an alterable decision that is automatically assigned a probability of alteration that is above the highlighting threshold, so that if the user wishes to undo the autocorrection, the user can immediately do so by means of the touch alteration feature described above. However, in an embodiment, after a user touches a highlighted autocorrection block and the interface performs the pending autocorrection, once the user performs another action, if that next action is not an alteration of the alterable decision to perform that autocorrection, then the interface will consider the user to have explicitly selected the default option of that alterable decision, and so the interface will drastically decrease that alterable decision's probability of alteration and it will no longer be highlighted.

In an embodiment, the invocation of touch change features can also be reversed by another means in certain circumstances, as is described in Chapter 8, in the explanation of side-sliding changes.

Touch Alteration of Overlapping Blocks

In an embodiment, as is described in Chapter 5, the interface will not highlight an alterable block when it overlaps the alterable block of a highlighted alterable interface decision that has a higher probability of alteration, and in an embodiment, as is described in Chapter 3, the interface will drastically decrease an alterable decision's probability of alteration once the user has completed review of the decision, such as by cycling through all its options. Therefore, in an embodiment, if a user wishes to alter an alterable interface decision by means of the touch alteration feature when that decision's alterable block overlaps the alterable block of an alterable interface decision that has a higher probability of alteration, then the user may do so by touching the overlapping region sufficiently many times consecutively: initially, such touches will cause the interface to alter the decision that has the higher probability of alteration, which the user does not actually wish to alter; but eventually that decision will revert to its default option and its probability of alteration will be drastically decreased, so eventually the alterable decision that the user does wish to alter will have a higher probability of alteration than the other decision and will become highlighted, and then the user's next touch will cause the interface to alter that decision. Similarly, if a user wishes to alter a decision when that decision's alterable block overlaps multiple other alterable blocks, the user may repeatedly touch the overlapping region until all the other alterable decisions have a lower probability of alteration than the one the user wishes to alter, and then the user's next consecutive touch will cause the interface to alter that decision.

In an alternative embodiment where the interface will highlight an alterable block even when it overlaps the alterable block of an alterable interface decision that has a higher probability of alteration, or in an alternative embodiment where the interface does not drastically decrease an alterable decision's probability of alteration once the user has reviewed all its options, each time a user touches a highlighted alterable block, the interface will alter an alterable decision whose alterable block the user touched. In such an embodiment, touching that location will cause the interface to determine and remember a specialized alteration cycle that includes only alterable decisions whose alterable blocks overlap at that location, so that the user will be able to cycle through such decisions by repeatedly touching that location.

TOUCH CHANGE CANCELLATION

In an embodiment, when a user touches a highlighted changeable block, the interface will immediately make the resulting change without waiting for the user to release the touch, but if while still holding the touch the user slides the point of touch more than a certain "previewing distance," then the interface will position the current text of the changeable block a little ways above the current point of touch and move it in parallel with the point of touch, so that the user is sliding around the current text of the changeable block. When the current text of the changeable block is slid away from its original location, the former text of the changeable block will be visible at that location, as is illustrated in the last panel of FIG. 6B. In an embodiment, if the user slides the current text of a highlighted changeable block more than a certain "cancellation distance" away from its original position and the point of touch is no longer on any portion of the original location of the highlighted changeable block, then that current text will disappear and the interface will undo the change to the changeable block. If the user releases the touch before sliding the current text that far away, the current text will return to its original location.

Figure 6B:
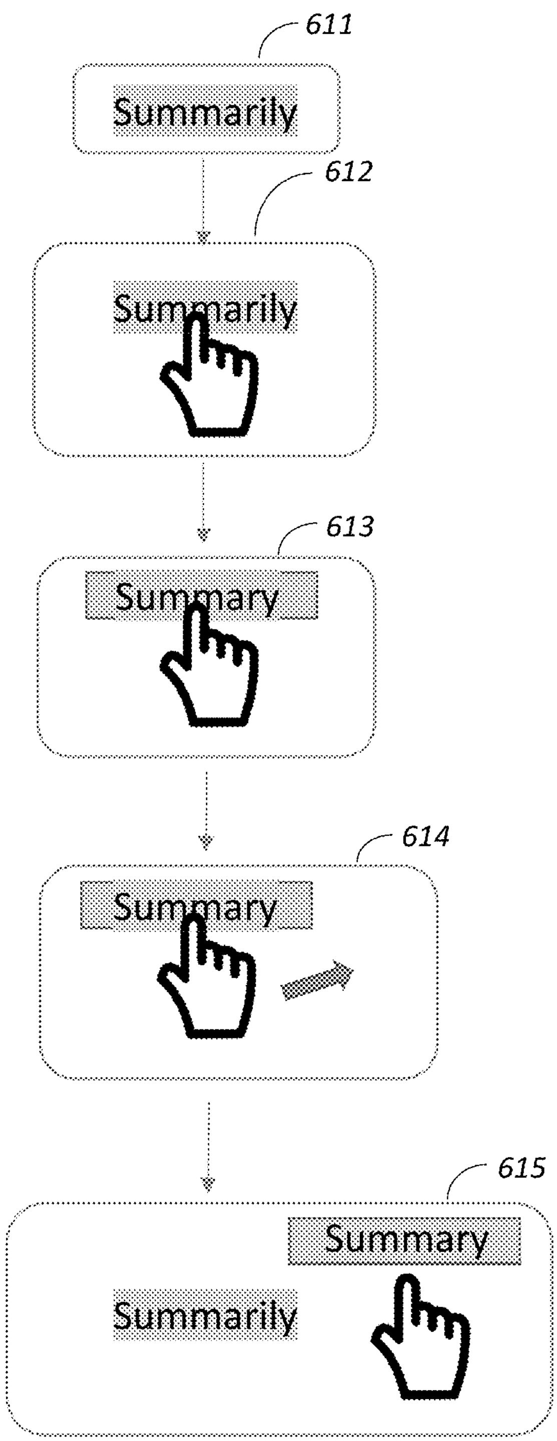
FIG. 6B illustrates an example of touch cancellation.

FIG. 6B illustrates the behavior described in the preceding paragraph. After the interface highlights an alterable decision (Panel 611) and a user touches the highlighted alterable block (Panel 612), the interface immediately evinces the alternate option without waiting for the user to release the touch (Panel 613). While still holding the touch the user slides the point of touch more than the previewing distance from the highlighted alterable block (Panel 614), so the interface positions the current text of the changeable block a little ways above the current point of touch and moves the image as corresponds with the user's point of touch (Panel 615), and when the current text of the changeable block is slid away from its original location, the former text of the changeable block becomes visible at that location (Panel 615).

In an alternative embodiment, when a user touches a highlighted changeable block, the interface will immediately make the resulting change without waiting for the user to release the touch, but subsequently sliding the point of touch will not have any visible effect on the text of the changeable block; nevertheless, if before releasing the touch the user slides the point of touch more than a certain "cancellation distance" and the point of touch is no longer on any portion of the highlighted changeable block, then the interface will undo that change.

Those of ordinary skill in the art will understand that the behavior described in the preceding paragraphs may also be applied to various alternative embodiments that require various means of "touch" in order to invoke the touch alteration feature. For example, in an embodiment, a user who wishes to temporarily view an alternate option for a highlighted alterable interface decision without permanently altering the decision can do so by positioning the mouse cursor on the highlighted alterable block and pressing the left mouse button and then sliding the mouse cursor sufficiently far away from the highlighted alterable block before releasing the left mouse button.

In an embodiment, for purposes of the following paragraphs, touching a highlighted changeable block and then sliding the point of touch far enough to cause the interface to undo the change as described above constitutes "previewing" the changeable block.

In an embodiment, if a user previews a highlighted alterable block, this counts as explicitly selecting the option that had previously been selected for that highlighted alterable decision, which may cause the interface to reduce the probability of alteration of that alterable decision, which may cause the alterable block to no longer be highlighted.

In an embodiment, if a user previews a highlighted undoable block or redoable block, or if a user previews a multi-click block, this counts as performing an action that is not an actuation of the Undo key or Redo key and is not a multi-click key actuation, and so the undoable block, redoable block, or multi-click block that the user previewed will no longer be highlighted.

In an embodiment, if a user previews a highlighted autocorrection block, the interface will cancel the pending autocorrection, and so the portion of input that had constituted the autocorrection block will no longer be highlighted. However, in an embodiment, if the user's next action is an action that would have caused the pending autocorrection to occur had it not been canceled, then the interface's decision not to perform that autocorrection will be an alterable decision with a very low probability of alteration.

Touch Change Variants

In an alternative embodiment, when a highlighted changeable block can be altered by means of touch change features, that highlighted changeable block is outlined in such a way as to imply that the highlighted changeable block is currently acting as a button. Such behavior may make it easier for a user to become acclimated to touch change features.

In an alternative embodiment, if a user touches the portion of input that an alterable interface decision pertains to, then the interface will alter the most relevant alterable interface decision that the user thus touched even if it is not a highlighted alterable interface decision. Such behavior may make it easier for a user to alter a decision as desired in certain cases, but may also make it easy for a user to alter a decision accidentally, so it may or may not confer a net advantage.

Those of ordinary skill in the art will understand that various alternative embodiments may require various means of "touch" in order to invoke various touch change features. For example, in one embodiment the touch alteration feature is invoked if a user simply touches and releases a highlighted alterable block; in an alternative embodiment the touch alteration feature is invoked only if a user double-clicks a highlighted alterable block; in another alternative embodiment the touch alteration feature is invoked only if a user traces a small clockwise circle that begins and ends on a highlighted alterable block; in another alternative embodiment the touch alteration feature is invoked if a user simply touches and releases a highlighted alterable block, but only when the interface is in alterable decision review mode; and so forth. In one embodiment the same means of touch may invoke touch change features for highlighted alterable blocks, highlighted undoable and redoable blocks, highlighted multi-click blocks, and highlighted autocorrection blocks; in an alternative embodiment single-clicking suffices for a highlighted undoable block, but double-clicking is required for a highlighted alterable block, and touch change features do not work at all for highlighted multi-click blocks or highlighted autocorrection blocks; and so forth.

In an embodiment, more than one distinct touch gesture may exist such that if a user performs the touch gesture on the alterable block of an alterable interface decision, and the decision's probability of alteration is above an optional minimum threshold, then the interface will alter that decision; each such distinct gesture may correspond to a different such optional minimum threshold. For example, in an embodiment, a simple tap gesture will invoke the alteration of a decision only if the decision has a high probability of alteration, and some more complex touch gesture will invoke the alteration of any alterable decision whatsoever. In an embodiment, if the probability of alteration of an alterable interface decision is above any particular such threshold, then the alterable block of that alterable interface decision is displayed differently than the way it would be displayed if its probability of alteration were below the threshold, so that an experienced user can visually distinguish which touch gestures can be used to invoke the alteration of any particular alterable decision.

Diverse embodiments that have touch change features may have diverse advantages. On the one hand, it may be extremely advantageous to minimize the effort required to fix a mistake, so it may be extremely advantageous for the touch alteration feature to be invoked by simply touching and releasing the alterable block of any alterable decision that has a probability of alteration that is not especially low. On the other hand, if a previously existing interface is modified in such a way as to embody the invention, and so users are already familiar with a version of that interface that did not have the touch alteration feature, then it may be advantageous for the touch alteration feature to instead be invoked by a means that is sufficiently complex that users who are not familiar with the touch alteration feature will seldom invoke the touch alteration feature by mistake. For example, in an embodiment, the touch alteration feature can be invoked only when the interface is in alterable decision review mode, and the interface is in alterable decision review mode only while the user is touching the lower left corner of the display of the computing device; in such an embodiment, a user who becomes familiar with the touch alteration feature may come to think of touch alteration invocation as a single input gesture that requires two fingers, and may learn to invoke the feature quite rapidly, but a user who is unfamiliar with the touch alteration feature will seldom invoke the touch alteration feature by mistake.

In an embodiment, the means that is required to invoke the touch alteration feature can be reconfigured. For example, in an embodiment, the touch alteration feature either can be invoked only when the interface is in alterable decision review mode or can be invoked at any time, depending on the current value of a particular interface setting, so that an individual user can explicitly set the touch alteration feature to operate in a way that suits the individual user's preference. Likewise, in an embodiment, the means that are required to invoke various other touch change features can be reconfigured.

Touch Controls in Perspective

Generally, most prior art mistake recovery features require at least two touch gestures, such as a first touch to open a mistake correction menu and a second touch to select the desired outcome. In an embodiment, the touch alteration may generally enable faster correction of a wider variety of mistakes.

U.S. Pat. No. 8,074,172 appears to describe an iPhone feature such that just a single touch of an autocorrected word will undo the autocorrection, but as far as the present writer is aware, that particular feature has never actually been implemented in any of the publicly available iPhones covered by that patent, presumably because that feature as described would be disadvantageous in many cases: on a phone with such a feature, a single touch of a replacement word could instantly undo an autocorrection that was a desired autocorrection of a very obvious typographical error, which is a result that a typical user would not expect and would not desire. In various embodiments, the touch change features that are described herein may be more advantageous than that prior art feature in various ways. In particular, in an embodiment, touch change features are invoked by a simple tap gesture only when the relevant changeable block is highlighted and so merely tapping non-highlighted text will not cause an unexpected change, and autocorrections that have a very low probability of alteration are not highlighted and thus cannot be accidentally undone by a single touch; and in an embodiment, many other types of errors can be corrected by means of touch change features other than just undesired autocorrections.

It may be extremely advantageous for a user to be able to alter an alterable decision by means of a single quick action, so the touch alteration feature may be especially desirable in an embodiment that lacks an alteration key, and vice versa. However, it may be preferable for an embodiment to have both the alteration key and the touch alteration feature, so as to enable users to quickly alter alterable decisions by whatever means they find most convenient.

As is mentioned in the previous chapter, interface behaviors that are described herein that pertain to interface-specified changes may be advantageous when applied to one particular type of interface-specified change, but may have an additional synergistic advantage when applied to multiple types of interface-specified changes. In particular, the touch alteration feature may be advantageous in an embodiment that does not have any other touch change features, and the touch change feature that enables a user to undo an action by means of touching a highlighted undoable block may be advantageous in an embodiment that does not have any other touch change features, but there may be an additional synergistic advantage in having both the touch alteration feature and other touch change features so that for example a user who has become accustomed to touching a highlighted undoable block in order to undo an action may then find it relatively easy to understand that touching a highlighted alterable block will alter a decision.

Chapter 7: Menu-Based Alteration

Option Descriptions

For certain purposes, it may be desirable for an option of an alterable interface decision to have a description that fits within a region of limited size. In particular, if an interface is to display a menu that lists the options of an alterable interface decision, it may be desirable for each description of an option to be displayed in an area that does not exceed a certain height and width.

In prior art, it is customary for menu options to consist of plain text (though often with some letters underlined to indicate shortcut keys). Menu options typically will not have special formatting such as italics or superscripts; if a programmer wishes a menu to include an option such as $x^2$ that has special formatting, the programmer may need to create custom menu functionality rather than relying on pre-existing menu functionality that restricts options to plain text. The following discussion of text descriptions of alterable interface decisions will primarily have in view plain text descriptions such as are commonly encountered in prior art menus. Nevertheless, the limitation in view in the following discussion is a spatial limitation, not a formatting limitation: it may possibly be appropriate for a menu to include an option such as $x^2$ that has special formatting, but it may not be appropriate for a menu to include an option such as $$\frac{\frac{1}{2}}{\frac{3}{4}}$$

that exceeds the height allotted for menu options. Thus, the so-called "text descriptions" discussed below may optionally include special formatting or even non-textual graphics, provided that the descriptions fit within a sufficiently small region. A "brief text description" is thus any description that can fit within a row of an ordinary interface menu, and an "extremely brief text description" is any description that can fit within a region that is only large enough to contain a dozen or so plain text characters. (In various embodiments, the exact size constraints for an "extremely brief text description" may vary.)

Two types of approaches to providing brief text descriptions for options of alterable interface decisions are: a self-descriptive approach, in which an option of an alterable interface decision serves as its own brief text description; and non-self-descriptive approaches, in which an option of an alterable interface decision is described in terms of its purpose or nature or in terms of the way the decision's outcome may be modified in order to yield that option.

An alterable interface decision that is intended to facilitate the correction of a potential word entry mistake will typically have options that consist of small portions of text, and so can easily serve as their own brief text descriptions. For example, if the interface makes an alterable decision to convert the word "arnor" to the word "armor," then the two options of this alterable decision can be briefly described as "arnor" and "armor." It would be more difficult to create an algorithm that briefly describes such options by means of a non-self-descriptive approach.

An alterable interface decision that is intended to facilitate the correction of an undesired autocorrection or a formatting mistake will typically have options that can easily be described by means of a non-self-descriptive approach. For example, if in response to an actuation of the Paste key the interface makes an alterable decision whether to keep the original format of the pasted text or to change the format of the pasted text to match its new surroundings, the options of that decision may be briefly described as "keep source formatting" and "match destination formatting," or in some similar way. If the pasted text is lengthy, then such a decision's options cannot be briefly described by means of a self-descriptive approach.

In many cases, the options of an alterable interface decision can easily be described by either type of approach. For example, if the interface makes an alterable decision to automatically convert the word "friday" to "Friday," the options of that decision may be briefly described as "friday" and "Friday," or they may be briefly described as "keep lowercase" and "capitalize." In other cases, the options of an alterable interface decision may not be easy to describe by either type of approach. For example, if the default option of an alterable interface decision is $$\sqrt{\frac{3}{4}}$$

and an alternate option is $$\frac{\sqrt{3}}{4},$$

it is not obvious to the present writer how to briefly describe these options in plain text that the average user will quickly understand. Nevertheless, it will usually be possible to describe the options of an alterable interface decision by means of a non-self-descriptive approach, even if such a description will not be easy for the average user to quickly understand. For example, in certain circumstances, if the options of an alterable interface decision are $$\sqrt{\frac{3}{4}} \text{ and } \frac{\sqrt{3}}{4},$$

these options may be described as "don't alter" and "shrink square root."

In an embodiment, the interface will use a self-descriptive approach to describe options of alterable interface decisions that are intended to correct word entry mistakes, and will use a non-self-descriptive approach to describe options of other alterable interface decisions. In an alternative embodiment, the interface will use a self-descriptive approach to describe options of alterable interface decisions whenever possible, and will use a non-self-descriptive approach in other cases.

For certain purposes, it may be desirable for an option of an alterable interface decision to have a text description that is extremely brief. In an embodiment, whenever an extremely brief text description of an option of an alterable interface decision is required, if the interface is otherwise unable to provide an extremely brief text description, then the interface will use a default description such as the word "Alter."

Alteration Menus

In various prior art interfaces, in various circumstances, the interface may display a menu of options where each option consists of a brief portion of text that is contained in a separate row of the menu. On a prior art iPhone, in various circumstances, the interface may display a pop-up menu of a few options where each option consists of an extremely brief portion of text and all the options are contained within a single row with dividers between the various options. In certain prior art interfaces, whenever a menu needs to contain more options than the quantity of options that can fit within its allotted space, the menu will have a special option such that when this option is selected the menu will replace the set of menu options that were visible with a different set of menu options. For example, on an iPhone, in certain circumstances a single-row menu may appear that contains the four options "Cut," "Copy," "Paste," and "►"; if the user selects the option "►.", then the first three options will be replaced with the options "◄", "Replace . . . ", and "Define"; if the user then selects the option "◄", then the menu will revert to its original version. Accordingly, those of ordinary skill in the art will understand that an alteration menu as described below may contain as many options as necessary, regardless of the size of the display of a computing device. (However, each individual option should have a description that fits within a region of limited size, as discussed above.)

In an embodiment of the present invention, when a user performs some particular touch gesture on an alterable block, the interface will display an "alteration menu," which is a menu that includes a brief text description for each alternate option of that alterable interface decision; if the user then selects one of these options from the menu, the interface will close the menu and will replace the previously selected option of that decision with the option the user just selected. If such an embodiment has the touch alteration feature, then the touch gesture that invokes an alteration menu is different than the touch gesture that invokes the touch alteration feature; for example, in an embodiment, the touch alteration feature is invoked by a very simple touch gesture such as a click of the left mouse button or a single tap with a finger, and an alteration menu is invoked by a click of the right mouse button or a touch with a finger with application of additional pressure.

In various embodiments, either the touch gesture that invokes an alteration menu may do so only when the touch gesture indicates the location of an alterable block that is highlighted, or else the touch gesture may invoke an alteration menu whenever the touch gesture indicates the location of any alterable block regardless of whether the alterable block is highlighted.

In various embodiments, either an alteration menu may include only the alternate options of an alterable interface decision, or it may also include the default option, possibly with some distinguishing mark or distinguishing highlight to indicate that the default option is currently selected. Each approach has its advantages. In an embodiment that is a computing device with a very small display, such as a smartphone, one possible advantage of including only the alternate options is that the alteration menu may then take up slightly less space.

In various prior art interfaces, a user who wishes to select a menu option from a menu that is on a menu bar may click on the title of the desired menu in order to open that menu and then click on the desired option to select that option, or may instead press and hold the mouse button in order to open the desired menu, then slide the mouse cursor to the desired option, and there release the mouse button to select that option. Accordingly, in an embodiment of the present invention, if a user holds the touch (or mouse button press) that causes the interface to display an alteration menu, then the user can select an option from that menu by sliding the touch (or mouse cursor) to the desired option and there releasing the touch (or mouse button press).

In an embodiment, if a user presses and holds the alteration key for at least a certain specific length of time, then the interface will display an alteration menu for the currently alterable decision. Thus, in such an embodiment, when a user wishes to correct a mistake by means of altering the currently alterable decision, the user can explicitly select the desired correction without the need to explicitly indicate the location of the mistake first. In an embodiment, if a user presses the Escape key or the alteration key while an alteration menu is displayed, the interface will close that menu without selecting an option from that menu.

In an embodiment, selecting an option of an alterable interface decision from an alteration menu constitutes "explicitly selecting an option" of that alterable interface decision. In an embodiment, closing an alteration menu without selecting an option of an alterable interface decision from that menu constitutes "completing review" of that alterable interface decision.

Additional Options and Additional Menus

In an embodiment, when the interface displays a menu of options of an alterable decision, the interface may also present the user with one or more options that allow the user to quickly access relevant customization features. For example, if the interface has made an alterable decision to automatically convert a numeral to an exponent, then when the interface displays a menu of options for that alterable decision, the interface may include an additional menu option such as "Stop Automatically Creating Exponents."

In an embodiment, if a user performs the touch gesture that invokes an alteration menu at a location that is the location of more than one overlapping alterable block, then the interface will display an alteration menu for only the most relevant alterable interface decision that has an alterable block that the user thus touched. In an alternative embodiment, if a user performs the touch gesture that invokes an alteration menu at a location that is the location of more than one overlapping alterable block, then the interface will display a combined alteration menu that includes the options of each alterable interface decision that has an alterable block that the user thus touched, optionally with dividers between any adjacent options that are options of different alterable interface decisions. In another alternative embodiment, if a user performs the touch gesture that invokes an alteration menu at a location that is the location of more than one overlapping alterable block, then the interface will simultaneously display one alteration menu for each alterable interface decision that has an alterable block that the user thus touched; if the user selects an option from any of these menus, the interface will close all of these menus.

In an embodiment, an alteration menu may also include options that do not pertain to alterable interface decisions. In an embodiment, the touch gesture that invokes an alteration menu may also cause some other menu or menus to appear along with the alteration menu. Such a behavior may be desirable if an interface designer wishes to enable a user to easily access alteration menus and also wishes to enable a user to easily access certain other menu options that are unrelated to alteration functionality. For example, in an embodiment, right-clicking an alterable block will simultaneously invoke an alteration menu that appears above the alterable block and also a menu of formatting options that appears below the alterable block.

Presenting Numerous Options Via Menu

In an embodiment, when the interface alters an alterable interface decision, if that decision has more than a certain threshold quantity of alternate options that have not been selected yet, then rather than replacing the selected option with an alternate option that has not been selected yet, the interface will display a menu of alternate options that have not been selected yet for that interface decision. For example, in an embodiment, if a user actuates the alteration key when the currently alterable decision has 10 alternate options, then the interface will open a menu of brief text descriptions of these 10 alternate options. In such an embodiment, when an alterable decision has numerous options, a user will not need to cycle through all the other options individually in order to reach the last option, and when an alterable decision does not have numerous options, a user will be able to alter the decision quickly without using a menu.

In an alternative embodiment, when the interface alters an alterable interface decision, if that decision has more than a certain number of alternate options that have not been selected yet, the interface will count the number of alternate options that have not been selected yet that have nearly as high a probability of alteration as the option that would be selected next: that is, the interface will calculate a threshold probability of alteration that is a certain amount lower than the probability of alteration of the option that would be selected next, and then the interface will count the number of alternate options that have not been selected yet that have a probability of alteration that is above this threshold probability. If the number of such alternate options is more than a certain threshold quantity, then rather than replacing the selected option with the next alternate option that has not been selected yet, the interface will display a menu of alternate options that have not been selected yet for that interface decision. (Such a menu may include alternate options that have not been selected yet that are below the threshold probability.) If however the number of such alternate options is less than the threshold quantity, then the interface will replace the currently selected option with the next alternate option as usual. For example, in an embodiment, if a particular alterable interface decision has one alternate option with a high probability of alteration and 10 alternate options with a low probability of alteration, then the first time the interface alters that decision it will replace the decision's default option with the alternate option that has a high probability of alteration, and the second time the interface alters that decision it will open a menu of brief text descriptions of the other 10 alternate options.

In an embodiment, when the interface displays a menu of all the alternate options that have not been selected yet as described in either of the two preceding paragraphs, if the user then performs a gesture that would cause the interface to alter the same decision again if this menu were not open, then the interface will close this menu; the user has then "completed review" of that alterable interface decision. For example, in an embodiment, if the user actuates the alteration key twice consecutively when the currently alterable decision has 10 alternate options with approximately equal probabilities of alteration, then the first actuation of the alteration key will cause the interface to open a menu of brief text descriptions of these 10 alternate options, and the next actuation of the alteration key will cause the interface to close this menu; the user has then completed review of that alterable interface decision, so a different decision may become the currently alterable decision.

Holding a Touch to Invoke a Menu

In an embodiment, if a user invokes the touch alteration feature by touching a highlighted alterable block and continues to hold the touch for at least a certain specific length of time, then the interface will display a menu of options for the decision that was just altered.

In an embodiment, when holding a touch causes the interface to display a menu of options of an alterable interface decision, the menu will include every option of that decision, including the option that is currently selected, and the option that is currently selected will be displayed in a manner that is distinct from the other options. In an alternative embodiment, when holding a touch causes the interface to display a menu of options of an alterable interface decision, the menu will not include the option that is currently selected.

In an embodiment, when holding a touch that invoked the touch alteration feature causes the interface to display a menu of options of an alterable interface decision, the touch alteration that just occurred will be undone (and so such a menu need not necessarily include the default option). In an alternative embodiment, when holding a touch that invoked the touch alteration feature causes the interface to display a menu of options of an alterable interface decision, the touch alteration that just occurred will not be undone (and so such a menu need not necessarily include the option that became selected when the touch alteration feature was invoked).

Menu-Based Alteration in Perspective

In various prior art interfaces, in certain circumstances a user can correct a word entry mistake or an undesired autocorrection by means of first performing an action that causes a menu of one or more correction options to pop up and then selecting the desired outcome from the menu. For example, on a prior art iPhone, if the iPhone performs an undesired autocorrection, in certain circumstances a user can correct the undesired autocorrection by means of first backspacing so that the input cursor is immediately after the word that was autocorrected, thus causing the interface to display a small flag menu that includes at least the word the user originally typed, and then touching the word the user originally typed.

In an embodiment that has other means of altering alterable decisions (such as the alteration key or the touch alteration feature), an alteration menu may be a relatively inefficient means of altering an alterable decision in most circumstances. Nevertheless, even in an embodiment that has other means of altering alterable decisions, an alteration menu may be the most convenient means of altering an alterable decision in certain circumstances, such as when an alterable decision has numerous alternate options, as is described above.

An embodiment that has other means of altering alterable decisions in addition to or instead of alteration menus may be more advantageous than an embodiment that has only alteration menus. Nevertheless, in various ways, an embodiment that has alteration menus but does not have other means of altering alterable decisions may still have significant advantages over prior art. For example, in an embodiment that has alteration menus and that has many types of alterable decisions that do not pertain to word entry mistakes or undesired autocorrections, there may be many more circumstances than in prior art wherein a user can quickly recover from a mistake by means of first invoking a menu and then selecting the desired outcome from the menu.

Chapter 8: Change Indicators

Change Flags

Below, various small indicators are described that may appear that are associated with changeable blocks. Such indicators are referred to herein as "change flags."

In an embodiment, when a change flag appears, if its associated changeable block has a specific location, then the change flag will appear near that location, and will have a tail that points to that location. In an embodiment, such a change flag will be located in an otherwise empty region of the display if possible; for example, when a user is typing text at the bottom of a document, if a change flag appears that pertains to a word the user just typed, the change flag will typically appear below the word the user typed rather than above it, so as not to obscure other text the user has typed. In an embodiment, when it is not possible for such a change flag to be located in an otherwise empty region of the display, it will be located immediately below the location of its associated changeable block if possible, or immediately above it otherwise.

In particular, in an embodiment, in certain circumstances a "block descriptor" will appear. A block descriptor is a change flag that describes the current state of its associated changeable block; for example, when a block descriptor appears that is associated with an alterable decision, the block descriptor contains a brief description of the currently selected option of the alterable decision. In such an embodiment, when an interface-specified change occurs, if a block descriptor was visible for the relevant changeable block, and if the block descriptor is still visible after the change, then the block descriptor will be updated so as to describe the new state of the associated changeable block; for example, if a block descriptor is associated with an alterable decision, then when the decision is altered its block descriptor is updated. FIG. 23 shows a sample block descriptor (2322) for an alterable decision pertaining to text format selection.

In an embodiment, in certain circumstances a "preview descriptor" will appear. A preview descriptor is a change flag that describes the state that will obtain if its associated changeable block is changed; for example, when a preview descriptor appears that is associated with an alterable decision, the preview descriptor will contain a brief description of the option of the alterable decision that will become selected if the decision is altered.

In an embodiment, a block descriptor will take the form of a small speech balloon graphic, but a preview descriptor will take the form of a small thought balloon graphic with a cloud-like outline; either one will have a tail that points to the location of its associated changeable block if that changeable block has a specific location. Other possible ways of distinguishing block descriptors from preview descriptors will be evident to those of ordinary skill in the art; for example, in an alternative embodiment, block descriptors and preview descriptors will both take the form of speech balloons, but preview descriptors will be highlighted a different color than block descriptors. In an alternative embodiment, block descriptors and preview descriptors will have the same appearance, and will be distinguishable only by virtue of the fact that a preview descriptor does not describe the current state of its associated changeable block.

In an embodiment, the text within a block descriptor or preview descriptor will be highlighted in the same way as its associated changeable block; for example, if highlighted alterable blocks are displayed with a light green background, then the text within a preview descriptor for a highlighted alterable block will also be displayed with a light green background. In an embodiment, touching a block descriptor or preview descriptor constitutes touching the associated changeable block for purposes of touch change features.

In an alternative embodiment, the interface does not have the touch alteration feature and yet touching a block descriptor or preview descriptor for an alterable block causes the interface to alter the decision. In such an alternative embodiment, it may be desirable for block descriptors and/or preview descriptors for alterable blocks to appear more frequently than in an embodiment that has the touch alteration feature, in order to frequently enable alteration by means of a single touch gesture despite the lack of the touch alteration feature.

In an embodiment, if a user presses and holds a change flag, then the change flag will become draggable, and if the user drags the change flag a certain minimum distance and then releases it, the change flag will disappear, and the associated change will no longer be pending. For example, if a change flag appears that is associated with a pending autocorrection, then the user can prevent the pending autocorrection by dragging away the change flag. When a change flag is associated with an alterable decision, making the change flag disappear this way constitutes explicitly selecting the currently selected option of that alterable decision, and so the interface may drastically decrease the probability of alteration of that alterable decision.

In an embodiment, a pop-up alteration menu also constitutes a change flag, and a user can dismiss such a menu by dragging it a certain minimum distance and then releasing it.

Previewing Changes

In an embodiment, when a user hovers over an alterable block for a certain minimum amount of time, the alterable block will become a highlighted alterable block until the user is no longer hovering over the alterable block. In an embodiment, when a user hovers over a highlighted changeable block for a certain minimum amount of time, the interface will display a preview descriptor for that changeable block; such a preview descriptor will disappear when the user is no longer hovering over the highlighted changeable block.

In an embodiment, a user is considered to be "hovering over" a changeable block either when the user has detectably positioned a stylus that is nearly touching the alterable block but is not touching the display at all, or when the user has positioned the mouse cursor on the changeable block without clicking. However, in an embodiment, a user is not considered to be hovering over a changeable block if without moving the mouse cursor the user performed an action that caused a changeable block to become located where the mouse cursor already was. For example, if the mouse cursor happens to be positioned at the center of the screen and a user types text at the center of the screen that happens to become an alterable block, and the user then pauses for the minimum amount of time referred to above, then even though the mouse cursor has been on the alterable block for that minimum amount of time, the alterable block will not necessarily become a highlighted alterable block. After that, if the user then moves the mouse cursor just slightly so that it is still on the alterable block then the user will be considered to have positioned the mouse cursor on the alterable block and will thus be hovering over the alterable block, and if the user then pauses for that minimum amount of time, then the alterable block will become a highlighted alterable block until the user is no longer hovering over the alterable block.

In an embodiment, when there is a proximate change as defined in Chapter 5 and a certain minimum amount of time passes during which the user does not perform any detectable activity, if the proximate change is an autocorrection change that would have no effect other than to insert additional input that the user did not type at a location that is immediately after the current cursor location, and there is sufficient empty space at that location to display the input that will be inserted if the proximate change occurs, then the interface will display the additional input that will be inserted if the proximate change occurs, with a distinctive appearance so as to indicate that the additional input is not yet actually present. Such displayed additional input will be referred to herein as a "pending interpolation preview." For example, in an embodiment, if the user has typed "Tuesd" and pressing the space bar would trigger an autocorrection that would insert "ay" before the resulting space character, then if the user pauses for a short while, the letters "ay" will appear after the current cursor location, and will be blue to indicate that they are not actually present in the user's input but are associated with a pending autocorrection change. In an embodiment, if a user touches a pending interpolation preview and slides the touch a certain minimum distance before releasing it, the pending interpolation preview will disappear and the associated change will no longer be pending.

In an embodiment, in certain circumstances that are described farther below, a "pending optional interpolation" may exist. In an embodiment, such a pending optional interpolation constitutes a pending autocorrection change for purposes of the preceding paragraph, except that any additional input that is displayed with a distinctive appearance as described in the preceding paragraph is displayed in a different manner if it is displayed due to a pending optional interpolation than if it is displayed due to an actual pending autocorrection change. For example, in an embodiment, a pending interpolation preview that is displayed due to a pending autocorrection change will be displayed with a blue color, but a pending interpolation preview that is displayed due to a pending optional interpolation will be displayed with a lighter blue color that will appear quite faint against a white background.

In an embodiment, when there is a proximate change and a certain minimum amount of time passes during which the user does not perform any detectable activity, the interface will display a preview descriptor for the proximate change or display the additional input that will be inserted if the proximate change occurs only in the circumstances described above. However, in an alternative embodiment, while a change that may occur in response to the user's next action is a proximate change, if a certain minimum amount of time passes during which the user does not perform any detectable activity, and if the interface does not display a pending interpolation preview for the proximate block, then the interface will display a preview descriptor for the proximate block; in an embodiment, the minimum amount of time that passes before the interface thus displays a preview descriptor is a longer amount of time than the minimum amount of time that passes before the interface displays a pending interpolation preview as described above.

In another alternative embodiment, when there is a proximate change, if a certain minimum amount of time passes during which the user does not perform any detectable activity, and if the interface does not display a pending interpolation preview for the proximate block, then the interface will actually briefly display the proximate change: that is, the interface will perodically change the user's input as though the proximate change had occurred and will then quickly revert the portion of input that changed. For example, in an embodiment, if the interface has automatically replaced "tuesday" with "Tuesday" and the proximate change is currently an alteration of that decision, then if the user stops for a while, the highlighted word "Tuesday" will periodically be briefly replaced by "tuesday." In an embodiment, when any such temporary replacement occurs, no other input will move due to such temporary replacement; instead, the replacement version of that portion of input will be reduced in size if necessary in order to fit within the available space. In an embodiment, as an exception, if the proximate change is such that the interface will appear to gradually change the proximate block if the proximate change does occur, and if such a gradual change will not consist of a sequence of distinct gradual changes, then rather than fully showing the proximate change, the interface will periodically cause the gradual change in appearance that is associated with the the proximate change to occur only partially and to then be reversed. For example, in an embodiment, if the proximate change would cause the interface to gradually move three characters into a fraction's numerator, then if the user stops acting and waits, those three characters will periodically move towards the fraction's numerator and then return to their original location. If the proximate change would cause the interface to change a sentence's font from black to light gray, then if the user stops acting and waits, the sentence will periodically become somewhat lighter and then darken to black again.

Flagging Subtle Changes

In many cases, an interface-specified change will pertain to a single discrete, clearly visible portion of input, and so the interface can communicate something about that interface-specified change by highlighting that portion of input. In most cases, when an interface-specified change occurs, the user can see the consequences. However, in some cases, simply highlighting a portion of input may not be an effective way to communicate the nature of a particular interface-specified change, and in some cases, when an interface-specified change occurs, the user may not be able to easily identify the consequences even if the relevant portion of input is highlighted.

In an embodiment, certain interface-specified changes are treated as "subtle changes" for purposes of the behaviors described in the following paragraphs. Specific types of subtle changes are described below.

In an embodiment, when a changeable block pertaining to a subtle change would be highlighted, the interface will cause a block descriptor to appear for the subtle change. In an embodiment, such a block descriptor will disappear when its changeable block would not be highlighted, except as specified in the following paragraph. In an embodiment, the highlighting threshold will be somewhat lower for alterable decisions that are subtle changes, in order to cause the interface to have slightly more of a tendency to display block descriptors for such alterable decisions, since without block descriptors a user may not be able to recognize the outcomes of such decisions.

In an embodiment, when a subtle change is to occur that will be animated, if a block descriptor was not already visible for that change, then the interface will cause a block descriptor to appear and the interface will very briefly pause while this block descriptor contains a brief description of the status of the subtle change before the change occurs; the interface will then cause the subtle change to occur, and will accordingly update the block descriptor. When a subtle change is to occur that will be animated, if a block descriptor was already visible for that change, then the change will occur immediately, without such a pause. In an embodiment, after a subtle change is animated, the block descriptor will remain visible at least until the user performs another action or until a fairly long amount of time elapses (such as, in an embodiment, 10 seconds); the block descriptor may remain visible longer if the changeable block remains highlighted.

In an embodiment, when the consequences of an interface-specified change are not readily visible at all, such a change will be treated as a subtle change. In an embodiment, the block descriptor for such an interface-specified change will take the form of a tiny pop-up window in an arbitrary location; in an embodiment, such a block descriptor will have the usual speech balloon appearance, except that it will not have a tail that points to anything. In an alternative embodiment, such a block descriptor will take the form of text on a status line. For example, in an embodiment where it is possible to undo the action of saving a file, such a change may have no readily visible consequences; therefore, in an embodiment, if the user undoes such a change, then a block descriptor will appear that says "File saved" for a very short time and then says "File not saved." In an embodiment, when multiple block descriptors that pertain to alterable interface decisions are visible in the form of text on a status line, the block descriptors will be arranged chronologically, so that the block descriptor for the alterable interface decision that occurred the most recently will be the farthest to the left on the status line and the block descriptor for the alterable interface decision that occurred the least recently will be the farthest to the right.

In an embodiment, when the consequences of an interface-specified change are visible but may be too subtle to easily identify even when the change is highlighted and animated (in the judgment of the interface designer), such a change will be treated as a subtle change. For example, if the interface has made an alterable decision to convert a straight quotation mark to a slanted quotation mark and a user alters that decision, then the resulting change may be difficult for the user to identify even if the change is highlighted and animated; therefore, in an embodiment, when a user alters such a decision, a block descriptor will appear that will say "slanted quotation mark" for a very short time and then say "straight quotation mark."

More generally, in an embodiment, even when the consequences of an interface-specified change are visible and identifiable, if it is likely that it will be difficult for a user to quickly grasp the nature of the change without a block descriptor (in the judgment of the interface designer), then such a change will be treated as a subtle change. For example, if the interface makes an alterable decision to display a long list of files in alphabetical order rather than in some other order, then highlighting the entire list as a highlighted alterable block may not communicate that what is alterable is the order in which the files are listed, so treating the alteration as a subtle change may make it easier to communicate what happens if the decision is altered. As another example, if an undo change consists of changing seven distinct occurrences of the word "John" to "Jon" and these occurrences are not all simultaneously visible, then treating the undo change as a subtle change may make it easier to communicate what happens if the undo change occurs.

In the present specification, a "subtle state" is an interface state either before or after an interface-specified change such that there is nothing in particular to highlight that is relevant to the change. A "semi-subtle change" is a change such that either the interface state before the change is a subtle state or the interface state after the change is a subtle state, but not both. In an embodiment, when a semi-subtle change occurs, a block descriptor will be visible for that change only while the interface is in the subtle state. For example, in an embodiment, when there is a highlighted undoable block, and when it is the case that actuating the Undo key would cause a window to close, the proximate change (which consists of closing that window) is a semi-subtle change. At that point, the interface is not in a subtle state with respect to the proximate change because the window itself can be highlighted; but if the user then actuates the Undo key and thus causes the interface to close the window, then once the window has closed the interface is in a subtle state because there is nothing in particular to highlight that is relevant to the closed window, and so a block descriptor that says "Window closed" will appear where the window used to be.

Side-Sliding Changes

In an embodiment, certain interface-specified changes are "side-sliding changes," as explained below. Certain interface behaviors pertaining to side-sliding changes that are explained below may enable a user to see in advance what will occur if he repeatedly alters a decision or repeatedly actuates a multi-click key, and may also enable a user to rewind if he overshoots by actuating the alteration key or a multi-click key too many times. However, certain interface behaviors that are explained above may make it unnecessary for a user to see potential interface-specified changes in advance or to rewind interface-specified changes: in most cases, a user can efficiently view the results of interface-specified changes simply by causing the changes to occur, and may then cancel the changes if desired. Therefore, in an embodiment, most interface-specified changes are not side-sliding changes: an interface-specified change is a side-sliding change only if it is unusually desirable for a user to see potential interface-specified changes in advance (in the judgment of the interface designer). For example, in an embodiment, multi-click changes pertaining to a variable shortcut key are side-sliding changes so that a user can see in advance what the result will be if he double-clicks or triple-clicks the variable shortcut key, but other multi-click changes and other interface-specified changes are not side-sliding changes. In an alternative embodiment, all interface-specified changes are side-sliding changes.

In an embodiment, when the interface displays a potential future version of a changeable block or a previous version of a changeable block in circumstances that are described below, such an alternate version of a changeable block will be displayed in a way that indicates what type of changeable block it is associated with; for example, in an embodiment where highlighted multi-click blocks are displayed with a light purple background, an alternate version of a multi-click block may be displayed with purple letters against a white background.

In an embodiment, when a side-sliding change is animated, rather than being animated in the ways described in Chapter 5, the new version of the changeable block will appear to the right of the changeable block with a small divider immediately to its left, and then it and the previous version of the changeable block will slide to the left so that the new version of the changeable block is in place, and then (except in circumstances that are described below) the previous version of the changeable block will disappear. In an embodiment, if other input is to the right or left of the changeable block, then the new version or previous version of the changeable block will not be visible in front of that input, but will instead be hidden behind it; for example, in an embodiment, if the middle word of "Yes its best" is a changeable block, and a side-sliding change replaces "its" with "it's," then "it's" will initially be hidden behind "best" and "its" will eventually be hidden behind "Yes", but the change will still be animated by sliding "its | it's" to the left, so at an intermediate point during the animation, the text may appear to say "Yes s | i best." In an embodiment, when the new version of the changeable block is to the right of its eventual location it will be diminished in size, and it will grow as it moves into place until it is the correct size, and the previous version of the changeable block will shrink as it moves to the left so that it is correspondingly diminished in size when it is to the left of its eventual location. If a block descriptor is visible for a side-sliding change, the change to the contents of the block descriptor will be animated the same way. In an embodiment, if the previous version of the changeable block is a different size than the new version of the changeable block and it is necessary to move other input accordingly, the movement of the other input will occur simultaneously with the side-sliding animation.

In an embodiment, after a side-sliding change that is an alteration or a multi-click change, until the user performs some other action, the previous version of the changeable block will not disappear (if it is visible and not hidden behind other input). Furthermore, in an embodiment, after a side-sliding change occurs, if the change has "potential future versions" as described in the present paragraph, then the interface will display a few such options to the right of the alterable block, each increasingly diminished in size, and separated by small dividers, if this would not obstruct the user's view of other input. In an embodiment, when a side-sliding change is an alteration such that the alterable decision has other alternate options that have not been selected yet, such options constitute potential future versions for purposes of the preceding sentence; in an embodiment, when a side-sliding change is a multi-click change such that immediately actuating the same multi-click key again would cause another multi-click change to occur, results that would obtain if the user continued to repeatedly actuate the same multi-click key constitute potential future versions for purposes of the preceding sentence. For example, in an embodiment, if a user has actuated a multi-click key twice, yielding the letter y, and if actuating the key three more times would yield z, then a, and then b, and if no text is to the right of the letter y so there is room to display potential future versions of the multi-click block, then the interface will display something like "y | z | a | b," with the letters diminishing in size so that the letter b is barely visible; actuating the multi-click key again will thus cause the row of letters to slide left and increase in size, and will cause the next letter in line to appear. This may make it easier for a user to quickly recognize how many times to multi-click a key in order to achieve a desired result.

In an embodiment, when a block descriptor appears for a side-sliding change, the block descriptor will extend to the right and/or to the left whenever doing so would be appropriate in order to make the block descriptor also include descriptions of potential future versions of the changeable block or previous versions of the changeable block. In an embodiment, when potential future versions for a changeable block would be visible as described in the preceding paragraph except that this would obstruct the user's view of other input, a block descriptor will appear for that changeable block so that descriptions of the potential future versions of the changeable block will be visible within the block descriptor. For example, if a user has actuated a multi-click key twice, yielding the letter y, but other input is to the right of the letter y so the interface will not display potential future versions for that multi-click block to the right of the letter y, then a block descriptor will appear above or below the letter y so that the interface can display potential future versions of the multi-click block without obstructing the user's view of the other input that is to the right of the letter y.

In an embodiment, after a side-sliding change has occurred, a user can reverse the change by touching the changeable block and sliding the touch to the right a little ways before releasing it, so as to essentially pull back into place the past version of the changeable block that had moved off to the left. Conversely, in an embodiment, if a potential change is a side-sliding change, a user may invoke the change by touching the changeable block and sliding the touch to the left a little ways before releasing it, so as to slide into place the potential future version of the changeable block. In an embodiment, such changes will visually be presented as though the user is actually sliding the changeable block: that is, for example, if a user touches a side-sliding changeable block and slides the touch to the left a little ways, the character the user is touching will remain directly beneath the point of contact and the entire contents of the changeable block will slide to the left while the user is sliding the touch to the left, as though the animated side-sliding change had begun to occur.

In an alternative embodiment, a user can invoke any interface-specified change as though it were a side-sliding change by touching the location of the change and sliding the touch to the left a little ways before releasing it. Similarly, in an alternative embodiment, a user can reverse any interface-specified change such that the changeable block is still highlighted after the change occurred as though it were a side-sliding change by touching the location of the change and sliding the touch to the right a little ways before releasing it.

In the above explanation of interface behaviors pertaining to side-sliding changes, future versions of side-sliding changeable blocks are said to be to the right, and past versions are said to be the left. It will be evident to those of ordinary skill in the art that similar behaviors can be implemented that are instead oriented in some other direction; for example, in an embodiment, when a side-sliding change is animated, the new version of the changeable block will appear above the changeable block and will move down into place.

Changeable Key Labels

In the following paragraphs, the present specification describes virtual keys whose labels are updated as necessary in order to indicate what change will occur if the key is actuated. It is to be understood that such virtual keys may be more advantageous in an embodiment with virtual keys that are large enough to legibly display a brief portion of text. For example, such virtual keys may be particularly advantageous in an embodiment that is a tablet computer, as opposed to an embodiment that is a smartphone with an extremely small virtual keyboard.

In an embodiment, the alteration key is a virtual key, or in certain circumstances an alteration key will appear that is a virtual key, and when possible, the text label of any such alteration virtual key will include a brief description of the option of the currently alterable interface decision that will become selected if the alteration key is actuated. For example, when actuating the alteration key would cause an answer to be displayed as a fraction instead of a decimal, the label of any alteration virtual key will if possible say "Alter to fraction." In an alternative embodiment, the text label of any alteration key will include a brief description of the currently selected option of the currently alterable decision, so for example, when actuating the alteration key would cause an answer to be displayed as a fraction instead of a decimal, the label of any alteration virtual key will if possible say "Alter decimal." In an embodiment, when actuating the alteration key would not cause a decision to be altered but would instead cause a decision to become the currently alterable decision or would cause the interface to scroll so that the alterable block of the currently alterable decision comes into view, the label of any alteration virtual key will say "View Next" or something similar.

In an embodiment, the Undo and Redo keys are virtual keys, and when possible, the text label of either virtual key will include a brief description of what will occur if the key is actuated; for example, in certain circumstances, the Undo key may say, "Undo typing."

In an embodiment, the space bar is a virtual key, and when an autocorrection is pending such that actuating the space bar would cause the autocorrection to occur, if possible, the text label of the virtual space bar will include a brief description of that autocorrection; for example, when pressing the space bar would cause the interface to automatically insert an apostrophe in the word "its," the space bar key may say, "it's space." In an embodiment, that brief description of the pending autocorrection will be highlighted in the same way that a highlighted autocorrection block is highlighted.

In an embodiment, when a virtual key includes additional explanatory text along with the name of the key as described in the preceding three paragraphs, the additional explanatory text will be in a smaller font then the name of the key itself.

In an embodiment, for any multi-click key that is a virtual key, whenever actuating the multi-click key would cause a special multi-click effect to occur, the multi-click key's appearance will be updated to indicate the effect that will occur if the key is actuated; for example, in an embodiment where double-clicking the $x^2$ key yields an exponent of 3, after a first actuation of that key, the key's label will change to $x^3$ until it is no longer the case that actuating the key would yield an exponent of 3.

Additional Alteration Indicators

Highlighting an alterable block will usually give a user sufficient information to know whether or not he wishes to alter that alterable decision: generally, a user will wish to alter a highlighted alterable decision if and only if the user is dissatisfied with the current state of the highlighted alterable block. Occasionally a user may not know the exact details of the change that will occur if he alters a highlighted alterable decision; for example, if a highlighted alterable decision is a multi-alternative decision, a user may not know which alternate option will become selected if he alters the decision. However, even when a user does not understand why a particular alterable block is highlighted or does not understand what will occur if he alters that decision, depending on the details of an embodiment, it may be quite easy to find out by simply altering the decision and then causing the decision to revert to its default option if desired. For that reason, in some embodiments, the additional alteration indicators that are described in the following paragraphs may be redundant.

However, if a user is controlling a computing device primarily via speech recognition functionality, then it may be advantageous for a user to have additional information about alterable decisions, because in an embodiment, as is described in Chapter 25, a user may be able to alter a decision by means of a verbal command stating the exact nature of the desired alteration. Therefore, in an embodiment, whenever a user makes use of speech recognition functionality, the interface will enter a "preview mode" as described in the following paragraph; the interface will exit preview mode when the user's most recent editing action was not by means of speech recognition functionality and at least a certain minimum amount of time has passed since the user made use of speech recognition functionality (such as, in an embodiment, at least one minute). In various alternative embodiments, the interface will ben in preview mode at all times regardless of whether a user has recently used speech recognition functionality, or the interface will never be in preview mode and thus will never behave as described in the following paragraph.

In an embodiment, while the interface is in preview mode, if any alterable decision has a probability of alteration that is above a certain previewing threshold, the interface will display a preview descriptor for each such alterable decision. In an embodiment, such a previewing threshold is rather high, so that the interface will display a preview descriptor only when it is reasonably likely that a user will wish to alter a decision. In an embodiment, once such a preview descriptor becomes visible, it will remain visible at least until either the user performs an action or a certain minimum length of time elapses, so that even if the probability of alteration of its associated alterable decision happens to immediately drop below the previewing threshold, the user may still have a chance to see what the preview descriptor says. In an alternative embodiment, when an alterable decision has a probability of alteration that is above a certain previewing threshold, the interface will display an entire alteration menu for that alterable decision.

In an alternative embodiment, a brief description of the currently selected option of the currently alterable decision will always be displayed at a certain location on the screen, such as in a fixed location on a status line. In another alternative embodiment, a brief description of the alternate option of the currently alterable interface decision that will become selected if the alteration key is actuated once will always be displayed at a certain location on the screen. In either case, this may help a user understand the nature of the change that will occur if the alteration key is actuated; for example, if an answer to a calculation is distinctively highlighted in such a way as to indicate that it is the alterable block of the currently alterable decision and the interface says "decimal" on the status line, this may help a user understand that actuating the alteration key will change the form of the answer.

Change Indicators in Perspective

As is mentioned in Chapter 5, interface behaviors that are described herein that pertain to interface-specified changes may be advantageous when applied to one particular type of interface-specified change, but may have an additional synergistic advantage when applied to multiple types of interface-specified changes. For example, it may be advantageous for a block descriptor to appear when an actuation of the Undo key causes an undo change to occur if the undo change is a subtle change, even in an embodiment that has no alteration functionality, but such behavior may be even more advantageous in an embodiment where block descriptors also appear for other types of interface-specified changes if they are subtle changes.

The interface behaviors that are described in the present chapter may be quite advantageous in certain circumstances, but depending on the details of an embodiment and depending on a user's behavior, such circumstances may not necessarily obtain very frequently. Even in an embodiment that behaves as described in the present chapter, it may be the case that most of the time no change flag is visible, even when the interface has made an alterable decision recently. Although the interface behaviors that are described in the present chapter may be quite advantageous in certain circumstances, an embodiment that does not include such interface behaviors may still have significant advantages over prior art.

Chapter 9: Additional Controls

Additional Alteration-Related Keys

In various embodiments, various keys that are referred to herein may have various labels. For example, an alteration key as described in Chapter 2 may be labeled "Alter" or may instead be labeled "Oops" or something else. A Yes key as described below may be labeled "Yes" or may instead be labeled "Okay" or something else. Various other possible labels for various keys will be evident to those of ordinary skill in the art.

The Yes key, the No key, and the Not That key that are described below are "alteration-cycle-related keys" for purposes of interface behaviors that are described in Chapter 2. Below, in each explanation of how the interface will respond to an actuation of one of these three alteration-cycle-related keys, it is assumed that a currently alterable decision exists when the key is actuated. In an embodiment, if a user actuates any of these three alteration-cycle-related keys when there is no currently alterable decision, then that key actuation will have no effect.

In the following paragraphs, when the interface is said to "explicitly select" an option of an alterable interface decision, this means that the interface selects that option, and that this counts as explicitly selecting that option (so, in an embodiment, the interface drastically decreases the decision's probability of alteration); additionally, after the interface "explicitly selects" any option of the currently alterable decision, the interface moves on to the next decision in the alteration cycle. (When the interface moves on to the next decision in the alteration cycle, this usually means that a new alterable decision becomes the currently alterable decision if possible; the interface behavior that constitutes "moving on to the next decision in the alteration cycle" is explained in more detail in Chapter 2.)

In an embodiment, the computing device has a Yes key such that when the Yes key is actuated, the interface explicitly selects whatever option of the currently alterable decision was already selected, and so the interface moves on to the next decision in the alteration cycle. When a user wishes to alter a particular alterable interface decision, such a Yes key will not necessarily enable the user to achieve any result that could not have been achieved by means of the alteration key, but may enable the user to achieve a desired result faster than the result could have been achieved by means of the alteration key alone. For example, in an embodiment, if a user wishes to alter a particular alterable decision when one other alterable decision is more relevant and is thus the currently alterable decision, then to achieve the desired result, the user may actuate the Yes key once to accept the currently selected outcome of the more relevant decision so that the less relevant decision becomes the currently alterable decision, and then actuate the alteration key once to alter the less relevant decision, for a total of two key actuations. To achieve the same result by means of the alteration key alone, the user would have to actuate the alteration key at least twice to complete review of the more relevant decision, and then actuate the alteration key once to alter the less relevant decision, for a total of at least three key actuations.

In an embodiment, as an exception, when the Yes key is actuated, if a multi-click block is highlighted, then actuating the Yes key does not cause the interface to explicitly select the currently selected option of the currently alterable decision. Instead, in such circumstances, actuating the Yes key has no effect other than to naturally cause the multi-click block to no longer be highlighted (because an immediately subsequent actuation of the relevant multi-click key would no longer constitute a consecutive actuation of that key). Thus, in such an embodiment, when a multi-click block is highlighted, a first actuation of the Yes key will cause that highlighted multi-click block to no longer be highlighted, and then if the user continues to consecutively actuate the Yes key, subsequent actuations of the Yes key may cause the interface to explicitly select options of alterable interface decisions, which may thus cause highlighted alterable blocks to no longer be highlighted.

In an embodiment, the computing device has a Yes to All key such that when the Yes to All key is actuated, the interface explicitly selects the currently selected option of every highlighted alterable decision. Thus, in an embodiment where alterable decisions are highlighted only when their probability of alteration is above a certain highlighting threshold, and where explicitly selecting an option of an alterable decision decreases its probability of alteration enough that it certainly will not be above the highlighting threshold, after a user actuates the Yes to All key, no alterable decisions will be highlighted. In an embodiment, actuating the Yes to All key while the interface is in alterable decision review mode will also cause the interface to exit alterable decision review mode. In an embodiment, the Yes to All key is not actually an independent key on a hardware keyboard, but is instead a key combination that is actuated by some particular means, such as, in an embodiment, by holding down a particular modifier key such as Ctrl while pressing the Yes key.

In an embodiment, the computing device has a No key such that when the No key is actuated, if the currently selected option of the currently alterable decision is not its default option, then the interface will explicitly select the default option of the currently alterable decision. In an embodiment, when the No key is actuated, if the currently selected option of the currently alterable decision is its default option, then that actuation of the No key will have no effect; in an alternative embodiment, when the No key is actuated, if the currently selected option of the currently alterable decision is its default option, then the interface will alter that decision as though the user had actuated the alteration key.

In an embodiment, when the Escape key is actuated, if the currently selected option of the currently alterable decision is not its default option, then the interface will explicitly select the default option of the currently alterable decision, and in other circumstances the Escape key may have its other usual effects. (In such an embodiment, the Escape key thus serves a similar purpose to the No key that is described in the preceding paragraph, so it may be redundant for such an embodiment to also have a No key.)

In an alternative embodiment, instead of or in addition to the No key that is described above, the computing device has a Not That key such that when the Not That key is actuated, if the currently selected option of the currently alterable decision is its default option, then the interface will alter that decision; if not, then the interface will first explicitly select the default option of the currently alterable decision (as though the user had actuated the No key as described above) and will then alter the new currently alterable decision if it is a different decision than the one whose default option the interface just explicitly selected. For example, in such an embodiment, if the interface has made two alterable decisions and a user actuates the alteration key but this does not alter the particular decision that the user intended to alter, the user may then be able to achieve the desired result by a single actuation of the Not That key, which will both undo the alteration of the decision that the user did not intend to alter and also alter the decision that the user did intend to alter.

In an alternative embodiment, when the Escape key is actuated, if this actuation does not yield some other effect that does not pertain to alteration functionality and if there is a currently alterable decision, then the interface will explicitly select the default option of the currently alterable decision, whether or not that option was already selected. In other words, in such an embodiment, the Escape key may cancel an alteration that just occurred in the same way as the No key described above, and also, whenever the default option of the currently alterable decision is selected, the Escape key may indicate acceptance of that option in the same way as the Yes key described above. Also, in an embodiment, when the Enter key is actuated, if there is a currently alterable decision and the currently selected option of that decision is not its default option, then the interface will explicitly select the currently selected option of that decision. In other words, in such an embodiment, whenever an alternate option of the currently alterable decision is selected, the Enter key may indicate acceptance of that option in the same way as the Yes key described above. An embodiment where the Escape key and the Enter key both function as described in the present paragraph may have advantages that are similar to the advantages of an embodiment that has a Yes key and a No key, without the need to add additional keys to the interface. However, such an embodiment also has the disadvantage that a user may sometimes need an additional keystroke in order to simply alter the currently alterable decision and resume working: in particular, if a user wishes to first alter the currently alterable decision by some means and then advance to the next line by means of pressing Enter, then an actuation of the alteration key followed by a single actuation of the Enter key will not achieve the desired result, because the interface will treat that actuation of the Enter key as an alteration-related action and so will not yet advance to the next line.

In an embodiment, the computing device has an Emphatic Alteration key, an Emphatic Yes key, and/or an Emphatic No key. In an embodiment, such "keys" are not actually independent keys on a hardware keyboard; for example, in an embodiment, holding down the Shift key or some other similar modifier key while pressing the alteration key, Yes key, or No key will cause that key to instead serve as the emphatic version of that key. In an embodiment, each such emphatic alteration-related key has the same effect as the non-emphatic version of the key, but also informs the interface that the user has an emphatic preference so that the interface can adapt its behavior in order to better suit the user's preference, as is described in Chapter 21.

Additional Undo-Related Keys

In an embodiment, the interface has various additional keys that enable a user to navigate through the history of actions in an undo buffer by various means. In particular, in an embodiment, the interface has an Undo Rewind key, a Redo Play key, and an Undo Stop key, When a user actuates the Undo Rewind key, the interface will enter "undo rewind mode," which means that it will undo one action at a time at a certain rate until the user performs some other action. When a user actuates the Redo Play key, the interface will enter "redo play mode," which means that it will redo one action at a time at a certain rate until the user performs some other action. The Undo Stop key will have no effect other than to cause the interface to exit undo rewind mode or redo play mode.

In an embodiment, while the interface is in undo rewind mode or redo play mode, the undo changes that occur are animated. In an embodiment, different changes may take different amounts of time to occur, so that for example if the interface undoes a single action that deleted a large portion of text, and so a large portion of text reappears, then the interface will take longer than usual before undoing the next action, so that the user has a little extra time to review what just happened.

In an embodiment, the speed at which the interface traverses actions while in undo rewind mode or redo play mode can be adjusted by some means. For example, in an embodiment, repeatedly actuating the Undo Rewind key will increase the speed at which the interface rewinds, until the interface reaches a certain maximum speed or the user performs some other action.

Additional Autocorrection-Related Keys

In an embodiment, when an autocorrection change or optional interpolation is pending, the Yes and No keys do not function as alteration-related keys as described above, but instead behave as described in the following paragraphs.

In an embodiment, when a user actuates the Yes key, if there is a pending autocorrection change or pending optional interpolation, then the interface will perform that autocorrection change or that interpolation immediately. In an embodiment, when a user actuates the right arrow key, if the input cursor is at the end of the user's input so the actuation of the right arrow key cannot have its usual effect of moving the input cursor one character to the right within the user's input, and if there is a pending autocorrection change or pending optional interpolation, then the interface will perform that autocorrection change or that optional interpolation immediately.

In an embodiment, when a user actuates the No key or the Escape key or the Delete key, if there is a pending autocorrection change or pending optional interpolation, then the interface will cancel that autocorrection change or optional interpolation so that it is no longer pending.

For example, in an embodiment, when a user has typed "tuesday" and has not yet pressed the space bar or any other key, pressing the space bar would trigger an autocorrection that would change "tuesday" to "Tuesday," so that particular autocorrection change is a pending autocorrection change. If the user does press the space bar, the interface will change "tuesday" to "Tuesday" and then append a space character. If instead the user presses the Yes key, the interface will change "tuesday" to "Tuesday" without appending a space character. If instead the user presses the No key, the interface will cancel that autocorrection change, so if the user then presses the space bar the interface will append a space character without changing "tuesday" to "Tuesday."

Situational Control Panels

In an embodiment, in certain circumstances the interface will display a "situational control panel" that includes controls that are particularly relevant in those circumstances. For example, after a user actuates the Undo key once, the interface may display an undo control panel that includes an Undo button; this may be especially advantageous on a smartphone or other computing device where an Undo key actuation ordinarily takes longer than most other key actuations.

In an embodiment, situational control panels will have a standard location, so that for example the location where an alteration control panel is sometimes visible is the same location where an undo control panel is sometimes visible. In an embodiment, this location is a location where an autocorrection bar is sometimes visible, such as immediately above a virtual keyboard. In an alternative embodiment, this location is at the very top or very bottom of the screen. In another alternative embodiment, this location is a touch bar virtual keyboard zone at the top of a hardware keyboard. Other possible locations for situational control panels will be evident to those of ordinary skill in the art.

In an embodiment, a situational control panel will have a small X on its right edge such that touching or clicking this X will cause the situational control panel to disappear.

In an embodiment, a situational control panel may have near its right edge a right arrow or other button such that touching or clicking the button will cause the interface to scroll the situational control panel so that different buttons come into view; if this happens, then a left arrow or other button will appear on the left edge to enable scrolling back to the set of buttons that were originally in view.

In an embodiment, when the interface enters alterable decision review mode, the interface will display an "alteration control panel" that is a situational control panel that includes one or more virtual alteration-related buttons that a user can click or touch. In an embodiment, such buttons include the alteration key, No key, Yes key, Yes to All key, and Emphatic Yes key. In an embodiment, when the interface exits alterable decision review mode, such a situational control panel will disappear. For example, in an embodiment, if a user is extremely displeased by the outcome of a particular interface decision, and that decision is the only highlighted alterable decision, the user can cause the interface to enter alterable decision review mode, then press the alteration key, and then press the Emphatic Yes key upon arriving at the desired result.

In an embodiment, when the user's last action was an actuation of the Undo key or Redo key or any other key pertaining to undo functionality, the interface will display an "undo control panel" that is a situational control panel that includes one or more virtual undo-related buttons. In an embodiment, such buttons include the Undo key, Redo key, Undo Rewind key, Redo Play key, and Undo Stop key. In an embodiment, to save space, such keys are labeled with appropriate icons instead of words. In an embodiment, when the user performs any action that does not pertain to undo functionality, such a situational control panel will disappear.

Figure 7A:
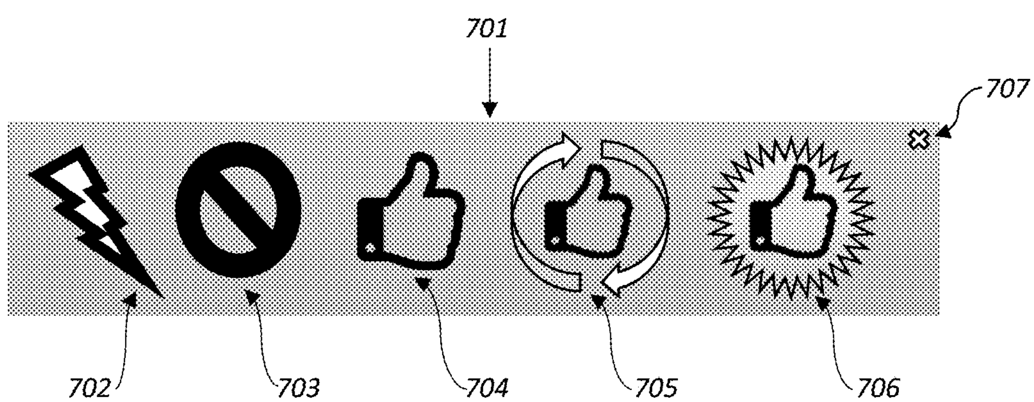
FIG. 7A illustrates an example of an alteration control panel.
Figure 7B:
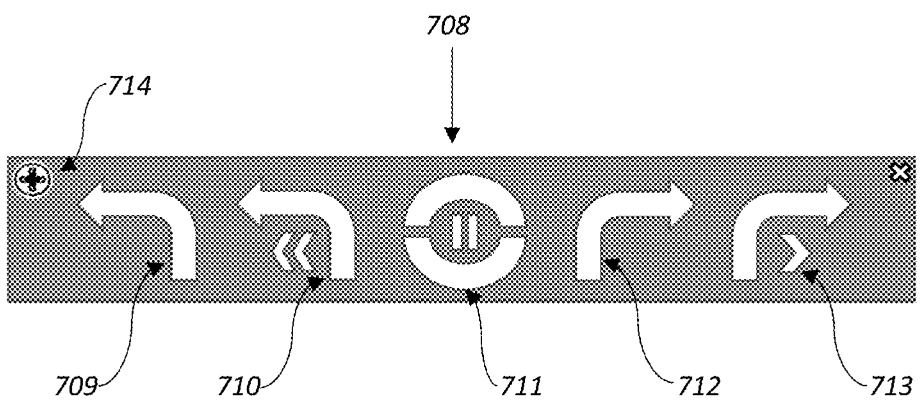
FIG. 7B illustrates an example of an undo control panel.

FIG. 7A shows an alteration control panel (701) with buttons that use icons instead of words to indicate their functions, including an alteration key button (702), a No button (703), a Yes button (704), a Yes to All button (705), and an Emphatic Yes button (706), along with an X (707) in the upper right corner for closing the alteration control panel. FIG. 7B shows an undo control panel (708) featuring an Undo button (709), an Undo Rewind button (710), an Undo Stop button (711), a Redo button (712), a Redo Play button (713), and an Undo Scope button (714) which is explained in Chapter 11.

Quick Alteration Buttons

In an embodiment, in certain circumstances the interface will display one or more "quick alteration buttons," where each such button contains a description of an alternate option of an alterable interface decision, and pressing the button will cause the interface to explicitly select that option. Such a quick alteration button is thus very similar to a preview descriptor as described in Chapter 8, with the distinction that a preview descriptor will appear near the relevant alterable block when possible, whereas a quick alteration button will appear in a standard location, as is explained in the following paragraphs.

In an embodiment, when the interface displays quick alteration buttons that pertain to more than one highlighted alterable interface decision, the interface will not highlight all highlighted alterable blocks the same color, but will instead highlight each highlighted alterable block that is associated with a quick alteration button a different color, and will highlight each quick alteration button the same color as its associated highlighted alterable block, so that a user can discern what portion of input each quick alteration button pertains to by finding the portion of input that is highlighted the same color as the button.

In an embodiment, when quick alteration buttons pertaining to multiple alterable decisions are displayed in the same row of buttons, the quick alteration buttons will be arranged from right to left with buttons that pertain to more relevant alterable decisions on the right and buttons that pertain to less relevant alterable decisions on the left. For example, in an embodiment, if the interface has made two alterable decisions, including an alterable decision with the alternate option "its" that has a high probability of alteration and including an alterable decision with the alternate option "tuesday" that has a low probability of alteration, then if a quick alteration button for each of these decisions is displayed in the same row of buttons, the "its" button will be displayed to the right of the "tuesday" button.

In an embodiment, whenever an alteration control panel as described above is visible, in addition to buttons such as the alteration key, No key, and so forth, the alteration control panel will include quick alteration buttons for some or all alternate options of highlighted alterable decisions, if any highlighted alterable decisions exist. (If the alteration control panel is scrollable, it may include indefinitely many quick alteration buttons.)

In an embodiment, whenever a highlighted alterable decision exists, a certain region of the display of the computing device will have one or more quick alteration buttons if sufficient space is available in that region. In particular, in an embodiment, if the computing device has a hardware keyboard that has a touch bar virtual keyboard zone at the top, then whenever a highlighted alterable decision exists, this touch bar will include one or more quick alteration buttons, unless the touch bar does not have room available (such as because it is already full of other virtual keys).

Quick alteration buttons as described above may be advantageous in certain circumstances even in an embodiment that has other means of quickly altering alterable interface decisions. However, because it may be extremely advantageous for a user to be able to alter an alterable decision by means of a single quick action, quick alteration buttons may be especially desirable in an embodiment that lacks other means of quickly altering alterable interface decisions.

Currently Alterable Decision Highlight Navigation

In an embodiment, while a user holds down the alteration key, the interface will enter alterable decision review mode at least until the user is no longer holding down the alteration key, so that a user can more easily see what decisions are alterable.

In an embodiment, when the currently alterable decision is highlighted distinctively, pressing an arrow key while holding down the alteration key may cause the interface to change which decision is the currently alterable decision. In particular, in an embodiment, in such circumstances, pressing the left arrow key while holding down the alteration key will cause the interface to find the alterable decision with an alterable block that precedes the alterable block of the currently alterable decision and is as near as possible to the alterable block of the currently alterable decision, and make that decision be the currently alterable decision; pressing the right arrow key while holding down the alteration key will cause the interface to find the nearest alterable decision that is after the currently alterable decision, and make that decision be the currently alterable decision; pressing the up arrow key while holding down the alteration key will have the same effect as pressing the left arrow key, except that it will skip any alterable decision whose alterable block is on the same line of input as the currently alterable decision; and pressing the down arrow key while holding down the alteration key will have the same effect as pressing the right arrow key, except that it will skip any alterable decision whose alterable block is on the same line of input as the currently alterable decision. In an embodiment, pressing an arrow key while holding down the alteration key will have no effect if it cannot have the effect described in the preceding sentence; for example, when there are no alterable decisions with alterable blocks that are after the alterable block of the currently alterable decision, pressing the right arrow key or down arrow key while holding down the alteration key will have no effect.

The interface behavior described in the preceding paragraph may be particularly desirable in an embodiment such as a graphing calculator that does not have a mouse or touch screen, because it enables a user to select a specific alterable decision to alter without clicking or touching an alterable block.

Alteration Hotkeys

In an embodiment, one or more specific types of alterable interface decisions may be individually assigned specific alteration hotkeys, so that actuating such an alteration hotkey will cause the interface to alter an alterable interface decision of that particular type, if such an alterable interface decision exists. Such a hotkey may be a key combination. For example, in an embodiment, holding down the alteration key and then pressing the period key while the alteration key is held down will cause the interface to alter an alterable decision regarding whether or not to display a number in decimal form.

In an embodiment, one or more specific types of alterable interface decisions may be "hotkey-exclusive alterable decisions," where a hotkey-exclusive alterable decision is an alterable decision that can only be altered by means of actuating an alteration hotkey, and thus cannot be altered by means of actuating the alteration key alone or by other ordinary means of altering interface decisions. One particular type of hotkey-exclusive alterable decision is described farther below.

Chapter 10: Alterable Widgets and Alterlinks

Fixture Alterable Decisions

It may be advantageous for alteration functionality, such as the alteration key, to serve a purpose even when a user is not editing input or editing a document. If a user knows how to use alteration functionality to modify interface decisions when entering input or editing a document, then it may be intuitive for the user to similarly use alteration functionality to modify other things in other circumstances.

In an embodiment, in certain circumstances alteration functionality may be used to manipulate certain control elements that typically appear in dialog boxes. In an embodiment, in certain circumstances alteration functionality may be used to alter decisions pertaining to webpages or similar output. Certain such interface behaviors are described in detail below.

In an embodiment, certain alterable decisions are "fixture alterable decisions" as described below. Generally, it may be advantageous for a control element within a dialog box to be a fixture alterable decision when the control element is a multiple-choice type of control element. Similarly, it may be advantageous for a portion of output within a webpage to be a fixture alterable decision in situations where the user can select among two or more options for that portion of output.

(Actually, in order to be entirely consistent in terminology, rather than saying that a control element is a fixture alterable decision, it would be more accurate to say that the interface setting that is controlled by that control element is the fixture alterable decision and then to refer to the control element itself as the alterable block of that fixture alterable decision. Likewise, rather than saying that a clickable portion of output is a fixture alterable decision, it would be more accurate to say that whatever setting changes when that portion of output is clicked is the fixture alterable decision and then to refer to the portion of output itself as the alterable block of that fixture alterable decision. Nevertheless, for the sake of brevity, the following discussion of fixture alterable decisions will refer to control elements and portions of output as fixture alterable decisions, and will generally not make any reference to the settings that are controlled by such fixture alterable decisions.)

In an embodiment, when a fixture alterable decision is visible, for purposes of determining the comparative relevance of alterable decisions, a fixture alterable decision is less relevant than any alterable interface decision that has the same probability of alteration and is not a fixture alterable decision. For purposes of determining the comparative relevance of alterable decisions, if two fixture alterable decisions in the same window have the same probability of alteration, the one that is closer to the beginning of the window is more relevant. (Of course, in an embodiment, an application developer or webpage creator who creates a dialog box or webpage can choose to customize the probability of alteration of any fixture alterable decisions in the dialog box or webpage so that if a user navigates through the fixture alterable decisions in a sequence from the most relevant to the least relevant, then the decisions in that sequence will be in an order that the application developer or webpage creator chose; however, it may often be advantageous to simply assign them all the same probability of alteration, so that the sequence will begin with the fixture alterable decision that is closest to the beginning of the dialog box or webpage and proceed from there.)

In an embodiment, regardless of its probability of alteration, a fixture alterable decision will not be highlighted until it is the currently alterable decision. In an embodiment, the probability of alteration of a fixture alterable decision will not decrease until the user interacts with it in some way, such as by altering the decision. (If a user enters input and the interface makes an alterable decision regarding the input, or if a user causes the interface to display a small amount of output and the interface makes an alterable decision regarding the output, then it is reasonable to expect the user to be willing to pay immediate attention to the outcome of this decision; accordingly, in an embodiment, the interface will highlight certain alterable interface decisions as soon as they exist, as is described in Chapter 5. However, when an interface displays a dialog box or webpage, it may not be reasonable to expect the user to pay immediate attention to any particular fixture alterable decision within the dialog box or webpage, because the dialog box or webpage may contain a lot of information.)

In an embodiment, fixture alterable decisions are displayed in a distinctive way in order to indicate that they are alterable decisions even when they are not highlighted alterable decisions. For example, in an embodiment, highlighted alterable decisions are displayed with a light green background, and fixture alterable decisions are displayed with green foreground text even when they are not highlighted.

Alterable Widgets

In an embodiment, one or more graphical user interface control elements that are inherently multiple-choice control elements are treated as fixture alterable decisions, so that a user can manipulate such control elements by means of the alteration key or other alteration functionality. Certain types of control elements that can be made to constitute fixture alterable decisions are specifically enumerated in the following paragraphs. In particular, in an embodiment, the operating system of the computing device is configured so that whenever an application invokes the interface functionality of the operating system in such a way as to cause the operating system to be responsible for the display and operation of any of the control elements enumerated below, the interface functionality of the operating system will by default cause such control elements to be fixture alterable decisions as described below. Various alternative embodiments will be obvious to those of ordinary skill in the art; for example, in an alternative embodiment, one particular application is configured so that one particular radio button group within the application is a fixture alterable decision as described below.

In an embodiment, a checkbox may be a fixture alterable decision such that altering the decision will toggle the checkmark.

In an embodiment, a radio button group may be a fixture alterable decision with one option per radio button, so that altering the decision will cause the interface to appropriately change which radio button is selected; if the radio button group has more than two radio buttons, then repeatedly altering the decision will cause the interface to cycle through the radio buttons.

In an embodiment, a list box may be a fixture alterable decision with one option per list option, or a drop-down list that does not allow a user to simultaneously select multiple options from the list may be a fixture alterable decision with one option per list option, and in either case altering the decision will cause the interface to appropriately change which list option is selected; if the list has more than two options, then repeatedly altering the decision will cause the interface to cycle through the options.

In an embodiment, a combo box may constitute a fixture alterable decision. Per Wikipedia, a combo box "is a combination of a drop-down list or list box and a single-line editable textbox, allowing the user to either type a value directly or select a value from the list." When a combo box is a fixture alterable decision, it will operate the same way as a drop-down list or list box that is a fixture alterable decision except that in order to permit a user to input a value that is not present in the list, one of its alternate options will be an undefined option. (Undefined options are explained in Chapter 15.)

Causing graphical user interface control elements to be fixture alterable decisions may facilitate manipulation of such controls by means of the keyboard. It is already possible in prior art interfaces to manipulate such controls by means of keys such as Tab, Enter, and the arrow keys, but some users are not entirely certain how such keys work. By contrast, if a user becomes familiar with the alteration key and the Yes key when interacting with alterable decisions that are not fixture alterable decisions, then when the user encounters fixture alterable decisions, it may be fairly obvious to the user that pressing the Yes key will cause the next fixture alterable decision to become the currently alterable decision, and pressing the alteration key will cycle through the various options of the currently alterable decision until the user has completed review of that decision.

Additionally, in an embodiment that has alterlinks as described below, it will be possible for the interface designer to replace any of the above-listed interface control elements with an alterlink, at the interface designer's discretion. An alterlink is a multiple-choice control element that looks simpler and takes up less space than any of the above-listed control elements, so using alterlinks in lieu of other control elements may reduce visual clutter. Once a user becomes accustomed to alterlinks, they may be as easy to manipulate as other control elements.

Alterlinks

In an embodiment, in certain circumstances the interface will display an "alterlink," where an alterlink is a graphical user interface control element that consists of a portion of text that is a fixture alterable decision, so that altering the decision will change whatever is described by the text, and will accordingly change the text itself. An alterlink can thus be altered by means of alteration functionality, such as by means of actuating the alteration key or clicking the alterlink. For example, in an embodiment, one or more dialog boxes will include alterlinks.

In an embodiment, touching or clicking an alterlink will cause the interface to alter the alterlink, regardless of whether or not the embodiment has the touch alteration feature for purposes of alterable decisions that are not alterlinks.

In an embodiment, an alterlink is by default displayed as green underlined text. In an embodiment, as an exception, in a web browser that displays hyperlinks in webpages as blue non-underlined text by default, alterlinks in webpages are displayed as green non-underlined text by default.

Due to the consistent use of hyperlinks in prior art, users have come to recognize that clicking blue underlined text will cause an interface to display additional information (such as a webpage) that pertains to the blue underlined text, or to do something else that is explicitly explained within or near the blue underlined text. In prior art, it is reasonably common to see a plain text explanation of an assumption, along with an explanation of the fact that a user can click a particular hyperlink in order to change the assumption.

If an interface designer uses alterlinks consistently, then users may come to recognize that clicking green underlined text will cause the interface to change an assumption pertaining to the green underlined text, with no need for additional explanation. Alterlinks may thus be useful as a compact way of indicating that a particular interface assumption can be changed. For example, if a Print dialog box says "Print pages in forward order" and the word "forward" is an alterlink, then an experienced user may understand that clicking the alterlink will change the order in which pages are printed (and will accordingly change the word "forward" to the word "reverse"). If an alterlink on a webpage says "Spoilers hidden," then an experienced user may understand that clicking the alterlink will cause spoilers to be revealed. If an alterlink says "24.1 miles," then an experienced user may understand that clicking the alterlink will cause the distance to be converted to kilometers. If an online encyclopedia has an article with the title "Arnold Palmer (golfer)" and the word "golfer" is an alterlink, then an experienced user may understand that clicking the alterlink will cause the article that is visible to be replaced by a different article that is about an Arnold Palmer other than the golfer.

Web Page Deployment

In an embodiment, the interface enables browsing of webpages that may include alterlinks. That is, in an embodiment, the interface can receive data regarding the content of webpages and accordingly display the webpages, and if such data includes information that explicitly indicates that a certain portion of the content should be displayed as an alterlink, then the interface will accordingly create an alterlink that the user may interact with by means of alteration functionality, as described above. In an embodiment, the interface also enables browsing of webpages that may include other graphical user interface control elements that are fixture alterable decisions, such as those that are described above.

Webpages are generally written in HTML. As of this writing, the latest standard that defines HTML is HTML5. HTML5 is sufficiently flexible to include custom data in order to convey customized information to web browsers. In particular, an HTML5 webpage can include sufficient information to notify a browser interface that a particular control element is to be treated as a fixture alterable decision, and can convey this information in such a way that any browser interface that is not configured to understand such information will simply display the control element as some type of prior art control element instead. Such an HTML5 webpage will thus have the same functionality whether or not a user views the webpage in a browser interface that has the fixture alterable decisions feature as described above, but will have a potentially superior interface for such functionality when viewed in a browser interface that does include that feature.

When creating a webpage that includes fixture alterable decisions when displayed in a browser interface that has the fixture alterable decisions feature, it may be desirable to ensure that if a user alters a fixture alterable decision that is an alterlink, if altering this decision causes the browser to reload the current webpage, or if altering this decision causes the browser to load a different webpage, then the browser interface will be able to identify the same fixture alterable decision on the newly loaded webpage, so that consecutive actuations of the alteration key can cause the interface to cycle through the alternate options of such a fixture alterable decision and then cycle back to the default option. For example, if an online encyclopedia has an article with the title “Arnold Palmer (golfer)” with the word in parentheses as an alterlink, and if altering that particular alterlink by means of the alteration key causes a browser to instead load an article with the title “Arnold Palmer (drink)” with the word in parentheses as an alterlink, then it may be desirable for the underlying metadata regarding such alterlinks to include sufficient identifying information that the interface can recognize that these two alterlinks on different pages correspond to one another and thus are to be treated as alternate options of a single fixture alterable decision. Those of ordinary skill in the art will understand various ways to do this; for example, in an embodiment, any HTML element that is to be treated as an alterlink will include some type of ID (such as an arbitrary large number), and each such ID will be unique except that alterlinks that are distinct alternate options of the same fixture alterable decision will have the same ID, so that if two distinct pages have alterlinks with the same ID then the interface will recognize that these are alternate options of a single fixture alterable decision.

Alterable Widgets and Alterlinks in Perspective

Generally, various types of alterable decisions have a potential synergy with one another in that a user who has had experience with one type of alterable decision is more likely to understand how to interact with another type of alterable decision. For example, if a user knows how to use alteration functionality to modify interface decisions when entering input or editing a document, then it may be intuitive for the user to similarly use alteration functionality to modify other things in other circumstances. Therefore, fixture alterable decisions as described in the present chapter may be especially advantageous in an embodiment that has other types of alterable decisions as described in other chapters. However, it may be advantageous for an embodiment to have fixture alterable decisions, including alterable widgets or alterlinks or both, even if the embodiment does not have any other types of alterable decisions.

Chapter 11: Enhanced Undo Functionality

Decision-Triggering Input

In various circumstances, when a user enters certain input, the newly entered input may trigger an interface decision regarding a previously typed section of input that does not include the newly entered input. For example, in certain prior art interfaces, when a user enters a space character, the space character may trigger an interface decision regarding the word preceding the space character: the interface may decide whether or not to autocorrect or automatically format that word, without making any decision about the space character itself. As another example, on a prior art iPhone, when a user enters a space character that is immediately after another space character, the second consecutive space character may trigger an interface decision to replace the first consecutive space character with a period, without modifying the second space character. As another example, in an embodiment of the present invention that is explained in detail in Chapter 48, typing a plus sign may trigger an interface decision regarding a trigonometric operand preceding the plus sign. In the present specification, when newly entered input triggers an alterable interface decision regarding a previously typed section of input that does not include the newly entered input, such newly entered input will be referred to as “decision-triggering input” for that decision.

Undoing Interface Interventions

In the present specification, an “interface intervention” is an interface decision to change a user’s input from what was actually typed by applying an autocorrection or automatic formatting action or some other action that a typical user will perceive as initiated by the interface (in the judgment of the interface designer).

In various prior art interfaces, including Microsoft Word, any change to the user’s input that is caused by autocorrection or automatic formatting is saved as a distinct action in the undo buffer, so if a single user keystroke causes some input to be entered and also triggers exactly one such interface intervention, then two distinct actions will be saved in the undo buffer in response to that single keystroke. In such an interface, it is thus possible in many cases to recover from an undesired interface intervention by means of undo functionality: after a user keystroke that yields an intended effect but also triggers one undesired interface intervention, if the user then immediately presses the Undo key once, then this will undo the undesired interface intervention without undoing the intended effect.

In the present specification, an "alterable interface intervention" is an alterable decision whether or not to perform an interface intervention. The "non-intervention option" of an alterable interface intervention is the option that consists of leaving the user's input exactly as it was typed.

Farther below, the present specification will describe various types of alterable interface interventions that are not traditional autocorrections or automatic formatting actions, but these will not be explicitly identified as alterable interface interventions; it will simply be clear that they fit the above definition of alterable interface interventions. For example, an alterable interface decision to automatically insert a degree symbol after a trigonometric operand is an alterable interface intervention.

In an embodiment, for purposes of the following paragraphs, a "significant interface intervention" is an alterable interface intervention that does not currently have its non-intervention option selected, and that has a probability of alteration that is above a certain "undoable intervention probability threshold" (also referred to as an "undoable intervention threshold"). FIG. 8B is a flowchart that illustrates the decision-making process for determining whether an interface intervention is significant. The process includes a series of four questions. In each case, if the answer to the question is no, then it is not a significant interface intervention (Block 820). If the answer is yes, the process continues with the next question until all questions have been answered. Specifically, Block 815 asks, "Is it an interface intervention?" Block 816 asks, "Is it alterable?" Block 817 asks, "Is the currently selected option NOT the non-intervention option?" Block 818 asks, "Is its probability of alteration above the undoable intervention probability threshold?" If the answer to all four questions is yes, then it is a significant interface intervention (Block 819).

In an embodiment, the undoable intervention probability threshold is initially set to a certain default value, and each time that a user performs an Undo action that has a low deliberation score, the undoable intervention threshold increases slightly, but as soon as the user performs any other action, before the action is applied, the undoable intervention threshold is reset to its default value. In an embodiment, the default value of the undoable intervention threshold is low, but not very low. In an alternative embodiment, a "significant interface intervention" is any alterable interface intervention that does not currently have its non-intervention option selected, regardless of its probability of alteration.

In an embodiment, when a user invokes an Undo action, if the user action that would be undone was decision-triggering input for at least one significant interface intervention, the interface will undo only the most relevant such significant interface intervention, which thus causes the non-intervention option of that intervention to become selected. If the user action that would be undone was decision-triggering input for one or more alterable interface interventions, but none of those interface interventions are currently significant interface interventions as defined above, then the interface will undo that user action with all its consequences, including all those alterable interface interventions. For example, in an embodiment, if a user types the word tuesday in lowercase letters and then types a space character, and typing the space character triggers an interface decision to automatically capitalize the word tuesday, and the user then actuates the Undo key once, then rather than undoing the entire effect of the most recent user action, the interface will only undo its decision to capitalize the word tuesday; if the user then actuates the Undo key again, the interface will undo the entry of the space character. However, in an embodiment, if a user typed the word tuesday followed by a space character followed by lots of additional text, and typing that space character triggered an interface decision to automatically capitalize the word tuesday, then if the user repeatedly actuates the Undo key quite rapidly sufficiently many times to undo everything that was typed after the word tuesday, and the user does not pause at all before undoing the entry of the space character after the word tuesday, then by the time the user undoes the entry of that space character the undoable intervention threshold will be very high, and so both the entry of that space character and the automatic capitalization of the preceding word will be undone by a single actuation of the Undo key.

In an embodiment, after an Undo action causes the interface to undo only a single significant interface intervention as described above, then if the user's very next action is a Redo action, then in addition to reversing the effect of the Undo action, this Redo action will cause the interface to consider the user to have completed review of that alterable interface intervention, and so the interface will drastically decrease that decision's probability of alteration. In such an embodiment, if a single user action constitutes decision-triggering input for more than one alterable interface intervention, and the user then consecutively actuates Undo, then Redo, and then Undo again, then the second actuation of the Undo key may alter a different alterable interface intervention than the first one did.

In an embodiment, after an Undo action causes the interface to undo a user action that was decision-triggering input for one or more alterable interface interventions, if the same Undo action also caused the interface to undo at least one alterable interface intervention that did not have its non-intervention option selected prior to the Undo action but that was not a significant interface intervention (because it had a probability of alteration that was below the undoable intervention threshold), then if the user's very next action is a Redo action, then in addition to reversing the effect of the Undo action, this Redo action will cause the interface to substantially increase the probability of alteration of every such alterable interface intervention.

Figure 8A:
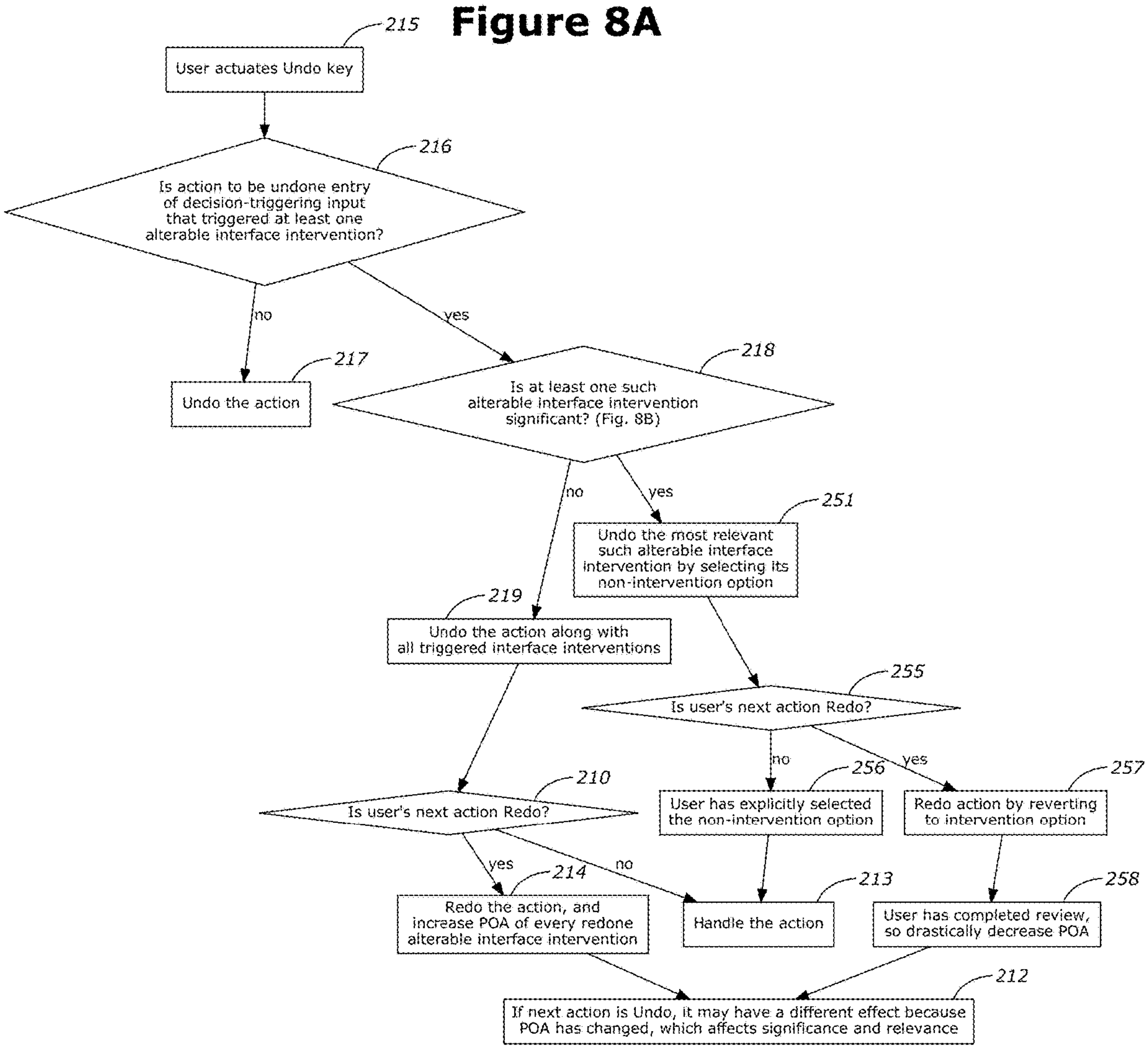
FIG. 8A is a flowchart that illustrates an example method for undo functionality.
Figure 8B:
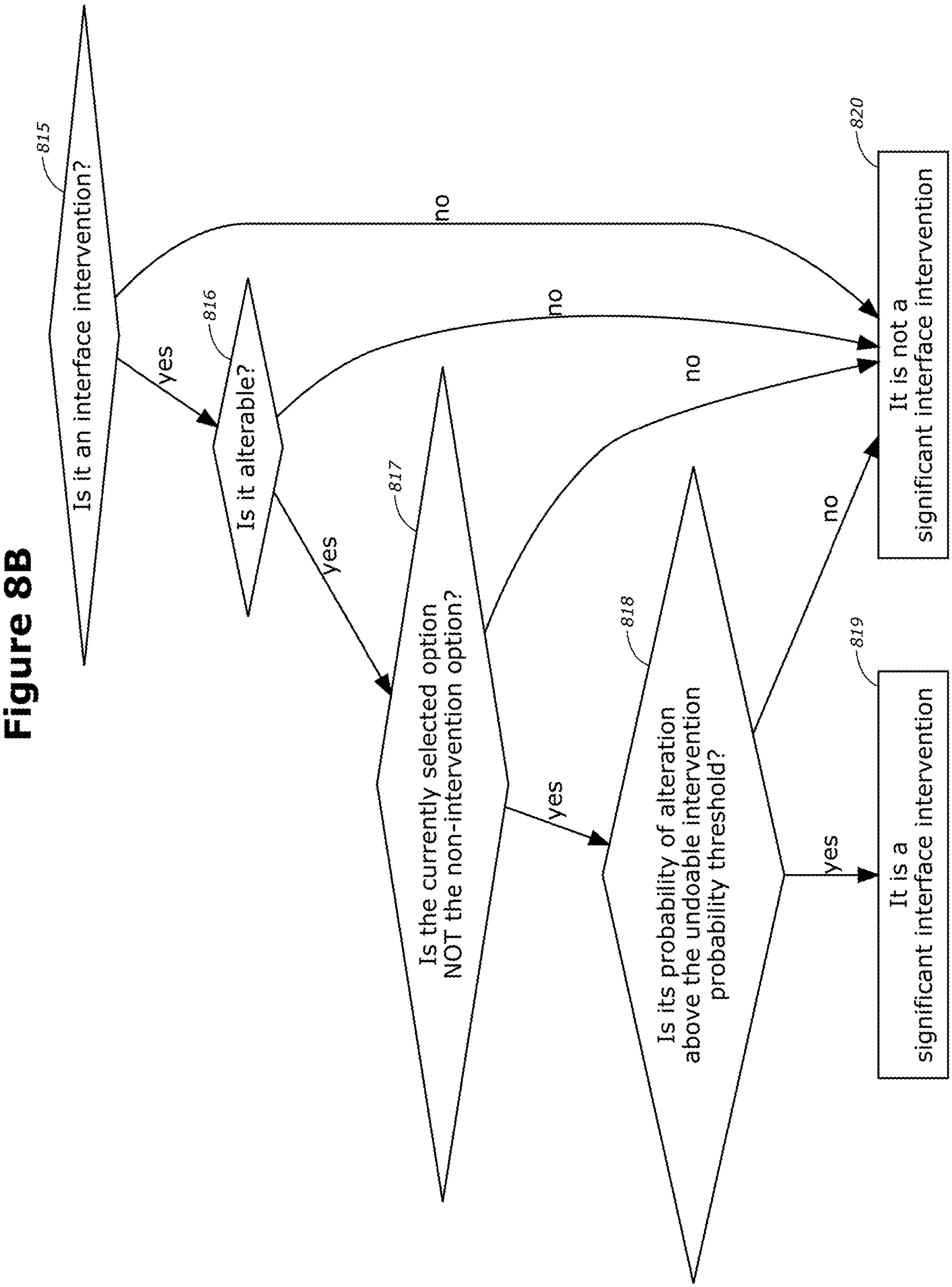
FIG. 8B is a flowchart that illustrates an example decision-making process for determining whether an interface intervention is significant.

FIG. 8A illustrates an algorithm that behaves as described above. At Block 801, the user actuates the Undo key. If the action to be undone is not entry of decision-triggering input that triggered at least one alterable interface intervention (Block 802), then the Undo key will simply cause the interface to undo one editing action as normal (Block 803). If the action is entry of decision-triggering input that triggered an alterable interface intervention (Block 802), then the interface will check whether at least one such alterable interface intervention is a significant interface intervention (Block 804). If no such alterable interface intervention is significant, then the interface will undo the action along with all the interface interventions that the undone action triggered (Block 805). However, subsequently, if the user's next action is an actuation of the Redo key (Block 806), then the interface will not only redo the action along with all the interface interventions that the action triggered but also increase the probability of alteration of all such alterable interface interventions (Block 807), so if after that the user again performs an Undo action then it may have a different effect (Block 808): because the probabilities of alteration were increased, one of those alterable interventions may now be a significant interface intervention.

Continuing the explanation of FIG. 8A, if the user performs an undo action that would undo entry of decision-triggering input that triggered at least one alterable interface intervention that is a significant interface intervention, then the interface will proceed from Block 804 to Block 810. The interface will then not undo the entry of the decision-triggering input, but will instead undo the most relevant significant interface intervention that it triggered by selecting the intervention's non-intervention option. If the user's next action is anything other than an actuation of the Redo key, then the interface will regard the user as having explicitly selected that non-intervention option (Block 812). However, if the user's next action is an actuation of the Redo key (Block 812), then the interface will not only redo that interface intervention (Block 813) but will also consider the user to have completed review of that alterable decision and so will drastically decrease its probability of alteration (Block 814), so if after that the user again performs an Undo action then it may have a different effect (Block 808): because that decision's probability of alteration was decreased, it may no longer be a significant interface intervention.

In an embodiment, after an Undo action causes the interface to undo only a single significant interface intervention as described above, when the user next performs an action that does not pertain to undo functionality, if that alterable interface intervention still exists and its non-intervention option is still selected, then the interface will consider the user to have explicitly selected that option of the decision, so for purposes of the interface adaptation functionality that is described in Part II, the previous outcome of the decision will be considered to have been a non-beneficial outcome.

The interface behavior described above often yields the same results that prior art would yield, but may have advantages over prior art in some circumstances. For example, in an embodiment, if a user intends to type "tuesday" in slanted quotes in lowercase letters, but finds that typing the closing quotation mark triggers both the automatic capitalization of the word tuesday and the automatic conversion of the closing quotation mark from a straight quote to a slanted quote, then the user will be able to achieve the desired result by means of a single Undo action if the automatic capitalization interface intervention has a higher probability of alteration than the automatic conversion of the closing quotation mark, or by means of the keystroke sequence Undo-Redo-Undo otherwise. By contrast, in a prior art interface if typing a closing quotation mark triggers both the automatic capitalization of the word tuesday and the automatic conversion of the closing quotation mark, then it may not be possible by means of undo functionality to undo the automatic capitalization without also undoing the automatic conversion of the quotation mark. (In fact, for this very reason the present writer has found it to be inconveniently difficult in a prior art interface to type "tuesday" in slanted quotes on many occasions, including while typing the present paragraph.) Also, in an embodiment, a user who wishes to undo everything that occurred since a certain point may be able to achieve this result more rapidly than in prior art, because the interface will not necessarily treat every interface intervention as a distinct undoable event; it is not especially important for the interface to treat every interface intervention as a distinct undoable event in an embodiment where a user can typically correct an undesired interface intervention faster by altering it rather than undoing it.

In an embodiment, as a means of implementing interface behaviors that are described above, when a user action constitutes decision-triggering input for one or more alterable interface interventions, the user action and all resulting interface interventions will be separated into distinct undoable events for purposes of undo functionality, and each distinct undoable event within such a group will be distinctively marked as belonging to this group. Whenever a single Undo action would cause the interface to undo the next distinct undoable event, if the next event that the interface would undo is an event from such a group, then the interface will look ahead at any subsequent undoable events that belong to the same group. Depending on what is necessary to yield the result that conforms to the interface behaviors that are described above, the interface will then either undo the next event as normal, or rearrange the sequence of the undoable events in that group so the next event is a different interface intervention that is more relevant and undo that event instead, or undo all the remaining undoable events in that group. Other means of implementing the interface behaviors that are described above will be evident to those of ordinary skill in the art; for example, when a user action constitutes decision-triggering input for one or more alterable interface interventions, the interface may record the action with all its results as a single undoable event in the undo buffer, and then when such an event would be undone, the interface will determine whether to instead separate that single event into distinct component events and undo only one of those component events.

The interface behaviors described in the present section may be advantageous as an enhancement to undo functionality even in an embodiment that does not have functionality that highlights alterable decisions or facilitates altering them, but may be more advantageous in an embodiment that has such functionality.

Selectable Undo Scope

In an embodiment, the interface has a "current undo scope," which is a setting that restricts the nature of the changes that may occur when the user invokes an Undo action. In an embodiment, the current undo scope may be set to either make undo changes to only the current document, or make undo changes to the current application, or make undo changes to the entire computing device. Certain additional undo scope settings and other related settings are described below.

In an embodiment, the user may by some means access controls to set the undo scope as desired. For example, if a user holds down the Undo key for more than a certain length of time, then the interface will bring up an Undo Scope dialog box that will include options by which the user can set the undo scope. In an embodiment, when an undo control panel appears, it will include a Scope button such that actuating the button will bring up such an Undo Scope dialog box.

In an embodiment, when the current undo scope is set to make undo changes to the entire computing device, performing Undo actions will revert the most recent changes of any kind that occurred on the computing device, including even changes that did not affect any input. For example, in such an embodiment, if a user mistakenly closes an application without saving the document that was being edited, the user may be able to set the current undo scope to make undo changes to the entire computing device and then undo the action of closing the application.

In an embodiment, as an exception, undo and redo activity will never change the current undo scope: if the current undo scope is set to make undo changes to the entire computing device, then rewinding to a moment when the current undo scope was set to make undo changes to only the current document will not actually change the undo scope.

In an embodiment, when the current undo scope is set to the entire computing device, a user may set an option that determines whether or not an exception is made so that saved files are not included in the current undo scope and thus are not affected by undo changes. For example, in such an embodiment, if a user carelessly saves over an important file, the user may be able to set the undo scope to the entire computing device, explicitly including saved files, and undo this mistake. In an embodiment, when the current undo scope is the entire computing device, a user may also set an option that determines whether or not an exception is made so that the clipboard that is used for Cut, Copy and Paste functionality is not included in the current undo scope. For example, in such an embodiment, if a user typed some text in a window and then closed that window without saving the text, and the user later wants to retrieve that text via the clipboard without changing the state of the computing device in any other way, then the user may set the undo scope to the entire computing device, explicitly excluding the clipboard; perform sufficiently many Undo actions that the text is again visible; copy the text to the clipboard; and redo all changes so that the state of the computing device returns to what it was, except that the text is now available on the clipboard. In an embodiment, by default saved files are not included in the current undo scope, and by default the clipboard is not included in the current undo scope.

In an embodiment, when the current undo scope is set to make undo changes to only the current application, performing Undo actions will revert the most recent changes of any kind that occurred within the current application. In such an embodiment, if for example a user inadvertently changes an application option that does not affect any particular document, and the user cannot figure out why the application is behaving differently, then even though this change did not affect any particular document, the user will be able to undo this change by means of first setting the current undo scope to make undo changes to the current application and then performing Undo actions as necessary.

In an embodiment, when the current undo scope is set to make undo changes to only the current document, performing an Undo action will revert the most recent change to that document. In an embodiment, this is the default undo scope; it corresponds to the prior art behavior that most users expect when performing Undo actions.

However, in an embodiment, a particular application may not necessarily support the distinction between an undo scope of the current application and an undo scope of the current document. In an embodiment, it is always possible to set the undo scope to the entire computing device, but other than that, the available options depend on the current application.

Additionally, in an embodiment, the current application may support other possibilities for the undo scope in addition to or instead of the current application and the current document. For example, a spreadsheet application may allow the current scope to be the current application, all open documents, the current document, or the current worksheet within the current document. In an embodiment, in addition to providing an interface for selecting the scope, the operating system of the computing device will provide a common library of functionality that facilitates the creation of applications that support various possibilities for the undo scope.

In an embodiment, the current undo scope may also be set to apply to the current selection within the current document, or to some other specific subdomain of the current application. For example, in an embodiment, after a user makes a single change to a paragraph on page 1 of a large document in a word processing application and subsequently makes numerous changes to page 5 of the document, if the user desires to undo the change on page 1 and nothing else, the user may be able to simply select that paragraph, set the current undo scope to apply to the current selection, and actuate the Undo key just once.

The interface behaviors described above pertaining to the current undo scope may be advantageous as an enhancement to undo functionality even an embodiment that has no functionality pertaining to alterable decisions. However, from an implementation standpoint, these interface behaviors may have synergy with certain types of alterable decisions such that retroactively altering the decisions may require the interface to undo the effects of OS-level actions such as saving files or closing windows, particularly including alterable command recognition decisions as described in Chapter 28. For example, if an implementer has already configured an embodiment so that the interface saves sufficient information in an undo buffer that it is possible to undo the closing of a window, then that will reduce the amount of time needed to further configure the embodiment so that if a user says "Close this window" then the interface's decision whether to treat this utterance as a verbal command or as text to be transcribed is an alterable decision.

Chapter 12: Measuring User Attention

Eye Movement Tracking

Certain embodiments of the present invention may be computing devices that may have more than one display device; for example, an embodiment may be a desktop computer that may be connected to multiple monitors. For the sake of simplicity, the present specification generally refers to "the display" of a computing device, but it is to be understood that any such reference to "the display" may include more than one display device.

In an embodiment, for purposes of the interface behaviors described herein, the "focal location" is a precise location that the eye tracking technology of a computing device determines to be the location that the user is currently looking at, even if the eye tracking technology is somewhat inaccurate and so this focal location may actually be a certain distance away from the actual location that the user is currently looking at. The "focal zone" is a larger region, typically consisting of a circle that is centered on the focal location, such that the eye tracking technology is reasonably confident that the user is currently looking at a location within the focal zone. For example, in an embodiment that is a computing device that has eye tracking technology that is sufficiently accurate to determine within 3 cm where a user is looking with a reasonable degree of confidence, the focal zone consists of a circle with a 3-cm radius that is centered on the focal location. In an embodiment, as an exception, when eye tracking technology can determine with a reasonable degree of confidence that the user is not looking at the display of the computing device at all, the focal location is "offscreen," and the focal zone is also "offscreen." When the interface "can determine a focal location," this means that the interface has access to eye tracking technology and that either the eye tracking technology can currently determine a location to be the location that the user is currently looking at, or else the eye tracking technology can determine with a reasonable degree of confidence that the user is not looking at the display of the computing device at all.

Figure 9A:
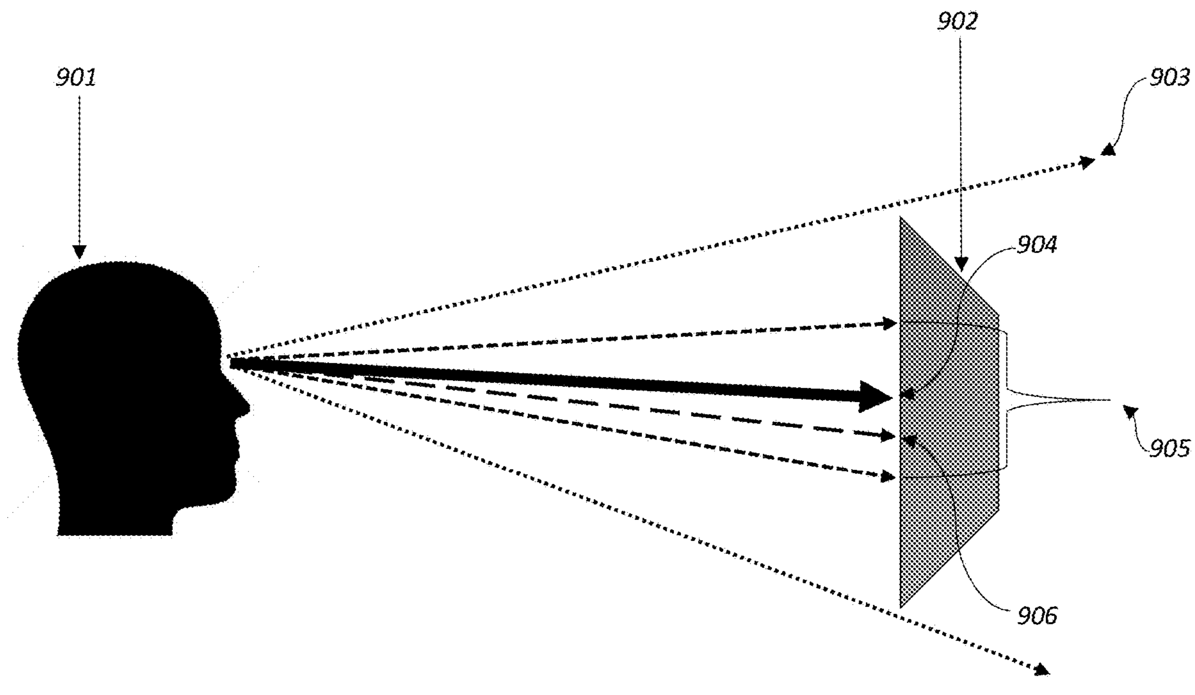
FIG. 9A illustrates a side-view of an interface user who is looking at a display device.
Figure 9B:
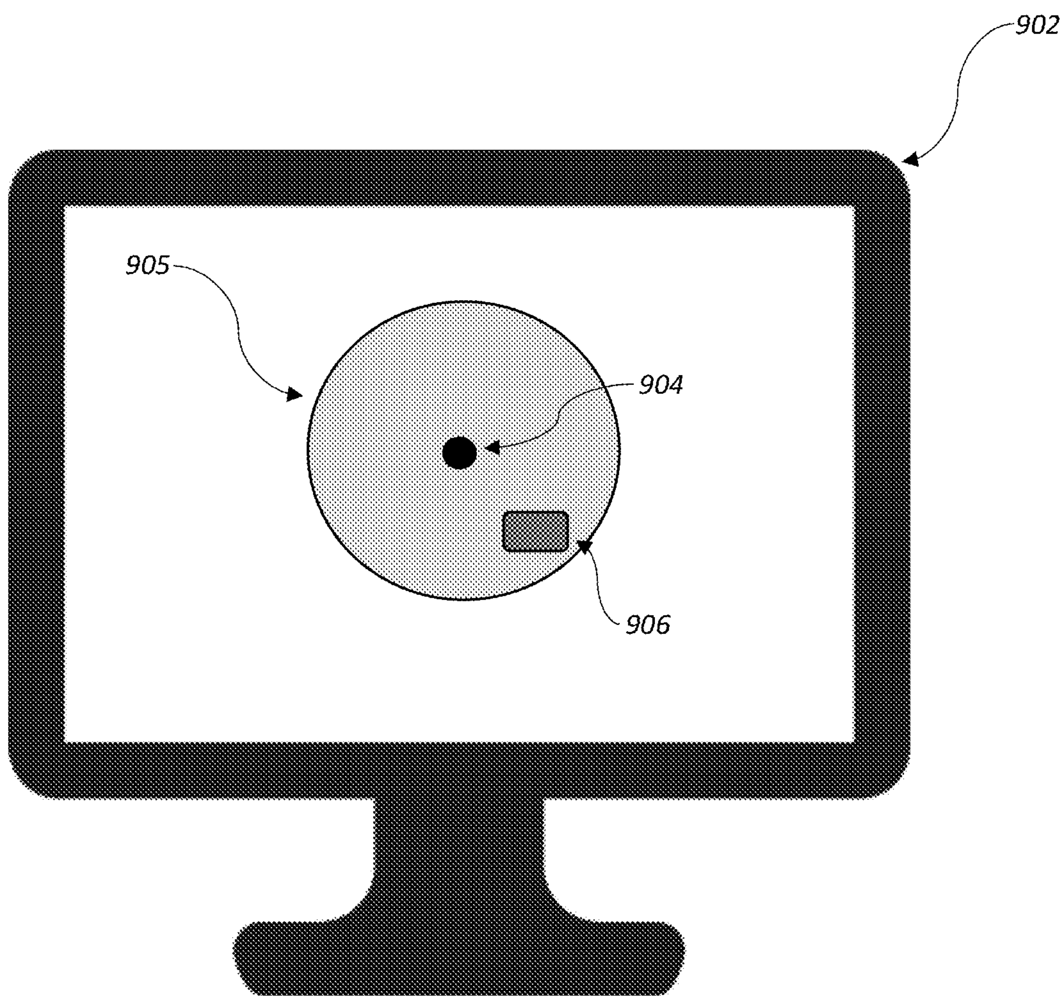
FIG. 9B is a front-facing view of the display device, including the target region and the focal zone centered on the focal location, according to one embodiment.

FIG. 9A gives a side-view of an interface user (901) who is looking at a display device (902). On the display is a target region (906) that the user may be looking at. The eye tracking technology believes that the user is looking somewhere within a focal zone (905) that is centered on a focal location (904). If the eye tracking technology were confident that the user was looking in the direction indicated by the top line (903), then the focal location would be offscreen. FIG. 9B is a front-facing view of the display device (902), including the target region (906) and the focal zone (905) centered on the focal location (904).

In an embodiment, for purposes of the interface behaviors described herein, when a user "detectably may be looking at" a certain target region on the display of a computing device, this does not necessarily mean that the target region includes the focal location: instead, in an embodiment, that means that the interface can determine a focal location, and the focal location is not offscreen, and at least some portion of the target region is within the focal zone. For example, in an embodiment that is a computing device that has eye tracking technology that is sufficiently accurate to determine within 3 cm where a user is looking with a reasonable degree of confidence, the user detectably may be looking at any target region such that at least some portion of the target region is within 3 cm of the focal location. In an embodiment, for purposes of the present paragraph and the following paragraph, a "target region" may be any location or locations or visual depiction of something on the display of the computing device.

In an embodiment, for purposes of the interface behaviors described herein, when a user is "detectably not looking at" a target region on the display of a computing device, this means that the interface can determine a focal location and that it is not the case that the user detectably may be looking at the target region. In particular, a user is detectably not looking at any region that is on the display of the computing device whenever the focal location is offscreen. In an embodiment, for purposes of the behaviors that are described herein, a user "detectably has not been looking at" a target region whenever it is the case that at the present moment and for a certain minimum duration of time immediately prior to the present moment (such as, in an embodiment, for at least one full second) the user was detectably not looking at the target region. For example, in an embodiment, if a user detectably has not been looking at the mouse cursor, this means that eye tracking technology has been able to determine that that the user was looking somewhere other than at the mouse cursor for at least one full second.

Some functionality that is described herein that pertains to eye tracking technology may be useful even in an embodiment where the eye tracking technology that is available for the interface can sometimes determine with a reasonable degree of confidence which of a plurality of display devices a user is looking at but cannot make any determination whatsoever regarding what location the user is looking at within that particular display device. In such an embodiment, whenever the interface is able to determine which display device the user is looking at, the "focal zone" consists of the entirety of the display device that the interface believes the user to be looking at, so the user then "detectably may be looking at" every location on that display device, and is "detectably not looking at" every location on all other display devices. In an embodiment, in such circumstances "the focal location" is the center of the display device that the interface believes the user to be looking at.

In an embodiment, the interface will continually monitor where the user is looking and will retain data regarding how long the user has or has not been looking at certain locations, so that, for example, at any moment the interface will be able to determine whether or not it is the case that the user has been detectably not looking at the location of the input cursor for at least one full second.

In prior art, eye tracking technology has not been widely deployed. An article regarding eye tracking technology has claimed that "user interface advancements need to be flawless in order to actually enhance user experience" (https://tech.thefuntimesguide.com/eye-tracking-technology/, accessed Nov. 25, 2016). However, the present specification describes features that may take advantage of any available eye tracking technology and may yield beneficial results even if the eye tracking technology is not entirely reliable or especially precise. For example, the present chapter explains how to use eye tracking technology in order to help the interface more accurately calculate attention factors that represent approximately how much attention the user may be paying to particular regions of the display, and the more accurate these attention factors are the better, but these attention factors need not be especially accurate in order to be somewhat useful. Also, Chapter 37 explains how to use eye tracking technology in order to make the input cursor jump to a location that the user may be looking at, but also explains how to facilitate correcting any mistakes that may result from such a cursor jump.

Deliberation Scores

In an embodiment, when a user presses a key or performs some other action such as a touch gesture, the user action will be assigned a "deliberation score" that reflects approximately how careful the user was in performing that action, insofar as the interface is able to determine this, as described in the following paragraphs.

In an embodiment, the interface will assign a deliberation score to each keypress or other user action based on the interval of time before that user action that elapsed since the interface completed its response to the previous user action, so that if a user pauses a long time before pressing a key, then that keypress will be assigned a relatively high deliberation score.

In an embodiment, as an exception, when a user performs the very first user action, for purposes of determining that action's deliberation score, the time when the interface became active will be treated as the time when the interface completed its response to the previous user action, so for example if a user turns on the computing device, and then a few seconds later the interface becomes ready to respond to user actions, and then five seconds after that the user performs a first user action, then the deliberation score of that first user action will be based on the five-second interval.

Generally, for purposes of the present specification, a "medium deliberation score" is intended to refer to a deliberation score such as may typically be assigned to a user action if a user does not stop to think before choosing to perform the action, yet the user performs the action carefully enough that there is little chance of accidentally invoking a different user action than intended. In particular, if a typical user has in mind a word that he wishes to type and is quite careful to type that word without mistakes (without the help of autocorrection), then most of the user's keystrokes should have medium deliberation scores. Thus, a "low deliberation score" may tend to indicate that a user is typing rapidly enough that a typographical error is not especially unlikely, and a "high deliberation score" may tend to indicate that a user has paused to think for at least a short while before performing a particular user action.

For example, in an embodiment, when a user performs a user action, that action has a "very low deliberation score" of 0 if the time that elapsed since the previous user action is less than 0.2 seconds, a "low deliberation score" of 1 if the elapsed time is between 0.2 seconds and 0.5 seconds, a "medium deliberation score" of 2 if the elapsed time is between 0.5 seconds and 1.0 seconds, a "moderately high deliberation score" of 3 if the elapsed time is between 1.0 seconds and 2.0 seconds, a "high deliberation score" of 4 if the elapsed time is between 2.0 seconds and 5.0 seconds, or a "very high deliberation score" of 5 if the elapsed time is more than 5.0 seconds. As another example, in an alternative embodiment, deliberation scores are on approximately the same scale as the scale described in the preceding sentence, but with additional gradations, so that for example when a user performs a user action, if the time that elapsed since the previous user action is 1.1 seconds, then the action's deliberation score is 2.6.

In an embodiment, if a user action actually requires multiple keystrokes or screen touches, then the interface will individually measure the deliberation scores of the component actions that are required in order to perform that user action and will assign that user action a deliberation score equal to the maximum of the component actions' deliberation scores. Thus, in such an embodiment, if a user quickly presses a virtual key that causes the interface to replace a virtual keyboard containing letters with a virtual keyboard containing digits and then quickly presses a digit, then the resulting actuation of the digit key will have a relatively low deliberation score even if it actually ended up taking a bit longer than a typical single keystroke.

In an embodiment, the scale by which deliberation scores are calculated is different for user actions that consist of speaking into a microphone than for other user actions such as keystrokes or screen touches. For example, in an embodiment, when a user speaks a verbal command into a microphone, the interface will determine the time that elapsed since the previous user action but will calculate a deliberation score based on half that amount of time rather than calculating a deliberation score based on the full amount of time.

In an embodiment, the scale by which deliberation scores are calculated may vary from one specific user action to another, so that for example if a user spends two seconds to actuate the E key then this keypress may be assigned a high deliberation score, but if a user spends two seconds to actuate the { key then this keypress may be assigned a medium deliberation score, because many users require more time just to find the key than they would require to find the E key.

In an embodiment, the scale by which deliberation scores are calculated for touches of keys that are on the primary virtual keyboard of a touchscreen computing device will take into account the physical distance on the display of the computing device between the key the user most recently touched and the key for which the interface is calculating the deliberation score, so that if 0.3 seconds elapse between the user's previous keystroke and a user keystroke of the letter M, then the M keystroke may be assigned a medium deliberation score if the user's previous keystroke was also an M keystroke, but may be assigned a low deliberation score if the user's previous keystroke was an A keystroke.

In an embodiment, the interface will retain and analyze data regarding how much time a particular user typically spends between user actions, in order to more accurately calibrate the deliberation scores that are assigned to user actions for that user. In an embodiment, the interface will also determine in certain circumstances whether certain keystrokes were accurate keystrokes or whether they were missed keystrokes; such behavior is explained in Chapter 31 in a discussion of evaluating the outcomes of "alterable word replacement decisions." In an embodiment, the interface will retain and analyze data regarding the amount of time that a particular user spent before an accurate keystroke or before a missed keystroke, and will use this information to calibrate the deliberation scores that are assigned to user actions for that user. Therefore, for example, for a user who frequently spends approximately 0.3 seconds between keystrokes when inputting text, if nearly all his keystrokes at that speed are accurate keystrokes, then once the interface has collected sufficient data regarding the behavior of this user, a keystroke that occurs 0.3 seconds after the previous user action will be assigned a medium deliberation score; if instead a rather high percentage of his keystrokes at that speed are missed keystrokes, then a keystroke that occurs 0.3 seconds after the previous user action will be assigned a low deliberation score. In an embodiment, the interface may retain and analyze such data separately for distinct keys, and may accordingly calibrate deliberation scores on a different scale for different keys; for example, if data shows that backspace keystrokes have always been missed keystrokes whenever they occurred less than 0.7 seconds after the previous keystroke, then a backspace keystroke that occurs 0.5 seconds after the previous user action may be assigned a very low deliberation score even if some other keystroke that occurred at that time would have been assigned a medium deliberation score.

In an embodiment, if while a key on the virtual keyboard of the interface is held down a special indicator appears that shows the user which key is currently pressed down, then if a user pauses on a particular key while such an indicator is visible for more than a certain threshold amount of time before releasing the key, the interface will assign that keystroke at least a medium deliberation score, so that if a user finds and presses a key much faster than usual but then briefly pauses to confirm that it is the correct key, then that keystroke will not be assigned a low deliberation score.

In an embodiment, for purposes of interface behaviors that are described farther below, the "hypothetical deliberation score" at any given moment is the deliberation score that would be assigned to a typical user action (such as typing the letter E) if that user action were to occur at that moment, without regard to whether or not any user action actually does occur at that moment. For example, when a user action has just occurred, the hypothetical deliberation score will be very low, but when a long time has elapsed since the most recent user action, the hypothetical deliberation score will be very high. In an embodiment, as a special case, whenever the user's most recent action consisted of speaking into a microphone, the hypothetical deliberation score is the deliberation score that would be assigned to another action consisting of speaking into a microphone if that action were to occur at that moment.

As described above, in addition to taking into account the time that elapsed since the user's previous action, the deliberation score for a user action may take into account other factors, such as how much time it would typically take a user to perform that particular action. However, wherever the present specification describes an embodiment that bases its behavior on a deliberation score, it is to be understood that an alternative embodiment may simply base its behavior on the amount of time that elapses between consecutive user actions. For example, where the present specification says that in a certain embodiment, in certain circumstances, "if the user's next action has a very high deliberation score, then the interface will forget all remembered alterable blocks," this means that in an alternative embodiment, in those circumstances, if a sufficiently long amount of time elapses before the user's next action (such as, in an embodiment, five seconds), then the interface will forget all remembered alterable blocks, without necessarily calculating any deliberation score per se. Likewise, whenever the present specification describes an embodiment that bases its behavior on a hypothetical deliberation score, it is to be understood that an alternative embodiment may simply base its behavior on the amount of time that elapsed since the most recent user action.

The remainder of the present chapter explains how deliberation scores may be useful in calculating approximately how much opportunity a user has had to notice and react to output. Chapter 17 explains how deliberation scores may be useful in determining whether it is more likely that a user who deleted input but then retyped the exact same input did so instinctively or deliberately. Chapter 31 explains how deliberation scores may be useful in autocorrection algorithms.

Attention Scores

In an embodiment, in certain circumstances the interface will assign an "attention score" to output that becomes visible on the display of a computing device or becomes perceptible to a user in some other way, and will subsequently increase that attention score in various circumstances. Such an attention score will reflect approximately how much opportunity the user has had to notice and react to the output, insofar as the interface is able to determine this. For example, the interface may assign an attention score to an alterable block, or to a pop-up window, or to a key on a virtual keyboard. In the present disclosure, anything that has an attention score may be referred to as an "attention object."

In an embodiment, when the interface assigns an attention score to an attention object, the attention score will initially be zero by default, and various factors may cause the attention score to increase; various situations in which the interface may increase the attention score of an attention object are described below.

In an embodiment, the interface will assign a "relative attention factor" to each attention object that reflects approximately how noticeable the attention object is compared to other attention objects; the determination of relative attention factors is described below, after the discussion of attention scores.

In an embodiment, as time passes, the interface will gradually increase the attention score of every visible attention object. For each attention object, the increase in its attention score due to the passage of time will be proportional to the amount of time that elapses multiplied by the relative attention factor of the attention object. Thus, if an attention object has a high relative attention factor, its attention score will increase relatively rapidly; if an attention object has a lower relative attention factor, its attention score will increase relatively slowly.

In an alternative embodiment, each time a user inputs a character or otherwise performs an editing action, the interface will increase the attention score of every attention object by an amount that is proportional to its relative attention factor.

In an embodiment, when a user touches or clicks on an attention object, the interface will greatly increase its attention score. In an embodiment, such an increase in an attention score will not be applied until after the touch or click is handled normally. For example, in an embodiment, if an interface window suddenly appears that is an attention object and a user who was intending to touch something else inadvertently touches the interface window before becoming consciously aware that the window had appeared, then the interface window will have an extremely low attention score at the moment when the user touches it, but will have a much higher attention score thereafter.

In an embodiment, when a user moves the input cursor past an attention object that is visible, the interface will slightly increase its attention score. For example, when an alterable block that has an attention score is in the middle of a line of input that the user has typed and the input cursor is at the end of the line of input, if the user presses the Home key to move the input cursor to the beginning of that line of input, then the interface will slightly increase the attention score of that alterable block.

Dismissing Attention Objects

If a user chooses to reduce his ability to interact with an attention object, this may indicate that the user has already paid enough attention to the attention object that the user is satisfied that is not necessary to interact with the attention object. It may be advantageous to increase the attention score of the attention object to reflect such a possibility. Interface behaviors to that effect are described in the following paragraphs.

In an embodiment, when a user performs an action that causes a previously visible attention object to no longer be visible, the interface will substantially increase its attention score. For example, in an embodiment, if an alterable block has an attention score and the user scrolls up to view a different part of the current document so that the alterable block is no longer in view, the interface will substantially increase the alterable block's attention score when it ceases to be visible (but its relative attention factor will become zero until it becomes visible again, as is explained below).

In an embodiment, for purposes of the following paragraph, certain user actions constitute "completion actions" for certain regions of input. Generally, a completion action is an action that inherently implies that the user is satisfied for the moment with some region of input (in the judgment of the interface designer). In particular, in an embodiment, exiting an application is a completion action for all input within the application. In an embodiment, saving a document is a completion action for the document. In an embodiment, pressing Enter to indicate that edits to a spreadsheet cell are finished is a completion action for that cell. In an embodiment, pressing Enter to cause a calculator interface to evaluate a mathematical expression is a completion action for that expression.

In an embodiment, when a user performs a completion action for a region of input, the interface will increase the attention score of every attention object that was visible immediately prior to that action within that region of input. In an embodiment, if the completion action has a high deliberation score, then the interface will increase such attention scores substantially. However, in an embodiment, when a user performs a completion action, the interface will not for that reason increase the attention score of any attention object that becomes visible in response to the action. For example, when a user presses Enter to cause a calculator interface to evaluate a mathematical expression, if pressing Enter also caused the interface to make an alterable decision to insert an additional character at the end of the mathematical expression, then when the interface increases the attention score of every attention object that was visible in the mathematical expression, this does not include the alterable block of the new alterable decision.

In an embodiment, even after a user has saved changes to a document and closed the document, the saved document may include saved alterable decisions so that when the document is reopened the decisions can be altered. In an embodiment, even after a user has typed a mathematical expression in a calculator interface and pressed Enter, the mathematical expression may include alterable decisions that can still be altered (which could cause the answer to the calculation to change).

Attention Factors

In an embodiment, the interface will assign an "attention factor" to each attention object. An attention object's attention factor is distinct from its relative attention factor: the attention factor reflects approximately how noticeable the attention object is and how strong are the indications that the user is paying attention to it, without regard to the existence of other attention objects that may also be demanding the user's attention, whereas the relative attention factor reflects approximately how noticeable the attention object is compared to other attention objects. (An attention object's attention factor and relative attention factor are both distinct from its attention score.)

In an embodiment, the relative attention factor of an attention object equals the ratio of its attention factor to the sum of all the attention factors of all the attention objects that currently exist. For example, in such an embodiment, if an attention object has an attention factor of 1.0, then its relative attention factor is 1.0 if no other attention object exists, but its relative attention factor is 0.25 if exactly one other attention object exists and that one has an attention factor of 3.0. In such an embodiment, the attention score of a highlighted alterable block will increase more quickly if it is the only highlighted alterable block than if numerous alterable blocks are highlighted. In an alternative embodiment, the relative attention factor of an attention object will simply equal its attention factor.

In an embodiment, for purposes of the preceding paragraph, at all times the interface will behave as though a special "typing attention object" exists. The typing attention object does not actually have an attention score, but has an attention factor that affects the relative attention factors of other attention objects as described in the preceding paragraph. In an embodiment, the attention factor of the typing attention object is at its maximum immediately after the user performs an action, and then decreases over time; more specifically, in an embodiment, at any given moment, the attention factor of the typing attention object equals a certain amount less the current hypothetical deliberation score. For example, in an embodiment, deliberation scores have a minimum of 0.0 and a maximum of 5.0, and at any given moment the attention factor of the typing attention object equals 5.0 minus the hypothetical deliberation score. In such an embodiment, while a user is typing rapidly, the attention factor of the typing attention object will usually be quite high, and so the relative attention factors of other attention objects will be relatively low, but once a user stops performing actions, the attention factor of the typing attention object will soon decrease, and so the relative attention factors of other attention objects will increase. This means that in an embodiment where an alterable block is an attention object such that increasing its attention score causes its associated probability of alteration to decrease (as is described in Chapter 13), if a user who is typing rapidly notices that the interface has made a highlighted alterable decision but does not wish to stop immediately, then the user can continue to type rapidly, with the expectation that the highlight will not fade rapidly until he stops to look.

In an embodiment, the attention factor of an attention object will equal its "base attention factor" except when special circumstances obtain; in various special circumstances, the attention factor of an attention object may temporarily be elevated for as long as the special circumstances obtain. Various such special circumstances are described below.

In an embodiment, a typical attention object will be assigned a base attention factor that is roughly proportional to how strongly the object inherently attracts the user's attention (in the judgment of the interface designer). For example, in an embodiment, an alterable block that has an associated change flag will have a base attention factor of 3.0; if an alterable block does not have an associated change flag but is highlighted, then its base attention factor will range from 2.0 if it has the maximum possible highlight intensity score down to 1.0 if it has the minimum possible highlight intensity score; and if an alterable block does not have an associated change flag and is not highlighted, it will have a base attention factor of 0.2.

In an embodiment, while a user detectably may be looking at an attention object, its attention factor will be elevated. In an embodiment, the amount by which an attention factor is elevated in such circumstances depends on how certain it is that the user is in fact looking at the attention object: if the eye tracking technology that the interface is using can determine where a user is looking within a very small radius, then while a user detectably may be looking at an attention object, its attention factor will be greatly elevated, but if the eye tracking technology can only determine the general region where a user is looking, then while a user detectably may be looking at an attention object, its attention factor will be elevated only slightly.

In an embodiment, if a user has moved the input cursor since the user last performed an editing action, then any attention object that the input cursor is within or immediately adjacent to will have a substantially elevated attention factor (such as, in an embodiment, an attention factor that is 5.0 greater than it would otherwise have), and any other attention object that the input cursor is very close to will have a slightly elevated attention factor. For example, in an embodiment, if the interface makes an alterable decision regarding a word the user types and the user then presses the left arrow key a few times so that the input cursor is at the end of that word, then that decision's alterable block will have an elevated attention factor until either the user moves the input cursor away from its alterable block or the user performs an editing action.

Similarly, in an embodiment, if a user has moved the mouse cursor more than a tiny distance since the user last actuated a key, then any attention object that the mouse cursor is within will have a substantially elevated attention factor, and any other attention object that the mouse cursor is very close to will have a slightly elevated attention factor. In an embodiment, if the interface detects that a stylus is hovering above the display of the computing device at a location that is directly above an attention object, then that attention object will have a substantially elevated attention factor.

In an embodiment, while an attention object is not visible (or otherwise perceptible), its attention factor will be zero until it becomes visible again. For example, if a user scrolls the display so that a highlighted alterable block is no longer visible, its attention factor will be zero until it becomes visible again. In an embodiment, whenever it is impossible for a user to interact with an attention object in any way, its attention factor will be zero until it becomes possible again for the user to interact with it. For example, if a highlighted alterable block is visible in a document, but a modal window has appeared so that it is not possible for the user to alter the decision or to edit the document in any way until the modal window is dismissed, then the attention factor of the highlighted alterable block will be zero until the modal window is dismissed.

In an embodiment, while the interface is in alterable decision review mode, the attention factor of every visible alterable block will be slightly increased, except that if the interface entered alterable decision review mode because the user invoked a command that is explicitly for the purpose of causing the interface to enter alterable decision review mode, or if the interface is in an intensified alterable decision review mode, then the attention factor of every visible alterable block will be substantially increased.

Attention Scores in Perspective

The above paragraphs have explained some relatively sophisticated methods for calculating attention scores. However, in an alternative embodiment, an attention object's attention score may be a simple measure of how much time has elapsed since the attention object became visible. In another alternative embodiment, an attention object's attention score may be a simple measure of how many user actions have occurred since the attention object became visible. Generally, where an attention score is mentioned in the present specification, it is to be understood that in an alternative embodiment where such a score is a simple measure of how much time has elapsed or how many user actions have occurred, language that directly pertains to elapsed time or to a quantity of user actions may be swapped in as a replacement for the reference to an attention score, and the interface behavior that is thus described can be implemented without implementing the explicit calculation of an attention score. For example, the following chapter explains an embodiment such that every alterable block is an attention object and such that whenever the interface increases the attention score of an alterable block the interface will decrease the probability of alteration of its alterable decision by an equal amount. It is to be understood that in an alternative embodiment the interface will simply decrease the probability of alteration of every alterable decision at the same gradual rate, and in another alternative embodiment the interface will simply decrease the probability of alteration of every alterable decision by a fixed amount each time a user action occurs. Such alternate embodiments can be implemented without implementing the explicit calculation of attention scores.

Whether attention scores are calculated by simple methods or by relatively sophisticated methods, an attention score may tend to indicate whether or not a user has had ample opportunity to notice and react to output, and this information may be useful for various interface behaviors that are described below. In particular, Chapter 13 explains how attention scores may be useful in ensuring that users have ample opportunity to notice and alter any alterable decision that has a relatively high probability of alteration even while conversely ensuring that a highlighted alterable decision will cease to be highlighted when a user has ignored it long enough.

Chapter 13: Ensuring Alteration Opportunities

Prioritizing High-Attention Blocks

In an embodiment, every alterable block is an attention object. If an alterable block is empty but its location is visible, then its location is an attention object, so for example if the interface makes an alterable decision not to insert some text and a user detectably looks at the exact location where the text would have been inserted had the interface chosen differently, then while the user is looking there, that alterable block's attention factor will be increased.

In an embodiment, for purposes of the interface behaviors described below, the "critical attention threshold" is a value such that no alterable block will have an attention factor above the critical attention threshold under ordinary circumstances, but an alterable block will typically have an attention factor above the critical attention threshold if for example the user has moved the mouse cursor onto the alterable block (and has not actuated a key since then), or if the interface is quite confident that the user is looking at the alterable block.

In an embodiment, whenever at least one alterable block has an attention factor that is above the critical attention threshold, every alterable decision whose alterable block's attention factor is above the critical attention threshold will be treated as more relevant than any alterable decision whose alterable block's attention factor is below the critical attention threshold. This may cause an alterable decision to temporarily become the most relevant alterable decision while the attention factor of its alterable block is elevated. In an alternative embodiment, while an alterable block's attention factor is above the critical attention threshold the interface will temporarily elevate its probability of alteration; this too may cause an alterable decision to temporarily become the most relevant alterable decision while the attention factor of its alterable block is elevated.

For example, in an embodiment, if the interface has made an alterable decision to automatically capitalize "tuesday" and an alterable decision to automatically insert an apostrophe in the word "its," then if the user moves the input cursor to within the word "Tuesday," the alterable block of that decision will have an attention factor that is above the critical attention threshold, and so the decision regarding that word will temporarily be more relevant than the other decision, regardless of their probabilities of alteration. If the user's next action is an actuation of the alteration key, the interface will alter the decision regarding the word "Tuesday."

In an embodiment, as a special case, if eye movement tracking is the only reason that an alterable decision becomes the most relevant decision, then that decision will not become the currently alterable decision until it has been the most relevant decision for at least a certain minimum amount of time, or until the user performs an action. That is, whenever the comparative relevance of two alterable decisions changes, if this change is exclusively due to the fact that one of the alterable decisions has an alterable block whose attention factor just rose above the critical attention threshold because the user detectably may looking at it, or due to the fact that one of the alterable decisions has an alterable block whose attention factor just dropped below the critical attention threshold because it is no longer the case that the user detectably may be looking at it, then if this change in the comparative relevance of the two alterable decisions will cause one of them to cease to be the currently alterable decision and cause the other to become the currently alterable decision, then the transition will not occur instantaneously. Instead, when such a situation obtains, there will be no currently alterable decision until either the user performs an action or a single alterable decision continues to be the most relevant alterable decision for a duration of at least a certain fixed interval of time (such as, in an embodiment, for at least one second). If a user actuates the alteration key while there is no currently alterable decision, then the only effect of this actuation of the alteration key will be that the interface causes the most relevant alterable decision to become the currently alterable decision without any additional delay.

For example, in an embodiment, if a user detectably looks at the alterable block of an alterable decision that was not the currently alterable decision for at least one full second, this may cause that decision to become the currently alterable decision until the user looks away, but if the user only glances at that alterable block briefly and then looks away, that decision will not become the currently alterable decision, not even briefly.

In an embodiment where a user can alter alterable decisions by means of spoken alteration commands (as is described in Chapter 25), it may be especially advantageous for an alterable decision to become more relevant when the user is detectably looking at it, so that a user can easily alter any particular alterable decision by looking at it and speaking the appropriate command, without using his hands at all.

Degrading Probabilities of Alteration

In an embodiment, in certain circumstances that are explained below, an alterable block may become "frozen." When an alterable block becomes frozen, it is assigned a "pending probability reduction score" that initially equals zero. When an alterable block ceases to be frozen, the probability of alteration of its alterable decision (and the probability of alteration of each alternate option of that decision) is reduced by an amount equal to its pending probability reduction score.

In an embodiment, whenever the interface increases the attention score of an alterable block, the interface will decrease the probability of alteration of its alterable decision (and the probability of alteration of each alternate option of that decision) by an equal amount. In an embodiment, as an exception, whenever the interface increases the attention score of an alterable block that is frozen, the interface will instead increase its pending probability reduction score by an equal amount. Thus, in an embodiment, because attention scores will tend to increase as time passes, the probabilities of alteration of alterable decisions will tend to decrease as time passes, especially if they are highlighted alterable decisions. In such an embodiment, if a user notices a highlighted alterable decision and is satisfied with the outcome of the decision but does not wish to take any action to cause the highlight to disappear, eventually the highlight will disappear anyway.

In an embodiment, whenever an alterable block has an attention factor that is temporarily greater than the critical attention threshold (as defined above), it will become frozen until its attention factor is below the critical attention threshold. Thus, for example, in an embodiment, if a user moves the mouse cursor so that it is hovering over the alterable block of a highlighted alterable decision for a while, then the interface will not decrease the probability of alteration of that decision while the mouse cursor is there, but if the user then moves the mouse cursor away without actually doing anything, the interface will greatly decrease the probability of alteration of that alterable decision, and that decision will cease to be highlighted. As another example, in an embodiment, if the interface is using eye tracking technology that has a great deal of accuracy, and a user detectably looks at the alterable block of a highlighted alterable decision for a while without doing anything, then once the user looks away, the decision will cease to be highlighted.

In an embodiment, if immediately after a user action an alterable decision has a probability of alteration that is above the highlighting threshold, but then due to the passage of time its attention score increases and so its probability of alteration decreases to below the highlighting threshold, then its transition from being highlighted to not being highlighted will be gradual rather than instantaneous. For example, in an embodiment, when the passage of time causes the probability of alteration of a highlighted alterable decision to decrease to the point where it no longer will be treated as a highlighted alterable decision, then over the next two seconds its highlight intensity score will gradually decrease from 1.0 to 0.0, and until it reaches 0.0 the decision will still constitute a highlighted alterable decision for purposes of the touch alteration feature. In an embodiment, if while such a transition is occurring the user performs an action, then after the user's action is handled the transition will be completed instantaneously rather than continuing gradually.

Revision Mode

In an embodiment, in certain circumstances the interface will enter a "revision mode." Generally speaking, when the interface is in revision mode, this means that the interface believes it is relatively likely that the user is about to correct any mistakes that the user sees, and it is relatively unlikely that the user is too focused on entering input to pay any attention to results that are already visible on the display of the computing device.

In an embodiment, when a user presses the alteration key or performs any other action that pertains to alteration functionality, the interface will enter revision mode. Also, when a user causes the interface to enter alterable decision review mode, the interface will enter revision mode. In an embodiment, as an exception, when the interface decides to enter final review mode as described below, the interface will immediately enter alterable decision review mode as a result of entering final review mode, but will not yet enter revision mode. In an embodiment, when a user presses the Undo key or performs any other action that pertains to undo functionality, the interface will enter revision mode. In an embodiment, when a user presses the backspace key or the Delete key or performs any other destructive action (as defined in Chapter 17), the interface will enter revision mode.

Figure 10:
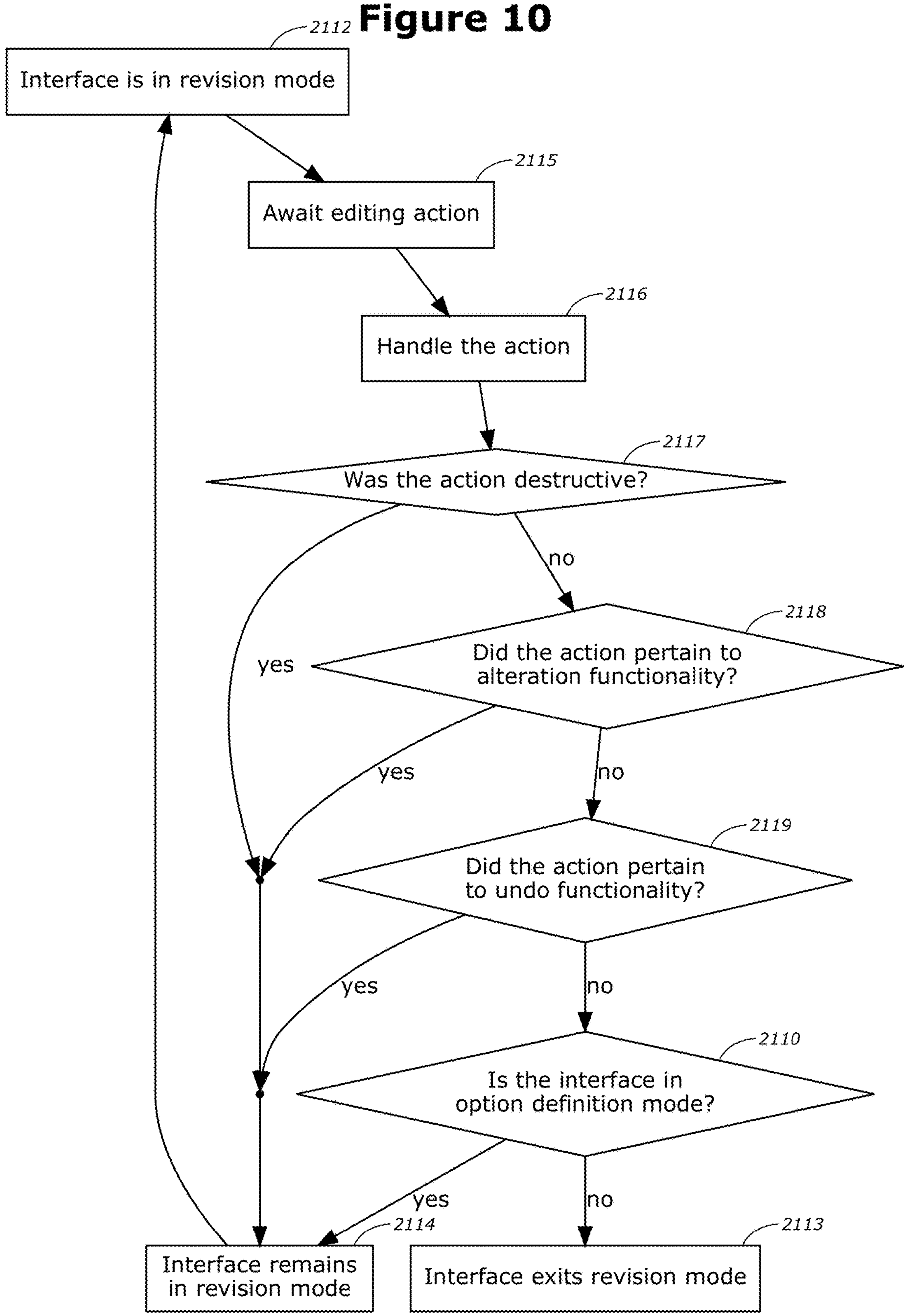
FIG. 10 is a flowchart that illustrates an example method for determining whether an interface remains in revision mode, beginning with the assumption that the interface is in revision mode

In an embodiment, when a user inputs an ordinary character or performs any other editing action that is not a destructive action and does not pertain to alteration functionality or to undo functionality, the interface will exit revision mode. In an embodiment, as an exception, while the interface is in option definition mode as defined in Chapter 15, inputting characters will not cause the interface to exit revision mode. FIG. 10 is a flowchart that illustrates the process for determining whether an interface remains in revision mode, beginning with the assumption that the interface is in revision mode. Block 1001 states that the interface is in revision mode and proceeds to Block 1002, which says, "Await editing action." Then, the interface handles the action (Block 1003). Subsequently, the process includes a series of four questions. In each case, if the answer to the question is yes, then the interface remains in revision mode (Block 1009). If the answer is no, the process continues with the next question until all questions have been answered. Specifically, Block 1004 asks, "Was the action destructive?" Block 1005 asks, "Did the action pertain to alteration functionality?" Block 1006 asks, "Did the action pertain to undo functionality?" Block 1007 asks, "Is the interface in option definition mode?" If the answer to all four questions is no, then the interface exits revision mode (Block 1008).

In an embodiment, when the interface enters revision mode, every alterable block that was not already frozen will become frozen until the interface exits revision mode. Thus, for example, in an embodiment, if several alterable blocks are highlighted, and a user alters one of them by means of touch alteration, then pauses a while, and then begins typing, then during that pause no highlighted alterable block will cease to be highlighted, but when the user begins typing several of them may instantaneously cease to be highlighted.

Interface-Initiated Button Presses

In an embodiment, in certain circumstances, when the interface responds to a user action, the interface may take the initiative to enter a certain special state that is not directly related to that user action, and then later the interface may take the initiative to press a button that causes the interface to exit the special state. In particular, in certain circumstances the interface may automatically enter a final review mode, and later the interface may take the initiative to press a button that causes it to exit final review mode. Final review mode is explained in detail below. When the interface is about to take the initiative to press a button and exit a special state, it may be desirable for the interface to communicate to the user that it is about to do so.

Therefore, in an embodiment, when the interface performs an "interface-initiated button press," for a short amount of time the interface will display some sort of pending button press indication that communicates that it is about to press a button, and if during that amount of time the user performs no interrupting action, then at the end of that amount of time the interface will respond as though the user had pressed the button.

In particular, in an embodiment, when the interface performs an interface-initiated button press, if the user performs no interrupting action, then for the next two seconds the button will be displayed in a visually distinctive way to indicate that the interface is about to press the button. For example, in an embodiment where holding down the button would cause the button to be displayed in a visually distinctive way, for the next two seconds the button will be displayed in the same visually distinctive way as though the user were holding down the button. During those two seconds, the button will pulse slightly brighter three times: once immediately, once after one second has passed, and once after two seconds have passed. At the end of those two seconds, the interface will respond as though the user had pressed and released the button.

Remote Alteration Controls

In an embodiment, when a user action will cause the alterable block of an alterable decision to no longer be visible on the screen, if the decision's probability of alteration immediately prior to the user action was above a certain "remote alteration threshold," then a small control will appear that enables the user to alter the decision even while its alterable block is not currently visible. (In an embodiment, this behavior is not applicable to any alterable interface decision that has no alterable block.) Such a control will be referred to herein as a "remote alteration control," and this feature will be referred to as "the remote alteration feature." In an embodiment, the remote alteration threshold will be moderately high. In an embodiment, a remote alteration control constitutes a change flag, and a user can dismiss it by dragging it a certain minimum distance and then releasing it.

In an embodiment, if a single user action will first cause the interface to make an alterable decision and then cause that decision's alterable block to no longer be visible on the screen, if the decision's initial probability of alteration is above the remote alteration threshold, then a remote alteration control will appear. For example, in an embodiment, if a user has typed a word such that an autocorrection is pending but has not yet occurred, and then the user clicks a button that both triggers the autocorrection and causes the computing device to switch away from the document editing screen to the home screen, then if the interface's decision to perform the autocorrection is an alterable decision with a high probability of alteration, a remote alteration control will appear.

Figure 11A:
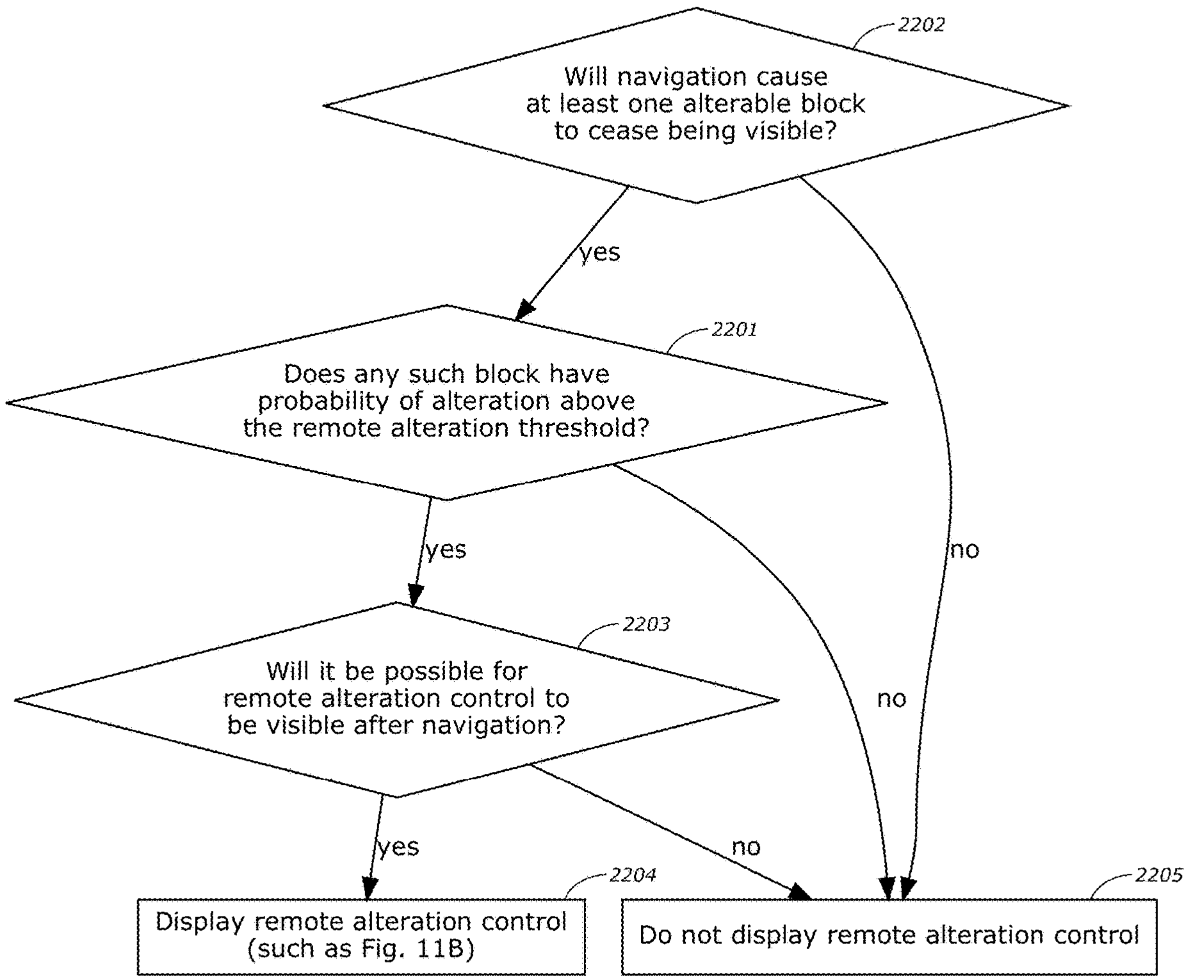
FIG. 11A is a flowchart that illustrates an example decision-making process for determining whether to display a remote alteration control.

FIG. 11A is a flowchart that illustrates the decision-making process for determining whether to display a remote alteration control. The process includes a series of three questions. In each case, if the answer to the question is no, then the interface will not display a remote alteration control (Block 1105). If the answer is yes, the process continues with the next question until all questions have been answered. Specifically, Block 1101 asks, "Will navigation cause at least one alterable block to cease being visible?" Block 1102 asks, "Does any such block have probability of alteration above the remote alteration threshold?" Block 1103 asks, "Will it be possible for remote alteration control to be visible after navigation?" If the answer to all three questions is yes, then the interface will display a remote alteration control (Block 1104).

In an embodiment, a remote alteration control constitutes a block descriptor for its associated alterable decision, but in addition to including a brief description of the currently selected option of the alterable decision, it also includes a Back button. In an embodiment, such a Back button is not labeled with the word "Back," but is instead labeled with a simple graphic such as the arrow (1107) in FIG. 11B.

In an embodiment, when a user performs an action that will cause a remote alteration control to become visible, before the interface handles that action, while the alterable block of the relevant alterable decision is still visible on the screen, the interface will slightly dim the entire screen except the alterable block of that alterable decision. The interface will then make the remote alteration control appear; it will not be dimmed either. The interface will if possible initially position the remote alteration control where its brief description of the alterable decision is positioned directly in front of the actual alterable block of the alterable decision; in fact, if the brief description of the alterable decision consists of the actual alterable block of the alterable decision, then the interface will if possible initially position the remote alteration control in such a way that the actual alterable block of the alterable decision does not appear to be occluded, because that portion of the remote alteration control shows an image that is identical to the alterable block that is behind it. In an embodiment, once the remote alteration control is in place, the interface will restore the entire screen to its ordinary brightness. In an embodiment, this entire transition process will occur quite rapidly; it is intended to help the user perceive the continuity between the alterable decision and its remote alteration control, and is not intended to slow the user down. The interface will then handle the user's action that causes the actual alterable block of the alterable decision to no longer be visible; the remote alteration control will continue to be visible.

In an embodiment, once the actual alterable block of the alterable decision is no longer visible, regardless of what is displayed on the screen, its remote alteration control will continue to be visible as a window that is always in front. (Allowing some other window to come to the front and occlude the remote alteration control would defeat the purpose.) In an embodiment, by default, once the actual alterable block of its alterable decision is no longer visible, a remote alteration control will move at a moderately slow pace towards some particular destination where it is relatively unlikely to occlude especially important portions of the window that is behind it. For example, in an embodiment, when only one remote alteration control is visible, its destination is by default the upper right corner of the display of the computing device; when multiple remote alteration controls are visible simultaneously, one's destination is the upper right corner, another's is immediately below that, and so forth. In an embodiment, whenever a remote alteration control would occlude the input cursor, its destination will become a different location. In an embodiment, an application may override the default destination for any remote alteration controls that are visible while the application is open; for example, if in a particular application it is especially important for the upper right corner to not be occluded, then the application may be configured to request that any remote alteration controls that will partially occlude the application window be redirected to the lower right corner.

In an embodiment, actuating the Back button of a remote alteration control will cause the interface to undo whatever navigation caused the alterable block of the alterable interface decision to no longer be visible, so that the alterable block becomes visible once again. The remote alteration control will then disappear. (In rare cases, while a remote alteration control is visible a user may first cause the interface to make a new alterable decision that has a very high probability of alteration and then actuate the Back button of the remote alteration control, which may cause the alterable block of the new alterable decision to no longer be visible and cause a new remote alteration control to appear.)

In an embodiment, the touch alteration feature is applicable to the brief description of the alterable decision within a remote alteration control: touching the description will cause the interface to alter the decision, and will accordingly update the brief description of the alterable decision.

In an embodiment, a remote alteration control is an attention object with a high attention factor, and increases to its attention score cause the probability of alteration of its alterable decision to decrease as though it were the alterable block of that alterable decision. In an embodiment, when the probability of alteration of the alterable decision of a remote alteration control has fallen below a certain threshold, and at least a certain minimum amount of time has elapsed since the remote alteration control appeared (such as, in an embodiment, one second), the interface will initiate dismissal of the remote alteration control, as explained below. In an embodiment, such dismissal will be interrupted if the user interacts with the remote alteration control after the interface has initiated dismissal but while the remote alteration control is still visible. In an embodiment, if the interface initiates dismissal of the remote alteration control and this does cause the remote alteration control to disappear, this will not constitute explicitly selecting the currently selected option of the relevant alterable interface decision; it will only cause the remote alteration control to disappear.

However, in an embodiment, if while a remote alteration control is visible a user causes the interface to alter a decision, then (as described above) the interface will enter revision mode, which will temporarily prevent probabilities of alteration from continuing to decrease, which will then prevent the interface from initiating dismissal of the remote alteration control until the interface exits revision mode. In an embodiment, if the interface initiates dismissal of a remote alteration control but before the remote alteration control disappears the interface is interrupted by an action such as an alteration that causes the interface to enter revision mode, then the interface will not again initiate dismissal of the remote alteration control until the interface exits revision mode.

In an embodiment, when the interface initiates dismissal of a remote alteration control, the remote alteration control will become slightly transparent in order to communicate that it is about to disappear. For a short amount of time the remote alteration control will remain visible, and if during that amount of time the user performs no interrupting action, then at the end of that amount of time the remote alteration control will disappear. In an embodiment, the visual cues that indicate that the remote alteration control is about to disappear will be timed the same as the visual cues associated with an interface-initiated button press; for example, in an embodiment, when the interface performs an interface-initiated button press, during the next two seconds the button will pulse slightly brighter three times and then the interface will respond as though the user had pressed and released the button, and similarly, when the interface initiates dismissal of a remote alteration control, during the next two seconds the remote alteration control will flicker to a more transparent state three times and then the remote alteration control will disappear.

Figure 11B:
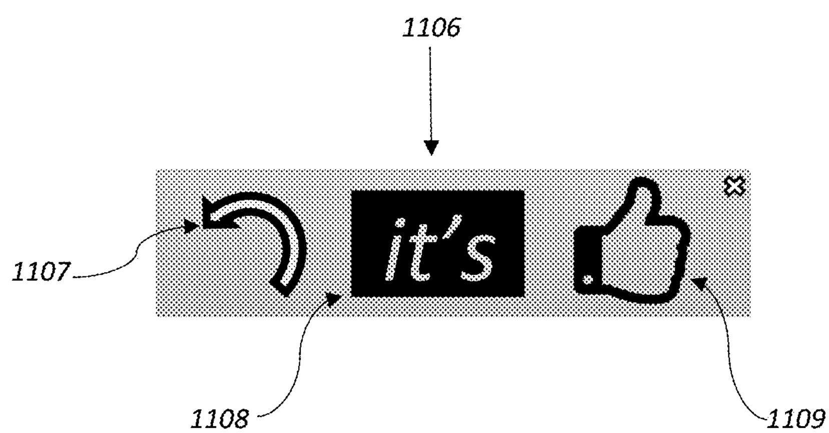
FIG. 11B illustrates an example remote alteration control.

In an alternative embodiment, a remote alteration control includes three components, which arranged from left to right consist of a Back button, a brief description of the alterable decision, and an Accept button. In an embodiment, the Accept button is not labeled with the word "Accept," but is instead labeled with a simple graphic such as a small letter X or a thumbs-up icon. In an embodiment, actuating such an Accept button will constitute explicitly selecting the currently selected option of the associated alterable interface decision, and will cause the remote alteration control to disappear. In such an embodiment, when the interface initiates dismissal of a remote alteration control, it will perform an interface-initiated button press of the Accept button. Such a three-component remote alteration control (1106) is depicted in FIG. 11B, which includes a Back button (1107), a brief description of the alterable decision (1108), and an Accept button (1109).

For example, in an embodiment, if a user types the word “its” within a certain document and then presses a button that will cause the interface to switch away from the application in which the user is editing the document, and pressing this button triggers an alterable interface decision to convert the word “its” to “it’s,” and this decision has a high probability of alteration, then when the interface switches away from the application in which the user is editing the document, a remote alteration control will appear for that alterable decision. If the user is satisfied with the interface’s decision, the user can ignore the remote alteration control and it will soon disappear; if the user is unsatisfied with the interface’s decision, the user can quickly correct this mistake by touching the word “it’s” in the remote alteration control, without any need to actually return to the location of the mistake.

Final Review Mode

In an embodiment, when a user invokes an interface command such that it is especially desirable to correct all mistakes before the command is executed (in the judgment of the interface designer), then if any alterable decision exists such that its probability of alteration immediately before the invocation of the command was above a certain “completion threshold,” then the interface will not immediately execute the command. Instead, the interface will immediately enter a “final review mode.” Such an interface command will be referred to herein as a “completion command,” and this feature will be referred to herein as the “final review feature.”

In an embodiment that has the remote alteration feature described above, if the only reason that it is especially desirable to correct all mistakes before a particular interface command is executed is that the particular command will cause currently visible input to no longer be visible, then it may not be necessary for the command to be treated as a completion command if the remote alteration feature will make it possible to correct mistakes even after the currently visible input is no longer visible. For example, in an embodiment without the remote alteration feature, or in an embodiment where remote alteration controls cannot be displayed in the home screen of a computing device, if a user is editing a text document, and an alterable decision that is visible has a very high probability of alteration, and the user presses a button that invokes a command that will cause the computing device to switch away from the document editing screen to the home screen, then it may be desirable for the command the user invokes to be treated as a completion command so that the user can alter the decision if desired before it is no longer visible; but in an embodiment where remote alteration controls can be displayed in the home screen of a computing device, in such circumstances, it may be preferable for the interface to go ahead and switch away from the document editing screen and display a remote alteration control so the user can either alter the decision or proceed with whatever the user intended to do on the home screen without necessarily being delayed.

In an embodiment, if the invocation of a completion command itself triggers an alterable interface decision, then such an alterable decision may cause the interface to enter final review mode if its probability of alteration is above the completion threshold. For example, in an embodiment, if a user of an email app has typed a word such that an autocorrection is pending but has not yet occurred, and the user clicks the Send button, and the interface makes an alterable decision to perform the autocorrection, and this alterable decision has a high probability of alteration, then the interface will not immediately send the email, but will instead enter final review mode.

In an embodiment, while the interface is in final review mode, the interface will be in intensified alterable decision review mode as described in Chapter 5, so that alterable decisions are more readily visible.

Figure 12A:
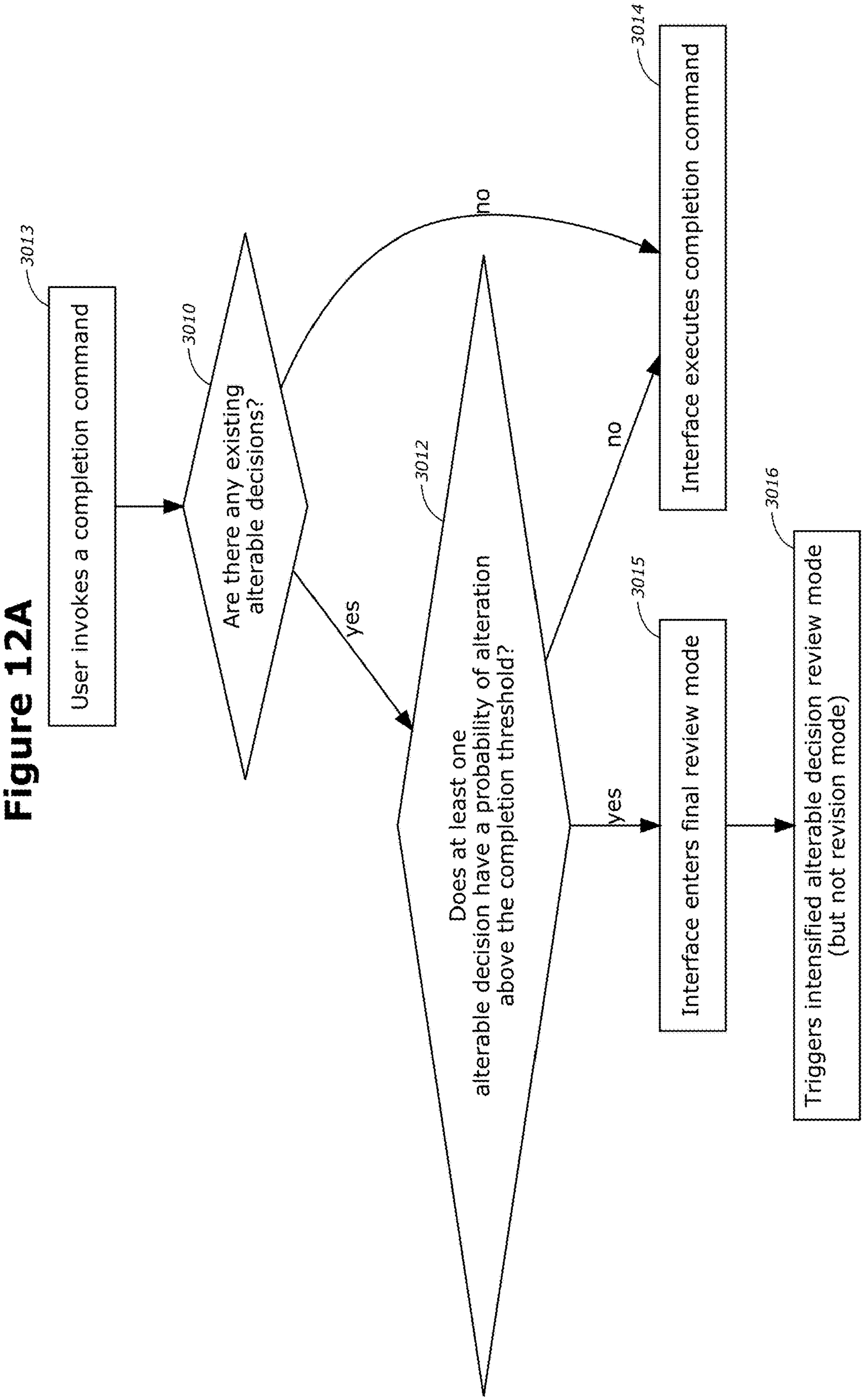
FIG. 12A is a flowchart that illustrates a method for deciding whether the interface enters a final review mode in response to a completion command, according to one embodiment.

FIG. 12A is a flowchart that illustrates the process of deciding whether the interface enters final review mode in response to a completion command, in an embodiment. Block 1201 says “User invokes a completion command” and proceeds to Block 1202, which asks, “Are there any existing alterable decisions?” If the answer is no, the interface executes the completion command (Block 1206). If the answer is yes, the process continues with Block 1203, which asks, “Does at least one alterable decision have a probability of alteration above the completion threshold?” If the answer to this question is no, the interface executes the completion command (Block 1206). If the answer is yes, the interface enters final review mode (Block 1204) which also triggers the intensified alterable decision review mode described in Chapter 5 (Block 1205). The interface’s operation while in final review mode is described in FIG. 12B.

In an embodiment, while the interface is in final review mode, if the user again invokes the same completion command that caused the interface to enter final review mode, the interface will immediately exit final review mode and execute the command. In an embodiment, if the completion command that caused the interface to enter final review mode was invoked by means of clicking or pressing a button on the screen, then if that button is sufficiently large, its label will change to “Yes to All.” In an embodiment, if the completion command that caused the interface to enter final review mode was invoked by means of clicking or touching a location on the screen other than a button that is sufficiently large to be labeled “Yes to All,” then a new button labeled “Yes to All” will appear; if this new button can appear at the location the user clicked or touched without obscuring any highlighted alterable interface decision, then it will appear there. While the interface is in final review mode, if the user presses the “Yes to All” button, the interface will immediately exit final review mode and execute the completion command, and this constitutes explicitly selecting the currently selected option of every alterable decision that was highlighted.

In an embodiment, while the interface is in final review mode, a button will appear that says “Cancel.” If the user presses the button, then the interface will exit final review mode but will not execute the completion command, and will instead enter revision mode.

In an embodiment, when the interface exits final review mode, the “Yes to All” button and the “Cancel” button will disappear.

In an embodiment, while the interface is in final review mode, when the probability of alteration of every alterable decision has dropped below a certain “review expiration threshold," and at least a certain minimum amount of time has elapsed since the interface entered final review mode (such as, in an embodiment, one second), the interface will perform an interface-initiated button press of the "Yes to All" button. However, in an embodiment, if while the interface is in final review mode a user causes the interface to alter a decision, then (as described above) the interface will enter revision mode, which will temporarily prevent probabilities of alteration from continuing to drop, which will then prevent the interface-initiated button press of the "Yes to All" button. In an embodiment, if the interface begins to perform the interface-initiated button press but is interrupted by an action such as an alteration that causes the interface to enter revision mode, then the interface will not perform another interface-initiated button press until the interface exits revision mode.

Figure 12B:
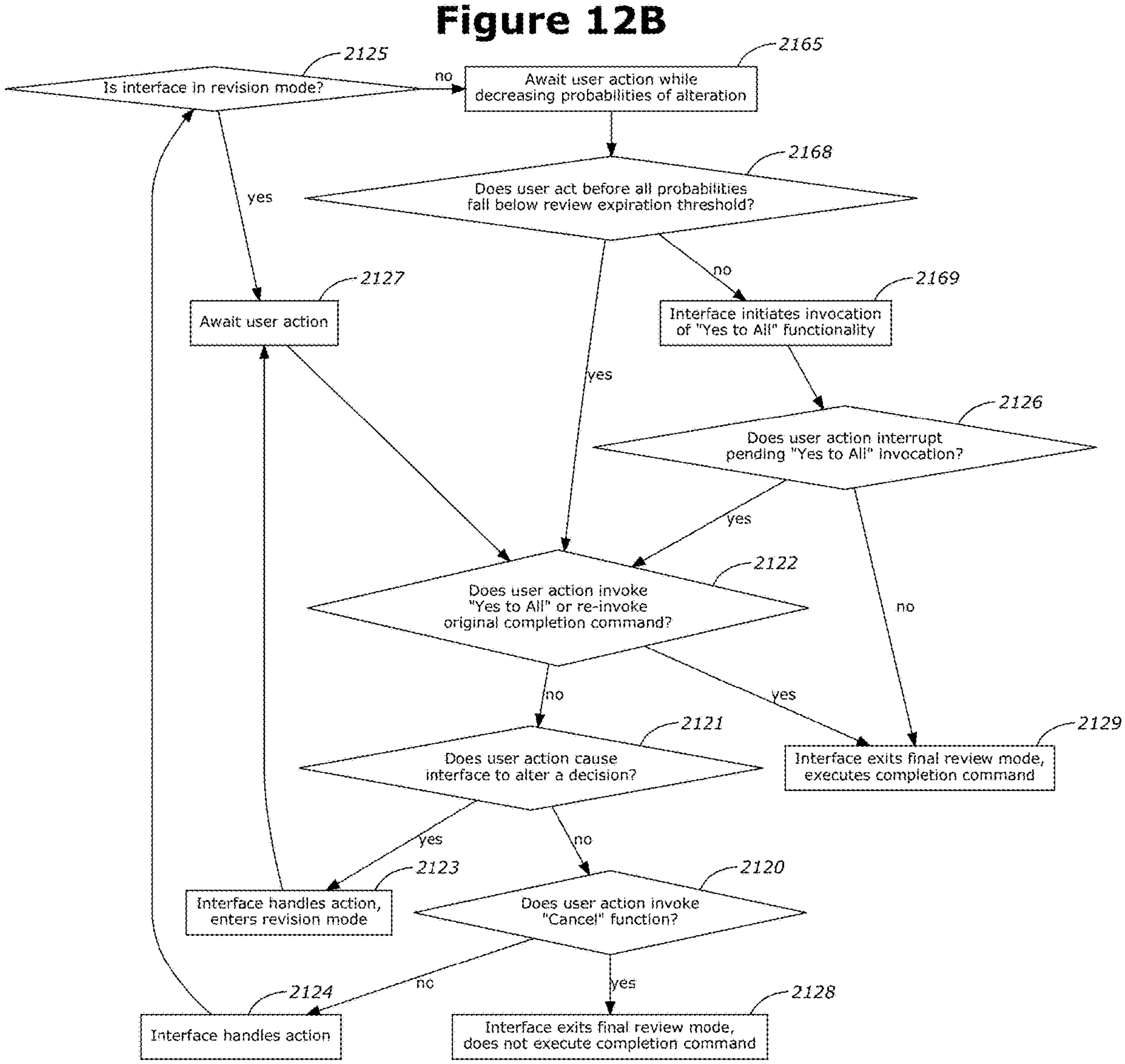
FIG. 12B is a flowchart that illustrates an example method for interface operation while in a final review mode.

FIG. 12B illustrates the behavior of the interface while in final review mode, in an embodiment. When the interface is not also in revision mode (1217), the interface awaits user action while decreasing probabilities of alteration (1207) to see whether the user acts before all such probabilities fall below the review expiration threshold (1208). If the user fails to act before this occurs, the interface initiates invocation of the "Yes to All" functionality (1209), and then if no user action interrupts the pending "Yes to All" invocation (1210), the interface exits final review mode and executes the completion command (1219). If user action does interrupt the pending "Yes to All" invocation (1210), or if the user acts prior to having all probabilities fall below the review expiration threshold (1208), then the interface will respond to the user's action as described in the following paragraph. When the interface is in revision mode, dawaits user action without decreasing probabilities of alteration (1214).

Continuing the explanation of FIG. 12B, when the interface is in final review mode and responds to a user's action, if the invokes the "Yes to All" command or re-invokes the original completion command (1211), then the interface exits final review mode and executes the command (1219). If not, and if the user's action caused the interface to alter a decision (1212), the interface handles the action and enters revision mode if it was not already in revision mode (1213) to await further user action (1214). If the user action invokes no completion-type command and does not cause the interface to alter a decision, Block 1215 queries whether the user action invoked the "Cancel" function. If so, the interface exits final review mode but does not execute any completion command (1218). If not, the interface handles the action (1216) appropriate to the user's input, whereupon the interface once again awaits a user action in a way that depends on whether or not it is in revision mode (1217).

In an embodiment, multiple distinct interface commands may constitute completion commands for purposes of the final review feature, and different completion commands may have different completion thresholds. Generally, a completion threshold should be lower for a command where mistakes would be especially annoying than for a command where mistakes would be only a minor nuisance (in the judgment of the interface designer). For example, in an embodiment, if a user begins to draft a text message and then presses a button that will cause the interface to switch to a different application where remote alteration controls are not available, then the final review feature will be invoked only if an alterable interface decision had a very high probability of alteration when the button was pressed, but if a user presses the Send button to send a text message, then the final review feature will be invoked if any alterable interface decision had at least a medium probability of alteration when the button was pressed.

The capabilities of the final review feature described above intersect with the capabilities of the "Transient Panel Enabling Message Correction Capabilities Prior to Data Submission" that is disclosed in U.S. patent application Ser. No. 13/562,489 insofar as both that transient panel feature and this final review feature may delay the execution of a command to send a text message and cause an interface to enter a mode that facilitates correction of mistakes. However, in some embodiments, this final review feature is dissimilar to that transient panel feature in various ways: The final review feature may be applied not only to a command to send a text message, but also to any other command such that it is especially desirable to correct all mistakes before the command is executed. The final review feature may facilitate correcting not only mistakes introduced by autocorrection functionality, but also a wide variety of other types of mistakes. The final review feature will not necessarily be triggered whenever a user would send a text message that has been affected by autocorrection functionality, but only when such a text message has an alterable decision that has a probability of alteration that is above a certain threshold; for example, in an embodiment, the final review feature would not be invoked if the only autocorrection that had occurred was a spelling change from "spontanious" to "spontaneous" that was assigned a very low probability of alteration. Also, the mechanism by which the final review feature facilitates correction of mistakes is quite different: rather than bringing up a special transient panel that had not previously been visible, the final review feature causes the interface to highlight potential mistakes that were already visible.

Ensuring Alteration Opportunities in Perspective

In an embodiment that highlights alterable decisions only when their probabilities of alteration are above a certain highlighting threshold (as described in Chapter 5), it may be especially advantageous for the interface to reduce probabilities of alteration as described in the present chapter, so that a user who does not wish to alter a highlighted alterable decision can cause the highlighting to disappear simply by ignoring the highlighted alterable decision long enough.

In an embodiment that has the remote alteration feature and/or the final review mode feature, it may be the case that it is relatively rare for these features to be invoked and facilitate recovery from actual mistakes, but these features may nevertheless be quite advantageous, because in the cases where these features do facilitate recovery from actual mistakes, such mistakes generally would have been quite inconvenient to recover from otherwise.

Chapter 14: Targeted Alteration

Decisions with Multiple Alterable Blocks

In an embodiment, each alterable block includes all input that was directly affected by the outcome of its alterable decision, but optionally, an alterable block may also include additional input that was not affected by the outcome of the decision. For certain decisions, more than one alterable block may make sense. For example, in an embodiment where the interface may make an alterable decision to convert x2 to $x^2$, either the exponent 2 or the entire exponential expression $x^2$ could be the alterable block of such a decision.

In the present specification, two "block alteration features" are described that may cause the interface to alter a decision if a user interacts with its alterable block in a particular way. (These features are the targeted alteration feature that is described in the present chapter, which may cause the interface to alter a decision if a user selects its alterable block and actuates the alteration key, and the automatic decision variation feature that is described in Chapter 17, which may cause the interface to alter a decision if a user manually deletes and retypes its alterable block.) In an embodiment, the portion of input that constitutes the alterable block of an alterable interface decision for purposes of either or both of these block alteration features need not be identical to the portion of input that constitutes the alterable block for purposes of other features described herein (such as highlighting).

In an embodiment, an alterable interface decision may have more than one distinct alterable block for purposes of block alteration features. In particular, in an embodiment, if the alterable block of an alterable interface decision has one or more characters at the beginning that will not change if the decision is altered, then for purposes of block alteration features, in addition to its full alterable block, the decision also has another alterable block that does not include the characters at the beginning that will not change if the decision is altered. For example, in an embodiment, if the interface makes an alterable decision to convert x2 to $x^2$, then the entire exponential expression $x^2$ is the alterable block of that decision for purposes of highlighting, but for purposes of block alteration features, in addition to that full alterable block, the decision also has another alterable block that consists of just the numeral 2, so for example the automatic decision variation feature may be invoked if either the user manually deletes and retypes just the numeral 2 or the user manually deletes and retypes x2.

In an embodiment, if an alterable interface decision is a multi-alternative decision and the decision has one or more characters at the beginning that will not change if the decision is altered so that a particular alternate option becomes selected but will change if the decision is altered so that some other alternate option becomes selected, then the decision will have more than one distinct alterable block for purposes of block alteration features. For each particular alternate option of such a decision, the decision will have an "option-specific alterable block" that consists of the decision's full alterable block less any characters at the beginning of the alterable block that will not change if the decision is altered so that particular alternate option becomes selected. If such a decision has an alternate option such that selecting the option would cause every character of the alterable block to change, then that option's option-specific alterable block will equal the decision's full alterable block. For example, if the full alterable block of an alterable interface decision consists of the expression $\sqrt{1+3+5}$, and the decision has one alternate option such that selecting the option would yield $\sqrt{1}+3+5$ and another alternate option such that selecting the option would yield $\sqrt{1+3}+5$, then for purposes of block alteration features, in addition to the decision's full alterable block, the decision also has an option-specific alterable block that does not include $\sqrt{1}$ at the beginning and an option-specific alterable block that does not include $\sqrt{1+3}$ at the beginning.

In an embodiment, for any alterable interface decision that does not have option-specific alterable blocks as described in the preceding paragraph, every alternate option of the decision is a "relevant alternate option" for every alterable block of the decision. For any alterable interface decision that does have option-specific alterable blocks, each alternate option of the decision is a "relevant alternate option" for its option-specific alterable block, and not for any other option-specific alterable block. If multiple alternate options happen to have the same option-specific alterable block, all of them are relevant alternate options for that option-specific alterable block. If the decision's full alterable block is not an option-specific alterable block for any particular alternate option, then every alternate option of the decision is a relevant alternate option for the decision's full alterable block.

Targeted Alteration

In an embodiment, while a range of input is selected or a range of multiple spreadsheet cells is selected, the selected range is "targeted for alteration." In an embodiment, if a user selects an individual cell of a spreadsheet by means of clicking on that cell or touching that cell, and then the user's next action is an actuation of the alteration key, then the selected cell is targeted for alteration and remains targeted for alteration until the user performs some action that does not pertain to alteration functionality.

In the present chapter, a selection that is targeted for alteration will be referred to as a "target." In an embodiment, for purposes of the behaviors described in the present chapter, an alterable block is "targeted" if the target consists of the entire alterable block and nothing more. Additionally, in an embodiment, if an alterable block is noncontiguous, then it also is "targeted" if the target consists of the entire alterable block plus all the other input that is between the various contiguous portions of the alterable block, or if the target consists of a single entire contiguous portion of the alterable block.

The targeted alteration feature is a block alteration feature for purposes of the interface behaviors described above, so in an embodiment, an alterable interface decision may have more than one distinct alterable block for purposes of the targeted alteration feature. An alterable interface decision is "selected" if it has any alterable block that is targeted.

In an embodiment, while a selection is targeted for alteration, the interface will treat any alterable interface decision that is selected as more relevant than any alterable interface decision that is not selected. In an alternative embodiment, while a selection is targeted for alteration, the interface will respond to any actuation of the alteration key as though no alterable interface decisions exist except those that are selected. An embodiment that behaves in either of these ways will be said to have the "targeted alteration feature."

In an embodiment, as a special case, while a selection is targeted for alteration, if a multi-alternative decision has an alterable block that is targeted but at least one alternate option of the decision is not a relevant alternate option for that particular alterable block (as defined above), then the multi-alternative decision will be separated into two partial decisions. The first partial decision will have the same default option as the original multi-alternative decision but have only the alternate options that are relevant alternate options for the alterable block that is targeted; the interface will treat this first partial decision as though it is selected, and so it is more relevant than any decision that is not selected. The second partial decision will have the same default option as the original multi-alternative decision but have only the alternate options that are not relevant alternate options for the alterable block that is targeted; the interface will treat this decision as though it is not selected. For example, in an embodiment, if the full alterable block of an alterable interface decision consists of the expression $\sqrt{1++3+5}$, and the decision has a first alternate option such that selecting the option would yield $\sqrt{1}+3+5$ and a second alternate option such that selecting the option would yield $\sqrt{1+3}+5$, then +5 is an option-specific alterable block for the second alternate option, so if a user selects +5 and actuates the alteration key once, then this actuation of the alteration key will definitely yield the second alternate option rather than the first alternate option, because the second alternate option is a relevant alternate option in those circumstances and the first alternate option is not.

In an embodiment, while a selection is targeted for alteration, if at least one alterable interface decision exists that is selected, then the most relevant such decision will be treated as a highlighted alterable decision for purposes of alteration functionality, regardless of whether that decision's probability of alteration is above any particular threshold. Thus, in such an embodiment, if the embodiment has the touch alteration feature and a user wishes to alter an alterable interface decision by means of the touch alteration feature but the decision is not yet highlighted, then the user can alter that decision by first selecting the range of input that constitutes the decision's alterable block and then invoking the touch alteration feature.

In an embodiment, while a selection is targeted for alteration, if an alterable interface decision that is selected is not a "targeted alterable interface decision" as defined below, then that alterable decision not only will be treated as a highlighted alterable decision for purposes of alteration functionality, but also will be displayed as a highlighted alterable decision. Such behavior may be advantageous in an embodiment that can simultaneously provide visual indications that a range of input is selected and that the range of input is a highlighted alterable block. For example, in an embodiment where selected input has a gray background color (instead of white) and a highlighted alterable block has a green foreground color (instead of black), if a user selects a certain word that is an alterable block, the interface can simultaneously indicate that the word is selected and that it is a highlighted alterable block by displaying the input with a gray background color and a green foreground color. In an alternative embodiment, while a selection is targeted for alteration, any alterable interface decision that is selected will be displayed as a highlighted alterable decision, whether or not it is a targeted alterable interface decision.

Targeted Alterable Decisions

In an embodiment, when a selection becomes targeted for alteration, the interface may cause one or more additional alterable interface decisions to temporarily exist that have the target as their alterable block; such decisions are referred to herein as "targeted alterable interface decisions." As soon as that selection is no longer targeted for alteration, all its targeted alterable interface decisions that still have their original default option selected will cease to exist. (A particular type of targeted alterable interface decision is described in detail in Chapter 34.)

In an embodiment, when the interface causes a targeted alterable interface decision to temporarily exist, the interface will delete any alternate option of such a decision that would yield an outcome that is identical to an outcome that could instead be achieved by altering some other alterable interface decision that is not a targeted alterable interface decision, and then if the decision has no alternate options remaining, the interface will delete the decision. For example, if the interface has already made an alterable decision such that altering the decision would cause a certain word to be displayed in a bold font, and the interface subsequently causes a single-alternative targeted alterable interface decision to temporarily exist such that altering this targeted alterable interface decision would cause the same word to be displayed in the same bold font, then the interface will immediately delete this targeted alterable interface decision.

Automatic Selection Menus

In certain smartphone interfaces, whenever a user selects a range of input, the interface will automatically open a small single-line menu that includes options such as "Copy," "Cut," and "Paste." In the present section, menu options such as "Copy," "Cut," and "Paste" that are not options of alterable interface decisions are referred to as "standard menu options."

In an embodiment, if the interface automatically opens a menu when a user selects a range of input (as certain smartphone interfaces typically do), then when this occurs, the selection will be targeted for alteration and the menu that appears will include a menu option corresponding to each alternate option of each alterable interface decision that has an alterable block that is the selection, including any targeted alterable interface decisions that temporarily exist. Such a menu may also include standard menu options. In an alternative embodiment, such a menu will include not only the alternate options but also the default option of each alterable interface decision that has an alterable block that is the selection, possibly with some distinguishing mark or distinguishing highlight to indicate that the default option is currently selected.

In an embodiment, when a user selects a range of input and the interface immediately opens a menu that includes alternate options of alterable interface decisions as described in the preceding paragraph, alternate options that have probabilities of alteration that are above a certain threshold will be listed before any standard menu options. In such an embodiment, an alternate option that a user is particularly likely to wish to select may be particularly likely to be initially visible when the interface opens such a menu, so a user who wishes to alter a decision by means of such a menu may not usually need to make an additional effort to view additional menu options that are not initially visible.

Chapter 15: Special Alterable Decisions

Undefined Options

In some circumstances, the interface may be able to determine that it is likely that a mistake has occurred at a certain location without being able to make a plausible guess as to the nature of the desired correction. For example, if a user types "invoyypkf," the interface may be able to determine that it is likely that the user has made a word entry mistake without being able to make a plausible guess as to what word the user actually intended to type.

In an embodiment, an alterable interface decision may have an "undefined option," and if a user causes the interface to select the undefined option, then the alterable block for that option will initially consist of an empty region, and the interface will move the input cursor into this alterable block so that the user can enter new input for the undefined option; the interface will then be in "option definition mode." Once the user has entered any new input for the undefined option, that option will no longer be an undefined option: it will be a "user-defined option." If the user presses Enter or alters the decision again while the interface is in option definition mode, then the interface will exit option definition mode and will restore the input cursor to its previous location. For example, in such an embodiment, if a user mistakenly types "invoyypkf" and the interface creates an alterable interface decision with "invoyypkf" as the default option and an undefined option as the alternate option, then a user can replace "invoyypkf" with the desired result by first causing the interface to alter the decision, then typing the desired result, and then pressing Enter, without any need to explicitly navigate to the location of the mistake or explicitly delete the undesired result.

In an embodiment, while the interface is in option definition mode, it will also be in revision mode as defined in Chapter 13.

In an embodiment, while the interface is in option definition mode, if the user performs an action such as a cursor navigation action that moves the input cursor outside the alterable block of the alterable decision, then the interface will exit option definition mode without restoring the cursor to its previous location.

In an embodiment, if the user actuates the Escape key while the interface is in option definition mode, then the interface will discard any new input that the user has entered within the alterable block of the previously undefined option, so if the option has become a user-defined option then it will revert to an undefined option, and the interface will revert the alterable decision to its default option; also, the interface will exit option definition mode and will restore the input cursor to its previous location.

Figure 13:
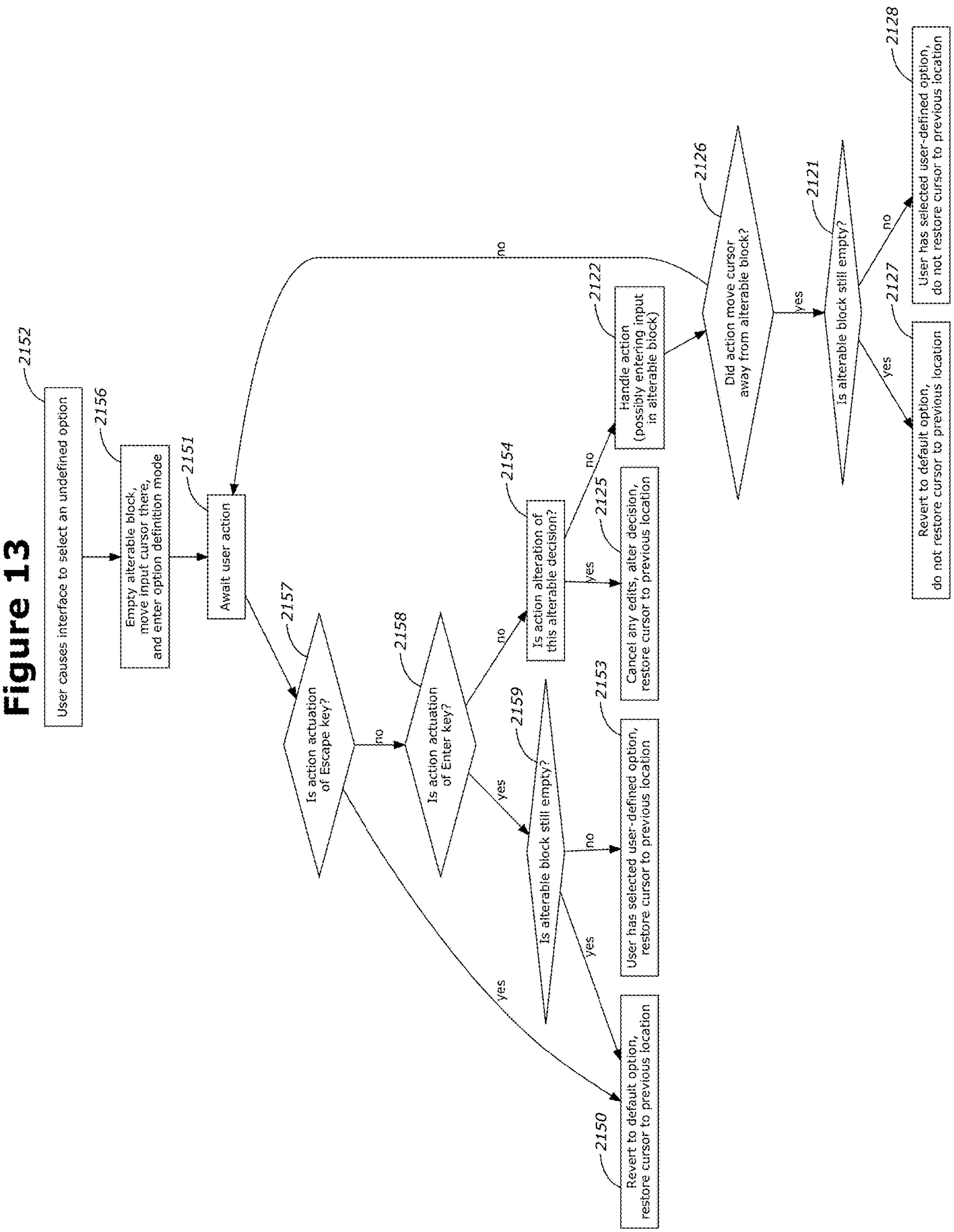
FIG. 13 is a flowchart that illustrates an example method for interface operation while in an option definition mode.

FIG. 13 is a flowchart that illustrates the behavior described above.

According to the flowchart, once a user causes the interface to select an undefined option (Block 1301), the interface will enter option definition mode, empty the alterable block, and move the input cursor into the alterable block (Block 1302). The interface will then await the user's next action (Block 1303). While the interface is in option definition mode, if the user actuates the Escape key (Block 1304) then the interface will exit option definition mode, revert the alterable decision to its default option, and restore the input cursor to the location where it was before the interface entered option definition mode (Block 1307). While the interface is in option definition mode, if the user presses Enter (Block 1305) while the alterable block is still empty (Block 1306), then this will have the same effect as pressing the Escape key. However, if the user presses Enter (Block 1305) when the alterable block is not empty (Block 1306), then the user has selected a user-defined option for the alterable decision, and the interface will exit option definition mode and restore the input cursor to its previous location (Block 1308). While the interface is in option definition mode, if the user does not press Enter or Escape but does perform an action that causes the interface to alter the same alterable decision again (Block 1309), then the interface will cancel any changes to the undefined option that may have occurred and alter the decision, and will exit option definition mode and restore the input cursor to its previous location.

Continuing the explanation of FIG. 13, while the interface is in option definition mode if the user performs an action other than pressing Escape or Enter or altering the decision, the interface will handle the action normally (Block 1311). This action may for example be the entry of input into the alterable block. Unless the action is a cursor navigation action that moved the cursor away from the alterable block, the interface will remain in option definition mode and await the next user action (Block 1303). If the action is a cursor navigation action that moved the cursor away from the alterable block, then if the alterable block is still empty then the interface will revert the alterable decision to its default option (Block 1314), and if not then the user has explicitly selected the user-defined option (Block 1315); in either case, the interface will exit option definition mode without restoring the input cursor to the location it was in before the interface entered option definition mode.

In an embodiment, if the user enters more than a certain amount of input while the interface is in option definition mode, then the interface will include only a limited amount of that input within the alterable block of the user-defined option, and will regard the user's subsequent input as though the user had moved the cursor outside the alterable block before entering that input. For example, in an embodiment, after the interface alters an alterable interface decision so that an undefined option is selected, if a user enters up to three words and then presses Enter or Escape or moves the cursor outside the alterable block, then the interface will include the user's entire entry within the user-defined option, but if a user enters a fourth word the interface will adjust the boundaries of the alterable block so that the user-defined option contains only the first word, and will exit option definition mode.

In an embodiment that provides brief text descriptions for options of alterable interface decisions, if a multi-alternative alterable interface decision has an undefined option, then the interface will briefly describe such an option as "Other . . . ". For example, if a user types "Ihda" and the interface makes a multi-alternative decision not to correct this potential word entry mistake, then a menu of brief descriptions of the alternate options might include "I had" and "Other . . . ". In an embodiment, if a single-alternative alterable interface decision has an undefined option, the interface will briefly describe such an option as "Correct this . . . ", or where a very brief text description is required, the interface will very briefly describe such an option as "Fix."

Dialog Options

In an embodiment, an alterable interface decision may have a "dialog option," and when a dialog option of an alterable interface decision becomes selected, a dialog box will appear that permits the user to specify in more detail the desired outcome of the interface decision.

In an embodiment, after a dialog option becomes selected, if the user alters the decision so that the particular dialog option is no longer selected, the dialog box will disappear. Conversely, in an embodiment, after a dialog option becomes selected, if the user actuates the Cancel button of the dialog box or dismisses the dialog box by some other means, then if the relevant alterable interface decision is still alterable, the relevant alterable interface decision will revert to its default option (if the dialog option was not the default option).

In an embodiment, when a dialog option becomes selected, if the user fills in the required information in the dialog box and actuates the OK button, or if the user completes the dialog box by some other means, then the user will be considered to have explicitly selected that option of the alterable interface decision.

For example, in an embodiment, in certain circumstances the interface may make an alterable decision to save a document, and if the user immediately alters the decision, a "Save As . . . " dialog box will appear that allows the user to explicitly choose the name, location, and format in which to save the document. If the user immediately alters the decision again, the dialog box will be dismissed. If the user completes the dialog box, then the interface will cause the net effect of the user's actions to be precisely the same effect that would have been achieved if the user had initially invoked the "Save As . . . " command from a menu rather than invoking the Save command.

Alterable Input State Decisions

In many cases, an interface decision will be a decision regarding input that was typed prior to the decision, and will not directly affect anything that is typed after the decision. For example, a typical autocorrection decision will affect input that was typed prior to the decision, and will not affect the next character the user types. However, in some cases an interface decision may be a decision regarding an input state that affects subsequently typed characters. For example, if the interface makes a decision whether or not to enter a bold font, or whether or not to move the input cursor to a new location, then such a decision will not affect the appearance or position of previously typed characters; instead, such a decision will affect the appearance or position of every subsequently typed character, at least until the user performs some action other than typing characters or until some other event changes the situation.

In the present specification, an "alterable input state decision" is an alterable decision that may affect characters that are typed after the decision occurs. In an embodiment, when a user types another character within or right at the end of the alterable block of an alterable input state decision, that character will be affected by the input state and included in the alterable block of the alterable input state decision, and so the alterable block of such a decision can continue to grow after the decision is made, except as otherwise specified below.

In an embodiment, if the alterable block of an alterable input state decision is an attention object, its attention factor will be increased while the input cursor is within or right at the end of the alterable block, even when the user has not moved the input cursor since the user last performed an editing action, to reflect the fact that it may be easier for a user to notice the results of a decision that is continuing to affect each character the user types. An exception to this behavior is specified below.

In an embodiment, when a user moves the input cursor so that it is outside of and not immediately adjacent to the alterable block of a particular alterable input state decision, that alterable block will permanently cease to grow; if the user then moves the input cursor back within that alterable block and types a character, then the alterable decision will be deleted (which means that it will no longer be alterable by means of alteration functionality). In an embodiment, the first time that a user moves the input cursor so that it is outside of and not immediately adjacent to the alterable block of a particular alterable input state decision, the interface will substantially decrease the probability of alteration of that alterable decision.

For purposes of the present specification, a "current input state decision" is an alterable input state decision such that the user has not yet moved the input cursor out of its alterable block, and so its alterable block may potentially continue to grow.

Multi-Alternative Alterable Input State Decisions

In certain circumstances, a user may correctly expect the interface to make a change to an input state, but may not realize at what point the interface will make such a change. For example, if a user of a math input interface that has an automatic structure exiting feature wishes to type $\sqrt{1+3}+5$, the user may correctly expect the interface to automatically exit the square root when he actuates the plus key, but may not consciously realize that the interface will do so the first time he actuates the plus key, so he may actuate the square root key and then type 1+3+5 in the expectation that this will yield the desired result.

Therefore, in an embodiment, certain types of alterable input state decisions may become multi-alternative alterable decisions. Such an alterable input state decision may have more than one option that corresponds to a result that would obtain if the interface had changed the input state at some particular point; for each such option that is an alternate option, the probability of alteration of that alternate option will reflect the approximate probability that the user expected the interface to change the input state at that particular point, insofar as the interface is able to determine such a probability. For example, in an embodiment, if a user actuates the square root key and then types 1+3+5, then a multi-alternative alterable input state decision will exist that has one option that corresponds to the result that would have obtained if the interface did not exit the square root at all and two distinct options that correspond to the two results that would have obtained if the interface had automatically exited the square root in response to either of the two actuations of the plus key. In such an embodiment, a user can type any of the three expressions $\sqrt{1+3+5}$, $\sqrt{1+3}+5$, and $\sqrt{1}+3+5$ by means of the intuitive keystroke sequence consisting of the square root key followed by 1+3+5, followed if necessary by alteration of the resulting multi-alternative alterable input state decision. (Such alterable structure exiting decisions are explained in detail in Chapter 44.)

In an embodiment, when the input cursor is positioned within the alterable block of a multi-alternative alterable input state decision but not at the very end of the alterable block, the interface will treat any alternate option that corresponds to the result that would have obtained if the interface had changed the input state at that particular point in the alterable block as having a higher probability of alteration than any other alternate option. For example, in an embodiment, if a user types the keystroke sequence [square root] 1+3+5, and the interface yields the result $\sqrt{1}+3+5$, then if the user moves the input cursor to immediately after the numeral 3 and actuates the alteration key once, then the interface will select the alternate option $\sqrt{1+3}+5$ rather than the alternate option $\sqrt{1+3+5}$.

In an embodiment, when the input cursor is positioned at the very end of the alterable block of a multi-alternative alterable input state decision, the interface will treat any alternate option that corresponds to the result that would have obtained if the interface had not changed the input state at all as having a higher probability of alteration than any other alternate option. This behavior may lead to a situation where a user has already realized that it will be desirable to alter a particular alterable input state decision, but where the user can achieve a desired result more rapidly by waiting to alter the decision until after the user has typed more input that is affected by the decision. For example, in an embodiment, if a user who wishes to input $\sqrt{1+3+5}$ types the keystroke sequence [square root] 1+3 and then notices that the result thus far is $\sqrt{1}+3$ due to the automatic structure exiting feature, the user can efficiently achieve the desired result by continuing to type until the result is $\sqrt{1}+3+5$ and then actuating the alteration key once. Because it may thus be advantageous for a user who has noticed the results of a potentially multi-alternative alterable input state decision to deliberately wait to alter the decision until after performing some other actions, in an embodiment, when the alterable block of such a decision is an attention object, its attention factor will not be especially increased in the way that is described above in the initial explanation of alterable input state decisions. (This is the exception that was mentioned in that explanation.)

Potentially Alterable Decisions

In an embodiment, for certain types of interface decisions, the interface will keep track of data regarding such a decision as though the decision were an alterable decision, but for purposes of the alteration functionality disclosed herein, such a decision will actually be alterable only while it meets certain criteria. Such decisions will be referred to herein as "potentially alterable decisions." For example, in an embodiment, in certain circumstances the interface will make a potentially alterable decision that has an alterable block that is initially empty, and the interface will assign the potentially alterable decision a probability of alteration as soon as it makes the decision, but the potentially alterable decision will not actually be alterable and its probability of alteration will have no relevance until a later editing action causes the decision's alterable block to become nonempty. In particular, in some cases it may be advantageous for an alterable input state decision as defined above to be a potentially alterable decision that is not actually alterable until its alterable block is nonempty.

In an embodiment, in some cases the interface may make an optimizable decision (as defined in Chapter 19) such that the decision has no effect on the user's input until the user performs at least one additional action, and such that if a user immediately notices the outcome of such a decision and is not satisfied with the outcome then the user will be able to change the outcome by the ordinary means of changing an outcome for that particular type of decision, possibly with just a single keystroke. In an embodiment, when the interface evaluates the outcome of any such optimizable decision, the interface will do so in such a way as to be able to recognize if a user changed the outcome of the decision regardless of whether or not the user "altered the decision" per se in order to do so. In an embodiment, any such optimizable decision will be implemented as a potentially alterable decision: as soon as the interface makes such an optimizable decision, the interface will keep track of data regarding the decision as though it were an alterable decision, but the decision will actually be alterable only once it has had an effect on the user's input. In an alternative embodiment, such a decision will be implemented as an ordinary alterable decision, and if the decision is altered when it has not had any effect on the user's input, then altering the decision may affect something other than the user's input. In Part III, the present specification will describe various embodiments in which certain such optimizable decisions are implemented as potentially alterable decisions. It is to be understood that for each embodiment in which such a decision is implemented as a potentially alterable decision there is an alternative embodiment in which such a decision is instead implemented as an ordinary alterable decision.

For example, in Chapter 32 an embodiment is described in which the interface may make an optimizable decision whether or not to switch to uppercase mode. Such a decision has no effect on the user's input until the user performs at least one additional action. If a user immediately notices the outcome of such a decision and is not satisfied with the outcome, the user can press the Shift key to change the outcome. In an embodiment, the interface will evaluate the outcome of such a decision based on whether or not the capitalization of the next letter ends up matching the initial outcome of the decision, so if the user presses the Shift key in order to change the outcome of such a decision (and does nothing else to further change its outcome), then the interface will determine that the decision had a non-beneficial outcome. As described in Chapter 32, such an optimizable decision is implemented as a potentially alterable decision, and the decision will actually be alterable only once the user has typed a letter that is affected by the decision; however, it is to be understood that in an alternative embodiment, such an optimizable decision is implemented as an ordinary alterable decision, and if the decision is altered immediately, then altering the decision will have the same effect that pressing the Shift key would have had.

Pseudo-Alterable Decisions

In an embodiment, certain interface decisions are "pseudo-alterable decisions." When the interface makes a pseudo-alterable decision, the interface will keep track of data regarding such a decision as though the decision were an alterable decision, but the decision cannot be a highlighted alterable decision, and the decision cannot be altered by the usual means for altering alterable interface decisions; instead, such a decision can be altered only by some special means, if at all.

In an embodiment, an interface decision may also be a "potentially pseudo-alterable decision," which means that it can be altered only by some special means, and can be altered by that means only while it meets certain criteria.

Also, in an embodiment, an alterable interface decision that is not a pseudo-alterable decision may nevertheless have a pseudo-alternate option, which is like an alternate option except that it can only be selected by some special means.

Chapter 16: Preventing Interface Mistakes

About Part II

Above, Part I of the present specification explains various features that may facilitate mistake recovery, in some embodiments.

Part II of the present specification includes Chapters 16 to 23. Part II explains various features that may cause the the interface to change its own behavior so as to avoid repeating mistakes, and that may educate the user how to achieve desired results more efficiently.

The present chapter discusses how it may be especially advantageous to implement "smart" interface behaviors which are relatively complex in conjunction with features that facilitate mistake recovery.

Chapter 17 explains how the interface can monitor a user's behavior when a user deletes an alterable block, so as to notice if a user immediately deletes an alterable block and then immediately causes the interface to repeat the same alterable decision. Such behavior may often indicate that the user has instinctively deleted a mistake but then repeated the same behavior that led to the mistake in the first place. In an embodiment, the interface will systematically attempt to change its own behavior when appropriate so as to prevent such user behavior from leading to repeated mistakes.

Chapter 18 explains how the interface can monitor a user's behavior so as to notice if a user achieves a result that could have been achieved by altering a decision, but does so by some other means. It may be advantageous for the interface to notice this for two reasons: one, this may help the interface recognize when it has wasted the user's time and should adapt its behavior; two, this may help the interface recognize when the user has wasted his own time and should be informed that there are easier ways to alter decisions.

Chapters 19 to 22 discuss various ways of making particular types of interface decisions be smarter. Chapter 19 explains how to measure whether or not an interface decision has had a beneficial outcome, and how to divide a decision that has more than two outcomes into component decisions. Chapter 20 explains how to cause the interface to adapt its behavior after a decision has a non-beneficial outcome, so as to increase the chance of beneficial outcomes in the future. Chapter 21 discusses various principles that may be helpful to an interface designer who wishes to customize a particular type of interface decision, such as how to cause a particular type of decision to take into account contextual information that is relevant for that type of decision, how to cause the interface to adapt more quickly to negative feedback for some types of decisions than for other types of decisions, and so forth. Chapter 22 discusses in broader terms how to make an interface be adaptive.

Chapter 23 discusses ways of tracking user behavior and informing the user when there are features that the user does not seem to be aware of that would actually have helped the user achieve desired results more efficiently.

Part III explains interface behaviors that pertain to more specific categories of interface functionality, such as speech recognition, autocorrection, capitalization, and so forth. Part III includes explanations of specific circumstances in which the interface will make alterable decisions, and also includes explanations of other convenient features and smart interface behaviors that do not directly pertain to alteration functionality but may be especially advantageous in conjunction with alteration functionality.

Interface Mistakes

It is common for interface behaviors to occasionally yield results that a user does not expect and does not desire. Such results will be referred to herein as "interface mistakes."

By this definition, even interface behaviors that are simple and logical may occasionally yield interface mistakes for inexperienced or careless users. For example, if a user forgets that Caps Lock is on and begins typing, an interface may yield exclusively capital letters when the user does not expect or desire such a result.

Complex and intelligent interface behaviors may yield interface mistakes even for experienced users. If an interface behavior is too complex for a user to fully understand what results to expect, but the behavior is intelligent enough to usually yield results that the user desires, then whenever the behavior yields results that the user does not desire, these results are likely to be unexpected, and will thus constitute interface mistakes as defined above. For example, the present writer has come to assume that his iPhone will automatically capitalize the first word of each sentence he types, and when his iPhone automatically capitalizes a word in the middle of a sentence (because the preceding word was an abbreviation that ended with a period), this usually constitutes an interface mistake.

Interface mistakes can be quite frustrating. Often, a user will fail to notice an interface mistake immediately, and will then have to make an extra effort later to go back and correct the mistake. Interface mistakes that are caused by complex and intelligent interface behaviors may be especially frustrating, because a user may feel as though the interface itself is actively opposing his efforts to achieve a certain goal. For example, one of the most widely used interface features that is complex and intelligent is autocorrect, and many users have become furious with autocorrection functionality. As another example, while typing portions of the present document, the present writer has often received the result "½" after typing "1/2," noticed the mistake a few seconds later, and cursed at Microsoft Word for causing this interface mistake—whereas when he accidentally typed "automatical" instead of "automatic" and noticed the mistake a few seconds later, he laughed at his own typographical error.

Approaches to Preventing Interface Mistakes

As defined above, an interface mistake is an interface behavior that yields a result a user does not expect and does not desire. In prior art, interface mistakes may be extremely frustrating, and may lead to user complaints. There are two general approaches to preventing interface mistakes: an interface designer may either try to prevent an interface behavior from yielding results a user does not desire, or an interface designer may try to prevent an interface behavior from yielding results a user does not expect.

In practice, it may be very difficult to prevent an interface behavior from yielding results a user does not desire. A user's desires may be too complex for an interface to accurately predict what the user will desire in any given situation. An interface behavior may intelligently take into account a wide variety of circumstantial factors in order to increase the chance that it will accurately determine what a user desires, but it will still be wrong sometimes—and the more complex an interface behavior is, the more likely it is that an undesired result will be quite unexpected, and will thus constitute an interface mistake.

Instead, an interface designer may try to prevent an interface behavior from yielding results a user does not expect. An interface behavior can be made simple enough for a user to accurately predict what the interface will do in any given situation. For example, if the outcome that a user may desire for a particular interface decision may vary according to circumstances, or may vary from one user to the next, then the outcome may be controlled by an interface setting, so that an experienced and careful user can adjust the relevant setting before the interface makes such a decision. For example, a user of a prior art TI-84 graphing calculator can control whether the interface displays the answer to a particular math problem as a decimal, improper fraction, or mixed fraction by adjusting various settings before typing the math problem, or by appending a particular command to the math problem. When an interface behavior is thus predictable and controllable, any interface mistakes that occur can be blamed on the user; nevertheless, interface mistakes will still occur. For example, some users may not know how to customize relevant interface settings, or even know that such settings exist; other users may simply forget to adjust relevant interface settings when necessary.

Thus, an interface behavior may be smart enough that it knows what a user will desire most of the time, but it will still be wrong sometimes, leading to interface mistakes; or an interface behavior may be simple enough that a user knows what to expect most of the time, but the user will still be wrong sometimes, leading to interface mistakes. Neither approach will prevent all interface mistakes.

These two approaches to preventing interface mistakes are not equal in all respects. When a simple interface behavior leads to interface mistakes, if a user becomes especially frustrated, then the user can learn more about the interface or be more careful, and this will prevent the user from being wrong about the interface in the future, and will thus reduce the number of interface mistakes. Ultimately, the predominant disadvantage of simple interface behaviors in prior art is not that they often cause great frustration; it is that they often require extra effort from the user. Conversely, when a smart interface behavior leads to interface mistakes, if a user becomes especially frustrated, then there may not be much the user can do to prevent the interface from being wrong in the future, other than simply refusing to use the smart interface behavior. Ultimately, the major disadvantage of smart interface behaviors in prior art is that they often cause great frustration. An example of this trade-off is the autocorrect functionality that is prevalent on smartphones: on many phones, this functionality is extremely intelligent, and it certainly reduces user effort in many cases, but autocorrection is also one of the most reviled of all interface features.

In some embodiments, the present invention may make it much easier to recover quickly from interface mistakes even when a user does not notice them right away, which may drastically decrease the frustration caused by interface mistakes. As a result, it may not be necessary for a designer of an embodiment of the present invention to do much to prevent interface mistakes. An interface designer may thus have the freedom to implement interface behaviors in whatever way is most convenient for the interface designer, with little risk of user complaints, provided that the interface designer makes sure that any interface decision that is likely to yield an interface mistake is an alterable decision. For example, if a calculator interface is so simplistic that it always initially displays the answer to a calculation as a decimal, not a fraction, then this may not be particularly objectionable as long as a user can usually change the answer to a fraction with a single keystroke. Conversely, if a calculator has a feature that attempts to intelligently determine whether a user will desire an answer to be displayed as a decimal or as a fraction, and the interface fails to include a means for a user to deactivate this feature, then this may not be particularly objectionable either as long as the user can usually change the outcome with a single keystroke.

Advantages of the Complex Approach

By decreasing the frustration caused by interface mistakes, in some embodiments, the present invention may decrease the disadvantages of simple interface behaviors that occasionally lead to interface mistakes, and may also decrease the disadvantages of smart interface behaviors that occasionally lead to interface mistakes. However, this does not mean that the present invention does not affect the trade-off between intelligence and simplicity. To the contrary, in prior art, interface mistakes that are associated with smart interface behaviors are arguably more frustrating than interface mistakes that are associated with simple interface behaviors. In some embodiments, by decreasing the frustration caused by interface mistakes, the present invention may improve the way users feel about simple interface behaviors, but it may improve the way users feel about smart interface behaviors even more, and so it may increase the relative advantageousness of smart interface behaviors.

In other words, in prior art, complex features that are usually helpful may be far too frustrating when they cause interface mistakes, but in some embodiments of the present invention, if a complex feature is usually helpful, then it may make very little difference that it occasionally causes interface mistakes. Therefore, some embodiments of the present invention will include a wide variety of relatively complex interface behaviors, in the expectation that these behaviors may confer a net advantage even if they occasionally yield results a user does not expect and does not desire.

Most of the new interface features that are described above are interface mistake recovery features that either have no effect until they are explicitly invoked, or affect the appearance of the interface in relatively minor ways without directly affecting a user's input. Below, in addition to interface mistake recovery features, certain new interface features are described that are interface mistake prevention features. In certain circumstances where a user of a prior art interface would typically encounter an interface mistake, certain features that are present in some embodiments of the present invention may cause the interface to make a different decision than a prior art interface would, so that in such circumstances a user will not encounter an interface mistake. Of course, such features increase the complexity of the interface, which means that when the interface does yield an undesirable result, the result is likely to also be unexpected, in which case it is an interface mistake; but in some embodiments, such features may nevertheless confer a net advantage, as is discussed above.

Furthermore, if an interface designer particularly wishes to minimize any potential disadvantages over prior art (rather than necessarily maximizing advantages), the interface designer can create an alternative embodiment such that the interface generally does not make interface decisions that are initially different than prior art interfaces, but does facilitate recovery from such decisions when they happen to be interface mistakes. That is, in an alternative embodiment, whenever any interface behavior as described herein would yield a different initial outcome for an interface decision than a typical prior art interface would yield, the interface will instead decide to yield the same initial outcome as prior art, but this will be an alterable decision such that altering the decision will cause the interface to yield a different outcome than prior art. If an embodiment does not yield different initial outcomes for interface decisions than prior art, and the embodiment has mistake recovery features that are not present in prior art, then it will almost inevitably confer a net advantage over prior art, although perhaps not as much of a net advantage as an embodiment that sometimes yields different initial outcomes for interface decisions than prior art.

Chapter 17: Automatic Decision Variation

Destructive Actions

In an embodiment, for purposes of the present chapter, an "editing action" is any user action that causes the user's input to be modified; cursor navigation actions are not "editing actions." A "destructive action" is an actuation of the backspace key, or an actuation of the Delete key, or any other editing action that has no major effect other than causing a portion of the user's input to be deleted. In an embodiment, although an actuation of the Undo key or Redo key may change the status of an undo buffer in some way, such a change to an undo buffer does not constitute a "major effect" for purposes of the preceding sentence, and so an actuation of the Undo key or Redo key may constitute a destructive action if it causes a portion of the user's input to be deleted even though it also changes the status of an undo buffer. In an embodiment, an actuation of the Cut key does not constitute a destructive action.

Figure 14A:
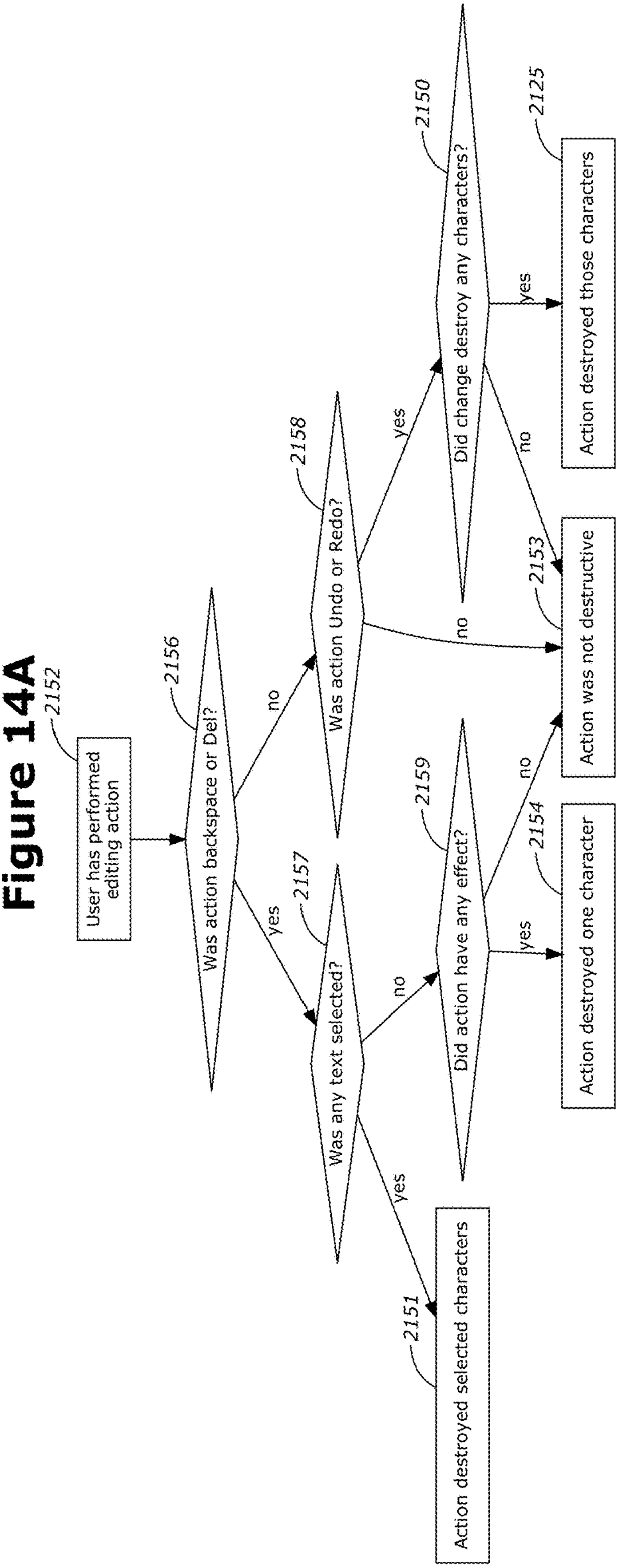
FIG. 14A is a flowchart that illustrates an example method for determining whether or not an action was a destructive action, and what characters it destroyed.

FIG. 14A is a flowchart that illustrates an algorithm for determining whether or not an action was a destructive action, and what characters it destroyed. Block 1401 says "User has performed editing action" and proceeds to Block 1402, which asks, "Was action backspace or Del?" If the answer is yes, then the algorithm proceeds to Block 1403, which asks, "Was any text selected?" If the answer is yes, then the algorithm proceeds to the outcome at Block 1404: "Action destroyed selected characters." If the answer to the question in Block 1403 is no, then the algorithm proceeds to Block 1405, which asks, "Did action have any effect?" If the answer is yes, then that means the action was an ordinary actuation of the backspace key or Del key that deleted only one character, so the algorithm proceeds to the outcome at Block 1406: "Action destroyed one character." If the answer is no, then that means the actuation of the backspace key or Del key had no effect (such as because there were no characters to delete), so the algorithm proceeds to the outcome at Block 1407: "Action was not destructive."

Continuing with the explanation of FIG. 14A, if the user's editing action was not an actuation of the backspace key or Del key, then the answer to the question in Block 1402 is no and the algorithm proceeds to Block 1408, which asks, "Was action Undo or Redo?" If the answer is no, then the algorithm proceeds to the outcome at Block 1407: "Action was not destructive." If the answer is yes, then the algorithm proceeds to Block 1409, which asks, "Did change destroy any characters?" This is the short form of a more complex question, which is, "Did the Undo or Redo change destroy at least one character and have no other effect on the document?" If the answer is yes, then the algorithm proceeds to the outcome at Block 1410: "Action destroyed those characters." If the answer is no, then the algorithm proceeds the outcome at Block 1407: "Action was not destructive."

Overview of Automatic Decision Variation

When an interface mistake occurs, a user may instinctively delete the mistake but then repeat the same editing actions that triggered the mistake in the first place. It may be desirable to systematically ensure that for any potential mistake that corresponds to an alterable interface decision, deleting and retyping the relevant portion of input will tend to not repeat the same potential mistake.

Therefore, in an embodiment, if a user performs a sequence of consecutive destructive actions that deletes the alterable block of an alterable interface decision and soon thereafter the user performs a non-destructive action that causes the interface to make a new alterable decision such that the new decision will have the same options as the decision that was deleted and such that the default outcome of the decision would cause the user's input to match the state it was in prior to the deletion of the old decision's alterable block, then this may cause the interface to select a different outcome for the new alterable decision. Such an embodiment will be said to have "the automatic decision variation feature." The details of such an embodiment are specified below.

The automatic decision variation feature that is described in the present chapter and the manual alteration detection feature that is described in the following chapter are collectively referred to herein as "retyping detection features." Certain details that are specified in the following description of the automatic decision variation feature refer to retyping detection features collectively rather than referring to the automatic decision variation feature individually, in order to explicitly include both the automatic decision variation feature and the manual alteration detection feature.

A Simplified Decision Variation Algorithm

Figure 14B:
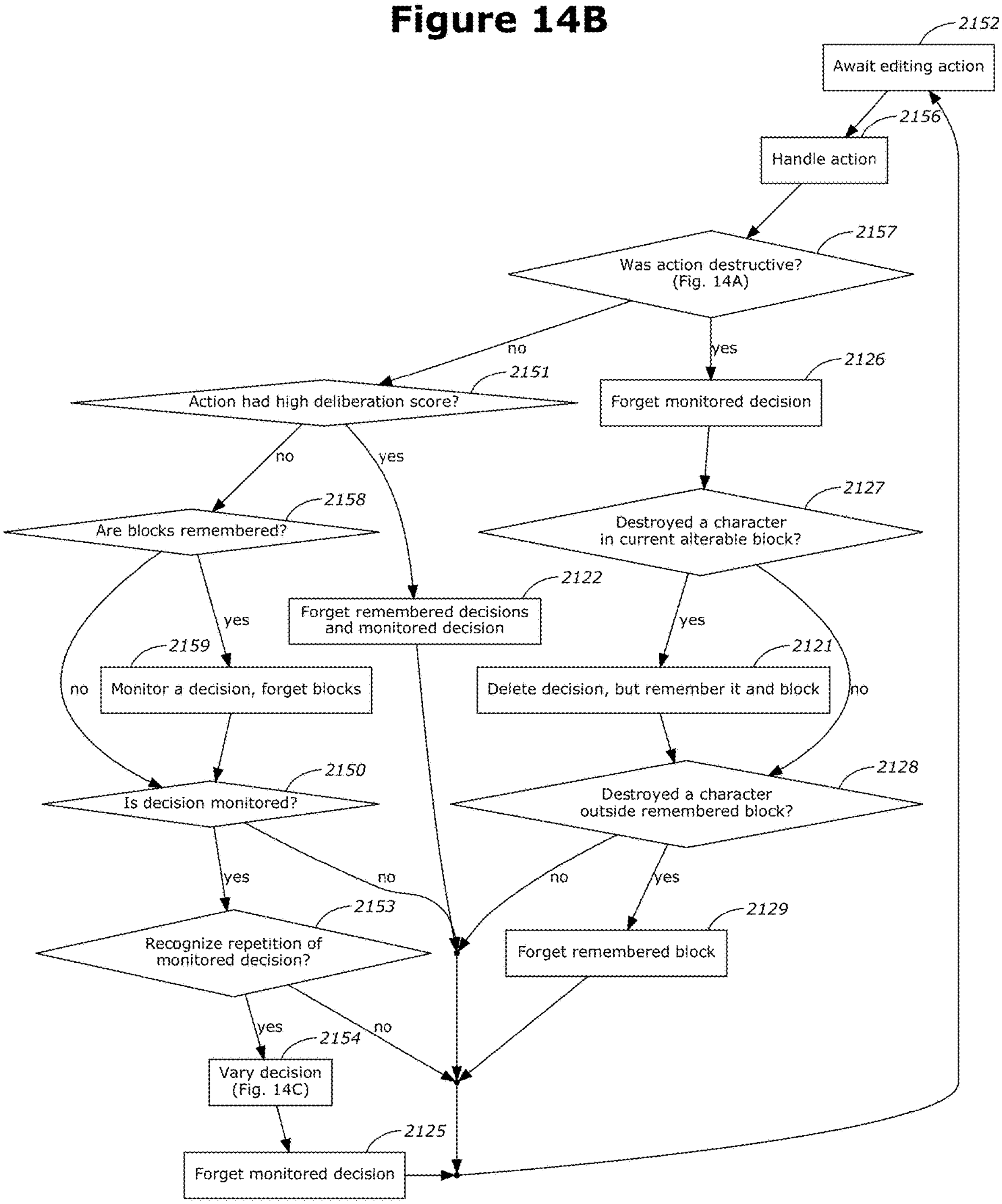
FIG. 14B is a flowchart that illustrates a simplified version of an automatic decision variation feature, according to one embodiment.

FIG. 14B is a flowchart that illustrates a simplified version of the automatic decision variation feature. At block 1401, the interface will "await editing action." When the user performs an editing action, the interface will proceed to block 1402 and "handle action" normally. After that, the interface will proceed to block 1403 and determine "Was action destructive?" (It may make this determination by means of the algorithm illustrated in FIG. 14A.) If the action was destructive, the interface will proceed to block 1412 and "forget monitored decision," which means that if there was a monitored alterable decision, then it stops monitoring that decision. It will then proceed to block 1413 and ask whether the action "Destroyed a character in current alterable block?" If the action did destroy a character in the alterable block of a current alterable decision, then the interface will proceed to block 1414, "Delete decision, but remember it and block." This means that the alterable decision is deleted as described in Chapter 2, but it now becomes a remembered alterable decision as defined below, and the alterable block becomes a remembered alterable block. The interface also remembers what the state of the user's input was immediately before the destructive action occurred, so it can later recognize whether the exact same state obtains. Whether the answer to the question in block 1413 is no, or whether it is yes and the interface proceeds to block 1414, in either case the interface will subsequently proceed to block 1415, where it will ask whether the action "Destroyed a character outside remembered block?", and if the answer is yes, the interface will proceed to block 1416, "Forget remembered block." This means that for each remembered alterable block, if the user deletes a character that was not part of that alterable block, then that alterable block will cease to be a remembered alterable block, and its alterable decision will cease to be a remembered alterable decision. Whether the answer to the question in block 1415 is no, or whether it is yes and the interface proceeds to block 1416, in either case the interface will subsequently return to block 1401 to await the user's next action.

Continuing with the explanation of FIG. 14B, if the user's action was not a destructive action, the interface will proceed from block 1403 to block 1404, where it will ask whether the "action had high deliberation score?" If the action had a high deliberation score as defined in Chapter 12, then that means that the user took a long time to perform the action, in which case the interface will proceed to block 1411 where it will "forget remembered blocks and monitored decision" (and will also forget any remembered alterable decisions) and will then return to block 1401 to await the user's next action.

In FIG. 14B, if the user's action was not a destructive action and did not have a high deliberation score, then the interface will proceed from block 1404 to block 1405, where it will determine whether there "Are blocks remembered?" If there is at least one remembered alterable block, then the interface will proceed to block 1406 to "monitor a decision, forget blocks," which means that it will cause the remembered alterable decision that has the highest probability of alteration to become the monitored alterable decision, and it will then forget the remembered alterable blocks and the remembered alterable decisions other than the monitored alterable decision. It will then proceed to block 1407. If there were no remembered alterable blocks when the user performed the non-destructive editing action that did not have a high deliberation score, then the interface will proceed from block 1405 directly to block 1407.

In FIG. 14B, at block 1407, the interface will check whether "Is decision monitored?" If there is no monitored alterable decision, the interface will return to block 1401 to await the user's next action. If there is a monitored alterable decision, the interface will proceed to block 1408, "Recognize repetition of monitored decision?" In order for the interface to recognize repetition of the monitored alterable decision, not only must a new alterable decision now exist that has the same options as the monitored alterable decision, but also the state of the user's input must be exactly the same as it was immediately before the first destructive action occurred that deleted a character of the alterable block of the monitored alterable decision. If the interface does not recognize repetition of the monitored alterable decision, it will return to block 1401 to await the user's next action. If the interface does recognize repetition of the monitored alterable decision, it will proceed to block 1409 to "vary decision," which means that it will vary the new alterable decision that is identical to the monitored alterable decision, which may cause it to change which option of that decision is selected, as is explained in FIG. 14C. From 1409 the interface will then proceed to block 1410 to "forget monitored decision." From there, the interface will return to block 1401 to await the user's next action.

Figure 14C:
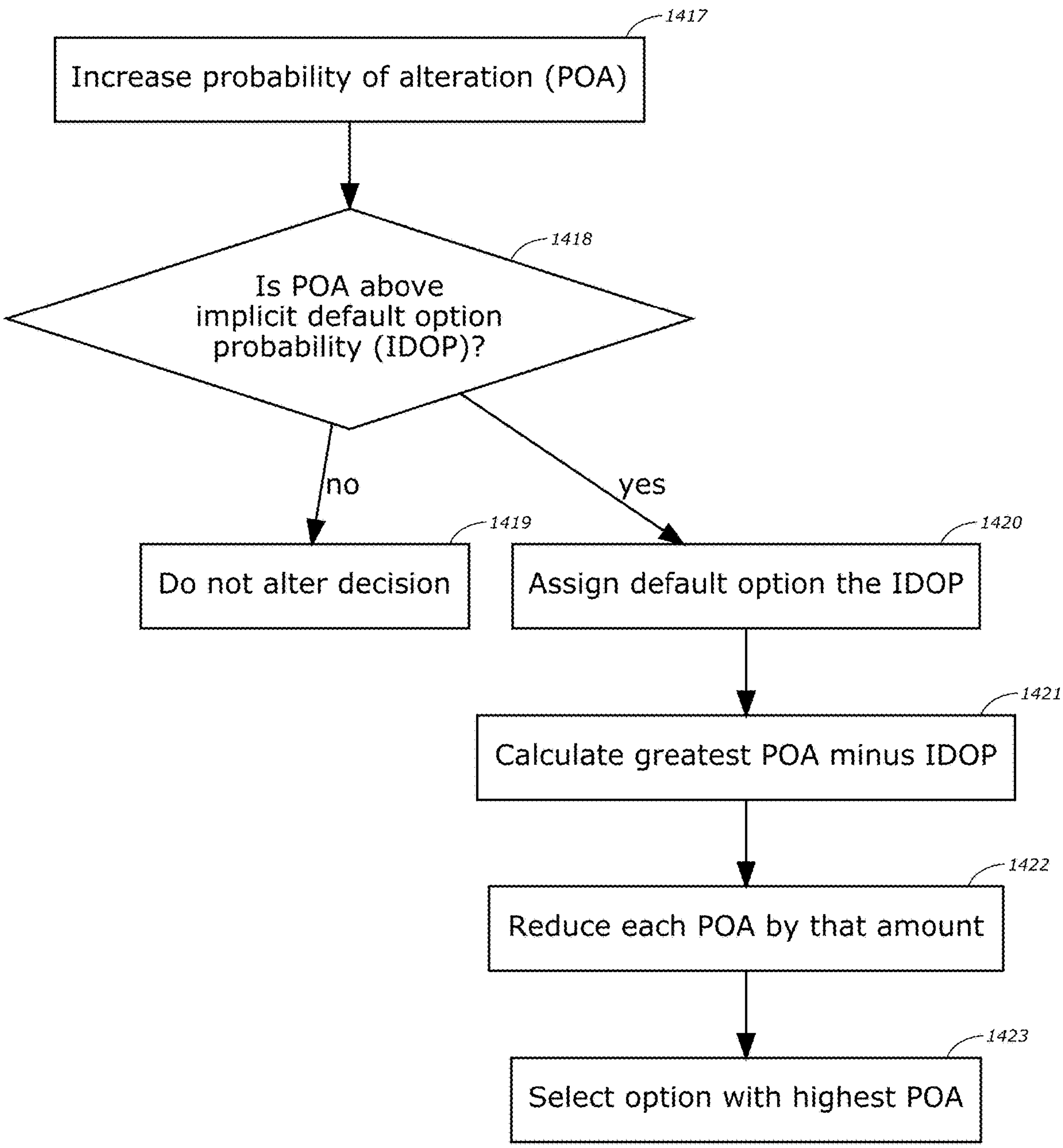
FIG. 14C is a flowchart that illustrates an example method for varying a decision that is identical to a monitored alterable decision.

FIG. 14C is a flowchart that illustrates a procedure for varying the decision that is identical to the monitored alterable decision. First, in Block 1417, the interface will "Increase probability of alteration (POA)," which means that the interface increases the probability of alteration of the decision and each of its alternate options by an amount equal to the variation score base value as described below, which is an amount that is sufficiently large that even if the decision had a very low probability of alteration its new probability of alteration may exceed the implicit default option probability (as defined in Chapter 3). From Block 1417 the interface will proceed to Block 1418, where it will check, "Is POA above default option probability (IDOP)?" If the decision's probability of alteration is still below the implicit default option probability even after its probability of alteration is increased by the variation score base value (because its probability of alteration was exceedingly low before that), then the decision variation feature has caused the decision's probability of alteration to increase but the interface will proceed to Block 1419: "Do not alter decision."

In FIG. 14C, at Block 1418, if the decision's probability of alteration is above the implicit default option probability then the interface will proceed to Block 1420, "Assign default option the IDOP," which means that the default option of the alterable decision will now explicitly have a probability of alteration equal to the implicit default option probability. The interface will then proceed to Block 1421, "Calculate greatest POA minus IDOP," and from there it will proceed to Block 1422, "Reduce each POA by that amount." These blocks mean that the interface will determine which alternate option has the highest probability of alteration and calculate that probability of alteration minus the implicit default option probability, and will then reduce the probability of alteration of every alternate option by that amount. When the interface does that, the alternate option that has the highest probability of alteration will come to have a probability of alteration that exactly equals the implicit default option probability. The interface will then proceed to Block 1423, "Select option with highest POA," and select that option.

It may be noted that when the interface varies a decision as explained in FIG. 14C, the higher the decision's probability of alteration was before the interface varied the decision, the greater will be the value that is calculated in Block 1421, so the greater will be the reduction of probabilities of alteration in Block 1422. This means that if a decision has a high probability of alteration before a user deletes and retypes its alterable block and in doing so causes the automatic decision variation feature to change the decision's outcome, then the decision may have a low probability of alteration afterwards, which reflects high confidence that the user indeed wanted the interface to change the outcome and is satisfied now that the interface has done so. If a decision has a very low probability of alteration before a user causes the automatic decision variation feature to change the decision's outcome, then it will have a high probability of alteration afterwards, which reflects uncertainty as to whether the user actually wanted the interface to change the outcome.

The following discussion of the automatic decision variation feature is much more detailed than the above explanation of FIGS. 14B and 14C. In an embodiment, the automatic decision variation feature will include the additional nuances that are explained below that are not illustrated in FIG. 14B or FIG. 14C. For example, a more sophisticated version of the automatic decision variation feature as described below may in certain circumstances reduce a "variation score" that initially equals the variation score base value, and if for example a user deletes a decision's alterable block and then deletes one extra character before retyping that extra character and that alterable block, the automatic decision variation feature may perhaps be invoked anyway, but the variation score will be less than the variation score base value and so the decision's probability of alteration will be increased less in Block 1417, which in certain circumstances will cause the decision's probability of alteration to be below the implicit default option probability. In an alternative embodiment, the automatic decision variation feature will behave exactly as explained above and as illustrated in FIG. 14B and FIG. 14C.

Retaining Pre-Deletion Data

In an embodiment, the automatic decision variation feature is a block alteration feature as defined in Chapter 14, and so an alterable interface decision may have more than one distinct alterable block for purposes of the automatic decision variation feature. Below, data pertaining to the automatic decision variation feature will be described as associated with alterable blocks in certain circumstances, and in other circumstances data will be described as associated with alterable decisions. The distinction between data that is associated with alterable blocks and data that is associated with alterable decisions is important only in an embodiment where an alterable interface decision may have more than one distinct alterable block for purposes of the automatic decision variation feature. For example, it is explained below that an alterable block may be assigned a "variation score" when it is deleted; in an embodiment where an alterable interface decision may have distinct alterable blocks, it may be significant that it is the alterable block and not its alterable decision that is assigned a variation score, because this means that a particular alterable decision may have multiple distinct variation scores corresponding to its multiple distinct alterable blocks, but in an embodiment where each alterable interface decision can have only one alterable block, it makes no difference whether a variation score is assigned to the alterable block or assigned to its alterable decision.

In an embodiment, when an alterable decision has only one alterable block, every alternate option of the decision is a relevant alternate option for that alterable block; but when a multi-alternative decision has multiple alterable blocks, in certain circumstances, for certain alterable blocks, certain alternate options of the decision may not be relevant alternate options. Chapter 14 explains which alternate options are relevant alternate options for each alterable block of a multi-alternative decision that has multiple alterable blocks, in an embodiment.

In an embodiment, each alterable block is associated with only one alterable interface decision. If more than one alterable decision pertains to the exact same portion of input, then that portion of input is not considered to be one alterable block that is associated with two alterable interface decisions: it is considered to be two distinct alterable blocks, each of which is associated with only one alterable interface decision, and each of which may have its own distinct variation score.

In an embodiment, an alterable block's "pre-deletion state" is the state of the user's input immediately prior to the first action that causes the deletion or modification of some portion of the alterable block. For example, if a user types 9x2−4 and the interface makes an alterable decision to convert x2 to $x^2$ and the alterable block of this decision consists of $x^2$, then if the user actuates the backspace key repeatedly until the alterable block is deleted, that alterable block's pre-deletion state will be $9x^2$. More than one alterable block may have the same pre-deletion state if a single action is the first action that causes the deletion or modification of some portion of more than one alterable block.

In an embodiment, an "altered pre-deletion state" is a state of the user's input that would obtain if a pre-deletion state were modified so that a different option became selected for the alterable interface decision of the alterable block that is associated with the pre-deletion state. For example, if a user types 9x2 and the interface makes an alterable decision to convert x2 to $x^2$ and the alterable block of this decision consists of $x^2$, then if the user actuates the backspace key, the alterable block's altered pre-deletion state will be 9x2.

In an embodiment, in order to implement the automatic decision variation feature, when an alterable decision is deleted and thus does not exist for purposes of most alteration-related features, the interface still temporarily retains information about the alterable decision in certain circumstances. In the following description of the automatic decision variation feature, a "remembered alterable decision" is an alterable decision that has been deleted such that the interface is still retaining information about the alterable decision for purposes of the automatic decision variation feature. In the following description of the automatic decision variation feature, ordinary alterable decisions that have not been deleted will be referred to as "current alterable decisions" to distinguish them from remembered alterable decisions. Similarly, a "remembered alterable block" is an alterable block that has been partially or fully deleted such that the interface is still retaining information about the alterable block for purposes of the automatic decision variation feature, and a "current alterable block" is an ordinary alterable block that has not been partially or fully deleted.

In the explanation of the automatic decision variation feature, it is to be understood that any mention of "deleting" an alterable block may be understood as a reference to deleting the portion of input that constituted the alterable block, not as a reference to deleting information about the alterable block. For example, if a remembered alterable block is said to have been "partially deleted," this means that some of the input that constituted the alterable block has been deleted. As another example, the phrase "after a remembered alterable block has been fully deleted" refers to when every character of the portion of input that constituted the alterable block has been deleted and yet the interface is still retaining information about the alterable block for purposes of the automatic decision variation feature; it does not refer to when the alterable block is no longer a remembered alterable block and is no longer relevant to any interface behavior.

Below, specific circumstances are described in which an alterable block will become a remembered alterable block, in an embodiment. In an embodiment, whenever a user performs a destructive action that causes the deletion of any portion of an alterable block, if that alterable block becomes a remembered alterable block, then the interface will remember "pre-deletion state data" for that alterable block until the alterable block is no longer a remembered alterable block. In an embodiment, such pre-deletion state data will include the pre-deletion state of that alterable block as well as the altered pre-deletion state of each alternate option of that alterable block's alterable interface decision.

In an embodiment, whenever a user performs a destructive action that causes the interface to delete an alterable decision, if the same action or a previous action caused any alterable block of that decision to become a remembered alterable block, then the decision will become a remembered alterable decision until none of its alterable blocks are remembered alterable blocks.

Analysis of Deletion and Retyping

It may be desirable to prevent an interface from repeating a mistake, but on the other hand, if a user deletes a portion of input and then types the same portion of input a second time simply due to indecisiveness, the user will typically wish the interface to respond to the input the second time the same way it responded the first time, and so a different response may itself be a mistake. For example, on several occasions the present writer has used an iPhone shortcut to input a period, then deleted the period, and then attempted to use the same shortcut to input a period again, only to be disappointed that the iPhone responded differently the second time he attempted to use the shortcut.

Therefore, in an embodiment, the interface will monitor actions that may constitute deliberately deleting an alterable block and monitor actions that may constitute deliberately causing the interface to repeat an alterable decision, and will take various factors into account so that if a user does delete an alterable block and then cause the interface to repeat the corresponding alterable decision, then the interface can attempt to determine whether the user did so due to indecisiveness or due to dissatisfaction with the outcome of the alterable decision. Methods for taking such factors into account are described in detail below.

In various embodiments, the interface will use slightly different approaches to take such factors into account. In one approach, when a user first begins to delete an alterable block, the interface will determine a "variation score" for the alterable block and will subsequently take into account various factors in adjusting this variation score, or in some cases will decide to instantly "forget" the alterable block, which means that the alterable block will no longer be eligible for automatic decision variation. In an alternative approach, when a user first begins to delete an alterable block, the interface will merely determine whether or not the alterable block is initially eligible for automatic decision variation, and then the interface will subsequently take into account various factors in determining whether to instantly forget the alterable block; such an approach may yield beneficial results less often, but may be easier to implement, and may still be a useful improvement over prior art. Both approaches are described in more detail below; in particular, in several cases the present specification explains how in one embodiment a certain user behavior may cause the interface to reduce an alterable block's variation score and then also explains how in an alternative embodiment a similar user behavior may instead cause the interface to instantly forget an alterable block. It is also possible to mix the approaches: even if an embodiment tracks variation scores, in certain situations it may simply forget an alterable block rather than adjusting the block's variation score.

(In an embodiment that also has the manual alteration detection feature that is described in Chapter 18, when the interface forgets a remembered alterable block or a remembered alterable decision for purposes of the automatic decision variation feature, it may still retain information about that alterable block or alterable decision for purposes of the manual alteration detection feature, but that alterable block or alterable decision will no longer constitute a remembered alterable block for purposes of the automatic decision variation feature.)

Deleting Alterable Blocks

In an embodiment, "the threshold of eligibility for automatic decision variation" is a threshold value that is sufficiently low that all or nearly all alterable interface decisions will initially have a probability of alteration that is above this threshold value, and is sufficiently high that an alterable interface decision will typically have a probability of alteration that is below this threshold value after the user explicitly selects an option of the decision or completes review of the decision.

In an embodiment, whenever a user performs a destructive action that causes the deletion of any portion of an existing alterable block, the interface will assign that alterable block a "variation score" that is initially equal to a particular fixed value; the particular fixed value is referred to herein as the "variation score base value." Depending on various circumstances, such a variation score may be modified immediately and/or may be modified later in response to subsequent user actions, as explained below. The interface will retain information about the alterable block so that it becomes a remembered alterable block as defined above. In an embodiment, if a remembered alterable block's variation score is reduced to zero or reduced below zero, then the interface will immediately forget the alterable block.

In an alternative embodiment, whenever a user performs a destructive action that causes the deletion of any portion of an existing alterable block, the interface will simply check whether the probability of alteration of that block's alterable interface decision is above the threshold of eligibility for automatic decision variation. If it is above the threshold of eligibility for automatic decision variation, the interface will retain information about the alterable block so that it becomes a remembered alterable block as defined above until the interface decides to forget the alterable block for some reason; otherwise, the interface will handle the deletion normally: the block will not become a remembered alterable block.

In an embodiment, when a user performs a destructive action that causes the deletion of all or part of an existing alterable block, the interface will immediately add a bonus to that alterable block's variation score if the alterable block has an extremely low attention score as defined in Chapter 12. In an alternative embodiment, to achieve a similar result without the use of an attention score, it will do so if a very short amount of time has elapsed since the interface initially made the corresponding alterable interface decision.

In an embodiment, after a user performs any destructive action, if any remembered alterable blocks exist, then as soon as the user performs any subsequent action, if the deliberation score of that subsequent action is higher than a certain moderately high threshold, then the interface will reduce the variation score of every remembered alterable block by an amount that is proportional to the amount by which that deliberation score exceeds the threshold. In such an embodiment, if a user pauses a bit longer than usual between keystrokes, the interface may slightly reduce the variation score of every remembered alterable block; if the user pauses a long time, the interface will greatly reduce the variation score of every remembered alterable block. In an alternative embodiment, immediately after a user performs any destructive action, if the user's next action has a high deliberation score, then the interface will forget all remembered alterable blocks.

In an embodiment, after a remembered alterable block has been fully deleted, each time the user performs an additional consecutive destructive action, the interface will substantially reduce the variation score of that remembered alterable block; thus, in such an embodiment, an alterable block's variation score will ultimately be reduced by an amount that is proportional to the number of additional consecutive destructive actions the user performs after fully deleting the alterable block. In an embodiment, the amount by which the interface reduces the variation score of a remembered alterable block in such circumstances depends on the ratio of the amount of text that is deleted after the remembered alterable block was fully deleted to the amount of text that was in the remembered alterable block; for example, in such an embodiment, if a user deletes an alterable block consisting of ten characters and then deletes one more character, the remembered alterable block's variation score will be substantially reduced when the user deletes that additional character, but if the user deletes an alterable block consisting of just a single character and then deletes one more character, the remembered alterable block's variation score will be reduced far more.

In an alternative embodiment, after a remembered alterable block has been fully deleted, each time the user performs an additional consecutive destructive action, the interface will reduce the variation score of that remembered alterable block by an amount that is proportional to the deliberation score of the additional consecutive destructive action, so if for example a user deletes an alterable block by means of consecutively pressing the backspace key very rapidly and accidentally overshoots by one character then the interface will only slightly reduce the block's variation score, but if a user deletes an alterable block and then pauses a very long time before deleting one more character then the interface will substantially reduce the block's variation score.

In another alternative embodiment, after a remembered alterable block has been fully deleted, if the user performs an additional consecutive destructive action, then the interface will forget that remembered alterable block.

Region Deletion and Alterable Block Deletion

In an embodiment, if a user selects a region of input containing a plurality of characters and then actuates the backspace key or the Delete key so that all the characters within the region are deleted, for purposes of retyping detection features, the interface will treat such a destructive action as equivalent to a sequence of consecutive destructive actions consisting of deleting the characters one at a time from right to left. For example, if a user selects the expression $9x^2-4$ and then actuates the Delete key, then the automatic decision variation feature will react the same way as if the user had backspaced repeatedly to delete $9x^2-4$, so if $x^2$ is an alterable block, then the pre-deletion state for that alterable block will be $9x^2$.

In an embodiment, if a user selects a region of input and then types new input, for purposes of retyping detection features, the interface will respond as though the user actuated the Delete key after selecting the region of input before typing anything else. For example, if a user selects the expression $9x^2-4$ and then types 9x2−4, the interface will respond in the same way as if the user selected the expression, then actuated the Delete key, and then typed 9x2−4.

In an embodiment, for purposes of the interface behaviors described below, a "mass deletion key" is a key that causes the interface to instantly delete an entire region of input (such as a field in a form) without any need for the user to first select a region or otherwise specify the boundaries of the region to be deleted. An example is the Clear key on a typical graphing calculator, which causes the calculator interface to instantly delete an entire line of input. Another example is the Esc key on a personal computer, which in certain circumstances causes the computer interface to instantly delete a portion of text. A "mass deletion block" is the input that is deleted by an actuation of a mass deletion key.

In an embodiment, when a user actuates a mass deletion key, the interface will forget any and all remembered alterable blocks that were fully deleted before the user actuated the mass deletion key.

In an embodiment, when a user actuates a mass deletion key, for any existing alterable block or remembered alterable block that is partially or fully deleted by that actuation of the mass deletion key, the interface will determine what proportion of the mass deletion block was before the alterable block, what proportion of the mass deletion block was part of the alterable block, and what proportion of the mass deletion block was after the alterable block, and the interface will reduce that alterable block's variation score by an amount that equals a constant value times the percentage of the mass deletion block that was before the alterable block plus a constant value times the percentage of the mass deletion block that was after the alterable block. In an embodiment, the two constant values mentioned in the preceding sentence are not equal: instead, the first value is greater than the second, so the interface will reduce an alterable block's variation score more if an actuation of the mass deletion key deletes input that was before the alterable block then it will if the actuation of the mass deletion key deletes input that was after the alterable block, all else being equal.

In an alternative embodiment, when a user actuates a mass deletion key, for any existing alterable block or remembered alterable block that is partially or fully deleted by that actuation of the mass deletion key, if the mass deletion block included any input that was not part of that alterable block and was not decision-triggering input for that alterable block's decision, then the interface will forget that block. For example, in such an embodiment, if a user types $x^2-4$ and then presses the Clear key, then if $x^2$ was an alterable block, the interface will forget that alterable block because that actuation of the Clear key deleted two characters that were not part of that alterable block and were not decision-triggering input for that alterable block's decision.

Beginning to Watch for Decision Repetition

In an embodiment, when a user performs an editing action that is not a destructive action, before handling that action, the interface will determine whether to begin to "watch for repetition" of a remembered alterable decision by means of the following five steps.

First, the interface will forget every remembered alterable block that has not yet been fully deleted, so that every remaining remembered alterable block will be an alterable block that has been fully deleted. If no remembered alterable blocks remain, then no remembered alterable decisions will remain either, and the interface will not begin to watch for repetition of a remembered alterable decision, so this procedure will end immediately and the remaining steps will not occur.

Second, the interface will select a remembered alterable block. To do so, in an embodiment, for each remembered alterable block, the interface will calculate a "probability of variation" that equals the alterable block's variation score plus the probability of alteration of its alterable decision. The interface will then select the remembered alterable block that has the highest such probability of variation; if more than one remembered alterable block is tied for the highest probability of variation, the interface will select from among those remembered alterable blocks the one whose alterable interface decision is the most relevant. In an alternative embodiment, the interface will merely select the remembered alterable block whose alterable interface decision is the most relevant. (If more than one remembered alterable block belongs to that alterable interface decision, it does not matter which one the interface selects.)

Third, in an embodiment, if the interface calculated a probability of variation for each remembered alterable block and the second highest probability of variation was exactly as high or nearly as high as the highest probability of variation, then the interface will slightly reduce the variation score of the selected alterable block. In an embodiment, if the remembered alterable decision of the remembered alterable block is a multi-alternative decision such that its two alternate options that have the highest probabilities of variation have approximately the same probability of variation, then the interface will slightly reduce the variation score of the selected alterable block. Such behavior is intended to slightly inhibit the automatic decision variation feature in circumstances where it is relatively likely that any change to the user's input that is caused by triggering the automatic decision variation feature will not be the particular change that a user wanted. In an alternative embodiment, the interface will not reduce the variation score of the selected alterable block for either of the reasons described in the present paragraph.

Fourth, the interface will begin to watch for repetition of the remembered alterable decision of the remembered alterable block that was selected in step two. That remembered alterable decision will constitute the "monitored alterable decision" for purposes of the automatic decision variation feature. The remembered alterable block's pre-deletion state data will now be associated with the remembered alterable decision, and will thus be the monitored alterable decision's pre-deletion state data. In an embodiment that keeps track of variation scores, the remembered alterable block's variation score will now be associated with the remembered alterable decision, and will thus be the monitored alterable decision's variation score. In an embodiment that has option-specific alterable blocks, if the remembered alterable block is an option-specific alterable block, the interface will remember which alternate options of the monitored alterable decision are relevant alternate options for the remembered alterable block.

Fifth, for purposes of the automatic decision variation feature, the interface will forget all remembered alterable blocks and all remembered alterable decisions except the monitored alterable decision. In other words, the interface will cease to retain information about alterable blocks and alterable decisions that have been deleted, except that the interface will still retain information about the monitored alterable decision. As an exception, in an embodiment that has the manual alteration detection feature that is described in Chapter 18, the interface may continue to retain information about such remembered alterable decisions for purposes of the manual alteration detection feature, but such information will no longer be relevant for purposes of the automatic decision variation feature.

Watching for Decision Repetition

In an embodiment, whenever the variation score of the monitored alterable decision is reduced to zero or reduced below zero, the interface will immediately stop watching for repetition of the monitored alterable decision. In an embodiment, whenever the interface stops watching for repetition of the monitored alterable decision for any reason, the interface will cease to retain information about that decision and that decision will cease to be a monitored alterable decision.

In an embodiment, while the interface is watching for repetition of a monitored alterable decision, if the user performs an action that has a deliberation score that is higher than a certain moderately high threshold, then the interface will reduce the variation score of the monitored alterable decision by an amount that is proportional to the amount by which that deliberation score exceeds the threshold. In such an embodiment, if a user pauses a bit longer than usual between keystrokes, the interface may slightly reduce the variation score of the monitored alterable decision; if the user pauses a long time, the interface will greatly reduce its variation score. In an alternative embodiment, while the interface is watching for repetition of a monitored alterable decision, if the user performs an action that has a high deliberation score, then the interface will stop watching for repetition of the monitored alterable decision.

In an embodiment, while the interface is watching for repetition of a monitored alterable decision, if the user performs a destructive action, then the interface will substantially reduce the variation score of the monitored alterable decision. In an embodiment, in such circumstances the interface will additionally reduce the variation score of the monitored alterable decision by an amount that is proportional to the ratio of the amount of text deleted by the destructive action to the amount of text contained in the alterable block of the monitored alterable decision; for example, in an embodiment, if a monitored alterable decision has an alterable block with 10 characters and the user makes a typographical error while retyping the alterable block and presses the backspace key, then the monitored alterable decision may still have a variation score greater than zero, but if a monitored alterable decision has an alterable block with just a single character then as soon as the user presses the backspace key the monitored alterable decision's variation score will certainly drop below zero.

In an alternative embodiment, while the interface is watching for repetition of a monitored alterable decision, if the user performs a destructive action, then the interface will stop watching for repetition of the monitored alterable decision.

In an embodiment, while the interface is watching for repetition of a monitored alterable decision, if the user performs a destructive action that causes the deletion of all or part of the alterable block of an alterable interface decision that has a probability of alteration that is above the threshold of eligibility for automatic decision variation, then the interface will stop watching for repetition of the monitored alterable decision, and the alterable block the user just deleted may become a remembered alterable block as explained above.

In an alternative embodiment, while the interface is watching for repetition of a monitored alterable decision, if the user performs a destructive action that causes the deletion of all or part of the alterable block of an alterable interface decision, the interface will continue to watch for repetition of the monitored alterable decision, and also, the alterable block will become an remembered alterable block. When the user next performs an editing action that is not a destructive action, the interface will check whether the user's input contains any text that is not contained in the pre-deletion state of the monitored alterable decision and is not contained within any altered pre-deletion state of the monitored alterable decision. If so, then the interface will forget the monitored alterable decision and determine whether to begin watching for repetition of some other alterable decision. If not, then the interface will check whether or not any remembered alterable block has a higher probability of alteration than the monitored alterable decision; if so, then the interface will forget the monitored alterable decision and determine whether to begin watching for repetition of some other alterable decision, and if not, then the interface will forget all remembered alterable blocks and continue to watch for repetition of the monitored alterable decision. For example, in an embodiment, if the interface is watching for repetition of a monitored alterable decision whose alterable block was "He will; I won't." when the user deletes an alterable block and types a character, then if the text the user has typed while the interface was watching for repetition of the monitored alterable decision now consists of "He will;", then the interface may continue watching for repetition of the monitored alterable decision, but if that text now consists of "They will;", then the interface certainly will not continue watching for repetition of the monitored alterable decision.

In an embodiment, when the interface begins to watch for repetition of a monitored alterable decision the interface will determine by some means approximately how many keystrokes would be required to retype the alterable block of the monitored alterable decision, and if the interface is still watching for repetition of the same monitored alterable decision when the user has typed a certain number of keystrokes more than that amount, then the interface will stop watching for repetition of the monitored alterable decision. For example, in an embodiment, when the interface begins to watch for repetition of a monitored alterable decision the interface will count the characters in the alterable block of the monitored alterable decision, and if the interface is still watching for repetition of the same monitored alterable decision when the user has typed 10 keystrokes more than that number of characters, then the interface will stop watching for repetition of the monitored alterable decision. However, the behavior described in the present paragraph is intended as an implementation suggestion, and may not have any direct effect that a user will ever discern: once a user has typed a significant number more keystrokes than necessary to retype the alterable block of the monitored alterable decision, it will probably be impossible for the automatic decision variation feature to be invoked for that monitored alterable decision, so the interface need not waste computer resources watching for repetition.

In an alternative embodiment, while the interface is watching for repetition of a monitored alterable decision, as soon as the user performs any action that does not cause the state of the user's input to more closely resemble either the pre-deletion state or some altered pre-deletion state of the monitored alterable decision, the interface will stop watching for repetition of the monitored alterable decision. For example, in an embodiment, if the interface begins to watch for repetition of a monitored alterable decision whose alterable block was "its" and whose alternate option was "it's," then if the user types the character "q," the interface will immediately stop watching for repetition of the monitored alterable decision.

Recognizing Decision Repetition

In an embodiment, while the interface is watching for repetition of a monitored alterable decision, if in response to any editing action that is not a destructive action the state of the user's input will match the pre-deletion state of the monitored alterable decision or any altered pre-deletion state of the monitored alterable decision, and a current alterable decision will exist that is essentially identical to the monitored alterable decision (as defined below), then the interface will "recognize repetition of the monitored alterable decision." The current alterable decision that is essentially identical to the monitored alterable decision is referred to below as "the matching alterable decision."

In an embodiment, for purposes of the preceding paragraph, the phrase "any editing action that is not a destructive action" includes the editing action that causes the interface to determine whether to watch for repetition of a monitored alterable decision, so after a user deletes an alterable block that consists of only a single character, if the user's next action is typing the same character, then in response to that single keystroke the interface may first determine to begin watching for repetition of that alterable decision (because the user performed an editing action that is not a destructive action), then enter that character into the user's input, and then recognize repetition of the monitored alterable decision.

In an embodiment, a current alterable decision is considered to be "essentially identical to the monitored alterable decision" if it has the exact same options the monitored alterable decision had, and has the same unmodified default outcome, and its alterable block is exactly where the monitored alterable decision's alterable block was; however, it may have a different option selected and may have different probabilities of alteration assigned to its options. For purposes of the preceding sentence, the "unmodified default outcome" of a decision is the default outcome the decision would have if it were never affected by automatic decision variation or any other alteration-related functionality. In order for the alterable block of a current alterable decision to be "exactly where the monitored alterable decision's alterable block was," either the state of the user's input matches the pre-deletion state of the monitored alterable decision (as opposed to matching an altered pre-deletion state) and the alterable block of the current alterable decision is exactly where the monitored alterable decision's alterable block was before it was deleted, or else it is the case that if the current alterable decision were altered in such a way as to cause the state of the user's input to match the pre-deletion state of the monitored alterable decision, then the current alterable decision's alterable block would be exactly where the monitored alterable decision's alterable block was before it was deleted. For example, if the selected option of the monitored alterable decision was "its," its alternate option was "it's," and its pre-deletion state was "When its," then if in response to an editing action the state of the user's input will become "When it's" and a current alterable decision will exist with a selected option of "it's" and an alternate option of "its," then the alterable block of that current alterable decision is exactly where the monitored alterable decision's alterable block was, and that current alterable decision is essentially identical to the monitored alterable decision, and that current alterable decision is a matching alterable decision.

In an embodiment that behaves as described above, the interface may recognize repetition of a monitored alterable decision when an editing action causes the interface to make a new alterable decision that is a matching alterable decision, and the interface also may recognize repetition of a monitored alterable decision when an editing action causes an alterable decision that had already existed to become a matching alterable decision (which, for example, may happen when the alterable block of an alterable input state decision grows to include additional text as described in Chapter 15). In an alternative embodiment, the interface will recognize repetition of the monitored alterable decision only in response to an editing action that causes the interface to make a new alterable decision that is a matching alterable decision. Such an alternative embodiment will behave the same way most the time, because it is relatively uncommon for the interface to make an alterable decision that is not initially identical to the monitored alterable decision but later comes to be essentially identical to the monitored alterable decision.

In an embodiment that behaves as described above, in certain circumstances the interface will temporarily remember the pre-deletion state and altered pre-deletion states of deleted alterable decisions, and later if the state of the user's input matches either the pre-deletion state or any altered pre-deletion state of the monitored alterable decision, and a matching alterable decision exists, then the interface will recognize repetition of the monitored alterable decision. This way, when a user deletes and retypes an alterable block so that the interface makes a matching alterable decision, if somehow the initially selected option of the matching alterable decision does not match the option of the monitored alterable decision that was selected, the interface will still be able to recognize that the user has essentially done nothing but delete and retype an alterable block, because the interface will recognize the altered pre-deletion state. For example, if a user deletes and retypes an alterable block and in response to this the interface varies the decision so that an alternate option becomes selected, then if the user deletes and retypes the alterable block a second time, the interface may still be able to recognize repetition of the monitored alterable decision the second time.

In various alternative embodiments, the interface behavior that is explained in the preceding paragraph may be achieved by different methods than are described above, without the need for the interface to remember every altered pre-deletion state of deleted alterable decisions. In particular, in one alternative embodiment, the interface will remember only the pre-deletion state of deleted alterable decisions, and later if a matching alterable decision exists and either the state of the user's input matches the pre-deletion state or the matching alterable decision has an alternate option such that selecting this alternate option would cause the state of the user's input to match the pre-deletion state, then the interface will recognize repetition of the monitored alterable decision. In another alternative embodiment, whenever a user performs a destructive action that causes the deletion of any portion of an alterable block, if that alterable block becomes a remembered alterable block, the interface will determine in advance what input state to watch for: it will determine which option of a matching alterable decision will be initially selected if the interface subsequently does make a matching alterable decision, and if that option is the one that was selected for the remembered alterable decision before it was deleted, then the interface will remember the pre-deletion state; otherwise, the interface will remember the appropriate altered pre-deletion state; in either case, later if a matching alterable decision exists and the state of the user's input matches the particular state that the interface remembered, then the interface will recognize repetition of the monitored alterable decision.

In yet another alternative embodiment, the interface will remember only the pre-deletion state of deleted alterable decisions, and the interface will recognize repetition of the monitored alterable decision only when the state of the user's input matches the pre-deletion state and a matching alterable decision exists. Such an embodiment will not recognize repetition of the monitored alterable decision in certain situations where previously described embodiments would recognize repetition of the monitored alterable decision, but it will usually recognize repetition of a decision as long as a user does not delete and retype the same alterable block twice.

Invoking Decision Variation

In an embodiment, when a user performs any editing action that is not a destructive action and the interface recognizes repetition of the monitored alterable decision, if that editing action was an Undo or Redo action, then the interface will stop watching for repetition of the monitored alterable decision and do nothing special: decision variation will not be invoked. For example, if actuating the Paste key causes the interface to make an alterable decision, then actuating the Undo key and then the Paste key again may invoke decision variation, but actuating the Undo key and then the Redo key will not.

In an embodiment, when a user performs any editing action that is not a destructive action and the interface recognizes repetition of the monitored alterable decision, if that editing action was not an Undo or Redo action, then the interface will vary the matching alterable decision as described below, which in most cases will cause the interface to select a different outcome of the decision.

In an embodiment, in some cases, it may be possible that a certain editing action will cause the interface to make an alterable interface decision and then a later editing action will cause the interface to vary that decision. In an embodiment, if a certain editing action causes the interface to make an alterable decision and then a later editing action causes the interface to vary the decision, then when the interface varies the decision, if varying the decision causes a different outcome of the decision to become selected, for purposes of interface visuals, the change to the user's input caused by varying the decision will be an alteration: that change will be highlighted and/or animated in the same way that an alteration would be highlighted and/or animated.

In an embodiment, however, it is likely that usually the editing action that causes the interface to vary a decision will be the same editing action that caused the interface to make the decision. In an embodiment, when the same editing action causes the interface to make an alterable decision and then immediately causes the interface to vary the decision, the interface will not display the outcome of the decision until after it varies the decision, so for purposes of interface visuals, in all respects the eventual outcome of the decision will appear to be the initial outcome of the decision. For example, in such an embodiment, if the interface makes a decision such that the default outcome of the decision would be to automatically convert x2 to $x^2$, but varying the decision causes the interface to select the outcome x2, then the interface will not temporarily display the outcome $x^2$ and then immediately convert the result to x2; instead, the interface will display only the eventual result of x2. As another example, in an embodiment where the interface highlights autocorrection changes in a way that is distinctively different than the way it highlights alterations, if the interface makes an alterable decision such that the default outcome of that decision is to not perform an autocorrection but varying the decision causes the outcome of performing the autocorrection to become selected, the interface will display this outcome as an autocorrection change, not as an alteration. In an embodiment, as an exception, when the same editing action causes the interface to make an alterable decision and then immediately causes the interface to vary the decision, if the change that occurs when the decision is varied will be a subtle change as defined in Chapter 8, then the interface will first display the outcome of the decision and then vary the decision, in order to help call attention to that change; for example, if varying a decision will convert a slanted quotation mark to a straight quotation mark, then the interface will first display the slanted quotation mark and then display the change to a straight quotation mark as an alteration, which will have a block descriptor as described in Chapter 8.

In an embodiment, when a user enters decision-triggering input as defined in Chapter 11, for purposes of retyping detection features, the alterable interface decision that is triggered by this input will actually occur first and may cause a retyping detection feature to be invoked before the decision-triggering input is entered into the user's input. For example, consider the following scenario: A user types "its" followed by a space character and the interface makes an alterable decision to automatically replace "its" with "it's." The user deletes the space character and then deletes the alterable block consisting of the word "it's"; the pre-deletion state of the user's input thus includes the word "it's" but does not include any following space character. The user then immediately retypes "its" and presses the space bar. The entry of a space character may again trigger an alterable decision whether to automatically replace "its" with "it's,"

so this space character is decision-triggering input. In an embodiment, for purposes of the automatic decision variation feature, the triggered alterable decision whether to replace “its” with “it’s” will actually occur first, before the entry of the space character, and so the user’s input will momentarily include the word “it’s” without a following space character, which will cause the automatic decision variation feature to be invoked before the space character is actually entered into the user’s input. The automatic decision variation feature will thus convert “it’s” back to “its” before the space character is appended, so the result will be “its”.

In various embodiments, the behavior described in the preceding paragraph may be implemented in various ways. The interface may determine that the user has caused the entry of decision-triggering input before actually entering the input, then make the alterable decision, and then enter the input; or the interface may enter the input, then recognize that it is decision-triggering input, then undo the entry of the input, then make the decision, and then redo the entry of the input; or the interface may enter the input, then make the decision, then determine what the input state would be if the decision-triggering input were not present and use this hypothetical input state to determine whether to invoke a retyping detection feature. Other means of implementing such behavior may be evident to those of ordinary skill in the art.

Varying a Decision

In an embodiment, when the interface varies a matching alterable decision, before determining the new selected option of the decision and the new probabilities of alteration of its options, the interface will cause the selected option of the matching alterable decision to be the same option that was selected for the monitored alterable decision (if it was not already), and the interface will cause the probability of alteration of every alternate option of the matching alterable decision to be at least as much as the probability of alteration of the corresponding alternate option of the monitored alterable decision. (In many cases, this will have no effect, because the matching alterable decision will already have the same option selected as the monitored alterable decision and all its alternate options will already have probabilities of alteration that are equal to or greater than the probabilities of alteration of the corresponding alternate options of the monitored alterable decision.)

In an embodiment, when the interface varies a matching alterable decision, in order to determine the new selected option of the decision and the new probabilities of alteration of its options, the interface will apply the variation score of the monitored alterable decision to the matching alterable decision as follows: First, the interface will increase the probability of alteration of each relevant alternate option of the decision by an amount equal to the variation score. If an alternate option then has a probability of alteration that is higher than the implicit default option probability (as defined in Chapter 3), then the interface will assign a probability of alteration to the default option that equals the implicit default option probability and will then reduce the probability of alteration of every relevant alternate option and the default option by the amount that will cause the greatest probability of alteration of any relevant alternate option to equal the implicit default option probability, and then the interface will select a relevant alternate option that has the greatest probability of alteration, so that option becomes the default option. Other mathematically equivalent procedures that achieve identical results will be evident to those of ordinary skill in the art.

(In most cases, every alternate option is a relevant alternate option, but in an embodiment that is explained in Chapter 14, when a user deletes and retypes an option-specific alterable block, certain alternate options will not be relevant alternate options. For example, in such an embodiment, if the interface has made a multi-alternative alterable decision that has an alterable block consisting of $\sqrt{1+3+5}$, and altering the decision would yield either $\sqrt{1}+3+5$ or $\sqrt{1+3}+5$ depending on which alternate option becomes selected, and if the user invokes the automatic decision variation feature by means of deleting and retyping +3+5, then this may convert the result to $\sqrt{1}+3+5$, but definitely will not convert the result to $\sqrt{1+3}+5$.)

In an embodiment, it may generally be expected that if a user deletes and retypes an alterable block reasonably quickly and without deleting or typing anything else, the variation score will be approximately equal to the variation score base value. In an embodiment, the variation score base value equals the amount by which the implicit default option probability exceeds the initial probability of alteration of an alterable interface decision that initially has a very low probability of alteration. In such an embodiment, if an alterable decision has a very low probability of alteration, then a user can still change its outcome by deleting and retyping its alterable block, provided the user does not hesitate after deleting the alterable block or make a typographical error in retyping the alterable block or do anything else that would cause the decision’s variation score to be reduced below its initial value. If an alterable decision has a high probability of alteration, then a user may be able to change its outcome by deleting and retyping its alterable block even if the user does so in a way that causes the decision’s variation score to be reduced below its initial value. Also, if a single-alternative alterable decision has a high probability of alteration and a user immediately deletes and retypes its alterable block quite rapidly, then not only will this change the decision’s outcome, but also it will cause the matching alterable decision to have a relatively low probability of alteration, which accurately reflects the fact that it is quite likely the user’s behavior was indeed intended to change the outcome.

In an embodiment that behaves as described above, when the interface applies a variation score to a decision, if the variation score is positive but is so small that it does not affect the outcome of the decision, it still may have an effect on the probability of alteration of the options of the decision. For example, if an alterable decision has a low probability of alteration and a user deletes and retypes its alterable block but hesitates in doing so, and if due to that hesitation the variation score is a relatively small value and so the interface selects the same default option as before, then the decision may now have a high probability of alteration. After that, if the user then deletes and retypes its alterable block just as hesitantly as before, if as explained above the interface causes the probability of alteration of the matching alterable decision to be at least as much as the probability of alteration of the monitored alterable decision, then even though the variation score will be a relatively small value again, the interface may select a different option of the decision because a small variation score may be sufficient to cause a different outcome for a decision that had a high probability of alteration. In other words, when deleting and retyping a decision once does not change the outcome of a decision, doing so twice may change the outcome.

In an alternative embodiment, when the interface varies a decision, in order to determine the new selected option of the decision and the new probabilities of alteration of its options, rather than applying the variation score of the monitored alterable decision as described in the preceding paragraphs, the interface will simply select the next option of the decision as though the decision were altered. (Such an embodiment need not necessarily keep track of any variation scores at all.) In an embodiment, when the interface varies a decision this way, the interface will subsequently remember for the decision which alternate option or options have been previously selected, and if subsequently the user deletes and retypes the decision's alterable block again so that another matching alterable decision exists, the interface will if possible select an option that has not yet been selected. Thus, in such an embodiment, after the interface makes a multi-alternative decision, a user can cycle through the alternate options of the decision by repeatedly deleting and retyping the decision's alterable block in such a way as to cause the interface to vary the decision.

In another alternative embodiment, when the interface varies a decision, the interface will actually undo all user activity that occurred since the last time the user's input was in the pre-deletion state so that the monitored alterable decision exists again as a current alterable decision, and then the interface will alter that decision. In such an embodiment, deleting and retyping an alterable block in such a way as to invoke automatic decision variation has the exact same effect as altering the decision.

Additional Effects of Decision Variation

In an embodiment, for purposes of the interface adaptation functionality described in later chapters, a matching alterable decision is treated as a re-creation of the monitored alterable decision. Therefore, if the interface makes an alterable decision that has a certain outcome and then the user deletes and retypes its alterable block in such a way as to invoke decision variation so that the matching alterable decision has a different outcome, then for purposes of interface adaptation functionality, this constitutes evidence that the initial outcome of the initial alterable decision was a non-beneficial outcome.

However, in an embodiment, invoking the automatic decision variation feature does not actually constitute altering a decision per se, and does not constitute explicitly selecting an option of the decision. When automatic decision variation is invoked, for most purposes, this simply means that the interface makes a decision that is similar to a previous decision but (usually) has a different outcome.

Example of Decision Variation

The following example is intended as a detailed illustration of one possible version of the automatic decision variation feature that is described above. It is to be understood that various embodiments that have the automatic decision variation feature may implement the feature in various ways, so certain details of the following example may not be directly applicable to some embodiments that have the automatic decision variation feature.

Suppose that a user types 9x2, and the interface automatically converts x2 to $x^2$, so the result thus far is $9x^2$. The interface's decision to convert x2 to $x^2$ is an alterable decision that has a very low probability of alteration. It has two distinct alterable blocks for purposes of the automatic decision variation feature: one of them is just the exponent 2, and the other is the entire exponential expression $x^2$.

The user types two more characters, yielding $9x^2-4$, but then backspaces those two characters.

The user then immediately backspaces again, deleting the exponent 2. This destructive action causes both alterable blocks of the alterable decision to become remembered alterable blocks, and causes the alterable decision to become a remembered alterable decision. For both alterable blocks, the pre-deletion state is $9x^2$, and the altered pre-deletion state is 9x2. The remembered alterable block that consisted of just the exponent 2 has been fully deleted; the remembered alterable block that consisted of the entire exponential expression $x^2$ has been partially deleted. Both remembered alterable blocks now have a variation score that equals the variation score base value.

The user then immediately backspaces again, deleting the letter x. The remembered alterable block that consisted of just the exponent 2 had already been fully deleted; in response to this additional consecutive destructive action, the interface greatly reduces its variation score. The variation score of the remembered alterable block that consisted of the entire exponential expression $x^2$ is unaffected.

The user then immediately retypes the letter x. This is a non-destructive action, so the interface determines whether to begin to watch for repetition of a remembered alterable decision. For both remembered alterable blocks, the interface calculates a probability of variation that equals the alterable block's variation score plus the probability of alteration of its alterable decision; the remembered alterable block $x^2$ has a much higher variation score, and both alterable blocks belong to the same alterable decision, so the remembered alterable block $x^2$ has the higher probability of variation. The interface begins to watch for repetition of that alterable block's remembered alterable decision, which is now the monitored alterable decision; $9x^2$ is now the pre-deletion state of the monitored alterable decision, and 9x2 is its altered pre-deletion state. The interface forgets the remembered alterable blocks, and remembers only the monitored alterable decision. The interface checks whether the input state matches the monitored alterable decision's pre-deletion state or altered pre-deletion state; it does not.

The user then immediately retypes the digit 2. In response to this action, the interface will again alterably decide to convert x2 to $x^2$, so the state of the user's input will match the pre-deletion state of the monitored alterable decision and a current alterable decision will exist that is identical to the monitored alterable decision, and so the interface recognizes repetition of the monitored alterable decision and varies the matching alterable decision.

To vary the decision, the interface increases the probability of alteration of its alternate option by an amount equal to the variation score. That probability of alteration is very low, but the variation score has not been reduced from the variation score base value, so adding it to the the probability of alteration yields a result that is slightly more than the implicit default option probability. The interface assigns a probability of alteration to the default option that equals the implicit default option probability and then slightly reduces the probability of alteration of both options, so that now the alternate option's probability of alteration equals the implicit default option probability and the default option's probability of alteration is slightly less, but is still a very high probability of alteration. The interface selects the alternate option; it is now the new default option.

The interface displays the result, 9x2.

For purposes of interface adaptation, the interface currently believes that the initial decision to automatically convert the digit 2 to an exponent had a non-beneficial outcome. The matching alterable decision now has a very high probability of alteration, so in an embodiment, x2 is highlighted, and if the user wants the result $9x^2$ then the user can achieve this result by actuating the alteration key. Alternatively, if the user wants the result $9x^2$, the user can first delete the digit 2, which will cause a remembered alterable block to exist, and then immediately retype the digit 2, which will cause the interface to watch for repetition of a monitored alterable decision, and will also immediately make the state of the user's input match an altered pre-deletion state of that monitored alterable decision and make a matching alterable decision exist, so the interface will again vary the matching alterable decision, which will yield the result $9x^2$ this time.

Decision Variation and Memory Constraints

Above, throughout the description of the automatic decision variation feature, for the sake of simplicity the interface is assumed to actually remember entire pre-deletion states and altered pre-deletion states in order to be able to later determine whether such a remembered state matches the then-current state of the user's input. However, in various embodiments, in order to reduce the memory requirements of retyping detection features, the exact same interface behaviors can be achieved by various other means. For purposes of retyping detection features, the interface really only needs to remember enough information about a pre-deletion state to be able to later recognize when the pre-deletion state matches the then-current state of the user's input. Also, for purposes of retyping detection features, whenever a user performs an action that may reasonably be assumed to indicate that the user does not currently intend to invoke a retyping detection feature, then the interface may as well immediately forget a remembered alterable block and its pre-deletion state if it is convenient for the interface to do so.

For example, in an embodiment, the interface will calculate a 256-bit hash code for a pre-deletion state and will remember that hash code in lieu of remembering the pre-deletion state itself, and later, in order to determine whether that pre-deletion state matches the then-current state of the user's input, the interface will calculate a 256-bit hash code for the then-current state of the user's input and check whether this matches the hash code that was generated for the pre-deletion state. If the hash codes match, then the input states themselves may be presumed to match. (There is an infinitesimal possibility that the hash codes will match when the input states themselves would not match, but in the unlikely event that this ever happens, the consequences will not be especially severe: if the automatic decision variation feature is accidentally invoked, then one retyped alterable decision will happen to have a different outcome than expected; if the manual alteration detection feature is accidentally invoked, the consequences will be even less significant.)

As another example, in an embodiment that has a version of the automatic decision variation feature but does not have the manual alteration detection feature, when a user performs a sequence of consecutive destructive actions followed by a non-destructive action, the interface will not remember any pre-deletion state or altered pre-deletion state of any deleted alterable block until it begins to watch for repetition of a monitored alterable decision. Instead, for each deleted alterable block, the interface will remember at what moment the alterable block was deleted so that the interface can later undo all the actions that occurred from the deletion of the alterable block onward. When the interface selects an alterable block whose alterable decision will become the monitored alterable decision, the interface will internally undo all the actions from the deletion of that alterable block onward in order to determine and remember the pre-deletion state and all altered pre-deletion states of that alterable block, and then the interface will internally redo all those actions (without actually displaying any undo changes or redo changes to the user's input). Thus, in such an embodiment, the interface will actually remember one entire pre-deletion state whenever there is a monitored alterable decision; however, when a sequence of consecutive destructive actions simultaneously deletes multiple alterable blocks, the interface will not need to simultaneously remember one pre-deletion state for each alterable block.

As another example, in an embodiment, the interface will never remember any deleted alterable block unless it is a contiguous portion of input that is smaller than a certain size (such as, in an embodiment, 50 characters). When the interface remembers the pre-deletion state of such an alterable block, this pre-deletion state will consist of only the portion of input that was within a certain range of the alterable block before it was deleted (such as, in an embodiment, within 10 characters). If the user subsequently performs any editing action that affects any of the user's input that is outside this portion of input, then the interface will forget the remembered alterable block; after all, if the user went off to do some editing elsewhere in the current document, then the user will probably not invoke a retyping detection feature anyway. Later, in order to determine whether that pre-deletion state matches the then-current state of the user's input, the interface will simply check the relevant portion of the user's input, knowing that no other portion of the user's input has changed.

Other possible implementations of retyping detection features that reduce the memory requirements of retyping detection features will be evident to those of ordinary skill in the art.

Trigger Variation

In an embodiment, after a user inputs a character that is decision-triggering input for an alterable decision, if the user wishes to alter that decision by deleting and retyping text, then rather than deleting and retyping the entire alterable block of the decision, the user may instead delete and retype just the decision-triggering character. Such an embodiment will be said to have "the trigger variation feature." Details of such an embodiment are specified in the following paragraphs.

In an embodiment, when a user performs an action that deletes a character that was decision-triggering input for an alterable decision without deleting any portion of that decision's alterable block, for purposes of decision variation, the deleted character will be treated as though it is an alterable block of that decision, and so it will become a remembered alterable block. In such a case, that remembered alterable block will be the alterable block of an alterable decision that is a current alterable decision, not a remembered alterable decision. In an embodiment, the interface will keep track of a certain value called the "trigger variation penalty," and whenever the interface thus causes a deleted character to become the remembered alterable block of a current alterable decision, the interface will reduce that remembered alterable block's variation score by an amount that is equal to the trigger variation penalty.

In an embodiment, after a deleted character that was decision-triggering input becomes a remembered alterable block of a current alterable decision as described in the preceding paragraph, if the user's next action does not consist of retyping the same character in the same location, then the user will forget that alterable block.

In an embodiment, after a deleted character that was decision-triggering input becomes a remembered alterable block of a current alterable decision, if the user's next action consists of retyping the same character in the same location, then the interface will proceed as described above in the explanation of the automatic decision variation feature. Therefore, in response to the retyping of that character, first the interface will determine whether to begin watching for repetition of an alterable decision, because the user performed an editing action that was not a destructive action; then the interface will enter that character into the user's input. At this point, if the interface decided to begin watching for repetition of that current alterable decision, then it is certain to recognize repetition of the monitored alterable decision: the state of the user's input will certainly match the pre-deletion state, because nothing happened since the pre-deletion state was recorded except the deletion and retyping of a single character, and a current alterable decision will certainly exist that is essentially identical to the monitored alterable decision, because a current alterable decision will exist that actually is itself the monitored alterable decision. In such circumstances, the interface will then vary the monitored alterable decision itself.

For example, in an embodiment that has the trigger variation feature, if a user inputs the word "its" followed by a space character, and the entry of the space character triggers an alterable interface decision to convert the preceding word to "it's," then the user can convert the result back to "its" by immediately deleting and retyping the space character: when the user deletes the space character, it will become the remembered alterable block of that decision, and when the user retypes the space character, that decision will become the monitored alterable decision, and the interface will recognize repetition of the monitored alterable decision, and so the interface will vary that decision, which will cause the outcome "its" to become selected.

As another example, in an embodiment, if a user types the lowercase word "tuesday" followed by a quotation mark, and the entry of the quotation mark triggers an alterable interface decision to automatically capitalize the word "tuesday" and also triggers an alterable interface decision to automatically convert the quotation mark from a straight quotation mark to a slanted quotation mark, then if the user immediately deletes the quotation mark, the deleted quotation mark will then be the remembered alterable block of a current alterable decision regarding the word "Tuesday" and will also be the remembered alterable block of a remembered alterable decision regarding the quotation mark itself, so if the user then immediately retypes the quotation mark, one of those two decisions may become the monitored alterable decision; which decision becomes the monitored alterable decision depends on factors such as the trigger variation penalty and the probabilities of alteration of the two decisions.

In an alternative embodiment, if a user performs an action that deletes a character that was decision-triggering input for an alterable decision without deleting any portion of that decision's alterable block, and the user's next action consists of retyping the same character in the same location, then the interface will alter that alterable decision. Such an embodiment may be easier to implement than the more complex version of the trigger variation feature that is described above, and may yield the same results in most cases, but may be less advantageous in some cases. Such an embodiment also will be said to have "the trigger variation feature."

In an embodiment that has the trigger variation feature, for some users it may seem rather odd at first that it is possible to undo an autocorrection by means of deleting and retyping the space character that is after the word that was autocorrected (for example). Nevertheless, deleting and retyping just a single character is a quick and easy way to correct a mistake, so the trigger variation feature may be quite advantageous for a user who becomes accustomed to it.

Other Versions of Decision Variation

As described above, the automatic decision variation feature may be fairly complex, in some embodiments. However, those of ordinary skill in the art will understand how to create various alternative embodiments with simpler versions of the automatic decision variation feature.

For example, in an alternative embodiment, after a user action causes the interface to make exactly one alterable decision, if each of the user's subsequent actions is a destructive action until the alterable block of that alterable decision is entirely deleted and nothing else is deleted, and then each of the user's subsequent actions is a non-destructive action until the interface makes an exactly identical alterable decision and the user's input is exactly the same as it was after the previous time the interface made the alterable decision, then the interface will alter that decision. In such an alternative embodiment, if a single user action causes the interface to make two distinct alterable decisions, then neither decision can be altered by means of the automatic decision variation feature; also, after the interface makes an alterable decision, if the user's next action is a non-destructive action, then it will no longer be possible for the user to go back and alter that decision by means of the automatic decision variation feature; nevertheless, such an alternative embodiment will often yield the same results as an embodiment with a more complex version of the automatic decision variation feature.

Automatic Decision Variation in Perspective

In various prior art interfaces, in certain circumstances, if the interface performs an autocorrection or automatic formatting action, and then before performing any other actions the user deletes and retypes the same input, then the interface will not necessarily repeat the same autocorrection or automatic formatting action the second time. For example, on a prior art iPhone, typing "woth" and then pressing the space bar may trigger autocorrection and so may yield the result "with," but if it does, then immediately deleting the entire word "with" and typing "woth" a second time may yield the result "woth." Even with respect to undesired autocorrections and automatic formatting actions, the automatic decision variation feature may be advantageous over prior art in various ways. In particular, in an embodiment, because the automatic decision variation feature is sensitive to significant pauses that occur while deleting and retyping text, a user can delete and retype text in such a way that the interface does not repeat an autocorrection or automatic formatting action (by not pausing), or a user can delete and retype text in such a way that the interface does repeat the autocorrection or automatic formatting action (by pausing). Such flexibility may generally make it easier for users to achieve desired results.

The automatic decision variation feature may be especially advantageous in conjunction with various other interface features that are described herein. In an embodiment with the automatic decision variation feature such that the interface highlights an alterable decision when its probability of alteration is above a certain threshold (as described in Chapter 5) and such that it is easy to alter highlighted alterable decisions by means of alteration functionality, if a user deletes and retypes the portion of input that pertains to an alterable interface decision but does not achieve the result he desires (either because the automatic decision variation feature was invoked when the user did not wish it to be or vice versa), then it may be easy for the user to notice and correct the resulting mistake. In an embodiment with the automatic decision variation feature where a wide variety of interface decisions are alterable (as is described in Part III), there will be a wide variety of situations in which deleting an undesired result and then instinctively repeating the behavior that caused the undesired result may actually yield the desired result. Such advantages may be quite significant even in an embodiment that has a very simple version of the automatic decision variation feature.

Chapter 18: Manual Alteration Detection

Overview of Manual Alteration Detection

Even in an interface where it is possible for a user to efficiently correct mistakes by means of the alteration functionality that is described herein, a user may correct mistakes by other means for various reasons. For example, a user may not understand how to use alteration functionality. A user may not be aware that a particular interface decision happens to be an alterable decision. Even when a user theoretically knows it is possible to efficiently correct a particular mistake by means of alteration functionality, the user may instinctively resort to a less efficient means of correcting the mistake. Occasionally, even when a mistake can be corrected by means of alteration functionality, another means of correcting the mistake is just as efficient or more efficient.

In an embodiment, in certain cases, if a user achieves the exact result that could have been achieved by means of altering a particular alterable interface decision, but the user achieves this result by some other means, the interface will recognize that the user has "manually altered" the decision. Such an embodiment will be said to have "the manual alteration detection feature."

The manual alteration detection feature is an information-gathering interface component: it enables the interface to detect situations where an interface decision apparently had a non-beneficial outcome, or where a user may have achieved a desired result by an inefficient means, but it does not directly affect interface behavior. The manual alteration detection feature serves no independent purpose as an interface feature; however, it may be quite useful in conjunction with various other interface features, as is discussed farther below.

A Simplified Manual Alteration Detection Algorithm

Figure 15A:
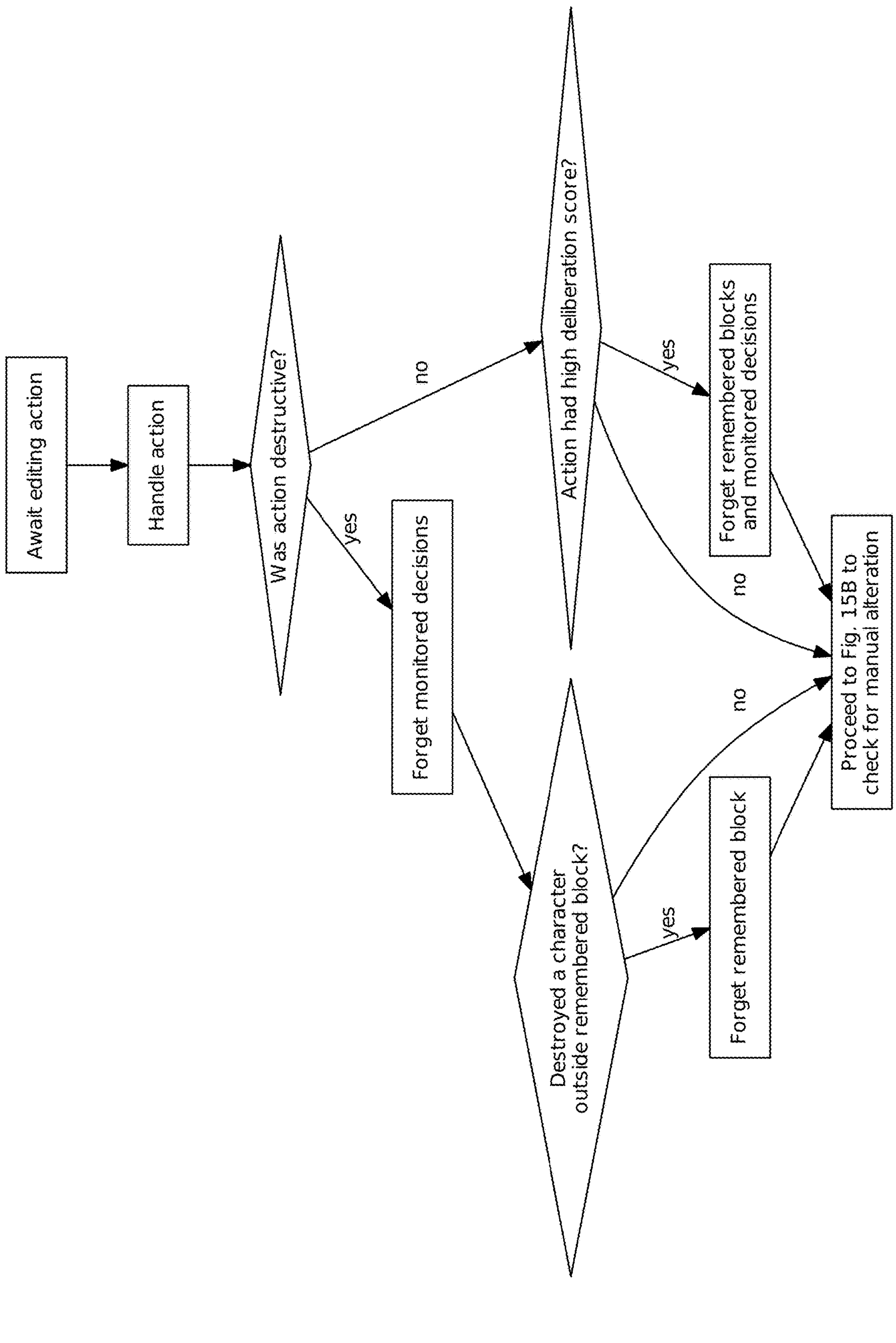
FIGS. 15A and 15B are flowcharts illustrating example methods for a manual alteration detection feature.
Figure 15B:
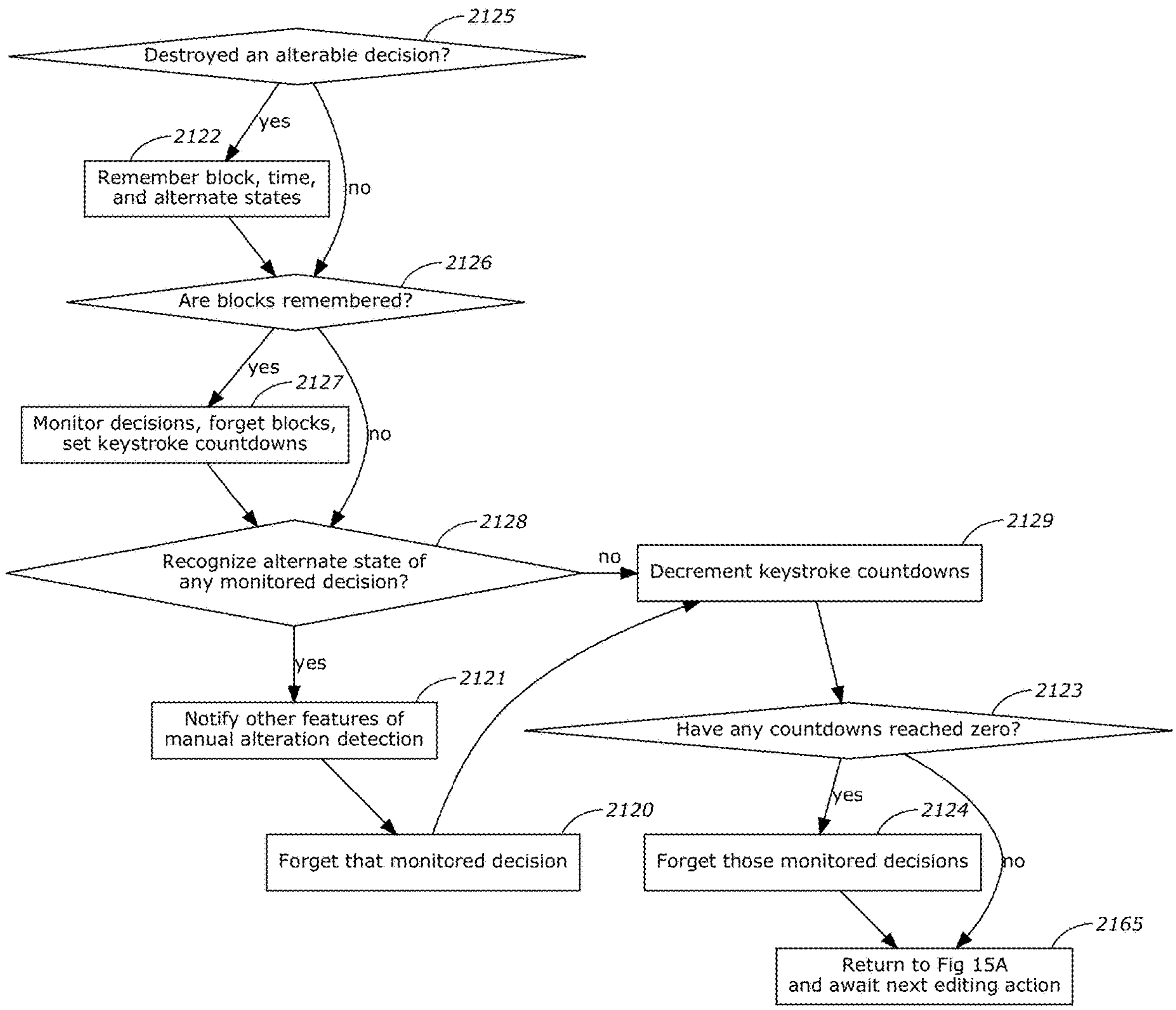

FIGS. 15A and 15B are flowcharts that illustrate a simplified version of the manual alteration detection feature. Initially, the interface will "await editing action." When the user performs an editing action, the interface will proceed to the next block and "handle action" normally. After that, the interface will proceed to determine "Was action destructive?" (It may make this determination by means of the algorithm illustrated in FIG. 14A.) If the action was destructive, the interface will proceed to "forget monitored decisions," which means that if there were any monitored alterable decision with respect to the manual alteration detection feature, then it stops monitoring those decisions. It will then proceed to ask whether the action "Destroyed a character outside remembered block?", and if the answer is yes, the interface will proceed to "Forget remembered block." This means that for each remembered alterable block, if the user deletes a character that was not part of that alterable block, then that alterable block will cease to be a remembered alterable block, and its alterable decision will cease to be a remembered alterable decision. Whether or not the action destroyed a character outside of a remembered alterable blocks, the interface will then perform the procedure illustrated in FIG. 15B in order to check for manual alteration.

Continuing with the explanation of FIG. 15, if the user's action was not a destructive action, the interface will ask whether the "action had high deliberation score?" If the action had a high deliberation score as defined in Chapter 12, then that means that the user took a long time to perform the action, in which case the interface will proceed to "forget remembered blocks and monitored decisions" before it then proceeds. Whether or not the action had a high deliberation score, the interface will proceed to perform the procedure illustrated in FIG. 15B in order to check for manual alteration.

When the interface performs the procedure illustrated in FIG. 15B, it will first determine whether the user's action "destroyed an alterable decision?" (Block 1510) If it did, then the interface will remember information about the alterable decision that may help the interface recognize whether the user subsequently wastes time achieving something by other means that could have been achieved by altering the decision; in particular, the interface will remember the alterable decision's alterable block, the time at which the alterable decision was destroyed, and the alternate input states that would have obtained if the user had altered the decision rather than performing the action the user did perform (Block 1511). Whether or not the action destroyed an alterable decision, the interface will then proceed to check whether there are any remembered blocks (Block 1512). If there are, then the interface will begin to monitor a decision for each such remembered block (but will no longer remember the block per se); to begin to monitor the decision, the interface will initialize a keystroke countdown such that the initial number of keystrokes in the keystroke countdown is at least enough keystrokes for the user to be able to manually input the contents of any of the alternate options of the monitored decision (Block 1513).

Whether or not there were any remembered blocks, the interface will proceed to check whether the user has now caused the input state to match any of the remembered alternate input states that would have obtained if the user had altered a monitored alterable decision rather than causing it to be destroyed (Block 1514). If so, then the interface notifies other components of the interface (such as the interface adaptation feature and/or the user education feature) that it has recognized manual alteration of the decision (Block 1515). The interface will then forget the remembered alterable decision (Block 1516).

Whether or not the interface recognizes manual alteration, it will proceed to decrement all keystroke countdowns for any remaining monitored alterable decisions (Block 1517), and if any keystroke countdowns have reached zero (Block 1518), it will forget the corresponding monitored alterable decisions (Block 1519). Whether or not any keystroke countdowns have reached zero, the interface will then await the next editing action.

The following discussion of the manual alteration detection feature is more detailed than the above explanation of FIGS. 15A and 15B. In an embodiment, the manual alteration detection feature will include the additional nuances described below; in an alternative embodiment, the automatic decision variation feature will behave exactly as explained above and as illustrated in FIG. 15A and FIG. 15B.

How Manual Alteration Detection Relates to Decision Variation

Although the manual alteration detection feature serves a different purpose than the automatic decision variation feature, the two features both monitor the user's behavior in a similar way. Broadly speaking, the automatic decision variation feature monitors the user's behavior to see whether the user deletes an alterable decision but then repeats actions that would lead the interface to select the exact same outcome of that alterable decision, so that the automatic decision variation feature can immediately intervene to change this outcome; the manual alteration detection feature monitors the user's behavior to see whether the user deletes an alterable decision but performs actions that lead to the same result that could have been achieved by selecting a different outcome of that alterable decision, so that the manual alteration detection feature can notify other components of the interface that the user has manually altered that decision.

As described in Chapter 17, the automatic decision variation feature may take into account various factors in an attempt to intelligently determine whether a user who deletes and retypes an alterable block does so due to dissatisfaction with the outcome of the alterable decision. It may similarly be advantageous for the manual alteration detection feature to take into account various factors in an attempt to intelligently determine whether a user who achieves the same result that could have been achieved by selecting a different outcome of an alterable decision does so due to dissatisfaction with the outcome of the alterable decision. In fact, it may be advantageous for the manual alteration detection feature to take into account the same factors as the automatic decision variation feature.

It is to be understood that an embodiment that has the manual alteration detection feature does not necessarily need to have the automatic decision variation feature also. However, if an embodiment does have both features, then it may be advantageous for the implementations of the similar portions of the two features to share common source code, in accordance with the well-known DRY principle of software development. ("Don't Repeat Yourself.") For that reason, it is likely that a skilled programmer intending to implement both features will prefer to understand the behavior of the manual alteration detection feature in terms of its relationship to the behavior of the automatic decision variation feature, rather than thinking about the behavior of the manual alteration detection feature independently of the automatic decision variation feature.

Therefore, in order to potentially facilitate implementation of the manual alteration detection feature, and in order to avoid excessive repetition within the present specification itself, the following description of the manual alteration detection feature does not explain it in a way that is intended to stand alone: instead, it explains the behavior of the manual alteration detection feature in terms of its relationship to the behavior of the automatic decision variation feature, which is explained in Chapter 17. Once those of ordinary skill in the art understand how to implement the manual alteration detection feature in conjunction with the automatic decision variation feature, it will be obvious to them how to implement the manual alteration detection feature without the automatic decision variation feature if desired.

Various terms such as "destructive action," "altered pre-deletion state," and so forth have the same meaning in the following description of the manual alteration detection feature that is specified above in the description of the automatic decision variation feature, except that a "remembered alterable decision" is a decision that has been deleted such that the interface is still retaining information about the decision for purposes of the manual alteration detection feature, and not necessarily also for purposes of the automatic decision variation feature, except as otherwise specified.

The above description of the automatic decision variation feature explains a few details of interface behaviors pertaining to "retyping detection features," and the manual alteration detection feature is a retyping detection feature, so those details have already been explained in terms of interface behaviors pertaining to the manual alteration detection feature. Such details will not be repeated again below.

Deletion and Manual Alteration

In an embodiment, when an alterable block becomes a remembered alterable block for purposes of the manual alteration detection feature, or when an alterable decision becomes a remembered alterable decision for purposes of the manual alteration detection feature, the interface will assign it a variation score for purposes of the manual alteration detection feature that is distinct from its variation score for purposes of the automatic decision variation feature. In an embodiment, the variation score base value for purposes of the manual alteration detection feature is higher than the variation score base value for purposes of the automatic decision variation feature, but when an alterable block or alterable decision has both types of variation scores, circumstances that cause the interface to decrease either of the variation scores will affect both of them equally; in such an embodiment, it is likely that circumstances will cause the variation score that pertains to the automatic decision variation score to reach zero before the other variation score reaches zero. In an alternative embodiment, a remembered alterable block or remembered alterable decision will have only a single variation score, so while it is a remembered alterable block or remembered alterable decision for purposes of both the automatic decision variation feature and the manual alteration detection feature, any changes to its variation score will affect its behavior with respect to both features equally.

In an embodiment, whenever a user performs a destructive action that causes the deletion of any portion of an alterable block and that alterable block becomes a remembered alterable block, the pre-deletion state data for the remembered alterable block will include a record of the time when the destructive action's "previous action moment" occurred, as defined in Chapter 23. In an alternative embodiment, the pre-deletion state data will simply include a record of the time when the destructive action itself occurred.

In an embodiment, an alterable block will become a remembered alterable block for purposes of the manual alteration detection feature in the exact same circumstances where it would become a remembered alterable block for purposes of the automatic decision variation feature as described in Chapter 17. (Such an embodiment need not actually have the automatic decision variation feature; the reference to the automatic decision variation feature in the present paragraph is intended only as a concise way of describing the circumstances in which an alterable block will become a remembered alterable block for purposes of the manual alteration detection feature.) In an embodiment, if a user performs a destructive action that causes the interface to delete an alterable decision, then that decision will become a remembered alterable decision for purposes of the manual alteration detection feature until none of its alterable blocks are remembered alterable blocks.

In an embodiment, remembered alterable blocks are treated exactly the same way for purposes of the manual alteration detection feature that they are treated for purposes of the automatic decision variation feature as described in Chapter 17. For example, in an embodiment, a remembered alterable block initially has a variation score, and after a user performs a destructive action, if the deliberation score of the user's next action is high, then the interface will reduce the variation score of every remembered alterable block, and the interface will forget any remembered alterable block whose variation score reaches zero; in an alternative embodiment, after a user performs a destructive action, if the deliberation score of the user's next action is very high, then the interface will forget all remembered alterable blocks, regardless of any variation score. Other details of the treatment of remembered alterable blocks for purposes of the manual alteration detection feature can be understood by reviewing the detailed description of the treatment of remembered alterable blocks in the explanation of the automatic decision variation feature.

In an embodiment, when a user performs an editing action that is not a destructive action, for purposes of the manual alteration detection feature, the interface will forget every remembered alterable block, but the interface will not forget any remembered alterable decision: instead, for every remembered alterable decision, its remembered alterable block's pre-deletion state data will now be associated with the remembered alterable decision, and the remembered alterable block's variation score will now be associated with the remembered alterable decision (if the interface keeps track of variation scores). If a remembered alterable decision had more than one remembered alterable block, it will acquire the pre-deletion state data and variation score of its remembered alterable block that had the highest variation score.

In an embodiment, whenever a user performs an editing action that is not a destructive action but that causes the interface to delete an alterable decision, no alterable block of that decision will become a remembered alterable block, but the decision itself will immediately become a remembered alterable decision for purposes of the manual alteration detection feature, and the interface will remember the altered pre-deletion state for each alternate option of that decision. In an embodiment, the interface will assign such a remembered alterable decision a variation score that equals the variation score base value. In an embodiment, the interface will remember the time when the previous action moment occurred for the editing action that caused the interface to delete the alterable decision; in an alternative embodiment, the interface will remember the time when the editing action itself occurred.

The behavior described in the preceding two paragraphs is different than the corresponding behavior for the automatic decision variation feature: when a user performs an editing action that is not a destructive action, the automatic decision variation feature will narrow its focus to a single monitored alterable decision (or forget every alterable decision), but the manual alteration detection feature may continue to remember arbitrarily many alterable decisions. It is therefore possible for an alterable decision to be a remembered alterable decision for purposes of the manual alteration detection feature while it is not a remembered alterable decision for purposes of the automatic decision variation feature.

WATCHING FOR MANUAL ALTERATION

In an embodiment, when a user performs an editing action that is not a destructive action, if any alterable decision is a remembered alterable decision for purposes of the manual alteration detection feature, then the interface will begin to watch for manual alteration of that remembered alterable decision. This includes any editing action that is not a destructive action that causes the alterable decision to become a remembered alterable decision. In fact, a single action can cause an alterable decision to become a remembered alterable decision, and cause the interface to begin to watch for manual alteration of that remembered alterable decision, and cause the interface to recognize manual alteration of that remembered alterable decision. For example, if the interface makes an alterable decision not to italicize a certain block of text, then if the user highlights that text and performs the single action of actuating a key that causes the interface to italicize the text, that action will modify the alterable block in such a way as to cause the alterable decision to become a remembered alterable decision, and cause the interface to begin to watch for manual alteration of that remembered alterable decision, and cause the interface to recognize manual alteration of that remembered alterable decision.

In an embodiment, while the interface is watching for manual alteration of a remembered alterable decision, after each user action, the interface may reduce its variation score for various reasons in the same way that the interface would reduce the variation score of a monitored alterable decision while it is watching for repetition of the monitored alterable decision, as described above in the description of the automatic decision variation feature. For example, in an embodiment, while the interface is watching for manual alteration of a remembered alterable decision, if the user performs an action that has a high deliberation score, then the interface will reduce the variation score of the remembered alterable decision; if the user performs a destructive action, the interface will substantially reduce the variation score of the remembered alterable decision; and so forth. (Such an embodiment need not actually have the automatic decision variation feature; the reference to the automatic decision variation feature in the present paragraph is intended only as a concise way of describing the circumstances in which the interface will reduce the variation score of a remembered alterable decision for purposes of the manual alteration detection feature.)

In an embodiment, in order to prevent the interface from wasting computer resources watching for manual alteration of a remembered alterable decision for an indefinitely long amount of time, when the interface begins to watch for manual alteration of a remembered alterable decision, the interface will determine by some means approximately how many keystrokes would be required to manually retype the entire alterable block of the remembered alterable decision, and if the interface is still watching for manual alteration of that decision when the user has typed a significant number more keystrokes than that amount (such as, in an embodiment, 10 more keystrokes than that amount), then the interface will forget that decision.

Recognizing Manual Alteration

In an embodiment, while the interface is watching for manual alteration of a remembered alterable decision, if an editing action causes the state of the user's input to match an altered pre-deletion state of a remembered alterable decision, then the interface will recognize manual alteration of the decision. The manual alteration feature will notify other components of the interface (such as the interface adaptation feature and/or the user education feature) that it has recognized manual alteration of the decision. The interface will then forget the remembered alterable decision.

In an embodiment, as an exception, if an editing action that causes the state of the user's input to match the altered pre-deletion state of a remembered alterable decision is an actuation of the alteration key or any other action that causes the interface to actually alter a decision, then the interface will not recognize manual alteration; it will simply forget the remembered alterable decision.

In an embodiment, when the manual alteration detection feature notifies other components of the interface that it has recognized manual alteration, it will also report how much time the user spent performing the sequence of actions that began with the editing action that caused the interface to delete the alterable block and ended with the editing action that caused the interface to recognize manual alteration. If the interface remembers not only when the first editing action of the sequence occurred but when that action's previous action moment occurred, then it can determine how much time the user spent perfolining the sequence of actions as defined in Chapter 23. This amount of time may be interpreted as the amount of time that it took for the user to manually alter the decision, and can thus serve as an approximate indication of how inconvenient it was for the user to manually alter the decision, which may be information that is useful for purposes of the user education feature described in Chapter 23.

In an embodiment, a deleted alterable decision that is a remembered alterable decision for purposes of the manual alteration detection feature may also be the monitored alterable decision for purposes of the automatic decision variation feature, and it is then possible that an action will cause the interface to recognize repetition of the monitored alterable decision so that the interface varies the matching alterable decision, and then as a result of varying the matching alterable decision the interface recognizes manual alteration of the remembered alterable decision. In other words, in such an embodiment, the "manual alteration" that is detected by the manual alteration detection feature may actually be the result of invoking the decision variation feature. In an alternative embodiment, whenever the interface recognizes repetition of the monitored alterable decision, if the monitored alterable decision is a remembered alterable decision for purposes of the automatic decision variation feature, then the interface will forget the remembered alterable decision for purposes of the manual alteration detection feature without recognizing manual alteration.

Example of Manual Alteration Detection

The following example is intended as a detailed illustration of one possible version of the manual alteration detection feature that is described above. It is to be understood that various embodiments that have the manual alteration detection feature may implement the feature in various ways, so certain details of the following example may not be directly applicable to some embodiments.

Suppose that a user is editing a document and wishes to input the word "fiancée" with an accent over the letter e. The user does not know how to input the accent, and decides to copy the word "fiancée" from a different document that someone else created. The user pastes the word "fiancée" into the current document. Unfortunately for the user, the font used in the other document does not match the font used in the current document, and the interface alterably decides against changing the word's font to match the font used in the current document. The font does not match. The word "fiancée" is now the alterable block of an alterable interface decision.

The user notices that the font does not match and is displeased, but the user does not know how to use alteration functionality. The user decides to give up and input the word "fiancee" without an accent.

The user presses the Undo key. This is a destructive action. The alterable decision regarding the font of the pasted text becomes a remembered alterable decision, and the word "fiancée" becomes a remembered alterable block for purposes of the manual alteration detection feature. The interface remembers its altered pre-deletion state, which is is the input state that would have obtained if the user had altered the decision rather than pressing Undo. This altered pre-deletion state happens to be the input state that the user actually desires, wherein the word "fiancée" has an accent over the letter e and its font matches the font used in the current document. The interface also remembers the time when this destructive action's previous action moment occurred, which happened to be at exactly noon.

The user begins to retype the word "fiancee" without an accent. When the user types the first letter of this word, the interface forgets the remembered alterable block but does not forget the remembered alterable decision. The altered pre-deletion state that was associated with the remembered alterable block is now associated with the remembered alterable decision. If the interface happens to have the automatic decision variation feature, then the remembered alterable decision becomes the monitored alterable decision for purposes of that feature, but for purposes of the manual alteration detection feature it is just a remembered alterable decision.

The user finishes retyping the word "fiancee," and does so quickly enough that the variation score of the remembered alterable decision is not reduced. The user accepts the result "fiancee."

Next, eight seconds after noon, the user presses the space bar. For purposes of this example, it so happens that the interface has autocorrect functionality that the user did not know about, and the interface now makes an alterable decision to change the word's spelling from "fiancee" to "fiancée." The space character that the user just typed is decision-triggering input for this alterable decision, but for purposes of the manual alteration detection feature, the alterable interface decision that is triggered by this input occurs first, before the space character is entered into the user's input. The moment after the interface changes the word's spelling from "fiancee" to "fiancée," before the space character is entered into the user's input, the manual alteration detection feature recognizes that the state of the user's input exactly matches the altered pre-deletion state of the remembered alterable decision, and so the manual alteration detection feature notifies other components of the interface that the user manually altered that decision, and that the user took eight seconds to do so. As a result, those other features can attempt to prevent future inconvenience for the user. Those other features may cause the interface to adapt so that in the future it is more likely to decide to cause pasted text to match the format of its destination, or may cause the interface to explain to the user how to use alteration functionality, or both; such features are described in detail in the following chapters.

Manual Alteration Detection for Non-Textual Decisions

As described above, the manual alteration detection feature can detect user actions that have the same effect that could have been achieved by altering an alterable interface decision that pertains to an editable portion of text input. However, in an embodiment, some types of alterable decisions do not pertain to text input at all. Such decisions will be referred to in the following paragraphs as "non-textual decisions." For example, in an embodiment, when a user is browsing a folder, if the user clicks to open a subfolder within the folder, the interface's decision whether to display the contents of the subfolder in the current window or in a newly opened window is an alterable decision. In an embodiment, if a user presses the up arrow key when the input cursor is positioned in a location within the current document that is not currently visible, the interface's decision whether to scroll the current document so that the input cursor becomes visible or to move the input cursor to a location that was already visible is an alterable decision.

It may be advantageous for the manual alteration detection feature to also be able to detect user actions that have the same effect that could have been achieved by altering a non-textual decision. In an embodiment, in order to make manual alteration detection work for one or more types of non-textual decisions, for purposes of such decisions the interface will consider the "input state" to include something other than or something in addition to the current contents of a portion of text. For example, when a user is editing a text document, the "input state" is ordinarily defined to consist of the actual contents of the current document, without regard to the location of the input cursor. If the interface makes an alterable decision regarding the location of the input cursor within a text document, though, then altering this decision will not change such an input state in any way. Instead, in an embodiment, for purposes of manual alteration detection of such a decision, the "input state" is defined to consist of the current location of the input cursor as well as the contents of the current document, so that when the interface makes such a decision, the input state that will obtain if the decision is altered is distinct from the current input state, and it is thus possible for the interface to detect whether subsequent user actions have the same effect that could have been achieved by altering the decision.

More generally, for any particular type of alterable interface decision, including a non-textual decision, a programmer may enable manual alteration detection by creating an algorithm that is specifically tailored to detect whether the computing device comes to be in essentially the same state that could have been achieved by altering the decision. For example, if the interface were to make an alterable decision to open a subfolder in a newly opened window rather than opening the subfolder in a browser window that was already open, then the primary effect of altering this decision would be that the interface would close the browser window that was already open. (Altering the decision could also have the effect of repositioning the newly opened window.) In an embodiment, after the interface makes an alterable decision to open a subfolder in a newly opened window, in order to detect whether subsequent user actions have essentially the same effect that could have been achieved by altering the decision, the interface will simply check whether the user's next action consists of closing the browser window that was already open. Conversely, after the interface makes an alterable decision to open a subfolder in a browser window that was already open, in order to detect whether subsequent user actions have essentially the same effect that could have been achieved by altering the decision, the interface will check whether the user then immediately opens another browser window and then performs a sequence of navigation actions in the new browser window such that the new browser window displays the contents of the parent folder while the previously open browser window displays the contents of the subfolder or vice versa.

For certain types of non-textual decisions, it may be advantageous for the manual alteration detection feature to detect user actions that have substantially the same effect that could have been achieved by altering the decision without having exactly the same effect. For such decisions, the ad hoc approach described in the preceding paragraph may be quite appropriate. For example, in an embodiment, if the interface makes an alterable decision to automatically move the input cursor to a new location, then rather than detecting only whether immediately subsequent user actions restore the input cursor to the exact location where it was previously, the interface will also notice if immediately subsequent user actions move the input cursor to a location that is much closer to its previous location than its new location, because this would also indicate that the decision to automatically move the input cursor to a new location had an outcome that should probably be considered non-beneficial.

In an embodiment, for purposes of the interface adaptation functionality that is described in the following chapters, in addition to being able to detect when user actions have substantially the same effect that could have been achieved by altering an alterable interface decision, the manual alteration detection feature may also distinguish gradations of similarity between the effect that was achieved by user actions and an effect that could have been achieved by altering an alterable interface decision. That is, in an embodiment, rather than noticing only when user actions lead to an input state that definitely would have been achieved sooner if an alterable interface decision had had a different outcome, the manual alteration detection feature may also notice when user actions lead to an input state that probably could have been achieved more efficiently if an alterable interface decision had had a different outcome. Generally, the decisions that have outcomes that may be worth evaluating in such an imprecise way will be the sort of non-textual decisions that require an ad hoc approach to manual alteration detection as described above: for such decisions, it may not always be entirely clear whether or not a decision's outcome was beneficial. For example, in an embodiment, if the interface makes an alterable decision to automatically move the input cursor to a new location, and immediately subsequent user actions move the input cursor to a location that is somewhat closer to its previous location than its new location, then the manual alteration detection feature will notify the interface adaptation component of the interface that the alterable decision to automatically move the input cursor to a new location had an outcome that may be considered to be non-beneficial, but with a relatively low degree of confidence.

Other Versions of Manual Alteration Detection

As described above, the manual alteration detection feature may be fairly complex, in some embodiments. However, those of ordinary skill in the art will understand how to create various alternative embodiments with simpler versions of the manual alteration detection feature.

For example, in an alternative embodiment, the interface will not remember alterable blocks for purposes of the manual alteration detection feature. Instead, whenever a user action causes the interface to delete an alterable decision, the decision will simply become a remembered alterable decision for purposes of the manual alteration detection feature, and while it is, the interface will remember every altered pre-deletion state of the decision. Such a decision will continue to be a remembered alterable decision for purposes of the manual alteration detection feature until either the interface recognizes manual alteration of the decision or the user performs 10 more actions, whichever comes first. Immediately after every user action that does not pertain to alteration functionality, if the current state of the user's input matches any altered pre-deletion state of any such remembered alterable decision, then the manual alteration detection feature will recognize manual alteration of that remembered alterable decision, and will notify other components of the interface accordingly. In such an alternative embodiment, if a user performs 15 actions in order to achieve a result that could have been achieved by simply altering an alterable interface decision, the manual alteration detection feature will fail to notice this; however, any such failure will not directly cause any inconvenience for the user: it will merely be a lost opportunity for the interface to try to prevent future inconvenience for the user. Conversely, such an embodiment may report that a user manually altered a decision when a more complex version of the manual alteration detection feature would have withheld judgment, but this is unlikely to cause much inconvenience either. Generally, such an embodiment will usually yield the same advantageous results as an embodiment with a more complex version of the manual alteration detection feature.

Manual Alteration Detection in Perspective

The manual alteration detection feature does not directly affect interface behavior, so it serves no independent purpose as an interface feature. However, it may be quite advantageous in conjunction with various other interface features that are described herein. Two ways that the manual alteration detection feature may be advantageous are described in the following two paragraphs.

In an embodiment that has the interface adaptation functionality that is described in the following chapters, if the interface recognizes that a user repeatedly needs to alter the outcome of a particular type of alterable interface decision in order to achieve the result the user desires, then sooner or later the interface will adjust its behavior so that type of decision will have a different outcome in the future, and then it is likely that the user will no longer need to alter the outcome of that type of decision. If such an embodiment has the manual alteration detection feature, then the interface may be able to recognize that it needs to adjust its behavior after a user repeatedly changes the outcome of a particular type of alterable interface decision even if the user changes the outcome by means of a time-consuming workaround rather than by means of alteration functionality. This may be especially advantageous: the more time a user spends correcting interface mistakes, the more important it is for the interface to adapt and prevent such mistakes. The manual alteration detection feature in conjunction with interface adaptation functionality may be quite advantageous even in an embodiment that does not actually facilitate altering alterable interface decisions.

In an embodiment that has the manual alteration detection feature in conjunction with the user education functionality that is described in Chapter 23, if a user changes the outcome of an alterable decision by means of a time-consuming workaround rather than by means of alteration functionality, the interface may notice that the user failed to take advantage of alteration functionality and may accordingly provide the user with a helpful tip that explains how to use alteration functionality.

Chapter 19: Decision Function Optimization

Decision Functions

In certain circumstances a prior art TI-84 Plus C Silver Edition graphing calculator running OS 4.0 will make a decision whether to display an answer in the form of a decimal or in the form of a fraction. The following paragraph explains when the TI-84 will decide to display an answer in the form of a decimal and when it will decide to display the answer in the form of a fraction. This particular decision serves as an example of a somewhat complex interface decision, and in the following discussion of interface decisions, any mention of "the example decision function" is a reference to the behavior that is described in the following paragraph.

The TI-84 Plus C Silver Edition has a mode settings screen with a line that says "ANSWERS:AUTO DEC FRAC-APPROX." When this calculator makes a decision whether to display an answer as a decimal or as a fraction, if the selected ANSWERS mode setting is DEC, then the calculator will decide to display the answer as a decimal. If the selected setting is FRAC-APPROX, then the calculator will decide to display the answer as a fraction. If the selected setting is AUTO, then the calculator will decide to display the answer as a fraction if the problem for which the calculator is providing an answer includes a fraction, or as a decimal otherwise.

In the present specification, a "decision function" is a mapping of circumstances to decision outcomes: that is, a decision function specifies which outcome an interface will choose in any given circumstances. Any particular decision function can be implemented by means of various algorithms. For example, the decision function that is specified in the preceding paragraph could be implemented by an algorithm that as its first step checks the calculator's ANSWERS mode setting, and then if the setting is DEC chooses decimal form; or if the setting is FRAC-APPROX chooses fraction form; or if the setting is AUTO, as its second step checks whether the user's input included a fraction, and then chooses fraction form if the input included a fraction, or decimal form otherwise. However, the same decision function could instead be implemented by an algorithm that as is its first step checks whether the user's input included a fraction, and then if the input included a fraction, as its second step checks the calculator's ANSWERS mode setting and then chooses fraction form unless the setting is DEC; or if the input did not include a fraction, as its second step checks the calculator's ANSWERS mode setting, and chooses decimal form unless the setting is FRAC-APPROX. Throughout the present specification, if a decision function is specified by describing one particular algorithm that implements the decision function, it is to be understood that those of ordinary skill in the art may be able to construct other algorithms that implement the same decision function.

In the present specification, a "decision class" is the set of all decisions such that an interface will make the decisions by means of the same decision function. For example, some interfaces have a setting that determines whether or not the interface will automatically capitalize days of the week, so in such an interface, if a user types "sunday" on one occasion and the interface makes a decision whether or not to capitalize that word, and the user types "monday" on another occasion and the interface makes a decision whether or not to capitalize that word, both these decisions are made by means of the same function, which simply checks the same setting; both these decisions thus belong to the same decision class. In the present specification, an "alterable decision class" is a decision class such that the decisions are alterable decisions; a "threshold decision class" is a decision class such that the decisions are threshold decisions; and so forth. In the present specification, a decision class may be said to be the decision class of a certain decision function, and a decision function may be said to be the decision function of a certain decision class.

Analyzing Decision Outcomes

In the present specification, an "optimizable decision" is any decision that an interface makes such that user behavior may later make it clear in retrospect whether the decision had a beneficial outcome or a non-beneficial outcome. For example, an interface's decision to automatically capitalize the word "tuesday" may be considered to have a non-beneficial outcome if the user immediately changes the word back to lowercase. When for some reason it is not possible to determine in retrospect whether an optimizable decision had a beneficial outcome or non-beneficial outcome, the decision may be considered to have had a neutral outcome. For example, an interface's decision to automatically capitalize the word "tuesday" may be considered to have a neutral outcome if the user immediately deletes the entire paragraph and closes the document.

A decision may be an optimizable decision as defined above even if the interface does not actually analyze the outcome of the decision. For example, when the prior art Microsoft Word interface decides whether or not to automatically capitalize the word "tuesday," this decision is an optimizable decision even though Microsoft Word does not determine in retrospect whether or not the decision had a beneficial outcome. However, the decision adaptation functionality that is described below requires the interface to analyze the outcomes of optimizable decisions in order for them to be adaptive decisions (as defined below).

Below, it will generally be assumed that when the interface determines that a decision had a non-beneficial outcome, the interface will also determine what outcome would have been beneficial. In an embodiment, if somehow a decision has more than two possible outcomes and the interface determines that the initial outcome of the decision was non-beneficial but cannot determine which of the other outcomes would have been beneficial, then such a decision may be treated as having a neutral outcome rather than a non-beneficial outcome for purposes of decision adaptation.

In an embodiment, for any optimizable decision that is an alterable decision, the interface will consider the decision to have a beneficial outcome when its initial default option remains selected. The interface will consider the decision to have a non-beneficial outcome when any other option is selected, and will consider the option that is selected to be the outcome that would have been beneficial. The interface will consider the decision to have a neutral outcome if the alterable decision is deleted because the user deleted or manually modified a portion of its alterable block, except that if the alterable decision is deleted but subsequently the manual alteration feature recognizes manual alteration of the decision then this will be treated as though the user had altered the decision by means of alteration functionality, or if the alterable decision is deleted and then the automatic decision variation feature causes a matching alterable decision to be created then this matching alterable decision will be treated as the same decision for purposes of the decision adaptation feature and so the interface will no longer consider the decision to have a neutral outcome.

If a particular embodiment has the decision adaptation functionality that is described below, and analyzes the outcomes of optimizable decisions that are alterable decisions as described in the preceding paragraph, and has the manual alteration detection feature, then it may be quite advantageous for the embodiment to have a wide variety of optimizable decisions be "alterable decisions" whether or not the embodiment actually includes any features that facilitate altering such decisions, because this will make it easy to take advantage of decision adaptation functionality for such decisions.

Optimizing Decisions

The process of improving the decision function for a particular interface decision class so that such decisions will be more likely to have beneficial outcomes will be referred to in the following discussion as "optimizing a decision."

Optimizing decisions may be more advantageous for some embodiments of the present invention than for prior art interfaces. One reason is that some embodiments of the present invention can easily be configured to analyze the outcomes of a wide variety of optimizable decisions, as described above, which will make it easy to take advantage of decision adaptation functionality to optimize such decisions. Another reason is that some embodiments of the present invention may reduce the need for interface decisions to be simplistic. In prior art interfaces, if a user does not notice right away that an interface decision had a non-beneficial outcome, then the user will typically need to perform several actions in order to achieve the desired outcome and resume working. If an interface is very simple, then although the interface may make decisions that have non-beneficial outcomes, at least a typical user may soon understand the interface well enough to know when to look for a non-beneficial outcome, so the user will usually notice right away if an interface decision has a non-beneficial outcome. In some embodiments of the present invention, though, if a user does not notice right away that an interface decision had a non-beneficial outcome, the user may nevertheless be able to achieve the desired outcome with just a single keystroke or single touch gesture. For that reason, it may be unnecessary for the interface to be very simple: a typical user may not care very much whether it is possible to understand the interface well enough to know when to look for a non-beneficial outcome. Instead, it may be more desirable for the interface to make decisions that have beneficial outcomes as often as possible, even if this means that the user may not know when to look for the occasional non-beneficial outcomes. In other words, an interface can be more aggressively helpful when its inevitable mistakes are unlikely to cause much inconvenience.

To optimize a particular interface decision class, an interface designer may cause the interface to take past decision outcomes into account when making the decision, or may cause the interface to take immediate context into account when making the decision, or both. Causing the interface to take past decisions outcomes into account when making a decision will be referred to herein as "making a decision adaptive," and causing the interface to take current context into account or causing it to do so in a more sophisticated way will be referred to as "making a decision smarter."

Below, the present specification will explain how to divide an interface decision class that has more than two possible outcomes into component decision classes, because it may be easier to optimize such component decisions individually. Next, the present specification will explain a generalized approach for making decisions adaptive. After that, the present specification will discuss some generally applicable principles for making decisions smarter. After that, the present specification will discuss some ways that adaptation behavior can be customized, so that for example the interface may be quicker to adjust the behavior of some decision classes than other decision classes. After that, the present specification will discuss customization of entire alteration-related features (such as the automatic decision variation feature), as opposed to individual decision classes.

Composite Decisions

In some cases, even if an interface decision that has more than two possible outcomes appears to the user to be a single interface decision, the interface may actually make the decision by dividing it into component decisions and making those decisions sequentially. Any decision that is divided into component decisions may be referred to herein as a "composite decision."

As an example, consider an interface decision class regarding whether to display an answer to a calculation as a decimal, proper fraction, improper fraction, or mixed fraction. This decision class will be referred to as "the example composite decision class." This composite decision class may be divided into three component decisions. To decide what form to display a particular answer in, first, the interface will make a component decision whether to display the answer as a decimal or as a fraction. If the interface decides to display the answer as a fraction, then the interface will make a component decision whether or not to display the answer as a proper fraction. If the interface decides not to display the answer as a proper fraction, then the interface will make a component decision whether to display the answer as an improper fraction or as a mixed fraction.

In terms of graph theory, a composite decision can be represented as a tree structure that has more than one internal node, where each internal node represents a component decision and each leaf represents an outcome of the composite decision. When the example composite decision class is represented as a tree, its root node represents the first component decision. The root node has two children: one is a leaf that represents the decimal outcome, and the other is an internal node that represents the second component decision. The node representing the second component decision has two children: one is a leaf that represents the proper fraction outcome, and the other is an internal node that represents the third component decision. The node representing the third component decision also has two children: one is a leaf that represents the improper fraction outcome, and the other is a leaf the represents the mixed fraction outcome.

In some cases, certain outcomes of a decision class will be possible outcomes for some decisions of that class but not for other decisions of that class. In the present specification, an "unavailable outcome" is an outcome that is not possible for a particular decision but would be possible for certain other decisions of the same decision class; an "available outcome" is an outcome that is possible for a particular decision. For example, for the example composite decision class, when a particular answer equals 0.5 it is not possible to display that answer as an improper fraction, so the outcome of displaying the answer as an improper fraction is then an unavailable outcome; in such circumstances, the outcome of displaying the answer as a mixed fraction is also an unavailable outcome. When an answer equals 1.5, the improper fraction outcome and the mixed fraction outcome are available outcomes, but the proper fraction outcome is an unavailable outcome. When an answer equals $\sqrt{2}$, only the decimal outcome is available.

In the following discussion of composite decisions, a "decision path" is a possible sequence of individual outcomes of component decisions that leads to an outcome of the composite decision. When a composite decision is represented as a tree structure, each path from the root node to a leaf thus represents a decision path. For a particular decision, an "available decision path" is a decision path such that each outcome of a component decision is an available outcome for that component decision.

When a composite decision is an alterable decision, in order to determine what outcomes are available, the interface can either determine every available outcome directly, or it can systematically traverse every available decision path in order to determine every available outcome. For example, for the example composite decision class, the interface can directly figure out which outcomes will be available for a particular answer based on the value of the answer. Alternatively, the interface can first check which outcomes of the first component decision are available outcomes; then if the fraction outcome is available, check which outcomes of the second component decision are available; then if the outcome of not displaying the answer as a proper fraction is available, check which outcomes of the third component decision are available.

When a composite decision is an alterable decision, in order to assign probabilities of alteration to the various alternate options, the interface can assign probabilities of alteration directly, or alternatively, if the interface assigns probabilities of alteration to the outcomes of the individual component decisions, then the interface can calculate the probabilities of alteration of the alternate options of the composite decision by treating each possible outcome of the composite decision as a combination of outcomes of the component decisions along the relevant decision path, and calculating the probability of that combination of outcomes as described in Chapter 4. This latter method may be particularly useful in an embodiment where the interface may adjust the probabilities of alteration of outcomes of component decisions, as described below. For example, for the example composite decision class, the interface can, say, assign a low probability of alteration to the mixed fraction outcome whenever it is an alternate option; alternatively, the interface can calculate the probability of alteration for the mixed fraction outcome based on the probabilities of alteration of the component decision outcomes along the decision path that leads to the mixed fraction outcome, so that interface adaptation that affects the probability of alteration of any component decision along that path will affect the probability of alteration of the mixed fraction outcome as an outcome of the composite decision.

When a composite decision is an adaptive decision, the interface can analyze the outcome of each component decision based on its analysis of the outcome of the composite decision. Such behavior may be particularly useful in an embodiment where the interface may adapt its behavior based on its analysis of the outcomes of component decisions, as described below. For purposes of the present paragraph, the "target outcome" of a composite decision is its initial outcome if that outcome was beneficial, or the outcome that would have been beneficial if its initial outcome was not beneficial. In an embodiment, when the interface is able to determine the target outcome of a composite decision, it will then analyze the outcomes of that decision's component decisions as follows: Every component decision that is not along the decision path to the target outcome will be considered to have had a neutral outcome, and every component decision that had only one available outcome will be considered to have had a neutral outcome. If a component decision is along the decision path to the target outcome and had more than one available outcome, then if the outcome of that component decision was the outcome that leads towards the target outcome, or if its outcome would have been the one that leads towards the target outcome if the interface had made that component decision, then that component decision will be considered to have had a beneficial outcome; if it had or would have had an outcome that leads away from the target outcome, it will be considered to have had a non-beneficial outcome. For example, if the interface made a component decision to display an answer as a decimal rather than a fraction, but it would have chosen to display the answer as a mixed fraction rather than an improper fraction if it had chosen to display the answer as a fraction, then if the interface determines that displaying the answer as a mixed fraction would have been beneficial, then the interface will determine that the component decision regarding whether to display the answer as a decimal or a fraction had a non-beneficial outcome but the component decision regarding whether to display the answer as a mixed fraction or an improper fraction had a beneficial outcome.

Dividing Decisions into Components

In the present specification, a "true decision" is an interface decision that has at least two available outcomes; a "false decision" is an interface decision that has only one available outcome. When a decision is a false decision, it cannot be altered or optimized. For example, in the example composite decision class, the component decision regarding whether to display an answer as an improper fraction or as some other kind of fraction always entirely depends on the value of the answer: the answer can be displayed as an improper fraction only if its absolute value is less than 1, and the answer can be displayed as some other kind of fraction only if its absolute value is greater than 1. That component decision is always a false decision.

Below, the present specification explains a general procedure for optimizing interface decisions. In the explanation of this procedure, it will be assumed that any interface decision class that is to be optimized has a constant set of outcomes that are available whenever the decision is a true decision. This procedure thus cannot be directly applied to an interface decision class that has an outcome that may or may not be available when the interface makes a true decision of that class. For example, the procedure cannot be directly applied to the example composite decision class described above, because when a decision of that class has at least two outcomes available, it may or may not have the improper fraction outcome available.

If an interface decision class has an outcome that may or may not be available when the interface makes a true decision of that class, then the interface decision class may be divided into two entirely distinct decision classes—one for when that outcome is available, and one for when it is not available. For example, an interface could have one decision class for deciding how to display an answer whose absolute value is less than 1, and another decision class for deciding how to display an answer whose absolute value is greater than 1. These decision classes may then be optimized separately using the procedure that is described below. However, by causing closely related decisions to be members of entirely distinct decision classes, such an approach may cause interface adaptation to be somewhat inefficient. For example, if an interface has distinct decision classes for deciding how to display an answer depending on its absolute value, then even after the interface has fully adapted to the fact that a user strongly prefers an answer to be displayed as a decimal when its absolute value is less than 1, the interface may not yet have begun to adapt to the fact that the user also strongly prefers an answer to be displayed as a decimal when its absolute value is greater than 1. Of course, it is possible that such an approach may sometimes yield better results than any other approach would yield, and even when such an approach yields suboptimal results, in some embodiments alteration functionality may reduce the inconvenience caused by such results; nevertheless, another approach may be more desirable in most cases.

Instead, if an interface decision class has an outcome that may or may not be available when the interface makes a true decision of that class, then the interface decision class may be divided into component decision classes such that no component decision class has an outcome that may or may not be available when the interface makes a true decision of that component class. One possible way to achieve such a division is by repeatedly subdividing the decision until each component decision has only two possible outcomes; both of those two outcomes will then be available whenever the interface makes a true decision of that class, because when less than two outcomes are available for a decision, it is not a true decision. These component decision classes may then be optimized separately using the procedure that is described below. This approach has some advantages over the approach described in the preceding paragraph; in particular, if the component decisions of the example composite decision class are optimized separately, then after the interface has fully adapted to the fact that a user strongly prefers an answer to be displayed as a decimal when its absolute value is less than 1, the interface will equally assume that the user strongly prefers an answer to be displayed as a decimal when its absolute value is greater than 1, because the component decision regarding whether or not to display an answer as a decimal is distinct from the component decision that takes into account the absolute value of the answer.

When a decision class has more than two possible outcomes, even if it has a constant set of outcomes that are available whenever the decision is a true decision, it may still be advantageous to divide the decision into component decisions that have only two outcomes each, if the resulting component decision classes will be easier to optimize than the original decision class would be. For example, the present writer has attempted to design an algorithm that would attempt to intelligently decide whether to display an answer as a decimal, improper fraction, or mixed fraction, and ultimately decided it would be easier to accomplish that task by dividing it into smaller pieces: he first designed an algorithm that attempts to intelligently decide whether to display an answer as a decimal or as a fraction and then designed a distinct algorithm that attempts to intelligently decide whether to display an answer as an improper fraction or mixed fraction.

When dividing a composite decision into component decisions, it may generally be preferable to organize the possible outcomes of the composite decision into a hierarchy, so that component decisions between very similar outcomes will tend to occur later in the decision process than component decisions between outcomes that are not very similar. For example, if the three outcomes of a composite decision consist of displaying an answer as an ordinary decimal, displaying it in scientific notation, and displaying it in engineering notation, then it may be preferable for the first component decision to be the decision whether or not to display the answer as an ordinary decimal, and the second component decision to be the decision (if necessary) whether to display the answer in scientific notation or in engineering notation. This can make it easier for an interface designer to optimize the component decisions. For example, both scientific notation and engineering notation are commonly used for extremely large numbers; if an interface designer wishes to bias the composite decision accordingly, then if those two outcomes are grouped together under one possible outcome of the first component decision, the interface designer will only need to bias that first component decision in favor of steering towards those two outcomes whenever an answer is extremely large, but if the composite decision is broken down into two component decisions in a different manner, then the interface designer will need to bias both of the component decisions.

Chapter 20: Decision Function Adaptation

Decision Settings

When the interface makes a decision, the outcome is determined by which decision function the interface uses and the circumstances that the decision function takes into account. Generally, the circumstances that a decision function takes into account may or may not be readily visible. This distinction is somewhat subjective, but for many decision functions it is easy to distinguish between circumstances that are readily visible and circumstances that are not readily visible. For example, the example decision function may take into account the input of a problem the user just typed, which will be readily visible, and may also take into account the calculator's ANSWERS mode setting, which is visible in a special settings screen but may not be readily visible when the calculator is displaying the answer to a problem. In the present specification, information regarding circumstances that are readily visible is "decision context." Information regarding circumstances that may not be readily visible is "decision settings." In the present specification, a "setting variable" is a particular decision setting that may vary according to circumstances, and a "setting value" is one possible value for a setting variable. For example, the ANSWERS mode setting mentioned above is a setting variable, and AUTO, DEC, and FRAC-APPROX are setting values. A "setting value combination" is a possible combination of setting values for a decision function, so for any decision function that takes into account the value of only one setting variable, a setting value combination is simply a setting value for that setting variable.

For the sake of brevity, a setting value combination may be referred to herein as a "setting." It is to be understood that such a "setting" may be a specific value for a single setting variable, or may actually be a combination of specific values for multiple setting variables. Also, decision context may be referred to herein as simply "context."

For any decision function that takes into account the current setting values of setting variables, the decision function can be specified in terms of a set of "setting-specific functions," where each setting-specific function describes how the decision function will behave when a specific setting value combination is selected. For example, the example decision function above can be specified in terms of three setting-specific functions, where each setting-specific function describes how the decision function will behave for a specific setting value of the ANSWERS mode setting: the setting-specific function for the DEC setting value will always choose decimal form; the setting-specific function for the FRAC-APPROX setting value will always choose fraction form; and the setting-specific function for the AUTO setting value will choose fraction form if the user's input included a fraction, or decimal form otherwise.

If a decision function does not take into account the current setting values of setting variables, then that decision function can still be considered to have a single possible setting value combination that consists of no setting values whatsoever, and the decision function can be considered to itself constitute a single "setting-specific function" that describes how the function will behave for that setting value combination.

In the present specification, when the behavior of a decision function is described in terms of the behavior of a set of setting-specific functions, this does not imply that such a decision function must be implemented in terms of an algorithm that first checks the current setting value combination and then invokes an algorithm that implements the appropriate setting-specific function. In some cases, it is certainly possible to implement a decision function by an algorithm that first checks the current setting value combination and then accordingly selects and invokes an algorithm that implements the setting-specific function that corresponds to that specific setting value combination. For example, the example decision function may be implemented by an algorithm that first checks the current setting value of the ANSWERS mode setting and invokes either an algorithm that implements the setting-specific function for the DEC setting value (by just choosing decimal form), or an algorithm that implements the setting-specific function for the FRAC-APPROX setting value (by just choosing fraction form), or an algorithm that implements the setting-specific function for the AUTO setting value. However, those of ordinary skill in the art may be able to construct other algorithms that implement the same behavior that do not begin by checking the current setting value combination.

Setting-specific functions do not themselves take into account any setting values. For example, if the example decision function is implemented in terms of an algorithm that checks setting values and then invokes the appropriate setting-specific function, then the algorithm for the DEC setting-specific function will be invoked only after the example decision function checks setting values, and will not itself check any setting values. If the behavior of a decision function is entirely determined by decision context and thus does not take into account any setting values, then that decision function consists of one setting-specific function, in a sense.

In the present specification, a "smart setting-specific function" is a setting-specific function that takes into account decision context (and thus chooses different outcomes depending on context), and a "simple setting-specific function" is a setting-specific function that does not take into account decision context (and thus always chooses the same outcome). For example, when the behavior of the example decision function described above is described in terms of three setting-specific functions, the setting-specific functions for the DEC setting value and the FRAC-APPROX setting value are simple setting-specific functions and the setting-specific function for the AUTO setting value is a smart setting-specific function.

In the present specification, a "smart decision function" is a decision function that takes into account decision context. When a smart decision function is described in terms of the behavior of a set of setting-specific functions, at least one of those functions will be a smart setting-specific function as defined above. For example, the example decision function described above is a smart decision function, and the setting-specific function for its AUTO setting value is a smart setting-specific function. In the present specification, a "simple decision function" is a decision function that does not take into account decision context. When a simple decision function is described in terms of the behavior of a set of setting-specific functions, all of those functions will be simple setting-specific functions.

In the present specification, the setting-specific function that describes the behavior of a decision function when a particular setting value combination is selected may be spoken of as though it were entirely synonymous with that setting value combination, and thus may itself be referred to as a "setting." For example, rather than saying, "The setting-specific function for the DEC setting value always chooses to answer in decimal form," the present specification could say, "The DEC setting always chooses to answer in decimal form."

Setting Adaptation Maps

In the following paragraphs, various terms are defined, and then "setting adaptation maps" are explained. A setting adaptation map is a way of organizing the possible settings that a particular adaptive decision class has. Subsequently, in explaining how to make optimizable decisions adaptive and how to make them smarter, it will be helpful to refer to setting adaptation maps.

The following explanation of setting adaptation maps includes some technical terms from the field of graph theory and is fairly complicated, but only because it is intended to be applicable to a wide variety of possible optimizable decision classes, including optimizable decision classes that have more than two possible outcomes and have multiple smart settings. The setting adaptation map of a typical optimizable decision class will actually turn out to be quite simple.

In the present specification, if two settings are said to be "non-comparable" with respect to a certain outcome, this means that each of the two settings will choose that outcome in at least one context where the other will not choose that outcome. If two settings are "comparable" with respect to a certain outcome, this means that at most one of the two settings will choose that outcome in a context where the other will not choose the outcome. When two settings are comparable with respect to a certain outcome, if one of the two settings will choose that outcome in at least one context where the other will not, then the former may be said to be "more biased" towards that outcome than the latter, and the letter may be said to be "less biased" towards that outcome of the former; otherwise, the two settings may be said to be "equally biased" towards that outcome.

In the present specification, if a setting is said to be "maximally biased" towards a certain outcome, this means that it is comparable to all the other settings of the relevant decision function and it is more biased or equally biased towards that outcome when compared to any other setting. For example, in the example decision function, the FRAC-APPROX setting is more biased towards the outcome of answering in fraction form than the AUTO setting, which is more biased towards that outcome than the DEC setting; the FRAC-APPROX setting is maximally biased towards that outcome.

In the present specification, if a setting is said to be "intermediate between" two other settings, this means that with respect to each possible outcome of the relevant decision function, the setting is comparable with both of those other two settings, and when the setting is compared with those other two settings, either the setting and at least one of those other two are equally biased towards that outcome, or else the setting is more biased towards that outcome than one of those other two settings and less biased than the other. In other words, if a setting is intermediate between two other settings, then there is no outcome such that the setting is more biased towards that outcome than both of the other two settings, and there is no outcome such that the setting is less biased towards that outcome than both of the other two settings. For example, in the example decision function, the AUTO setting is intermediate between the DEC setting and the FRAC-APPROX setting: it is more biased towards the outcome of answering in fraction form than the DEC setting and less biased than the FRAC-APPROX setting, and it is more biased towards the outcome of answering in decimal form than the FRAC-APPROX setting and less biased then the DEC setting.

In the following discussion of setting adaptation maps, a "setting vertex" is any vertex of a graph that corresponds to a setting of a decision function. A setting vertex may be spoken of as though the vertex itself is synonymous with the corresponding setting; for example, one setting vertex may be said to have less bias towards an outcome than another setting vertex. The "destination vertex" for an outcome is some particular setting vertex that is maximally biased towards that outcome; when more than one setting of a decision function is maximally biased towards a particular outcome, only one such setting will be the destination vertex for that outcome. An "empty vertex" is a vertex of a graph that does not correspond to a setting of a decision function.

In the present specification, a "setting adaptation map" is an acyclic connected graph that has one distinct setting vertex for each setting of a decision function (and may also have empty vertices that do not correspond to settings of the function), and that has a destination vertex for each possible outcome, and that has the property that for any particular setting vertex and any particular outcome, if the unique simple path is traced from that setting vertex through zero or more intermediate vertices to that outcome's destination vertex, then that particular setting will have a bias towards that outcome that is less than or equal to the bias of every setting vertex that the path travels through. In other words, a setting adaptation map is a map of paths connecting settings such that the road from any particular setting to a maximally biased setting never passes through a less biased setting.

It is always possible to create a setting adaptation map for any decision function, as long as the decision function has a destination vertex for each possible outcome. One way to do so is to directly connect each setting vertex to a single central empty vertex, and not directly connect any setting vertex to any other setting vertex. However, for most decision functions, it is also possible to create a setting adaptation map that does not have any empty vertices; the following two paragraphs explain a couple of specific situations in which it is possible to create a setting adaptation map that does not have any empty vertices.

If a decision function has one simple setting per possible outcome along with just one smart setting, then a setting adaptation map for that decision function can be an arrangement such that all of the simple setting vertices are directly connected to the smart setting vertex, and none of them are directly connected to each other. An example of such a setting adaptation map is a graph where the setting vertex DEC and setting vertex FRAC-APPROX are both directly connected to the setting vertex AUTO (and not to each other). If the outcome of answering in scientific notation is added to the example decision function and a simple setting called SCI-NOT that always chooses to answer in scientific notation is added to the example decision function, then a graph in which the setting vertices DEC, FRAC-APPROX, and SCI-NOT are all directly connected to the setting vertex AUTO (and not to each other) will be a setting adaptation map for this modified example decision function.

If a decision function has only two possible outcomes, and every possible pair of settings of the decision function is comparable with respect to both of the possible outcomes, then a setting adaptation map for that decision function can be an arrangement of the function's settings in a linear sequence from the least biased towards a certain outcome to the most biased towards that outcome, with an edge directly connecting each setting to the next. For example, the settings of the example decision function can be arranged from the least biased towards the outcome of answering in fraction form to the most biased towards that outcome: DEC, then AUTO, then FRAC-APPROX. If a graph is constructed such that the setting vertex DEC is directly connected to the setting vertex AUTO which is directly connected to the setting vertex FRAC-APPROX (but the setting vertex DEC is not directly connected to the setting vertex FRAC-APPROX), then this constitutes a setting adaptation map for the sample decision function. If another setting called PROBABLY-DEC is added to the example decision function, and this setting is intermediate between the DEC setting and the AUTO setting, then a graph in which DEC, PROBABLY-DEC, AUTO, and FRAC-APPROX are arranged in that order from left to right and adjacent settings are directly connected to each other will be a setting adaptation map for this modified example decision function.

Adaptive Decisions

In an embodiment, for one or more optimizable decision classes, at some time after the interface makes a decision of such a class, the interface will analyze the outcome of the decision, and in certain circumstances will then adjust relevant setting variables in an attempt to increase the likelihood that future decisions of that class will have beneficial outcomes, or in an attempt to increase the likelihood that future decisions of that class will have more appropriate probabilities of alteration assigned to them, or both. Such decisions may be referred to herein as "adaptive decisions."

Figure 16:
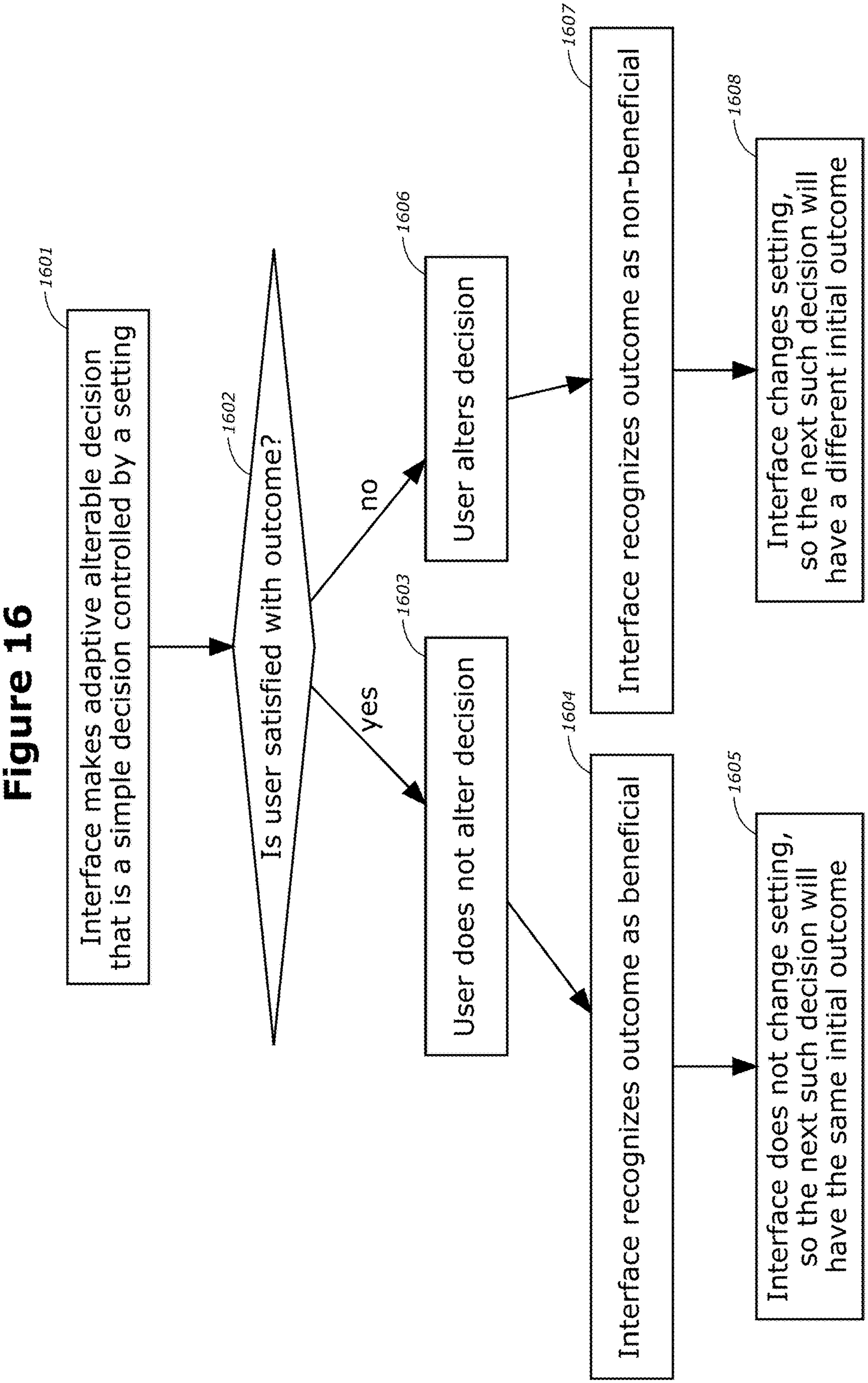
FIG. 16 is a flowchart that illustrates a simple case of an adaptive decision that may affect interface settings, according to one embodiment.

FIG. 16 is a flowchart that illustrates a simple case of an adaptive decision that may affect interface settings, in an embodiment. Block 1601 says "Interface makes adaptive alterable decision that is a simple decision controlled by a setting" and proceeds to Block 1602, which asks, "Is user satisfied with outcome?" If the answer is yes, that means that the user will not alter the decision (Block 1603), so the interface will eventually recognize the outcome as beneficial (Block 1604), and the interface will not change the setting, which means that the next decision of that decision class will have the same initial outcome (Block 1605). If the answer is no, that means that the user will alter the decision (Block 1606), so the interface will recognize the outcome as non-beneficial (Block 1607), and the interface will change the setting so the next decision of that decision class will have a different initial outcome (Block 1608).

For example, in an embodiment, if the interface makes an alterable decision whether or not to automatically capitalize the word "tuesday" and this decision turns out to have a non-beneficial outcome, then the interface will adjust the relevant setting variable so that it will make the opposite decision the next time the user types the word "tuesday." As another example, in a different embodiment, only after three alterable decisions in a row regarding whether or not to automatically capitalize the word "tuesday" have all had non-beneficial outcomes will the interface adjust a setting variable so that it will make the opposite decision the next time the user types the word "tuesday." As another example, in an embodiment, if alterable decisions regarding whether or not to automatically capitalize the word "tuesday" are assigned high probabilities of alteration but then five such decisions in a row all have beneficial outcomes, then the interface will adjust a setting variable so that such decisions will continue to have the same outcome but will be assigned moderate probabilities of alteration.

In an embodiment, when the interface makes an adaptive decision, the interface will immediately treat the decision as having a beneficial outcome for purposes of decision adaptation, and will later reevaluate the outcome of the decision and redo adaptation if necessary. For example, in such an embodiment, if a user types "tuesday tuesday" and as a result the interface makes two consecutive adaptive decisions regarding whether or not to automatically capitalize "tuesday," then at the moment when the interface makes the second decision, the interface may be acting under the assumption that its first decision was correct, because thus far the user appears to be satisfied with that first decision. In an alternative embodiment, the interface will not immediately take the outcome of an adaptive decision into account for purposes of decision adaptation, and will instead evaluate the outcome of an adaptive decision only later, at a point when it is impossible or relatively unlikely for the outcome to change, such as when an adaptive decision that was an alterable decision ceases to be alterable. For example, in such an embodiment, if a user types "tuesday tuesday" and the interface makes two consecutive adaptive decisions regarding whether or not to automatically capitalize "tuesday," then at the moment when the interface makes the second decision, the interface will not necessarily be acting under the assumption that its first decision was correct: at that moment, the interface may not yet have evaluated the outcome of its first decision.

Making Decisions Adaptive

In the present specification, a "non-adaptive decision function" is any decision function that does not in any way take into account past outcomes of decisions of that class. For example, on a TI-84, the example decision function described above takes into account the current value of a setting variable, but the TI-84 interface never takes the initiative to adjust that setting variable based on outcomes of decisions of that class, so that decision function is a non-adaptive decision class.

To convert a non-adaptive decision function into an adaptive decision function, an interface designer may perform the following three steps:

As the first step, for each possible outcome of the decision function, choose an existing setting that is maximally biased towards that outcome as the destination setting for that outcome, or add a new setting if necessary. In most cases this step will be trivial, because for most decision classes there will already be for each possible outcome exactly one setting that is maximally biased towards that outcome; for example, in the example decision function, the FRAC-APPROX setting is maximally biased towards answering in fraction form, and the DEC setting is maximally biased towards answering in decimal form. In the rare cases where a decision function has an outcome such that no setting is maximally biased towards that outcome, as part of the first step, add a new setting for the function such that the new setting will choose that outcome whenever any other setting would choose that outcome; such a setting will then be maximally biased towards that outcome, and can serve as the destination setting for that outcome. (Such a setting usually might as well be a simple setting that always chooses that outcome in every context, but does not necessarily need to be such a setting: it only needs to choose that outcome whenever some other setting would choose that outcome.)

As the second step, create a setting adaptation map for the decision class of the decision function, as described above. Try to avoid using empty vertices. If the decision function has one simple setting per possible outcome along with just one smart setting, or if the decision function has only two possible outcomes and every possible pair of settings of the decision function is comparable with respect to both of the possible outcomes, then it will be possible to create a setting adaptation map that does not have empty vertices, as is explained above.

As the third step, implement the following interface behavior: When the interface evaluates the outcome of a decision of this decision class, if the decision had a non-beneficial outcome, then the interface will determine the nearest beneficial setting and adjust the relevant setting variable or variables so that the nearest beneficial setting becomes selected. The "nearest beneficial setting" is defined as follows: if the unique simple path in the setting adaptation map from the setting vertex of the current setting to the destination vertex for the outcome that would have been beneficial is traced one vertex at a time, then the "nearest beneficial setting" is the setting that corresponds to the first setting vertex that is encountered while tracing this path that fits the requirement that the decision would have had a beneficial outcome if the setting corresponding to this vertex had been selected when the decision was made. If there is no such setting, then the "nearest beneficial setting" is the destination setting for the outcome that would have been beneficial.

In other words, to convert a decision into an adaptive decision, make it so that after such a decision has a non-beneficial outcome, the interface will change its settings the least amount possible such that the decision would have had a beneficial outcome if the change had been made prior to the decision.

An interface designer can use the preceding three-step procedure to convert any non-adaptive decision function to an adaptive decision function. In most cases, though, it will not actually be necessary to perform the entire procedure; most decision functions are so simple that an interface designer of ordinary skill in the art will understand how to implement essentially the same interface behavior that is described in the third step in a more direct fashion, without actually creating a setting adaptation map first. In the following three paragraphs, simpler procedures are described for converting three specific types of non-adaptive decision functions to adaptive decision functions. In each case, the three-step procedure described above will yield the same interface behavior as the simpler procedure described below; these simpler procedures thus serve to illustrate the results that would be achieved by applying the three-step procedure to specific types of non-adaptive decision functions.

When a non-adaptive decision function is a simple decision function that just has one simple setting for each possible outcome, to make the function adaptive, an interface designer may implement the following interface behavior: When the interface evaluates the outcome of a decision of this decision class, if the decision had a non-beneficial outcome, then the interface will select the setting that would have yielded a beneficial outcome.

When a non-adaptive decision function is a smart decision function that has one simple setting for each possible outcome and that also has a single smart setting, to make the function adaptive, an interface designer may implement the following interface behavior: When the interface evaluates the outcome of a decision of this decision class, if the decision had a non-beneficial outcome, if the smart setting would have yielded a beneficial outcome, then the interface will select the smart setting; otherwise, the interface will select the simple setting that would have yielded a beneficial outcome. This is the same interface behavior as is described in the third step of the procedure above, where the setting adaptation map is arranged so that the unique simple path from any simple setting vertex to any other simple setting vertex will travel through only the smart setting vertex.

When a non-adaptive decision function is a smart decision function that has only two possible outcomes and that does not have any settings that are non-comparable to each other, to make the function adaptive, an interface designer may arrange the function's settings in a linear sequence from the least biased towards a certain outcome to the most biased towards that outcome and then implement the following interface behavior: When the interface evaluates the outcome of a decision of this decision class, if the decision had a non-beneficial outcome, the interface will select the setting that would have yielded a beneficial outcome that is nearest in the sequence to the current setting.

If a non-adaptive decision function is a simple decision function that has only two possible outcomes, or if it is a smart decision function that has only two possible outcomes that has one simple setting for each of the two possible outcomes and that also has a single smart setting, then in either case two of the three preceding paragraphs will be applicable, and it does not matter which of the two paragraphs is applied: the same interface behavior will result either way. For example, the example decision function fits the criteria described in the second and third of the preceding three paragraphs. To apply the procedure described in the third paragraph, an interface designer may arrange the function's settings in the sequence DEC, then AUTO, then FRAC-APPROX, and then implement the interface behavior such that when the interface evaluates the outcome of a decision of this decision class, if the decision had a non-beneficial outcome, the interface will move the setting only one position in the sequence if that would have yielded a beneficial outcome, or two positions otherwise. In other words, if the smart setting AUTO was not selected and would have yielded a beneficial outcome, the interface will select AUTO; otherwise, the interface will select the simple setting that would have yielded a beneficial outcome. This is the exact same behavior that would result from applying the procedure described in the second paragraph.

Above, the interface behavior that would be achieved by applying the full three-step procedure is described via terminology that pertains to setting adaptation maps. A programmer of ordinary skill in the art will be able to create data structures that represent setting adaptation maps; as a starting point, source code for data structures that represent graphs, vertices, and so forth is readily available online. However, as can be seen from the above discussion of simpler procedures that achieve the same results as the full three-step procedure for certain specific types of decision functions, it is possible for a programmer to implement most adaptive decision functions by means of simpler algorithms that can use simpler data structures.

Making Probabilities of Alteration Adaptive

In an embodiment, interface adaptation not only may affect the outcome of future decisions of an alterable decision class, but also may affect the probability of alteration that is assigned to future decisions of an alterable decision class.

As an aid to implement such behavior, for any adaptive alterable decision function that makes use of a setting adaptation map as described above, an interface designer may add a distance metric to the setting adaptation map. That is, the interface designer may assign to each edge (direct connection) in the setting adaptation map a numeric value that represents its length, which is an approximate measure of the magnitude of the difference between the two settings the edge connects, in the judgment of the interface designer. For example, if a setting adaptation map has only two setting vertices that correspond to simple settings that make opposite choices, the edge connecting those two vertices will be assigned a high length, but if a setting adaptation map has dozens of vertices arranged sequentially such that each vertex in many situations will yield the same outcome as both of its adjacent vertices, then an edge connecting any two vertices will be assigned a low length. Also, if for any outcome the maximally biased setting in the setting adaptation map is a setting that sometimes does not select that outcome, then the interface designer may add to the setting adaptation map a simple setting that would always select that outcome, and directly connect that simple setting to only the setting that was previously the maximally biased setting for that outcome, and assign an appropriate length to the edge connecting those two settings; if desired, the interface designer may prevent such an additional simple setting from ever being selected, so that it is not included in the setting adaptation map for purposes of automatically adjusting settings as described above, but is included in the setting adaptation map for purposes of determining probabilities of alteration as described below.

In an embodiment, when the interface makes an alterable decision of a decision class that has a setting adaptation map with a distance metric as described in the preceding paragraph, the probability of alteration that is assigned to an alternate option of the decision is inversely related to the total length of the simple path between the current setting and the setting vertex that will be the nearest beneficial setting if that option becomes selected, so that if the current setting is very close to a setting that would have yielded that outcome than its probability of alteration will be high, but if it is far from a setting that would have yielded that outcome than its probability of alteration will be low. For example, if each of the two edges in the example decision function's setting adaptation map are assigned a length of 1, and the user types input that includes a fraction, and the interface makes an alterable decision using the example decision function, and the interface chooses to display the answer as a fraction, then at this point the setting that is selected must be either FRAC-APPROX or AUTO: if it were DEC, the interface would have chosen to display the answer as a decimal. The probability of alteration of this decision depends on which setting is selected. If the setting that is selected is AUTO, then the distance to the only setting that would have yielded a different outcome is 1, but if the setting that is selected is FRAC-APPROX, then the distance to that setting is 2, so the probability of alteration of the decision will be higher if the setting that is selected is AUTO than if it is FRAC-APPROX. This is appropriate: if the user caused the simple setting to become selected such that an answer would be displayed as a fraction even when the input did not include a fraction, then it is that much less likely that the user will want some different outcome now that the input actually includes a fraction.

The behavior described above causes the interface to adjust not only future decision outcomes but also future probabilities of alteration after a decision has a non-beneficial outcome. It may also be advantageous to cause the interface to adjust future probabilities of alteration even when a decision has a beneficial outcome: if a decision repeatedly has a beneficial outcome, it may be advantageous for its probability of alteration to gradually decrease. Therefore, in an embodiment, for some or all adaptive decision classes, in addition to remembering what setting is currently selected for that decision class, the interface will also remember an optional distance penalty for each possible outcome of that class. After the interface makes a decision of such a class, when the interface determines the outcome that was beneficial or would have been beneficial, the interface will reset that outcome's optional distance penalty to zero, and will slightly increase the optional distance penalty of all other outcomes. Whenever the interface makes a decision of such a class, when the interface would determine the probability of alteration to assign to an alternate option by means of determining the total length of the simple path between the current setting and the setting vertex that will be the nearest beneficial setting if that alternate option becomes selected, the interface will also add the current value of the optional distance penalty for that particular outcome. In such an embodiment, for such a decision class, if the same outcome repeatedly turns out to be beneficial, then the optional distance penalty for all the other outcomes will gradually increase, and so the probability of alteration of the decisions of that class will gradually decrease.

Just as it is possible for a programmer to implement most adaptive decision functions by means of algorithms that use simpler data structures than a setting adaptation map, it is also possible in most cases for a programmer to implement the same behavior that is described in the preceding paragraphs by means of algorithms that use simpler data structures than a setting adaptation map. In particular, if an adaptive decision function has only two possible outcomes and has no non-comparable settings, then its setting adaptation map may consist of an arrangement of the function's settings in a linear sequence, so the algorithm for measuring the total length of the path from one setting to another can be quite simple.

Making Simple Decisions Adaptive

In the simplest case, a decision function will have only two possible outcomes, and only two simple settings. For example, a decision whether or not to automatically capitalize a day of the week may be a simple decision between two possible outcomes that never takes context into account. A setting adaptation map may be constructed for such a decision that has only two simple setting vertices with one edge connecting them.

Therefore, in an embodiment, for some or all alterable decision classes that have two possible outcomes and that never take context into account, the interface will keep track of which outcome it currently prefers for each decision class and keep track of a single optional distance penalty that will always represent the optional distance penalty for whichever outcome it does not currently prefer. Such an optional distance penalty may be initialized to have a relatively high value if the interface designer is relatively confident that a typical user will have a strong preference for the outcome that the interface initially prefers. When the interface makes a decision of such a class, the default outcome will be the outcome the interface initially prefers, and the probability of alteration will depend only on the current value of the optional distance penalty. Whenever such a decision has a non-beneficial outcome, the interface will change which outcome it prefers and reset the optional distance penalty to 0, so that the next time it makes such a decision, the decision's probability of alteration will be very high; whenever such a decision has a beneficial outcome, the interface will slightly increase the optional distance penalty, so that the next time it makes such a decision, the decision's probability of alteration will be slightly less than before.

Making Threshold Decisions Adaptive

As defined in Chapter 3, a threshold decision class is a decision class that has two possible outcomes, where the outcome of any particular decision depends on whether or not a decision score that is based on circumstances exceeds a certain threshold value.

In an embodiment, some or all threshold decision classes will be adaptive decision classes such that the threshold itself is not a constant value, but is instead a setting variable that can take on various values. Any possible threshold value is thus a distinct setting. If the possible threshold values are arranged in a linear sequence, then this constitutes a setting adaptation map. As a distance metric for such a setting adaptation map, the distance between any two possible threshold value simply equals the difference between the values.

For such an adaptive threshold decision class, if a decision of that class has a non-beneficial outcome and so the interface causes the nearest beneficial setting to become selected, this means that the interface changes the threshold just enough that the decision would have had a beneficial outcome if the change had occurred before the decision. For example, if before a decision a threshold value is 5.0, and the decision score for the decision is 7.3, and this decision has a non-beneficial outcome, then the interface will change the threshold value from 5.0 to 7.3 (or to infinitesimally more than 7.3 if necessary) because this is the closest threshold value that would have caused the decision to have a different outcome. In an embodiment that determines probabilities of alteration for adaptive decisions by means of a distance metric as described above, unless an optional distance penalty is present, the probability of alteration of such a threshold decision will simply be based on the difference between the decision score and the threshold value: the probability of alteration that is assigned to such a decision will be high if the decision score is almost the same as the threshold value, or low if the decision score is much lower or much higher than the threshold value. This turns out to be exactly the same principle for assigning probabilities of alteration to threshold decisions that was described in the initial explanation of threshold decisions. However, in an embodiment that includes optional distance penalties as described above, when an optional distance penalty is present, the interface may assign a lower probability of alteration to a threshold decision than it otherwise would.

Chapter 21: Decision Function Customization

Adding Smart Settings

Without interface adaptation functionality, it may not be very advantageous for a decision function to have more than one distinct smart setting: if two distinct smart settings would turn out to be particularly appropriate for two different types of users, then many users would not actually make the effort to understand the smart settings in order to select the appropriate one. However, in an embodiment with the interface adaptation functionality that is described above, if two distinct smart settings would turn out to be particularly appropriate for two different types of users, that for each particular type of user, interface adaptation could cause the smart setting to become selected that would be particularly appropriate for that user. Thus, interface adaptation functionality may make it more advantageous for a decision function to include additional distinct smart settings.

In many cases, it may be possible for an interface designer to guess in advance the circumstances in which certain users will desire each particular outcome for a particular decision function. Generally, if an interface designer has a plausible theory regarding the circumstances in which certain users will desire a particular outcome for a particular decision function, and if this theory can be reduced to a function that selects each particular outcome in exactly the circumstances where the interface designer believes certain users will desire that outcome, then it may be advantageous for the interface designer to implement that particular function as an additional smart setting-specific function for that particular decision function.

In particular, once an interface designer has made a decision function be an adaptive decision function by the means described above, it may be advantageous for the interface designer to convert any empty vertex in the decision's setting adaptation map into a setting vertex that is associated with an appropriate smart setting-specific function. It may also be advantageous for the interface designer to insert additional vertices into the setting adaptation map between other vertices, and to have the added vertices be associated with appropriate smart setting-specific functions. In the present paragraph, an "appropriate smart setting-specific function" is a setting-specific function that fits the necessary requirements so that the setting adaptation map continues to be a setting adaptation map as defined above.

For example, if the example decision function did not have the AUTO setting, its setting adaptation map would consist of two setting vertices directly connected to each other—namely, the DEC vertex and the FRAC-APPROX vertex. An interface designer might guess in advance that certain users will desire an answer to be displayed as a fraction when and only when the user's input included a fraction. A setting-specific function that chooses the fraction form when and only when the user's input includes a fraction can be implemented; that is what the AUTO setting-specific function is. The AUTO setting vertex can be inserted in the setting adaptation map between the DEC vertex and the FRAC-APPROX vertex. An interface designer also might guess that certain other users will desire an answer to be displayed as a fraction when the user's input included a fraction, unless the user's input also included a decimal point. A new setting-specific function that behaves accordingly can be inserted in the setting adaptation map between the AUTO vertex and the DEC vertex. Between the vertex of this new setting-specific function and the AUTO vertex, another vertex can be inserted corresponding to a setting-specific function that chooses the fraction form when the user's input included a fraction, unless the number of decimal points in the user's input was more than the number of fractions in the user's input. Each additional smart setting may increase the chance that interface adaptation will eventually cause a setting to become selected that accurately reflects the strength of a particular user's preference for a particular outcome.

Converting to Threshold Decisions

When a decision has only two possible outcomes, and its setting adaptation map consists of an arrangement of the function's settings in a linear sequence, if the decision is not a threshold decision, then it can necessarily be replaced with a threshold decision that always yields exactly the same results as the original decision.

For example, as one way to do so, the function's settings may be numbered from left to right. If an interface designer has assigned edge lengths to the edges between the setting nodes on the setting adaptation map in order to add a distance metric to the setting adaptation map, then numbers may be assigned to the function's settings in such a way that the number assigned to each setting node (other than the leftmost) equals the number of the previous setting node plus the length of the connecting edge. Next, an algorithm may be implemented that yields decision scores that fit the following criteria: in any particular decision context such that the interface's decision between the two possible outcomes depends on which setting is selected, the decision score equals the average of the two numbers of the adjacent settings that would yield different outcomes; in any decision context such that the interface's decision is certain to have a particular outcome and does not depend on which setting is selected, if the setting that is most biased against that outcome is on the far left, then the decision score equals that setting's number minus a certain amount, such as 0.5; if it is on the far right, the decision score equals that setting's number plus a certain amount, such as 0.5. Finally, once the interface can calculate a decision score that is based on context this way, if the interface makes a threshold decision using this decision score and with a threshold value that is equal to the number of the setting that is currently selected, then this threshold decision will always yield exactly the same outcome that the original decision function would have yielded, and can thus serve as a replacement for the original decision function.

For example, the example decision function has only two possible outcomes, and its setting adaptation map may consist of the settings DEC, AUTO, and FRAC-APPROX arranged in a line in that order. Those settings may be numbered DEC 1, AUTO 2, and FRAC-APPROX 3. The interface may calculate a decision score in any particular circumstances as follows: If the user's input included a fraction, then the DEC 1 setting would yield a different outcome than the AUTO 2 setting, so the decision score is 1.5. If the user's input did not include a fraction, then the AUTO 2 setting would yield a different outcome than the FRAC-APPROX setting, so the decision score is 2.5. If a threshold decision function calculates a decision score in this way, and then compares the decision score to a threshold value that is equal to the number of the setting that is currently selected and chooses to display an answer as a decimal if and only if the decision score exceeds the threshold value, then this new threshold decision function will always yield exactly the same outcome that the example decision function would have yielded. For example, by this method, when the AUTO 2 setting is selected, this threshold decision function will choose to display an answer as a fraction if and only if the decision score is less than 2; the decision score will be less than 2 only when an answer can be displayed as a fraction and the user's input included a fraction, and these are the same circumstances that are described above such that the setting-specific function for the AUTO setting will display an answer as a fraction.

As another example, if a decision function is a simple decision function with just two settings corresponding to the two possible outcomes, then it can be replaced with a threshold decision function that always has a constant decision score. One of its two settings will then correspond to a threshold value that is below this decision score, and the other will correspond to a threshold value that is above this decision score. For example, in an embodiment, the interface's decision whether or not to automatically capitalize the word "Tuesday" is always based on a decision score of 1.0, and the outcome will vary depending on whether the threshold value is set to 0.0 or 2.0.

It is thus possible to convert certain decision functions to threshold decision functions without changing their behavior. One advantage of doing so is that a threshold decision necessarily has a distance metric and can thus be made to have adaptive probabilities of alteration that are calculated based on distance, as described above. For example, in an embodiment where the example decision function has been converted to a threshold decision as described above, if the setting DEC 1 is selected, then the interface will display an answer as a decimal regardless of whether or not the user's input included a fraction, but if the user's input included a fraction then the decision score will be 1.5, which is relatively close to the threshold value of 1, so the probability of alteration will be higher than if the user's input did not include a fraction, which makes intuitive sense: a user who has typed a problem involving fractions is probably more likely to want to switch to a fraction answer.

Another advantage of converting a decision to a threshold decision is that it then becomes relatively easy to modify the function so it takes into account additional contextual information: if an interface designer can think of any particular contextual factor that probably ought to increase a particular threshold decision function's tendency to favor one outcome over another, then the interface designer can modify the decision function so as to increase or decrease the decision score based on that contextual factor. For example, an interface designer may think about the example decision function that was converted to a threshold decision function as described in the preceding paragraphs, and may think that if a user's input includes a fraction, but the user's input also happens to include several decimal points, then maybe it is not as likely that the user will want the answer to be a fraction. The interface designer can then accordingly modify the decision function, such as by increasing the decision score by 0.1 for each decimal point in the user's input, up to a maximum increase of 0.5. When a function is a threshold decision function, it is relatively easy to perform such modifications. Of course, the disadvantage of such modifications is that they may cause a decision function to become too complex for a user to understand its behavior, which may occasionally lead to interface mistakes—but in some embodiments, the present invention may mitigate the disadvantages of interface mistakes, so it may be relatively easy to modify a threshold decision in a way that confers a net advantage for most users.

It may be advantageous to implement even the simplest interface decision as a threshold decision, for reasons that are discussed in the two preceding paragraphs; therefore, in an embodiment, most or all interface decisions are threshold decisions, unless otherwise specified. In particular, in an embodiment, any interface decision that is described herein in very simple terms as an alterable decision to choose one alternative over another is actually implemented as an adaptive threshold decision. If a particular alterable decision class does not take context into account, then its decision score will always equal a constant value, but its threshold may vary as interface adaptation occurs. For example, if the present specification were to say that "any interface decision to automatically convert a numeral after a variable into an exponent is an alterable decision," this would mean that in an embodiment, such a decision is also an adaptive threshold decision; for example, its decision score may always equal 1.0, and the initial threshold value of that decision class may initially be 0.1 so that decisions of that class by default have a very low probability of alteration, but interface adaptation may change this threshold value so that such decisions have a different probability of alteration or even a different default outcome.

Customizing Probabilities of Alteration

In an embodiment, generally, as is discussed farther above, when the interface makes a score-based decision that is an alterable decision, the probability of alteration that is assigned to an alternate option of that decision will be high when the score gap of that alternate option is relatively low, and will be low when the score gap of that alternate option is relatively high.

In an embodiment, the specific details of the way in which a probability of alteration is calculated based on a score gap may be different for various score-based decisions. This may be advantageous because various decisions may have completely different scoring scales, and also because some decisions should perhaps be always alterable with at least a certain minimum probability of alteration, while other decisions should perhaps be conditionally alterable. Also, for a threshold decision, the way in which a probability of alteration is calculated based on the score gap may be different depending on whether the decision score is above or below the threshold value.

In an embodiment, for certain score-based decision classes, probabilities of alteration will will take into account gradations of the score gap, so that, for example, small increases in the score gap will cause small decreases in the probability of alteration.

For example, in an embodiment, initial probabilities of alteration of alterable interface decisions typically range from a minimum of 0.0 (which is extremely low) to a maximum of 5.0 (which is very high). In an embodiment, the interface alterably decides whether or not to respond to two consecutive actuations of the same particular key as a special rapid double-click actuation, and the decision score for such a decision is the number of seconds that elapse between the two consecutive actuations. If the decision score is below the threshold value, then the probability of alteration equals 5.0 minus 10 times the score gap, to a minimum of 2.0, so that for example a score gap of 0.2 seconds yields a probability of alteration of 3.0; if the decision score is above the threshold value, then the probability of alteration equals 5.0 minus 5 times the score gap, to a minimum of 2.0. As another example, in an embodiment, the interface alterably decides whether or not to display an answer as a fraction based on a certain decision score that is based on circumstances, and the probability of alteration for such a decision simply equals 5.0 minus the score gap, except that if the score gap is greater than 5.0 then the decision is not alterable.

Making Decisions Smarter

Generally, an interface designer should understand that incorporating various features that are described herein may decrease the need for interface simplicity. When a decision is an alterable decision, in some cases it may not be important for a user to understand how the interface determines the outcome of such a decision; it may be more important for the interface to be as smart as possible in selecting the outcome the user is most likely to desire, even if this leads to occasional interface mistakes. Even more so, when a decision is an alterable decision, it may not be especially important for a user to understand how the interface determines the probability of alteration to assign to such a decision, so even when it is somewhat important for a particular interface decision to be relatively simple, the determination of the probability of alteration for such a decision may be quite complex.

Generally, the challenge of making a particular decision function be relatively intelligent can be divided into three components: identifying criteria that should be taken into account by the decision function; determining how to take the criteria into account, and mitigating the problems caused by any non-beneficial outcomes of the decision function.

The present specification cannot delineate all the criteria that should be taken into account for all possible interface decisions. The present specification explains criteria that may be relevant for certain particular interface decision classes, but an interface designer may also wish to make other decision functions be relatively intelligent that are beyond the scope of the present specification. Generally, an interface designer can identify relevant criteria by simply creating example cases in which the interface designer believes it is reasonably clear that the interface should select a particular outcome and then asking himself what contextual information makes it clear that the interface should select that outcome. (It may also be advantageous to create example cases in which the interface designer believes it is not especially clear what outcome the interface should select, for reasons that are discussed in the following paragraph.) In some cases, the criteria that decision functions should take into account will be obvious to those of ordinary skill in the art; in other cases, the criteria that decision functions should take into account may require unusual insight.

Once an interface designer has identified criteria that should be taken into consideration by a decision function, an interface designer will need to determine how the decision function should take the criteria into account. In many cases, it may be appropriate for an interface designer to quantify the criteria that are involved. An interface designer may then create a spreadsheet listing the quantified values of the various inputs of the decision for various example cases, along with the preferred outcomes for the decision in those example cases. The interface designer may then attempt to determine some type of formula that produces suitable decision scores that will cause the interface to yield the preferred outcome for most of these example cases, and cause it to yield a high probability of alteration in most cases where it does not yield the preferred outcome or where the interface designer does not strongly prefer one particular outcome. In many cases, an interface designer may be able to arrive at a reasonably good formula with just a little bit of ad hoc effort. Interface designers should also keep in mind that at this stage the problem of optimizing the decision function is essentially a problem of abstract mathematical analysis, and so it is a generic enough problem that a vast amount of prior art expertise is applicable: those with ordinary skill in various fields such as artificial intelligence or statistical process control will be familiar with techniques that may prove helpful. (In fact, certain relevant techniques can be automated and incorporated into the interface software, so that the formula used by a decision function can adapt based on actual results for a particular user.)

No matter how well an interface designer does at identifying criteria that should be taken into account by a decision function and determining how to take the criteria into account, it is virtually inevitable that any decision function will occasionally yield undesired results—and the smarter the decision function is, the more likely it is that these undesired results will be unexpected and will thus be frustrating interface mistakes. It may thus be desirable for an interface designer to include interface features that facilitate recovery from such mistakes. Facilitating recovery from undesired outcomes may be desirable not only because it is inevitable that such outcomes will occasionally occur regardless of how smart a decision function is, but also because it may not always be desirable for an interface designer to spend a lot of time and effort trying to make a decision function as smart as possible. If it is very easy to recover from interface mistakes, then may not be essential for a smart decision function to always be right.

Of course, the alteration functionality that is described herein may serve as a generic means of facilitating recovery from interface mistakes, in some embodiments, and may be usefully applied to a wide variety of decision functions. It may sometimes be advantageous for an interface designer to create new mistake recovery features that are particularly useful for recovering from certain specific types of undesired outcomes, but generally, in an embodiment, in order to make sure that it is easy to recover from undesired outcomes, an interface designer need only make such outcomes alterable. The alteration functionality that is described herein may thus greatly reduce the effort an interface designer needs to make in order to facilitate recovery from interface mistakes. Also, by virtue of being generic and applicable to a wide variety of decision functions, the alteration functionality that is described herein may be easier for a user to learn than ad hoc mistake recovery features: a user who has used alteration functionality to fix one particular type of interface mistake may already understand how to use alteration functionality to fix other types of interface mistakes.

Thus, in an embodiment that has certain alteration functionality that is described herein, it may be easy for an interface designer to mitigate the problems caused by non-beneficial outcomes of a decision function, which means that it may not be essential for the interface designer to do especially well at identifying criteria that should be taken into account by the decision function and determining how to take the criteria into account: the interface designer can make a decision function be reasonably smart without the need to worry much about its imperfections.

For example, one of the inventors decided to create a smart interface decision function that decides whether or not to display an answer to a mathematical calculation as a fraction. After much thought, he decided that it is generally more desirable to display an answer as a fraction when the answer can be displayed as a fairly simple fraction, and when the problem the user typed includes fractions, and when the most recent previous answer was displayed as a fraction. It is generally less desirable to display an answer as a fraction when it would have many digits in its denominator, and when it is a very large number, and when the problem the user typed includes decimals, and when the most recent previous answer was not displayed as a fraction. After some additional thought, he decided that if an answer can be displayed as a fraction that is rather complicated then the interface should be somewhat biased against displaying the answer as a fraction, but the bias should not be as strong if the problem the user typed included a fraction that was equally complicated. He spent several hours fiddling with a spreadsheet to create a smart threshold decision function that takes all these criteria into account and yields outcomes that mostly appear to make sense. This decision function is described in Chapter 50. This decision function may not be perfect, but it may be significantly smarter than prior art, and it does not need to be perfect: in an embodiment, a non-beneficial outcome can typically be corrected with a single keystroke. Likewise, an interface designer can make other decision functions be relatively intelligent that are beyond the scope of the present specification, without the need to worry much about their imperfections.

Increasing Decision Consistency

Generally, it may be advantageous for consecutive interface decisions of the same decision class to tend to yield the same results. If the interface makes a threshold decision as explained above such that the decision score is just barely below the threshold value, and then soon afterward the interface makes a threshold decision of the same decision class such that the decision score is just barely above the threshold value, then the fact that the two decision scores are very close to one another indicates that the circumstances of the two decisions were very similar as for the interface can tell, so the user may not expect the second decision to yield a different outcome than the first. For example, if the interface's decision whether to respond to two consecutive actuations of the same particular key as a special rapid double-click actuation is a threshold decision that is based on the amount of time that elapses between the two consecutive actuations, and the threshold value is 1.00 seconds, then if a user has recently actuated the key twice with 0.97 seconds between the actuations and so the interface treated that as a special rapid double-click actuation, then if the user now actuates the key twice with 1.01 seconds between the actuations, the user may not expect the second pair of actuations to yield a different outcome than the first.

Therefore, in an embodiment, certain threshold decisions may have an "outcome repetition bias." For any particular threshold decision class, if that decision class has a certain "maximum outcome repetition bias," then this means that immediately after a decision of that class, the "current outcome repetition bias" will be set to equal that maximum amount, and the interface will remember the decision score of that decision. Whenever the interface makes its next decision of that class, if the difference between the decision score of the new decision and the decision score of the previous decision is less than the current outcome repetition bias, but the decision score of the new decision is on the other side of the threshold value and so the interface would ordinarily select a different outcome than the previous time, then instead the interface will modify the decision score of the new decision just enough that it is on the same side of the threshold value as the decision score of the previous decision, so that the interface will decide to select the same outcome as before and this decision will have an extremely high probability of alteration. For example, if the decision class mentioned in the preceding paragraph has an outcome repetition bias of 0.10 seconds, then if a user actuates the key twice with 0.97 seconds between the actuations and soon thereafter actuates the key twice with 1.01 seconds between the actuations, the decision pertaining to the second pair of actuations will necessarily have the same outcome as the decision pertaining to the first pair. As another example, a threshold decision regarding whether to display an answer as a mixed fraction or as an improper fraction is described in Chapter 50, and this decision has a maximum outcome repetition bias of 3.0, so if the interface makes a decision of this class with a decision score of 1.5 and then immediately thereafter makes another decision of this class with a decision score of −0.5, these two decisions will necessarily have the same outcome.

In an embodiment, however, for certain such decision classes, a "context break" may occur that will cause the interface to reduce the current outcome repetition bias. In various embodiments, for various decision classes, the interface may use different criteria to determine when such a context break occurs. Generally, whenever the interface has some indication that a previous decision's outcome is no longer as likely to influence a user's expectations, such an indication may constitute a context break.

In particular, in an embodiment, if a certain amount of time passes during which no decision of a particular class occurs, this may constitute a context break. For example, in an embodiment, for a threshold decision class that has a maximum outcome repetition bias of 3.0, the current outcome repetition bias will be reduced by 0.1 each minute, so that a previous decision of that class will not affect the next decision of that class if 30 minutes elapse between the two decisions.

In an embodiment, whenever the interface makes a composite decision, for any component decision class that is not involved in the composite decision, this may constitute a context break. For example, in an embodiment, if the interface's decision regarding what form to display the answer to a calculation in is a composite decision, and the composite decision includes a component decision regarding whether to display an answer as a mixed fraction rather than an improper fraction, then whenever a user types a problem such that the answer cannot be displayed as a fraction at all, this will constitute a context break for purposes of that component decision class.

In an embodiment, when a user edits a different document, this may constitute a context break.

Other ways of determining in various embodiments what constitutes a context break for various decision classes will be evident to those of ordinary skill in the art.

Customizing Adaptation Tendencies

In many cases, after an interface decision has a non-beneficial outcome, it will be advantageous for the interface to cause the nearest beneficial setting to become selected, and then leave that setting selected until the next time a decision of that class has a non-beneficial outcome. However, in some cases, for certain decision classes, an interface designer may know or believe that such adaptation behavior may not be optimal. Of course, even if such adaptation behavior leads to non-beneficial outcomes, in some embodiments, the interface mitigates the disadvantages of non-beneficial outcomes; nevertheless, it may be advantageous for an interface designer to cause certain decision classes to adapt to user behavior in slightly different ways.

In particular, it may be advantageous for a decision class to equally take into account all past outcomes of decisions of that class rather than adapting based on the most recent outcome. It may be advantageous for a decision class to resist adapting to the point where an outcome that is not usually desirable becomes the default outcome. It may be advantageous for a decision class where an outcome that is not usually desirable has become the default outcome to automatically revert to a more normal setting in certain circumstances. Such behaviors are described below.

The adaptation behaviors that are described above and the adaptation behaviors that are described below give an interface designer a variety of approaches that can be used to create adaptive decision classes that generally yield good results. However, other ways of customizing adaptation behavior may occasionally be especially advantageous for specific decision classes. For example, in Chapter 48, the present specification describes a decision class that decides between a radian input mode and a degree input mode; for that particular decision class, if a user includes in the same line of input some angles that are measured in radians and other angles that are measured in degrees, then the interface will not select a setting that is strongly biased towards either radians or degrees until the user moves on to the next line of input.

Adaptation that Considers Past History

In an embodiment, for some decision classes, when the interface determines whether a particular decision of that class had a beneficial or non-beneficial outcome, rather than changing the threshold value based on the outcome of just that particular decision so as to ensure that the decision would have had a beneficial outcome if the change had occurred before the decision, the interface will instead recalculate the threshold value based on the history of the outcomes of all decisions of that class, or some more recent subset of the decisions of that class. Such behavior may be advantageous for a decision class where it is relatively unlikely that a user's preferences will change over time (in the judgment of the interface designer), and so other past outcomes may provide information that is just as relevant as the most recent outcome.

In particular, in an embodiment, for some threshold decision classes, when the interface determines whether a particular decision of that class had a beneficial or non-beneficial outcome, the interface will then set the threshold value of that decision class to be a value that would have caused non-beneficial outcomes to be divided between the two possible outcomes of the decision as equally as possible. For example, consider an embodiment where the interface decides whether or not to treat two consecutive actuations of the same particular key as a special rapid double-click actuation, and this is an adaptive threshold decision that is based on the amount of time that elapses between the two consecutive actuations. Suppose the interface has made seven decisions of this decision class. On four occasions, treating the consecutive actuations as a double-click actuation was beneficial or would have been beneficial; on those occasions, the amount of time that elapsed was 0.5 seconds, 0.3 seconds, 0.5 seconds, and 0.6 seconds. On three occasions, treating the consecutive actuations as two distinct actuations was beneficial or would have been beneficial; on those occasions, the amount of time that elapsed was 1.2 seconds, 0.7 seconds, and 2.0 seconds. As a result, the threshold amount of time for this decision class is now somewhere between 0.6 and 0.7 seconds. If a user now actuates the key twice consecutively with 1.3 seconds between the actuations, the interface will alterably treat this as two distinct actuations. If this decision turns out to have a non-beneficial outcome, then in an embodiment, the interface will not adjust the threshold amount of time past 1.3 seconds; instead, the interface will set the threshold amount of time to be somewhere between 0.7 seconds and 1.2 seconds, which is a threshold that would have caused this decision class to yield non-beneficial outcomes that would have been divided equally between the double-click actuation outcome and the distinct actuations outcome: on the one hand, the recent decision not to treat two consecutive actuations that were separated by 1.3 seconds as a double-click actuation would still have had a non-beneficial outcome, and on the other hand, the decision to treat the earlier two consecutive actuations that were separated by 0.7 seconds as a double-click actuation would also have had a non-beneficial outcome. In essence, in such an embodiment the interface may thus adjust a threshold value so that it is sort of an average desirable value based on all previous user behavior, rather than a minimally desirable value based on the most recent user behavior.

Adaptation that Avoids Extremes

In an embodiment, some adaptive decision classes are "adaptation-resistant decision classes." By various means, the interface may resist adapting in such a way as to cause certain settings of an adaptation-resistant decision class to become selected. That is, using the terminology of setting adaptation maps, when the interface determines that an adaptation-resistant decision had a non-beneficial outcome, in certain circumstances the interface may not necessarily cause the nearest beneficial setting to become selected. Such behavior may be advantageous for a decision class where certain settings are so unlikely to yield beneficial outcomes that in the judgment of the interface designer, it is relatively unlikely that such a setting would yield a beneficial outcome for the next decision even when the interface has just determined that the setting would have yielded a beneficial outcome for the most recent decision.

In particular, in an embodiment, within the setting adaptation map of an adaptation-resistant decision class, a setting node may have an "inherent adaptation resistance value," or an edge within the map may have an inherent adaptation resistance value, or an edge may have such a value for purposes of traversing the edge in one direction but not for purposes of traversing the edge in the other direction. Every setting or edge that has an inherent adaptation resistance value will also have a "current adaptation resistance value" that is initially equal to its inherent adaptation resistance value. If a decision of that class has a non-beneficial outcome and so the interface determines the path to the nearest beneficial setting, if at some point following that path would cause the interface to traverse an edge or reach a setting node that has a current adaptation resistance value that is greater than zero, then that edge or setting will block the path: the interface will not select the nearest beneficial setting, but will instead select the node that is immediately before the edge or node that has a current adaptation resistance value that is greater than zero, and will decrease that current adaptation resistance value by one. The interface will also reset all current adaptation resistance values on that setting adaptation map other than the one it just decreased back to their inherent adaptation resistance values. Whenever a decision of that class has a beneficial outcome, the interface will reset all current adaptation resistance values on that setting adaptation map back to their inherent adaptation resistance values. In other words, in such an embodiment, the interface may resist adapting so as to cause a particular setting to become selected until its failure to adapt causes a non-beneficial outcome to occur a certain number of times in a row.

Of course, in most cases a programmer can implement the same behavior that is described in the preceding paragraph by means of algorithms that do not use setting adaptation maps. For example, in an embodiment, when the interface alterably decides to automatically capitalize the word after "Mr.", the interface will simply keep count of how many consecutive times this yields a non-beneficial outcome, and will adapt so as to stop automatically capitalizing the word after "Mr." only if its decisions to automatically capitalize the word after "Mr." yield non-beneficial outcomes three times in a row.

In an embodiment, as another means of making an adaptive decision class be adaptation-resistant, for a class that has a setting adaptation map with a distance metric as described above, when a decision of that class has a non-beneficial outcome, the interface may restrict its adaptation so that rather than necessarily causing the nearest beneficial setting to become selected, it will proceed as far as possible along the path from the currently selected setting to the nearest beneficial setting subject to the restriction that it will thus traverse only a certain maximum adaptation distance before it stops. In an embodiment, in addition to keeping track of which particular setting is selected for a particular adaptive decision class, the interface may also keep track of how much progress has been made from that setting towards an adjacent setting along the connecting edge. For example, if a setting adaptation map has three settings arranged sequentially, and the length of each of the two connecting edges is 5, and the leftmost setting is currently selected and no progress has been made towards the center setting, then if the interface determines that a decision of that class had a non-beneficial outcome and the nearest beneficial setting is the rightmost setting, then if the maximum adaptation distance the interface will traverse along this setting adaptation map is 3, the interface will not arrive at the rightmost setting; it will not even reach the center setting. Instead, it will proceed so that it is ⅗ of the way from the leftmost setting to the center setting; then if the next decision of that class again has an outcome such that the nearest beneficial setting is the rightmost setting, the interface will select the center setting and proceed so that it is ⅕ of the way from the center setting to the rightmost setting.

Various other ways of making an adaptive decision class be adaptation-resistant will be evident to those of ordinary skill in the art. An interface designer can mix various approaches as desired in order to make a particular decision class adapt in a way that the interface designer believes will be advantageous. For example, in an embodiment, for some particular decision class that has one outcome that is usually desirable and another outcome that is rarely desirable (in the opinion of the interface designer), when a decision of that class has a non-beneficial outcome, if the outcome that is usually desirable is the one that would have been desirable, the interface will adapt normally, but if the outcome that is rarely desirable is the one that would have been desirable, then the interface will resist adaptation somewhat: it will proceed along the path towards the nearest beneficial setting, but it will traverse only a certain maximum distance before it stops, where the maximum distance is either a constant adaptation distance or half the distance to the nearest beneficial setting, whichever is greater.

Adaptation that Reverts from Extremes

In an embodiment, for some adaptive decision classes, one or more settings are "extreme settings" such that if an extreme setting is selected when a context break occurs, then the interface will "revert" from the extreme setting, which means that it will either adjust its settings so as to cause the extreme setting to no longer be selected, or it will at least adjust its settings so as to move towards eventually causing the extreme setting to no longer be selected without yet actually doing so. Such behavior may be advantageous for a decision class where certain settings are relatively likely to be disadvantageous in the future, even if they are advantageous currently.

For example, in an embodiment, for each extreme setting a target setting will exist such that if the extreme setting is selected when a context break occurs, then the interface will select its corresponding target setting. Such a target setting may itself be an extreme setting that is less extreme, so that if another context break occurs, the interface will again select a different setting.

Alternatively, in an embodiment, for a decision class that has two possible outcomes and thus has a setting adaptation map that is an arrangement of the function's settings in a linear sequence from the least biased towards a certain outcome to the most biased towards that outcome, if the setting adaptation map has a distance metric as described above, then a certain edge on the setting adaptation map may constitute a boundary between non-extreme settings and extreme settings, and if the setting that is selected is on the extreme side of that boundary when a context break occurs, then the interface will travel a certain fraction of the distance back towards the non-extreme side of that boundary. For example, in an embodiment, if an extreme setting is selected when a context break occurs, then the interface will adjust the relevant setting variable by an amount equal to half the distance towards the nearest non-extreme setting, rounded up.

Other ways of configuring a particular decision class to revert from an extreme setting if it is selected when a context break occurs will be evident to those of ordinary skill in the art.

In various embodiments, for various decision classes, the interface may use different criteria to determine when a context break occurs. Generally, whenever the interface has some indication that the user's previously expressed preference for a particular extreme setting may no longer apply, such an indication may constitute a context break. In particular, if a certain amount of time passes during which no decision of a particular class occurs, this may constitute a context break. Whenever the interface makes a composite decision, for any component decision class that is not involved in the composite decision, this may constitute a context break. When a user edits a different document, this may constitute a context break. For example, in an embodiment, if the interface has adapted so that it will no longer automatically capitalize names of days of the week, this may be applicable only until the user exits the current document, so when the user edits a different document this may constitute a context break that will cause the interface to revert to automatically capitalizing names of days of the week. Other ways of determining what constitutes a context break for a particular decision class will be evident to those of ordinary skill in the art.

In an embodiment, for a decision class that has extreme settings as defined above, the interface's decision whether or not to revert from an extreme setting if it is selected when a context break occurs is itself an adaptive decision, of its own adaptive decision class. Such a decision will be referred to as an "adaptive reversion decision," and the decision class that has extreme settings that it pertains to will be referred to as its "base decision class." After an adaptive reversion decision occurs, the interface will remember the extreme setting that was selected before the context break occurred and will also remember what setting then became selected or would have become selected if it had decided to revert from the extreme setting, and as soon as the interface makes a decision of the base decision class that has a non-beneficial outcome, the interface will determine whether the other setting would have yielded a beneficial outcome, or whether it would at least have been closer to the nearest beneficial setting on the setting adaptation map, and if so, then the interface will determine that its adaptive reversion decision had a non-beneficial outcome. For example, in an embodiment, if the interface has adapted so that it will no longer automatically capitalize names of days of the week, and then the user closes the current document and edits a different document, and this constitutes a context break for that decision class, so the interface makes an adaptive reversion decision and decides to resume automatically capitalizing names of days of the week, then the interface will remember that if it had made the opposite choice when it made the adaptive reversion decision then it would not be automatically capitalizing names of days of the week; subsequently, if the next time the interface automatically capitalizes the name of a day of the week, this decision turns out to have a non-beneficial outcome, then the interface will not only adapt so that it will once again stop automatically capitalizing names of days the week, but will also determine that the adaptive reversion decision had a non-beneficial outcome and will adjust the setting of that adaptive reversion decision class also, so that the next time the user closes the current document and edits a different document, the interface will decide not to revert from the extreme setting despite the context break.

Adaptation to Emphatic Preferences

In Chapter 9, the present specification describes an Emphatic Alteration key, an Emphatic Yes key, and an Emphatic No key that have the same effects as the non-emphatic versions of the keys, along with additional effects that are not described in Chapter 9. In an embodiment, actuating any such emphatic alteration-related key may affect interface adaptation differently than the non-emphatic version of the key. Such behavior is described in more detail in the following paragraphs.

In an embodiment, for any alterable decision that is an adaptive decision, if a user actuates an emphatic alteration-related key while that decision is the currently alterable decision, then the interface will remember that the user has expressed an emphatic preference pertaining to that decision, and then when the interface determines what outcome of the decision was beneficial or would have been beneficial and adjusts its settings accordingly, the procedure for adjusting the interface settings will take into account the fact that the user expressed an emphatic preference.

In particular, in an embodiment, for purposes of interface adaptation, when the interface determines what outcome of an adaptive decision was beneficial or would have been beneficial and adjusts its settings accordingly, if the user expressed an emphatic preference by actuating an emphatic alteration-related key, then the interface will perform the same adaptation procedure that it would perform if the user had not expressed an emphatic preference, but will do so a certain number of consecutive times, such as, in an embodiment, five consecutive times. For example, in an embodiment, if an adaptive decision has a certain default outcome, and a user explicitly indicates approval of this outcome by means of actuating the Emphatic Yes key, then the interface will adjust its settings just as much as if it had happened five consecutive times that the interface made that decision and the user explicitly indicated approval by means of actuating the non-emphatic Yes key. Thus, in such an embodiment, emphatic alteration-related keys will tend to accelerate the process of interface adaptation.

In an alternative embodiment, as an alternative approach to achieving a similar purpose, if a user rejects a particular option of an alterable interface decision by means of the Emphatic Alteration key or the Emphatic No key, then the interface will if possible ensure that the option the user thus rejected will not be the default option the next time the interface makes a decision of that decision class. For example, in an embodiment, if the interface by default alterably decides to automatically capitalize the word after “Mr.”, and if the interface ordinarily will not change that behavior until it yields a non-beneficial outcome three times in a row, then if the first time the interface alterably decides to automatically capitalize the word after “Mr.” the user alters this decision by means of the Emphatic Alteration key, then the interface will change its behavior immediately even though it has yielded a non-beneficial outcome only once. In an embodiment, after the interface makes an alterable decision that is an adaptive decision, if a user accepts the default outcome of that decision by means of the Emphatic Yes key, then the interface will if possible ensure that the next time the interface makes a decision of that decision class, it will have the same outcome, and the probability of alteration of the decision will be below the highlighting threshold. In an embodiment, after the interface makes an alterable decision that is an adaptive decision, if a user alters the decision and then accepts an alternate option by means of the Emphatic Yes key, then the interface will if possible ensure that the next time the interface makes a decision of that decision class, the option the user thus accepted will be the default option.

Chapter 22: Interface Adaptation

Universal Alterable Decision Adaptation

In an embodiment, some or all alterable interface decisions will be adaptive decisions. In an embodiment, a distinct adaptive decision class will exist for each distinct circumstance disclosed herein in which the interface makes an alterable decision. Therefore, throughout the present specification, whenever the default outcome of an alterable decision is stated or implied, it is to be understood that in an embodiment, interface adaptation may cause the default outcome of that type of decision to change. For example, if the present specification says, “In an embodiment, when a user types a numeral that is immediately after a variable, the interface will alterably decide to automatically convert the numeral into an exponent,” then it is to be understood that in an embodiment, if such a decision has a non-beneficial outcome, then the next time the user types a numeral that is immediately after a variable, the interface will instead alterably decide to not automatically convert the numeral into an exponent.

Above, the present specification explains how to convert non-adaptive decision functions to adaptive decision functions. In Part III, numerous distinct situations are described in which the interface will make various types of alterable decision. In most cases, the below explanations of alterable decisions will explain the relevant interface decision functions it enough detail to make it clear how to implement those functions as non-adaptive decision functions, without specifically explaining how to make those functions adaptive; however, taking such later portions of the present specification in conjunction with the above explanation of how to convert non-adaptive decision functions to adaptive decision functions, it will be clear how to implement such functions as adaptive decision functions.

In particular, in every case where the present specification describes a particular type of alterable decision that has two possible outcomes, it is to be understood that in an embodiment, that type of decision will be implemented as a distinct adaptive decision class as described above. As is described above, this means that in an embodiment, whenever a decision of such a decision class has a non-beneficial outcome, the interface will adjust its settings so that the next time it makes a decision of that class, it will select the other outcome, and the decision’s probability of alteration will be very high; whenever such a decision has a beneficial outcome, the interface will adjust the settings so that the next time it makes a decision of that class, the decision’s probability of alteration will be slightly less than before. So, for example, if the present specification says, “In an embodiment, when a user types a numeral that is immediately after a variable, the interface will alterably decide to automatically convert the numeral into an exponent," then it is to be understood that in an embodiment, if that outcome of automatically converting the numeral into an exponent repeatedly and consistently turns out to be beneficial, then eventually the probability of alteration that is assigned to such decisions will become quite low.

Alteration of Adaptation

As described above, adaptation functionality may cause the interface to change its own settings without notifying the user.

However, in an embodiment, when an adaptive decision has a non-beneficial outcome and the interface accordingly adjusts a setting in such a way that if the adjustment had occurred before the decision then the decision would have had a beneficial outcome, then the interface's decision to adjust that setting itself may be an alterable decision such that altering the decision will cause the adjusted setting to revert to its previous value. Such a decision will be referred to as an "alterable adaptation decision."

Any alteration of an alterable adaptation decision will have consequences that are not readily visible, so in an embodiment, such an alteration will be treated as a subtle change as defined in Chapter 8, and so in certain circumstances, a block descriptor will appear for an alterable adaptation decision. In an embodiment, for purposes of such a block descriptor, the options of an alterable adaptation decision will be described as "Adapting" and "Not adapting."

If the interface behaviors described in the preceding two paragraphs cause a block descriptor to appear that notifies the user when the interface is adapting, this may serve to call the user's attention to an unusually helpful interface behavior that the user otherwise might not consciously notice. Also, making the interface's decision to adjust a setting be an alterable decision may give a user more control over the interface's behavior, so that the user can more easily cause the interface to behave more like a prior art interface that does not automatically adjust its own settings, which may possibly be advantageous. On the other hand, there may be little need for an embodiment of the present invention to behave like a prior art interface: if adjusting a setting will cause the interface to make a wrong decision later, then it will be quite easy for the user to fix that mistake later by means of alteration functionality, so there may be little point in making it possible for the user to prevent that mistake rather than fixing it later. Furthermore, if there is not much need to actually alter alterable adaptation decisions, then any block descriptors that pertain to such decisions may be unnecessarily distracting. Therefore, it may be desirable that if adaptation decisions are made to be alterable, then they are configured in such a way that if a user consistently ignores the possibility of altering such decisions, then sooner or later block descriptors for such decisions will not be displayed.

In an embodiment, alterable adaptation decisions are themselves all members of a single adaptive decision class. In an embodiment, the default outcome of such decisions will initially be to perform adaptation, and the alternate outcome will initially have a high probability of alteration, but if a user repeatedly accepts the default outcomes of such decisions, eventually these decisions will have a sufficiently low probability of alteration that a block descriptor will by default not be displayed. In an embodiment, when the interface adjusts a setting for the alterable adaptation decision class itself, its decision to do so is not an alterable decision, and thus is not itself an alterable adaptation decision.

Interface Decision Data Collection

In an embodiment, in certain circumstances the interface will retain usage data regarding an interface decision even after it has determined whether or not such a decision had a beneficial outcome and has adjusted its settings accordingly, so as to be able to potentially make use of information regarding multiple decisions of a particular decision class in order to adjust its settings in a more sophisticated way. For example, in an embodiment, the interface will remember the initial probability of alteration of each alterable decision and remember whether or not the decision had a beneficial outcome until the interface has subsequently made 1000 more alterable decisions, so that the interface will be able to analyze up to 1000 decisions in order to determine a highlighting threshold such that at least 95% of all decisions with a probability of alteration below this threshold had a beneficial outcome.

Furthermore, in an embodiment, in certain circumstances the interface will send anonymous usage data regarding alterable decisions to a developer, so that the developer may subsequently use aggregated data pertaining to multiple users in order to further improve the algorithms pertaining to alterable decisions. For example, in an embodiment, if a user explicitly opts to send anonymous usage data regarding alterable decisions, then once a month the interface will send to a particular email address an email that includes the current threshold value for each adaptive threshold decision class, so that the developer will receive such data from the computing devices of various users and may then aggregate and analyze the data in order to determine more appropriate initial threshold values for various adaptive threshold decision classes.

Below, various interface behaviors are described that may take advantage of data regarding past alterable decisions. In every case that is described below where the interface may take into account such data for an individual user and adjust its behavior for that user, it is to be understood that also, in an embodiment, the interface may send such data to a developer so that the developer can adjust the initial default behavior of the interface for all future users.

Multi-Factor Adaptation

In an embodiment, as described above, if the interface makes a decision by means of taking into account multiple factors in calculating a decision score and then comparing the decision score to a threshold value, then after the interface determines whether or not the decision had a beneficial outcome, adaptation functionality may cause the interface to adjust the threshold value of the threshold decision.

In an embodiment, for certain threshold decision classes, the interface not only may adjust the threshold value of the decision class, but also may adjust the weights of various factors that are taken into account in calculating the decision score for decisions of that class.

For example, in an embodiment, for a certain threshold decision class, in order to be able to intelligently adapt the weights of multiple factors, the interface will remember all the relevant data regarding each decision of that class, including whether or not each decision had a beneficial outcome, until it has made at least 10 decisions of that class.

Once the interface has made at least 10 decisions of that class, the interface will determine what threshold values would have caused as many of those 10 decisions as possible to have beneficial outcomes, and then for each factor that was involved in these decisions, one at a time, in some order, the interface will check that factor to determine whether a different weight for that factor would have been more beneficial and will adjust the weight of that factor if so; that is, for each factor, the interface will determine whether increasing or decreasing the weight of the factor would have caused more of those decisions to have beneficial outcomes, or would at least have caused some cases in which the decision had a non-beneficial outcome to have a higher probability of alteration; if so, the interface will accordingly adjust the weight of that factor. If the interface does adjust the weight of a factor that it checks, then it will use this new weight in determining whether or not to adjust the weight of any subsequent factor that it checks. For example, in an embodiment, if the interface sometimes makes an alterable decision whether or not to display a calculated value as a fraction, and by default such decisions are partly based on how many fractions were included in the expression that was evaluated and partly based on how many digits would be in the denominator if the answer were displayed as a fraction, then if a user repeatedly and consistently causes the calculated value to be displayed as a fraction if and only if it would have a single-digit denominator, then eventually the interface will adapt so that when it calculates a decision score for such a decision, the number of digits that would be in the denominator will have far more weight than the number of fractions that were included in the expression that was evaluated.

The preceding paragraph describes a relatively simple technique for adapting the weights of multiple factors. Those with skill in various fields such as artificial intelligence or statistical process control may be familiar with techniques that are more sophisticated. In many cases, though, even a relatively simple technique may yield beneficial results.

Adaptation of Decision Variation

In an embodiment, in certain circumstances the automatic decision variation feature will vary a decision, which may cause a different option of the decision to become selected than would otherwise become selected, as is described in Chapter 17 in more detail.

In an embodiment, the automatic decision variation feature is adaptive. If a user deletes and retypes an alterable block so that the interface recognizes repetition of some particular alterable decision, then the interface's decision whether or not to select a different outcome of the decision will be considered to have a beneficial outcome if and only if the user does not subsequently alter the outcome of that decision by some means.

In the automatic decision variation feature as described in Chapter 17, when the interface varies a decision, the variation score of the monitored alterable decision determines the strength of the interface's tendency to cause a different option of the decision to become selected. In an embodiment, the interface may adapt the strength of such a tendency with respect to each individual decision class, so for example, in an embodiment where the interface alterably decides to automatically convert straight quotation marks to slanted quotation marks, and a user occasionally deletes and immediately retypes a quotation mark but never actually intends to effect any change by doing this, then eventually the interface will adapt so that particular type of alterable decision is essentially immune to the automatic decision variation feature. In particular, in order to achieve such behavior, in an embodiment, for each distinct type of alterable interface decision that is described herein, the interface will keep track of a decision variation bias that is initially 0. When the interface varies a decision, it will increase the variation score by an amount equal to the decision variation bias for that type of decision. After the interface varies a decision, if varying the decision causes a different option to become selected, but later the interface determines that the outcome that would have been beneficial is the option that would have become selected if the interface had not varied the decision, then the interface will slightly decrease the decision variation bias for that type of decision (even if this results in a negative value), so that in the future varying that type of decision will be slightly less likely to cause a different option to become selected. Conversely, after the interface varies a decision, if varying the decision does not cause a different option to become selected, but later the interface determines that the outcome that would have been beneficial is the outcome that would become selected if the variation score had been sufficiently high to cause the interface to select a different option, then the interface will slightly increase the decision variation bias for that type of decision, so that in the future varying that type of decision will be slightly more likely to cause a different option to become selected.

In an embodiment, the interface may also eventually adjust any particular value that controls the overall behavior of the decision variation feature if it determines that such an adjustment would have yielded more beneficial outcomes. For example, as described further in Chapter 17, the automatic decision variation feature will reduce variation scores whenever a user performs an action that has a deliberation score that is above a certain threshold, so that when a user deletes and retypes an alterable decision, if the user pauses very long while doing so, the interface will have less tendency to select a different outcome of the decision; but in an embodiment, if a user frequently pauses while deleting and retyping an alterable block, and yet the user repeatedly and consistently wishes the interface to yield a different outcome in response to the deletion and retyping of the alterable block despite the pause, then eventually the interface will raise the aforementioned threshold so that the automatic decision variation feature will subsequently be less sensitive to such pauses.

Chapter 23: User Education

Efficiency Tips and Notifications

In an embodiment, in certain circumstances the interface will generate messages to a user that include specific tips that explain how to get desired results more efficiently by using particular interface features, and such messages will be based on actual interface observation of apparent inefficiencies in the user's behavior. Such messages will be referred to herein as "efficiency tips." In the present specification, such an embodiment will be said to have the "user education feature."

In an embodiment, when the interface generates an efficiency tip, the interface will display a notification badge in a certain region of the display, such as on a status line, with the numeral 1 in the notification badge, or if a notification badge was already present, the interface will increment the numeral. In an embodiment, when a user clicks or touches such a notification badge, the interface will display a list of brief descriptions of efficiency tips. In an embodiment, when a user clicks or touches such an efficiency tip from such a list, the interface will display the tip; if this is the first time the user has viewed the tip, the interface will decrement the numeral in the notification badge, and when that numeral would be zero the notification badge will disappear.

In an alternative embodiment, when the interface generates an efficiency tip, the interface will send the user an email containing the efficiency tip. In another alternative embodiment, when the interface generates an efficiency tip, the interface will immediately display the efficiency tip. In another alternative embodiment, the interface will not immediately notify the user when it generates an efficiency tip, but may nevertheless show the user the efficiency tip in certain circumstances, such as the circumstances described in the following paragraph.

In an embodiment, whenever the interface displays a "Tip of the Day" window for an application, if the interface has generated any efficiency tips while running that application that the user has not yet viewed, then the interface will initially display such an efficiency tip within the "Tip of the Day" window rather than displaying some other Tip of the Day.

In an embodiment, as described below, efficiency tips may be generated when the interface observes that a user has performed a specific task in a relatively inefficient manner. In such circumstances, the interface will therefore have specific information regarding the specific task that the user performed inefficiently; in an embodiment, an efficiency tip may include such information. For example, in an embodiment, if a user moves to the end of a line of text by holding down the right arrow key for several seconds when the user could instead have simply pressed the End key, and in response to this behavior the interface generates an efficiency tip, then the efficiency tip not only will explain what the End key does, but also will mention that the user recently could have reached the end of a line of text faster by using the End key.

In an embodiment, an efficiency tip may also include a video or a link to a video explaining how to use a particular feature in order to get desired results more efficiently. In an embodiment, an efficiency tip may also include an interactive tutorial or a link to an interactive tutorial so that a user can conveniently practice using a particular feature. In an embodiment, an efficiency tip may also include a button that enables a user to prevent a particular efficiency tip from ever appearing again, and may also include a button that enables a user to completely prevent all future efficiency tips. In an embodiment, a user can always choose to re-enable efficiency tips via an interface settings menu option.

Measuring Time Spent

In an embodiment, in certain circumstances the interface will determine how much time a user spent performing a particular sequence of actions. In particular, in an embodiment, when the interface determines that a user has performed a sequence of actions that is an action workaround as defined below, the interface will also determine how much time the user spent performing that sequence of actions. In an embodiment, for purposes of the interface behaviors described herein, the amount of time that a user spent performing a sequence of actions is defined to be the amount of time in the interval between the previous action moment and the moment when the user performed the last action of the sequence of actions. In an embodiment, for purposes of the preceding sentence, the "previous action moment" is the moment when the user performed the action that immediately preceded the sequence of actions (which is not itself an action that is part of the sequence of actions), except as specified in the following paragraph.

In an embodiment, as an exception, when the interface determines how much time a user spent performing a particular sequence of actions, if the first action of the sequence of actions had a deliberation score that is more than a medium deliberation score, then for purposes of the preceding paragraph, the "preceding action moment" is the earliest moment such that if the preceding action had occurred at that moment then the deliberation score of the first action of the sequence of actions would have been a medium deliberation score, which may be later than the moment when the preceding action actually did occur. For example, in an embodiment where a user action is assigned a medium deliberation score if the amount of time that elapsed since the previous action is between 0.5 seconds and 1.0 seconds, if the first action of a sequence of actions had a very high deliberation score, then for purposes of the preceding paragraph, the "preceding action moment" is 1.0 seconds before the first action, even if the preceding action actually occurred five minutes before the first action.

In an alternative embodiment, for purposes of the interface behaviors described herein, the amount of time that the user spent performing a sequence of actions is defined to be the amount of time in the interval between the moment when the user performed the first action and the moment when the user performed the last action.

Workaround Detection

In an embodiment, an individual user action or a sequence of user actions may be a "tutored action." In an embodiment, for one or more tutored actions, in certain circumstances the interface will recognize that a particular sequence of actions yields a result that could instead have been achieved by means of performing the tutored action. Such a recognized sequence of actions will be referred to herein as an "action workaround," and may also be specifically referred to as an action workaround that is "for" a particular tutored action, meaning that it yields the same result that the tutored action would have yielded. In an embodiment, when the interface recognizes an action workaround, it will also note the total amount of time that was spent performing the sequence of actions that constituted the action workaround.

Generally, if users may be unfamiliar with a feature that will sometimes make it possible to efficiently achieve a desirable result by means of a single action, then it may be advantageous for such an action to be a tutored action, so that if a user performs an action workaround for that action then the interface may generate an efficiency tip explaining that feature. For example, in an embodiment, if a user corrects a mistake by means of a dozen keystrokes when the user could have achieved the same result by means of a single actuation of the alteration key, then the interface may generate an efficiency tip, as is explained below. More details of such interface behavior are explained in the following paragraphs.

In an embodiment, pressing the End key is a tutored action: if a user actuates the right arrow key sufficiently many consecutive times to reach the end of the current line of text and then performs an action that is not a cursor navigation action, and if thus reaching the end of the line of text required at least two consecutive actuations of the right arrow key, then the interface will recognize this sequence of consecutive actuations of the right arrow key as an action workaround for pressing the End key. Conversely, in an embodiment, if a user actuates the left arrow key sufficiently many consecutive times to reach the beginning of the current line of text and then performs an action that is not a cursor navigation action, and if reaching the beginning of the line of text required at least two consecutive actuations of the left arrow key, then the interface will recognize this sequence of consecutive actuations of the left arrow key as an action workaround for pressing the Home key.

In an embodiment, if a user actuates the right arrow key a certain number of consecutive times and then actuates the backspace key exactly as many times as he actuated the right arrow key, then the interface will recognize this sequence of actions as an action workaround for that number of actuations of the Delete key (which would have enabled the user to directly delete the characters that were to the right of the input cursor, rather than first moving the input cursor to cause those characters to be on the left of the input cursor and then backspacing). Furthermore, in an embodiment, if a user actuates the right arrow key sufficiently many consecutive times to reach the end of a line of text and then actuates the backspace key exactly as many times as he actuated the right arrow key, and if reaching the end of the line of text required at least five consecutive actuations of the right arrow key, then the interface will recognize this sequence of actions as an action workaround for first actuating Shift-End to select all text between the current input cursor location and the end of the current line and then actuating either Delete or backspace just once to delete the selected text.

In an embodiment, the interface will recognize when a sequence of actions has an effect that could instead have been achieved by means of altering a decision, as is described in Chapter 18. In an embodiment, when the interface recognizes manual alteration of a decision as described in Chapter 18, the interface will then treat the sequence of actions by which the user manually altered the decision as an action workaround for a sequence of actions that would have caused the interface to alter the decision (such as the sequence of actions consisting of sufficiently many actuations of the alteration key to cause the particular decision to be altered).

The above paragraphs serve as specific examples of ways in which an embodiment may recognize action workarounds for particular tutored actions. In light of these examples, various ways of configuring an embodiment so that other useful interface features are tutored actions will be evident to those of ordinary skill in the art. Generally, in order to cause an embodiment to detect when a user does not appropriately take advantage of a particular interface feature and instead achieves the same result by a less efficient means, an interface designer may first figure out what sequence of actions a user who is not aware of the feature might use in order to achieve a result that could efficiently be achieved by using the feature (such as by observing a user who is ignorant of the feature or simply by imagining an alternative sequence of actions), and may then cause the interface to detect when such a sequence of actions yields the exact same result that could have been achieved by means of using the feature. It may require some persistence to implement such ad hoc detection of action workarounds for a very wide variety of tutored actions, but it may not necessarily require significant creativity nor require skill beyond that of the ordinary practitioner.

In an embodiment, as an exception, when a sequence of actions yields exactly the same result that could have been achieved by means of using a tutored action, if any of these actions other than the first action has a high deliberation score, then the interface will not regard the sequence of actions to be an action workaround. This may be advantageous because such a sequence of actions may not necessarily indicate that a user intended to achieve a particular result and then did so by means of an inefficient sequence of actions: it may instead indicate that the user had not yet chosen to achieve that result until sometime after the user began the sequence of actions. For example, in an embodiment, if a user actuates the right arrow key 30 consecutive times in order to reach the end of a line of text, but the last such actuation has a high deliberation score, then the interface will not consider this sequence of actions to be an action workaround for an actuation of the End key. (Also, in an embodiment, the manual alteration detection feature usually will not recognize manual alteration of an alterable interface decision if a user pauses very long while deleting or editing its alterable block, as is discussed in Chapter 18.)

In an embodiment, as another exception, when the interface recognizes that a user has manually altered a decision, if the decision was not a highlighted alterable decision, and if interface adaptation as described above causes the interface to change a relevant setting, and if it is the case that if the setting had been thus adjusted before the alterable decision had occurred then the decision either would have had a different outcome or would have been a highlighted alterable decision, then the interface will not consider the user to have performed an action workaround for alteration functionality. For example, in an embodiment, if the interface alterably decides to automatically convert "tuesday" to "Tuesday" and does not highlight the alterable block of this decision, and the user goes back and manually converts the word back to lowercase and so the manual alteration detection feature of the interface recognizes that the user has manually altered that alterable decision, and so the interface adjusts a setting so that the next time it automatically decides to capitalize a day of the week the decision will have a high probability of alteration and will thus be highlighted, then the interface will not regard the user's action of manually converting the word back to lowercase to be an action workaround for an actuation of the alteration key, and thus will not generate an efficiency tip. This may be advantageous because such interface adaptation may render efficiency tips superfluous anyway: if the interface adjusts its own behavior so that it will make a different decision the next time it makes a certain type of decision, or if the interface adjusts its own behavior so that it will be easier for a user to recognize when such a decision is alterable, then there may be no need for the interface to educate a user regarding how to alter such a decision.

Measuring Cumulative Inefficiency

In an embodiment, when the interface recognizes an action workaround for a tutored action as described above, the interface will also determine the total amount of time that was spent performing the sequence of actions that constituted the action workaround, as is described above. The time spent performing an action workaround will be referred to herein as the "actual time."

In an embodiment, when the interface recognizes an action workaround for a tutored action, the interface will calculate the "theoretical time," which is approximately the amount of time that would have been required in order for the user to perform the tutored action rather than performing the action workaround. In an embodiment, when the interface recognizes an action workaround, the interface will calculate the "theoretical wasted time," which equals the actual time minus the theoretical time. For example, in an embodiment, the interface will assume that each individual user action requires approximately 1 second, and so the theoretical time for a tutored action that consists of only a single keystroke equals 1 second; in such an embodiment, if a user spends 10 seconds performing an action workaround for a tutored action that would have consisted of only a single keystroke, then the theoretical wasted time will equal 9 seconds.

In an embodiment, when the interface recognizes an action workaround for a tutored action, if the interface calculates that the theoretical wasted time for the action workaround is more than a certain threshold amount (such as, in an embodiment, three seconds), then the interface will "disapprove" the action workaround, which may lead to the generation of an efficiency tip, as described in the following paragraphs. In an embodiment, if the interface does not disapprove an action workaround, then recognizing the action workaround will have no effect. For example, in an embodiment, if a user reaches the end of a line of text by means of five rapid consecutive actuations of the right arrow key, then the interface will recognize this as an action workaround for pressing the End key but will not disapprove the action workaround and will not generate an efficiency tip, because pressing the right arrow key five times consecutively did not take very long; however, if a user reaches the end of a line of text by means of speaking the verbal command "Press right arrow" five consecutive times, and the interface recognizes this as an action workaround for speaking the verbal command "Go to end of line," then the interface may disapprove the action workaround and generate an efficiency tip, because speaking even a simple verbal command five times consecutively may take a fairly long time. (User education regarding verbal commands is discussed in more detail farther below, in Chapter 28.)

In an embodiment, for each tutored action, the interface will keep track of its "workaround count," "cumulative expended time," and "cumulative wasted time." Each of these will initially be set to zero. Whenever the interface disapproves an action workaround for a particular tutored action, it will increase that tutored action's workaround count by 1, increase its cumulative expended time by the actual time of the recognized action workaround, and increase its cumulative wasted time by the theoretical wasted time of the recognized action workaround. The "wasted time percentage" equals the cumulative wasted time divided by the cumulative expended time. In an embodiment, whenever the interface disapproves an action workaround for a tutored action, the interface will then generate an efficiency tip if each of three particular numbers exceeds a threshold value: it will generate an efficiency tip if the workaround count equals at least a certain first threshold value, and the cumulative wasted time equals at least a certain second threshold value, and the wasted time percentage equals at least a certain third threshold value.

In the following paragraphs, a "workaround sensitivity level" is a set of three threshold values for purposes of the interface behavior described in the preceding paragraph. For example, the workaround sensitivity level of a tutored action may consist of the three threshold values 1, 3 seconds, and 20%, in which case the interface will generate an efficiency tip for that tutored action as soon as its workaround count is at least 1, its cumulative wasted time is at least 3 seconds, and its wasted time percentage is at least 20%.

In an embodiment, distinct tutored actions may have distinct workaround sensitivity levels. In an embodiment, in certain circumstances the workaround sensitivity level of an individual tutored action may change, as is described below. For example, in an embodiment, a tutored action may have one of four distinct workaround sensitivity levels that may be referred to as "high," "medium," "low," and "zero" workaround sensitivity levels. At the high level, the interface will generate an efficiency tip when the workaround count is at least 1, the cumulative wasted time is at least 3 seconds, and the wasted time percentage is at least 20%. At the medium level, the interface will generate an efficiency tip when the workaround count is at least 3, the cumulative wasted time is at least 10 seconds, and the wasted time percentage is at least 50%. At the low level, the interface will generate an efficiency tip when the workaround count is at least 10, the cumulative wasted time is at least 60 seconds, and the wasted time percentage is at least 75%. At the zero level, at least one of the thresholds will be sufficiently high that the interface will never generate efficiency tips for a tutored action that has such a workaround sensitivity level.

In an embodiment, after the interface generates an efficiency tip, the interface will clear its record of workarounds for that tutored action, which means that it will reset the workaround count, cumulative expended time, and cumulative wasted time all to zero. After the interface generates an efficiency tip, if the interface will know when the user views the efficiency tip, then the interface will cease to disapprove workarounds for that tutored action until the user views the efficiency tip. In an embodiment, after the interface generates an efficiency tip, the interface not only will clear its record of workarounds for that tutored action, but also will reduce its sensitivity level for that tutored action, so if a user persistently performs tasks by means of detectably inefficient sequences of actions, the interface will warn the user less and less often until it finally gives up, even if the user does not explicitly deactivate efficiency tips.

In an embodiment, whenever a user performs a tutored action, the interface will clear its record of workarounds for that tutored action and reduce its sensitivity level for that tutored action to the minimum sensitivity level. In an embodiment, if a user has not yet read an efficiency tip pertaining to a particular tutored action when the user performs that tutored action, then the interface will nevertheless mark such an efficiency tip as read when the user performs that tutored action, on the assumption that a user who has just performed a tutored action will not wish to read an explanation of how to perform that tutored action.

Figure 17:
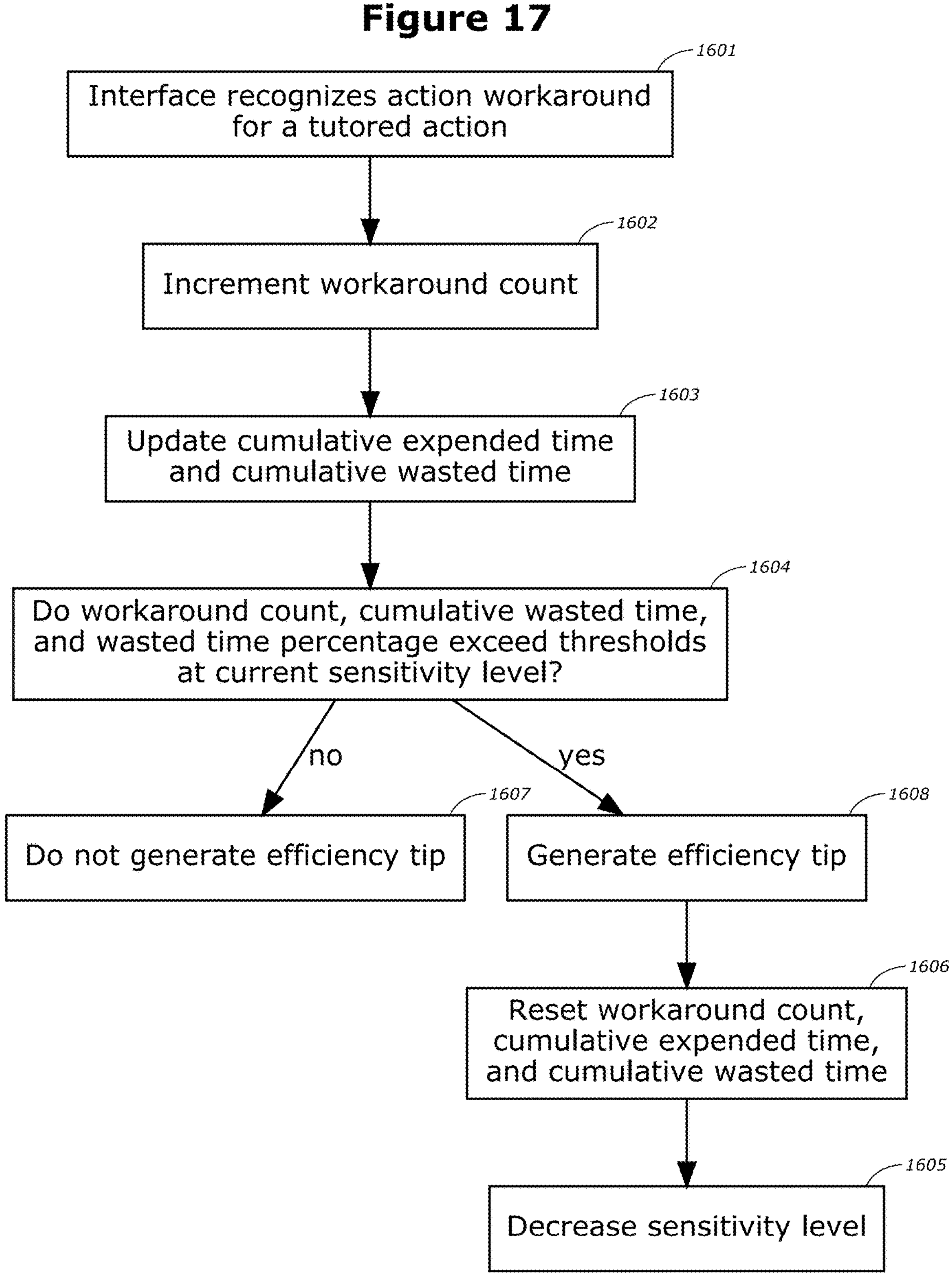
FIG. 17 is a flowchart that illustrates an example process by which an interface decides whether to generate an efficiency tip.

FIG. 17 is a flowchart that illustrates the process by which the interface decides whether to generate an efficiency tip. The process starts with Block 1701 which says, "Interface recognizes action workaround for a tutored action." When that happens, the interface proceeds to "increment workaround count" (Block 1702) and "update cumulative expended time and cumulative wasted time" (Block 1703). These data are evaluated in the following step: Block 1704 asks, "Do workaround count, cumulative wasted time, and wasted time percentage exceed thresholds at current sensitivity level?" If the answer is no, the interface will not generate an efficiency tip (Block 1705). If the answer is yes, the interface will generate an efficiency tip for that tutored action (Block 1706), and will reset the workaround count, cumulative expended time, and cumulative wasted time (Block 1707), and will decrease the sensitivity level for that tutored action (Block 1708).

Chapter 24: Situation-Specific Interface Improvements

About Part III

Above, Parts I and II of the present specification explain various features that interact with alterable interface decisions, in some embodiments. Many specific examples of alterable decisions are included in Parts I and II for purposes of illustration, but for the most part Parts I and II do not focus on explaining different types of alterable decisions or the circumstances in which the interface may make alterable decisions. (There are a couple exceptions: Chapter 10 explains fixture alterable decisions and the circumstances in which the interface may make such decisions, in an embodiment. Chapter 22 explains alterable adaptation decisions and circumstances in which the interface may make such decisions, in an embodiment.)

Part III of the present specification includes chapters 24 to 52. Part III explains in detail many different types of alterable decisions and the circumstances in which the interface may make alterable decisions, in some embodiments. Part III also explains various other interface improvements.

The present chapter introduces Part III and explains a few broad categories of alterable interface decisions. After this chapter, Part III discusses in detail various situations in which various interface improvements may make it easier for a user to achieve desired results quickly; these improvements are organized by situation. For example, various chapters discusses interface improvements that may make it easier for a user to achieve desired results quickly when using speech recognition software, when interacting with autocorrection functionality, when using an interface that has automatic capitalization, when inputting formatted text, when editing a spreadsheet, etc. The various chapters in Part III describe various specific types of alterable decisions and the exact circumstances in which the interface may make such decisions, in some embodiments. These chapters also describe other interface improvements that may be useful, in some embodiments.

Factors that Influence Interface Outcomes

Many types of alterable interface decisions are useful for mistake recovery. Before explaining a few broad categories of alterable interface decisions, the present specification will discuss the factors that determine interface outcomes, so as to be able to distinguish various causes of mistakes. For purposes of the following discussion of the factors that determine interface outcomes, an "interface outcome" is the result of a sequence of user actions.

Broadly speaking, interface outcomes are determined by a mix of "user choices" and "interface choices." Of course, interfaces generally behave in accordance with clearly specified rules, so in most cases any so-called interface choices are entirely predictable. An experienced and careful user can generally prevent interface choices from having undesired outcomes (except for interface interpretations, which are discussed below). Nevertheless, there is a distinction between user choices and interface choices: whether or not a user fully understands the rules that determine the outcome of an interface choice, the user is reasonably likely to perceive that outcome as caused by the interface, not by the user, and so an interface choice that has an undesired outcome may be especially likely to cause a user to be particularly frustrated with the interface.

When interface choices are not a significant factor in determining an interface outcome, that outcome may be determined not only by which actions the user performed and in what sequence, but also by previous user choices that determined the state of the interface when the user began performing those actions. For purposes of the present chapter, when a user performs a sequence of actions, the "denotation" is which actions are performed and in what sequence, and the "context" of the actions is the state of the interface when the user begins performing the actions—insofar as the state of the interface affects the outcome of the actions, and insofar as the user is directly responsible for determining the state of the interface. The "current context" is the state of the interface at some particular time insofar as it is likely to affect the context of immediately subsequent user actions.

For example, in a typical interface that allows the input of formatted text, the current context generally includes such data as where the input cursor is located, what font is active, and whether or not the interface is in Caps Lock mode. If a user types the sequence of characters "hello," then the outcome depends not only on the sequence of characters the user typed, but also on the current context when the user began typing these characters. In such circumstances, the denotation of the user's typing is the five-character sequence h-e-l-l-o, and the context is the input cursor location, active font, and Caps Lock status when the user begins typing. It is generally understood that such context is determined by user choices: if for example the interface was in Caps Lock mode when the user began typing "hello" but the user did not intend it to be in Caps Lock mode, then the user is likely to blame himself, not the interface.

In the present chapter, "denotative data" may be data pertaining to a user's input that was determined by the denotation of a sequence of user actions, and "contextual data" may be data that was determined by the context. By these definitions, capitalization data may be either denotative data or contextual data, depending on how it is determined: for example, if a user holds down the Shift key while typing a word, then the fact that the word is comprised of capital letters constitutes denotative data, directly determined by user input actions; but if the interface is in Caps Lock mode when a user begins typing a word, then the fact that the word consists of capital letters constitutes contextual data. More broadly, "denotative data" may refer to the type of data that is generally determined by denotation, and may refer to this type of data even when it is actually determined by interface choices; and "contextual data" may refer to the type of data that is generally determined by context, even when it is actually determined by interface choices. For example, after the interface autocorrects a word a user typed, the word's new spelling is still "denotative data" even though it was determined by an interface choice.

Figure 18:
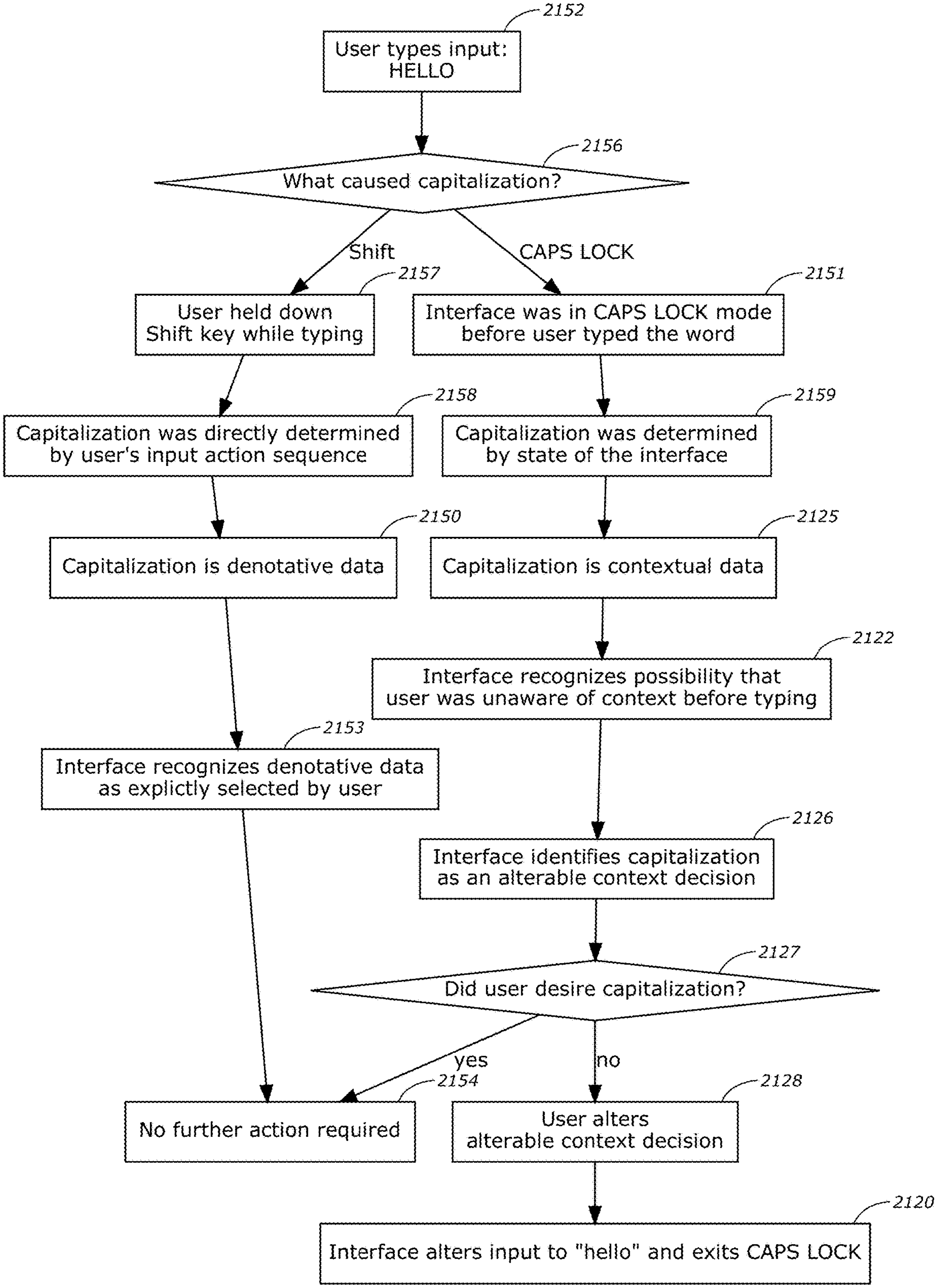
FIG. 18 is a flowchart that illustrates a distinction between denotative and contextual data, and also shows how contextual data is associated with alterable decisions, according to an embodiment.

FIG. 18 is a flowchart that illustrates this distinction between denotative and contextual data, and also shows how contextual data is associated with alterable decisions. Block 1801 states the specific example used throughout the flowchart, "User types input: HELLO." The type of data that comprises the word's capitalization depends on the method used to produce that capitalization, so Block 1802 asks, "What caused capitalization?" If the capitalization was caused by the user holding down the Shift key while typing hello (Block 1803), then the "capitalization was directly determined by user's input action sequence" (Block 1804) and is considered denotative data (Block 1805). In this case, the "interface recognizes denotative data as explicitly selected by user" (Block 1806), and no further action is required (Block 1807). However, if the interface was in Caps Lock mode before the user began typing "HELLO" (Block 1808), then "capitalization was determined by state of the interface" (Block 1809) and is considered contextual data (Block 1810). In this case, in an embodiment, depending on circumstances, it is possible that the "interface recognizes possibility that user was unaware of context before typing" (Block 1811). If so, then consequently the "interface identifies capitalization as an alterable context decision" (Block 1812). At this point, Block 1813 asks, "Did user desire capitalization?" If the answer is yes, then no further action is required (Block 1807). If the answer is no, then the user can alter the alterable context decision (Block 1814), in which case the interface alters the input to "hello" and exits Caps Lock mode (Block 1815).

In the present chapter, a "denotation override" is a key combination or verbal utterance that may in certain circumstances invoke a special effect that is distinct from its obvious effect (regardless of whether or not the denotation override may in other circumstances yield its obvious effect). For example, when a user is dictating text to Dragon NaturallySpeaking speech recognition software, speaking a sentence that begins with the word "Correct" will usually cause the software to open a mistake correction menu (or have no effect at all) rather than having the obvious effect of causing the software to transcribe the spoken sentence. Often, special multi-click effects are denotation overrides; for example, on an iPhone rapidly pressing the space bar twice consecutively will usually yield a period followed by a space character rather than having the obvious effect of yielding two consecutive space characters.

Various types of interface choices may influence interface outcomes. When a user is providing input by means of speaking into a microphone, speech recognition technology must interpret the audio input in an attempt to determine what the user says. When speech recognition technology makes a choice regarding how to interpret audio input, this is an "interface interpretation." An incorrect interface interpretation may yield denotative data that is not what the user desired or expected. Users are generally likely to blame incorrect interpretations on the speech recognition technology.

In certain cases, rather than requiring a user to entirely specify certain input, an interface may make a "interface assumption," which is an interface choice to automatically supplement a user's input. In many cases, an interface assumption adds denotative data that the user did not input. For example, in certain prior art spreadsheet applications, if on Jan. 3, 2017 a user types "12/31" into a spreadsheet cell that is formatted to interpret any numeric input as a date that includes a year, by default the spreadsheet interface may assume that the user intends to refer to a day within the current year and may thus yield the result "12/31/17." The year does not constitute "context" as defined above, because the user is not directly responsible for determining the current year; the user may be reasonably likely to blame any undesired outcome on the interface.

In certain cases, an interface may perform an "interface intervention," which is an interface choice to change an interface outcome so that the resulting denotative data and/or contextual data is different than what the user's actions clearly indicated. For purposes of the present chapter, an "autocorrection" is an interface intervention that changes denotative data, and an "automatic formatting action" is an interface intervention that changes contextual data. In prior art, interface interventions are generally in response to denotative data, even when they change contextual data. For example, in prior art word processing software, even though it is generally a user's responsibility to determine what font is used, if a user types "1st" and presses the space bar, then the interface may automatically convert the letters "st" to a superscript font, which is an interface intervention that is an automatic formatting action, and is a change of contextual data that is in response to denotative data (because the character sequence 1-s-t is denotative data). Users are generally likely to blame undesired interface interventions on the interface.

When a user performs an action other than simple input entry, in certain circumstances, an interface will make some type of decision regarding how to respond to that action that is an interface choice that is not an interface interpretation, interface assumption, or interface intervention. Such a decision is an "interface operation decision." For example, when a user types a problem into a calculator and presses Enter, the calculator interface may decide whether to display the answer as a decimal or as a fraction. When such a decision is controlled by a simple setting, a user may possibly perceive the outcome of such a decision as caused by the user, in which case the current value of that simple setting may be considered to constitute context as defined above, and the user may blame any undesired outcome on himself. When the algorithm for such a decision is relatively complex, it becomes more likely that a user will blame any undesired outcome on the interface.

The Scope of Mistake Recovery

Generally, on many computing devices, the most common mistakes are denotative word entry mistakes such as typographical errors and spelling mistakes. On many computing devices, perhaps the most frustrating mistakes are incorrect interface interpretations and undesired interface interventions, because such mistakes may cause users to feel that the interface is itself taking the initiative to introduce mistakes by refusing to do as it is told. In various prior art interfaces, various features may facilitate recovery from these kinds of mistakes, so where the present specification describes features that facilitate recovery from word entry mistakes, incorrect interface interpretations, or undesired interface interventions, the present specification may compare such features to prior art features that are intended to be useful in similar situations.

The present specification also describes in detail features that may facilitate recovery from other types of mistakes. In particular, even when the interface did exactly as it was told, and even when the interface cannot detect a typographical error or spelling mistake, in certain circumstances the interface may detect that there is a significant possibility that the user has made a specific mistake and may make an alterable decision such that altering the decision will correct any such mistake. Generally, where the present specification describes a particular type of alterable decision that is associated with some type of potential mistake other than a word entry mistake, incorrect interface interpretation, or undesired interface intervention, the present specification will not directly compare such mistake recovery functionality to prior art mistake recovery functionality, because prior art interfaces generally lack functionality that facilitates recovery from such mistakes (other than basic editing functionality such as the backspace key and the Undo key).

Prior art mistake recovery features generally facilitate changing denotative data that is not as desired: Word entry mistakes consist of incorrect spellings, and spellings are denotative data. Interface interpretations consist of interface decisions regarding what a user said, which is denotative data. Interface interventions that are autocorrections (as defined above) pertain to denotative data. However, interface interventions that are automatic formatting actions pertain to contextual data, so when a prior art feature that facilitates recovery from undesired interface interventions is used for recovery from an undesired automatic formatting action, it changes contextual data.

Many types of alterable decisions that are described herein pertain to contextual data, so in some embodiments, the interface has mistake correction features that facilitate changing contextual data that is not as desired, even when that contextual data was not the outcome of an undesired automatic formatting action. For example, in an embodiment, in certain circumstances a user may be able to change the location of text by altering an "alterable navigation decision"; in an embodiment, in certain circumstances a user may be able to change a font by altering an "alterable format decision"; in an embodiment, in certain circumstances a user may be able to change capitalization by altering an "alterable capitalization decision"; and so forth. In the following paragraphs, where various categories of alterable interface decisions are described, it is to be understood that certain of these categories of alterable interface decisions may pertain to contextual data in certain circumstances.

Alterable Decisions that Facilitate Mistake Correction

Certain broad categories of alterable interface decisions are explained below: broad categories of alterable interface decisions pertaining to interface choices are explained, and then broad categories of alterable interface decisions pertaining to user choices are explained. Specific types of alterable interface decisions are explained in detail in the following chapters.

In an embodiment, "interface choices" as described above will generally be alterable decisions.

In particular, in an embodiment, in certain circumstances, when the interface performs an interface interpretation as defined above, its decision regarding how to interpret the user's input may be an "alterable interpretation decision." Chapter 26 describes alterable transcription decisions, which are alterable interpretation decisions.

In an embodiment, in certain circumstances, when the interface makes an interface assumption as defined above, the outcome of the assumption may be an "alterable interface assumption," which is an alterable interface decision such that altering the decision will cause the interface to retroactively make a different assumption. For example, Chapter 36 describes an embodiment where if a user types "12/31" into a cell and the interface makes an assumption regarding what year should be included in that date, in certain circumstances its assumption will be alterable.

In an embodiment, when the interface performs an interface intervention as defined above, its decision to do so will be an "alterable intervention decision." Additionally, in an embodiment, in certain circumstances, when the interface decides not to perform an interface intervention, its decision to not perform the interface intervention also may be an "alterable intervention decision." The latter type of alterable intervention decision may facilitate correcting mistakes that prior art interfaces generally do not facilitate correcting: for example, in various prior art word processor interfaces, if a user types "1st" and an autocorrection feature automatically converts the letters "st" to a superscript font then certain interface features may facilitate quickly undoing the conversion to the superscript font, but if the user forgets he has disabled that autocorrection feature and types "1st" with the incorrect expectation that the interface will automatically convert the letters "st" to a superscript font then the interface will not especially facilitate the desired conversion to the superscript font; whereas in an embodiment of the present invention, if the interface alterably decides not to convert the letters "st" to a superscript font, then the user may be able to quickly change this decision by means of alteration functionality.

In an embodiment, in certain circumstances, when the interface makes an interface operation decision as defined above, its decision may be an alterable decision. This may be advantageous even if the decision is controlled by a simple setting, since it is reasonably common for a user to forget the current value of a relevant setting, but this may be especially advantageous if the algorithm for the decision is relatively complex, because then a user may be likely to perceive the outcome of the decision as caused by the interface and thus may be particularly frustrated with the interface if the decision has an undesired outcome that is not easy to correct quickly. For example, Chapter 50 describes an embodiment where an interface decision regarding whether to display the answer to a calculation as a decimal or as a fraction is an alterable decision; this may be advantageous even if a simple setting determines how the answer is displayed, but may be especially advantageous if the algorithm that determines how the answer is displayed is too complex for most users to understand.

In an embodiment, in certain circumstances the interface may determine that is reasonably likely that user choices included a particular mistake, and will make an alterable decision such that if that mistake did indeed occur then altering the decision will correct the mistake. Two categories of alterable decisions that may facilitate correcting mistakes pertaining to user choices are described in the following paragraphs.

In an embodiment, in certain circumstances the interface will determine that it is reasonably likely that the user forgot that a certain denotation would not currently achieve a certain desired result and thus made a mistake, and so the interface will make an alterable decision such that altering the decision may correct such a mistake. In particular, in an embodiment, when a user performs a denotation override, the interface's decision whether to invoke the special effect of the denotation override or the obvious effect of the denotation override is an "alterable invocation decision." In such an embodiment, if a user attempts to achieve the result that would be the obvious effect of the denotation override but forgets that the denotation override will instead yield a special effect and so receives an undesired result, or if the user attempts to achieve the result that would be the special effect of the denotation override but for some reason the denotation override instead yields its obvious effect, then the user may be able to correct such a mistake by means of alteration functionality. For example, in an embodiment that is described in Chapter 28, an interface decision to invoke a verbal command rather than transcribing text may be an "alterable command recognition decision," which is a type of alterable invocation decision, so if a user carelessly attempts to dictate text that constitutes a recognized verbal command, then the user may be able to correct the resulting mistake by means of alteration functionality.

In an embodiment, in various circumstances the interface will determine that it is reasonably likely that the user may be mistaken about the current context, so if the user then enters input without first changing the context, then the interface will make an "alterable context decision" such that altering the decision will change the contextual data for the input the user thus entered so as to possibly correct a user mistake. Alterable context decisions are generally alterable input state decisions as explained in Chapter 15, which means that after the interface makes an alterable context decision, the alterable block of such a decision may continue to grow as the user types additional characters that are affected by the context. As an exception, alterable capitalization decisions as described in Chapter 32 are not alterable input state decisions. Many types of alterable context decisions are explained in the following chapters, including alterable context decisions that pertain to input cursor location (in Chapter 37), font (in Chapter 34), Caps Lock status (in Chapter 33), and more.

Other Useful Situation-Specific Features

Although alteration functionality is often associated with mistake recovery in the present specification, it is to be understood that alteration functionality need not be exclusively used for mistake recovery. Even if a particular type of alterable decision is associated with a potential mistake, this does not necessarily mean that a user must actually make a mistake in order to find it desirable to alter that type of decision: a user may find that deliberately making a "mistake" and then altering an alterable interface decision may be an efficient way to achieve a desired outcome.

In an embodiment, certain alterable decisions are "convenience alterable decisions" that are not necessarily associated with interface attempts to detect potential mistakes. In particular, in an embodiment, in certain circumstances the interface will make an "alterable allocation decision" such that altering the decision will change the current context or change contextual data in a way that may be convenient for the user. For example, in an embodiment that is described in Chapter 34, even when the interface has not detected any potential mistakes pertaining to the font, a user may generally be able to change the current font by means of alteration functionality, and a user may generally be able to change the font of previously entered text by selecting the text and then actuating the alteration key. In other embodiments, altering an alterable allocation decision may change the cursor location, or the document that is currently active, and so forth.

Part III not only includes explanations of many types of alterable decisions, but also includes explanations of various other features, such as complex and intelligent decision functions, and such as new types of denotation overrides, interface assumptions, and interface interventions. Such features may be advantageous even in an embodiment that does not have alteration functionality. However, improved mistake recovery functionality may increase the relative advantageousness of complex and intelligent interface behaviors, as is discussed in Chapter 16, and so there is a synergy between alteration functionality and the various features that are described in Part III that do not inherently pertain to alteration functionality.

For example, in various prior art interfaces, when a user clicks a location that is between two words that are in different fonts and so the interface moves the input cursor to that location, the interface will switch the active font so that it matches the font of the character immediately to the left of the input cursor. In an embodiment that is described in Chapter 34, when a user clicks between two words that are in different fonts, the interface may make a potentially alterable decision such that if a user types some text before realizing which font the interface chose then the user may be able to correct any resulting mistake by means of alteration functionality. Also, in an embodiment that is described in Chapter 34, when a user clicks between two words that are in different fonts, the interface will decide which font becomes the active font by means of an algorithm that is more complex than simply matching the font on the left; such behavior may be advantageous even in an embodiment that has no alteration functionality, but may be more advantageous in an embodiment where the interface's decision is an alterable decision so that it if the interface does not choose the font the user wants then the user may be able to correct the resulting mistake by means of alteration functionality.

How Alterable Decisions are Described

In Part III, the present specification will explain various types of alterable interface decisions in sufficient detail that it will be clear how to apply to each of these types of alterable interface decisions the features that are described above that pertain to alterable decisions. In order to fully explain each particular type of alterable interface decision, the present specification may explicitly or implicitly define the circumstances in which the interface will make such an alterable interface decision, the options that will exist for such a decision, and which option will be initially selected or the method by which the interface will decide which option will be initially selected. The present specification may also describe how a probability of alteration will be assigned to such a decision and/or how probabilities of alteration will be assigned to the individual alternate options of the decision.

In some cases, the present specification will explicitly specify the initially selected option of an alterable interface decision, but will not explicitly specify what alternate options exist for the decision; in such cases, the alternate option or options will be clearly implied. For example, if the present specification were to say, "When a user types 'tuesday' the interface will make an alterable decision to capitalize this word," then such a sentence would explicitly specify that the initially selected option of the decision is an option such that the word "tuesday" becomes capitalized while clearly implying that the decision's only alternate option is an option such that the word "tuesday" is not capitalized.

In some cases, the present specification will not explicitly specify the initially selected option of an alterable interface decision, but will instead imply that the initially selected option is to not modify the user's input in any way. For example, if the present specification were to say, "When a user types 'tuesday' the interface will make an alterable decision such that altering this decision will cause the interface to capitalize the word 'tuesday,'" then it would be implied that the initially selected option of this decision is an option such that the interface does not capitalize the word "tuesday." When the present specification explains an alterable interface decision in terms of specifying the effect that will occur when a particular alterable interface decision is altered, it is to be understood that such an effect will not occur when altering the decision causes the default option to become selected again. For example, if the present specification were to say, "When a user types 'tuesday' the interface will make an alterable decision such that altering this decision will cause the interface to capitalize the word 'tuesday,'" then this would mean that the interface will capitalize the word if the decision is altered so that its alternate option becomes selected, but would not mean that the interface will capitalize the word if the decision is altered a second time so that its default option becomes selected again: on the contrary, if the decision is altered a second time, the interface will revert the word to lowercase.

In some cases, where prior art teaches how an interface can make a particular type of interface decision, the present specification may explain how to make such a decision become an alterable decision without specifying the method by which the interface will decide which option is initially selected. In such cases, it is to be understood that the interface can make its initial decision by the same method that a prior art interface would use to make such a decision. For example, in certain prior art interfaces, when a user types "tuesday" the interface will automatically capitalize the word "tuesday" if and only if a formatting option such as "Capitalize names of days" is currently selected, so if the present specification were to say, "When a user types 'tuesday' the interface's decision whether or not to automatically capitalize this word will be an alterable interface decision," then those who are familiar with prior art would understand that one possible method by which the interface can decide which option of such a decision is initially selected is that the interface can initially decide to automatically capitalize the word "tuesday" if and only if the formatting option "Capitalize names of days" is currently selected. Even where the present specification explicitly specifies a method by which the interface may decide which option of a particular type of alterable decision is initially selected, it is to be understood that in an alternative embodiment, the interface will make its initial decision by the same method that a prior art interface would use to make such a decision; such an alternative embodiment may still have significant advantages over prior art with respect to such a decision, by virtue of making the decision be an alterable decision.

In some cases, the present specification will specify a probability of alteration that may be assigned to an alterable decision and/or to the options of the decision, or specify a possible method for determining what probability of alteration to assign to an alterable decision and/or its options. Generally, descriptive language such as "high probability of alteration" and "low probability of alteration" will be used, rather than numeric quantities or formulas. Those of ordinary skill in the art will understand how to implement probabilities of alteration based on such descriptive language; in particular, those of ordinary skill in the art will understand how to implement probabilities of alteration in terms of numeric quantities in such a way that an alterable decision that is said to have a "high probability of alteration" will have a probability of alteration with a greater numeric value than a decision that is said to have a "low probability of alteration." The probabilities of alteration that are specified herein are intended as examples of probabilities that may be appropriate, but are not intended to be definitive: it is to be understood that alternative embodiments are possible in which alterable decisions have different probabilities of alteration than those specified herein, or which lack the alteration probability feature altogether. Where the present specification does not specify a probability of alteration that may be appropriate for an alterable decision, those of ordinary skill in the art will understand that a moderate probability of alteration or some other probability of alteration may be assigned to such a decision.

In some cases, the present specification will not be exhaustively precise in its explanation of a particular type of alterable decision. For example, in some cases, the present specification will not explain the precise details of how the interface will decide which option is initially selected in certain situations; in other cases, the present specification will not explain the precise details of how the interface will assign a probability of alteration in certain situations. Generally, where such ambiguity occurs, the particular details can easily be filled in by those of ordinary skill in the art, and are not necessarily essential details in any case. For example, in Chapter 32, the present specification explains that in an embodiment, in certain circumstances the initially selected option of an alterable decision regarding whether or not to capitalize the word after an abbreviation will depend on a capitalization score that is assigned to the abbreviation in a table of abbreviations. The present specification does not provide any such table of abbreviations with their corresponding capitalization scores, but those of ordinary skill in the art will understand how to create a reasonably comprehensive table of abbreviations and come up with capitalization scores that are reasonably appropriate, and the exact capitalization scores that are assigned to the abbreviations in such a table may not be especially important: in an embodiment, capitalization mistakes will generally be easy to correct, and each abbreviation will correspond to a distinct adaptive decision class so the interface will eventually be able to determine based on usage which abbreviations are usually followed by capitalized words and which are not.

In an embodiment, distinct adaptive decision classes will exist for various distinct circumstances described below in which the interface makes an alterable decision. For example, if the present specification were to say, "In an embodiment, the interface will make an alterable decision to automatically convert a numeral that is after a variable into an exponent," then this would also mean that in an embodiment, all such decisions are adaptive decisions of the same adaptive decision class. In some cases, the present specification will specify additional details regarding how a particular alterable decision class can be made to be an adaptive decision class; for example, the present specification describes an embodiment in which the interface may decide whether or not to automatically switch from degree mode to radian mode or vice versa, and explains in detail how the interface may automatically adjust its own settings pertaining to such decisions. In most cases, though, the present specification will not separately explain for each individual type of alterable decision how to make that type of decision be an adaptive decision; in Part II, the initial definition of adaptive decisions is followed by an extensive discussion of how to make alterable decisions be adaptive decisions, and it is not necessary to provide additional details for each individual type of alterable decision.

The present specification will explain various types of alterable interface decisions in enough detail to apply various above-described features that pertain to alterable decisions to each of these types of alterable interface decisions, but it is to be understood that a particular embodiment need not necessarily include all the above-described features that pertain to alterable decisions, and so some of the details provided below may not be relevant for some embodiments. For example, if the present specification provides details regarding how to determine the alternate options for some type of alterable interface decision, then those particular details may not be relevant for an embodiment that highlights alterable decisions as potential mistakes but does not actually facilitate alteration of such decisions and does not keep track of alternate options for such decisions. Furthermore, it is to be understood that a particular embodiment need not necessarily include all the types of alterable interface decisions that are described below.

In various places, the present specification will explain a type of alterable interface decision and then give an example that illustrates a possible advantage of making such an interface decision be alterable. In many cases, such an example will say that after the interface makes some particular type of alterable decision, a user can actuate the alteration key once to change the outcome of the decision. In such cases, the example thus assumes for the sake of illustration that an alteration key is available, and that a first actuation of the alteration key will alter the alterable decision that is explicitly mentioned in the example rather than perhaps altering some other alterable decision that happens to be more relevant. Such assumptions are intended for illustrative purposes only: it is to be understood that it may also be advantageous to make interface decisions be alterable in an embodiment that does not have an alteration key, and it may be advantageous to make interface decisions be alterable in an embodiment where a first actuation of the alteration key does not necessarily alter the most recent alterable decision.

Chapter 25: Spoken Alteration Commands

Spoken Alteration Commands

For the most part, the present specification can be divided into three large sections with distinct emphases: the first two large sections explain various features that interact with alterable interface decisions, and the third large section explains various types of alterable interface decisions. However, the following discussion of features pertaining to speech recognition includes both emphases: the present chapter explains spoken commands for interacting with alterable interface decisions, and then the following chapters explain various types of alterable interface decisions that pertain to speech recognition.

Below, certain circumstances are explained in which the interface will alter a decision that fits certain criteria, in some embodiments. Generally, as is explained in Chapter 2, if a user causes the interface to alter a decision that fits certain criteria, then the interface will alter the most relevant decision that fits those criteria, except that if a user performs an action that causes the interface to alter a decision more than once consecutively, then in certain circumstances, later consecutive actions will alter less relevant decisions.

For purposes of the following paragraphs, an "utterance" that invokes an interface command consists of a sequence of spoken words that are immediately preceded and immediately followed by at least a brief pause, even in an embodiment that continuously reacts to what a user says. For example, the behavior described in the following paragraph is not applicable when a user happens to say the word "alter" in the middle of a sentence, with no pause before or after the word "alter." However, an "utterance" that is transcribed as text need not be preceded or followed by a pause.

In an embodiment of the present invention, in response to either the utterance "Alter" or the utterance "Oops," the interface will alter a decision. For example, in such an embodiment, if a user pasted the word "defense" into a document and the interface made an alterable decision to cause the formatting of the pasted text to match the surrounding formatting, and if this decision is the currently alterable decision, then the user can alter this decision by saying "Alter" or by saying "Oops." If such an embodiment also has eye tracking technology that is capable of determining somewhat accurately where the user is looking, and if the embodiment has the feature described in Chapter 13 such that looking at an alterable block may cause the interface to increase that alterable decision's relevance, then in many cases a user may be able to correct a mistake simply by looking at the mistake and saying "Oops."

In an embodiment, in response to an utterance consisting of the word "Alter" followed by a verbal description of the contents of an alterable block, the interface will alter an alterable interface decision whose alterable block was thus verbally described. For example, in an embodiment, if the user pasted the word "defense" into a document and the interface made an alterable decision to cause the formatting of the pasted text to match the surrounding formatting, then the user can alter this decision by saying, "Alter 'defense'" (unless a more relevant alterable decision also has an alterable block consisting of the word "defense").

In an embodiment, in response to an utterance consisting of the word "Alter," followed by a verbal description of the contents of an alterable block, followed by the word "to," followed by a verbal description of an alternate option, the interface will select such an alternate option for the most relevant alterable interface decision that has an alterable block that was thus verbally described and has an alternate option that was thus verbally described. For example, in an embodiment, if a user pasted the word "defense" into a document and the interface made an alterable decision to cause the formatting of the pasted text to match the surrounding formatting, the user may be able to alter this decision by saying, "Alter 'defense' to keep source formatting."

In an embodiment, in response to an utterance consisting of the word "Oops" followed by a verbal description of an alternate option of an alterable interface decision, the interface will select such an alternate option for the most relevant alterable interface decision that has an alternate option that was thus verbally described. For example, in an embodiment, if the user pasted the word "defense" into a document and the interface made an alterable decision to cause the formatting of the pasted text to match the surrounding formatting, the user may be able to alter this decision by saying, "Oops keep source formatting."

In an embodiment, if while a user is holding down the alteration key the user speaks a verbal description of an alternate option of an alterable interface decision, the interface will respond as though the user had said "Oops" before describing that alternate option. For example, in an embodiment, if the interface has made an alterable decision to cause the formatting of pasted text to match surrounding formatting, the user may be able to alter the decision by holding down the alteration key and saying "Keep source formatting."

Follow-Up to Spoken Alteration Commands

The following paragraphs describe various commands that may be useful immediately after the user has spoken a verbal command that caused the interface to alter an alterable interface decision as described above. In the following paragraphs, the phrase "after a spoken alteration command" refers to any time when the most recent user action was an utterance that caused the interface to alter an alterable interface decision as described above, or as described in the following paragraphs. After a spoken alteration command, "the altered decision" is the decision that the interface altered in response to that command.

In an embodiment, after a spoken alteration command, the interface will not yet consider the user to have explicitly selected an option of the altered decision until the user performs some other action, and thus will not yet drastically reduce the probability of alteration of that decision; for example, after a user says "Alter 'defense' to keep source formatting," the alterable decision may still have a high probability of alteration until the user performs another action. This may be useful because occasionally a verbal command that causes the interface to alter an alterable interface decision as described above may not have the effect that was actually desired.

In an embodiment, after a spoken alteration command, the command "again" will have the same effect that repeating the previous utterance would have.

In an embodiment, after a spoken alteration command, in response to the utterance "Alter it to" followed by a verbal description of a different alternate option of the altered decision, the interface will select that alternate option of the altered decision. In an embodiment, such an utterance will have the same effect if the phrase "Alter it to" is replaced with any of the following phrases: "No, alter it to"; "Alter that to"; "No, alter that to"; or simply "No." For example, in an embodiment, if the interface makes a multi-alternative decision to interpret a spoken word as "to" rather than as "two" or "too," and the user says "Alter 'to'" and the interface selects the option "two," then the user may be able to convert this result to "too" by saying, "No, alter it to 'too' with two O's."

In an embodiment, after a spoken alteration command, in response to the utterance "No," the interface will explicitly select the default option of the altered decision. In an embodiment, after a spoken alteration command, in response to the utterance "No, not that one" or the utterance "No, the other one," the interface will explicitly select the default option of the altered decision, and then if the user's previous utterance could have been interpreted as a command to alter some other alterable decision, then the interface will alter the most relevant such decision; for example, in an embodiment, if two different alterable decisions both happen to have an alterable block consisting of the word "defense" when a user says "Alter 'defense'" and the interface alters one of these alterable decisions, then if the user then says, "No, not that one," then the interface will revert the decision it altered and alter the other one.

In an embodiment, after a spoken alteration command, in response to the utterance "Good," the interface will drastically reduce the probability of alteration of the altered decision. In an embodiment, when the most recent user action was not an utterance that caused the interface to alter an alterable interface decision, in response to the utterance "Good," the interface will drastically reduce the probability of alteration of every highlighted alterable decision.

Verbal Descriptions of Alternate Options

In an embodiment, for purposes of any verbal commands that cause the interface to select an alternate option of an alterable interface decision as described above, an alternate option of an alterable interface decision may have multiple descriptions. Generally, it may be advantageous for an interface designer to include a very wide variety of possible verbal descriptions for alternate options of alterable interface decisions, in an attempt to make it likely that any user who attempts to alter an alterable interface decision by means of a verbal command will be able to do so even if the user has no prior knowledge regarding what verbal descriptions of a particular alternate option the interface will recognize. For example, if the interface has made an alterable decision to cause the formatting of pasted text to match surrounding formatting, some users may find it relatively intuitive to alter such a decision by saying "Oops keep source formatting" but other users may find it more intuitive to say "Oops with the original format"; in an embodiment, either utterance will have the desired effect.

In an embodiment, for certain alterable decision classes, verbal descriptions of options of a decision of that class will depend on the particular details of the decision. For example, in an embodiment, when the interface makes an alterable decision whether or not to cause the formatting of pasted text to match surrounding formatting, if there is at least one format attribute such that altering the decision will cause that format attribute to change throughout the entire alterable block, then for each such format attribute the interface will create a corresponding verbal description of the alternate option of the decision; for example, if altering the decision would change the entire alterable block from black text to blue text, then in an embodiment, a user will be able to alter the decision by saying "Oops blue."

Generally, speech recognition technology makes use of extensive records regarding what phrases are commonly spoken by a particular user, and what phrases are commonly spoken by users in general, so as to be biased in favor of interpreting a particular utterance as a commonly spoken phrase if possible, rather than interpreting it as a rarely spoken phrase. In some embodiments of the present invention, a single alternate option of an alterable decision may have a wide variety of verbal descriptions, so when the interface has made an alterable decision, there may be many phrases that a user could say to select a particular alternate option of that decision. In an embodiment, the interface will make use of extensive records regarding which particular descriptions of alternate options of alterable decisions are commonly used by a particular user, and which particular descriptions of alternate options of alterable decisions are commonly used by users in general, so as to be somewhat biased towards interpreting a particular utterance as text to be transcribed rather than as a spoken alteration command if the spoken alteration command would include a rarely used description of an alternate option of an alterable decision, but not if it would include a commonly used description of an alternate option of an alterable decision. (Decisions regarding whether to interpret an utterance as a verbal command or as text to be transcribed are described in Chapter 28, which also discusses other circumstances in which the interface may introduce a transcription bias.)

Attribute-Based Verbal Descriptions

In an embodiment, the interface not only recognizes verbal descriptions of the individual alternate options of alterable interface decisions, but also may recognize verbal descriptions of specific attributes of the alterable block of an alterable interface decision that will change if the decision is altered so that a particular alternate option becomes selected. For example, in an embodiment, when the interface makes an alterable decision to cause the formatting of pasted text to match surrounding formatting, it will recognize that "formatting" is a verbal description of an attribute that will change if the decision is altered, and if for example altering the decision would change the entire alterable block from black text to blue text, then in an embodiment, the interface will recognize that "color" and "text color" are verbal descriptions of an attribute that varies between the options of that alterable decision. In the following paragraphs, a verbal description of an attribute that varies between the options of an alterable interface decision will be referred to as a "verbal attribute description."

In an embodiment, in response to an utterance consisting of the word "Oops" followed by a verbal attribute description, the interface will alter the most relevant alterable interface decision that such a description pertains to, and will alter it in such a way that the specified attribute is changed. For example, in an embodiment, if altering a decision would change the entire alterable block from black text to blue text, then a user will be able to alter the decision by saying "Oops formatting" or "Oops color." If merely altering such a decision once would not cause the specified attribute to change, then the interface will alter that decision sufficiently many times to cause that attribute to change; for example, if selecting a first alternate option of an alterable interface decision would change only the foreground color of the alterable block and selecting a second alternate option of that alterable decision would change only the background color, then saying "Oops background color" will cause the interface to select that second alternate option.

In an embodiment, in response to an utterance consisting of the word "Alter" followed by a verbal description of the contents of an alterable block followed by a verbal attribute description, the interface will alter the most relevant alterable interface decision that has an alterable block that was thus verbally described and that such a verbal attribute description pertains to, and will alter it in such a way that the specified attribute is changed. For example, in an embodiment, if the user pasted the word "defense" into a document and the interface made an alterable decision to cause the formatting of the pasted text to match the surrounding formatting, the user may be able to alter this decision by saying, "Alter 'defense' formatting."

Chapter 26: Alterable Transcription

Verbal Blocks

Below, the present specification explains various interface features that, in some embodiments, may facilitate correcting mistakes made by speech recognition technology that transcribes spoken text.

In the following paragraphs, a "sequence of phonemes" may consist of only a single phoneme, and a "sequence of words" may consist of only a single word, and so forth.

In an embodiment, for purposes of the transcription-related interface behaviors described below, a punctuation character constitutes a "word." For example, if a user says "yes colon" and the interface transcribes this as "yes:", then the colon character is considered to be the second word of the resulting transcribed text for purposes of the transcription-related interface behaviors described below.

Below, a "phonetic block" is data that represents a sequence of consecutive phonemes. A phonetic block may include data indicating multiple possibilities for phonemes that have not been identified with complete confidence; for example, if a user says "red" and speech recognition technology generates a phonetic block that represents the outcome of its attempt to identify the phonemes the user spoke, then this phonetic block may include data that indicates that the speech recognition technology is uncertain whether the last phoneme the user spoke was a D sound or a T sound. A "phonetic input block" is a phonetic block that represents something a user just said, which speech recognition technology is processing.

Below, a "plain audio block" is data pertaining to audio input that does not include data regarding what phonemes are contained in the audio input, and does not include data regarding what words best match the audio input. When speech recognition technology "phonetically analyzes" a plain audio block, this means that it attempts to identify the phonemes that are included in the plain audio block and generates a phonetic block that represents the outcome of this attempt. (By this definition of a "plain audio block," if speech recognition technology attempts to filter out background noise before phonetically analyzing audio input, the filtered audio input is still a "plain audio block" after the background noise is filtered out.) An "audio block" is either a plain audio block or a phonetic block. A "plain audio input block" is a plain audio block that represents something a user just said, which speech recognition technology is processing; an "audio input block" is an audio block that represents something a user just said, which speech recognition technology is processing.

Below, a "plain text block" is a sequence of words that is represented in computer memory as text. When speech recognition technology "phonetically analyzes" a plain text block, this means that it identifies possible pronunciations of the plain text block and generates one or more phonetic blocks that represent possible pronunciations. A "text output block" is a plain text block that was generated by transcription; for example, if a user inputs "I told" by means of a keyboard and then inputs "you two" by means of transcription technology, then the entire phrase "I told you two" is a plain text block, but only the words "you two" are a text output block.

Below, a "verbal block" is any block of data that can be interpreted as representing a sequence of consecutive phonemes. Phonetic blocks are verbal blocks, because they directly represent sequences of consecutive phonemes. Plain audio blocks and plain text blocks are also verbal blocks, because they can be phonetically analyzed and thus converted to phonetic blocks.

Below, a "portion" of a verbal block is a contiguous portion of the verbal block that includes a representation of at least one phoneme. (A portion of a verbal block is thus itself a verbal block.) A "subportion" of a verbal block is any portion of the verbal block other than the entire verbal block. A "beginning subportion" of a verbal block is a subportion that includes at least the beginning of the verbal block; a "beginning portion" of a verbal block is either a beginning subportion or the entire verbal block. For example, the plain text block "you" is a beginning subportion of the plain text block "you two." Likewise, if a phonetic block represents the phonemes that are in the words "you two," then the portion of the phonetic block that represents only the phonemes in the word "you" is a beginning subportion of the phonetic block.

Processing Verbal Blocks

Below, "phonetically scoring" a first verbal block with respect to a second verbal block consists of algorithmically attempting to determine how plausible it is that the two verbal blocks represent the same sequence of phonemes. A "phonetic score" is a number that represents how plausible it is that two verbal blocks represent the same sequence of phonemes, insofar as the speech recognition technology is able to make such a determination. Whenever speech recognition technology is said to "phonetically score" a first verbal block, if no second verbal block is specified such that the first verbal block is phonetically scored with respect to the second verbal block, then is to be understood that the technology phonetically scores the first verbal block with respect to the current audio input block.

Below, the "contextual score" or simply "score" of an interpretation equals its phonetic score with respect to the audio input block plus any additional bonuses or penalties that are based on non-phonetic factors (such as, for example, whether or not the words of the interpretation are common English words). "Contextually scoring" an interpretation consists of calculating its contextual score.

Below, "comparing" two verbal blocks consists of phonetically scoring one of the verbal blocks with respect to the other. Two verbal blocks are said to be "compatible" or "completely compatible" if their phonetic score exceeds a certain threshold, so that it is at least somewhat plausible that the two verbal blocks represent the same sequence of phonemes; they are "incompatible" otherwise. For example, if three phonetic blocks contain data that was generated after a user said "red" and "Rhett" and "fool" (respectively), then the first two phonetic blocks may be compatible if the speech recognition technology was unable to conclusively identify the final consonants of "red" and "Rhett," but the third phonetic block will almost certainly be incompatible with both of the other two. In an embodiment, in certain circumstances the interface may compare plain text blocks; for example, the interface may compare the words "reed" and "read" and determine that they are compatible. In an embodiment, compatibility is not transitive: that is, if two verbal blocks are both compatible with the same third verbal block, this does not necessarily mean the two verbal blocks are compatible with each other; for example, if phonetic blocks containing the words "reed" and "red" are both compatible with the plain text block "read," this does not mean those phonetic blocks are compatible with each other.

Below, if a first verbal block is said to be "incompletely compatible" with a second verbal block, then this means that the first verbal block is compatible with a beginning subportion of the second verbal block. (In other words, this means that the first verbal block is shorter than the second verbal block, and the first verbal block may represent the same sequence of phonemes that is at the beginning of the second verbal block.) That beginning subportion of the second verbal block is the "compatible subportion" of the second verbal block, and the remainder of the second verbal block is the "incompatible subportion." For example, a plain text block consisting of the word "you" is incompletely compatible with a phonetic block the represents the words "you two"; the subportion of the phonetic block the represents the word "you" is the compatible subportion, and the subportion that represents the word "two" is the incompatible subportion. A first verbal block is "left-compatible" with a second verbal block if either it is incompletely compatible with the second verbal block or it is completely compatible with the second verbal block.

In an embodiment, when speech recognition technology determines that two verbal blocks are compatible, in certain circumstances the interface will "associate" the two verbal blocks. In particular, in certain circumstances the interface will associate a plain text block with an audio block; for example, in an embodiment, the interface may associate the plain text block "you two" with the plain audio block that it transcribed as "you two." In certain circumstances the interface will "dissociate" two verbal blocks that it had previously associated, which means they will no longer be associated. In an embodiment, association is not transitive: that is, if one verbal block is associated with two other verbal blocks, this does not necessarily mean those two other verbal blocks are associated with each other.

In order for speech recognition technology to determine that two verbal blocks are compatible, it will necessarily determine which portions of the two verbal blocks contain corresponding phonemes. In an embodiment, when speech recognition technology determines that two verbal blocks are compatible and associates the two verbal blocks, it will output data that indicates which portions of the verbal blocks contain corresponding phonemes. In an embodiment, the interface will retain such data so that if it later determines a subportion of one of the two verbal blocks then it can accordingly determine the corresponding subportion of the other verbal block. For example, in an embodiment, if a user says "you two" but pronounces the words at different rates so that the word "two" is contained in the last 20% of the resulting plain audio block, and then the interface associates that resulting plain audio block with the plain text block "you two," then the interface will retain data regarding how the plain audio block lines up with the plain text block; later, if the interface determines a subportion of the plain text block that includes only "two," then that subportion will be associated with a subportion of the plain audio block that consists of the last 20% of the plain audio block.

Below, a "supplemented text block" is a plain text block that is associated with at least one verbal block. The "speech block" that is "associated with" a supplemented text block is the set of all verbal blocks that are associated with the plain text block. For example, in an embodiment, if a user dictates "you two," then the resulting plain text block "you two" is a supplemented text block that is associated with the audio block that was transcribed as "you two." When the interface "dissociates" a speech block from a supplemented text block, this means that the interface dissociates all of the speech block's verbal blocks from the plain text block.

When a supplemented text block is associated with an audio block, even when the interface retains data that indicates which portions of the two verbal blocks contain corresponding phonemes, this does not mean that each individual character of the supplemented text block necessarily corresponds to a specific portion of the audio block. For example, if a plain text block consisting of the words "these are" is associated with an audio block, then the letter H in the plain text block will not independently correspond to any specific portion of the audio block, because the two-letter sequence TH represents a single phoneme in this context. Below, a "text chunk" is the smallest portion of a supplemented text block that the speech recognition technology identifies as corresponding to a portion of an associated verbal block. Because a text chunk corresponds to a specific portion of a verbal block, a text chunk is by definition a supplemented text block. In various embodiments, text chunks may be different sizes, depending on the details of the speech recognition technology: when a user says "these are" and speech recognition technology outputs a plain text block containing the words "these are," the two-letter sequence TH may be a text chunk of the plain text block, or the entire syllable "these" may be a text chunk, or the entire text block "these are" may be the only text chunk if the speech recognition technology does not provide any additional information regarding what portions of its input and output contain corresponding phonemes.

In an embodiment, in certain circumstances, a plain text block may be "deprecated," which means that the interface has flagged that plain text block as probably including at least one mistake somewhere. If a plain text block is said to be deprecated, this does not mean that any subportion of the plain text block is deprecated, unless that subportion is also explicitly said to be deprecated.

About Speech Recognition Technology

Generally, in order to determine what a user said, speech recognition technology will phonetically analyze a plain audio block and score various interpretations with respect to the resulting phonetic block, and then if at least one interpretation is compatible with the phonetic block, the technology will select the interpretation that received the highest score. (The scoring referred to in the present paragraph may involve more than just phonetic scoring, as is explained below.)

In the preceding paragraph and below, an "interpretation" or "candidate sequence" is a plain text block that may represent what a user said in an audio input block. Below, the "correct interpretation" is whatever plain text would correctly represent what the user actually said. A "selected interpretation" is the interpretation that speech recognition technology selects as the best possible interpretation of what a user said in an audio block, whether or not that actually happens to be the correct interpretation. A "second-tier interpretation" is an interpretation that is compatible with an audio input block and receives a relatively high score but does not become the selected interpretation. In some cases the correct interpretation will be a second-tier interpretation. For example, if a user says "U2" but the speech recognition technology selects "you two" as the best possible interpretation of what the user said, then the correct interpretation is "U2" but the selected interpretation is "you two," and second-tier interpretations may include plain text blocks such as "you too," "you to," "U2," "you do," and so forth.

Generally, it is relatively easy for speech recognition technology to phonetically analyze a plain audio block and yield a phonetic block that is at least an approximately accurate representation of the phonemes the user actually intended to speak, and it is relatively easy for speech recognition technology to calculate a phonetic score that is at least an approximately accurate measure of how well the phonetic block matches a possible interpretation. As a result, whenever speech recognition technology is only required to distinguish between a relatively limited number of phonetically dissimilar candidate sequences of words, it is relatively easy for speech recognition technology to do so successfully: the technology can phonetically score every candidate sequence and then select the interpretation that receives the highest phonetic score. For example, when speech recognition technology is used only to identify a number that a user spoke, it is relatively easy for the technology to recognize, say, the difference between "two" and "three."

However, transcribing arbitrary text is a much more difficult task than just selecting the correct interpretation from among a relatively limited number of phonetically dissimilar candidate sequences of words, for several reasons. One difficulty is that speech recognition software cannot always identify spoken phonemes as precisely as a human listener, especially when the speaker is in a noisy environment, so phonetic blocks will not always be as precise as users may expect. For example, the present writer has found it common for speech recognition technology to mistake the D sound for the T sound. Another difficulty is that multiple interpretations may be phonetically quite similar. For example, when the phrase "be no more" achieves an extremely high phonetic score, the phrase "bee gnome ore" may achieve just as high a phonetic score. (As another example, when the present writer attempted to dictate the preceding sentence by means of speech recognition software, he inadvertently discovered that "just as high a score" is phonetically similar to "justice highest score.") Another difficulty is that in certain circumstances there will be far too many possible interpretations for speech recognition technology to actually score every possible interpretation. For example, if the technology has a vocabulary of even just a couple thousand words, then it can theoretically recognize trillions of possible four-word sequences, but it cannot individually calculate scores for trillions of candidate sequences every time a user speaks four words.

In prior art, developers of speech recognition technology have put a great deal of effort into dealing with the problems described in the preceding paragraph. In order to make it easier for speech recognition software to identify spoken phonemes, speech recognition technology may attempt to algorithmically isolate the speaker's voice from background noise. It may also keep track of a unique speech profile for each individual user so that it can learn from experience how each particular user typically pronounces various phonemes.

In order to cope with the fact that multiple interpretations may be phonetically quite similar, speech recognition technology may take the phonetic score for each interpretation and add to that score a bonus or penalty based on how common the interpretation's words and phrases are in English, thus calculating a "contextual score" as defined above, and the speech recognition technology may then choose its selected interpretation on the basis of these contextual scores. For example, speech recognition technology may assign the interpretation "these are" a higher contextual score than the interpretation "the czar" even when both interpretations achieve the same phonetic score, because the former phrase is more common in English than the latter; it may also assign "the czar of Russia" a higher contextual score than "these are of Russia," for similar reasons. An individual user's speech profile may also include data regarding how frequently that individual user speaks various words and phrases.

In order to cope with the fact that there may be too many possible interpretations for speech recognition technology to calculate a score for every possible individual interpretation, speech recognition technology may process phonemes sequentially rather than attempting to evaluate an entire lengthy audio block all at once. For example, if a user says "The czar of Russia abdicated in 1917," then speech recognition technology may process the phonemes from the words "the czar" before processing the phonemes from later words, and in processing these first few phonemes the technology may narrow down the possibilities for the first couple words of its transcription to a relatively small set of interpretations such as "these are" and "the czar" and even "these aardvarks." As speech recognition technology processes more phonemes, the variety of possible interpretations of the new phonemes naturally causes the number of possible interpretations to increase, but as speech recognition technology processes more phonemes it may continue to eliminate the possible interpretations that have the lowest scores thus far so as to limit the number of possibilities under consideration. For example, if a user says "the czar of Russia" and speech recognition technology processes the phonemes from the words "the czar" before processing the remaining phonemes, then by the time it has processed the phonemes from the words "of Russia" it will have eliminated "these aardvarks" from consideration (because "of Russia" sounds nothing like "dvarks"). At that point, its interpretation of "of Russia" may cause the interpretation of the first couple words as "the czar" to now achieve a higher score than the interpretation of those words as "these are." By the time the technology has finished processing the entire sentence, it may have eliminated "these are" from consideration as an interpretation of the first couple words.

Even though developers of speech recognition technology have put a great deal of effort into improving the ability of speech recognition technology to accurately transcribe arbitrary spoken text, such transcription technology is still notoriously mistake-prone.

Transcription Algorithms

In the present specification, a "transcription algorithm" is a speech recognition algorithm that can receive as input a single plain audio block that may represent arbitrary spoken text, process it, and either output a selected interpretation of the plain audio block or output the information that it was unable to find any candidate sequence of words that was compatible with the plain audio block.

It is very difficult to create a transcription algorithm that consistently does well at selecting the correct interpretation, for reasons such as those that are discussed above. A high-quality transcription algorithm may convert a plain audio block into a phonetic block in an extremely complex and sophisticated way, and may contextually score interpretations in an extremely complex and sophisticated way, and may determine which possible interpretations to actually score in an extremely complex and sophisticated way, but may still select an incorrect interpretation in many cases.

The present specification does not explain how to create a higher-quality transcription algorithm that does nothing except receive as input a single plain audio block and then output a single selected interpretation. Instead, the present specification explains how to make use of a transcription algorithm that can receive additional input and can provide additional output in order to facilitate correction of transcription mistakes. For example, the present specification explains how in an embodiment, the interface uses a transcription algorithm that not only outputs a selected interpretation but also outputs second-tier interpretations, so that when the interface displays text that is a selected interpretation it can facilitate replacing that text with one of the second-tier interpretations.

In the following paragraphs, the present specification will explain certain behaviors of a transcription algorithm that are used by some embodiments of the present invention. Generally, it is extremely desirable to use a high-quality transcription algorithm that does as well as possible at selecting correct interpretations, so for a speech recognition programmer who is creating or assisting in creating an embodiment of the present invention, it may be preferable to use the best transcription algorithm that the programmer has access to (and is able to modify) as the starting point for creating a transcription algorithm such as is described below. If a speech recognition programmer of ordinary skill in the art has access to a transcription algorithm that does not already behave as described below, then it will be possible for the programmer to modify the transcription algorithm in order to cause it to behave as described below, using only routine skills. For example, if a programmer has access to a transcription algorithm that does not output second-tier interpretations, then it will be a relatively simple matter for the programmer to modify the transcription algorithm so that it does output second-tier interpretations: the transcription algorithm already does determine various other possible interpretations in addition to the one that ends up becoming the selected interpretation, and already does contextually score them, so it is a simple matter to modify the transcription algorithm so as to output, say, all the other interpretations that contextually score at least 95% as high as the selected interpretation.

In an embodiment, when the transcription algorithm interprets an audio input block, it will not only output a selected interpretation but also inform the interface of any second-tier interpretations and how their contextual scores compared to the selected interpretation. For example, in an embodiment, if a user says "read" and transcription technology outputs the word "read," in certain circumstances the interface will be informed that the candidate word "reed" received a score that was almost as high as the word "read," and so the interface will cause the decision to transcibe the word as "read" rather than "reed" to be an alterable decision, as is explained below. In an embodiment, when the transcription algorithm would output a second-tier interpretation such that one or more words of the second-tier interpretation would correspond exactly to words of the preferred interpretation, the transcription algorithm will instead output only the subportion or subportions of the second-tier interpretation that differ from the preferred interpretation, along with information that indicates which subportions of the preferred interpretation correspond to these subportions of the second-tier interpretation. Such information may be useful for making transcription decisions be alterable, as is explained below. For example, in an embodiment, if the preferred interpretation is "to you two" and a second-tier interpretation is "to you too," and this second-tier interpretation achieved a score that was 99% as high as that achieved by the preferred interpretation, then the transcription algorithm will output information that indicates that a second-tier interpretation that achieved 99% as high a score as the preferred interpretation can be constructed by means of replacing the word "two" in the preferred interpretation with the word "too."

In an embodiment, the transcription algorithm will bias its interpretation of an audio block in various ways when it is so instructed by the interface, such as by adding bonuses or penalties when contextually scoring certain interpretations. For example, in an embodiment, in certain circumstances the transcription algorithm will bias its interpretation of an audio block against any interpretation that begins with the word "to," such as by reducing the score of any such interpretation by 20%.

In an embodiment, in circumstances that are described in the following chapter, the transcription algorithm will bias its interpretation of an audio input block in favor of an interpretation that is compatible with one or more other audio blocks that the user previously spoke; in an embodiment, to do so, rather than first calculating the score of an interpretation as normal and then increasing the score by a fixed amount or fixed percentage per each additional audio block that the interpretation is compatible with, the transcription algorithm will first calculate a biased phonetic score and then add bonuses or penalties to calculate the contextual score as normal. In an embodiment, for purposes of the preceding sentence, the interface calculates the "biased phonetic score" of an interpretation by first calculating the interpretation's phonetic score with respect to each audio block involved, including the audio input block, and then determining the weighted average of these phonetic scores, with the phonetic score with respect to the audio input block receiving twice as much weight as the phonetic score with respect to each of the other audio input blocks; for example, in order for the transcription algorithm to bias its interpretation in favor of an interpretation that is compatible with one previously spoken audio block, the phonetic score of each interpretation will equal two-thirds of its phonetic score with respect to the audio input block plus one third of its phonetic score with respect to the previously spoken audio block.

The transcription-related interface behaviors that are described below will not all require the interface to make use of a transcription algorithm that behaves in all the ways that are described in the preceding paragraphs. For example, an embodiment may include alterable capitalization of transcribed text as described farther below while making use of a transcription algorithm that does nothing except receive a single block of raw audio input and then output a single selected interpretation.

Alterable Transcription

In an embodiment, when a user dictates text that the interface transcribes, certain of the interface's decisions regarding how to convert the user's speech into text are alterable decisions. Such decisions are referred to herein as "alterable transcription decisions."

In an embodiment, when the transcription algorithm interprets spoken text and informs the interface of second-tier interpretations of the text, the interface will accordingly create an alterable transcription decision or decisions with those second-tier interpretations as alternate options. In an embodiment, the transcription will also inform the interface of how the scores of the second-tier interpretations compared to the score of the selected interpretation, and the interface will use this information in determining appropriate probabilities of alteration to assign to the alternate options of the alterable transcription decisions, according to the principles described in the explanation of alterable score-based decisions in Chapter 3, so that if a second-tier interpretation's score was extremely close to the score of the selected interpretation then the probability of alteration of the alternate option associated with that second-tier interpretation will be very high. In an embodiment, when the transcription algorithm informs the interface that a second-tier interpretation corresponds to a subportion of the selected interpretation, that subportion of the selected interpretation will accordingly be the initial alterable block of the corresponding alterable transcription decision (rather than the entirety of the selected interpretation being its alterable block). For example, in an embodiment, if a user says something that the interface interprets as "You two were crazy!," various alterable transcription decisions may exist with various alterable blocks: it may be possible to alter "two were" to yield "tour," alter "two" to yield "too," alter "!" to yield "exclamation point," and so forth.

In an alternative embodiment, rather than making use of data regarding second-tier interpretations that is provided by the transcription algorithm, the interface will determine what transcription decisions to make alterable by consulting a dictionary of common transcription mistakes. For any word or phrase in the dictionary of mistakes, if that word or phrase is present in a selected interpretation, then the interface will cause its decision to output that particular word or phrase (as opposed to some other word or phrase) to be an alterable transcription decision as specified in the dictionary. For example, the dictionary of common transcription mistakes may indicate that a user of transcription technology who receives the result "read" may frequently prefer the result "red" and occasionally prefer the result "reed," in which case whenever the interface transcribes a word as "read" its decision to do so will be an alterable transcription decision that has the alternate options "red" and "reed," and the alternate option "red" will have a higher probability of alteration than the option "reed."

In another alternative embodiment, whenever the transcription algorithm outputs a selected interpretation, for any portion of the selected interpretation such that the transcription algorithm indicates that it had relatively low confidence in its interpretation of the corresponding portion of audio input, that portion of the selected interpretation constitutes the alterable block of an alterable transcription decision whose alternate option is an undefined option. (Such interface behavior may be particularly advantageous if the interface programmer chooses to make use of a transcription algorithm that tells the interface how confident it is in its interpretation of spoken text but does not inform the interface of any second-tier interpretations. In particular, Microsoft's speech recognition API enables programmers who make use of the API to access information regarding what the speech recognition technology believes to be the most plausible interpretation of specified audio input, and to access information regarding how confident it is in that interpretation, but as far as the present writer is aware, it does not enable programmers to access information regarding second-tier interpretations.)

In an embodiment, some or all alterable transcription decisions that have second-tier interpretations as alternate options will also have undefined options. For example, in an embodiment, if a user says a single word that the interface transcribes as "red," actuating the alteration key once may yield the result "read" and then actuating the alteration key a second consecutive time may cause the interface to enter option definition mode.

In an embodiment, a highlighted alterable block will be highlighted differently if it is the alterable block of an alterable transcription decision than it would be highlighted if it were the alterable block of some other type of alterable decision. For example, in an embodiment, if a user says "Bold move comma" and the interface alterably decides to interpret this utterance as text to be transcribed rather than interpreting it as a command to be executed, and then the user says "you two" and the interface alterably decides to interpret the word "two" as "two" rather than interpreting it as "too," then "Bold move," will be displayed with a light green background, "you" will be displayed normally, and "two" will be displayed with a light gray background.

In an embodiment, after the interface makes an alterable transcription decision it may reevaluate the outcome of that decision based on context provided by subsequent dictation and may adjust the probability of alteration of its options accordingly; if the interface has the automatic alteration feature described in Chapter 3, then the interface may automatically alter an alterable transcription decision if context provided by subsequent dictation makes it clear that the alterable transcription decision probably had the wrong outcome.

Circumlocutions for Dictated Text

In an embodiment, alternate options of alterable transcription decisions will have a wide variety of phonetically distinctive verbal descriptions. In such an embodiment, if a user can alter a decision by means of saying "Oops" followed by a verbal description of an alternate option of an alterable interface decision (as is described in the preceding chapter), then the user will be able to correct a typical transcription mistake by means of saying "Oops" and then describing the desired result in a way that is unlikely to yield the same incorrect outcome. For example, in an embodiment, if an alterable transcription decision had the outcome "through" when a user desired the outcome "threw," then the user may be able to correct the mistake with a single utterance by saying "Oops threw meaning tossed." Phonetically distinctive verbal descriptions of alternate options of alterable transcription decisions may be referred to herein as "circumlocutions." Various types of circumlocutions are described in the following paragraphs.

In an embodiment, an alternate option of an alterable transcription decision can be described by spelling it; for example, if the interface alterably interpreted a word as "to," then saying "Oops T-W-O" will convert the result to "two." In an embodiment, an alternate option of an alterable transcription decision can be described by saying "with a" and then specifying a letter that is present in the alternate option but not the default option; for example, if the interface alterably interpreted a word as "to," then saying "Oops with a W" will convert the result to "two." Conversely, in an embodiment, an alternate option of an alterable transcription decision can be described by saying "without a" and then specifying a letter that is present in the default option but not the alternate option; for example, if the interface alterably interpreted a word as "whole," then saying "Oops without a W" will convert the result to "hole." In an embodiment, if an alternate option of an alterable transcription decision includes a doubled letter that is not present in the default option, then the alternate option can be described by saying "with two" and then specifying the plural of the letter; for example, if the interface alterably interpreted a word as "to," then saying "Oops with two O's" will convert the result to "too." In an embodiment, for purposes of the present paragraph, a letter that is explicitly specified to be uppercase or explicitly specified to be lowercase counts as a distinct letter; for example, in an embodiment, if the interface alterably interpreted a word as "been," then saying "Oops with a capital B" will convert the result to "Ben."

In an embodiment, an alternate option of an alterable transcription decision can be described by naming a synonym, optionally after saying the word "meaning"; for example, if the interface alterably interpreted a word as "to," then saying "Oops also" or "Oops meaning also" will convert the result to "too." In an embodiment, an alternate option of an alterable transcription decision that is a noun can be described by naming a category such that the noun is typically considered to be a member of that category, optionally followed by restating the desired outcome; for example, if the interface alterably interpreted a word as "to," then saying "Oops number" or "Oops the number two" will convert the result to "two."

In an embodiment, if an alternate option of an alterable transcription decision is a punctuation symbol and the default option is not, then the alternate option can be described as "punctuation" or "punctuation mark"; for example, if the interface alterably interpreted some words as "I never question Mark," then saying "Oops punctuation mark" will change the result to "I never?". Conversely, in an embodiment, if the default option of a single-alternative transcription decision is a punctuation symbol and its only alternate option is not, then the alternate option can be described by saying "word" or "words" or "the word" or "the words," optionally followed by restating the desired outcome; for example, if the interface alterably interpreted some words as "I never?", then saying "Oops words" will change the result to "I never question Mark."

In an embodiment, a circumlocution may optionally begin with a straightforward verbal description of the desired outcome, so for example if the interface alterably interpreted a word as "to," then saying "Oops two with a W" will have the same effect as saying "Oops with a W."

In an embodiment, if an alternate option of an alterable transcription decision divides phonemes between words differently than the default option, then such an alternate option can be described by reciting the words of the alternate option (or, in an embodiment, circumlocutions that describe the words) with the word "space" between the words, or with a long pause between the words. For example, in an embodiment, if the interface alterably interpreted some phonemes as "Willmott," then saying "Oops will space not" will convert the result to "will not." As another example, if the interface alterably interpreted some phonemes as "jump down," then saying "Oops jumped space down" will convert the result to "jumped down."

In an embodiment, if an alternate option of an alterable transcription decision includes multiple words that differ from the default option, then such an alternate option can be described by means of any description that would be a description of one of the words that is different than the corresponding word of the default option, provided that such a description does not also constitute a description of an actual single-word alternate option of an alterable transcription decision. For example, in an embodiment, if the interface made an alterable decision to interpret dictation as "Van Gogh" rather than as "van go" and there is no alterable block that consists of just the word "Van" or just the word "Gogh," then the user may be able to change the result from "Van Gogh" to "van go" by saying either "Oops with a lowercase V" or "Oops G-O," among other possibilities.

Once a user becomes accustomed to altering alterable transcription decisions in some of the ways that are explained in the preceding paragraphs, the user may instinctively attempt to alter an alterable transcription decision by saying "Oops" and then describing an alternate option of an alterable transcription decision in whatever way comes to mind. For example, if a user says the letter D and the interface incorrectly transcribes it as T, the user may try to correct the mistake by saying "Oops D as in dog." Those of ordinary skill in the art will understand that various other circumlocutions may be created in addition to those that are explained in the preceding paragraphs, with the goal of making it possible for users who generally understand how to modify alterable transcription decisions to be able to do so easily in most cases, without often having to stop to figure out what particular description of an alternate option of such a decision the interface is likely to recognize.

In an embodiment, for any set of two or more alterable transcription decisions such that none of the alterable blocks of the decisions overlap and such that none of the alterable blocks is more than a certain maximum distance away from the nearest of the other alterable blocks (such as, in an embodiment, more than 10 words away), a user can alter every decision in the set by means of an utterance consisting of the word "Oops" followed by a chained circumlocution, where a "chained circumlocution" consists of a circumlocution for an alternate option of the first alterable block in the set, followed by, for each additional alterable block after the first, the recitation of the text between the previous alterable block and that additional alterable block if any such text exists, followed by a circumlocution for an alternate option of that additional alterable block. In an embodiment, such a chained circumlocution may optionally be preceded by a recitation of a small amount of text that precedes the first alterable block, and may optionally be followed by a recitation of a small amount of text that follows the last alterable block. For example, in an embodiment, after the interface has transcribed dictated text as, "These are told me to much," if the user then says, "Oops the space czar told me too with two O's much," then the interface will convert the result to "The czar told me too much."

In an embodiment, when the interface displays an alteration menu for an alterable transcription decision, each description of an alternate option in the alteration menu will be a circumlocution for that option. For example, the alteration menu for an alterable decision to interpret a spoken word as "to" may include options such as "to meaning towards," "too meaning also," "the number two," and "the numeral 2."

Exaggerated Enunciation

A human listener who is having trouble identifying phonemes and correctly grouping them into words may find it helpful for the speaker to enunciate more clearly, so that the speaker's pronunciation patterns change in such a way that individual phonemes and individual words can be distinguished more easily. For prior art speech recognition technology, though, it is important for a user's speech patterns to be consistent, so that the user will pronounce each phoneme in a way that the technology will recognize from the user's unique speech profile. In the first of the "top 5 things you need to know to start dictating with Dragon," documentation for prior art Dragon NaturallySpeaking speech recognition software says:

Dragon is not a person, so it won't help to:

YELL!!!

T a a a a l k s l o o o o o w w w l y y y y . . .

Or. Say. Only. One. Word. At. A. Time.

In fact, Dragon does better when you speak in long phrases, using your natural voice.

For example, if a human listener has trouble determining that a spoken phrase was "becomes selected" and not "become selected," a speaker can exaggerate the pronunciation of the ending of the word "becomes" and pause longer between words; but the present writer has dictated the phrase "becomes selected" to Dragon NaturallySpeaking software with exaggerated enunciation a few times, and in some cases, it was incorrectly transcribed as "becomes a selected" due to the exaggerated enunciation of the ending of the word "becomes."

In an embodiment of the present invention, the interface has speech recognition technology that keeps track of not just one speech profile per user but two—one with data regarding the normal speech patterns of the user, and another with data regarding the speech patterns that the user employs when speaking with deliberately exaggerated enunciation. In an embodiment, the interface recognizes distinctive cues that indicate when a user may be speaking with deliberately exaggerated enunciation, such as louder volume, fewer distinct phonemes per second, longer pauses between words, and so forth.

In an embodiment, when an alternate option for an alterable transcription decision is not a homophone of the default option—that is, when the interface would have had to make different choices in identifying phonemes and/or correctly grouping them into words in order to yield that option rather than the default option—the alternate option can be described by speaking it with exaggerated enunciation. For example, in an embodiment, if an alterable transcription decision has the default option "as" and the alternate option "has," then a user can alter the decision by saying "Oops has" loudly and with an exaggerated H. (In fact, the present writer would actually have found such a feature useful in correcting the transcription of the eleventh word of the preceding sentence, which was in fact transcribed incorrectly by speech recognition software on the first attempt.)

In an embodiment, if a user speaks an utterance that has a pause before and after it, and the interface determines that it is very likely that the utterance was spoken with deliberately exaggerated enunciation, then the interface will attempt to use the exaggerated enunciation speech profile of the user in order to interpret the utterance. If the utterance turns out to be compatible with a text block that the interface transcribed sufficiently recently, then rather than transcribing the utterance at the current input cursor location, then the interface will choose as its selected interpretation of the new utterance a text block that is different than the previously transcribed compatible text block and will replace that previously transcribed compatible text block with its transcription of the new utterance. For example, in an embodiment, if a user says "When text becomes selected" and the interface incorrectly transcribes this as "When text become selected," and the user then pauses and repeats "Becomes selected" loudly and with an exaggerated S at the end of the word "becomes" followed by an exaggerated pause, then this will cause the interface to alter its previous, incorrect transcription. In an embodiment, if the utterance turns out to be compatible with more than one text block that the interface transcribed sufficiently recently, then the interface will replace the one that is contained in the most relevant alterable block possible; in case of a tie, or if none of the text blocks are contained in alterable blocks, the interface will preferentially replace the text block that is at the nearest location that precedes the current input cursor location.

Although prior art programmers could have configured speech recognition technology to understand the speech patterns of both normal speech and speech with deliberately exaggerated enunciation, this would not have yielded much of an advantage if it merely allowed the user to achieve the same results in two slightly different ways. The interface behavior described in the preceding paragraph is quite different than that: rather than merely enabling a user to use a different speech pattern in order to achieve the same result that could have been achieved by speaking normally, the interface behavior described in the preceding paragraph allows a user to deliberately use a different speech pattern so as to achieve a different effect. In essence, in such an embodiment, a user's deliberate choice of whether or not to use exaggerated enunciation itself serves as a means of indicating to the interface whether or not the user is satisfied with previous transcription results.

Alterable Transcription Capitalization

By default, prior art Dragon NaturallySpeaking speech recognition software attempts to automatically capitalize any word that is at the beginning of a sentence. Its algorithm for determining what constitutes the beginning of a sentence is rather simplistic, so for example during work on the present document, whenever the present writer dictated the first word of a paragraph that was after a section heading, Dragon NaturallySpeaking failed to capitalize the first word of the paragraph. When Dragon transcribes an utterance that ends with a period in a location that is immediately before a lowercase word, it converts the first letter of that following lowercase word to uppercase.

Generally, when dictating to speech recognition software, capitalization mistakes may frequently occur. Features that in some embodiments facilitate recovery from capitalization mistakes, including capitalization mistakes that occur when dictating to speech recognition software, are discussed in Chapter 25.

Alterable Transcription in Perspective

In the present writer's experience, attempting to use prior art speech recognition software to correct transcription mistakes may be extremely frustrating. Deleting a mistake and making a second attempt to dictate the text will often yield the same mistake—as will the third attempt, and the fourth.

Certain prior art speech recognition technology has specialized transcription mistake recovery features. In particular, on a PC running prior art Dragon NaturallySpeaking speech recognition software, after the software transcribes an utterance consisting of one or more spoken words, if the user's next utterance is "Correct that," then the interface will highlight the most recently transcribed utterance and present the user with a menu containing numbered phrase replacement options that correspond to alternate ways of interpreting what the user said. Such menus may include both phrases that sounds similar to the software's original interpretation of the user's utterance and alternate ways of capitalizing the software's original interpretation of the user's utterance. For example, if the software interprets an utterance as "with the" and the user says "Correct that," then the menu that appears may include the following options:

"Choose 1" with a "Choose 2" With The "Choose 3" WITH THE

The numbers on such a menu are phonetically distinct, so a user can reliably select any desired option from such a menu by saying, for example, "Choose 1."

Also, when a user of Dragon NaturallySpeaking says, for example, "Correct 'with the,'" the interface will find an occurrence of the phrase "with the" (or of something that sounds very similar if it cannot find the phrase "with the"), will highlight that, and will present the user with a menu containing numbered replacement options. After a user of Dragon NaturallySpeaking corrects a speech recognition mistake by such means, or by means of selecting a range of text and then speaking a replacement for the selected text, the software may adjust the user's speech recognition profile so that the software may possibly be able to more accurately interpret the user's speech in the future.

However, correcting a transcription mistake by means of such a correction menu necessarily requires multiple steps: a user must first invoke the menu; then see which numbered option, if any, is the desired option; and then select the desired option. This sequence of steps may take significantly longer than saying, for example, "Oops with space a." Also, such a correction menu will only contain a small number of options, and in the experience of the present writer, the desired result is usually not among them. When using prior art speech recognition software, the present writer has found only one consistently successful way to fix transcription mistakes verbally: by spelling out the desired result one letter at a time.

Although the present writer had health issues that caused excessive typing to be painful, he found that attempting to input text by means of prior art Dragon NaturallySpeaking speech recognition software alone was intolerably unpleasant. Eventually, the present writer found that for him, the best way to use Dragon is to input a first draft of text via speech recognition technology but then correct any transcription mistakes via the keyboard.

In an embodiment that has certain features that are described above, it may be possible for users to verbally correct transcription mistakes more quickly and with fewer repetitions of mistakes, which may drastically decrease the frustration caused when speech recognition technology does not yield the desired result on the first try. Such features may be extremely advantageous for users of speech recognition technology, even in an embodiment where no non-transcription-related decisions are alterable decisions. However, in an embodiment where numerous other types of decisions are also alterable decisions as described herein, users may become accustomed to efficient alteration technology before they encounter transcription mistakes, and then they may find it especially intuitive and convenient to correct transcription mistakes by means of alteration technology.

Chapter 27: Alterable Transcription

Overview of Transcription Variation

Spoken input is inherently imprecise. A careful typist who types the same sentence twice can actuate exactly the same keys in the same sequence both times, but a careful speaker who dictates the same sentence twice cannot pronounce the sentence exactly the same way both times. It is difficult for software to deal with such imprecision, and speech recognition software often transcribes dictated speech incorrectly, no matter how careful the speaker is.

After speech recognition software transcribes dictated speech incorrectly, a user may delete the incorrectly transcribed text and repeat the same words in the hope that they will be transcribed correctly the second time. It may be desirable to systematically ensure that for any potential transcription mistake, deleting the transcribed text and repeating the same words will tend to not repeat the same transcription.

Therefore, in an embodiment, if a user deletes text that was dictated and then the user dictates text that could plausibly be transcribed as identical to the text that was just deleted and could plausibly be transcribed some other way, then the interface will preferentially tend to transcribe the text some other way. Such an embodiment will be said to have the "transcription variation feature." Details of such an embodiment are specified below.

Furthermore, in an embodiment, in certain circumstances the interface will associate with a transcribed text block the audio block that was transcribed as that text block, and subsequently, if the user deletes the transcribed text and then speaks a new audio block that could plausibly be an attempt to dictate the same text that the user previously was attempting to dictate, then the speech recognition functionality of the interface will take into account not only the current audio input block but also a previous audio block. For example, suppose that a user says a word that the interface transcribes as "need," but the speech recognition functionality of the interface had difficulty identifying the final consonant of the word and believes that the intended word may have been "neat" (or possibly "knead" or "kneed"). The user deletes the transcribed word, but the interface still remembers the audio block that it had transcribed as "need." The user then says a word again, and once again the speech recognition functionality of the interface does not hear the user clearly; this time it has difficulty identifying the first consonant of the word, and it believes that the intended word may be "meet," "meat," or "neat." In an embodiment, in such circumstances, even if the speech recognition functionality of the interface would guess based on the audio input block that the intended first consonant of the word is the letter M, the speech recognition functionality of the interface not only will take into account the audio input block but also will take into account the previous audio block that it transcribed as "need." The interface will thus transcribe the current audio input as "neat," which is the only word that the speech recognition functionality recognized as a compatible candidate both the first time and the second time.

How Transcription Variation Relates to Decision Variation

The transcription variation feature as described below is different from the automatic decision variation feature in significant ways. Nevertheless, if an embodiment does not have the transcription variation feature yet does have the automatic decision variation feature and has alterable transcription decisions as described above, then in certain circumstances such an embodiment will yield the same results as an embodiment with the transcription variation feature. For example, in such an embodiment, if a user says "meat" but the interface mistakenly decides to transcribe this word as "meet," and if this decision is an alterable transcription decision, then the user may be able to correct this mistake by deleting the transcribed word and saying the word "meat" a second time, because if the interface makes an alterable transcription decision that is essentially identical to the alterable transcription decision that was just deleted, then the automatic decision variation feature may cause the interface to choose a different outcome the second time.

However, unlike the automatic decision variation feature, the transcription variation feature is specifically designed to deal with the imprecision of spoken input, so an embodiment that has the transcription variation feature may have advantages over an embodiment that has only the automatic decision variation feature and alterable transcription decisions. For example, if a user says "meat" and the speech recognition functionality of the interface clearly identifies the first consonant of the word as M but the interface makes an alterable transcription decision to transcribe this word as "meet" rather than "meat," and if the user then deletes the transcribed word and says the word "meat" a second time, but this time the interface has difficulty identifying whether the first consonant of the word is N or M and would incorrectly guess based on the current audio input that the intended word is "neat," then in an embodiment without the transcription variation feature, the interface will transcribe the word as "neat" and the automatic decision variation feature will not be invoked, whereas in an embodiment with the transcription variation feature the interface may take into account the previous audio input in which the first consonant of the word was easier to identify and so may correctly guess that the intended word is "meat."

As described in Chapter 17, the automatic decision variation feature may take into account various factors in an attempt to intelligently determine whether a user who deletes and retypes an alterable block does so due to dissatisfaction with the outcome of the alterable decision. It may similarly be advantageous for the transcription variation feature to take into account various factors in an attempt to intelligently determine whether a user who deletes transcribed text and dictates something that sounds very similar does so due to dissatisfaction with the initial transcription. In fact, it may be advantageous for the transcription variation feature to take into account the same factors as the automatic decision variation feature. It is to be understood that an embodiment that has the transcription variation feature does not necessarily need to have the automatic decision variation feature also; however, if an embodiment does have both features, then it may be advantageous for the implementations of the similar portions of the two features to share common source code.

Therefore, the following description of the transcription variation feature does not explain it in isolation from the automatic decision variation feature: instead, it explains the behavior of the transcription variation feature in terms of its relationship to the behavior of the automatic decision variation feature, which is explained in Chapter 17. For example, the following description of the transcript variation feature uses terms such as "monitored alterable decision" that are defined in the explanation of the automatic decision variation feature. Once those of ordinary skill in the art understand how to implement the transcription variation feature in conjunction with the automatic decision variation feature, it will be obvious to them how to remove the automatic decision variation feature if so desired so that only the transcription variation feature is implemented.

Retaining Audio Input

In an embodiment, when a user dictates text, in addition to transcribing the text and possibly creating alterable transcription decisions, the interface will also retain certain additional information at least temporarily, as described below. If the user's dictation is transcribed incorrectly, retaining such additional information may subsequently facilitate correcting the transcription, as is explained below.

In an embodiment, when a user dictates text, the interface will associate the audio input block (either the plain audio input block or the phonetic input block) with the text output block that is its selected interpretation, thus creating a supplemented text block. In an alternative embodiment, when a user dictates text, for any words in the resulting text output block that have multiple distinct pronunciations, the interface will associate with those words a phonetic block that at least indicates which pronunciation it believes was spoken, without saving additional phonetic information; for example, in such an embodiment, if the word "read" is transcribed then the interface will remember whether it was pronounced the way that "reed" is pronounced or the way that "red" is pronounced, but will not remember, say, how confident it is that the last phoneme was a D sound rather than a T sound.

In an embodiment, as soon as any particular supplemented text block does not contain any word that is included in the alterable block of any alterable transcription decision, the interface will dissociate that text block from its prior speech block, so it will no longer be a supplemented text block. For example, in an embodiment, if a user says something that the interface alterably decides to transcribe as "read" rather than as "read," then the interface will associate the phonetic input block with the text output block that consists of the word "read" until the alterable transcription decision is deleted, whereupon the interface will dissociate the phonetic block.

In an embodiment, when a user dictates text, each word that the interface transcribes will be treated as the alterable block of a pseudo-alterable decision that has no alternate options and has a probability of alteration that is initially exceptionally low. In an embodiment, such a pseudo-alterable interface decision is not actually alterable, but it will be treated as an alterable transcription decision for purposes of the preceding paragraph, and its probability of alteration will decrease as the attention score of its alterable block increases until its probability of alteration drops below a certain threshold and it is deleted, just as though it were an actual alterable decision.

In an embodiment, when a user performs a destructive action that causes the interface to delete part of a text chunk without deleting the entire text chunk, the interface will retain data regarding the text chunk: specifically, the interface will retain data indicating what verbal block or blocks the text chunk was associated with, and which characters of the text chunk have not yet been deleted. Subsequently, if the user performs any action that is not a destructive action before every character of the text chunk has been deleted, then the interface will dissociate the text chunk from all associated verbal blocks. Otherwise, once every character of the text chunk is deleted, the user will then be considered to have deleted an entire supplemented text block for purposes of the following paragraph (since the text chunk is a supplemented text block). For example, in an embodiment where each word of a supplemented text block is a chunk, if a user dictates text that is transcribed as "you two" and then the user begins backspacing one character at a time, then the user will not be considered to have deleted a supplemented text block for purposes of the following paragraph until the user has finished deleting an entire word.

In an embodiment, when a user deletes a supplemented text block, the interface will continue to retain its associated speech block at least until the deleted text is not part of the remembered transcription block as defined below. A "deleted speech block" consists of one or more verbal blocks that were originally associated with one or more plain text blocks that have since been deleted. Later, when the user dictates text and the interface associates the new audio input block with the new text output block, in certain circumstances the interface may also associate a deleted speech block with that new text output block, so that the new text output block may be associated with more than one verbal block.

Deleting Transcribed Text

In an embodiment, for purposes of the interface behavior described in the following paragraphs, when a user performs a sequence of one or more consecutive destructive actions that delete a portion of text, the interface will keep track of whether or not the user "explicitly selected" the left and right boundaries of the portion of text to be deleted. In particular, if for example a user says "Undo that" and in response the interface undoes the transcription of several words, then the user will not be considered to have explicitly selected the boundaries of the transcribed words that were thus deleted. If a user backspaces to delete text that was just transcribed, then the user will be considered to have explicitly selected the left boundary of the portion of text that was just deleted, because the user explicitly chose when to stop backspacing, but the user will not be considered to have explicitly selected the right boundary of the portion of text that was just deleted, because the user may have initially been using the backspace key as a convenient means of getting to a particular word the user desired to delete without particularly intending to delete the rightmost word that was thus deleted. If a user moves the input cursor to a new location and then backspaces text, or if a user selects a portion of text using the mouse and then presses the backspace key or the Delete key, then the user will be considered to have explicitly selected both the left and right boundaries of the portion of text to be deleted.

In an embodiment, for purposes of the automatic decision variation feature that is described in Chapter 17, when a user performs a first destructive action that deletes any portion of text, if either the text is a portion of a supplemented text block or the user's most recent entry of text was by means of transcription, then the portion of text that the user deleted will become "the remembered transcription block," which the interface will treat like the alterable block of an alterable decision; the interface will thus remember pre-deletion state data for the the remembered transcription block, including any speech block associated with the text. The "remembered speech block" is the speech block that is associated with the remembered transcription block (if any), and a "remembered audio block" is any audio block that is included in the remembered speech block. The interface will remember whether the user is considered to have explicitly selected the left and right boundaries of the remembered transcription block.

In an embodiment, when a user performs a destructive action such as is described in the preceding paragraph and the interface thus causes a portion of text to become the remembered transcription block, the interface will associate the remembered transcription block with "the remembered transcription decision," which will essentially be a special alterable decision regarding the text the user has deleted. The remembered transcription decision will not have any actual alternate options, and cannot be altered by means of ordinary alteration functionality; it will exist only as a remembered alterable decision that can become the monitored alterable decision.

In an embodiment, for purposes of the automatic decision variation feature, the remembered transcription block will never be considered to have been fully deleted until the interface determines whether to watch for repetition of a remembered alterable decision. While a remembered transcription block exists and no monitored alterable decision yet exists, each time the user performs another consecutive destructive action, if the portion of text that is deleted by the current destructive action is contiguous with the remembered transcription block then it will be added to the remembered transcription block, and its speech block, if any, will be added to the remembered speech block; if it is not contiguous, then the previously remembered transcription block will be forgotten, and the portion of text that is deleted by the current destructive action will become the new remembered transcription block.

In an embodiment, the probability of alteration that is assigned to the remembered transcription decision will always equal at least a certain minimum amount, and whenever a portion of text becomes the remembered transcription block that was not part of the alterable block of any alterable transcription decision, the probability of alteration of the remembered transcription decision will be reset to this minimum amount. In an embodiment, this minimum amount will be a probability of alteration that is low but not very low. In an embodiment, ordinary alterable transcription decisions will not actually become remembered alterable decisions: the remembered transcription decision will be the only decision pertaining to transcription that is eligible to become the monitored alterable decision. However, in an embodiment, the probability of alteration of an ordinary alterable transcription decision may affect the probability of alteration of the remembered transcription decision, as follows: whenever a portion of text becomes the remembered transcription block or is added to the remembered transcription block, if that portion of text was part of the alterable block of any alterable transcription decision, then the probability of alteration of the remembered transcription decision will be made to be at least as much as the probability of alteration of that alterable transcription decision.

Beginning to Monitor Transcription

In an embodiment, after a user performs a sequence of consecutive destructive actions, as soon as the user performs an editing action that is not a destructive action, when the interface determines whether to watch for repetition of a remembered alterable decision, the remembered transcription decision may become the monitored alterable decision. (In an embodiment, it may be possible for some other remembered alterable decision to become the monitored alterable decision instead, depending on circumstances; for example, in an embodiment, in certain circumstances if a user says "Hello" the interface may make an alterable decision regarding what format to apply to the transcribed word, in which case deleting the word and then performing an editing action that is not a destructive action may possibly cause that alterable format decision to become the monitored alterable decision rather than causing the remembered transcription decision to become the monitored alterable decision.)

In the following paragraphs, the interface will be said to be "monitoring transcription" whenever the remembered transcription decision is the monitored alterable decision. The interface "begins monitoring transcription" when the remembered transcription decision becomes the monitored alterable decision. When the interface "stops monitoring transcription," this means that the interface stops watching for repetition of the monitored alterable decision (which is the remembered transcription decision).

In an embodiment, for purposes of the following paragraphs, once the interface begins monitoring transcription, a "remembered audio block" is an audio block that is associated with the entire remembered transcription block, excluding any audio block that is associated with only a subportion of the remembered transcription block. A "remembered text block" is either the remembered transcription block itself or another text block that is associated with a remembered audio block. Generally, while monitoring transcription, the interface is alert for the possibility that any remembered audio blocks were user attempts to dictate the same text that the user is now attempting to dictate again and that any remembered text blocks were transcriptions that did not yield the result the user desired.

In an embodiment, when the interface begins monitoring transcription, the interface will deprecate the remembered transcription block, which means it will later avoid yielding that exact same result as a text output block, as is explained below. In an embodiment, when the interface begins monitoring transcription, if the user had explicitly specified the left boundary of the remembered transcription block, then the interface will deprecate the first word of the remembered transcription block. In an embodiment, when the interface begins monitoring transcription, if the user had explicitly specified the right boundary of the remembered transcription block, then the interface will deprecate the last word of the remembered transcription block. For example, in an embodiment, if a user speaks text that is transcribed as "these are said to fish" and then the user backspaces all five words before saying something, and when the user says something the interface begins monitoring transcription, then the remembered transcription block will be the five-word sequence "these are said to fish"; the complete five-word sequence will be deprecated, and its first word will individually be deprecated, but no other subportions will be deprecated.

In an embodiment, when the interface begins monitoring transcription, the interface will determine every deprecated portion of a remembered text block that either begins the remembered text block or consists of the entire remembered text block; such deprecated portions are "deprecated beginnings" for purposes of the following paragraphs. In an embodiment, when the interface begins monitoring transcription, the interface will determine every deprecated portion of a remembered text block that either ends the remembered text block or consists of the entire remembered text block; such deprecated portions are "deprecated endings." For example, if the remembered transcription block consists of the words "these are said to fish" and the entire remembered transcription block and its first word "these" are deprecated, but its last word is not deprecated, then if there is no other remembered text block, the deprecated beginnings consist of the phrase "these are said to fish" and the word "these" and nothing else, and the deprecated endings consist of only the phrase "these are said to fish."

Monitoring Transcription

Essentially, if the remembered transcription decision becomes the monitored alterable decision, this means that the interface believes it is possible that the reason that the user just deleted some text is that the text was incorrectly transcribed, and believes that the user may now be making another attempt to dictate the exact same thing. Generally speaking, in an embodiment, the interface will continue to monitor transcription only while it is still possible that the user is making another attempt to dictate the exact same thing, insofar as the interface is able to determine whether or not this is possible.

Therefore, specifically, in an embodiment, while the interface is monitoring transcription, the interface will keep track of all text that the user has entered since the remembered transcription decision became the monitored alterable decision. While the interface is monitoring transcription, the "monitored input" is all the text that the user has entered since the remembered transcription decision became the monitored alterable decision. When the user has entered any such text, the monitored input is said to be "non-empty"; when the user has not yet entered any such text, the monitored input is said to be "empty."

In an embodiment, while the interface is monitoring transcription, when a user inputs text either by means of the keyboard or by means of dictation, if the monitored input is empty and the input cursor is not currently located where the remembered transcription block was located, then the interface will stop monitoring transcription; and while the interface is monitoring transcription, when a user inputs text, if the monitored input is non-empty and the input cursor is not currently located at the end of the monitored input, then the interface will stop monitoring transcription. In other words, the interface will continue to monitor transcription only if the user inputs text sequentially where the remembered transcription block was located.

In an embodiment, for purposes of interface behaviors that are described below, when the monitored input is empty, the "unmatched portion" of the remembered transcription block is the entire remembered transcription block. When the monitored input is non-empty, if it is incompletely compatible with the remembered transcription block, then the "unmatched portion" of the remembered transcription block is the incompatible subportion as defined above. When the monitored input is non-empty, if it is not incompletely compatible with the remembered transcription block, there is no "unmatched portion" of the remembered transcription block.

In an embodiment, whenever the monitored input is non-empty, it is incompletely compatible with every remembered audio block, as is explained below. Below, for any given remembered audio block, if the monitored input is empty then the "unmatched portion" of the remembered audio block is the entire remembered audio block; if the monitored input is non-empty, and the monitored input is thus incompletely compatible with the remembered audio block, then the "unmatched portion" of the remembered audio block is the incompatible subportion as defined above.

In an embodiment, while the interface is monitoring transcription, if a user dictates text to be transcribed, then the interface will provide as input for the transcription algorithm not only the current audio input block but also the unmatched portion of every remembered audio block. In an embodiment, the transcription algorithm will then determine whether there is at least one unmatched portion of a remembered audio block such that the current audio input block is left-compatible with the unmatched portion. If so, then the transcription algorithm will by some means bias its interpretation of the audio input block in favor of an interpretation that is left-compatible with every such unmatched portion, such as by means of using a weighted average phonetic score as described above.

In an embodiment, whenever the monitored input changes, such as because a user dictates text that becomes part of the monitored input, if the monitored input is non-empty, then the interface will update the status of the remembered speech block, as follows: First, the interface will determine whether the remembered transcription block or any remembered audio block is left-compatible with the monitored input, and if so, then the interface will "determine that the user has finished repeating dictation," which has results that are explained below. When this happens, the matched portion of the monitored input is the "revised transcription block" for purposes of behaviors that are explained below. (When for example the remembered transcription block is left-compatible with the monitored input, either the monitored input is compatible with the entire remembered transcription block or a subportion of the monitored input is compatible with the remembered transcription block; in either case, if the user was making a second attempt to dictate the same phonemes that were in the remembered transcription block, the user has now done so.) Next, if the interface did not determine that the user has finished repeating dictation, then the interface will ensure that the monitored input is incompletely compatible with every remembered audio block by eliminating any remembered audio block that it would not be incompletely compatible with; that is, for each remembered audio block, the interface will determine whether the monitored input is incompletely compatible with that remembered audio block, and if it is not then the interface will dissociate that remembered audio block so that it is no longer part of the remembered speech block and thus is no longer a remembered audio block. After that, if there are no remembered audio blocks, then the interface will determine whether the monitored input is incompletely compatible with the remembered transcription block; if it is not, then the interface will stop monitoring transcription.

Varying Transcription

In an embodiment, once the interface begins monitoring transcription, if the user's first editing action that is not a destructive action consists of dictating text, then the interface will provide the transcription algorithm with additional input consisting of the list of deprecated beginnings and will instruct the transcription algorithm to strongly bias its interpretation of the audio input block against any interpretation that begins with or consists of any of these deprecated beginnings. For example, in an embodiment, if a user backspaces the transcribed words "these are said to fish" and then says "these are," then on the second attempt the interface will be more likely to yield a result such as "the czar" or "fees are" or something else that is phonetically similar and does not begin with the word "these."

In an embodiment, while the interface is monitoring transcription, whenever a user dictates text, if there are any deprecated endings, then before causing the transcription algorithm to select an interpretation for the current audio input block, the interface will determine whether either there is an unmatched portion of the remembered transcription block such that the unmatched portion of the remembered transcription block is incompletely compatible with the audio input block, or there is a remembered audio block such that the unmatched portion of the remembered audio block is incompletely compatible with the audio input block. If so, then the interface will divide the audio input block into two subportions—the matched portion and the unmatched portion—and will process these two subportions to the transcription algorithm sequentially, as individual audio input blocks. When it processes the first subportion, the special interface behavior described in the following paragraph will be invoked, so that the transcription algorithm can appropriately avoid deprecated endings. For example, if a user selected and deleted the transcribed words "these are said to," and the word "to" became a deprecated ending when the interface began monitoring transcription, and the monitored input now consists of the words "the czar said" so the unmatched portion of the remembered transcription block is just the word "to," and the user says "two fish," then the interface will divide the resulting audio input block into two subportions—one containing the spoken word "two" and another containing the spoken word "fish"—and will process these words separately, so that the interface behavior described in the following paragraph will be invoked when the spoken word "two" is processed and the transcription algorithm will avoid the word "to"; the spoken word "fish" will subsequently be processed normally.

In an embodiment, while the interface is monitoring transcription, whenever a user dictates text, before causing the transcription algorithm to select an interpretation for the current audio input block, the interface will determine whether either there is an unmatched portion of the remembered transcription block such that the unmatched portion of the remembered transcription block is compatible with the audio input block, or there is a remembered audio block such that the unmatched portion of the remembered audio block is compatible with the audio input block. If so, then when the interface causes the transcription algorithm to select an interpretation for the current audio block, it will provide the transcription algorithm with additional input consisting of the list of deprecated endings and will instruct the transcription algorithm to strongly bias its interpretation of the audio block against any interpretation that ends with or consists of any of these deprecated endings. For example, if the word "to" is a deprecated ending and there is an unmatched portion of the remembered transcription block that consists of the word "to," then if the user says "to" the interface will be more likely to yield a result such as "two" or "too" or something else that is phonetically similar and does not end with the word "to."

In an embodiment, while the interface is monitoring transcription, if it determines that the user has finished repeating dictation, then if the monitored input exactly matches a deprecated block (such as because the monitored input somehow turned out exactly the same as the remembered transcription block), and if the interface has transcribed any text since it began monitoring transcription, and that text has not been deleted, then the interface will vary its transcription as described in the following paragraphs, which means that it may retroactively switch to some other phonetically reasonable interpretation of what the user said, so as to avoid repeating a transcription that the user already deleted. In other words, in an embodiment, if a user deletes a lengthy transcribed sentence and immediately dictates it again, and the transcription is turning out to be exactly the same, then the interface will try to find something to change.

In particular, in an embodiment, when the interface varies its transcription, the interface will vary the most relevant alterable transcription decision that it made since it began monitoring transcription if any such alterable transcription decision exists, using the procedure for varying a decision that is described in Chapter 17, with the variation score of the remembered transcription decision serving as the variation score of that alterable transcription decision. For example, if a user deletes the entire transcribed sentence “These are said to fish” by means of saying “Undo that” and then the user says the same five words slowly one at a time and they are transcribed exactly the same way, then once the fifth word is transcribed, the interface will find the most relevant alterable transcription decision in the resulting sentence, and vary that decision.

In an alternative embodiment, when the interface varies its transcription, the interface will determine the longest contiguous portion of text that it transcribed since it began monitoring transcription and that has not been deleted, and will provide the corresponding audio block to the transcription algorithm as input, and will instruct the transcription algorithm to strongly bias its interpretation of the audio block against an interpretation that is identical to that longest contiguous portion of text. For example, if a user deletes the entire transcribed sentence “These are said to fish” and then says the same five words slowly one at a time, then the interface will send hack the audio input corresponding to that entire sentence to the transcription algorithm to be interpreted again as a single unit, and will instruct the transcription algorithm to try to avoid repeating that result.

Recognizing Transcription Correction

In an embodiment, when the interface determines that the user has finished repeating dictation, if the revised transcription block is not identical to the remembered transcription block (including if the revised transcription block would be identical to the remembered transcription block but the interface varies its transcription and so then the revised transcription block is no longer identical to the remembered transcription block), then the interface will consider its previous transcription of the remembered transcription block to have been incorrect and consider the revised transcription block to be the correct transcription. In particular, in an embodiment, if the interface still remembers the audio block that was originally transcribed as the remembered transcription block, then the interface will accordingly save data for its speech recognition user profile that indicates that it now believes the correct transcription of that original audio block to be the revised transcription block.

In an embodiment, when the interface determines that the user has finished repeating dictation, if the entire revised transcription block is a supplemented text block that is associated with an audio block, then the interface will associate the revised transcription block with data pertaining to previous failed transcription attempts: that is, first, the interface will associate the remembered transcription block with the audio block that is associated with the revised transcription block; then, the interface will associate every remembered audio block with the revised transcription block.

In an embodiment where the interface behaves as described in the preceding paragraph, third and fourth attempts to dictate text may be increasingly likely to yield a desired result, because each time the user deletes the revised transcription block and makes yet another attempt to dictate the same thing, the interface will have access to all the same remembered audio blocks and remembered text blocks as the last time, plus one more of each. For example, when the interface determines that the user has finished repeating dictation, if the remembered transcription block consists of the word “to” and the revised transcription block consists of the word “two,” and the revised transcription block is associated with an audio block that represents the user’s latest pronunciation of a word that sounds like “two,” and there is also a remembered audio block that represents the user’s earlier pronunciation of something very similar, then the interface will associate the latest audio block with the remembered transcription block “to” and will associate the earlier remembered audio block with the revised transcription block, so if the user immediately deletes the word “two” and makes yet another attempt to dictate the same thing, then both the word “to” and the word “two” will be remembered text blocks that are deprecated, and the pronunciations of both those words will be remembered audio blocks. As another example, in an embodiment, if a user says “Both had many” too quietly for the interface to pick up the sound of the letter H, and so the interface transcribes this as “Both at many,” and then the user attempts to correct this but gets the result “Boat had many,” if on the third try the user pronounces “Both had many” exactly the same as the first time then the interface may nevertheless yield the right result, because it will be taking into account additional information such as the audible presence of the letter H in the audio input for the second draft and the fact that the user did not accept the result “Both at many” for the first draft.

In an embodiment, when the interface determines that the user has finished repeating dictation, after the interface has performed the additional processing described above, the interface will stop monitoring transcription.

Chapter 28: Other Alterable Speech Recognition Decisions

About Verbal Commands and Speech Recognition Modes

Prior art speech recognition software can be configured to recognize a specific set of verbal commands such as “Undo that,” “Launch Internet Explorer,” “Go to sleep,” “Italicize [something]” and so forth. It can be configured to recognize commands based on context; for example, prior art Dragon NaturallySpeaking software will recognize the verbal command “Click Save” when a Save button is visible. Such verbal commands are particularly useful for speech recognition software, both because verbal commands are a relatively intuitive means of invoking specific interface functions and because speech recognition software is a relatively inefficient means of navigating interface menus to find menu commands for specific interface functions.

Prior art Dragon NaturallySpeaking speech recognition software can be set to operate in various special modes.

While in command mode, Dragon will attempt to interpret all utterances as verbal commands, and will not transcribe any spoken words. Conversely, while in dictation mode, Dragon will transcribe all spoken words, including words that would otherwise be interpreted as verbal commands. While in sleep mode, Dragon will continue to process speech that it hears, but will not respond to any such speech other than the verbal command "Wake up," which will cause it to exit sleep mode. Dragon may enter sleep mode automatically if it hears no speech for a certain minimum amount of time. Dragon NaturallySpeaking can be configured so that various hotkeys affect its operation; for example, by default, holding down the Shift key will cause Dragon to operate in dictation mode until the Shift key is released.

On quite a few occasions, while using prior art Dragon NaturallySpeaking speech recognition software, the present writer attempted to dictate a phrase beginning with the word "old," but Dragon instead interpreted his utterance as a verbal command beginning with the wold "bold." Whenever he canceled the result of that command and tried the same utterance again, Dragon made the same mistake—but then when he finally tried holding down the Shift key to force Dragon to operate in dictation mode temporarily, Dragon correctly transcribed his utterance as a phrase beginning with the word "old" rather than the word "bold." From this experience, it may be inferred that when Dragon is operating in normal mode (as opposed to command mode or dictation mode), Dragon is configured to bias its interpretation of an utterance in favor of an interpretation that will cause Dragon to treat the utterance as a verbal command. Obviously, such a bias may cause mistakes when a user attempts to dictate a phrase that happens to phonetically resemble a valid command, but conversely, such a bias may prevent mistakes when a user attempts to invoke a valid command that happens to phonetically resemble a phrase that is not a valid command.

Certain prior art speech recognition software does not visibly react to what a user says until the user pauses briefly, whereupon it reacts to everything the user said since the most recent previous pause. This enables it to determine the most likely interpretation of a sequence of phonemes in light of any immediately subsequent phonemes before it commits to an interpretation; for example, when the present writer said "the czar" to Dragon NaturallySpeaking speech recognition software and paused, Dragon incorrectly transcribed it as "these are," but when the present writer said "the czar of Russia" in a single breath, Dragon NaturallySpeaking correctly transcribed the entire utterance. Certain other prior art speech recognition software continuously reacts to what a user says, and may thus need to backtrack in order to replace an interpretation of a partial sequence of phonemes that is later determined to be unlikely in light of immediately subsequent phonemes; for example, when the present writer said "the czar of Russia" in a single breath to an iPhone operating in dictation mode, the word "these" appeared briefly, but then disappeared and was replaced by "the czar of Russia."

When prior art Dragon NaturallySpeaking speech recognition software reacts to everything the user said since the most recent previous pause, it either interprets that entire utterance as a verbal command or interprets that entire utterance as text to be transcribed; a user cannot successfully mix dictation with verbal commands without pausing in between. The present writer is not aware of any technology in which a user can mix dictation with verbal commands without pausing in between. Speech recognition software can often be extremely frustrating to use, but in the present writer's experience, the inability to mix dictation with verbal commands without pausing in between is not a major source of frustration: it is usually natural to pause before speaking a verbal command in order to think of the command, and it is usually natural to pause after speaking a verbal command in order to see the results.

ALTERABLE COMMAND RECOGNITION

In the following paragraphs, a "command utterance" is any utterance that the interface can recognize as a verbal command, regardless of whether or not the interface actually does then treat the utterance as a verbal command. For example, in prior art Dragon NaturallySpeaking software "Correct that" is by default a command utterance, even when the Dragon interface is operating in dictation mode and does not actually treat the utterance "Correct that" as a verbal command; "Hello there" is not a command utterance.

In an embodiment of the present invention, after any utterance that the interface interprets as a verbal command, the interpretation of that utterance as a verbal command is an alterable decision such that altering the decision will cause the interface to undo the effect of the verbal command (if possible) and then to transcribe that utterance. In an embodiment, the verbal description of the alternate option of such a decision is "dictation" or "that was dictation," and so immediately after the interface interprets an utterance as a verbal command, if the user's next utterance is "Oops that was dictation" then the interface will alter its decision to interpret the previous utterance as a verbal command.

In an embodiment, after any command utterance that the interface interprets as text to be transcribed and not as a verbal command, the interpretation of that command utterance as text to be transcribed is an alterable decision such that altering the decision will cause the interface to undo the transcription of that utterance and then to respond to the command utterance as a verbal command. In an embodiment, the verbal description of the alternate option of such a decision is "command" or "that was a command," and so immediately after the interface interprets a command utterance as text to be transcribed, if the user's next utterance is "Oops that was a command," then the interface will alter the its decision to interpret the previous utterance as text to be transcribed.

The alterable decisions described in the preceding two paragraphs are referred to herein as "alterable command recognition decisions."

Figure 19A:
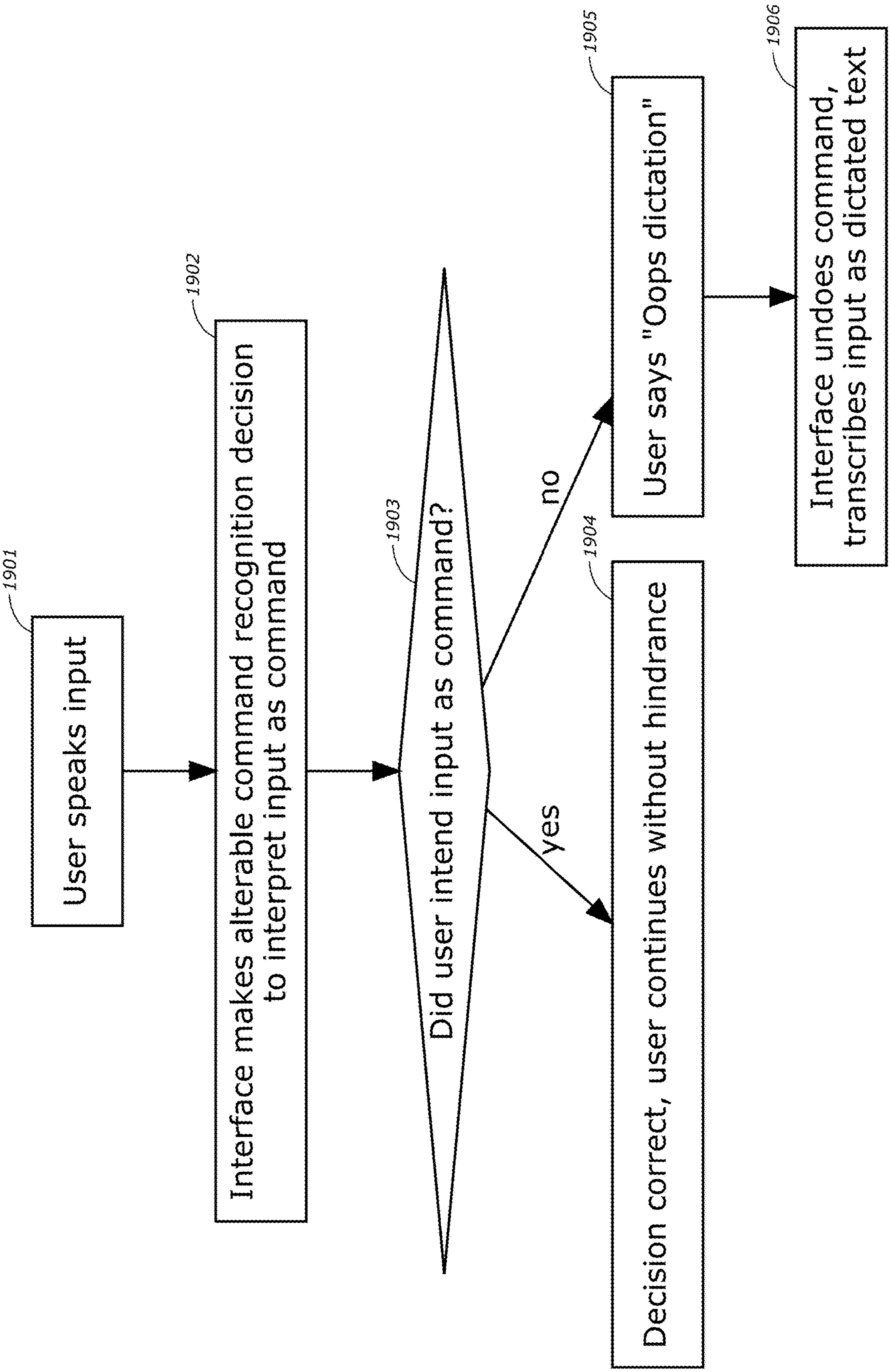
FIGS. 19A and 19B are flowcharts depicting example scenarios where alterable command recognition decisions may facilitate mistake correction.
Figure 19B:
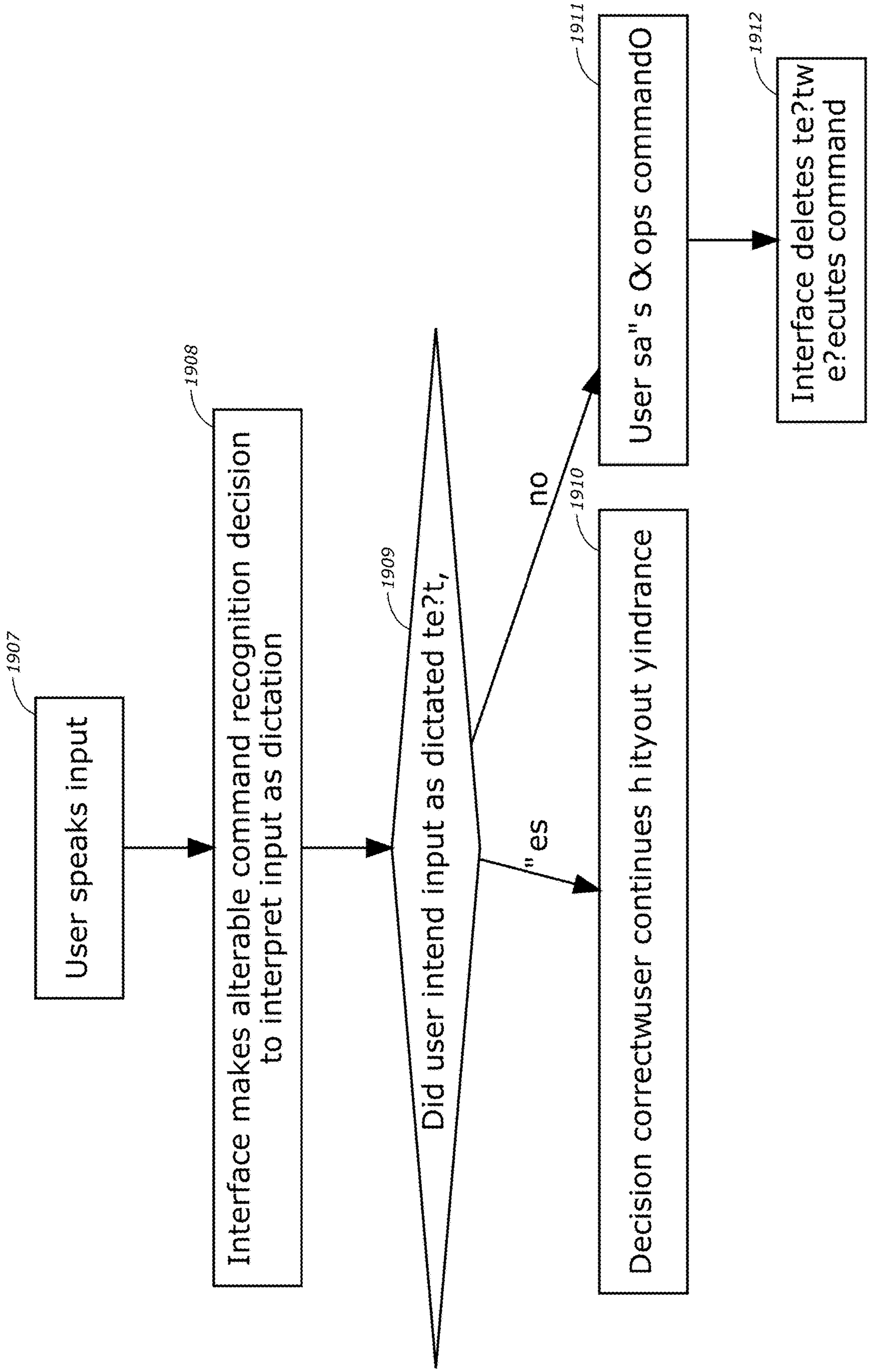

FIGS. 19A and 19B are flowcharts depicting scenarios where alterable command recognition decisions may facilitate mistake correction. In the scenario of FIG. 19A, once the user speaks input (1901), the interface makes an alterable command recognition decision to interpret the spoken input as a command (1902) rather than interpreting and transcribing the input as dictation. At that point the salient question is whether or not the user intended that input as a command (1903). If so, the interface made the correct decision and the user continues unhindered (1904). If the user did not intend that spoken input as a command, the user can invoke corrective alteration functionality by saying "Oops dictation" (1905), thereby instructing the interface to undo the misinterpreted command and transcribe the original input as dictated text (1906).

FIG. 19B depicts a scenario that is the converse of the scenario in FIG. 19A. In this scenario, once the user speaks input (1907), the interface makes an alterable command recognition decision to interpret the spoken input as dictation (1908) rather than as an interface command. At that point the salient question is whether or not the user intended that input as dictated text (1909). If so, the interface made the correct decision and the user continues unhindered (1910). If the user did not intend that spoken input as dictation, the user can invoke corrective alteration functionality by saying "Oops command" (1911), thereby prompting the interface to delete the transcribed text and execute the original command (1912).

In an embodiment, even the interface's decision whether or not to interpret as a verbal command a command utterance that begins with the word "Alter" or the word "Oops" is itself an alterable command recognition decision. For example, in an embodiment, after the utterance "Oops" causes the interface to alter an alterable decision, if the user's next utterance is "Oops dictation," then the interface will undo the recent alteration and transcribe the word "Oops." In an embodiment, even if interface adaptation causes the interface to initially interpret most utterances beginning with the word "Oops" as dictation, the interface will always initially decide to interpret the utterance "Oops command" as a verbal command rather than as dictation, so that the interface cannot come to be in a state where it is not possible to command it to reinterpret a previous utterance as a command. In an alternative embodiment, the interface may initially decide to interpret the utterance "Oops command" as dictation rather than as a verbal command, but if it does so, then if the user's next utterance is also "Oops command," the interface will alter its decision to interpret the previous utterance of "Oops command" as dictation rather than as a verbal command.

In many cases, the change that would occur if a particular alterable command recognition decision were altered will be a semi-subtle change as defined in Chapter 8, so in an embodiment, when such a decision would be highlighted, in certain circumstances a block descriptor may appear for the decision, as is explained in Chapter 8. For example, in an embodiment, if the interface makes an alterable decision to interpret the utterance "Close this application" as text to be transcribed rather than as a command to be executed, and this decision is a highlighted alterable decision, then the transcribed text itself will constitute the highlighted alterable block of the decision, but if the user then alters the decision and the interface closes the application, a block descriptor that says "Application closed" will appear.

Smart Command Recognition

In an embodiment, except when the interface is in a special command mode such that it interprets every command utterance as a verbal command or in a special dictation mode such that it interprets every command utterance as text to be transcribed, when a user speaks a command utterance, the interface's decision whether to interpret the utterance as a verbal command or as text to be transcribed is a threshold decision. In the present specification, such decisions are referred to as "command recognition threshold decisions." In the present specification, where a command recognition threshold decision is said to "have a transcription bias" in certain circumstances, this means that in such circumstances the interface modifies the decision score in such a way as to increase the interface's tendency to interpret the utterance as text to be transcribed.

In an embodiment, a command recognition threshold decision will have a transcription bias if interpreting the utterance as a verbal command would yield a command that currently would have no effect. In an embodiment, a command recognition threshold decision will have a transcription bias if text within the current input field or current document includes the distinctive command word that is at the beginning of the utterance, and will have an even greater transcription bias if such text includes the exact text of the utterance; for example, if a user says "Correct that," then the interface will be more inclined to interpret that utterance as text to be transcribed if the current document includes the word "correct," and even more so if the current document includes the exact phrase "correct that." In an embodiment, a command recognition threshold decision will have a transcription bias if the user's utterance happens to consist of a particular phrase that is recognized by the speech recognition software as a common phrase; for example, if a user says "Bold font," then the interface may be more inclined to interpret that utterance as text to be transcribed then if the user had said "Bold 'never.'"

For example, in an embodiment, when the interface makes a command recognition threshold decision, the decision score will equal zero, plus one if interpreting the utterance as a verbal command would yield no effect, plus a value that may be as much as three if the distinctive command word is present in the current document (but may be less than three if that word is not prevalent), plus one if interpreting the utterance as text to be transcribed would cause the interface to transcribe a common phrase; the interface will interpret the command utterance as text to be transcribed if the decision score exceeds a threshold value that initially equals 1.5 by default. For example, if a user says "Bold never" when the words "bold" and "never" are not present anywhere in the current document, then the command recognition threshold decision will have a decision score of one: there will be a one-point transcription bias because the command "bold never" currently would have no effect (because the word "never" is not present anywhere in the current document), and there will not be any other transcription bias; if the threshold value equals 1.5, then the interface will interpret this utterance as a verbal command, and its decision to do so will be alterable with a moderate probability of alteration.

In an embodiment, an utterance consisting of the word "Hey" immediately followed by a command utterance (without a significant intervening pause) will have the same effect as the command utterance without the word "Hey," except that the interface will modify the decision score of the resulting command recognition threshold decision in such a way as to greatly increase the interface's tendency to interpret the utterance as a verbal command. (Of course, if the interface nevertheless decides to treat the utterance as text to be transcribed, then the word "Hey" will be included in the transcription.) For example, in an embodiment, if a user says, "Hey bold never," then the interface will treat this as a command utterance that represents the same verbal command as the utterance "Bold never," and the decision score of the resulting command recognition threshold decision will be decreased by five due to the presence of the word "Hey."

Adaptive Command Recognition

In an embodiment, each particular type of verbal command corresponds to a distinct adaptive decision class: when the user speaks a command utterance that could be interpreted as that particular type of verbal command, the interface will make a threshold command recognition decision regarding that utterance, and if such a decision turns out to have a non-beneficial outcome, then the interface will accordingly adjust the threshold for that particular type of verbal command. For example, in an embodiment, if a user frequently speaks command utterances that begin with the word "correct," and every time that the interface interprets such an utterance as a verbal command the user says "Oops dictation," then sooner or later the interface will adapt and stop interpreting such command utterances as verbal commands. In an embodiment, each such adaptive decision is an adaptive threshold decision, so if a user frequently dictates a particular command utterance that could be interpreted as a verbal command but never ends up actually using that command utterance as a verbal command, then not only will the interface learn to interpret that command utterance as dictation, but also the interface's decisions to interpret that command utterance as dictation will eventually be assigned a very low probability of alteration.

In such an embodiment, for certain such adaptive decision classes, the relevant threshold value may be initially configured so that the interface alterably decides to interpret that particular type of command utterance as text to be transcribed, and these alterable command recognition decisions initially have a very low probability of alteration. If such an embodiment also has the manual alteration detection feature, then when a user attempts to invoke such a command, even though the user's utterance will initially be interpreted as dictation, the interface may subsequently recognize that interpreting the user's utterance as a command would have been a beneficial outcome, and may adapt its behavior accordingly.

Thus, in an embodiment, it may be advantageous for an interface designer to add numerous specialized verbal commands such that only a small minority of users will ever want to use each additional specialized verbal command: for those who often wish to use a particular command, the interface will adapt so that the command is easy to invoke; for those who never wish to use it, the interface will continue to treat the command utterance as dictation. This is another reason why the alterable command recognition functionality described herein may be advantageous over prior art: not only can it help to efficiently correct mistakes that users already tend to make when using speech recognition technology, but also it may allow interface designers to add numerous specialized verbal commands without much risk of introducing frequent additional mistakes.

Transcription Correction Commands

In an embodiment, each individual description of an alternate option of an alterable interface decision may serve as essentially a distinct verbal command. Such behavior is described in detail in the following paragraphs. In the following paragraphs, a "correction utterance" is any utterance that consists of a verbal description of an alternate option of an alterable interface decision, regardless of whether or not the interface responds to the utterance by altering an alterable interface decision.

In an embodiment, in response to a correction utterance that consists of a description of an alternate option of an alterable interface decision that has a probability of alteration that is above a certain "correction recognition threshold," the interface will select such an alternate option for the most relevant alterable interface decision that has such an alternate option. In an embodiment, by default the correction recognition threshold equals the highlighting threshold. For example, in an embodiment, if the interface has made an alterable decision to interpet a dictated word as "to" rather than "two," and the alterable block of the decision is highlighted, then the user may be able to alter the decision by saying "With a W," without saying "Oops" or holding down the alteration key or performing any other additional action to indicate that the intended effect of the utterance is an alteration.

In an embodiment, when in response to a correction utterance the interface decides to alter a decision as described in the preceding paragraph, its decision to do so is itself an alterable decision such that altering the decision will cause the interface to undo the effect of its previous response to the correction utterance and then to transcribe that utterance. In an embodiment, the verbal description of the alternate option of such a decision is "dictation" or "that was dictation." In an embodiment, when in response to a correction utterance the interface transcribes the utterance, its decision to do so rather than altering a decision is itself an alterable decision such that altering it will cause the interface to undo the transcription of the correction utterance and then to select an alternate option that was verbally described by the correction utterance for the most relevant alterable interface decision that has such an alternate option (even if that decision has a probability of alteration that is below the correction recognition threshold). In an embodiment, the verbal description of the alternate option of such a decision is "correction" or "that was a correction." The alterable decisions described in the present paragraph will be referred to herein as "alterable correction recognition decisions." In an embodiment, even an alterable correction recognition decision may itself be altered by means of a correction utterance, as is illustrated in the example below.

In an embodiment, when the interface decides whether to respond to a correction utterance by transcribing the utterance or by altering an alterable interface decision, its decision to do so will not be determined simply by whether or not the correction utterance is a description of an alternate option of an alterable interface decision that has a probability of alteration that is above the correction recognition threshold. Instead, the decision is a threshold decision that has a decision score that is affected by the same factors that are discussed above in the explanation of command recognition threshold decisions. Furthermore, in an embodiment, various distinct descriptions or types of descriptions of alternate options of alterable interface decisions correspond to distinct adaptive decision classes, each with its own distinct correction recognition threshold. In such an embodiment, for certain such adaptive decision classes, the command recognition threshold may be initially configured so that the interface alterably decides to interpret that particular type of correction utterance as text to be transcribed, and these alterable correction recognition decisions initially have a very low probability of alteration. For example, the interface may initially be configured so that the utterance "That was a command" may cause the interface to alter an alterable command recognition decision, but the utterance "Command" will not, even though it describes the same alterable option of the same alterable interface decision.

For example, in an embodiment, the following scenario may be possible: A user says something that the interface transcribes as, "Gio, look at that Van Gogh!" The phrase "Van Gogh" is a highlighted alterable block. This was not the outcome the user desired. In an attempt to correct the mistake, the user says "G-O." Because this utterance is pronounced the same as the nearby text "Gio," the interface's decision regarding this utterance has a transcription bias, and the interface decides to transcribe this utterance as "Gio." Its decision to transcribe the utterance is an alterable correction recognition decision that has a high probability of alteration. The user then says, "That was a correction"; in response to this particular correction utterance, the interface alters the previous alterable correction recognition decision, which means that the interface deletes the recently transcribed word "Gio" and instead selects the alternate option of an alterable decision that was described by the utterance "G-O," thus yielding, "Gio, look at that van go!", which is the outcome the user desired. Subsequently, due to interface adaptation, the interface may have an additional bias against transcribing "Gio" when that utterance happens to be a correction utterance.

Alterable Speech Recognition Modes

In an embodiment, in response to an utterance consisting of the word "Oops" followed by the name of a particular speech recognition mode, the interface will undo its response to the previous utterance, and then enter the specified mode, and then respond again to that previous utterance, but now in the new mode. For example, in an embodiment, if the interface is in a special command mode such that the interface does not transcribe spoken text and a user says "Best wishes" but this does not correspond to a command and so the interface does nothing, then if the user then says "Oops normal mode" this will cause the interface to exit command mode and also transcribe the text "Best wishes." In an embodiment, holding down the alteration key while speaking a command that causes the interface to enter a particular speech recognition mode will have the same effect.

In an embodiment, in addition to a normal speech recognition mode in which the interface responds to all utterances it hears and a sleep mode in which it only responds to the verbal command "Wake up," the interface will have a "dormant mode." In an embodiment, if the interface hears no speech for a certain minimum amount of time, it will enter dormant mode rather than entering sleep mode. While the interface is in dormant mode, the interface will ignore any sounds that it would not be able to successfully transcribe, along with any sounds that occur within a certain amount of time before or after such sounds. For example, in an embodiment, if while the interface is in dormant mode the user laughs and then immediately says "No way," the interface will ignore not only the laugh but also the subsequent words. In an embodiment, while the interface is in dormant mode, if the interface hears nothing that is above a certain minimum threshold volume for a certain minimum length of time and then hears recognizable speech at normal volume and clearly enunciated, then the interface will automatically exit dormant mode and process that utterance.

In an embodiment, while the the interface is in sleep mode, or while it is in dormant mode if it has a dormant mode as described in the preceding paragraph, the interface will remember all speech that it hears for a certain minimum amount of time (such as, in an embodiment, 15 seconds), even after it has determined that it should not enter normal speech recognition mode in response to such speech. In an embodiment, the interface's decision to remain in sleep mode when it hears an utterance other than "Wake up" is an alterable interface decision, and the interface's decision to ignore an utterance and remain in dormant mode is an alterable interface decision, and altering either of these types of decisions will cause the interface to exit sleep mode or dormant mode and respond to the user's previous utterance as though that utterance had been spoken while the interface was in normal mode. In an embodiment, a user can alter such a decision by saying "Oops wake up" or by holding down the alteration key while saying "Wake up." For example, in an embodiment, if a user says, "Hello there exclamation point" while the interface is in sleep mode and then says "Oops wake up," the interface will exit sleep mode and transcribe the previously dictated phrase "Hello there!"

Figure 19C:
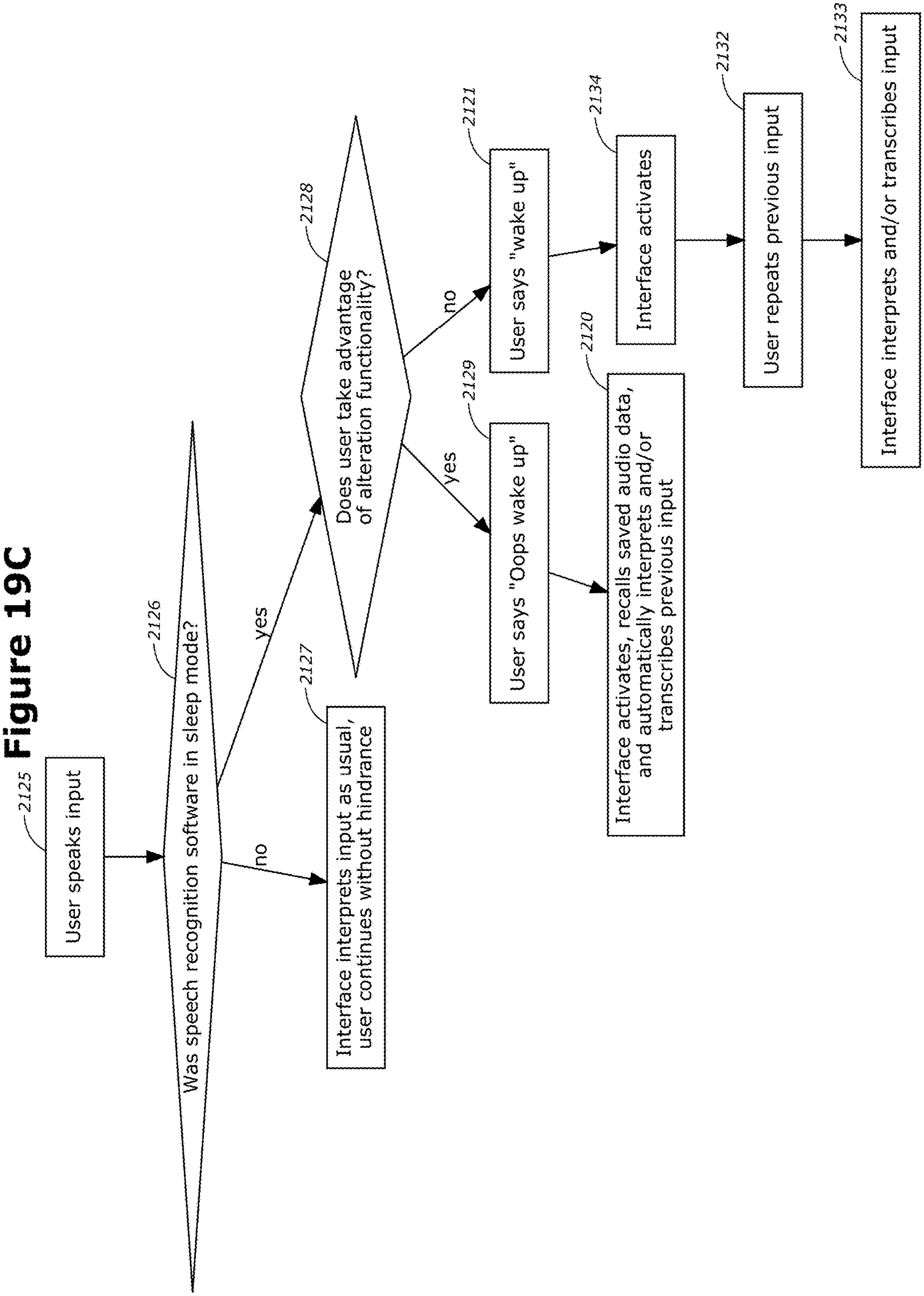
FIG. 19C is a flowchart depicting an example scenario for applying corrective alteration functionality to a mistake that may occur when speech recognition software is in sleep mode.

FIG. 19C is a flowchart depicting a scenario applying corrective alteration functionality to the mistake that may occur when speech recognition software is in sleep mode. Once the user speaks input (1913), if the interface was not in sleep mode when the user spoke (1914), the interface interprets the input as usual and the user continues unhindered (1915). If, however the speech recognition software was in sleep mode (1914) at the time of input, the user's experience then becomes contingent upon interface alteration functionality capability. If the user is not able to take advantage of alteration functionality (1916), once the user realizes the software had entered sleep mode, the user will instruct the program to "wake up" (1919) and then wait for the interface to activate (1920) before the user repeats the previous input (1921) so the interface will then (finally!) interpret and/or transcribe that input (1922). If the user is able to take advantage of alteration functionality (1916), once the user realizes the software had entered sleep mode, the user can simply say "Oops wake up" (1917), causing the interface to activate, recall saved audio data, and automatically initiate retroactive interpretation and/or transcription of the previously given input (1918) without further ado.

In an embodiment, the interface's decision to automatically exit dormant mode when it hears recognizable speech at normal volume and clearly enunciated is an alterable decision, and altering such a decision will cause the interface to undo whatever it did in response to the utterance that caused it to exit dormant mode, along with everything it did in response to speech since then, and will also cause the interface to enter sleep mode; in an embodiment, a user can alter such a decision by saying "Oops go to sleep" or by holding down the alteration key while saying "Go to sleep." Such a decision is an alterable input state decision, as defined in Chapter 15.

In an embodiment, except when an alterable interface decision to automatically exit dormant mode exists as described in the preceding paragraph, the verbal command "Oops go to sleep" will cause the interface to undo whatever it did in response to the user's most recent single utterance and will also cause the interface to enter sleep mode. In an embodiment, holding down the alteration key while saying "Go to sleep" will have the same effect.

Alteration and Continuous Speech Recognition

As is mentioned farther above, prior art Dragon NaturallySpeaking speech recognition software does not visibly react to what a user says until the user pauses briefly, whereupon it either interprets everything the user said since the most recent previous pause as a single verbal command, or interprets everything the user said since the most recent previous pause as text to be transcribed; a user cannot successfully mix dictation with verbal commands without pausing in between.

In various embodiments of the present invention, the interface may continuously react to what a user says, or the interface may not visibly react to what a user says until the user pauses briefly.

In an embodiment, the interface continuously reacts to what a user says. In such an embodiment, a user may begin to speak a new verbal command or additional text to be transcribed before the interface has necessarily displayed its reaction to whatever the user said previously. In an embodiment, when the interface responds to any utterance that is a verbal command that causes the interface to alter an alterable interface decision, for purposes of determining what alterable decision to alter in response to that command, the interface will ignore any alterable decision that had consequences that did not appear until after the moment when the user began to speak the verbal command. For example, in an embodiment, if a user says "I want two fish and two puppies too period. Oops two with a W," and the interface has transcribed only "I want to fish and" when the user says "Oops two with a W," and then the interface finishes transcribing the dictated sentence so that it says "I want to fish and two puppies too," then even if its decision regarding the word "too" happens to be the most relevant decision when it interprets the user's command "Oops two with a W," that decision is not eligible to be altered by that command because the word "too" was not visible until after the moment when the user began to speak that command.

In an embodiment, the utterance "Oops . . . never mind" is a verbal command that has no net effect. Such a command may be useful if a user says "Oops" with the intention of correcting an alterable transcription decision but then sees that the interface itself backtracked and corrected its own interpretation in light of what it heard subsequently.

In an embodiment, in order for the interface to interpret an utterance as a verbal command rather than as text to be transcribed, the utterance must be preceded by a pause of at least a certain minimum length, so that for example the utterance "You can alter mistakes easily," if spoken without a pause, definitely will not be interpreted as two words to be transcribed followed by a verbal command that begins with the word "alter." In an embodiment, the minimum length of such a preceding pause is not very long, but a shorter preceding pause will tend to discourage the interface from interpreting an utterance as a verbal command: that is, in an embodiment, when the interface makes a command recognition threshold decision, the interface will determine the length of time during which it heard no phonemes immediately prior to the time when the user began to speak the relevant command utterance, and if that length of time is less than a certain threshold, then that decision will have a transcription bias that is proportional to the amount by which that length of time falls short of the threshold. For example, in an embodiment, an utterance will not be interpreted as a verbal command unless it is preceded by a pause of at least 0.5 seconds, and if an utterance is preceded by a pause that is between 0.5 seconds and 2.0 seconds, then the decision score of the relevant command recognition threshold decision will be increased by 2.0 minus the duration of the pause.

In an alternative embodiment, the interface does not visibly react to what a user says until the user pauses briefly, and the interface may interpret everything the user said since the most recent previous pause as a single verbal command, or as text to be transcribed, or as multiple verbal commands separated by the word "and." For example, in an embodiment, if a user says "Save the current document and close Microsoft Word," then this will cause the interface to first save the current document and then close Microsoft Word, assuming those two actions happen to be valid verbal commands at the time.

Verbal Alteration Hints

In an embodiment, for purposes of the following paragraphs, an "alterable speech recognition decision" is an alterable transcription decision, an alterable command recognition decision, or an alterable correction recognition decision.

In an embodiment, when the interface makes an alterable speech recognition decision that has a probability of alteration that is higher than a certain "alteration hint threshold," the interface will display a small balloon graphic that includes a description of what the user can say to select each alternate option that has a probability of alteration that is above the alteration hint threshold. Such a graphic will be referred to herein as a "hint balloon." For example, in an embodiment, if a user says "Select one" and the interface decides to interpret this as dictation rather than as a command, and this decision is an alterable decision with a high probability of alteration, then a hint balloon will appear above the transcribed text that says, "You can say 'Oops command.'" In an embodiment, if such an alterable speech recognition decision is an alterable transcription decision, each description of an option will be a description of a phonetically distinctive circumlocution for that option. In an embodiment, for purposes of determining whether or not a probability of alteration exceeds the alteration hint threshold, whenever the interface is in alterable decision review mode as described in Chapter 5, every probability of alteration will be increased by the review mode intensification value.

In an embodiment, if a user has altered alterable speech recognition decisions a sufficient number of times and the user has recently exhibited a preference for altering such decisions by means other than speech recognition, then hint balloons will not appear. For example, in an embodiment, if a user has altered alterable speech recognition decisions at least 10 times, and of the last 10 times that the user has done so, a majority have been by means of the alteration key or by means of touch alteration functionality, then hint balloons will not appear.

In an embodiment, when a user may be expected to be quite familiar with a particular way of verbally describing an option of an alterable speech recognition decision, the type of hint balloon that describes such an option will no longer appear. In particular, in an embodiment, when a user has seen a particular type of hint balloon at least a certain number of times (such as, in an embodiment, at least 10 times), or when the user has altered a decision by means of the type of utterance that is suggested in a particular type of hint balloon sufficiently many times (such as, in an embodiment, at least three times), then that type of hint balloon will no longer appear. For example, in an embodiment, once a user has altered a decision by means of saying "Oops command" at least three times, hint balloons will no longer appear that would say, "You can say 'Oops command,'" but hint balloons may still appear that say, "You can say 'Oops two with a W.'"

In an embodiment, when at least one hint balloon is showing, the utterance "Hey, I know" will cause the interface to close all hint balloons; if only one type of hint balloon was showing, then that type of hint balloon will no longer appear. In an embodiment, when a hint balloon appears, another hint balloon will appear that says, "You can say, 'Hey, I know' to close this hint permanently," except that as described in the preceding paragraph, when a user may be expected to be quite familiar with the utterance "Hey, I know," the type of hint balloon that explains that you can say "Hey, I know" will no longer appear.

In an embodiment, the utterance "Hey, deactivate correction advice" will cause all types of hint balloons to no longer appear. In an embodiment, once the type of hint balloon that explains that you can say "Hey, I know" no longer appears and the user has said 'Hey, I know' at least five times, when a hint balloon appears, another hint balloon will appear that says, "You can say, 'Hey, deactivate correction advice' to close all hints permanently," except that as described above, when the user may be expected to be quite familiar with that command, that type of hint balloon will no longer appear.

User Education and Verbal Commands

In Chapter 23, an interface behavior is described such that in an embodiment, the interface may recognize when a user performs a workaround for a particular feature (such as when a user moves the input cursor to the end of a line of input by means of repeatedly actuating the right arrow key rather than by means of actuating the End key), and the interface may accordingly generate an efficiency tip that explains to the user how to use that particular feature.

In an embodiment, when the interface recognizes an action workaround for a tutored action, if every user action that was included in the action workaround was performed by means of speech recognition, and if the interface generates an efficiency tip in response to that particular action workaround, then the efficiency tip will if possible explain how to perform the tutored action by means of speech recognition, rather than by means of the keyboard or some other means. For example, in an embodiment, if a user moves the input cursor to the end of a line of input by means of repeatedly speaking the verbal command "Press right arrow" rather than by means of actuating the End key, and if the interface generates an efficiency tip in response to that particular action workaround, then the efficiency tip will explain that the spoken command "Go to end of line" moves the input cursor to the end of a line of input, rather than explaining that the End key moves the input cursor to the end of a line of input.

It may generally be more difficult for a user who is exclusively using speech recognition functionality to perform certain editing tasks efficiently. Certain sequences of actions may be relatively efficient when performed by means of a mouse or keyboard, yet be relatively inefficient when performed by means of speech recognition functionality. For example, clicking a precise location on the display of a computing device usually will not take very long, but specifying a precise location to click by means of speech recognition functionality may take quite a long time. As another example, pressing a key ten consecutive times may not take very long, but speaking a corresponding verbal command ten consecutive times may take quite a long time. Because speech recognition functionality may make it difficult to perform certain editing tasks efficiently, it may be particularly advantageous for the interface to detect inefficient workarounds and generate efficiency tips when a user is performing editing tasks by means of speech recognition functionality. Also, many users who are generally experienced with computing devices may nevertheless be unfamiliar with speech recognition functionality, and in particular may be unfamiliar with certain verbal commands that may facilitate efficient editing, so for that reason also, it may be particularly advantageous for the interface to generate efficiency tips pertaining to speech recognition functionality.

For example, repeatedly actuating the alteration key in order to cycle through various alternate options of various alterable decisions may be a relatively efficient way for a user to select a particular alternate option of a particular alterable decision, but repeatedly speaking the word "Alter" and repeatedly waiting for speech recognition functionality to recognize and respond to that command may not be so efficient. Therefore, in an embodiment, if a user speaks the command "Alter" more than a certain number of times consecutively (such as, in an embodiment, more than three times consecutively), then as soon the user performs an action other than speaking the command "Alter," if that action does not pertain to alteration functionality, and if that sequence of consecutive utterances of "Alter" achieves the result of selecting a particular alternate option of a particular alterable decision, then the interface will recognize that sequence of consecutive utterances of "Alter" to be an action workaround for a single utterance that would have caused the interface to select that alternate option of that decision. For example, in an embodiment, if a user says "Alter" five times consecutively and then resumes dictating text, and the eventual result of these five consecutive utterances of "Alter" could instead have been achieved by saying "Oops two with a W," then the interface will accordingly generate an efficiency tip.

In an embodiment, the interface will in certain circumstances enter a verbal command training mode, and while the interface is in such a configuration, the interface will recognize when a user achieves a result that could have been achieved by means of a verbal command but does so without the use of speech recognition functionality, and the interface will consider this to be an action workaround even if the user achieved such results quite efficiently. Such interface behavior may be advantageous for a user who for health reasons wishes to transition to exclusively using speech recognition functionality, but wishes to begin using speech recognition functionality without first learning how to do everything by means of speech recognition functionality. For example, in an embodiment, if a user views a dialog box that contains options pertaining to speech recognition functionality and selects a checkbox for the option "Teach me to use speech recognition for everything," and then the user dictates some text by means of speech recognition functionality, and then the user presses the Home key, then the interface will generate an efficiency tip that says, "You can say 'Go to beginning of line' instead of pressing the Home key."

In an embodiment, as an exception, while the speech recognition functionality of the interface is in sleep mode or dormant mode, or is turned off entirely, the interface will not behave as described in the preceding paragraph even if the interface is in verbal command training mode.

In an embodiment, as an exception, if the interface displays a hint balloon that explains how to alter a particular decision by means of speech recognition functionality but then the user alters that decision by some means other than speech recognition functionality, then the interface will disregard such an action workaround, because an efficiency tip would simply repeat what the hint balloon had already explained.

In an embodiment, whenever there is an efficiency tip pertaining to speech recognition functionality that the user has not yet viewed, if the user ceases speaking for a certain minimum amount of time (such as, in an embodiment, for at least five seconds), then the interface will display an efficiency tip pertaining to speech recognition functionality. In an alternative embodiment, the interface will not display any efficiency tips unless the user explicitly acts to cause an efficiency tip to be displayed, such as by speaking a recognized verbal command such as "Show tip" or by clicking or touching a notification badge pertaining to efficiency tips.

Variants of Spoken Alteration Commands

The present specification has explained various verbal commands that pertain to alteration functionality in terms of specific spoken words such as "Alter," "Oops," "No," "Hey," and so forth. Those of ordinary skill in the art will understand that various embodiments may use different specific spoken words to denote verbal commands that pertain to alteration functionality, or may use means of input other than speech to help to indicate when an utterance is intended as a verbal command that pertains to alteration functionality. For example, an embodiment was described above in which immediately after an utterance that is interpreted as a verbal command, if the user's next utterance is "Oops that was dictation" then the interface will alter its decision to interpret the previous utterance as a verbal command; however, those of ordinary skill in the art will understand that other embodiments may require a user to use slightly different means to achieve the same result. For example, in one alternative embodiment, immediately after an utterance that is interpreted as a verbal command, if the user's next utterance is "No, that was dictation" then the interface will alter its decision to interpret the previous utterance as a verbal command; in another alternative embodiment, in such circumstances, if the computing device interprets input from a camera that is facing the user and recognizes that the user is shaking his head from side to side, and the user says "Dictation" while doing so, then the interface will alter its decision to interpret the previous utterance as a verbal command; and so forth.

Chapter 29: Audio Highlighting

Highlighting Audio Alterable Blocks

In an embodiment, even when interface output is in audio form rather than visual form, the alterable block of an alterable interface decision may be a highlighted alterable block; that is, in an embodiment, whenever the interface outputs the alterable block of a highlighted alterable interface decision by means of audio output, the interface will output that highlighted alterable block in a distinctive manner. For example, the interface may play a particular musical sound while describing a highlighted alterable block, or may use a different voice while describing a highlighted alterable block, or may pause before and after a highlighted alterable block and raise the pitch of its voice at the end of the highlighted alterable block so as to make the highlighted alterable block sound like a question. Other ways of outputting a highlighted alterable block by means of audio output in a distinctive manner will be evident to those of ordinary skill in the art. Likewise, in an embodiment, when the interface outputs a highlighted undoable block or any other type of highlighted changeable block by means of audio output, the interface will output that highlighted changeable block in an appropriately distinctive manner.

For example, in an embodiment that is a voice-controlled computer with a speaker for output and no display, when a user has verbally instructed the computer to add "Meet with Josh" to his calendar for "8:00 Saturday," the interface may say, "Okay, 'Meet with Josh' is scheduled for 8:00 . . . AM? . . . Saturday, January 21." In an embodiment, if the user then says "Oops PM," the interface may respond, "Okay, 'Meet with Josh' is scheduled for 8:00 . . . PM? . . . Saturday, January 21."

Chapter 30: Word Replacement Improvements

Autocorrection of Word Entry Mistakes

The most common mistakes that users of computing devices encounter are word entry mistakes, such as typographical errors and spelling mistakes. Typographical errors are fairly common for users who are entering input by means of a hardware keyboard, and for users who are entering input by means of a small virtual keyboard on a smartphone or by means of speech recognition, word entry mistakes are even more common.

In various prior art interfaces, when a user presses the space bar or any other key that indicates the user has finished typing a word, autocorrection functionality analyzes the word the user typed and determines whether it appears that the user has made a word entry mistake; if so, then the autocorrection functionality replaces the word the user typed with a different word. Autocorrection functionality will successfully correct word entry mistakes without any additional effort from the user in many cases, but not always.

Some prior art autocorrect features operate by means of a simple word replacement table, so that a mistyped or misspelled word is corrected only if it is explicitly present in the table. However, many autocorrect features use algorithms that are more complex. A typical prior art autocorrection algorithm may have an autocorrection dictionary that includes thousands of actual words and includes data regarding how frequently the words are used. When the autocorrection algorithm receives as input a "word" that a user typed, the word replacement algorithm will by some method find words in its dictionary that are similar enough to the typed word to be relevant replacement candidates, and then by some method calculate a score for each candidate word that takes into account the candidate word's similarity to the word the user typed and, in some cases, also takes into account the candidate word's frequency of usage. For example, U.S. Pat. No. 8,232,973 describes an algorithm that, in one possible configuration, assigns each relevant dictionary word 1 point for each letter that exactly matches the corresponding letter in the word the user typed, 0.5 points for each letter that does not match but is a "keyboard layout neighbor" of the corresponding letter the user typed, and 0.25 points for each letter that is a neighbor of a neighbor. That patent also describes an algorithm that assigns scores that take into consideration the distance on a touchscreen keyboard between the center point of a letter in a dictionary word and the actual location the user touched on the touchscreen keyboard, so that for example a dictionary word that includes the letter I where the word the user typed includes the letter O will have a higher score if the user typed that letter O by touching its far left edge (thus barely missing the letter I) rather than touching its far right edge (and thus missing by more).

Because many users rely heavily on autocorrection to correct typos and spelling errors, even small improvements to an autocorrection algorithm may be very advantageous. In an attempt to improve user experiences, autocorrection algorithms have been created that are extremely complex. Some autocorrection algorithms even take context into account, so that a candidate word may receive a score the depends in part on previous words that a user typed, so that, for example, the word "quo" will receive a high score as a replacement for "qua" if a user typed "status qua" but not if the user typed "sine qua." Some autocorrection algorithms may even replace correctly spelled common English words with other words in certain circumstances; for example, the present writer has been pleasantly surprised on several occasions when his iPhone correctly replaced "on" with "in."

However, even the most sophisticated autocorrection algorithm will often yield the wrong word. A user who generally expects and desires that sophisticated autocorrection functionality will correct his typographical errors will often be disappointed. In fact, other than individual typographical errors, probably the most common mistakes that computer users encounter are autocorrection mistakes. Such mistakes may be especially frustrating when the user actually typed the desired word correctly and autocorrection intervened to change the desired result to an undesired result.

Candidate Word Algorithms

In the following discussion of autocorrection, a "word" is a single sequence of consecutive letters that may optionally also include other symbols such as apostrophes and hyphens but does not include space characters, whether or not such a "word" is an actual word in any language. "The input word" is a word that a user typed that may be modified by autocorrection functionality, or any other word or sequence of keystrokes that is provided as input to a candidate word algorithm. A "candidate word algorithm" is a software procedure that takes as input an input word and an autocorrection dictionary of words that are recognized as valid (and that may also include data regarding how frequently these valid words are used), and based on this input determines a list of "candidate words" that have a certain minimum amount of similarity to the word a user typed, and that also determines some sort of "suitability score" for each candidate word, which is some type of measurement of the desirability of each candidate word as a replacement for the input word. A candidate word algorithm may also take into account other input in addition to the dictionary and the input word; for example, a candidate word algorithm may also take into account words that are adjacent to the input word.

Those of ordinary skill in the art will understand that there are various ways to create candidate word algorithms. As a simple example, a candidate word algorithm may simply return as the only candidate word the input word whenever the input word is itself present in the autocorrection dictionary, and in other circumstances may return a list of candidate words that includes only those words that are present in the autocorrection dictionary that can be generated by replacing a single letter of the input word with a different letter, with a suitability score assigned to each candidate word that is proportional to its frequency of usage. Various other candidate word algorithms exist that can be found online; other candidate word algorithms exist that are proprietary trade secrets of various companies. Some prior art candidate word algorithms are very complex and intelligent. Because typographical errors and autocorrection mistakes are the most common types of interface mistakes, and because a well-made candidate word algorithm can help to correct or prevent such mistakes, even an incremental improvement to a candidate word algorithm may greatly enhance an interface.

Below, the present specification will describe various ways that autocorrection functionality can be improved, in some embodiments. Because a great deal of ingenuity has already gone into creating intelligent prior art candidate word algorithms, it may be extremely undesirable to replace such candidate word algorithms and start from scratch. Instead, the present specification will explain how to create an embodiment in which an unspecified base candidate word algorithm is incorporated into an interface's autocorrection functionality in such a way as to yield better results. This way, if an interface designer happens to have access to a particularly intelligent candidate word algorithm, then the interface designer can use that candidate word algorithm as the base candidate word algorithm for purposes of the autocorrection functionality that is described below, so as to create an embodiment of the present invention that has the advantages of the improved autocorrection functionality that is described below while retaining the advantages of the intelligent base candidate word algorithm.

In particular, various enhanced candidate word algorithms are described below such that in an embodiment, each enhanced candidate word algorithm will itself make use of some simpler candidate word algorithm and will typically yield results that are just as advantageous or more advantageous than the results that would be yielded by the simpler candidate word algorithm. In an embodiment, in order to incorporate all the improvements that are described below, the interface's autocorrection functionality will directly use an enhanced typo-correcting candidate word algorithm as described below to determine a candidate word list; the enhanced typo-correcting candidate word algorithm will use a backspace-branching candidate word algorithm, which will use a retyping-sensitive candidate word algorithm, which will use a backspace-sensitive candidate word algorithm, which will use an accuracy-customizable candidate word algorithm, which will be a modified version of the base candidate word algorithm, which will presumably be the most intelligent prior art candidate word algorithm that the interface designer has convenient access to. These various types of candidate word algorithms are explained in detail below. Those of ordinary skill in the art will understand how to refactor such a sequence of nested candidate word algorithms so that it instead consists of a single candidate word algorithm that behaves the same way that the sequence of nested candidate word algorithms would behave.

In the following discussion of autocorrection functionality, it will be assumed that any base candidate word algorithm will assign a higher suitability score to a candidate word that is a more desirable replacement for the input word. If instead an interface designer wishes to incorporate a base candidate word algorithm that assigns a lower suitability score to a candidate word that is a more desirable replacement for the input word, the interface designer can create a modified version of the base candidate word algorithm that assigns higher suitability scores to more desirable candidate words, and then make use of that modified version of the base candidate word algorithm.

Making Word Replacement Decisions Alterable

In the present specification, when the interface has used a candidate word algorithm to find candidate words that may serve as replacements for a word the user typed and the interface then makes its decision whether or not to replace the word the user typed with a different word, such a decision is a "word replacement decision."

In an embodiment, when the interface makes a word replacement decision that has more than one viable alternative, that decision is an alterable interface decision. Such a decision will be referred to herein as an "alterable word replacement decision," and also constitutes an "alterable autocorrection decision."

In an embodiment, an alterable word replacement decision will include one alternate option for each candidate word that was not selected as a replacement for the input word, along with an alternate option corresponding to the input word itself if the input word was replaced. In an embodiment, as an exception, if the number of candidate words is greater than a certain maximum amount (such as, in an embodiment, five), then the alterable word replacement decision will include only that maximum amount of alternate options, with the candidate words that have the highest suitability scores serving as alternate options. In an embodiment, an alterable word replacement decision will always include an option corresponding to the unmodified input word itself, so that whenever autocorrection functionality does cause the interface to replace a word the user typed, it will always be possible for the user to undo the effect of the autocorrection functionality by means of alteration functionality.

In an embodiment, each alternate option of an alterable word replacement decision will be assigned a probability of alteration that is reflective of the approximate probability that a user will wish to select that alternate option relative to the probability that the user will be satisfied with the default option, insofar as the interface is able to determine such a probability. Those of ordinary skill in the art will be able to understand various ways to implement such behavior with respect to any particular candidate word algorithm. For example, in an embodiment, if the candidate word for a particular alternate option has a suitability score that is at least 90% as much as the candidate word that is selected as the default option, then that particular alternate option will be assigned a very high probability of alteration.

In an embodiment, if autocorrection functionality ever replaces a word that is not the most recent word the user typed (such as because the most recent word provided relevant context that caused the autocorrection functionality to reconsider a previous decision it made), that particular alterable word replacement decision will be assigned a very high probability of alteration. For example, in an embodiment, if a user types "sotto" and autocorrection functionality converts this to "ditto" and then the user types "voce" and so autocorrection functionality converts "ditto" back to "sotto," then at this point, the alterable decision regarding "sotto" will have a very high probability of alteration.

In an embodiment, when a user deletes the alterable block of a word replacement decision, it will not become a remembered alterable block for purposes of the automatic decision variation feature: instead, autocorrection functionality itself will be configured in such a way that if a user deletes a single word and then quickly retypes it by means of the exact same keystroke sequence as before, the interface will be biased against choosing the same outcome for the resulting alterable word replacement decision that it chose the previous time. Such behavior of autocorrection functionality is described below, in the explanation of a "retyping-sensitive candidate word algorithm."

Considering Letter Confidence in Word Replacement Decisions

In an embodiment, the interface will have an "accuracy-customizable candidate word algorithm" that can accept as input not only a candidate word and an autocorrection dictionary, but also additional data regarding whether or not the interface thinks that certain particular letters are likely to be desired in certain positions within the word. In particular, in an embodiment, the input for an accuracy-customizable candidate word algorithm may include information regarding whether the interface is more or less confident than usual that a user intended to type a particular letter that the user typed. In an embodiment, the input for an accuracy-customizable candidate word algorithm may include the information that the interface believes it is quite unlikely that a user will desire a particular letter in a particular position within the word. In an embodiment, the input for an accuracy-customizable candidate word algorithm may include the information that the interface is quite confident that a user did not intend to type a particular letter that the user typed, but still believes it is relatively likely that the user intended to type a keyboard-adjacent letter. In an embodiment, the input for an accuracy-customizable candidate word algorithm may include information regarding which letter or letters the interface believes are relatively likely to be the letter that a user intended if a particular letter that the user typed is not the letter the user intended to type, so that for example, if the interface keeps track of typing accuracy statistics that indicate whether or not a particular user who has mistakenly typed X is generally more likely to have intended to type the adjacent letter Z or the adjacent letter C, then if the accuracy-customizable candidate word algorithm is invoked with the input word "raxe," the algorithm can take such typing accuracy statistics into account in determining the suitability scores to assign to the candidate words "raze" and "race."

Those of ordinary skill in the art will understand how to modify a candidate word algorithm if necessary so that it becomes an accuracy-customizable candidate word algorithm as defined above. For example, consider a candidate word algorithm that calculates suitability scores by giving each candidate word 1 point for each letter that exactly matches the corresponding letter in the input word, 0.5 points for each letter that is keyboard-adjacent to the corresponding letter in the input word, 0.25 points for a letter that is keyboard-adjacent to a letter that is keyboard-adjacent to the letter in the input word, and 0 points for any other letter that does not match the corresponding letter in the input word. In an embodiment, instead of necessarily always using these values of 1, 0.5, 0.25, and 0 respectively in determining a number of points to score for every letter of a candidate word that corresponds to any letter in the input word, the candidate word algorithm is modified to use that set of four values when it has the usual level of confidence that a certain letter was typed correctly, but a different set of four values where the algorithm has additional information regarding a particular letter that is provided by the interface as described in the preceding paragraph. For example, when the interface is unusually confident that a certain letter was typed correctly, the candidate word algorithm may use the four values 1, 0.25, 0, and −1 respectively in determining points for that letter. When the interface is unusually uncertain as to whether a certain letter was typed correctly, the candidate word algorithm may use the four values 1, 0.75, 0.5, and 0.25 respectively in determining points for that letter. When the interface is quite confident that a user did not intend to type a particular letter that the user typed, but still believes it is relatively likely that the user intended to type a keyboard-adjacent letter, the candidate word algorithm may use the four values −1, 1, 0.5, and 0.25 respectively in determining points for that letter. When the interface believes that a particular user who has mistakenly typed X is generally more likely to have intended to type the adjacent letter Z then the adjacent letter C, the candidate word algorithm may use the four values 1, 0.5, 0.25, and 0 respectively in determining points for the letter X, with the modification that a candidate word with the keyboard-adjacent letter Z in place of X will receive 0.55 points instead of 0.5 points, and a candidate word with the keyboard-adjacent letter C in place of X will receive 0.45 points instead of 0.5 points. In addition to this example, those of ordinary skill in the art will understand how to modify other candidate word algorithms if necessary so that they become accuracy-customizable candidate word algorithms as defined above. Those of ordinary skill in the art will understand how to create a candidate word algorithm that will accept as input other gradations of certainty and appropriately incorporate these gradations into its calculation of suitability scores.

The behavior that is described above for an accuracy-customizable word algorithm is designed to facilitate unusually sophisticated correction of typographical errors; it is not designed to improve correction of spelling mistakes that are not typographical errors. Therefore, in an embodiment, an accuracy-customizable word algorithm will distinguish potential spelling mistakes from potential typographical errors that are extremely unlikely to be spelling mistakes, and when the accuracy-customizable word algorithm takes into account additional information in assigning suitability scores to candidate words as described above, it will not thereby reduce the score that is assigned to a potential spelling mistake. Such a distinction need not necessarily be implemented in an especially sophisticated way. For example, in an embodiment, an accuracy-customizable word algorithm will regard the substitution of any vowel for any other vowel as a potential spelling mistake provided that the vowel is not the first or last letter of the word, but will not regard a letter substitution as a potential spelling mistake in any other circumstances. When such an algorithm is invoked, if its input is the word "herin" and its input also includes the information that the interface is extremely confident that the user intended to type the letter "i" as the fourth letter of that word, then the interface may nevertheless assign a very high suitability score to the candidate word "heron"; but if its input is the word "soli" and its input also includes the information that the interface is extremely confident that the user intended to type the letter "i" as the fourth letter of that word, then the interface will not assign a high suitability score to the candidate word "solo."

Discouraging Autocorrection from Suggesting Candidates Twice

In an embodiment, if the interface presents a user with a list of candidate words before the user has necessarily finished typing a word, and the user explicitly selects such a candidate word (such as by touching such a candidate word), then the resulting word replacement decision is not an alterable decision: the interface will assume the user selected the word that the user desired.

However, in an embodiment, in such circumstances, the interface will continue to remember what the user had typed before the user selected the candidate word and continue to remember what other candidate words had been visible in the list of candidate words at least until the user performs another action, so as to enable the behavior described in the following paragraph. In the following paragraph, whatever the user had typed before selecting the candidate word will be referred to as "the partial word" (without regard to whether or not it was actually a complete word), and the other candidate words that had been visible in the list of candidate words will be referred to as "the rejected candidate words." The candidate word the user selected will be referred to as "the previous word."

In an embodiment, if the interface presents a user with a list of candidate words before the user has necessarily finished typing a word, and the user explicitly selects such a candidate word, and then the user actuates the backspace key with a low deliberation score, and then the interface presents the user with another list of candidate words that are potential replacement words for the previous word, then the interface will follow special rules in determining what candidate words to include in a list of potential replacement words for the previous word. In particular, in an embodiment, in such circumstances, when autocorrection functionality invokes a candidate word algorithm in order to determine suitability scores for potential replacement words, the candidate word algorithm will be an accuracy-customizable word algorithm, and the interface will inform the candidate word algorithm algorithm that it is extremely likely that each and every letter that was in both the partial word and the previous word is a letter the user desires. In an embodiment, if selecting the previous word extended the length of the partial word by at least three letters, then the interface will also inform the candidate word algorithm that those added letters also have an enhanced likelihood of being desired letters, but this enhanced likelihood will taper off gradually so that it is zero for, say, the last two letters of the previous word. For example, in an embodiment, if a user types the partial word "imp" and then selects the candidate word "impossible" and then immediately actuates the backspace key, the interface will inform the candidate word algorithm that the letters "imp" are extremely likely to be letters the user desires, and the letter "o" is also unusually likely to be a letter the user desires but not quite as likely, and the first letter "s" has slightly less enhanced likelihood, and so on until the letter "l" which has no enhanced likelihood at all. In an embodiment, in such circumstances, after the candidate word algorithm returns a candidate word list, the interface will substantially reduce the suitability score of any word that was a rejected candidate word. Therefore, for example, in an embodiment, if a user wishes to type "impossibility" and begins by typing "imp," and the user then sees that the interface has suggested the replacement words "imperfect," "impossible," and "impossibly," and the user then selects the replacement word "impossible" and immediately presses the backspace key, then when the interface determines a new set of replacement words to suggest, the interface will be biased towards suggesting words that start with a set of letters that are quite similar to the word "impossible," except that the interface will be biased against suggesting "impossibly" again; as a result, it is quite likely that the interface will immediately suggest "impossibility."

In an embodiment, if the interface presents a user with a list of candidate words before the user has necessarily finished typing a word, and the user explicitly selects one of the candidate words, and then the user actuates the backspace key with a low deliberation score, and then the interface presents the user with another list of candidate words that are potential replacement words for the previous word, and then the user continues to repeatedly actuate the backspace key, then after each such actuation of the backspace key, until the previous word has been deleted entirely, for purposes of determining another set of replacement words to suggest, the interface will still reduce the suitability score of any word that was a rejected candidate word by the same amount that it reduced the suitability score of such words after the first actuation of the backspace key. (Of course, the interface will still suggest such a word as a replacement word if somehow its suitability score is higher than other candidate words' suitability scores even after this reduction.)

Adjusting Letter Confidence Based on User Behavior

In an embodiment, when a user types a sequence of letters and the interface invokes a candidate word algorithm in order to make a word replacement decision, the candidate word algorithm the interface uses is an accuracy-customizable candidate word algorithm, and the interface will inform that algorithm of its confidence regarding each letter the user typed, where such confidence is based on the deliberation score of the keystroke by which the user types that letter: if a keystroke had a high deliberation score, then the interface will inform the candidate word algorithm that it is unusually confident that that letter was typed correctly; if the keystroke had a low deliberation score, then the interface will inform the candidate word algorithm that is unusually uncertain as to whether that letter was typed correctly; and so forth.

In such an embodiment, a user may be able to deliberately pause between keystrokes as a means of controlling the behavior of autocorrection functionality. For example, in an embodiment, if a user types "har" very rapidly then the interface will replace it with "hat," but if the user deliberately types "har" quite slowly then the interface will not replace it.

In Chapter 12, an embodiment is mentioned in which the interface determines in certain circumstances whether certain keystrokes were accurate keystrokes or whether they were missed keystrokes, in order to more accurately calibrate the decision scores that are assigned to input actions for a particular user, so that if for example a user frequently makes typographical mistakes when typing at a speed of 0.3 seconds per keystroke than the deliberation score that is assigned to a keystroke that occurs 0.3 seconds after the previous keystroke will be a low deliberation score. However, the circumstances in which keystrokes are determined to be accurate keystrokes or missed keystrokes were not described in Chapter 12: they are described below. Specifically, an embodiment is described below that makes use of the manual alteration detection feature and/or other interface functionality in order to attempt to accurately determine whether or not a sequence of letters that a user types ultimately is shown to have included one or more typographical errors; in an embodiment, the interface may even recognize a typographical error if a user does not correct the mistake until quite a while after he made the mistake. An embodiment that is described below may also be able to determine for each keystroke that is determined to be a missed keystroke what was the intended target, so as to gather typing accuracy statistics regarding what letters are more likely to be intended targets when a particular keystroke is a missed keystroke.

Therefore, in an embodiment, when a user types a sequence of letters and the interface invokes the candidate word algorithm in order to make a word replacement decision, the candidate word algorithm the interface uses is an accuracy-customizable candidate word algorithm, and the interface will inform that algorithm not only of its overall confidence regarding each letter the user typed, but also of what letters are relatively likely to be the intended target or relatively unlikely to be intended the target if a particular letter is a missed keystroke.

Evaluating Word Replacement Decisions

In an embodiment that has the manual alteration detection feature as described in Chapter 18, if the interface makes an alterable word replacement decision and a little while later the user notices the decision had an undesired result and the user manually edits the word in order to achieve the desired result, if the edited result was an alternate option of the alterable word replacement decision, then the interface may consider its initial alterable word replacement decision to have had a non-beneficial outcome and consider the edited result to be the outcome that would have been beneficial.

In an embodiment, whenever a user manually edits a word that is the alterable block of an alterable word replacement decision, if the edited result is sufficiently similar to the word as it was originally typed that the edited result could reasonably have been what the user originally intended to type, then even if the edited result was not an alternate option of the alterable word replacement decision, the interface will still consider its initial alterable word replacement decision to have had a non-beneficial outcome and consider the edited result to be the outcome that would have been beneficial. Those of ordinary skill in the art will understand various ways to measure whether an edited result is "sufficiently similar" to a word as it was originally typed: various prior art autocorrection algorithms measure word similarity in various ways, and this is just a different application of such a similarity measurement. For example, in an embodiment, if a user types "pwnef" and the interface alterably replaces that word with "owned," and the alternate options of this alterable word replacement decision are "pwnef" and "owner," then if the user manually edits this to yield "pwned," the interface will consider its initial alterable word replacement decision to have had a non-beneficial outcome and consider "pwned" to be the outcome that would have been beneficial.

In an embodiment, for purposes of the behavior described in the preceding paragraph, each time a user finishes manually typing a word and the interface's autocorrection feature is thus invoked, if the interface decides not to replace the word the user typed and this decision is not alterable, then the word the user typed will be treated as the alterable block of a pseudo-alterable word replacement decision that has no alternate options and has a probability of alteration that is initially exceptionally low. In an embodiment, such a pseudo-alterable interface decision is not actually alterable, but its probability of alteration will decrease as the attention score of its alterable block increases until its probability of alteration drops below a certain threshold and it is deleted, just as though it were an actual alterable decision. In other words, in such an embodiment, for a little while after a user finishes manually typing a word, if the user manually edits the word, the interface may consider its decision not to replace the word the user typed to have had a non-beneficial outcome and consider the edited result to be the outcome that would have been beneficial, regardless of whether or not the interface's decision not to replace the word was actually an alterable decision.

In an embodiment, if a user performs a sequence of consecutive destructive actions that deletes exactly one word and does not delete any characters before the word, if the user's next actions consist of typing a word, then for purposes of the behaviors described in the preceding paragraphs, the user will be considered to have manually edited the word that the user deleted in order to achieve the result that the user then typed. For example, in such an embodiment, if the word "good" is the alterable block of an alterable word replacement decision when a user selects the entire word and types "goof," the interface will consider the outcome "goof" to be the outcome that would have been beneficial for the alterable word replacement decision.

In an embodiment, whenever the interface makes an alterable word replacement decision (or a pseudo-alterable word replacement decision), it will remember the sequence of letters that the user actually typed until the decision is deleted. In an embodiment, it will also remember the amount of time that elapsed since the user's previous action before the user typed each letter. When the interface evaluates the outcome of the decision, if the letters that the user actually typed exactly match the letters of the outcome that would have been beneficial except that certain particular letters that the user actually typed are one or two keyboard positions away from the letters that would have been beneficial, then the interface will determine the letters that the user actually typed that exactly match the letters of the outcome that would have been beneficial to be accurate keystrokes and will determine the other letters to be missed keystrokes, and will update its typing accuracy statistics accordingly. In an embodiment, for such purposes, if the outcome that would have been beneficial is longer than the sequence of letters that the user actually typed, the excess letters will be ignored.

For example, in an embodiment, if the interface makes an alterable decision to replace the word "degretta" with "regrettably," and eventually that alterable decision's probability of alteration drops low enough that the interface considers it to have had a beneficial outcome and deletes the decision, then the interface will determine that the letter d at the beginning of the sequence of letters that the user actually typed was a missed keystroke, and the letter r was the intended target. The interface will also determine that the letters in "egretta" were accurate keystrokes. The interface will then update its typing accuracy statistics so as to be able to more realistically estimate, for example, how likely it is that a typed letter D was actually intended as a letter R when the user types it with a particular deliberation score.

Considering Backspace in Word Replacement Decisions

In an embodiment, while a user is typing a word, the interface will keep track of the keystroke sequence by which the user types the word, and when autocorrection is invoked, in order to determine candidate replacement words and assign them scores, the interface may take into account not only the actual sequence of letters of the input word, but also other details of the keystroke sequence that was used in order to type those letters, including any occurrences of the backspace key. For example, in an embodiment, if a user has typed "bur," the interface may assign different scores to various candidate replacement words if the user typed "bur" by means of the keystroke sequence B U R than it would assign if the user typed "bur" by means of the keystroke sequence B U T backspace R. Furthermore, in an embodiment, if a user begins to type a word and then backspaces sufficiently far to delete the entire word the user typed, if the user then immediately types another word, then in order to determine candidate replacement words and assign them scores, the interface may take into account other details of the keystroke sequence involved in such behavior, including the character or characters that were typed before the user backspaced the entire word, and including the backspace keystrokes. For example, in an embodiment, if a user has typed "gar," the interface may assign different keystrokes to various candidate replacement words if the user typed "gar" by means of the keystroke sequence G A R that it would assign if the user typed "gar" by means of the keystroke sequence F backspace G A R.

Therefore, in an embodiment, the input for various candidate word algorithms that are described below may include not only an input word but also information regarding the keystroke sequence that was used in order to type the input word. In particular, for each type of candidate word algorithm that is explained below that handles backspace keystrokes in a special way, the input for that type of candidate word algorithm may include information regarding the keystroke sequence that was used in order to type the input word, in order for that type of candidate word algorithm to be able to receive information regarding backspace keystrokes.

In an embodiment, the interface will include a "backspace-sensitive candidate word algorithm." The backspace-sensitive candidate word algorithm will itself make use of an accuracy-customizable candidate word algorithm that does not itself take into account backspacing; this accuracy-customizable candidate word algorithm will be referred to as "the underlying candidate word algorithm" in the following description of the backspace-sensitive candidate word algorithm.

In an embodiment, whenever the backspace-sensitive candidate word algorithm receives as input a keystroke sequence, it will determine the resulting word that the user eventually typed, and it will invoke the underlying candidate word algorithm with that word as input and return the results provided by the underlying candidate word algorithm.

However, in an embodiment, when the backspace-sensitive candidate word algorithm invokes the underlying candidate word algorithm, if the keystroke sequence it receives as input includes at least one backspace keystroke, then for each backspace keystroke that is not immediately followed by another backspace keystroke, the interface will inform the underlying candidate word algorithm that it is quite unlikely that the user will desire a word that has the letter that was thus backspaced and has that letter in the same position that it was in before it was backspaced, unless that letter was subsequently retyped in that same position with a high deliberation score, or unless after that backspace keystroke occurred the user performed some other action before retyping that letter in that same position. For example, in an embodiment, if a user types "ji" and then backspaces once and then very quickly types "ib" and actuates the space bar, then the backspace-sensitive candidate word algorithm may determine that it is actually more likely the user intended to type "job" rather than "jib."

In an embodiment, when the backspace-sensitive candidate word algorithm invokes the underlying candidate word algorithm, for any letter of the word the user typed such that the user did not backspace the letter but did backspace a letter immediately to its right, the interface will inform the underlying candidate word algorithm that it is much more confident than usual that the user intended to type that letter. Additionally, in an embodiment, the interface will inform the underlying candidate word algorithm that it is slightly more confident than usual that the user intended to type any letter that is immediately to the left of such a letter. For example, in an embodiment, if a user types "pqned" and then backspaces four times and then types "wned" and actuates the space bar, then the backspace-sensitive candidate word algorithm may determine that it is reasonably likely the user deliberately chose to type "pwned" instead of the common English word "owned."

Considering Deleted Letters in Word Replacement Decisions

In an embodiment, if a user selects a single word and then begins typing, so that the word that was previously present becomes deleted when the user begins typing, then the interface will remember the word that was previously present, and when autocorrection is invoked, in order to determine candidate replacement words and assign them scores, the interface not only may take into account information regarding the keystroke sequence that was used in order to type the input word, but also may take into account the word that was deleted when the user began typing the input word.

In an embodiment, the interface will include a "retyping-sensitive candidate word algorithm." The retyping-sensitive candidate word algorithm will itself make use of another candidate word algorithm such as the backspace-sensitive candidate word algorithm described above, or some other candidate word algorithm; this other candidate word algorithm will be referred to as "the underlying candidate word algorithm" in the following description of the retyping-sensitive candidate word algorithm.

In an embodiment, whenever the retyping-sensitive candidate word algorithm receives as input a keystroke sequence that does not include any backspace keystrokes, the retyping-sensitive candidate word algorithm will simply invoke the underlying candidate word algorithm and return its results.

In an embodiment, whenever the retyping-sensitive candidate word algorithm is invoked, if it receives as input a keystroke sequence that includes at least one backspace keystroke, the algorithm will determine a list of input words to be analyzed. This list of input words will include a primary input word that consists of the actual word the user eventually typed, and will also include a list of auxiliary input words consisting of each version of the word that existed immediately before the user actuated the backspace key one or more consecutive times, in a sequence from the most recent version of the word to the oldest version. Additionally, if the retyping-sensitive candidate word algorithm also received as input a word that was deleted when the user began typing the input word, then that deleted word will be included as the last of the auxiliary input words. For example, if a user selects the word "sjit," types "a," backspaces once, types "shot," backspaces twice, types "iy," and finally presses the space bar, then the primary input word will be "shiy" and the auxiliary input words will be "shot," "a," and "sjit."

In an embodiment, each auxiliary input word will be assigned a relevance percentage; for example, in an embodiment, the first auxiliary input word will be assigned a relevance percentage of 50%, and any and all auxiliary input words after the first (which are older versions of the word than the first auxiliary input word) will be assigned a relevance percentage of 25%.

In an embodiment, after the retyping-sensitive candidate word algorithm determines such a list of input words to be analyzed, it will invoke the underlying candidate word algorithm with the primary input word as input. If the underlying candidate word algorithm is the backspace-sensitive candidate word algorithm, then the retyping-sensitive candidate word algorithm will inform that algorithm of the entire keystroke sequence that was used to type the primary input word, including backspace keystrokes; otherwise, it will inform that algorithm of only the keystrokes that resulted in the letters that are actually present. The retyping-sensitive candidate word algorithm will save the resulting candidate word list as the "primary candidate word list."

In an embodiment, after determining the primary candidate word list, the retyping-sensitive candidate word algorithm will substantially reduce the suitability score of any candidate word that is or that begins with an auxiliary input word, unless after the user typed the auxiliary input word and backspaced it the user performed at least one action that had a high deliberation score, or unless there is currently a monitored alterable decision (in which case the user may be deliberately retyping a word in order to invoke the decision variation feature). For example, in an embodiment, if a user types "rare" and then very rapidly backspaces and then retypes the last two letters "re" and presses the space bar, then the retyping-sensitive candidate word algorithm will not assign a very high suitability score to the candidate word "rare" (assuming there is currently no monitored alterable decision), but if a user types "rare" and then backspaces twice and then pauses before retyping "re" and pressing the space bar, then the retyping-sensitive candidate word algorithm may assign a relatively high suitability score to the candidate word "rare."

Subsequently, in an embodiment, the retyping-sensitive candidate word algorithm will invoke the underlying candidate word algorithm once for each of the auxiliary input words; if the underlying candidate word algorithm is the backspace-sensitive candidate word algorithm, it will inform that algorithm of the entire keystroke sequence that resulted in the auxiliary input word. The retyping-sensitive candidate word algorithm will examine each resulting auxiliary candidate word list to see whether it contains any candidate word that is also in the primary candidate word list; if so, then for each such candidate word, the retyping-sensitive candidate word algorithm will increase the suitability score of the candidate word in the primary candidate word list by an amount equal to the relevance percentage of that particular auxiliary input word multiplied by the suitability score of the candidate word in the auxiliary candidate word list.

For example, in an embodiment, if a user types "bpot" and then backspaces three times and then rapidly types "oor" and presses the space bar, then when the retyping-sensitive candidate word algorithm processes the auxiliary input word "bpot," this may cause the retyping-sensitive candidate word algorithm to add a substantial bonus to the suitability score of the word "boot," so then depending on the details of the embodiment, the retyping-sensitive candidate word algorithm may determine that it is actually more likely the user intended to type "boot" rather than "boor," or at least may increase the probability of alteration of the alterable word replacement decision if it alterably decides against replacing "boor" with "boot."

Considering Accidental Backspace in Word Replacement Decisions

In an embodiment, the interface will include a "enhanced typo-correcting candidate word algorithm." The enhanced typo-correcting candidate word algorithm will make use of a "backspace-branching" candidate word algorithm that itself makes use of another candidate word algorithm such as the retyping-sensitive candidate word algorithm described above, or some other candidate word algorithm; this other candidate word algorithm will be referred to as "the underlying candidate word algorithm" in the below description of the backspace-branching candidate word algorithm.

In an embodiment, the underlying candidate word algorithm that is used by the backspace-branching candidate word algorithm is modified if necessary so as to be able to receive as input an input word that includes a character that does not match any letter of any word in the autocorrection dictionary, and so as to then treat such a character as though it were an unusual letter that was typed by means of pressing a key that happens to be at the exact same location as the backspace key. Those of ordinary skill in the art will understand how to modify any particular underlying candidate word algorithm as necessary. Such a character is referred to below as "the backspace typo letter." For example, in an embodiment where the backspace key is immediately adjacent to the M key and where the underlying candidate word algorithm takes into account keyboard adjacency in determining suitability scores, if the character θ serves as the backspace typo letter, then the underlying candidate word algorithm may receive as input the input word "impleθentation" and then assign quite a high suitability score to the candidate word "implementation" because the candidate word "implementation" could be generated by replacing just a single letter of the input word with a letter that is keyboard-adjacent.

In an embodiment, when the enhanced typo-correcting candidate word algorithm is invoked, if the keystroke sequence that it receives as input includes at least one backspace keystroke that is not immediately preceded nor immediately followed by another backspace keystroke, then it will replace every such backspace keystroke with a "marked backspace keystroke." After that, in an embodiment, to prevent excess consumption of processing time, if more than three marked backspace keystrokes are in the keystroke sequence then the interface will replace the marked backspace keystroke with the highest deliberation score (or in case of tie, the one with the highest deliberation score that occurred first) with an ordinary backspace keystroke, and will repeatedly do so until there are only three marked backspace keystrokes. The enhanced typo-correcting candidate word algorithm will then invoke a backspace-branching candidate word algorithm that behaves as described below, and will then return the resulting candidate word list.

Figure 20A:
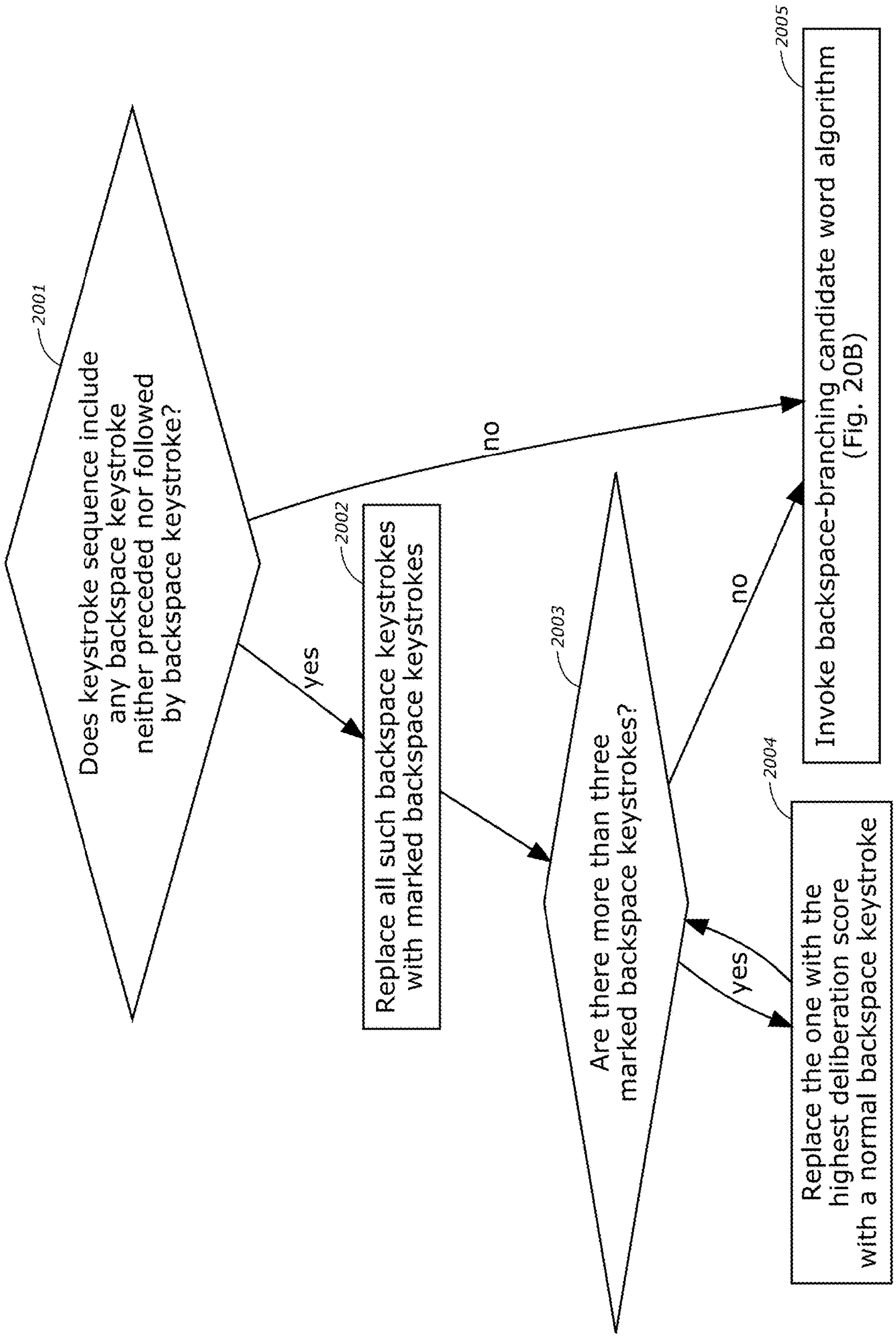
FIGS. 20A and 20B are flowcharts that illustrate an example method that occurs when an enhanced typo-correcting candidate word algorithm is invoked, according to one embodiment.

FIG. 20A is a flowchart that illustrates the process that occurs when the enhanced typo-correcting candidate word algorithm is invoked, in an embodiment. The process begins with Block 2001 which asks, "Does keystroke sequence include any backspace keystroke neither preceded nor followed by backspace keystroke?" If the answer is no, the interface will invoke the backspace-branching candidate word algorithm, which is described further in FIG. 20B (Block 2005). If the answer is yes, the interface will replace all such backspace keystrokes with marked backspace keystrokes (Block 2002). The process continues in Block 2003, which asks, "Are there more than three marked backspace keystrokes?" If the answer is no, then the interface will invoke the backspace-branching candidate word algorithm previously mentioned (Block 2005). If the answer is yes, then the interface will replace the one with the highest deliberation score with a normal backspace keystroke (Block 2004) and will repeatedly do so until there are only three marked backspace keystrokes (as illustrated by the arrow returning to Block 2003).

In an alternative embodiment, as an exception to the behavior described above, a backspace keystroke that has a high deliberation score will not be replaced with a marked backspace keystroke. (However, if the underlying candidate word algorithm takes into account deliberation scores, then it may not make much difference whether or not a backspace keystroke that has a high deliberation score is replaced with a marked backspace keystroke, since such a backspace keystroke is unlikely to be taken for a missed keystroke by the underlying candidate word algorithm.)

In an embodiment, whenever the backspace-branching candidate word algorithm receives as input a keystroke sequence that does not include any marked backspace keystrokes, the backspace-branching candidate word algorithm will simply invoke the underlying candidate word algorithm and return the resulting candidate word list.

In an embodiment, whenever the backspace-branching candidate word algorithm receives as input a keystroke sequence that includes at least one marked backspace keystroke, the backspace-branching candidate word algorithm will generate two distinct keystroke sequences based on the input sequence. In one of these keystroke sequences, the first marked backspace keystroke will be replaced with an ordinary backspace keystroke; this is the "intentional-backspace keystroke sequence." In the other, the first marked backspace keystroke will be replaced with the backspace typo letter; this is the "accidental-backspace keystroke sequence." After the backspace-branching candidate word algorithm generates these two distinct keystroke sequences, it will invoke itself twice, once with each of these two keystroke sequences as input, in order to generate two distinct candidate word lists: the "intentional-backspace candidate word list" and the "accidental-backspace candidate word list." The algorithm may then reduce the suitability scores of all the words in the intentional-backspace candidate word list as explained in the following paragraph. The algorithm will then combine the two resulting candidate word lists into one combined candidate word list that includes every candidate word that was in either of the two distinct lists. For any candidate word that is in both lists, the candidate word's suitability score in the combined candidate word list will equal the greater of its two suitability scores from the two distinct lists. The backspace-branching candidate word algorithm will then return the resulting combined candidate word list.

In an embodiment, as a special case, after the backspace-branching candidate word algorithm generates two distinct candidate word lists as described in the preceding paragraph, before it combines the two resulting candidate word lists into one combined candidate word list, if the marked backspace keystroke had a low deliberation score then the suitability scores of all the words in the intentional-backspace candidate word list will be reduced by a certain percentage. If the marked backspace keystroke had a very low deliberation score, then those suitability scores will be reduced even more. Thus, for example, if a user types "wo" and then very rapidly presses the backspace key and types "an," then the candidate word "wan" may not receive an extremely high suitability score even though it is exactly what the user typed. This reflects the fact that it generally takes a little extra time to notice and react to a typographical error, and so a backspace keystroke with a very low deliberation score is less likely to actually be an intentional backspace keystroke.

In an embodiment, when the backspace-branching candidate word algorithm generates two distinct candidate word lists and combines them into one combined candidate word list, the combined candidate word list will also include information for each word in the combined candidate word list that indicates whether that word came from the intentional-backspace candidate word list or from the accidental-backspace candidate word list. If a word was in both candidate word lists then it will be identified as though it came from the candidate word list in which it had the higher suitability score; if it had an equally high suitability score in both candidate word lists then it will not be identified as coming from either candidate word list. If the interface ends up recognizing a word that came from the intentional-backspace candidate word list as the outcome that would have been beneficial for a word replacement decision, then it will regard that marked backspace keystroke as an accurate keystroke; if it ends up recognizing a candidate word that came from the accidental-backspace candidate word list as the outcome that would have been beneficial, then it will regard that marked backspace keystroke as a missed keystroke.

Figure 20B:
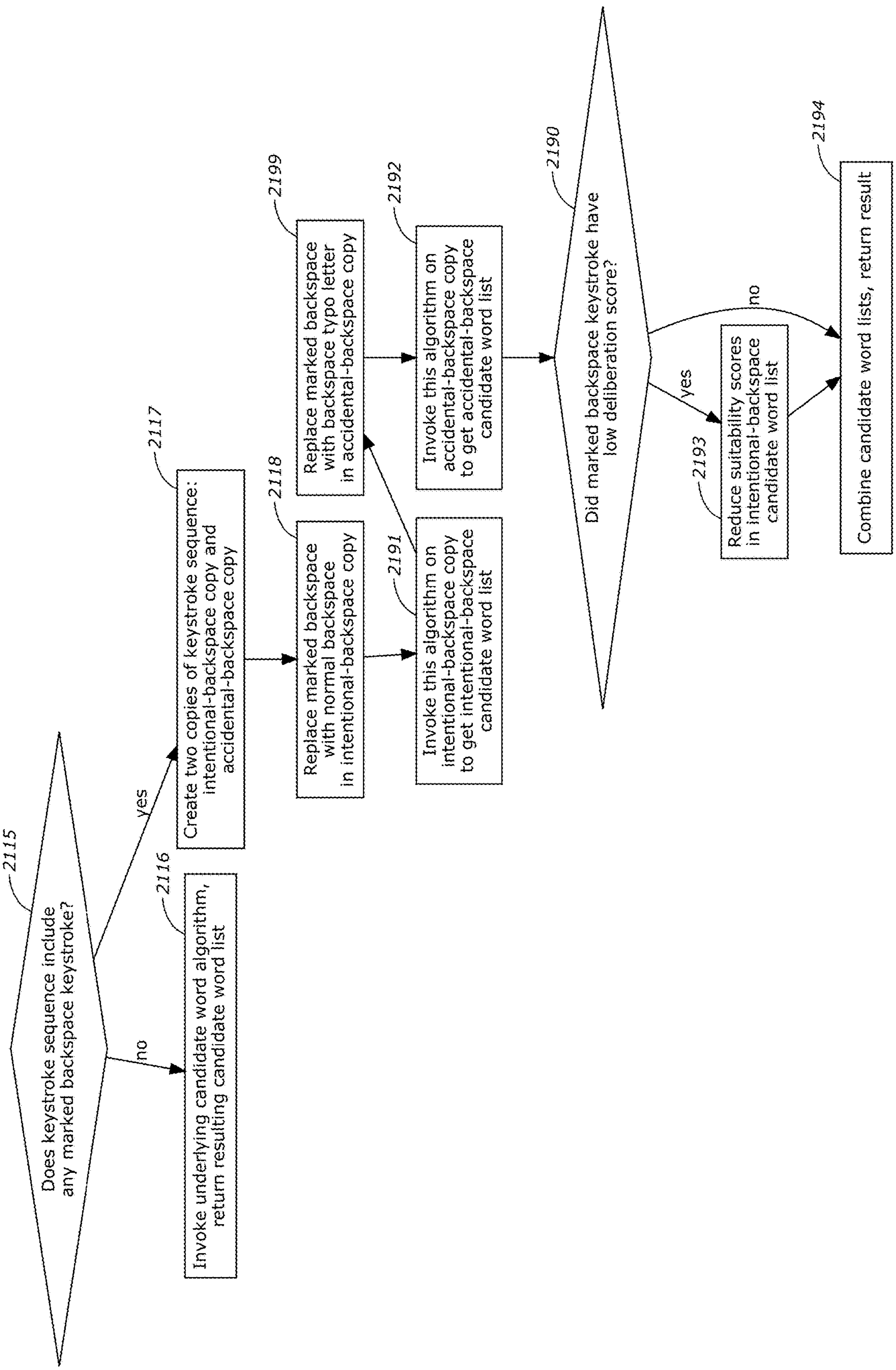

FIG. 20B is a flowchart which illustrates the behavior of the backspace-branching candidate word algorithm, in an embodiment. The process begins with Block 2006, which asks, "Does keystroke sequence include any marked backspace keystroke?" If the answer is no, the algorithm will simply invoke the underlying candidate word algorithm and return the resulting candidate word list (Block 2007). If the answer is yes, the backspace-branching candidate word algorithm will create two copies of the keystroke sequence (Block 2008). Subsequently, in one copy the algorithm will replace the first marked backspace keystroke with a normal backspace keystroke to create the intentional-backspace copy (Block 2009). The algorithm will invoke itself on the intentional-backspace copy to generate the intentional-backspace candidate word list (Block 2010). Similarly, in the second copy, the algorithm will replace the first marked backspace keystroke with the backspace typo letter to create the accidental-backspace copy (Block 2011). The algorithm will invoke itself on the accidental-backspace copy to generate the accidental-backspace candidate word list (Block 2012). The process continues in Block 2013, which asks, "Did marked backspace keystroke have low deliberation score?" If the answer is yes, then the algorithm reduces the suitability scores in the intentional-backspace candidate word list (Block 2014), combines the candidate word lists, and returns the resulting combined candidate word list (Block 2015). If the answer is no, then the algorithm combines the candidate word lists without adjusting suitability scores and returns the result (Block 2015).

For example, in an embodiment, if the keystroke sequence that the backspace-branching candidate word algorithm receives as input consists of "imple" followed by a marked backspace keystroke with a low deliberation score followed by "entation," then it will generate two distinct keystroke sequences. One of these keystroke sequences will consist of "imple" followed by an ordinary backspace keystroke followed by "entation"; this is essentially the input word "implentation," along with additional information regarding the exact keystroke sequence that was used to type the input word "implentation." The other keystroke sequence will consist of "impleθentation." The backspace-branching candidate word algorithm will then invoke itself twice, once with each of these two keystroke sequences as input. Neither of these two keystroke sequences now includes a marked backspace keystroke, so each of these invocations of the backspace-branching candidate word algorithm will now cause it to simply invoke the underlying candidate word algorithm. One of these invocations of the underlying candidate word algorithm may yield the candidate word "implantation" with a medium suitability score, and the other may yield the candidate word "implementation" with a high suitability score, so the backspace-branching candidate word algorithm (and ultimately the enhanced typo-correcting candidate word algorithm) may return a candidate word list that includes the word "implantation" from the intentional-backspace candidate word list and the word "implementation" from the accidental-backspace candidate word list. The word "implementation" may have a higher suitability score. If as a result the interface autocorrects the word to yield "implementation" and the user accepts this outcome, then the interface will regard that backspace keystroke as a missed keystroke.

Because the backspace-branching candidate word algorithm as described in the preceding paragraph is a recursive algorithm, if the algorithm receives an input a keystroke sequence that includes more than one marked backspace keystroke, it will end up invoking the underlying candidate word algorithm more than twice. For example, in an embodiment, if a user types "rember" by means of the keystroke "t," followed by an actuation of the backspace key, then the keystroke sequence "reme," then an actuation of the backspace key, and then the keystroke sequence "ber," then the underlying candidate word algorithm will be invoked four times, with the four input words "tθremeθber," "tθrember," "remeθber," and "rember." If the algorithm receives as input a keystroke sequence that includes three marked backspace keystrokes, it will end up invoking the underlying candidate word algorithm eight times; if it receives a keystroke sequence that includes four marked backspace keystrokes, it will end up invoking the underlying candidate word algorithm 16 times; and so forth. (This is why it may be desirable to replace marked backspace keystrokes in excess of a certain number with ordinary backspace keystrokes, as is described above.)

In an alternative embodiment, not only will the enhanced typo-correcting candidate word algorithm replace nonconsecutive backspace keystrokes with marked backspace keystrokes as described above, but also, whenever the enhanced typo-correcting candidate word algorithm receives as input a keystroke sequence that includes a sequence of exactly two consecutive backspace keystrokes that are preceded by at least two consecutive characters that are not backspace keystrokes, it will replace that pair of actuations of the backspace key with a pair of marked backspace keystrokes. When the backspace-branching candidate word algorithm receives as input a keystroke sequence that includes at least one pair of adjacent marked backspace keystrokes, it will generate two distinct keystroke sequences based on the input sequence; in one, the first such pair of marked backspace keystrokes will be replaced with a pair of ordinary backspace keystrokes, and in the other, the first such pair of marked backspace keystrokes will be replaced with two consecutive occurrences of the backspace typo letter. The backspace-branching candidate word algorithm will then invoke itself twice, combine the two resulting candidate word lists into one, and return the result, as described above. For example, in an embodiment, if the user types "er" by means of the keystroke sequence "ha" followed by two consecutive actuations of the backspace key followed by the keystroke sequence "er," then the underlying candidate word algorithm will be invoked once with the input word "haθθer" and once with the input word "er."

Word Replacement Improvements in Perspective

Word entry mistakes may be the most common of all mistakes that users of computing devices encounter, so even a slight improvement to an autocorrection functionality may be important. Even in an embodiment that does not facilitate altering alterable interface decisions, autocorrection functionality that makes use of the enhanced candidate word algorithms that are described above may have significant advantages over prior art.

In various prior art interfaces, after autocorrection fails to correct a word entry mistake or itself causes a word entry mistake, in certain circumstances a user can replace an incorrect word by means of just two gestures. For example, on an iPhone, after the iPhone replaces a word that a user typed with some other word, if the user subsequently backspaces to position the cursor after the replacement word, in certain cases a word replacement balloon graphic will appear that contains at least the word the user originally typed, and if the user then touches that original word then the iPhone will undo the replacement of that word. The present writer has often found this feature to be useful, but also has often found this feature to be annoyingly obtrusive: on numerous occasions, he has pressed the space bar on an iPhone just to trigger a desired autocorrection and then immediately backspaced the undesired space character, and was distracted by the undesired balloon graphic that then appeared. Also, even when this feature would be advantageous, this feature is not triggered if backspacing to position the cursor after the replacement word causes the replacement word to become united with the immediately following word; for example, if a user positions the input cursor immediately before the word "iPhone" and deliberately types "Cwazy" followed by a space character, and the iPhone replaces "Cwazy" with "Crazy," then backspacing once will yield "CrazyiPhone" and will not cause a word replacement balloon graphic to appear.

U.S. Pat. No. 8,074,172 describes an iPhone feature such that just a single touch of an undesired replacement word will undo the replacement; Chapter 6 briefly discusses the disadvantages of that feature and explains how the touch alteration feature described herein may be significantly more advantageous even for recovery from an undesired word replacement.

Generally, in various embodiments that make alterable word replacement decisions, if a word replacement decision has an undesired outcome, then various features that facilitate altering alterable interface decisions may enable the user to recover from the resulting word entry mistake, and may enable the user to do so more efficiently than prior art word entry mistake recovery features would. It may be extremely advantageous for word replacement decisions to be alterable decisions even in an embodiment where no other types of decisions are alterable decisions. However, in an embodiment where numerous other types of decisions are also alterable decisions as described herein, users may become accustomed to efficient alteration technology when they encounter word entry mistakes, and then they may find it especially intuitive and convenient to correct other types of mistakes by means of alteration technology.

Chapter 31: Other Autocorrection Improvements

Alterable Autoformatting Decisions

In the present specification, any decision whether or not to perform an autocorrection or automatic formatting action may be referred to as an "autocorrection decision." Generally, a "word replacement decision" is an autocorrection decision regarding whether or not to replace a word with a different word, and an "autoformatting decision" is an autocorrection decision that is not a word replacement decision.

Various types of autoformatting decisions are known to those of ordinary skill in the art. Generally, for any type of autoformatting decision, in the relevant circumstances where such an autoformatting decision may occur, a typical prior art interface will decide whether or not to perform the autocorrection or automatic formatting action based on whether or not the relevant setting is selected in an options menu somewhere. For example, in a prior art interface, when a user types "tuesday" and presses the space bar, the interface will automatically convert the first letter to lowercase if and only if the checkbox next to "Capitalize days of the week" is checked in a menu of AutoCorrect options.

In an embodiment of the present invention, when the interface decides whether or not to perform an autocorrection, the decision is an alterable decision. In an embodiment where pending autocorrections are highlighted differently than alterable blocks, it is thus possible for example that the word "tuesday" is highlighted as a pending autocorrection before a user presses the space bar, and then is automatically capitalized when the user presses the space bar, and is highlighted as an alterable block afterward.

In an embodiment, each particular type of autoformatting decision class is a distinct adaptive decision class. Therefore, in an embodiment, if a user repeatedly types days of the week that begin with lowercase letters and the interface's alterable decision to autocorrect such words is always non-beneficial, sooner or later the interface will begin to decide to not autocorrect such words; then if its decision to not autocorrect such words repeatedly turns out to be non-beneficial, it will change its mind again. As another example, in an embodiment, if a user double-clicks the space bar and the interface alterably decides to replace the first space character with a period, then if its decision to do so repeatedly turns out to be beneficial, eventually such decisions will have an extremely low probability of alteration.

Smarter Quotes

In various prior art interfaces, when a setting such as "Replace straight quotes with smart quotes" is selected in an options menu somewhere, if a user types an apostrophe that is immediately after a space character, the interface will automatically replace the apostrophe with a typographic left single quotation mark, which has the appearance of an apostrophe rotated 180°. Presumably due to this "smart quotes" feature, the present writer has frequently seen such typographic left single quotation marks used mistakenly where apostrophes should have been used; in fact, the first draft of the following paragraph contained such mistakes.

In an embodiment of the present invention, the interface has a list of recognized contractions that begin with apostrophes, such as 'em, 'til, 'cause, 'cept, and so forth, and when the interface makes an alterable decision to replace an apostrophe with a typographic left single quotation mark, if that left single quotation mark later comes to be at the beginning of a completed word that is in this list, then the interface will automatically alter the decision if possible so as to change that typographic left single quotation mark back to an apostrophe, or if that alterable decision no longer exists then the interface will make a new alterable decision to change that typographic left single quotation mark back to an apostrophe. In an embodiment, in either case, the interface will then assign the alterable decision a very low probability of alteration. For example, in an embodiment, if a user has typed the three characters 'em and has not pressed the space bar, then the apostrophe the user typed has been replaced with a typographic left single quotation mark, which is now highlighted as a pending autocorrection; if the user's next action is pressing the space bar, then the interface will alterably decide to change that typographic left single quotation mark back to an apostrophe.

Automatically Undoing Certain Autocorrections

In an embodiment, when a user types a quotation mark that is immediately after a single word that is immediately after another quotation mark, if typing this quotation mark triggers an alterable autocorrection decision, then after the autocorrection decision occurs but before the result is displayed, if the selected option of the decision would not be the word the user originally typed, then the interface will substantially increase the probability of alteration of the alternate option consisting of the word the user originally typed. In an embodiment, if such an increase would cause the probability of alteration of that option to become greater than the implicit default option probability, then the interface will accordingly select that option as the default outcome of the decision instead of the option that it would have selected. For example, in an embodiment, if a user types the word "tuesday" in lowercase letters without quotation marks then the interface will alterably decide to capitalize the word, and the decision will have a medium probability of alteration; but if the user types the word "tuesday" in lowercase letters within quotation marks, then the interface will instead alterably decide not to capitalize the word. As another example, in an embodiment, if a user types the word "druzz" without quotation marks then the interface will alterably replace this word with the word "frizz," and the decision will have a low probability of alteration; but if the user types the word "druzz" within quotation marks, then although the interface will still alterably replace this word with the word "frizz," the decision will have a high probability of alteration.

In an embodiment, when a user types "[sic]" in brackets, the interface will automatically italicize the word sic if possible (and if it is not already italicized), as an alterable autocorrection decision. In an embodiment, when a user types "[sic" (including the left bracket but not including a right bracket and not including quotation marks) followed by a space character or followed by a punctuation mark other than a right bracket, the interface will alterably decide to automatically insert a right bracket between "[sic" and the following character and to also italicize the word sic, so as to yield "[sic]" followed by the next character the user typed. In an embodiment, when a user types "[sic]" in brackets by some means (whether or not it is italicized), if the word immediately preceding that word is the alterable block of an alterable word replacement decision or other alterable autocorrection decision, and if that alterable autocorrection decision's selected option is not the word the user originally typed, then the interface will automatically alter that alterable autocorrection decision so as to select the word the user originally typed. For example, in an embodiment, if a user attempts to type "incorect [sic]," but when the user types "incorect" the interface alterably decides to replace this word with the word "incorrect," then if the user proceeds to type "[sic]," the interface will automatically alter its previous word replacement decision, thus yielding the result the user desires.

In an embodiment, when a user types a dot character (that is, a period character) immediately followed by a lowercase letter with no intervening space, the dot character becomes a URL indicator for purposes of the behavior described in the present paragraph. In an embodiment, when a user types an @ character, the @ character becomes a URL indicator for purposes of the behavior described in the present paragraph. In an embodiment, when a character becomes a URL indicator, for each word that is to the left of that URL indicator but is not to the left of any whitespace that precedes that URL indicator, if that word is the alterable block of an alterable word replacement decision or other alterable autocorrection decision, and if that alterable autocorrection decision's selected option is not the word the user originally typed, then the interface will automatically alter that alterable autocorrection decision so as to select the word the user originally typed. For example, in an embodiment, if a user attempts to type "Visit dont-autocorect-me.com" but when the user types the first hyphen character the interface alterably decides to automatically insert an apostrophe in the word "dont" and when the user types the second hyphen character the interface alterably converts the preceding word to "autocorrect," then if the user ignores these undesired autocorrections and continues to type, then when the user types the letter "c" of the suffix ".com," the dot character will become a URL indicator and the interface will automatically alter the two recent autocorrection decisions that had undesired outcomes, so the user can ultimately achieve the desired result by typing "dont-autocorect-me.com" exactly as it appears, without any need to take action to explicitly prevent or recover from undesired autocorrection. Furthermore, in an embodiment, the interface will always decide not to autocorrect any word that is to the right of a URL indicator and is not to the right of any whitespace that is after the URL indicator (although, in an embodiment, its decision to not autocorrect such a word will be an alterable decision if the word would otherwise have been autocorrected).

In an embodiment, in certain circumstances the interface will become "dot-autocorrection-resistant," and if the user actuates the dot key when the interface is dot-autocorrection-resistant, the interface will not autocorrect the word preceding the resulting dot character until the user actuates at least one more key, whereupon the interface will yield the same result it would have yielded at that point if it had not been dot-autocorrection-resistant in the first place. For example, in an embodiment, if a user types "smartish" and then actuates the dot key when the interface is not dot-autocorrection-resistant then the interface may alterably autocorrect the word "smartish" and yield a result such as "smarting," but if the user then types a lowercase letter immediately after the dot character then the dot character will become a URL indicator as described in the preceding paragraph and so the interface will alter that autocorrection decision and restore the word "smartish." If a user types "smartish" and then actuates the dot key when the interface is dot-autocorrection-resistant then the interface will not autocorrect the word "smartish" until the user actuates at least one more key, and if that next key is a lowercase letter then the dot character will become a URL indicator as described in the preceding paragraph and so the interface will yield the word "smartish" followed by a dot character followed by a lowercase letter, just as it would have yielded if the user had typed the same keystroke sequence when the interface was not dot-autocorrection-resistant. The advantage of such behavior is that when the interface is dot-autocorrection-resistant, a user who is typing a URL is less likely to be distracted by undesired autocorrections that are then automatically altered as described in the preceding paragraph. In an embodiment, the interface will be dot-autocorrection-resistant when and only when both it is the case that on the most recent previous occasion when the user actuated the dot key, the resulting dot character subsequently became a URL indicator as described in the preceding paragraph, and also it is the case that on the most recent previous occasion when the user entered a dot character that did not become a URL indicator, the user entered that dot character by means of double-clicking the space bar (which yielded a dot character followed by a space character). In other words, in such an embodiment, when a user's recent behavior suggests that the user may prefer to use the shortcut of double-clicking the space bar in order to type the period at the end of a sentence and may resort to the actual dot key only when typing a URL, the interface will be dot-autocorrection-resistant. Various alternative embodiments may use similar yet slightly different criteria to determine when to cause the interface to be dot-autocorrection-resistant; for example, in one alternative embodiment, the interface will be dot-autocorrection-resistant when and only when on each of the last five occasions when the user actuated the dot key, the resulting dot character subsequently became a URL indicator.

Autocorrection Improvements in Perspective

In prior art, various features facilitate recovery from undesired autocorrections. Chapter 11 mentions how it may be possible to undo an undesired autocorrection in certain prior art interfaces. Chapter 17 mentions that in certain prior art interfaces deleting a word that was autocorrected and retyping it may not necessarily repeat the same undesired autocorrection. Chapter 30 mentions prior art features that may facilitate recovery from word entry mistakes, including word entry mistakes that are undesired autocorrections.

In prior art Microsoft Word word processing software, after the invocation of certain autocorrection features, if the user moves either the input cursor or the mouse cursor onto the word that was autocorrected, a small and unobtrusive rectangle will appear underneath the start of that word; if the user then moves the mouse cursor onto this rectangle, the interface will display a small button with a lightning bolt icon; if the user then clicks this button, the interface will display a small menu of options that allow the user to undo the autocorrection and/or to access customization features. For example, if a user types "tuesday" in lowercase letters, Microsoft Word will automatically capitalize the word. If the user then moves the mouse cursor onto the word "Tuesday," a small rectangle will appear. If the user moves the mouse cursor onto the small rectangle, a small button with a lightning bolt icon will appear. If the user clicks the button, the following three options will appear: "Undo Automatic Capitalization," "Stop Auto-Capitalizing Names of Days," and "Control AutoCorrect Options." This feature thus may enable a user to belatedly correct an undesired interface intervention without moving the input cursor back to the location of the mistake, and may enable a user to adjust interface settings appropriately after an undesired interface intervention without the need to navigate through an extensive sequence of menus. In Microsoft Word, this feature is accessible after the invocation of the autocorrect feature that automatically capitalizes days of the week, or after the invocation of the autocorrect feature that fixes two consecutive capital letters at the start of a word, or after the invocation of the autocorrect feature that automatically converts 1/2 to ½, among other circumstances. However, this feature is not accessible after the invocation of the feature that automatically converts straight quotation marks to slanted quotation marks: after a quotation mark has been automatically converted to a slanted quotation mark, moving the mouse cursor onto the slanted quotation mark will have no special effect.

Undesired autocorrections may be among the most frustrating mistakes that users of computing devices encounter, so it may be extremely advantageous to make it even slightly easier for users to recover from undesired autocorrections. Many of the interface features described herein that pertain to alteration functionality were designed with alterable autocorrection decisions specifically in mind as a paradigm example of alterable decisions, and were specifically designed to be more advantageous than prior art features that facilitate recovery from undesired autocorrections.

In an embodiment, alterable autocorrection decisions may sometimes facilitate mistake correction even after the interface decides to not perform an autocorrection. In prior art, if for example a user unchecks the option "Capitalize days of the week" so the interface no longer performs that type of autocorrection, then the interface will not in any way facilitate capitalizing days of the week until the user checks that option again. By contrast, in an embodiment of the present invention, an interface decision to not perform an autocorrection may be an alterable decision, so for example even when the interface does not automatically capitalize a day of the week its decision not to do so may be an alterable decision, which means that the interface may facilitate such capitalization even when it does not actually perform the capitalization automatically. In prior art, if a user deactivates a particular type of autocorrection due to special circumstances, the user may not necessarily remember to reactivate that type of autocorrection when the special circumstances no longer obtain, and may not even remember that the interface has that type of autocorrection as an option. But in an embodiment of the present invention that has the manual alteration detection feature and adaptation functionality described in Part II, if a user deactivates a particular type of autocorrection due to special circumstances and later the user's behavior clearly indicates that it is no longer advantageous for that type of autocorrection to be deactivated, then the interface may automatically reactivate that type of autocorrection.

Highlighting Potential User Mistakes

In an embodiment, if a user types a word that is exceedingly rude and autocorrection functionality does not replace the word, the interface's decision not to replace the word will be an alterable word replacement decision with a sufficiently high probability of alteration to ensure that the word is a highlighted alterable block (at least temporarily). However, in an embodiment, such decisions are adaptive decisions, so if the interface's decision not to replace such a word repeatedly turns out to have a beneficial outcome, eventually the interface will stop highlighting such words.

In an embodiment, when a user types a word that is not is not in the autocorrection dictionary, if the interface decides not to replace that word (such as because no candidate word has a sufficiently high suitability score), then the interface's decision not to replace that word is an alterable decision with a high probability of alteration; if no suitable candidate replacement word is known to the interface, then the alternate option of such a decision is an undefined option.

In an embodiment, when a user types a word that is not in the autocorrection dictionary, if the interface decides not to replace that word, then the word will be distinctively highlighted in some way so as to indicate that it is a potentially misspelled word; for example, it may be underlined with a red squiggly underline. However, in an embodiment, whenever such a word is no longer the alterable block of an alterable interface decision, such highlighting will disappear, so if for example the user detectably stares at such a word for a while and then resumes typing without doing anything about the supposed mistake, such highlighting will disappear.

Similarly, in an embodiment, if the interface detects a supposed grammar mistake, then the mistake will be the alterable block of a special alterable decision such that altering the decision will cause the interface to bring up a dialog box explaining what it thinks is wrong and suggesting corrections. In an embodiment, such a supposed grammar mistake will be distinctively highlighted in some way; for example, it may be underlined with a green squiggly line. However, in an embodiment, whenever such a supposed mistake is no longer the alterable block of an alterable interface decision, such highlighting will disappear.

Chapter 32: Alterable Smart Capitalization

Capitalization Attribute Sets

In an embodiment, for purposes of the following discussion of capitalization behaviors, a "capitalization attribute set" is a set of data pertaining to capitalization behaviors. A location where an input cursor may become located may have a capitalization attribute set; an abbreviation may have a capitalization attribute set. In an embodiment, a capitalization attribute set includes an attribute that is either uppercase or lowercase and an attribute that is either alterable or non-alterable. For example, a location may be non-alterable lowercase, non-alterable uppercase, alterable lowercase, or alterable uppercase.

In an embodiment, every location where an input cursor may become located has a capitalization attribute set. By default, a location's capitalization attribute set will have the lowercase attribute and the non-alterable attribute, unless otherwise specified. In the following discussion of capitalization behaviors, locations will frequently be spoken of in terms of their capitalization attributes without explicit mention of a "capitalization attribute set." For example, a location may be said to be an "alterable uppercase location," which means that the location's capitalization attribute set includes the uppercase attribute and the alterable attribute. In the following discussion of capitalization behaviors, an "alterable capitalization location" is a location whose capitalization attribute set has the alterable attribute; that is, it is either an alterable uppercase location or an alterable lowercase location.

In an embodiment, in certain circumstances that are described below, an abbreviation's capitalization attribute set may affect a location's capitalization attribute set, and in certain circumstances a location's capitalization attribute set either may directly affect an interface decision regarding whether or not to capitalize a letter, or may affect an interface decision regarding whether or not to enter uppercase mode which may in turn affect the capitalization of the next letter a user types. Thus, in certain circumstances, a capitalization attribute set may affect the capitalization of a letter a user types. Generally, if a capitalization attribute set affects a letter's capitalization, then that letter's capitalization will be alterable if the capitalization attribute set included the alterable attribute, and will not be alterable otherwise. Such behavior is described in more detail below.

In an embodiment, a capitalization attribute set that includes the alterable attribute may include a probability of alteration, and if such a capitalization attribute set causes an alterable capitalization decision or a potentially alterable capitalization decision to exist, then that decision's probability of alteration will equal the probability of alteration in the capitalization attribute set, as described below.

In an embodiment, a capitalization attribute set that includes the alterable attribute may include a capitalization score. In such an embodiment, the capitalization attribute set will include either the uppercase attribute or the lowercase attribute depending on whether or not the capitalization score exceeds a certain capitalization threshold value, and the capitalization attribute set will include a high probability of alteration if the capitalization score is very close to the capitalization threshold value, or a low probability of alteration if the capitalization score is far from the capitalization threshold value, or will not include the alterable attribute at all if the capitalization score is extremely far from the capitalization threshold value. Thus, in such an embodiment, if such a capitalization attribute set affects an alterable interface decision, then the capitalization score will in effect serve as a decision score for a conditionally alterable threshold decision. In the following discussion of capitalization behaviors, if a means for determining a capitalization score is specified for a capitalization attribute set and no other information is specified about the capitalization attribute set, then it may be inferred that the uppercase or lowercase attribute, alterable or non-alterable attribute, and probability of alteration of that attribute set will all be derived from the capitalization score.

Whenever capitalization scores are discussed in the present disclosure, it will be assumed that a capitalization score that is above a certain capitalization threshold value will be associated with the uppercase attribute and a capitalization score that is below the capitalization threshold value will be associated with the lowercase attribute; however, those of ordinary skill in the art will understand that identical interface behaviors may instead be implemented by means of capitalization scores that work in the opposite fashion. For example, a table of abbreviations is described below such that each abbreviation in the table is assigned a specific capitalization score, and such that a high capitalization score is assigned to any abbreviation that usually occurs at the end of a sentence; those of ordinary skill in the art will understand that an identical interface behavior could instead be implemented by causing capitalization scores that are below the capitalization threshold value to be associated with the uppercase attribute and accordingly assigning a low capitalization score to any abbreviation that usually occurs at the end of a sentence.

In the following discussion of capitalization behaviors, when a capitalization attribute set is said to include the alterable attribute and the uppercase attribute, if no probability of alteration is specified and no capitalization score is specified, it may be inferred that the attribute set's capitalization score is above the capitalization threshold value by a moderate amount, in an embodiment where capitalization attribute sets have capitalization scores. Likewise, a capitalization attribute set that includes the alterable attribute and the lowercase attribute may be inferred to include a capitalization score that is below the capitalization threshold value by a moderate amount, unless otherwise specified.

Capitalization and Whitespace

In an embodiment, a location immediately after a single space character has the same capitalization attribute set as the location before that space character, except as otherwise specified below.

For purposes of the present paragraph, a tab character constitutes a "whitespace gap" if it is immediately after a non-whitespace character, and a sequence of two or more characters such that each of the characters is either a space character or a tab character constitutes a "whitespace gap" if it is immediately after a non-whitespace character; a single space character alone does not constitute a whitespace gap. In an embodiment, the location immediately after a whitespace gap has a capitalization attribute set that depends on the location before the whitespace gap: if the location before the gap is a non-alterable lowercase location, then the location after the gap is an alterable lowercase location; if the location before the gap is an alterable lowercase location or an alterable uppercase location, then the location after the gap is an alterable uppercase location; and if the location before the gap is a non-alterable uppercase location, then the location after the gap is also a non-alterable uppercase location.

In an embodiment, for purposes of the following paragraphs, a text document or other text region is separated into lines by newline characters; characters that are not separated by a newline character are considered to be on the same "line" even when they happen to be separated by a line break due to wordwrap. A "blank line" consists of a line that is empty or contains only whitespace characters. A "line of text" is a line that includes at least one non-whitespace character, so a blank line is not considered to be a "line of text." A line of text "ends uppercase" if the location after its last non-whitespace character is an uppercase location or if inserting a space character after its last non-whitespace character would cause the location after that space character to be an uppercase location; for example, if a line of text reads "This is a complete sentence.", then that line ends uppercase because inserting a space character after the period would cause the location after that space character to be an uppercase location. A line of text "ends lowercase" otherwise; for example, if a line of text reads "This sentence fragment is", then that line ends lowercase because the location after its last letter is a lowercase location and inserting a space character after that letter would cause the location after that space character to be a lowercase location.

In an embodiment, a location immediately after a newline character is an uppercase location. In an embodiment, such a location is not an alterable uppercase location, except as described in the following two paragraphs.

In an embodiment, the location immediately after a newline character is an alterable uppercase location if a line of text is above it somewhere and the nearest such line of text ends lowercase. In an embodiment, such a location has a high probability of alteration if the line immediately above it is a line of text that ends lowercase, or a low probability of alteration if the line immediately above it is a blank line.

In an embodiment, for any location immediately after a newline character, if the location is immediately followed by a lowercase letter and either there is no line of text above that location or the nearest such line of text ends uppercase, then every location that is sufficiently nearby (such as, in an embodiment, within 20 lines) and is immediately after a newline character and is an uppercase location is an alterable uppercase location.

Text Analysis

In an embodiment, the interface will attempt to determine when standard linguistic rules require that the next letter be capitalized, and will then automatically enter uppercase mode if it is likely that this would be helpful. Such behavior is described in detail below.

In an embodiment, the interface may distinguish a "sentence uppercase location" or "sentence alterable capitalization location" from a "title uppercase location" or "title alterable capitalization location." For example, in an embodiment, the location after "I know." is a sentence uppercase location, and the location after "Mrs." is a title uppercase location, as is explained below. For purposes of such an embodiment, any uppercase location or alterable capitalization location that is referred to in the present specification may be assumed to be a sentence uppercase location or sentence alterable capitalization location, except as otherwise specified.

The following three paragraphs describe text analysis algorithms that may sometimes help to determine whether a certain location should be a capitalization location, in an embodiment. Applications for these algorithms are mentioned farther below. When one of these text analysis algorithms is invoked, it need not necessarily provide a definitive result; instead, either the algorithm may provide a result and also return information regarding how confident the algorithm is in the result, or the algorithm may only return the information that it was unable to provide even a tentative result. The examples of such algorithms that are provided in the following three paragraphs are simplistic examples that may nevertheless be useful. Other such text analysis algorithms that are more intelligent can be created by those of ordinary skill in the art, and it may also be possible for the unusually skilled artisan to create an unusually intelligent text analysis algorithm.

In an embodiment, the interface includes a text analysis algorithm that can attempt to determine whether or not two portions of text are part of the same sentence (or sentence fragment). For example, in an embodiment, the interface includes a text analysis algorithm that determines with a high degree of confidence that if two portions of text are separated by a line break then they are not part of the same sentence, and determines with a high degree of confidence that if between two portions of text there is no line break and no sentence uppercase location or sentence alterable capitalization location that is actually followed by a capital letter, then the two portions of text are part of the same sentence. In an embodiment, such an algorithm determines with a high degree of confidence that if two portions of text are separated by a sentence uppercase location or sentence alterable capitalization location that is actually followed by a capital letter, then the two portions of text are not part of the same sentence.

In an embodiment, the interface includes a text analysis algorithm that can attempt to determine whether a particular portion of text that ends with a period is a complete sentence in English or is only a sentence fragment. For example, in an embodiment, the interface includes a text analysis algorithm that determines with a high degree of confidence that a sequence of English words that does not include any verb is not a complete sentence, and that does not make any determination whether or not any other portion of text that ends with a period is a complete sentence.

In an embodiment, the interface includes a text analysis algorithm that can attempt to determine whether a particular portion of text that follows text enclosed in quotes is likely to be a continuation of a sentence that includes the quoted text, and that does not take into account whether or not the portion of text begins with a capital letter (because the algorithm will be used in situations where the user did not explicitly choose whether or not to capitalize that letter). For example, in an embodiment, the interface includes a text analysis algorithm such that if a particular portion of text follows text enclosed in quotes, and the beginning and ending of the portion of text are probably part of the same sentence, and the portion of text ends with a period or other sentence-ending punctuation, and the portion of text includes less than four words, and the last word of the text is a verb such as "asked," "said," or "exclaimed," then the text analysis algorithm will determine with confidence that the portion of text is likely to be a continuation of a sentence that includes quoted text. For example, such a text analysis algorithm will determine with a high degree of confidence that the last two words of "'Why?' he asked." are probably part of the same sentence as the quoted text "Why?".

Capitalization and Miscellaneous Punctuation

In an embodiment, if a colon is immediately followed by a space character, then the location immediately after that space character is an alterable lowercase location.

In an embodiment, if an uppercase location is immediately followed by an asterisk, then the location after the asterisk is an alterable uppercase location. In an embodiment, as an exception, within an instant messaging application, if an uppercase location that is at the beginning of a message is immediately followed by an asterisk, then the location after the asterisk is an alterable lowercase location.

In an embodiment, if a period, question mark, or exclamation point is immediately followed by a space character, then the location immediately after that space character is a non-alterable uppercase location, except as otherwise specified below.

In an embodiment, if an ellipsis that consists of three dots is immediately followed by a space character, then the location after that space character is an alterable uppercase location. In an embodiment, such an ellipsis may either consist of a single three-dot ellipsis character, or of three consecutive period characters, or of three period characters that are separated by single space characters. However, in an embodiment, any period character that is at the end of an ellipsis that consists of four dots is treated as an ordinary period character, so for example the location after "I know . . . ." is a non-alterable uppercase location.

Capitalization and Abbreviations

In an embodiment, if a user types a single lowercase letter followed by a period, the interface will alterably decide to convert that single lowercase letter to an uppercase letter. In an embodiment, for purposes of highlighting, such a change constitutes an autocorrection.

In an embodiment, if a word that consists of a single uppercase letter is immediately followed by a period that is immediately followed by a space character, then the location immediately after that space character is an alterable lowercase location if the word is immediately preceded by another word that begins with a capital letter and does not end with a period, or is an alterable uppercase location otherwise. For example, in such an embodiment, the location after "Jeff H." is an alterable lowercase location; the location after "J.R.R." is an alterable uppercase location.

In an embodiment, the interface initially has in memory a table of certain abbreviations that end with periods along with corresponding capitalization attribute sets, where each abbreviation's corresponding capitalization attribute set is based on the probability that an average user will want the word after that abbreviation to be capitalized, in the judgment of the interface designer. For example, if the interface designer believes that the average user will want the word after a certain abbreviation to be capitalized slightly less than half the time, then the interface designer will assign that abbreviation a capitalization score that is barely less than the capitalization threshold value, which means that the abbreviation's capitalization attribute set will include the alterable attribute and the lowercase attribute and a high probability of alteration. In an embodiment, when a user's input includes an abbreviation that is in such a table of abbreviations, if the abbreviation's ending period is immediately followed by a space character, then the location immediately after that space character has the same capitalization attribute set as the abbreviation's capitalization attribute set from the table of abbreviations.

In an embodiment, such a table of abbreviations will also include information regarding whether the abbreviation is a "title abbreviation," which is an abbreviation that is frequently followed by a proper noun. For example, the interface will recognize that abbreviations such as "Mr." and "Dr." are frequently followed by proper nouns. In an embodiment, for any occurrence of any title abbreviation, if the abbreviation's ending period is immediately followed by a space character and the location after that space character is an uppercase location or an alterable capitalization location, then that location is a title uppercase location or title alterable capitalization location.

In an embodiment, the capitalization scores of abbreviations are not constant but are variable, and can be adjusted by interface adaptation. In other words, in such an embodiment, each abbreviation in a table of abbreviations corresponds to a distinct adaptive decision class, so if for example the first time a user types "vs." and presses the space bar the interface decides to automatically switch to uppercase mode, and this occurs repeatedly and leads to a non-beneficial outcome each time, then eventually the interface will modify the capitalization score of "vs." sufficiently that the interface will then decide to remain in lowercase mode in such circumstances.

In an embodiment of the present invention, when a user's input includes an abbreviation that ends with a period that is in a table of abbreviations as described above and the period is immediately followed by a space character, then the interface will run a text analysis algorithm that attempts to determine whether or not the period is at the end of a complete sentence in English. If the algorithm is able to make a determination regarding whether or not the period is at the end of a complete sentence, then if the period is at the end of a complete sentence, then the interface will increase the capitalization score of the location after the space character; if the period is not at the end of a complete sentence and the abbreviation is not a title abbreviation, then the interface will decrease the capitalization score of the location after the space character. In an embodiment, any such increase or decrease of the capitalization score will be proportional to the confidence of the text analysis algorithm in its determination regarding whether or not the period is at the end of a complete sentence. For example, in an embodiment, the location after "I asked Wilson et al." is an alterable uppercase location because "et al." has a capitalization score that is slightly above the capitalization threshold value and the text analysis algorithm is unable to determine whether or not "I asked Wilson et al." is a complete sentence, but the location after "I asked. Wilson et al." is an alterable lowercase location because the text analysis algorithm determines with confidence that "Wilson et al." is not a complete sentence and "et al." is not a title abbreviation, and so the interface decreases the location's capitalization score substantially.

Capitalization and Quotes

In the following discussion of capitalization within and after quotation marks, examples of user input will contain quotation marks. For the sake of legibility, such examples will not themselves be enclosed in quotation marks, but will instead be enclosed in angle brackets. The angle brackets that enclose these examples are not themselves part of the examples.

In an embodiment, for purposes of the interface behaviors described in the following paragraphs, a “quotation mark” is either a double quote or a single quote (such as an apostrophe). In an embodiment, as an exception, the interface has a list of recognized contractions that begin with apostrophes, such as ’em, ’til, ’cause, ’cept, and so forth, and an apostrophe that is at the beginning of such a recognized contraction does not constitute a quotation mark for purposes of the interface behaviors described in the following paragraphs.

In an embodiment, if a comma is immediately followed by a space character that is immediately followed by a quotation mark, then the location after that quotation mark is an alterable uppercase location. For example, in an embodiment, the location after <She said, “> is an alterable uppercase location. In an embodiment, as an exception, if a comma is immediately followed by a space character that is immediately followed by a quotation mark, and if before that sequence of characters and after the most recent previous line break (if any) there is a region enclosed in quotes such the last character within the quotes is a comma, then the interface will run a text analysis algorithm that attempts to determine whether the most recent such region enclosed in quotes is part of the same sentence as the comma followed by the space character followed by the quotation mark, and if the interface determines with a high degree of confidence that the region is part of the same sentence, then the location after the quotation mark is an alterable lowercase location instead of an alterable uppercase location. For example, in an embodiment, the location after <“Because,” she said, “> is an alterable lowercase location.

In an embodiment, except as specified in the preceding paragraph, the location immediately after any quotation mark has the same capitalization attribute set as the location before the quotation mark. However, if a quotation mark is immediately followed by a space character, then special rules apply to the location immediately after that space character due to the presence of the quotation mark, as specified in the following paragraphs.

In an embodiment, if a period that is not part of an ellipsis is immediately followed by a quotation mark that is immediately followed by a space character, then the interface will determine what the capitalization score of the location after that space character would be if the quotation mark were not present, and the capitalization score of that location will equal what the capitalization score would have been if the quotation mark were not present plus an additional amount. For example, in an embodiment, if the location after <etc.> would be an alterable lowercase location with a capitalization score that is slightly below the capitalization threshold value, then the capitalization score of the location after <etc."> will exceed the capitalization threshold value, so the location after <etc."> will be an alterable uppercase location. If the location after <that.> would be a non-alterable uppercase location, then the location after <that."> will also be a non-alterable uppercase location.

In an embodiment, if a question mark or exclamation point or ellipsis is immediately followed by a quotation mark that is immediately followed by a space character, then by default the location after that space character is an alterable uppercase location with a high probability of alteration, and thus has a capitalization score that is slightly above the capitalization threshold value. However, in an embodiment, in such circumstances, if such a quotation mark is at the end of a region that is enclosed in quotes, then if the region enclosed in quotes is very short, the interface will slightly decrease that capitalization score; if the region enclosed in quotes is relatively long, the interface will slightly increase that capitalization score; and if the region enclosed in quotes is preceded by a space character that is preceded by a comma, the interface will slightly increase that capitalization score. For example, in an embodiment, the capitalization score of the location after <“Why?”> is lower than the capitalization score of the location after <He said, “You’re not going to explain, are you?”>

In an embodiment, if an alterable capitalization decision comes to exist because a user typed a letter after the input cursor became located at an alterable capitalization location, then while that alterable capitalization decision exists, if the interface modifies the capitalization score of that location then the interface will accordingly modify the alterable capitalization decision. If such an embodiment has the automatic alteration feature, then if the interface makes an alterable capitalization decision regarding a letter and then in response to subsequent user activity the interface changes the capitalization score of the location where that letter was typed, then the interface may even change that capitalization score so much that the interface automatically alters that decision. In particular, the following paragraph describes circumstances that may cause the interface to retroactively change a letter’s capitalization, in an embodiment.

In an embodiment, if a question mark or exclamation point or ellipsis is immediately followed by a quotation mark that is immediately followed by a space character, and if the location after that space character is an alterable capitalization location as explained above, then if that location comes to be followed by a portion of text such that a text analysis algorithm determines with a high degree of confidence that the portion of text not only follows text that is enclosed in quotes but also is likely to be a continuation of the sentence that includes the quoted text, then the interface will greatly decrease the capitalization score of that location. Similarly, if that location comes to be followed by a portion of text such that an algorithm determines with a low degree of confidence that the portion of text is likely to be a continuation of the sentence, then the interface will slightly decrease the capitalization score of that location, or if that location comes to be followed by a portion of text such that an algorithm determines that the portion of text is unlikely to be a continuation of the sentence, then the interface will increase the capitalization score of that location. In an embodiment, changing the capitalization score of such a location may cause the interface to retroactively change a letter’s capitalization, as explained in the preceding paragraph. For example, in an embodiment, if a user types <“Why?”> then the interface will enter alterable uppercase mode, but if the user continues to type without explicitly choosing whether or not the next letter should be uppercase and the user’s input comes to say <“Why?” He asked.> then the interface will automatically alter its capitalization decision so the result becomes <“Why?” he asked.>

In an embodiment, if a period or question mark or exclamation point or ellipsis is immediately followed by a sequence of two or more consecutive quotation marks that is immediately followed by a space character, then the interface will determine what capitalization score the location after the space character would have if only one quotation mark were present, and will substantially increase that location’s capitalization score for each quotation mark that is present beyond the first. Therefore, in such an embodiment, if that location would be an alterable lowercase location if only one quotation mark were present, then in most cases that location will be an alterable uppercase location; if that location would be an alterable uppercase location if only one quotation mark were present, then that location will be an alterable uppercase location with a low probability of alteration or an uppercase location that is not alterable at all.

Capitalization and Parentheses

In an embodiment, a location immediately after a left parenthesis or left bracket has the same capitalization attribute set as the location before that left parenthesis or left bracket. In an embodiment, a location that is immediately after a right parenthesis or right bracket is a non-alterable lowercase location; however, special rules may apply to a location that is after a space character that is after a right parenthesis or right bracket. Such rules are described in the following paragraphs.

In an embodiment, for purposes of the following paragraphs, a "parenthetical enclosure" consists of either a left parenthesis followed by a certain amount of text that includes at least one character and does not include any blank lines followed by a right parenthesis followed by a space character, or a left bracket followed by certain amount of text that includes at least one character and does not include any blank lines followed by a right bracket followed by a space character. Text that is "within" a parenthetical enclosure is between the parentheses or brackets, so for example "the first character within a parenthetical enclosure" is the first character after the left parenthesis or left bracket at the beginning of the parenthetical enclosure.

The following paragraphs explain how to determine the capitalization attribute set of the location after a parenthetical enclosure, in an embodiment. In the following paragraphs, if the interface is said to "ignore the right parenthesis for capitalization purposes," this means that the location immediately after the parenthetical enclosure has the same capitalization attribute set that it would have if the right parenthesis were not present, except as otherwise specified. If the interface is said to "ignore the parenthetical enclosure for capitalization purposes," this means that the location immediately after the parenthetical enclosure has the same capitalization attribute set as the location immediately before the parenthetical enclosure, except as otherwise specified. In an embodiment, if more than one rule from the following discussion of capitalization after parenthetical enclosures would apply to a particular situation, the rule that is specified first takes precedence. (This is why many of the following paragraphs say "except as specified above.")

In an embodiment, if the text within a parenthetical enclosure entirely consists of a title abbreviation, then the interface will ignore the right parenthesis for capitalization purposes, and so the location after the right parenthesis will be a title uppercase location; for example, the location immediately after "He told [Dr.]" is a title uppercase location.

In an embodiment, except as specified in the preceding paragraph, when the interface is said to ignore a right parenthesis for capitalization purposes, if the right parenthesis is immediately preceded by a title abbreviation, then the location immediately after the parenthetical enclosure is a non-alterable sentence uppercase location, not a title uppercase location. In an embodiment, when the interface is said to ignore a parenthetical enclosure for capitalization purposes, if the parenthetical enclosure is immediately preceded by a title abbreviation, then the location immediately after the parenthetical enclosure is a non-alterable sentence uppercase location, not a title uppercase location.

In an embodiment, except as specified above, if ignoring a parenthetical enclosure for capitalization purposes would cause the capitalization attribute set of the location after the parenthetical enclosure to not include the alterable attribute, then the interface will ignore the parenthetical enclosure for capitalization purposes; for example, the location immediately after "He read the cited source (Wilson et al.)" is a non-alterable lowercase location.

In an embodiment, except as specified above, if the first character within a parenthetical enclosure is an uppercase letter and the last character within the parenthetical enclosure is a question mark or exclamation point, then the interface will determine the capitalization attribute set that the location after the parenthetical enclosure will have if it ignores the parenthetical enclosure for capitalization purposes. If that capitalization attribute set does not include the alterable attribute, then the interface will ignore the parenthetical enclosure for capitalization purposes (as is specified in the preceding paragraph). If that capitalization attribute set includes the alterable attribute, then the interface will run a text analysis algorithm that attempts to determine whether the first word within the parenthetical enclosure and the last word within the parenthetical enclosure are part of the same sentence. If the algorithm determines with confidence that they are not part of the same sentence, then the location after the parenthetical enclosure is a non-alterable uppercase location; otherwise, the capitalization score of the location after the parenthetical enclosure equals a certain amount more than the capitalization score that location would have if the interface ignored the parenthetical enclosure for capitalization purposes. For example, if the location after "He responded to Wilson et al." would be an alterable uppercase location, then the location after "He responded to Wilson et al. (Did you hear?)" will be an alterable uppercase location with a higher capitalization score, so the interface's decision to capitalize the character after "He responded to Wilson et al. (Did you hear?)" would have a lower probability of alteration. The location after "He responded to Wilson et al. (His response was quite clever. Did you hear?)" will be a non-alterable uppercase location.

In an embodiment, except as specified above, if the first character within a parenthetical enclosure is a lowercase letter, then the location immediately after the parenthetical enclosure is a non-alterable lowercase location; for example, the location immediately after "He responded to Wilson et al. (or so I hear)" is a non-alterable lowercase location.

In an embodiment, except as specified above, if ignoring the right parenthesis for capitalization purposes would cause the capitalization attribute set of the location after a parenthetical enclosure to not include the alterable attribute, then the interface will ignore the right parenthesis for capitalization purposes; for example, if the location after "He responded to Wilson et al." would be an alterable uppercase location, then the location immediately after "He responded to Wilson et al. (I heard)" is a non-alterable lowercase location, and the location immediately after "He responded to Wilson et al. (I heard.)" is a non-alterable uppercase location.

In an embodiment, except as specified above, the location after a parenthetical enclosure is an alterable uppercase location with a low probability of alteration. For example, in an embodiment, the location after "He responded to Wilson et al. (I saw his notes, articles, etc.)" is an alterable uppercase location with a low probability of alteration. It may be noted that in order for none of the circumstances that are specified in the preceding paragraphs to be applicable, the location before the parenthetical enclosure must be an alterable capitalization location, and the first character within the parenthetical enclosure must not be a lowercase letter, and it must be the case that ignoring the right parenthesis for capitalization purposes would cause the location after the parenthetical enclosure to be an alterable capitalization location. For such cases, additional sophisticated rules could presumably be specified that would increase the tendency of the interface to yield advantageous results in such cases, but such cases may be so rare that it may not be worth the effort to implement more sophisticated rules for such cases, even if the interface is expected to be used by many people.

Alterable Capitalization

Below, the present specification will describe circumstances in which the interface will make alterable capitalization decisions, in some embodiments.

In an embodiment, once an alterable capitalization decision exists such that altering the decision will toggle a letter from uppercase to lowercase or vice versa, any additional characters after that letter that become part of the same word will also become included in the alterable block of the alterable capitalization decision. For example, in such an embodiment, if the interface alterably enters lowercase mode and then the user types the word "he," then the alterable block of the resulting alterable capitalization decision will consist of the entire word "he," and altering the decision will convert that word to "He."

In an embodiment, once an alterable capitalization decision exists such that altering the decision will toggle the first letter of a word from uppercase to lowercase or vice versa, if when the user finishes typing that word the interface's autocorrect feature recognizes the word the user typed as a word that possibly ought to be replaced with a capitalized word, then the interface may make another alterable decision whether or not to capitalize the same letter. For example, in an embodiment, if a user types "Smith vs. jones," the interface will alterably enter lowercase mode after the user types "Smith vs." and so the decision whether or not to capitalize the letter j will be alterable, and then later, if the interface decides not to capitalize the letter j, the interface may also make a contingent decision whether or not to capitalize the word "jones." Chapter 4 explains how the interface can deal with contingent duplicate decisions.

Inherent Capitalization Analysis

In the present specification, a "capitalization percentage chance" is the percentage chance that a user will prefer a letter to be uppercase in a certain situation, insofar as the interface is able to determine such a probability, so that a capitalization percentage chance greater than 50% means it is more likely than not that a user will prefer a letter to be uppercase. In an embodiment, capitalization scores are actually represented in terms of probabilities, so that for example the capitalization score of any capitalization attribute set that has the uppercase attribute is between 50% and 100%, and the representation of a capitalization score is thus a capitalization percentage chance. In an alternative embodiment, a capitalization score is not represented in terms of a capitalization percentage chance, but in certain circumstances, the interface will convert a capitalization score to a capitalization percentage chance or vice versa, by means of a conversion table or other conversion algorithm. (The features described herein were designed with the expectation that capitalization scores may not be especially precise, so such a conversion algorithm may not need to be especially precise either.)

In an embodiment, for purposes of the following paragraphs, a letter's location is considered to be synonymous with the potential cursor location that is immediately to the left of the letter, so for example, when the location immediately to the left of a letter is an uppercase location, the letter itself may be said to be "in an uppercase location."

For purposes of the present paragraph, an uppercase letter is considered to be "inherently uppercase" if it would be uppercase even if the word that contains the letter were not at the beginning of a sentence; for example, the first letter of the name "Jeff" is inherently uppercase. Any letter that is not inherently uppercase is "inherently lowercase." In an embodiment, in certain circumstances the interface may analyze a letter and assign it an "inherent capitalization probability," which is 0% when the interface is confident that the letter is inherently lowercase, or 100% when the interface is confident that the letter is inherently uppercase, or somewhere in between when the interface is not entirely certain one way or the other.

In an embodiment, when the interface assigns an inherent capitalization probability to a letter, if the letter is lowercase, then the interface will assign the letter a status of inherently lowercase. If the letter is uppercase and is in a non-alterable lowercase location, then the interface will assign the letter a status of inherently uppercase.

In an embodiment, when the interface assigns an inherent capitalization probability to a letter, if the letter is uppercase and is in a non-alterable uppercase location, then the interface will determine the "inherent capitalization frequency" of the word that the letter is at the beginning of, and will assign that inherent capitalization frequency to the letter as its inherent capitalization probability.

In an embodiment, in order to determine the inherent capitalization frequency of a word, if the user is editing a document, the interface will search the document for any occurrence of the word where its first letter is in a non-alterable lowercase location, and if there are any such occurrences, the inherent capitalization frequency of the word is the percentage of such occurrences that begin with an uppercase letter. In an embodiment, in order to determine the inherent capitalization frequency of a word, if the user is not editing a document, or if there are no occurrences of the word in non-alterable lowercase locations in the document, the interface will consult a table that includes a list of words that are often capitalized when in the middle of sentences along with their inherent capitalization frequencies, where each such inherent capitalization frequency is the frequency with which a word is capitalized when in the middle of a sentence. For example, in an embodiment, such a list includes the word "Jeff" with an inherent capitalization frequency of 100%, and so the first letter of that word will be assigned an inherent capitalization probability of inherently uppercase even when it is in a non-alterable uppercase location. In an embodiment, for any word that is not included in such a list, the interface will consult a dictionary of non-capitalized English words; if the word is in the dictionary, then it will be assigned an inherent capitalization frequency that is very low (such as, in an embodiment, 5%), and if the word is not in the dictionary, then it will be assigned an inherent capitalization frequency that is rather high (such as, in an embodiment, 80%).

In an embodiment, when the interface assigns an inherent capitalization probability to a letter, if the letter is uppercase and is in an alterable capitalization location, then the interface will determine the value of the inherent capitalization frequency of the word that the letter is at the beginning of, as described in the preceding paragraph, and then the interface will increase that value and then assign it to the letter as its inherent capitalization probability. In an embodiment, the interface will increase that value only slightly if the location has a relatively high capitalization score, and increase it a great deal if the location has a very low capitalization score. In particular, in an embodiment, the interface will calculate the inherent capitalization probability of an uppercase letter in an alterable capitalization location by means of the formula $$I = \frac{F}{F + (1 - F)L},$$

where F is the inherent capitalization frequency of the word that the letter is at the beginning of, L is the capitalization percentage chance of the alterable capitalization location where the letter is located, and I is the inherent capitalization probability that is then assigned to the letter. (This formula may also be applied to a letter that is uppercase and is in a non-alterable capitalization location: if it is a non-alterable lowercase location then L=0 and the formula yields I=1, and if it is a non-alterable uppercase location then L=1 and the formula yields I=F, so in either case this corresponds to the behavior described in the preceding paragraphs.) For example, if a word has an inherent capitalization frequency of 20% and its first letter is in a location that has a capitalization percentage chance of 50%, then the inherent capitalization probability of that letter will equal $$I = \frac{0.2}{0.2 + (1 - 0.2)(0.5)},$$

which equals approximately 33%, which is a moderate amount more than the word's inherent capitalization frequency of 20%.

In an embodiment, as an exception to the behavior described above, when the interface would assign an inherent capitalization probability to a letter, if somehow the letter already had an inherent capitalization probability, then if the letter's previous inherent capitalization probability is farther from 50% then the new inherent capitalization probability would be, the interface will retain the previous inherent capitalization probability. For example, when the interface would assign an inherent capitalization probability of 33% to a letter, if somehow its inherent capitalization probability was already 100%, the interface will leave its inherent capitalization probability as 100%.

Tracking Changes to a Letter's Context

In an embodiment, in certain circumstances the interface will "remember a letter's capitalization status," which means that the interface will assign the letter an inherent capitalization probability and remember the capitalization score of its location. In an embodiment, whenever a letter becomes an "adjustable letter" as defined below, the interface will remember its capitalization status. In an embodiment, whenever a letter that was an adjustable letter ceases to be an adjustable letter, if the letter "had its context changed," as defined below, then the interface will "recapitalize the letter," which may cause the interface to convert the letter from uppercase to lowercase or vice versa, as explained below. If the letter has not had its context changed, then the interface will do nothing.

In an embodiment, for purposes of the behavior described in the following two paragraphs, the current input cursor location is always a "relevant change location."

In an embodiment, for purposes of the capitalization behaviors described below, an "adjustable letter" is any letter such that it would be possible to change the capitalization score of the letter's location by means of inserting text at a relevant change location. For example, in an embodiment, if the input cursor is located immediately to the left of the word "bluebird," then the first letter of that word is an adjustable letter because typing a period followed by a space character would cause the location of that letter to become an uppercase location, but the second letter of that word is not an adjustable letter because it will continue to be in a lowercase location regardless of anything the user may insert at the current cursor location. As another example, in an embodiment, if the location immediately after the word "nothing" is a relevant change location in the sentence "I said nothing (Should I have?) but I smiled at him," then the first letter of the word "but" is an adjustable letter because inserting a period at the relevant change location would change that character's location to an uppercase location.

In an alternative embodiment, an "adjustable letter" is the first letter that is after a relevant change location. Such an embodiment may be easier to implement than the embodiment described in the preceding paragraph, and will behave the same way in most cases. However, in the case of the second example described in the preceding paragraph, such an alternative embodiment could yield a different result than the embodiment described in the preceding paragraph in certain circumstances, because the first letter of the word "but" would not be an adjustable letter in such an alternative embodiment.

In an embodiment, whenever a user performs an action that causes the capitalization score of the location of an adjustable letter to change, this letter subsequently is an adjustable letter that "has had its context changed."

In an embodiment, whenever a user performs an action that will cause the interface to copy or cut a block of text to the clipboard of the computing device, before the interface does so, the interface will treat the location immediately before the block of text as a relevant change location. In many cases, this will cause the first letter of the text to become an adjustable letter, and so the interface will remember its capitalization status before it is copied or cut. Any letter that is thus an adjustable letter when it is copied or cut to the clipboard will continue to be treated as an adjustable letter while it is on the clipboard. If the text is then pasted from the clipboard, the pasted copy of the letter is an adjustable letter that "has had its context changed," unless the text is pasted to the exact same location that it was copied or cut from so that no actual movement occurred.

In an embodiment, whenever a user performs an action that will cause the interface to delete a block of text (such as selecting a block of text and pressing the Delete key), immediately before the interface deletes the text, the interface will move the input cursor to the end of the block of text, so that location will become a relevant change location before the text is deleted. In many cases, this will cause the first letter after the block of text to become an adjustable letter, and so the interface will remember that letter's capitalization status before the text is deleted; in many cases, the deletion of the text will then cause the first letter after the block of text to become an adjustable letter that has had its context changed. In an embodiment, such behavior is also applicable whenever a user cuts a block of text by means of actuating the Cut key.

Thus, in an embodiment, if by means of Cut and Paste functionality a user moves a block of text from one location that is not at the end of a document to another location that is not at the end of the document, this may ultimately cause the interface to recapitalize three letters: When the user cuts the block of text, the first letter of the block of text and the first letter after the block of text may both become adjustable, as described in the preceding two paragraphs. When the user then moves the input cursor to a new location, this may cause the first letter after the previous location of the block of text to no longer be adjustable, so the interface may recapitalize that letter. This may also cause the first letter after the new cursor location to become adjustable. When the user pastes the block of text, this may cause the first letter of the block of text to no longer be adjustable, so the interface may recapitalize that letter. Finally, whenever the user moves the input cursor away from the location where the block of text was pasted, this may cause the first letter after that location to no longer be adjustable, so the interface may recapitalize that letter.

Automatic Capitalization Adjustment

In an embodiment, when the interface recapitalizes a letter, the interface will first determine its "new capitalization probability." In an embodiment, when the interface determines a letter's new capitalization probability, if the letter is now in a non-alterable uppercase location, its new capitalization probability is 100%. If the letter is in a non-alterable lowercase location, its new capitalization probability equals its inherent capitalization probability.

In an embodiment, when the interface determines a letter's new capitalization probability, if the letter is in an alterable capitalization location, then its new capitalization probability will be somewhere between its inherent capitalization probability and 100%, and will be towards the higher end of that range if the location has a high capitalization score or towards the lower end of that range if the location has a low capitalization score. In particular, in an embodiment, when the interface determines a letter's new capitalization probability, the new capitalization probability will be calculated by means of the formula $N=I+L-IL$, where I is the letter's inherent capitalization probability and L is the capitalization percentage chance of the letter's new location. (When the letter is in a non-alterable capitalization location, if it is a non-alterable uppercase location then $L=1$ and the formula yields $N=1$, which equals 100%, and if it is a non-alterable lowercase location then $L=0$ and the formula yields $N=I$, so in either case this corresponds to the behavior described in the preceding paragraph.)

In an embodiment, when the interface recapitalizes a letter, if the letter is lowercase and its new capitalization probability is 0% or if the letter is uppercase and its new capitalization probability is 100%, the interface will do nothing. In an embodiment, in other circumstances, the interface will make an alterable capitalization decision regarding that letter: the interface will decide whether or not to change the capitalization of that letter, and whether it decides to change the capitalization of that letter or decides not to change the capitalization of that letter, the decision will be alterable. In an embodiment, the outcome of this decision is the same outcome that would be achieved by deleting the letter, interpreting the new capitalization probability as a capitalization percentage chance, converting it to a capitalization score, and retyping the letter at a location that has that capitalization score—except that in any case if the interface converts a letter from uppercase to lowercase the decision will be alterable with at least a probability of alteration that is moderately low but not very low, and if the interface converts a letter from lowercase to uppercase the decision will be alterable with at least a very low probability of alteration. For example, if a letter is uppercase and its new capitalization probability is 55%, then this capitalization percentage chance of 55% would correspond to the capitalization score of an alterable uppercase location such that typing a letter at that location would cause the interface to make an alterable capitalization decision with a very high probability of alteration. Therefore, if a letter is uppercase and its new capitalization probability is 55%, the interface will decide not to change the capitalization of that letter, but this decision will have a very high probability of alteration. If a letter is lowercase and its new capitalization probability is 100%, then the interface will change the letter to uppercase, and this decision will have a very low probability of alteration.

Although the calculations described above may seem somewhat complex, in many cases the relevant locations will be non-alterable capitalization locations and the relevant percentages will be 0% or 100%, and the resulting behavior will be relatively simple. For example, in an embodiment, if a portion of text says "Fight. Never stop!", and a user cuts the text "Never" from before the word "stop!" and pastes it before the word "Fight," then after the user moves the cursor away from its new location, the resulting text will say "Never fight. Stop!", and both of the capitalization changes that occurred will be alterable, and neither will have an especially high probability of alteration.

In an embodiment, whenever it is the case that if the input cursor were moved to a distant location then the interface would recapitalize a letter and would change its capitalization, the possibility of such a change to a letter's capitalization is treated as a pending autocorrection. Farther above, various interface behaviors pertaining to pending autocorrections are described; one such behavior is that in an embodiment, if a certain amount of time elapses while an autocorrection is pending, then its autocorrection block will be distinctively highlighted. For example, in an embodiment, if a user types a period after a word that is in the middle of a sentence and then pauses, then if the next word begins with a lowercase letter, the interface will highlight that letter in order to indicate that the user's next action may cause that letter to be automatically changed to an uppercase letter.

In an embodiment, after the interface recapitalizes a letter, the interface will continue to remember that letter's inherent capitalization probability. For example, in an embodiment, if a user deletes the first two words of the sentence "I know Rose never fails" and moves the input cursor elsewhere, and so the interface determines that the letter R is inherently uppercase but does not change it, yielding "Rose never fails," then if later the user inserts the words "Everyone knows" at the beginning of the sentence, then because the interface remembers that the letter R is inherently uppercase, the interface will not convert the letter R to lowercase and this will not be an alterable decision: this will simply yield the result "Everyone knows Rose never fails."

Alterable Transcription Capitalization

Speech recognition technology typically distinguishes recognized words and phrases that are inherently capitalized from words and phrases that are not inherently capitalized. For example, speech recognition technology typically capitalizes the word “I” even when it is in the middle of a sentence, but not the word “you.” Generally, interfaces that use speech recognition technology attempt to determine when a word or phrase is at the beginning of a sentence, in order to appropriately capitalize the first word of a sentence.

In an embodiment of the present invention, when by means of speech recognition technology a user inputs a word or phrase that is not inherently capitalized, the interface will capitalize the first letter of the transcribed word or phrase if and only if the location immediately before the word or phrase is an uppercase location, and the interface’s decision whether or not to capitalize that letter will be an alterable decision if and only if the location immediately before the word or phrase is an alterable capitalization location. Such alterable decisions will be referred to herein as “alterable capitalization decisions.” For example, in an embodiment where any location that is immediately after a space character that is immediately after a colon is an alterable lowercase location, if the input cursor is at a non-alterable uppercase location when a user dictates “we told you colon no,” then the result will be “We told you: no” (assuming the speech recognition technology hears the user correctly) and the interface’s decision not to capitalize the word “no” will be an alterable capitalization decision.

Below, an embodiment is described in which the interface will not directly decide to capitalize the first letter after an uppercase location, but will instead decide to enter uppercase mode when the input cursor becomes located at an uppercase location, and then if a user types a letter while the interface is in uppercase mode, the letter will be capitalized. In an embodiment, if the interface has a capitalization mode that can be toggled by pressing and releasing the Shift key as described below, and the interface also has speech recognition technology, then when a user speaks text to be transcribed that begins with a word that is not inherently capitalized, then the interface will treat the first letter of that word in the same way that it would treat that letter if the user had typed it manually. For example, in such an embodiment, if the input cursor becomes located at a non-alterable uppercase location and so the interface decides to enter uppercase mode, but then the user presses and releases the Shift key so that the interface switches to lowercase mode, and then the user says “we told you,” then the resulting transcribed text will begin with a lowercase letter even though the location immediately before the first word was an uppercase location, because the user manually switched to lowercase mode before dictating.

Capitalization Mode

In a typical prior art smartphone interface, pressing and releasing the Shift key will cause the interface to enter uppercase mode (if it was in lowercase mode), and while the interface is in uppercase mode, typing a letter will cause the letter to be capitalized and will cause the interface to switch to lowercase mode. Thus, to type a capital letter on a smartphone, instead of holding down the Shift key while typing a letter, a user will typically press and release the Shift key to enter uppercase mode and will then type the letter. To save keystrokes, certain prior art smartphone interfaces will make a decision to automatically enter uppercase mode in certain circumstances, by means of an algorithm that takes nearby text into account. For example, such interfaces will automatically enter uppercase mode when an algorithm determines that it is likely that the input cursor is at the beginning of a new sentence. A user may come to rely on such an automatic capitalization feature. Often, the present writer has incorrectly assumed that his smartphone’s decision whether or not to automatically enter uppercase mode would match his wishes, and then failed to immediately notice the resulting capitalization mistake; in some cases, the present writer also subsequently failed to remember that backspacing a capital letter may cause a smartphone to automatically enter uppercase mode, and thus repeated a capitalization mistake he was trying to correct.

In an embodiment of the present invention, the interface has a capitalization mode that at any given moment is either uppercase mode or lowercase mode, and when a user types a letter, the interface will capitalize that letter if and only if the interface is in uppercase mode when the user types the letter. In an embodiment, pressing and releasing the Shift key of an on-screen virtual keyboard will cause the interface to switch from uppercase mode to lowercase mode or vice versa. (Such behavior may be particularly useful on a smartphone or other computing device where it may be relatively inconvenient for a user to hold down the Shift key with one finger while typing a letter with another finger.)

In an embodiment, for purposes of the capitalization features described herein, when the interface is said to “alterably enter uppercase mode,” this means that the interface enters uppercase mode and its decision to enter uppercase mode rather than lowercase mode is a potentially alterable decision. Conversely, when the interface is said to “alterably enter lowercase mode,” this means that the interface enters lowercase mode and its decision to enter lowercase mode rather than uppercase mode is a potentially alterable decision. Potentially alterable decisions to enter uppercase mode and potentially alterable decisions to enter lowercase mode will be referred to as “potentially alterable capitalization decisions.”

In an embodiment, for purposes of the capitalization features described herein, when a location’s capitalization attribute set is said to be “applied to the interface’s current capitalization mode,” this means that the interface decides to enter uppercase mode if the capitalization attribute set has the uppercase attribute, or decides to enter lowercase mode if the capitalization attribute set has the lowercase attribute. If the location’s attribute set has the non-alterable attribute, then the decision whether to enter uppercase mode or lowercase mode is not alterable and not potentially alterable. If the location’s attribute set includes the alterable attribute, then the decision whether to enter uppercase mode or lowercase mode is a potentially alterable capitalization decision, and the decision’s probability of alteration (in an embodiment that has the alteration probability feature) equals the probability of alteration of the capitalization attribute set.

Alterably Setting Capitalization Mode

In an embodiment, whenever the input cursor becomes located at a new location, the interface will apply the new location’s capitalization attribute set to the interface’s current capitalization mode, regardless of whether the change of location is caused by a cursor navigation action or by some other action such as typing or deleting a character.

In an embodiment, as an exception to the behavior described in the preceding paragraph, after any actuation of the Shift key, if the user then inputs one or more consecutive characters that are not letters before the user either types a letter or performs a cursor navigation action, then in response to each such consecutive input of a non-letter character that causes the input cursor to become located at a new location, if applying the new location's capitalization attribute set to the interface's current capitalization mode would cause the interface's current capitalization mode to change from uppercase mode to lowercase mode then the interface will alterably enter uppercase mode instead, and if applying the new location's capitalization attribute set to the interface's current capitalization mode would cause the interface's current capitalization mode to change from lowercase mode to uppercase mode then the interface will alterably enter lowercase mode instead. In other words, in such an embodiment, when a user actuates the Shift key, even if the next character the user types is not a letter, the interface will make a potentially alterable decision to assume that the user still wants that actuation of the Shift key to affect the next letter the user types. For example, in an embodiment, if a user types a period and then a space character and the interface enters uppercase mode, and the user then presses the Shift key so the interface is in lowercase mode, and the user then presses the space bar, then although pressing the space bar causes the input cursor to become located at a new location that is an uppercase location, the interface will alterably enter lowercase mode, on the theory that the user probably switched to lowercase mode deliberately and still wishes the interface to remain in lowercase mode.

In an embodiment, whenever the left endpoint of a region of selected text becomes located at a new location, the interface will enter uppercase mode or lowercase mode or alterably enter uppercase mode or alterably enter lowercase mode, according to what the interface would do if the user had backspaced the first character of the selected text; for example, if backspacing a particular character would cause the interface to alterably enter uppercase mode, then positioning the left endpoint of a region of selected text immediately before that particular character will cause the interface to alterably enter uppercase mode. In an alternative embodiment, whenever the left endpoint of a region of selected text becomes located at a new location, for purposes of capitalization behaviors the interface will behave as though the input cursor became located at that location. (These two embodiments will behave the same way in most circumstances, but may behave differently when the left endpoint of a region of selected text is a lowercase location and yet the first character of the selected text is a capital letter, in which case backspacking that capital letter would have a special effect, as is explained below.)

In an embodiment, when the interface makes a potentially alterable capitalization decision, if then the user performs another action that causes a location's capitalization attribute set to be applied to the interface's current capitalization mode (without typing a letter first), then that previous potentially alterable capitalization decision will be deleted, even if applying the location's capitalization attribute set to the interface's current capitalization mode does not actually change the interface's current capitalization mode. For example, if a user moves the input cursor to an alterable uppercase location so that the interface makes a potentially alterable decision to enter uppercase mode, and then the user immediately moves the input cursor to a new alterable uppercase location (without typing a letter first), the previous potentially alterable capitalization decision will be deleted and the interface will make a new potentially alterable capitalization decision.

In an embodiment, when the interface makes a potentially alterable capitalization decision, any location on the display of the computing device that gives status information regarding the interface's current capitalization mode (such as the Shift key on a typical virtual keyboard) will become an attention object, and if the attention score of such an attention object exceeds a certain threshold value before the user performs another action, then the probability of alteration of that potentially alterable capitalization decision will be reduced; in an embodiment, if the attention score exceeds a certain higher threshold value before the user types a letter, then the interface will delete the potentially alterable capitalization decision altogether. Thus, for example, if such an embodiment has eye tracking technology that is able to determine within a fairly small radius where a user is looking, and the interface makes a potentially alterable decision to enter uppercase mode, and the user stops for a little while and detectably stares at the Shift key before typing a letter, then the interface may reduce the probability of alteration of the potentially alterable capitalization decision, on the assumption that the user was probably aware of and satisfied with its decision to enter uppercase mode.

Alterably Applying Capitalization Mode

In an embodiment, when the interface makes a potentially alterable capitalization decision, if the user then types a letter before the the user performs any action that affects the interface's capitalization mode other than pressing the Shift key, then the potentially alterable capitalization decision will become an alterable capitalization decision such that altering the decision will toggle that letter's capitalization, except possibly in certain circumstances that are described below. When the user performs any action that affects the interface's capitalization mode other than pressing the Shift key, any previously existing potentially alterable capitalization decision that is not yet an actually alterable capitalization decision will be deleted.

In particular, in an embodiment, when the interface makes a potentially alterable capitalization decision, if the user then presses Shift and then types a letter, then when the user types that letter the potentially alterable capitalization decision will become an alterable capitalization decision regarding that letter such that altering the decision will toggle that letter's capitalization. For example, if the interface alterably enters uppercase mode and then the user presses Shift so that the interface is in lowercase mode and then the user types the letter b, then an alterable capitalization decision will exist such that altering the decision will convert the lowercase letter b to an uppercase letter B. If the user had not expected the interface to enter uppercase mode when it did, and the user pressed Shift intending to switch to uppercase mode but mistakenly switched to lowercase mode instead, then altering such an alterable capitalization decision may be a convenient way for the user to correct the resulting mistake.

However, in an embodiment, when the interface makes a potentially alterable capitalization decision, if the user then presses the Shift key and then types a letter, then if pressing the Shift key was an action that had a moderately high deliberation score, then the probability of alteration of the resulting alterable capitalization decision will be reduced; if pressing the Shift key was an action that had a very high deliberation score, then the resulting alterable capitalization decision will be deleted.

In an embodiment, when the interface makes a potentially alterable capitalization decision, if the user then presses the Shift key more than once before typing a letter, then the potentially alterable capitalization decision will be deleted. In an alternative embodiment, when the interface makes a potentially alterable capitalization decision, if the user then presses the Shift key more than once before typing a letter, each additional actuation of the Shift key after the first will greatly decrease the probability of alteration of the potentially alterable capitalization decision, but may not necessarily cause the interface to delete the decision.

Figure 21A:
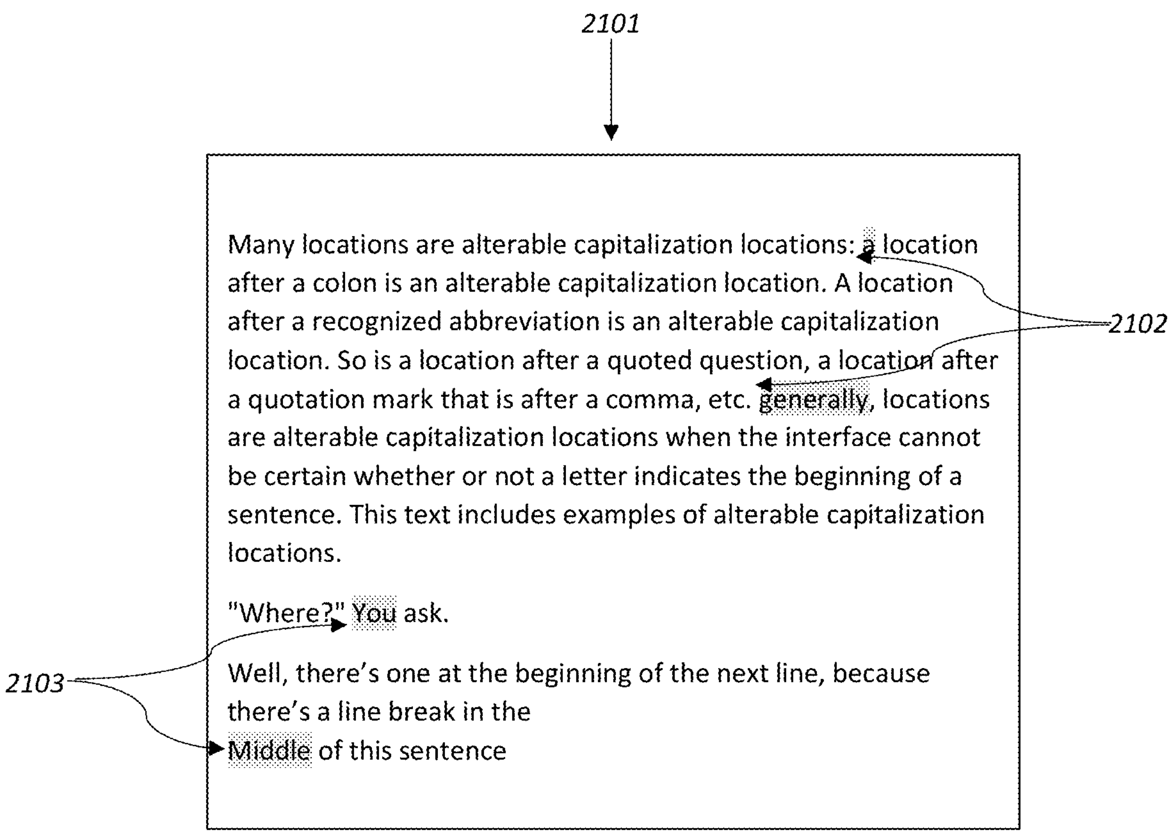
FIG. 21A illustrates features of an alterable capitalization decision.

Generally, alterable capitalization decisions as described above may facilitate correcting mistakes that occur when a user fails to notice that the interface did not enter uppercase mode when the user expected it to, or did enter uppercase mode when the user did not expect it to. In FIG. 21A, Block 2101 includes four highlighted words that would be the alterable blocks of alterable capitalization decisions if a user were to type that text without pressing the Shift key. The potential cursor location at the left of each highlighted word is an alterable capitalization location: the locations labeled 2102 are alterable lowercase locations, and the locations labeled 2103 are alterable uppercase locations. This figure illustrates how alterable capitalization decisions may coincide with potential user mistakes in that the default outcomes of all those alterable decisions are undesirable outcomes. Prior art interfaces would also yield undesirable capitalization outcomes in such circumstances, but they would not be alterable.

Capitalization Mode after Backspacing a Capital Letter

In an embodiment, when an actuation of the backspace key causes the interface to delete a capital letter but does not cause the input cursor to become located at an uppercase location, if the letter was not originally typed as a capital letter, or if the interface does not remember whether the letter was originally typed as a capital letter, then the interface will alterably enter lowercase mode. For example, in such an embodiment, if a user types "Ask jim" and autocorrection converts the letter j to a capital letter J, and then the user backspaces to delete the word Jim, then when the capital letter J is deleted the interface will alterably enter lowercase mode.

In an embodiment, when an actuation of the backspace key causes the interface to delete a capital letter but does not cause the input cursor to become located at an uppercase location, if the interface remembers that the letter was typed as a capital letter, then the interface will make a threshold decision whether to alterably enter uppercase mode or alterably enter lowercase mode based on the amount of time that elapsed since the letter was typed: if the capital letter that is deleted was typed as a capital letter sufficiently recently (such as, in an embodiment, within the last 15 seconds) then the interface will alterably enter uppercase mode, and if not, then the interface will alterably enter lowercase mode. For example, in such an embodiment, if a user types "Ask Jim" and very quickly backspaces to delete "Jim" then when the capital letter J is deleted the interface will alterably enter uppercase mode. In an embodiment, when the interface makes a potentially alterable capitalization decision in such circumstances, the decision will have a minimum probability of alteration that is low but not very low.

In an embodiment, when an actuation of the backspace key causes the interface to delete a capital letter, if that letter did not constitute an alterable block, then for purposes of the automatic decision variation feature the capital letter that is deleted will nevertheless be treated as the alterable block of an alterable capitalization decision that had an extremely low probability of alteration, so if the user then retypes the letter the automatic decision variation feature (as described in Chapter 17) may be triggered. For example, in an embodiment, if a user manually types a capital letter S by first pressing the Shift key and then pressing the S key, and then the user presses the backspace key, then the interface will alterably enter uppercase mode (as described in the preceding paragraph), and the interface will also treat this actuation of the backspace key as though it deleted the alterable block of an alterable capitalization decision, so if the user then presses the letter S again the interface may treat this as though the user deleted and retyped an alterable block consisting of the letter S and may thus convert the letter to lowercase due to the automatic decision variation feature.

Figure 21B:
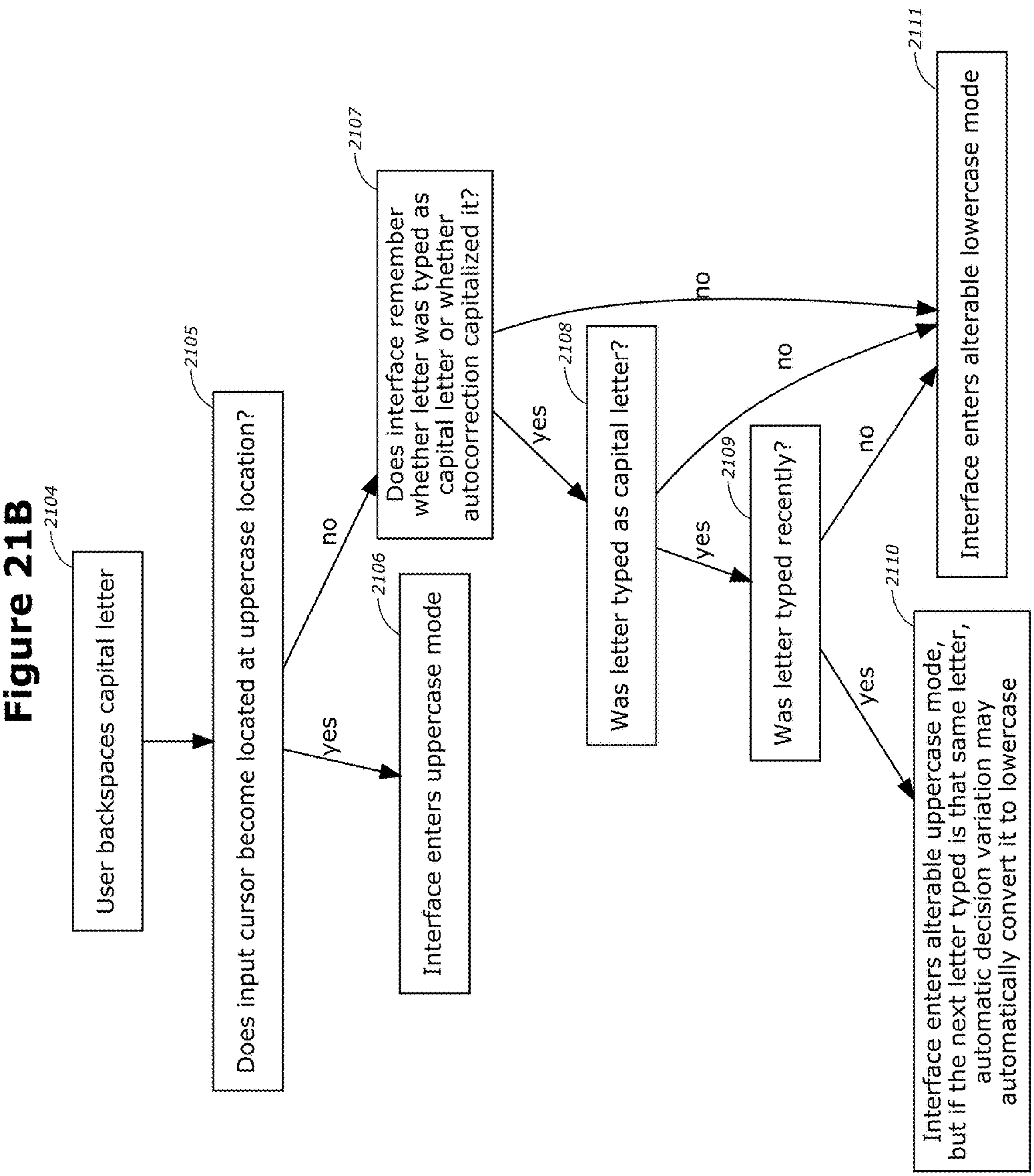
FIG. 21B is a flowchart that illustrates what happens when a user backspaces a capital letter, according to one embodiment.

FIG. 21B is a flowchart that illustrates what happens when a user backspaces a capital letter, in an embodiment. The process starts in Block 2104 which says, "User backspaces capital letter" and proceeds with Block 2105, which asks, "Does input cursor become located at uppercase location?" If the answer is yes, the interface enters uppercase mode as normal (Block 2106). If the answer is no, the interface proceeds to a series of three questions. In each case, if the answer to the question is no, then the interface enters alterable lowercase mode (Block 2111). If the answer is yes, the process continues with the next question until all questions have been answered (Blocks 2107-2109). If the answer to all three questions is yes, then the interface enters alterable uppercase mode. However, even when the interface enters alterable uppercase mode, if the next letter typed is that same letter, the automatic decision variation feature may cause the interface to automatically convert it to lowercase (Block 2110).

Adaptive Capitalization

In an embodiment, if a potentially alterable capitalization decision is an adaptive decision, then the interface will evaluate the outcome of that decision based on whether or not the user's eventual decision whether to type an uppercase letter or a lowercase letter matches the interface's initial potentially alterable decision whether to enter uppercase mode or lowercase mode. For example, in such an embodiment, if the interface alterably enters uppercase mode and then the user presses Shift so that the interface is in lowercase mode and then the user types a lowercase letter, then at that point if the interface evaluates of the outcome of that decision then the decision will be regarded as having a non-beneficial outcome because the interface decided to enter uppercase mode but the user apparently wanted to type a lowercase letter. However, in an alternative embodiment, after the interface makes a potentially alterable capitalization decision, if the user presses Shift within a very short amount of time (such as, in an embodiment, within 0.5 seconds), then the interface will regard the decision as having a neutral outcome; in such an embodiment, the interface may be less likely to eliminate the need to press Shift in certain circumstances after a user has fully acclimated to the need to press Shift in those circumstances.

Various circumstances are described above that may lead to alterable capitalization decisions. In an embodiment, a distinct adaptive decision class will exist for each type of circumstance that may lead to an alterable capitalization decision. In an embodiment, each such capitalization decision class will be an adaptive threshold decision class such that the interface keeps track of a capitalization score for that decision class and the interface may automatically adjust that capitalization score. For example, where the present specification says that in certain circumstances deleting a capital letter causes the interface to alterably enter lowercase mode, it is to be understood that in an embodiment, the potentially alterable decision to enter lowercase mode is an adaptive decision, so if such decisions in such circumstances repeatedly have non-beneficial outcomes, sooner or later the interface will instead alterably enter uppercase mode in such circumstances. As another example, where the present specification says, "If an ellipsis that consists of three dots is immediately followed by a space character, then the location after that space character is an alterable uppercase location," it is to be understood that in an embodiment, any alterable capitalization decision regarding whether to capitalize a letter at such a location is an adaptive decision, so if such decisions repeatedly have non-beneficial outcomes, sooner or later such locations will become alterable lowercase locations instead.

Chapter 33: Alterable Word Entry Modes

Word Entry Modes

In an embodiment of the present invention, in various circumstances the interface will enter various special "word entry modes," as described below. Other than letter hyphenation mode and word hyphenation mode, all of the special word entry modes that are described below are special capitalization modes. Essentially, when the interface is in a special capitalization mode, rather than attempting to facilitate capitalizing the first word of every sentence, the interface will attempt to facilitate some other capitalization behavior. Many of these modes may be particularly useful in circumstances where it is relatively inconvenient to explicitly specify that a letter is to be capitalized, such as when a user is using a virtual keyboard or using speech recognition functionality; Caps Lock mode is also frequently useful on a computing device that has a hardware keyboard.

More specifically, in an embodiment, when the interface is in a special capitalization mode, the rules that are described above for determining what locations are uppercase locations are applicable only for purposes of behaviors pertaining to recapitalization (such as for determining what inherent capitalization probability to assign to a letter), if at all; for purposes of determining whether or not to enter uppercase mode, the simpler rules that are described below are applicable instead when the interface is in a special capitalization mode.

In an embodiment, for purposes of the behaviors described below, when the interface is not in a special word entry mode as described below, it is said to be in the "normal word entry mode"; thus, the interface is always in some particular word entry mode, whether or not it is in one of the special word entry modes described below.

In an embodiment, the interface has a Caps Lock mode (which is a special word entry mode), and while the interface is in Caps Lock mode, every location is an uppercase location. In an embodiment, in circumstances where uppercase locations either do not exist or have no effect (such as when the user is entering input by means of a hardware keyboard), while the interface is in Caps Lock mode, letters that are typed will be interpreted as uppercase letters, except that when the Shift key is held down they will be interpreted as lowercase letters.

In an embodiment, the interface has a word capitalization mode (which is a special word entry mode), and while the interface is in word capitalization mode, a location that is at the beginning of a text field or immediately after a whitespace character or hyphen is an uppercase location; a location that is immediately after a letter or digit or apostrophe is a lowercase location. In various embodiments, when the interface is in word capitalization mode, various rules may be applicable to a location that is immediately after a character that is not a letter, digit, apostrophe, hyphen, or whitespace character; for example, in an embodiment, when the interface is in word capitalization mode, any such location is an uppercase location.

In an embodiment, the interface has a title capitalization mode (which is a special word entry mode), and while the interface is in title capitalization mode, it will behave exactly the same as in word capitalization mode, except that in certain circumstances the interface will automatically convert a word's first letter to lowercase. In particular, if a user types a sequence of consecutive words while the interface is in title capitalization mode, then when the user types the first character of the third word or any subsequent word, the interface will determine whether the preceding word is a "lowercase title word"; if it is, and if the word's first letter is capitalized, then the interface will convert that letter to lowercase. In an embodiment, for purposes of the preceding sentence, a lowercase title word is any one of the following words: a, an, the, at, by, for, in, of, on, to, up, and, as, but, or, nor. For example, in an embodiment, if the interface enters title capitalization mode and then a user types the keystroke sequence "the time to move on" (without explicitly toggling the capitalization mode), then the first letter of each word will be an uppercase location, but the ultimate result will not be "The Time To Move On" with all five words capitalized because when the user types the first character of the word "Move" the interface will recognize that the preceding word is a lowercase title word and will convert its first letter to lowercase; the ultimate result will be "The Time to Move On." Various alternative lists of lowercase title words will be evident to those of ordinary skill in the art.

In an embodiment, the interface has an letter hyphenation mode (which is a special word entry mode), and while the interface is in letter hyphenation mode, when the user types a letter or other non-whitespace character, the interface will automatically append a hyphen. When the user types a space or other whitespace character, the interface will exit letter hyphenation mode and will delete any hyphen immediately preceding that whitespace character. For example, if a user enters letter hyphenation mode and types "never" the result will be "n-e-v-e-r-" with a trailing hyphen, and if the user then presses the space bar the result will be "n-e-v-e-r" with no trailing hyphen.

Identifier Entry Modes

The word hyphenation mode, the macro case mode, and the camel case mode that are described in the following paragraphs are special word entry modes that are "identifier entry modes." When the interface is in an identifier entry mode, words can be typed by means of the same sequence of input gestures as though the words were separated by space characters, but the words will not be separated by space characters.

In an embodiment, while the interface is in an identifier entry mode, in certain circumstances a special "separator key" will exist; such circumstances are explained below. In an embodiment, while a separator key exists, the space bar key on the virtual keyboard of the computing device will be replaced by the separator key. In an alternative embodiment, while a separator key exists, most of the space bar key will be replaced by the separator key, but the separator key will be smaller than the original space bar key and so a smallerthan-usual space bar key will remain on the virtual keyboard. In another alternative embodiment, while a separator key exists, the space bar key will remain on the keyboard of the computing device, but actuating the space bar key will have the effect that actuating the separator key would have rather than the usual effect of inputting a space character; such behavior may be appropriate particularly in an embodiment where the keyboard cannot be altered according to circumstances, such as because it is a hardware keyboard.

In an embodiment, the interface has an word hyphenation mode, and while the interface is in word hyphenation mode and the input cursor is immediately after a letter or digit, the separator key exists and is the hyphen key. Thus, while the interface is in word hyphenation mode, if a user performs a sequence of actions that would ordinarily yield the result "useful new input modes.html," this will instead yield the result "useful-new-input-modes.html" because user actions that would ordinarily cause the entry of space characters will instead cause the entry of hyphens.

In an embodiment, the interface has a macro case mode, and while the interface is in macro case mode every location is an uppercase location, and while the input cursor is immediately after a letter or digit, the separator key exists and is the underscore key. Thus, while the interface is in macro case mode, if a user performs a sequence of actions that would ordinarily yield the result "macro case," this will instead yield the result "MACRO_CASE."

In an embodiment, the interface has a camel case mode that has the same rules for determining whether a location is an uppercase location as word capitalization mode, and while the interface is in camel case mode and the input cursor is immediately after a non-whitespace character and the interface is in lowercase mode, the separator key exists and is the Shift key. Thus, while the interface is in camel case mode, if a user performs a sequence of actions that would ordinarily yield the result "this is camel case," these actions may instead yield the result "ThisIsCamelCase."

In an embodiment, while the interface is in an identifier entry mode, if a user performs some action other than actuating the space bar that would ordinarily cause the interface to enter a space character after a word, the action will instead cause the interface to perform the effect of actuating the separator key. For example, in an embodiment, if the interface is in macro case mode while the user dictates the text "number of users" via speech recognition technology, the result will be "NUMBER_OF_USERS." As another example, in an embodiment, when the interface is in camel case mode, if a user begins typing "Autocom" and then sees the replacement word "Autocompletion" on the screen and touches that word, then this will cause "Autocom" to be converted to "Autocompletion" as usual, but the interface will not enter a space after "Autocompletion," and will instead enter uppercase mode.

In an embodiment, while the interface is in an identifier entry mode, for purposes of autocorrection and/or spell-checking functionality, actuating the separator key will demarcate the boundary between words just as it would if the interface were not in such a mode. For example, in an embodiment, if the interface is in camel case mode when a user types the keystroke sequence "prevent speling errors" (with only one L in "speling"), then autocorrection may cause the interface to insert a second L, thus yielding the result "PreventSpellingErrors."

In an embodiment, if the interface is in an identifier entry mode when a user inputs a punctuation character other than a hyphen or underscore character, or when by some means a user inputs an actual space character, then the interface will exit the identifier entry mode. For example, in an embodiment, if the interface is in camel case mode when a user performs a sequence of actions that yields the result "CamelCase," and then the separator key exists and is present on the virtual keyboard where the space bar would usually be, and the user actuates the separator key so that the interface enters uppercase mode, and so the criteria for the separator key's existence are no longer fulfilled and so the space bar becomes visible on the keyboard again, then actuating the space bar key will cause the entry of an actual space character and will thus cause the interface to exit identifier entry mode. Thus, in an embodiment, double-clicking the location where the space bar key is usually present on the virtual keyboard will cause the interface to exit identifier entry mode.

Additionally, in an embodiment, if the interface is in an identifier entry mode when a user double-clicks the location where the space bar key is usually present on the virtual keyboard, then when the interface exits identifier entry mode as a result of the entry of an actual space character, it will also undo the effect of the immediately previous actuation of the separator key. For example, in such an embodiment, if the interface is in word hyphenation mode when a user performs a sequence of actions that would ordinarily yield the result "hyphenation mode" and then the user double-clicks the location where the space bar key is usually present on the virtual keyboard, the result will be "hyphenation-mode" followed by a space character rather than "hyphenation-mode-" followed by a space character.

Alterable Word Entry Mode Decisions

In an embodiment, in certain circumstances, the interface's decision regarding what word entry mode to be in will be a potentially alterable decision or a potentially pseudo-alterable decision. Such decisions are referred to herein as "alterable word entry mode decisions." Such decisions are alterable input state decisions, so after the interface makes such a decision, its alterable block may grow to include text the user types. In an embodiment, an alterable word entry mode decision will not be actually alterable when altering the decision would cause no change; for example, if the interface decides to enter title capitalization mode when the input cursor becomes located at the start of a particular text field, and this is an alterable word entry mode decision, then if the user types "The Best," the so-called alterable word entry mode decision will actually become alterable when the user types the letter B, because until then it makes no difference that the interface is in title capitalization mode.

In an embodiment, when an alterable word entry mode decision is a current input state decision and the interface is still in the same word entry mode that it chose when it made the alterable word entry mode decision, altering that decision will not only cause its alterable block to change so that its text is as it would have been if the interface had made a different decision regarding what word entry mode to be in, but will also accordingly change the current word entry mode. For example, in an embodiment, if the interface alterably decides to remain in Caps Lock mode and the user types "LOWERCASE" and then alters the decision, then altering the decision will not only convert that word to "lowercase" but will also cause the interface to exit Caps Lock mode.

In an embodiment, every alterable word entry mode decision will have either an alternate option or a pseudo-alternate option for each word entry mode other than the one the interface decided on, so by some means it will be possible for the user to cause the interface to retroactively change the alterable block of the alterable word entry mode decision so that it is as it would have been if the interface had instead decided to enter any particular word entry mode. In an embodiment, unless otherwise specified, an alterable word entry mode decision that is not a pseudo-alterable decision will actually only have one alternate option that is not a pseudo-alternate option; unless otherwise specified, this alternate option will correspond to the normal word entry mode. In an embodiment, unless otherwise specified, an alterable word entry mode decision will have a low probability of alteration by default.

In an embodiment, while the interface is in a special word entry mode, if a user performs a cursor movement action that moves the input cursor to a location that is not within or immediately adjacent to the alterable block of any previously existing alterable word entry mode decision and then the user begins typing at such a location, then the interface's decision to remain in the special word entry mode (rather than exiting it) is an alterable word entry mode decision. For example, in an embodiment, if the interface is in Caps Lock mode when a user moves the input cursor to a different page of the current document and begins typing, then the interface's decision to remain in Caps Lock mode is an alterable word entry mode decision.

In an embodiment, while the interface is in a special word entry mode, if a user performs an action that has a very high deliberation score, the interface's decision to remain in the special word entry mode is an alterable word entry mode decision. For example, in an embodiment, if a user pauses for a very long time while the interface is in Caps Lock mode and then begins typing, then the interface's decision to remain in Caps Lock mode is an alterable word entry mode decision. In an embodiment, while the interface is in normal word entry mode, if a user performs an action that has a very high deliberation score, the interface's decision to remain in normal word entry mode is an alterable word entry mode decision that is a pseudo-alterable decision, and thus can be altered only by special means.

In an embodiment, when two actually alterable word entry mode decisions are both current input state decisions, and the two decisions have distinct yet overlapping alterable blocks and have distinct alternate options, the interface will combine them into a single decision. Such a decision will be referred to below as a "combined alterable word entry mode decision." For example, in an embodiment, if the interface is in Caps Lock mode, and a user moves the input cursor to a different page of the current document and types "GREAT!" and then the user pauses for a very long time, and then the user types "NEXT," then at that point a multi-alternative decision will exist such that selecting one alternate option will yield "Great! Next" and selecting the other will yield "GREAT! Next." If the user then pauses for a very long time yet again, and then begins typing again, then the interface may once again combine the new alterable word entry mode decision with the previously existing decision, thus creating a combined alterable word entry mode decision that has three alternate options (not including pseudo-alternate options).

Automatic Caps Lock Alteration

In an embodiment, if the interface made an alterable word entry mode decision to enter or remain in Caps Lock mode, and the alterable block of such a decision comes to include a lowercase letter that a user types by means of actuating the Shift key while the interface is in Caps Lock mode, then the decision's probability of alteration will become extremely high. In an embodiment, in such circumstances, the interface will automatically alter the decision. For example, in an embodiment, if the interface is in Caps Lock mode when a user pauses for a long time, and then the user holds down the Shift key and types the letter "i," then the user's action had a high deliberation score so the interface will make an alterable decision to remain in Caps Lock mode, but because this decision's alterable block will immediately come to include a lowercase letter that the user typed by means of actuating the Shift key while the interface was in Caps Lock mode, the interface will automatically alter the decision, so the result will be "I" and the interface will exit Caps Lock mode.

In an embodiment, when such automatic alteration occurs, the alterable capitalization mode decision will still be an alterable input state decision and its alterable block may continue to grow, so that if the automatic alteration was undesired then the user may be able to revert it by means of alteration functionality.

Selecting Word Entry Modes

In an embodiment, if a user holds down the Shift key of a virtual keyboard for a certain minimum length of time, a menu of word entry modes will appear; if the user then slides the touch to a particular word entry mode and releases it there, the interface will enter that word entry mode.

Figure 22:
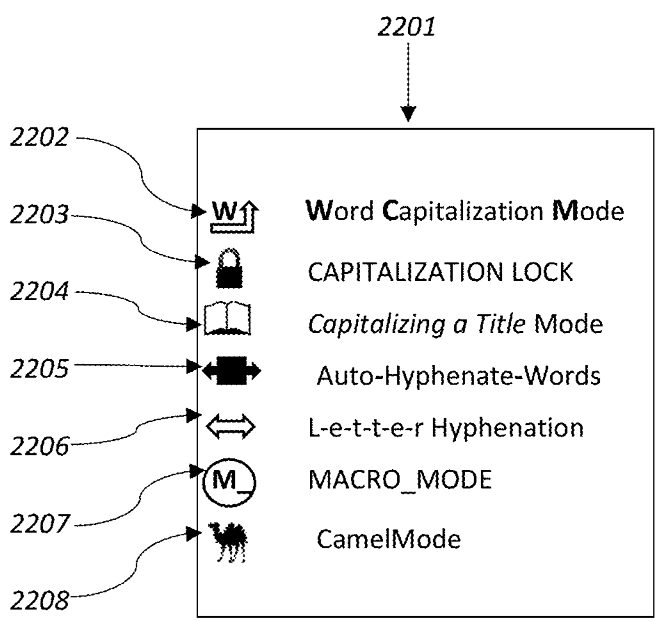
FIG. 22 illustrates an example of a word entry mode menu.

FIG. 22 is an illustration of a word entry mode menu (2201). The illustration includes self-descriptive versions of the titles of various word entry modes, as follows: Word Capitalization Mode (2202), CAPITALIZATION LOCK (2203), Capitalizing a Title Mode (2204), Auto-Hyphenate-Words (2205), L-e-t-t-e-r Hyphenation (2206), MACRO-_MODE (2207), and CamelMode (2208). The illustration also includes corresponding icons for each word entry mode.

In an embodiment, when an alterable word entry mode decision is a current input state decision, such a word entry mode menu will also include an option corresponding to each alternate option or pseudo-alternate option of that current input state decision that would cause a change to that decision's alterable block, and selecting such a menu option will cause the interface to alter that decision so as to select the corresponding alternate option or pseudo-alternate option. For example, in an embodiment, if the interface makes an alterable decision to enter title capitalization mode and the user types "The Title," then the menu of word entry modes will include an option for retroactively selecting Caps Lock mode so as to yield "THE TITLE," and will also include an option for retroactively selecting normal word entry mode, but will not include an option for retroactively selecting word capitalization mode because this would cause no change.

In an embodiment, various spoken commands will cause the interface to enter various word entry modes. For example, in an embodiment, the spoken command "camel case" will cause the interface to enter camel case mode, so saying "camel case" followed by "this is a test" will yield "ThisIsATest." In an embodiment, when an alterable word entry mode decision is a current input state decision, saying "Oops" followed by such a spoken command will cause the interface to alter that current input state decision so as to select the appropriate alternate option or pseudo-alternate option of that decision. For example, in an embodiment, if after a long pause a user says "this is a test," and then the user pauses and says "Oops Caps Lock," then the result will be "THIS IS A TEST."

In an embodiment, actuating a Caps Lock key when the interface is in a special word entry mode will cause the interface to exit that word entry mode; actuating the Caps Lock key when the interface is in normal word entry mode will cause the interface to enter Caps Lock mode. In an embodiment, when an alterable word entry mode decision is a current input state decision, if a user actuates the Caps Lock key while holding down the alteration key, the interface will alter that current input state decision so as to select the alternate option or pseudo-alternate option of that decision corresponding to Caps Lock mode, unless that option was the default option of that decision, in which case the interface will alter that decision so as to select the alternate option or pseudo-alternate option corresponding to normal word entry mode. For example, in an embodiment, if after a long pause a user forgets that the interface is in Caps Lock mode and begins typing text that should not be capitalized, the user can correct the resulting mistake by holding down the alteration key and actuating the Caps Lock key.

In an embodiment, for purposes of the behaviors described in the preceding three paragraphs, when an alterable word entry mode decision is a current input state decision, if the decision is a combined alterable word entry mode decision, and a user performs some action that will cause an alternate option or pseudo-alternate option corresponding to some particular word entry mode to become selected, then the interface will perform the smallest appropriate change; if the user then repeats the same action, the interface will perform the next smallest appropriate change; and so forth. For example, in an embodiment, if the interface is in title capitalization mode and a user says "one . . . two . . . three" with a very long pause between consecutive words, and the result is "One Two Three," then if the user says "Oops Caps Lock" once; the result will be "One Two THREE"; if the user then says it again, the result will be "One TWO THREE."

Text Field Word Entry Modes

In an embodiment, rather than having only one normal word entry mode, the interface will have two normal word entry modes that differ only with respect to text fields: an initially uppercase word entry mode and an initially lowercase word entry mode. These two normal word entry modes are exactly the same except that the location at the very beginning of a text field is an alterable uppercase location when the interface is in initially uppercase word entry mode and is an alterable lowercase location when the interface is in initially lowercase word entry mode.

In an embodiment, when the input cursor becomes located in a text field that did not previously contain the input cursor, either the interface will make an alterable decision to enter or remain in a particular word entry mode, or the interface will make a pseudo-alterable decision to do so. For example, in an embodiment, if the input cursor becomes located in a particular text field, and then the user types some text, and then the user holds down the alteration key while pressing the Caps Lock key, then the text the user typed in that field will all become capitalized (assuming that this sequence of events occurred rapidly enough that the pseudo-alterable decision's probability of alteration did not drop below the deletion threshold).

In an embodiment, when the input cursor becomes located in a text field that did not previously contain the input cursor, by default the interface will enter initially uppercase word entry mode, and this will be a pseudo-alterable decision. However, in an embodiment, the alterable decision or pseudo-alterable decision the interface makes when the input cursor becomes located in a text field can be customized for a particular text field.

In particular, in an embodiment, a text field may have the property that when the input cursor becomes located within the text field, by default the interface will decide to enter a particular word entry mode, and this decision will be an alterable word entry mode decision. The alternate options of such a decision may be customized to include either initially uppercase word entry mode or initially lowercase word entry mode, or both, or may include special word entry modes in addition to or instead of normal word entry modes.

In an embodiment, a text field may have the property that when the input cursor exits the text field, the interface will remember what particular word entry mode the user was in, and when the input cursor again becomes located within the text field, the interface will decide to re-enter that word entry mode, rather than necessarily entering the default word entry mode for that text field. In an embodiment, for purposes of such behavior, corresponding text fields in distinct data records constitute the same text field; that is, for example, the First Name text field in a Contacts app whereby a user can input the first name of one contact is considered to be the same text field as the First Name text field whereby the user can input the first name of another contact.

For example, in an embodiment, the Memo text field in a checking app may have the property that when the input cursor becomes located within the text field, by default the interface will decide to enter word capitalization mode. This will be an alterable word entry mode decision with a very low probability of alteration. If a user is entering data for a particular check and types some text in the Memo text field and then notices that each word is capitalized and wants to change this, the user can change it by means of alteration functionality. The text field may also have the property that the interface will remember what particular word entry mode the user was in, so that if the user causes the interface to switch to initially lowercase word entry mode, then the next time the input cursor becomes located within the Memo text field, the interface will enter initially lowercase word entry mode rather than entering word capitalization mode, even if it is the Memo text field for a different check.

Chapter 34: Text Formatting Improvements

Text Formatting

Various interfaces allow users to input formatted text. In various interfaces, a text format may be composed of multiple distinct format elements that may vary independently, including foreground color, background color, underlining status, and so forth. In the present specification, a "format attribute" is a component of a format that may vary, such as foreground color, and a "format value" is one specific possibility for a format attribute, such as blue foreground color. In the present specification, the "active format" is the format that an interface will apply to the next character a user types if the user's next action is typing a character. A "format" is a set of all format values for all relevant format attributes; for example, a format may consist of the Times New Roman font, black foreground color, white background color, non-underlined, etc.

In prior art, interfaces that allow input of formatted text generally do not require a user to individually specify the format for each character the user types. Instead, a user can specify a particular format and then type any number of characters in that format before specifying a different format. Text formatting is thus contextual data as defined in Chapter 24. Most prior art interfaces that allow users to input formatted text are somewhat similar: for example, the interface of the desktop computer word processing application Microsoft Word generally behaves as described in the following paragraph, and so does the interface of the web page editor for the web-based application WordPress. (As an exception, as far as the present writer can discern, the "Text Highlight Color" toolbar button of Microsoft Word seems to behave in a way that is inconsistent with what is described below; the present writer has not figured out how that toolbar button works.)

In various prior art interfaces, when a user backspaces a character, the active format becomes the format that character had; that is, in various interfaces, by default, if a user backspaces a character and then types a character, the new character's font, size, foreground and background color, bold status, italic status, and so forth will match the character that was backspaced. When a user moves the input cursor to a new location that is not at the beginning of a line of input, the active format becomes the format of the character to the left of the input cursor. When a user moves the input cursor to a new location that is at the beginning of a line of input that is not empty, the active format becomes the format of the character to the right of the input cursor.

In WordPress, if a user presses Enter when the input cursor is at the end of a line of input, then WordPress reverts the active format to the default format (as well as inserting a line break). The present writer has done some experimentation to try to determine how Microsoft Word determines the active format when a user moves the input cursor to a new location that is at the beginning of an empty line of input, but has not succeeded at figuring it out. (In fact, on several occasions the present writer has thought that he had deleted all text of a certain format from a document in Microsoft Word, but later when he typed new text at the beginning of an empty line of input where the deleted text had been, that previously used format was applied to the new text, contrary to his wishes.)

In various interfaces, a user can perform formatting actions by various means; for example, in both Microsoft Word and WordPress, a user can toggle italic status by clicking a toolbar button. If a region of text is selected when a user performs a formatting action, the formatting action is applied to the selected region and to the active format. (As an exception, if for example one character of the selected region is italic and another character is not, toggling italic status of the selected region will cause the entire region to be italic or cause the entire region to be non-italic, rather than individually toggling each character.) If no text is selected when a user performs a formatting action, if the input cursor is in the middle of a word, the formatting action is applied to that word and to the active format. If no text is selected when a user performs a formatting action and the input cursor is not in the middle of a word, then the formatting action is applied only to the active format. For example, when the last character of a document is italic, if a user moves the input cursor to the end of the dOcument and then types a character, the new character will by default be italic; if instead the user moves the input cursor to the end of the document, clicks a toolbar button to toggle italic status, and then types a character, the new character will not be italic.

In an embodiment of the present invention, in various circumstances the interface will make it easier for users to cause text to have a desired format. In particular, in an embodiment, when a user has caused text to have a format that is not the format the user desired, the interface may make it easier to recover from such a mistake. Such interface behavior is described in detail below.

Blank Characters in an embodiment, for purposes of the interface behaviors described below, a "blank character" is a space character or tab character or any other character that does not correspond to a visible mark when rendered and does not pertain to a line break. In an embodiment, whenever an interface is showing formatting marks so that a space character or tab character corresponds to a visible mark when rendered, the space character or tab character does not constitute a blank character.

In an embodiment, a "background attribute" is a format attribute such that various format values of that format attribute can be distinguished even when the format attribute is only applied to blank characters. For example, underlining status is a background attribute, because a user can visually distinguish whether or not a space character is underlined. A "foreground attribute" is a format attribute that is not a background attribute, such as bold status.

In an embodiment, the formats of two characters are considered to "match" if the two characters have the exact same format, or if at least one of the characters is a blank character and the formats of the two characters have the same format values for every background attribute, whether or not they have the same format values for every foreground attribute. For example, if one space character is in a normal font and another space character is in a bold font that is otherwise identical, then their formats match. In an alternative embodiment, the formats of two characters are considered to match only if the two characters have the exact same format; such an alternative embodiment may be less advantageous in some respects, but may be easier to implement and may still have significant advantages over prior art.

In the present specification, a "blank block" is a maximally large set of one or more blank characters such that all the characters are in the same line of text, and all the characters are adjacent (with no non-blank characters between them), and the formats of all of the blank characters match one another. Any particular blank character will be included within only one blank block, which may be said to be the blank block of that blank character. For example, in an embodiment, if a line of text consists of five consecutive space characters whose formats are identical except that only the second character is in a bold font, then the line of text contains one blank block consisting of all five characters, but if a line of text consists of five consecutive space characters whose formats are identical except that only the second character has a green background color, then that second character will be a distinct blank block, and so the line of text will contain a total of three blank blocks. In many cases blank characters are not consecutive, so in many cases a blank block will just be a single blank character; and when a group of blank characters are consecutive they are usually in the same font, so when a group of blank characters are consecutive they will usually form a single blank block.

In the present specification, a character is "visually ambiguous" if it is a blank character whose blank block is neither at the beginning nor at the end of its line of text, and its format matches the format of the last character before its blank block and also matches the format of the first character after its blank block, but the format of the last character before its blank block does not match the format of the first character after its blank block. For example, when an space character is between a red character and a blue character, the space character is visually ambiguous if its format matches the format of the red character and its format matches the format of the blue character, because the format of the red character does not match the format of the blue character. A character is "visually distinct" if it is not visually ambiguous.

Figure 23A:
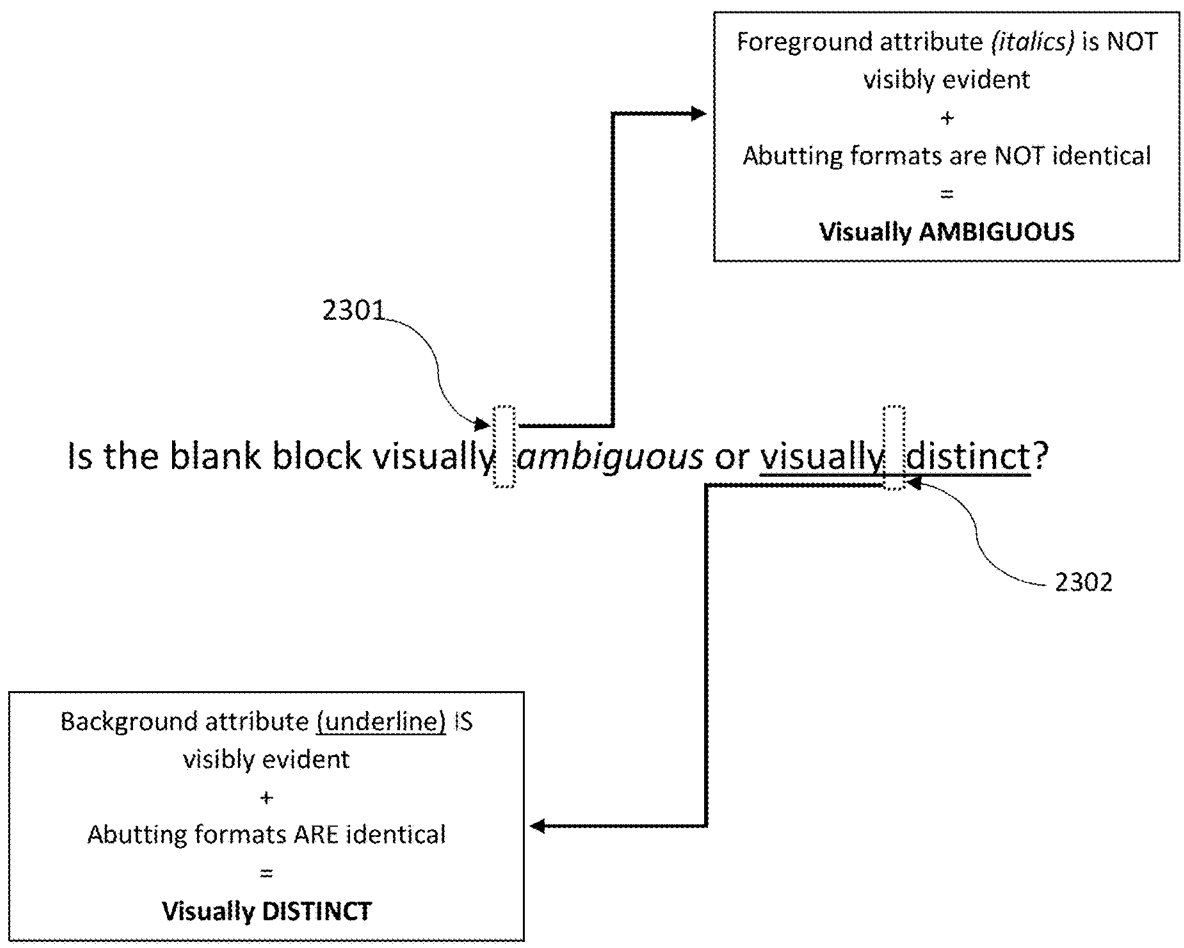
FIG. 23A illustrates a diagram identifying and deconstructing the pertinent format elements distinguishing visually ambiguous from visually distinct blank blocks, according to one embodiment.

FIG. 23A presents as a diagram identifying and deconstructing the pertinent format elements distinguishing visually ambiguous from visually distinct blank blocks. In FIG. 23A, blank block 2301, represented as the blank character between a standardly-formatted word and an italicized word, is classified as visually ambiguous because it meets the dual criteria that its abutting formats are not identical to each other and yet both formats appear identical to the format of the blank character because the divisive formatting element (italics, in this case) is identifiable as a "foreground attribute" whose presence or absence is not visibly discernible in the blank character constituting the blank block in question. By contrast, blank block 2302, represented as the blank character between two standardly-formatted and underlined words, is classified as visually distinct because of its characteristically identical abutting formats and because all "background attributes" that are visibly discernible in the blank character (including underlining, in this case) are shared with the abutting formats.

Hidden Formatting

In an embodiment, not only may each character in a document have its own individual formatting, but also a potential input cursor location may have its own individual formatting that does not necessarily match the formatting of a character immediately before it or a character immediately after it. In an embodiment, whenever moving the input cursor away from its current location and then immediately returning it to that location would change the active format, if the user does perform a cursor navigation action that will move the input cursor away from its current location, then before moving the input cursor, the interface will apply the active format to the current input cursor location so that the location has its own individual formatting. After moving the input cursor, the interface may change the active format based on the cursor's new location, but it will still remember the formatting of that previous input cursor location in case the user returns the cursor to that location.

For example, if a document contains no bold text and a user switches the active format to bold while the input cursor is at a certain location, but then the user moves the cursor away from that location before actually typing any bold text, then the bold format will, in a sense, be left behind: the interface will apply the bold format to the location where the cursor was before moving the cursor to its new location and changing the active format. As another example, in an embodiment, if a user has just finished deleting all highlighted text in a document and the active format is a highlighted format, then if the user moves the cursor away from its current location before typing any new highlighted text, the interface will apply the highlighted format to the location where the cursor was before moving the cursor to its new location and before changing the active format.

In an embodiment, when a format is applied to a potential input cursor location as described in the preceding paragraph, that format will be assigned an "inherent weight" that is initially a moderate value, and that weight will decrease over time until it becomes zero, at which point the location will cease to have its own individual formatting. Such an inherent weight is intended to reflect approximately how likely it is that a user who returns the input cursor to such a location will remember the format that was the active format when the input cursor was at that location, and will wish that format to become the active format again when the input cursor returns to that location.

Alterable Format Decisions

In the present specification, a "format set" consists of one or more formats, one of which is the "primary format" of the format set. For example, a format set may consist of a first format which is red underlined Helvetica and a second format which is black non-underlined Helvetica, with the first format as the primary format.

In an embodiment, a format that is in a format set may be assigned a "weight" that reflects approximately how likely the user is to want that format to be applied to certain characters, insofar as the interface is able to determine such a likelihood. In an embodiment, the primary format of a format set is always a format that has the highest weight within the format set. Below, whenever a certain format is said to be the primary format of a format set, this also means the format has a very high weight within that format set.

Below, the present specification will explain various circumstances in which the interface will determine certain format sets that include certain formats for various reasons. In an embodiment, if a format set would include a particular format for more than one reason, then the interface will include only one copy of that format in the format set, and the interface will assign it a weight that is slightly greater than the greatest weight it would have otherwise been assigned. In an embodiment, if a first format set is said to include a second format set, then that means it includes each format of the second format set. If a first format set is said to include a second format set with its weight reduced by a certain percentage, that means it includes each format of the second format set with the weight of each such format reduced by that percentage.

In an embodiment, in certain circumstances, rather than merely applying a particular format to one or more characters, the interface will apply a format set to those characters. When the interface applies a format set to one or more characters, the interface applies the primary format of the format set to those characters, and if the format set has more than one format then the decision to apply the primary format to those characters rather than applying some other format from the format set to those characters is an alterable decision. Such an alterable decision will be referred to herein as an "alterable format decision." An alterable format decision will have one alternate option for each particular format in the format set other than the primary format, and selecting such an alternate option will cause the interface to apply the corresponding format to the characters that the format set was applied to. For example, if a format set includes an italic format and an underlined format, and the italic format is the primary format of the format set, then applying that format set to a paragraph will cause the interface to make an alterable decision to cause the paragraph to become italicized, and altering that decision will cause the interface to change the paragraph from italicized to underlined.

In an embodiment, the probability of alteration of each alternate option of an alterable format decision will reflect the ratio of the weight of the relevant format to the weight of the primary format of the format set. For example, in an embodiment, if a format set includes a first format that is the primary format, a second format that has just as much weight as the primary format, and a third format that has a much lower weight than the primary format, then when the interface applies that format set to one or more characters, the resulting alterable format decision will have an alternate option with a very high probability of alteration for the second format and an alternate option with a low probability of alteration for the third format.

In an embodiment, in certain circumstances, rather than merely setting an active format that will be applied to the next character a user types if the user's next action is typing a character, the interface will set an "active format set."

In an embodiment, when the interface sets an active format set that has more than one format, its decision to cause the primary format of that format set to become the active format rather than causing some other format of that format set to become the active format is an alterable format decision that is an alterable input state decision. Because the alterable block of an alterable input state decision may continue to grow as a user types additional characters, in such an embodiment, if for example a user types a few words after the interface sets an active format set and then realizes that these words are not in the format he expected, then the user may be able to correct this mistake by means of a single actuation of the alteration key.

In an alternative embodiment, when the interface sets an active format set that has more than one format, its decision to cause the primary format of that format set to become the active format rather than causing some other format of that format set to become the active format is a potentially alterable decision, but that decision is not actually alterable until the user types at least one character to which that format set is applied, whereupon it becomes an alterable format decision that is an alterable input state decision as described in the preceding paragraph. In an embodiment, if such a decision is an adaptive decision, and if the user types at least one character before moving the input cursor to a new location, then the interface will evaluate the outcome of that decision based on the format of that character; for example, if the interface sets an active format set that has a bold font and a plain font, and the interface causes the bold font to become the active format because it is the primary format, and the user manually switches to the plain font before beginning to type, then the interface's decision to cause the bold font to become the active format will be considered to have had a non-beneficial outcome.

In an alternative embodiment, when the interface would set an active format set that has more than one format, the interface will merely cause the primary format of that format set to become the active format, and will not make an alterable format decision. Such an embodiment still may have significant advantages over prior art when its initial choice of an active format is a more intelligent choice than a prior art interface would make, even though that choice cannot be altered by means of alteration functionality.

Selecting Adjacent Formats Via Arrow Keys

In an embodiment, in certain circumstances that are described below, one or more formats may become "left-adjacent" or "right-adjacent" formats; for example, in certain circumstances, when a user moves the input cursor to the beginning of a document, a bold font may become the active format while a normal font becomes a left-adjacent format. In an embodiment, despite the term "left-adjacent," the format of the character immediately to the left of the cursor location may not be a "left-adjacent" format for purposes of the present specification: a "left-adjacent" format exists only in the circumstances that are explicitly described herein. Likewise, the format of the character immediately to the right of the cursor location may not be a "right-adjacent format."

In an embodiment, the active format is never left-adjacent or right-adjacent: whenever a format that is left-adjacent or right-adjacent becomes the active format, it ceases to be left-adjacent or right-adjacent. Whenever a user performs an action that causes the input cursor to move (including the action of typing a character), all formats that were previously left-adjacent or right-adjacent formats immediately cease to be left-adjacent or right-adjacent, but if that action consists of explicitly moving the input cursor, then that action may then itself cause one or more formats to become left-adjacent or right-adjacent, as described below.

In an embodiment, if a user actuates the left arrow key when there is a left-adjacent format, then instead of moving the input cursor, the interface will cause a left-adjacent format to become the active format, and the format that was previously the active format will become a right-adjacent format. If a user actuates the right arrow key when there is a right-adjacent format, then instead of moving the input cursor the interface will cause the right-adjacent format to become the active format, and the format that was previously the active format will become a left-adjacent format. In an embodiment, in such circumstances, if more than one format is left-adjacent or right-adjacent, the interface will if possible cause the left-adjacent or right-adjacent format that has the highest weight in the active format set to become the active format. Such a means of changing the active format may be convenient even in an embodiment that does not have alteration functionality.

In an embodiment, when the input cursor is at the beginning of a document, if a user actuates the left arrow key when there is no left-adjacent format, the interface will treat this as explicitly moving the input cursor to the beginning of the document, which will not cause the cursor to actually move but may cause the interface to change the active format and may cause one or more formats to become left-adjacent formats, as is described farther below. Conversely, when the input cursor is at the end of a document, if a user actuates the right arrow key when there is no right-adjacent format, the interface will treat this as explicitly moving the input cursor to the end of the document, which will not cause the cursor to move but may cause the interface to change the active format and may cause one or more formats to become right-adjacent formats.

For example, in an embodiment, when the active format is a bold font and there is one left-adjacent format, which is a normal font, then if a user actuates the left arrow key, then the normal font will become the active format. After that, if the user's next action is an actuation of the right arrow key, then this will undo the effect of pressing the left arrow key. If instead the user's next action is a second consecutive actuation of the left arrow key, then this will move the input cursor normally, except that if the input cursor was at the beginning of the document when the user performed the second consecutive actuation of the left arrow key then the interface will treat that actuation as explicitly moving the input cursor to the beginning of the document, which may for example cause the bold font to again become the active format and cause the normal font to again become a left-adjacent format.

In an embodiment, when an actuation of the left arrow key or right arrow key causes the interface to change which format is the active format without moving the input cursor, that change is treated as though it were an interface-specified change that is a subtle change for purposes of interface behaviors described in Chapter 8, and so a block descriptor will appear for that change. In an embodiment, such a block descriptor will not be highlighted.

Text-Specific Format Sets

In an embodiment, in certain circumstances the interface may determine an "included format set" for a certain portion of text. In an embodiment, the included format set for a portion of text will include every format that is applied to any character within that portion of text, with a weight that is proportional to the prevalence of that format within that portion of text. For example, if a paragraph of several sentences is mostly plain text but includes one sentence that is bold and a single character that is italicized, then its included format set will include the plain text format with a high weight, the bold format with a moderately low weight, and the italic format with a very low weight.

In an embodiment, in certain circumstances the interface may determine a "prevalent format set" for a certain portion of text. In an embodiment, the prevalent format set for a portion of text will include every format that is applied to at least a certain minimum percentage of that portion of text (such as, in an embodiment, at least 20%), with a weight that is proportional to the amount by which the prevalence of that format exceeds the minimum percentage. For example, if a paragraph of several sentences is mostly plain text but includes one sentence that is bold and a single character that is italicized, then its prevalent format set will include the plain text format with a high weight and the bold format with a very low weight, and will not include the italic format at all. In an alternative embodiment, the prevalent format set for a portion of text will simply be the same as the included format set for that portion of text.

Normal Format Sets

In an embodiment, in certain circumstances the interface will determine a "normal format set." Generally, such a format set is intended to include at least one format that a user will perceive as the format that is currently appropriate for text that is not emphasized in any way; when it is not easy for the interface to determine with certainty what particular format fits that description, the normal format set may include more than one format that may fit that description.

In an embodiment, when the interface determines a normal format set, it will include the format that is used most in the current document. In an embodiment, if that format is bold or italic or otherwise has a distinctive attribute, then the interface will also include a plain text version of that format (with such distinctiveness removed) in the normal format set. In an embodiment, a format's choice of font will never be treated as distinctive. For example, in an embodiment, when a document contains exclusively purple text in the Times New Roman font, the normal format set will include both a purple Times New Roman format and a black Times New Roman format. In an embodiment, when multiple formats are the most used in the current document, all such formats will be included in the normal format set, along with plain text versions of all such formats.

In an embodiment, when the interface determines a normal format set, along with the format that is used most in the current document, the interface will include every format that is used by at least a certain percentage of the current document (such as, in an embodiment, at least 20% of the current document), along with a plain text version of every such format. In an embodiment, each such format will have less weight in the normal format set the less it is used.

Positional Formatting

In the present specification, a user may be said to "explicitly move the input cursor" when the user performs a cursor navigation action, such as, for example, actuating an arrow key or clicking a location. Cursor movement that occurs due to input entry or deletion does not constitute explicitly moving the input cursor.

In an embodiment, when a user explicitly moves the input cursor to a new cursor location, the interface will set the active format set. Such behavior is explained in more detail below.

In an embodiment, when a user explicitly moves the input cursor to a new cursor location, the interface will cause the active format set to include the format of the nearest visually distinct character to the left of the input cursor, if any such character exists, and will also cause it to include the format of the nearest visually distinct character to the right of the input cursor, if any such character exists. If those two formats are the same, then this format will have a very high weight in the active format set. If those two formats are not the same, then for each of those formats, the weight of the format will equal a high weight minus a small amount per each visually ambiguous character in the relevant direction that is between the input cursor and the nearest visually distinct character in that direction. In an embodiment, if these two formats are not the same and have exactly the same weight, then the format of the nearest visually distinct character to the left of the input cursor is the primary format.

For example, in an embodiment, if red text is followed by a space character that is followed by blue text, and by pressing an arrow key the user moves the input cursor to after that space character, then the active format set will include the red format and the blue format, and the red format will have a slightly lower weight because one visually ambiguous character (the space character) is between the input cursor and the nearest visually distinct character to the left. If the user then types a word in that location, then the interface will decide to apply the blue font to the word the user types rather than the red font, and this decision will be an alterable decision with a high probability of alteration. If an additional space character had been present after the input cursor, so that the blue format's weight was reduced just as much as the red format's weight, then the interface would have decided to apply the red font instead; this decision would have been an alterable decision with a very high probability of alteration.

Figure 23B:
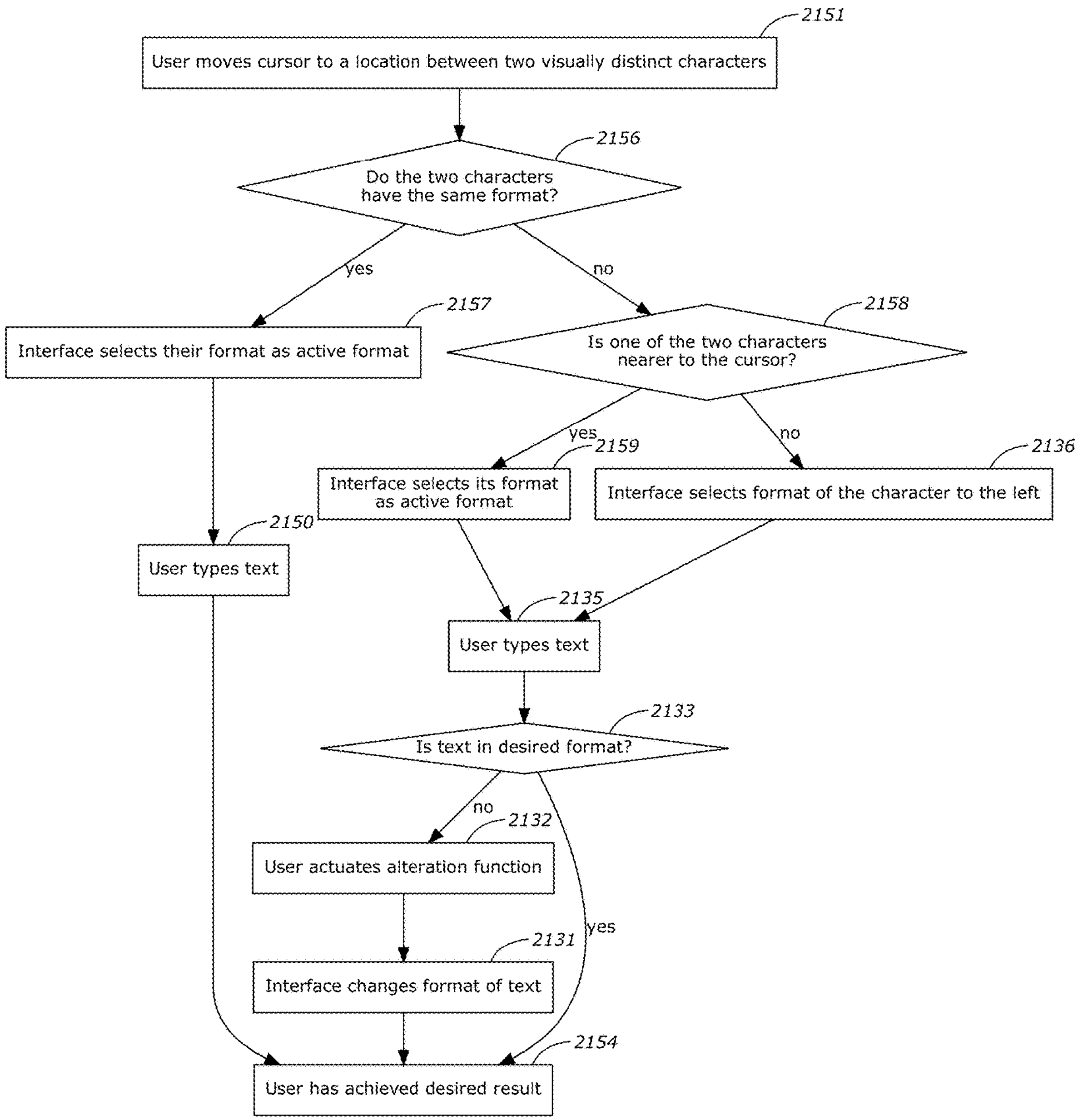
FIGS. 23B and 23C illustrate features related to positional formatting.

FIG. 23B illustrates the potential usefulness of the behaviors described above. In FIG. 23B, once a user moves the cursor to a location between two visually distinct characters (2303), the interface evaluates elements such as whether those two characters have the same format (2304). If they do, the interface selects that shared format as the active format (2305) so when the user types text (2306) they presumably achieve the desired result (2307). If instead the user has moved the cursor to a location between two characters that do not have the same format, then the interface will examine whether one of the two characters is positioned nearer to the cursor (2308) to determine the more relevant format. If one character is positioned more closely to the cursor, the interface selects that character's format as the active format (2309) for subsequent input for that location. If the two characters are equidistant, the interface defaults to select the format of the character to the left of the cursor. Regardless of the currently active format selected, the user's next input (2310) will allow the user to evaluate whether or not the text appears in the user's desired format (2311). If so, the user has achieved the desired result (2307). If not, the user can then make use of alteration functionality (2312), prompting the interface to change the format of the text (2313) to the alternate option so that the user may achieve the desired result (2307) without the need to manually select the desired format.

In an alternative embodiment, when a user explicitly moves the input cursor to a new location, if a visually distinct character exists that is to the left of the input cursor and a visually distinct character exists that is to the right of the input cursor, and these two characters have different formats, and the distance from the input cursor to the nearest such character on the left equals the distance from the input cursor to the nearest such character on the right, then the format of the nearest such character on the left will become the active format, and the format of the nearest such character on the right will become a right-adjacent format. Such interface behavior may undesirably hinder the use of the right arrow key for its usual purpose, but may still confer a net advantage in an embodiment that does not have alteration functionality, or in an embodiment where it is relatively inconvenient to alter an alterable format decision, because in such an embodiment it may be a convenient way for a user who has positioned the input cursor between two adjacent characters that have different formats to explicitly select the format of the character on the right to be the active format before beginning to type.

In an embodiment, in certain cases a potential cursor location may have its own individual formatting that does not necessarily match any characters to the left or the right of the location, as is described above. In an embodiment, when a user explicitly moves the input cursor to such a cursor location, the interface will also cause the active format set to include that location's format. The weight of that location's format in the format set will be the location's inherent weight as defined above. For example, if the input cursor is at the beginning of a certain line of plain text when a user switches the active format to bold, but then before typing anything the user moves the input cursor somewhere else, then the bold format will be, in a sense, left behind: the location at the beginning of the line where the cursor was when the user switch the active format to bold will itself have the bold format with moderate weight. That weight will decrease over time, as described above. If the user moves the input cursor back to the beginning of that line very soon, before the inherent weight of the bold format has decreased much, then that hold format will not become the active format but it will be included in the active format set with a moderate weight, so if the user types a word then the interface will decide to apply the plain font to that word and its decision to apply the plain font rather than the bold font will be an alterable decision with a moderate probability of alteration.

In an embodiment, when a user explicitly moves the input cursor to a location that is at the beginning of a line that is not empty, the interface will cause the active format set to include the format of the last character that precedes that line if any such character exists, with a low weight, and that format will become a left-adjacent format. When a user explicitly moves the input cursor to a location that is at the end of a line that is not empty, the interface will cause the active format set to include the format of the first character that is after that line if any such character exists, with a low weight, and that format will become a right-adjacent format. For example, if a document happens to include one line of text that ends with a word that is in an italic font, and that line of text is followed by a line that is entirely in a normal font, and if the user moves the input cursor to immediately after the italicized word, then the italic font will become the active format, but the user can change this by pressing the right arrow key to switch to the normal font, or the user can type a few characters and then actuate the alteration key to change those characters from the italic font to the normal font.

In an embodiment, when a user explicitly moves the input cursor to a location that is at the beginning or end of a document, the interface will cause the active format set to include the normal format set, with a reduced weight; if the location is at the beginning of the document, then all formats in the normal format set will become left-adjacent formats, and if it is at the end of the document, then all formats in the normal format set will become right-adjacent formats. For example, if most of the characters within a document are in a plain font but the last character is in a superscript font, and if the user moves the input cursor to the end of the document then the superscript font will become the active format, but the user can change this by pressing the right arrow key to switch to a plain font, or the user can type a few characters and then actuate the alteration key to change those characters from the superscript font to the plain font.

In an embodiment, after a user types a character, if the cursor is then in a location such that explicitly moving the input cursor to that location would cause one or more left-adjacent or right-adjacent formats to exist according to the interface behaviors specified in the two preceding paragraphs, then such left-adjacent or right-adjacent formats will exist as though the user had explicitly moved the input cursor to that location. For example, if most of the characters within a document are in a plain font, and the input cursor is at the end of the document, and the user switches to a superscript font and types a character in the superscript font at the end of the document, then pressing the right arrow key will cause the interface to switch to the plain font.

Figure 23C:
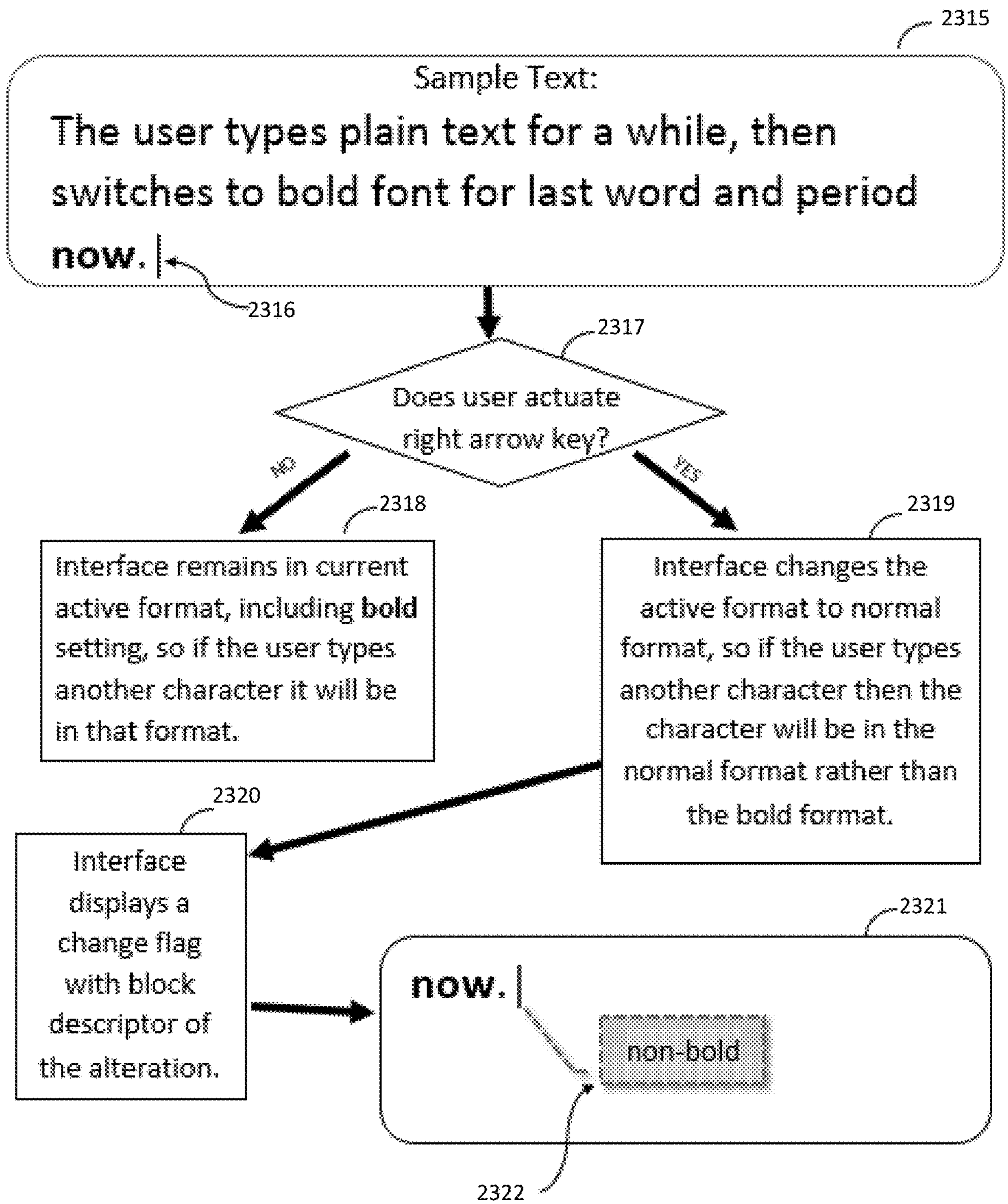

FIG. 23C is a flowchart that includes text that illustrates and explains the behavior described in the preceding paragraph such that actuating the right arrow key when the cursor is at the end of a line of text may cause the interface to change the active format: Block 2315 illustrates a situation where the active format is a bold format, but if the user actuates the right arrow key then the interface will behave as explained in Blocks 2319 and 2320 so the interface will change the active format to the normal format and display a block descriptor 2322 to inform the user of this change.

Paste Formatting

In various prior art interfaces, a user can copy and paste formatted text. In various interfaces, depending on the means by which a user pastes formatted text, the interface may either paste the formatted text with its formatting unchanged or may cause the formatting of the pasted text to entirely match the active format (which is the format that the interface would have applied if the user had typed a character rather than invoking the Paste command). For example, in WordPress, if a user presses Ctrl-V then the interface will paste formatted text with its formatting unchanged; if the user instead presses Ctrl-Shift-V then the interface will cause the formatting of the pasted text to match the active format, as though the user had retyped the individual characters of the pasted text rather than pasting the text.

In an embodiment of the present invention, when a user pastes formatted text into a document at the location of the input cursor, the primary format of the format set for the pasted copy of the text will be the original format of the formatted text; that is, the interface will alterably choose to keep the source formatting. In an embodiment, when a user pastes formatted text into a document at the location of the input cursor, the format set for the pasted copy of the text will also include every format that it would have included if the user had typed a character at that location. For example, if a user positions the input cursor between red text and green text and pastes blue text there, the interface will alterably decide to leave the pasted text blue; selecting one of the alternate options of this decision will cause the pasted text to become red, and selecting the other will cause the pasted text to become green.

FIG. 23D is a flowchart demonstrating interface use of contextual data to inform pasted text format determinations as alterable format decisions. When the user pastes formatted text into a location (2301) the interface defaults to preserve the pasted text's original source formatting (2302) but registers that formatting as an alterable decision. If the default format is what the user desired (2303), the decision is correct and the intended result achieved (2306). If the default original source formatting was not what the user desired (2303), user experience becomes defined by the interface's alteration functionality or its lack thereof (2304). When the format is alterable the user can simply invoke alteration functionality (2307) to prompt the interface to change the formatting to an alternate option determined by positional data (2308). (Usage of positional data is further detailed in FIG. 23B.) At that point, the user evaluates whether the text is in the desired format (2303), and the user either has achieved the desired result (2306) or can easily actuate alteration functionality again to prompt the interface to change the formatting to another not-previously-selected option. By contrast, if the interface lacks alteration functionality (2304), the user must manually edit the text format (if not forced to delete the input entirely and re-type it in the desired format) (2305) in order to achieve the desired result (2306).

Deletion Formatting

In an embodiment, immediately after a user deletes an individual character by means of the backspace key or Delete key, the primary format of the active format set will be the format that individual character had, and the active format set will also include every format that it would include if the input cursor were explicitly moved to its current location. For example, if a document consists entirely of plain text except for one line that is bold text, then if a user repeatedly presses the Backspace key until all the text in that line is deleted, the primary format of the active format set will be the bold format, and the active format set will also include the plain format. As another example, if the first letter of a word is underlined and the following letter is not, then if a user deletes that first letter and immediately retypes a new letter, the new letter will be underlined by default, but the interface's decision to underline the new letter will be an alterable decision.

In an embodiment, immediately after a user selects a region of input containing a plurality of characters and then actuates the backspace key or the Delete key so that all the characters within the region are deleted via a single keystroke, the primary format of the active format set will include the prevalent format set of the text that was deleted via that keystroke and will also include every format that it would include if the input cursor were explicitly moved to its current location. For example, if a document contains just one brief sentence that is in a bold font, and that sentence includes a couple italicized words, then if a user selects that sentence and then deletes the entire sentence by means of a single actuation of the backspace key, then the active format set will include the bold format, and will include the bold italic format with a lower weight, and will also include a plain format if the characters that are now immediately before and immediately after the cursor location are plain text characters.

Pattern-Recognition Formatting

In an embodiment, the interface will attempt to recognize distinctive format usage patterns. If the interface recognizes a distinctive format usage pattern, then the interface will automatically add the appropriate format to the active format set at the appropriate time in order to cause the pattern to continue. If the interface is very confident in recognizing such a distinctive format usage pattern, then the interface will add the appropriate format to the active format set as the primary format.

In particular, in an embodiment, when a document has at least three blank lines, if each line that is immediately after a blank line has the same first particular format, and each such line is immediately followed by a line that has the same second particular format that is distinct from the first particular format, then when the user adds a line at the end of the document, if that line is immediately after a blank line, then the interface will add that first particular format to the active format set as the primary format, and unless the user then breaks the pattern, at the start of the following line the interface will add that second particular format to the active format set as the primary format. For example, in such an embodiment, if a blank line is always followed by a line that is in a particular bold font (because it is a section heading) that is followed by a line that is in a particular normal font, then the interface will learn to automatically switch to that particular bold font after a blank line, and then switch back to that particular normal font at the beginning of the following line.

Various other means of identifying distinctive format usage patterns will be evident to those of ordinary skill in the art, and especially clever means of identifying distinctive format usage patterns may be evident to the especially skilled practitioner. One possible advantage of the alterable format set functionality that is described above is that once such functionality is deployed, an interface designer can aggressively deploy smart algorithms that attempt to guess what format a user wants with relatively little risk that such algorithms will cause very much inconvenience when they guess incorrectly.

Targeted Formatting

The alteration key and other alteration functionality may be quite useful for efficiently correcting mistakes, but do not necessarily need to be devoted to that purpose exclusively: in an embodiment, alteration functionality may also be used to make other changes. In particular, in an embodiment, the targeted format alteration feature described below may be used to change the format of a selected portion of a document.

In an embodiment, while a range of input is selected, the selected range is "targeted for alteration" as described in Chapter 14. In the following paragraphs, a selection that is targeted for alteration will be referred to as a "target."

In an embodiment, when a selection is targeted for alteration, the interface may cause one or more targeted alterable interface decisions to temporarily exist such that altering one of these decisions will cause the format of the target to change. Such an embodiment will be said to have "the targeted format alteration feature," and such an alterable interface decision will be referred to herein as a "targeted format decision."

In an embodiment, when a selection is targeted for alteration, if the target is the alterable block of an alterable format decision that already existed, then that alterable format decision will be treated as a targeted format decision for purposes of the behaviors described below even though it is not a targeted alterable interface decision as defined in Chapter 14, and so the interface may temporarily add additional formats to its format set, as described below. If it does, then if any of these additional formats would have a weight greater than the weight of the primary format that was already in the format set of the targeted format decision, then the weights of all these additional formats will be reduced by a sufficient percentage that none has a weight greater than the weight of the primary format. Also, if the interface adds additional formats to the format set of an alterable format decision when its alterable block becomes targeted for alteration, then any such additional format that is not selected when its alterable block ceases to be targeted for alteration will then be deleted from the format set of the alterable format decision.

In an embodiment, when a selection is targeted for alteration, if the target is not the alterable block of an alterable format decision that already existed, then the interface will cause a single targeted alterable interface decision to exist that is a targeted format decision, except that if such a decision would have no alternate options then the interface will not cause such a decision to exist. Such a decision will be an alterable format decision such that the primary format of its format set corresponds to leaving the format of the selection unchanged; the interface may also add other formats to its format set, as described below, and if it does, then the targeted format decision will thus have alternate options that have probabilities of alteration that are proportional to the weights of these additional formats in its format set.

In an embodiment, when a decision is a targeted format decision, its format set will include every format that is in use in the current document. Thus, for example, in an embodiment, if all the text in a document is either black or red, then selecting a black word and actuating the alteration key may cause the word to become red, and selecting a red word and actuating the alteration key may cause the word to become black.

In an embodiment, the interface will remember formats that a user has used even after a document is closed, and the format set of a targeted format decision not only will include every format that is in use in the current document, but also may include other formats that the user has recently used. In an embodiment, the interface will examine other documents on the same computing device that may be closely related to the current document, such as documents that are stored in the same folder on a computer's hard drive, and a targeted format decision may also include other formats that are stored on the same computing device as the current document.

Targeted Format Weights in an embodiment, for purposes of the interface behavior described in the following paragraphs, an "alternate format" is a format that is in the format set of a targeted format decision. Various factors are discussed below that the interface may take into consideration in assigning a weight to a format in the format set of a targeted format decision. When it is said that an alternate format is assigned a higher weight in certain circumstances, this means that it is assigned a higher weight than it would be assigned in other circumstances, all else being equal. For example, the following paragraph means that in an embodiment, an alternate format that is used in the current document will be assigned a higher weight than it would be assigned if it were not used in the current document, all else being equal.

In an embodiment, an alternate format that is used in the current document will be assigned a higher weight.

In an embodiment, an alternate format that is used by text that is located closer to the target will be assigned a higher weight than it would be assigned if it were located farther away, and in particular, an alternate format that is used by text that is immediately adjacent to the target will be assigned an especially high weight.

In an embodiment, the interface will count the number of distinct places that each alternate format is used within the current document, and an alternate format that corresponds to a higher number will be assigned a higher weight. In an embodiment, if the interface examines other documents on the same computing device to determine what alternate formats are available for a targeted format decision, then the interface will count the number of distinct places that each alternate format is used within other documents and will add a percentage of this number to the number of distinct places that each alternate format is used within the current document, and an alternate format that corresponds to a higher total will be assigned a higher weight. (In other words, in an embodiment, alternate formats that are more heavily used will have a higher weight, especially if they are more heavily used in the current document.) In an embodiment, the percentage mentioned in the present paragraph is a higher percentage for documents that the user has edited more recently; in an alternative embodiment, the percentage is a fixed percentage.

In an embodiment, an alternate format that the user selected more recently will be assigned a higher weight. For purposes of the present paragraph, "selecting" a format consists of explicitly choosing that format by some means such as clicking format-related buttons on a toolbar or performing targeted format alteration; merely locating the input cursor within a region where a format has previously been applied and typing within that region does not constitute "selecting" that format.

In an embodiment, an alternate format that has more format values in common with the entire target will be assigned a higher weight; for example, if the selection that is targeted for alteration includes only black underlined text and blue underlined text, then an alternate format that includes underlining will be assigned a higher weight than an alternate format that does not, all else being equal.

In an embodiment, for each format value that an alternate format does not have in common with the entire target, the alternate format will be assigned a higher weight if it does not have that format value in common with the majority of the current document than the weight it would be assigned if it did have that format value in common with the majority of the current document, all else being equal. In other words, formats that diverge farther from the document's default format will tend to have higher weights. In an embodiment, the weight bias described in the present paragraph will be sufficiently strong that if an alternate format consists of the format that is used in the majority of the current document, then this format still may not necessarily have the highest weight of all the alternate formats. For example, in an embodiment, if the majority of a document consists of non-underlined black text and the selection that is targeted for alteration consists of non-underlined blue text, and if an alternate format consisting of underlined blue text exists, then the alternate format consisting of underlined blue text may have a higher weight than an alternate format consisting of non-underlined black text even though non-underlined black text is used in the majority of the current document.

In an embodiment, when the selection that is targeted for alteration has the same format as the text that immediately precedes the selection and the same format as the text that immediately follows the selection, the weight bias disclosed in the preceding paragraph will be even stronger. For example, in such an embodiment, if the majority of a document consists of non-underlined black text and the selection that is targeted for alteration consists of a single word that is in the middle of a sentence that entirely consists of non-underlined blue text, then the behavior disclosed in the present paragraph will cause the interface to have a substantial bias against causing that word to become non-underlined black text, as opposed to, say, underlined blue text.

However, in an embodiment, as an exception to the behaviors disclosed in the preceding two paragraphs, when the selection that is targeted for alteration has the same format as the text that immediately precedes the selection and the same format as the text that immediately follows the selection, if the selection is italicized and the majority of the current document is not italicized, then an alternate format that is identical to the selection's current format except that it is not italicized will not be assigned a lower weight due to not being italicized. For example, in such an embodiment, if the selection that is targeted for alteration consists of a single italicized word that is in the middle of an italicized sentence, then the behavior disclosed in the preceding two paragraphs will not be applicable and so the interface may not necessarily have any bias against causing that word to become non-italicized text.

Subsequent Formatting

In an embodiment, for purposes of the interface behavior described in the following paragraphs, a "subsequent format decision" is an alterable format decision such that altering the decision will change which format is the active format but will not change the format of any characters that exist yet. For example, if a user moves the input cursor to a new location and the interface makes an alterable input state decision whether to set the active format to a red format or a blue format, that decision is then a subsequent format decision, but as soon as the user types a character, it is no longer a subsequent format decision.

Because altering a subsequent format decision does not change the format of any characters that exist yet, in an embodiment, such an alterable decision is a subtle change for purposes of the relevant interface behaviors that are described in Chapter 8, which means that when such a decision is a highlighted alterable decision, in an embodiment, the interface may cause a block descriptor to appear that contains a brief description of the status of such an alterable decision, as is described in Chapter 8. In an embodiment, such a brief description will include only the minimum explanation necessary to distinguish a particular option of a subsequent format decision from the other options; for example, if the two options of a subsequent format decision consist of setting the active format to be either italicized underlined red or italicized underlined blue, then the brief descriptions of those options will consist of only the words "red" and "blue" respectively. In an embodiment, the text of such a brief description will be displayed in the actual format that it is a description of, provided that this format does not cause the text to be illegible.

In an embodiment, whenever the input cursor is at a location where it is possible to input formatted text, and no text is selected, a subsequent format decision will exist, except that if such a decision would have no alternate options then such a decision will not exist. The format set of such a decision will be referred to as the "subsequent format set." That is, in an embodiment, except when there is a subsequent format decision that exists due to an interface behavior that is described above (such as due to the interface causing a format set that has more than one format to become the active format set), or when there is text that is selected, the interface will cause a subsequent format decision to temporarily exist, unless such a decision would have no alternate options. In an embodiment, such a decision will exist only until the user performs an editing action such as moving the input cursor or typing a character, whereupon the interface will delete the decision (but may then immediately cause another subsequent format decision to temporarily exist). For example, in an embodiment, if a user alters a temporarily existing subsequent format decision and thus causes the active format to change from red to blue, and then the user types a character, then the decision the user altered will no longer exist and so the user cannot change the color of the character he just typed by altering that decision; a new temporarily existing subsequent format decision may then exist so that the user can change the active format from blue back to red, but doing so would not affect any character the user already typed.

In an embodiment, whenever there is a visually distinct character that is to the right of the input cursor, if the nearest such character has a format other than the active format, the subsequent format set will include the format of that character with a high weight, minus a small amount per each visually ambiguous character that is between the input cursor and that character. When the input cursor is at the end of a line that is not empty, the subsequent format set will include the format of the first character that is after that line if any such character exists, with a low weight. When the input cursor is at the end of a document, the subsequent format set will include the normal format set, with a reduced weight.

In an embodiment, the subsequent format set will include every format that would be included in the format set of any targeted format alteration decision as described above, and the same factors that would affect the weights of the formats in the format set of a targeted format alteration decision as described above correspondingly affect the weights of these formats in the subsequent format set, except that factors that affect format weights that are dependent on the content of the target in a targeted format alteration decision are not relevant in determining the format of a weight in the subsequent format set, since there is no selection that is targeted for alteration. (Such behavior is possible even in an embodiment that does not have targeted format alteration decisions: the above explanation of how to determine what formats are included in the format set of a targeted format alteration decision can instead be used as an explanation of how to determine what formats are included in the subsequent format set.) Thus, for example, in an embodiment, if a document contains some blue text in just one location, and that location is quite far away from the input cursor location, then the subsequent format set will include the blue format, but with a relatively low weight because it is used far away and in only one place.

In an embodiment, for each alternate option of a temporarily existing subsequent format decision, its probability of alteration will equal only a certain percentage (such as, in an embodiment, 50%) of the probability of alteration it would have if the temporarily existing subsequent format decision were an ordinary alterable format decision. For example, in an embodiment, if a character moves the input cursor to a location that is between a red letter and a blue letter, then the interface will make an alterable format decision to set the active format to be red instead of blue, and the blue format will have a high weight in the format set of that decision, so the alternate option of that decision will have a very high probability of alteration (such as, in an embodiment, 5.0). Such a decision is an ordinary alterable format decision, and is an alterable input state decision. If the user then types a character that is red, then that alterable input state decision may still exist, so the user can change that character from red to blue by altering that decision, but now a temporarily existing subsequent format decision will also exist. Such a temporarily existing subsequent format decision will not have a very high probability of alteration: the blue format has a high weight in the format set of that decision, but the corresponding alternate option of that decision has a probability of alteration that equals only a certain percentage of the probability of alteration it would ordinarily have, so that alternate option has a moderate probability of alteration (such as, in an embodiment, 2.5). If the user continues to type red text within the alterable block of the alterable input state decision, gradually that decision's probability of alteration will decrease so that its probability of alteration may become lower than that of a temporarily existing subsequent format decision. Thus, in such an embodiment, it may be the case that when a user moves the input cursor to a location that is between two formats and begins to type, if the text the user is typing is not in the format the user desires, the user can retroactively correct this mistake by actuating the alteration key once; if it is in the format the user desires, the user can continue to type text in this format, and then a while later, if the user wants to switch to the other format without affecting the text he has already typed, he may be able to achieve this by actuating the alteration key once, provided that the alterable input state decision regarding the text he has already typed has come to have a lower probability of alteration than the temporarily existing subsequent format decision.

Text Formatting Improvements in Perspective

The behaviors that are described above that pertain to formatting of text may be advantageous even in an embodiment that does not have any functionality pertaining to alterable interface decisions. Although in such an embodiment the interface's initial choice of an active format cannot be altered by means of alteration functionality, such an initial choice may still be a more desirable choice than a prior art interface would make. For example, in an embodiment, as described above, if a red word and a blue word are separated by a sequence of space characters and a user moves the input cursor to a location within that sequence of space characters, then the interface will set the active format to be either red or blue depending on which word the input cursor is closer to. In those circumstances, a typical prior art interface would set the active format based on the foreground color of the space character immediately to the left of the input cursor in its new location, which is something that the user cannot actually see because a space character has no foreground text. Such prior art behavior may be undesirable, because it is often undesirable to base interface decisions on information that users cannot actually see.

However, the behaviors that are described above that pertain to formatting text may be significantly more advantageous in an embodiment that facilitates altering alterable interface decisions. On many occasions, the present writer has made formatting mistakes that could have been easily corrected in an embodiment that makes alterable format decisions as described above and that facilitates altering alterable interface decisions. For example, the behaviors that are described above that pertain to formatting text may be advantageous in an embodiment that has the automatic decision variation feature that is described in Chapter 17: on several occasions, the present writer moved the input cursor to a location between one word that had a certain format and another word that had a different format, and began to type, and then realized the text he was typing did not have the format he desired, and then deleted the text and began to type again, only to realize that he had just repeated his mistake; in an embodiment that makes alterable format decisions as described above and that has the automatic decision variation feature, such behavior could actually correct the mistake. Even better, when such an embodiment also has an alteration key as described in Chapter 2 and highlights alterable decisions as described in Chapter 5, if a user moves the input cursor to a location between two words that are in different formats and begins to type, then the text will become a highlighted alterable block, so if the text is not in the desired format then the user will be able to alter the format by means of a single actuation of the alteration key.

Chapter 35: Alterable Layout Formatting

Paragraph Formatting

In various interfaces, such as Microsoft Word and WordPress, pressing Enter will typically cause the interface to insert a paragraph break, which will not cause the interface to move the cursor to the beginning of the next line: instead, the interface will move the cursor to the beginning of the line after that, leaving a blank line between the previous paragraph and the new paragraph. After this occurs, it is not possible to move the input cursor into the blank line that appears to exist between the input cursor's previous location and its new location, or to edit this line in any way. If a user wishes to move on to the next line without also inserting such a non-editable blank line, the user must press Shift-Enter to insert a line break that is not a paragraph break, or must edit paragraph format settings in such a way as to prevent such a non-editable blank line from appearing.

In Microsoft Word, if a user presses the Tab key when the input cursor is on a blank line, the interface will simply insert a tab character. If a user presses the Tab key when the input cursor is at the beginning of a paragraph that does not have its first line indented, the interface will display a result that appears identical to the result that would have obtained if the interface had inserted a tab character, but this result will not be obtained by actually inserting a tab character: instead, the interface will adjust the paragraph format settings so that the first line of the paragraph is inherently indented exactly as much as it would have been indented if a tab character had been inserted. If a user presses the Tab key when the input cursor is at the beginning of a paragraph that already has its first line indented, or if a user presses the Tab key when an entire paragraph is selected, then the interface will adjust the paragraph format settings so that every line of the paragraph is further indented. Whenever pressing the Tab key thus causes the interface to adjust paragraph format settings, a small button will appear such that clicking the button will cause a menu to appear that gives a user the option of replacing this paragraph format change with the insertion of an ordinary tab character, among other options; as soon as the user performs an editing action other than using this menu, this button will disappear.

In Microsoft Word, if a user presses the backspace key when the input cursor is at the beginning of a paragraph that has its first line indented, the interface will adjust the paragraph format settings so that the first line of the paragraph is no longer indented. If a user presses the backspace key when the input cursor is at the beginning of a paragraph such that the first line of the paragraph is not individually indented but the paragraph itself is indented, then the interface will adjust the paragraph format settings so as to reduce the indenting of the entire paragraph.

Thus, in Microsoft Word, a user can conveniently increase and decrease paragraph indenting by means of the Tab and backspace keys, with no need to explicitly access a paragraph formatting menu. After a user has thus changed the paragraph format settings for a particular paragraph, if the user then inserts a paragraph break at the end of the paragraph, the same paragraph format settings will be applied to the new paragraph. (That is how the distinction between inserting a single tab character and making an equivalent change to the paragraph formatting settings becomes significant: in Microsoft Word, if you first press Tab and then type a paragraph, then the result will appear to be the same as if you type the paragraph and then go back and press Tab at the beginning of the paragraph, but if you subsequently moves the input cursor to the end of the paragraph and press Enter, the result will be different: if you pressed Tab before typing the paragraph, then Microsoft Word inserted a tab character and did not change the paragraph format settings, so the next paragraph will not be indented; if you typed the paragraph before going back and pressing Tab, then Microsoft Word changed the paragraph format settings, so the next paragraph will be indented.)

Alterable Paragraph Formatting

In an embodiment, when a user presses Enter, if the interface would insert a paragraph break that would cause the interface to not only move on to the next paragraph but also insert a blank line between the adjacent paragraphs, then the interface's decision to insert such a blank line between the adjacent paragraphs is an alterable decision. In other words, in an embodiment, when a user presses Enter, the interface's decision to insert a paragraph break rather than a mere line break is an alterable decision. Such an alterable decision will be referred to herein as an "alterable line break decision."

In an embodiment, for purposes of the automatic decision variation feature (and for purposes of any other feature that recognizes the internal representation of the alterable block of an an alterable decision), the alterable block of an alterable line break decision is the paragraph break character or line break character that was inserted in the document when the user pressed Enter. For example, in an embodiment, if a user presses Enter and the interface inserts a paragraph break, and then the user immediately presses backspace and immediately presses Enter again, then the interface will insert a line break instead of a paragraph break the second time.

In an embodiment, for purposes of highlighting, the alterable block of an alterable line break decision will consist of the entire blank line that is visible because of the paragraph break when the selected option of the alterable decision is a paragraph break, and will consist of a very slender horizontal line between consecutive lines of text when the selected option is a line break.

In an embodiment, alterable line break decisions are an adaptive decision class, so if inserting a paragraph break when a user presses Enter is repeatedly and consistently a beneficial outcome, then its probability of alteration will soon drop below the highlighting threshold, and conversely, if inserting a line break when a user presses Enter is repeatedly and consistently the outcome that is beneficial or would have been beneficial, then soon inserting a line break will be the default outcome when the user presses Enter, and eventually the probability of alteration of such decisions will drop below the highlighting threshold.

In an embodiment, if a user indents a paragraph by pressing Tab at the beginning of the paragraph, then as soon as the paragraph includes multiple lines so that it is clear whether it is the entire paragraph that is indented or only the first line, the interface's decision whether to indent the entire paragraph or only the first line will then become an alterable decision. Thus, if a user types an entire multi-line paragraph and then moves the input cursor to the beginning of the paragraph and presses the Tab key, then the interface's decision whether to indent the entire paragraph or only the first line will immediately be alterable; if instead a user presses the Tab key before beginning to type a paragraph, then only when the paragraph becomes a multi-line paragraph will the decision become an alterable decision.

In an embodiment, when a user presses Enter and the interface inserts a paragraph break or a line break, if the previous paragraph or line was indented, then the interface will make an alterable decision whether or not to indent the new paragraph or new line the same way. Additionally, in an embodiment, after a user presses Enter and the interface inserts a paragraph break or line break, if the interface decides to indent the new paragraph or new line, the user can delete such indenting by pressing the backspace key when the input cursor is at the beginning of the new paragraph or new line.

Targeted Paragraph Formatting

In an embodiment, when a selection is targeted for alteration, if the selection is an entire paragraph, the interface may cause a targeted alterable interface decision to temporarily exist such that altering the decision will cause the paragraph formatting to change. Such a decision will be referred to herein as a "targeted paragraph decision."

In an embodiment, a targeted paragraph decision is distinct from a targeted format decision as described above, but works in the same way as a targeted format decision, except that instead of alternate options corresponding to various text formats that are in use in the current document, a targeted paragraph decision will have an option corresponding to each paragraph format that is in use in the current document (with the paragraph format that was already applied to the targeted paragraph as its default option). For example, in a document where all the paragraphs have default formatting except one paragraph that is indented, and where all the text is black except for a few individual words that are red, if a user selects an entire paragraph that is black and not indented, then the interface will cause a targeted paragraph decision to exist such that altering the decision will indent the paragraph; the interface will also cause a targeted format decision to exist such that altering the decision will convert all the text to red.

In an embodiment, a targeted paragraph decision has a higher probability of alteration than a targeted format decision. In an embodiment, various behaviors that are described above with respect to targeted format decisions are also applicable to targeted paragraph decisions; for example, in an embodiment, the interface will remember paragraph formats that a user has used even after a document is closed, and the options of a targeted paragraph decision not only will include one option corresponding to each paragraph format that is in use in the current document, but also may include other options corresponding to other paragraph formats that the user has recently used.

In an embodiment, for purposes of targeted paragraph decisions, any text format attribute that is applied to an entire paragraph of a document is treated as though it were itself a paragraph format attribute. For example, in a document where all the text is black except for one paragraph that is entirely red, if a user selects an entire paragraph that is black, then the interface will cause a targeted paragraph decision to exist such that altering the decision will convert the text of the entire paragraph to red. (The interface will also delete any alternate option of a targeted format decision that would duplicate this effect.) As another example, in such an embodiment, in a document where all the text and all the paragraphs have default formatting except one paragraph that is indented and italicized, selecting a paragraph that is not indented will cause a targeted paragraph decision to exist such that altering the decision will simultaneously indent and italicize the paragraph.

List Formatting

In Microsoft Word, if a user types "1." at the beginning of a paragraph and presses the space bar, the interface will automatically indent the paragraph and convert this number to the first number in a numbered list. This behavior may in some cases constitute an undesired interface intervention, but Microsoft Word facilitates recovering from undesired interface interventions: in this case, when Microsoft Word thus converts a number to the first number in a numbered list, it also displays a small button such that clicking the button will cause a menu to appear that gives the user the option of undoing this automatic conversion, among other options. This button will remain visible if the user types additional text within the numbered list, but will disappear when the user types additional text somewhere else.

In Microsoft Word, by default, numbered lists are formatted differently than ordinary paragraphs. Within a numbered list, pressing Enter at the end of a line that contains more than just the number will cause the interface to insert a line break (as opposed to a paragraph break) and to put the next consecutive number at the beginning of the next line; if later lines were already present that included the next consecutive number, the interface will increment the numbers of these later lines. As an exception, if the previous number was preceded by two consecutive line breaks, then pressing Enter at the end of the line will cause the interface to insert two consecutive line breaks. Pressing backspace when the input cursor is immediately after a number within a numbered list will cause the interface to delete the number, and to decrement the numbers of any later lines in the list. Within a numbered list, pressing Enter at the end of a line that contains only a number will cause the interface to delete the number, decrement the numbers of the later lines of the list, and insert a paragraph break.

So, for example, in Microsoft Word, on several occasions, when the present writer has wished to create a numbered list with blank lines between the consecutive numbers, the present writer has done so by means of the following procedure: First, at the beginning of a paragraph, type "1." and press the space bar. The interface will automatically indent the paragraph and convert this number to the first number in a numbered list. Type the first element of the list. Press Enter. The interface will insert a line break and put the number "2." at the beginning of the next line, but without the desired blank line in between. Try to insert a blank line between the first and second lines by moving back up to the end of the first line and pressing Enter again. The interface will again insert a line break and put the number "2." at the beginning of the next line, and will also increment the previously entered number "2." so that it is now "3." Press backspace. The interface will delete the number "2." on the current line, so the current line is now a blank line, and will decrement the number "3." on the next line, so that it is now the number "2." This is the result that is desired thus far, in that the first two numbers of the list are present and are separated by a blank line. Subsequently, after typing the second element of the list, pressing Enter will cause the interface to insert two consecutive line breaks, as desired. (The present writer did not consciously understand this procedure before preparing to write the present discussion of prior art; he has performed this procedure or variants of this procedure several times, but each time, he achieved the desired result by trial and error, without actually understanding the behavior of Microsoft Word, and without subsequently remembering what he had done in order to achieve the desired result.)

Microsoft Word will create a lettered list if a user types "A." at the beginning of a paragraph and presses the space bar; the interface will treat such a lettered list the same way as a numbered list, except that instead of incrementing or decrementing numbers in certain circumstances the interface will increment or decrement letters in such circumstances, where "incrementing" a letter means replacing it with the following letter, and "decrementing" a letter means replacing it with the preceding letter. Similarly, Microsoft Word will create a bullet point list if a user types "–" at the beginning of a paragraph and presses the space bar; the interface will treat such a bullet point list the same way as a numbered list, except that the interface will never increment or decrement numbers in a list that includes bullet points instead of numbers. Microsoft Word will create various other similar types of lists in similar circumstances, such as if a user types the Roman numeral "I." at the beginning of a paragraph and presses the space bar, or if a user types the number "1)" at the beginning of a paragraph and presses the space bar, and so forth.

The Home editing ribbon in Microsoft Word includes a numbered list button with a drop-down arrow next to it;

clicking the arrow opens a drop-down menu that includes a "Numbering Library" with various numbered and lettered list formats such that selecting one of these formats will cause the interface to create the selected type of list, except that if the input cursor was already located in some type of numbered or lettered list, then selecting such a format will instead cause the interface to convert that list to the selected type of list. For example, a user may convert the numerals in a list from ordinary numerals to Roman numerals by positioning the input cursor within the list, clicking the drop-down arrow next to the numbered list button on the Home editing ribbon, and selecting a Roman numeral option from the Numbering Library. This drop-down menu also includes "Recently Used Number Formats" and "Document Number Formats"; these sections may include duplicates of formats that are present in the Numbering Library.

Alterable List Formatting

In an embodiment, if a user types "1." at the beginning of a paragraph and presses the space bar, then the interface's decision whether or not to automatically create a numbered list is an alterable decision. Similarly, in an embodiment, if a user types "i)", or "A.", or "–", or anything else that may denote the beginning of a numbered list, letter list, or bullet point list at the beginning of a paragraph, and then the user presses the space bar, then the interface's decision whether or not to automatically create the appropriate type of list is an alterable decision.

In an embodiment, if a user types "–" at the beginning of the paragraph and presses the space bar, if the interface decides to automatically create a bullet point list, the interface will make an alterable decision what bullet symbol to use for the list. In an embodiment, such an alterable decision will be combined with the alterable decision regarding whether or not to automatically create the bullet point list, so the resulting combined alterable decision will have one option corresponding to each possible bullet symbol and another option corresponding to not creating a bullet point list at all; one of these options will be the default option.

In the following paragraphs, a "delimited list" is a numbered list, lettered list, or bullet point list. A "delimiter" is whatever denotes the beginning of an item in the list, whether it be a number or letter followed by a period, a number or letter followed by a right parenthesis, a bullet point, or whatever else may denote the beginning of an item in the list.

In an embodiment, if the input cursor is at the end of a line in a delimited list when a user presses Enter, the interface will alterably decide whether to insert a single line break and proceed to the next delimiter, or insert a double line break and proceed to the next delimiter, or end the list and insert a paragraph break. Such a decision will be referred to herein as an "alterable list continuation decision." In an embodiment, if the input cursor is at the end of the second line or a later line in a delimited list when a user presses Enter, then either the alternate option of the alterable list continuation decision that causes the interface to proceed to the next delimiter but changes the size of the line break will have an extremely low probability of alteration, or that option will be deleted entirely; in other words, once a user appears to have decided on the desired amount of spacing between the first two list elements, the decision regarding spacing of later elements will either have an extremely low probability of alteration or will not be alterable.

In an embodiment, if the input cursor is at the end of a line in a delimited list when a user presses Enter, and so the interface makes an alterable list continuation decision, then if the line included only a delimiter, the alterable list continuation decision will include an option such that if the option becomes selected, the interface will delete that line, end the list, and insert a paragraph break. In an embodiment, the initial outcome of an alterable list continuation decision will depend on whether or not the input cursor was at the end of a line that includes more than just a delimiter: if the line includes more than just a delimiter, or if it was not immediately preceded by a line of the list that includes more than just a delimiter, then the interface will alterably decide to insert a line break and proceed to the next delimiter; otherwise, the interface will alterably decide to delete the line, end the list, and insert a paragraph break. In other words, in such an embodiment, after a line in a delimited list that includes more than just a delimiter, by default a user can end the list by means of pressing Enter twice consecutively: the first actuation of the Enter key will cause the interface to insert a line break and proceed to the next delimiter, but the second actuation of the Enter key will undo the effect of that first actuation of the Enter key and insert a paragraph break instead.

For example, in an embodiment, if a user wishes to create a list consisting of five placeholder numbers but does not yet wish to type the elements of the list, the user may type "1." at the beginning of a paragraph and press the space bar. The interface will alterably decide to automatically convert this to the first number in a numbered list. The user may then press Enter; because the current line is not preceded by a line of the list that includes more than just a number, the interface will alterably decide to insert a line break and proceed to the next number. The user may do this repeatedly. After the fifth line, the user may press Enter again; the interface will again alterably decide to insert a line break and proceed to the next number, but this time, the user may alter this decision so as to replace this undesired sixth line with a paragraph break.

In an alternative embodiment, an alterable list continuation decision will never include an option that would cause the interface to delete a line. Instead, if the input cursor is at the end of a line in a delimited list when a user presses Enter twice consecutively, the interface will make an alterable multi-click decision whether to treat this as two ordinary actuations of the Enter key or to treat this as a special double-click actuation that causes the interface to end the list and insert a paragraph break. Alterable multi-click decisions are described in more detail in Chapter 39. Such an embodiment will yield an interface behavior that is quite similar to what is described in the preceding two paragraphs, but is different in that the amount of time that elapses between two consecutive actuations of the Enter key may affect the interface's behavior.

In the present paragraph, a "wordwrap-added line" of a list item is any line within a delimited list that is on a different line than its delimiter due to wordwrap. In an embodiment, the first time that a particular delimited list has any wordwrap-added line, the interface will alterably decide whether all such lines in the current list are to be left aligned so that the first character of each wordwrap-added line is directly under its delimiter, or are to be left aligned so that the first character of each wordwrap-added line is directly under the first character following its delimiter.

Targeted List Formatting

In an embodiment, a "list format" includes formatting information that is specific to a delimited list, such as what type of delimiter is used for the list, whether consecutive list elements are separated by a single line break or double line break, whether wordwrap-added lines are left aligned so as to line up with delimiters or left aligned so as to line up with characters after delimiters, and any other formatting information that may be specific to a delimited list.

In an embodiment, when a selection is targeted for alteration, if the selection is an entire delimited list, the interface may cause a targeted alterable interface decision to temporarily exist such that altering the decision will cause the list formatting to change. Such a decision will be referred to herein as a "targeted list decision."

In an embodiment, a targeted list decision works in the same way as a targeted format decision or targeted paragraph decision, but has an option corresponding to each list format that is in use in the current document (with the list format that was already applied to the targeted list as its default option). In an embodiment, a targeted list decision has a higher probability of alteration than a targeted format decision. In an embodiment, various behaviors that are described above with respect to targeted format decisions are also applicable to targeted list decisions. In an embodiment, for purposes of targeted list decisions, any text format attribute that is applied to an entire delimited list within a document is treated as though it were itself a list format attribute.

Initial Document Templates

In prior art document editing software, it is common for a user to be able to choose by some means that rather than creating a new document that is initially blank, the user will instead select a predefined document template from a list of templates, which may include options such as business letter, event flyer, résumé, student report, and so forth. The user may then customize the selected template rather than creating that type of document from scratch. Such templates may thus greatly reduce the amount of work a user needs to do in order to create a document with the appropriate layout and appropriate fonts for a particular purpose.

In an embodiment of the present invention, when a user creates a new document, the interface will alterably decide to create a new document that is initially empty and without special formatting, rather than creating a new document that is based on a predefined document template. Such an alterable decision will have alternate options corresponding to specific document templates, so altering the decision will cause the empty document to be replaced with a specific document template. Such a decision will be referred to as an "alterable document template decision," and this feature will be referred to as the "alterable document template feature."

In an embodiment, in particular, when a user creates a new spreadsheet document, the interface will make an alterable document template decision that has an alternate option corresponding to a template in which the top row of the spreadsheet is formatted as a header row so that any text that is entered into a cell in the top row of the spreadsheet will be bold and centered. In an embodiment, the manual alteration detection feature is applicable to such an alterable document template decision: if a user creates a new document that is initially empty and without special formatting and does not alter the resulting alterable document template decision, and then the user immediately formats the top row of the spreadsheet so that any text that is entered into a cell in the top row will be bold and centered, then the interface will recognize that the user has performed actions that had the same effect that could have been achieved by altering the alterable document template decision, and may thus generate an efficiency tip as described in Chapter 23.

In an embodiment, as soon as a user modifies a new document so that it is not empty and is not identical to a specific document template, any alterable document template decision pertaining to that document will be deleted. In an alternative embodiment, in certain circumstances an alterable document template decision may continue to exist after a user begins editing the new document; for example, an alterable document template decision pertaining to a word processing document may continue to exist after a user begins entering text into the main body of the document, provided the user does not edit the document's layout or enter text in some other field of the document; altering the alterable document template decision will then cause text that was entered into the main body of the document to be preserved and copied into the main body of the document template that becomes selected.

In an embodiment, when an alterable document template decision is a highlighted alterable decision, a block descriptor will appear, so for example, in an embodiment, when a user creates a new document, a block descriptor will appear that says "Blank document," and repeatedly pressing the alteration key will cause the interface to cycle among various other document templates, which will cause the block descriptor to change so that it always says the name of the document template that is currently selected.

In prior art, a user who wishes to create a document based on a template must invoke a special document creation command in order to do so; in some cases, an inexperienced user may not be aware that such a command exists, and even an experienced user may not necessarily remember how to invoke such a command. An embodiment of the present invention that has the alterable document template feature may have the advantage that if a user who is familiar with the alteration functionality described herein creates an empty document that is not based on a template, the user may realize based on the presence of an alteration indicator that it is possible to quickly access document templates by means of alteration functionality, and yet if the user simply wishes to begin working from an empty document, the user will not need to perform any additional action in order to do so.

Chapter 36: Alterable Cell Formatting

Cell Formatting Terminology

The following discussion of cell formatting will refer to a set of individually formattable cells that are arranged in rows and columns as a "spreadsheet." Those of ordinary skill in the art will understand that certain behaviors that are described below may be applied to an individual worksheet within a spreadsheet document, and may also be applied to a table within a word processing document if the cells within the table are individually formattable, and may be applied to any other structure that is composed of individually formattable cells that are arranged in rows and columns.

Generally, a cell format may be composed of multiple distinct format elements that may vary independently, including foreground color, background color, underlined or non-underlined status, number format, and so forth. In the present specification, a "format attribute" is a component of a format that may vary, such as foreground color, and a "format value" is one specific possibility for a format attribute, such as blue foreground color.

In prior art spreadsheet software, not only does each spreadsheet cell have a specific cell format, but also each worksheet has a specific format, and each row or column may have a specific format; such zone formats may be applied to formats of individual spreadsheet cells in certain circumstances. In particular, in Microsoft Excel, if a user selects a certain first cell and performs the Cut action and then selects a second cell and performs the Paste action, then the contents and format of the first cell will be moved into the second cell, and the first cell will then be emptied of its contents and its former format; that first cell will then take on the format of its row if its row has a specific format, or the format of its column if its column has a specific format but its row does not, or the format of its worksheet if neither its row nor its column have a specific format.

In the present specification, a "string format attribute" is a format attribute such that selecting a different format value for that format attribute in a cell (without changing the value stored in that cell) may cause the characters that are displayed in that cell to be replaced by different characters. For example, date format is a string format attribute, because the same value may be displayed as the characters "7-Mar" or as the characters "3/7" depending on what date format is selected.

In an embodiment, for purposes of the present chapter, a cell "expresses" a format attribute when and only when it is possible for a user to discern by looking at the cell what format value is selected for that format attribute in that cell. For example, a cell that contains no value expresses its background color but does not express its foreground color. A cell that contains the word "Date" but does not actually contain a date does not express its date format. In an embodiment, a vertical alignment format attribute determines which line to display when a cell contains multiple lines of text but does not have sufficient height to simultaneously display multiple lines of text; in such an embodiment, a cell that does not contain multiple lines of text does not express its vertical alignment.

In an embodiment, for purposes of the behaviors described below, a cell "debuts" a format attribute the first time that the cell expresses the format attribute and is visible. A row, column, or spreadsheet is said to debut a format attribute the first time that any cell within the row, column, or spreadsheet debuts the format attribute. For example, when a new row of empty cells is inserted, that row debuts its background color immediately, unless for some reason the new row is not visible at all.

Format Zones

In an embodiment, a spreadsheet may have one or more rectangular "format zones," where each format zone consists of a region within the spreadsheet along with one or more format values for format attributes that are by default applied to cells within that region. For example, a format zone may consist of the top row of the spreadsheet and a horizontally centered format value for the horizontal alignment format attribute, in which case the text in each cell of the top row of the spreadsheet will by default be horizontally centered within the cell. A format zone need not necessarily have a format value for every format attribute; for example, a format zone may have a horizontally centered format value for the horizontal alignment format attribute and a non-bold format value for the bold status format attribute, yet not have any particular value for the background color format attribute.

Below, instead of always referring to a "row or column" of a spreadsheet, the present specification will generally discuss interface behaviors that pertain to format zones in terms of rows, but it is to be understood that columns are equally in view. For example, the present specification may refer to the "row number" of an unspecified boundary of a format zone, but in an embodiment, the particular boundary may happen to be the left boundary or the right boundary of a format zone, in which case its so-called "row number" is actually a column number. Also, instead of always explaining an interface behavior in terms of how it may affect rows of a spreadsheet and then explaining the interface behavior in terms of how it may affect columns, the present specification will generally explain interface behaviors in terms of how they affect rows; it is to be understood that in an embodiment, corresponding interface behaviors will affect columns in a way that is exactly analagous. For example, when the present specification explains how inserting a row may affect top or bottom boundaries of format zones, it is to be understood that in an embodiment, inserting a column may affect left or right boundaries of format zones in a way that is exactly analogous.

In an embodiment, a format zone may have a precedence relative to other format zones, so that if a cell is within multiple format zones that have different format values for the same format attribute, then the format value applied to that cell is the one from the format zone that has the highest precedence. For example, in an embodiment, if a cell is within a bold format zone that has a precedence score of 1 and is also within a non-bold format zone that has a precedence score of 7, then the non-bold format is applied to that cell.

Below, when giving examples of the extent of format zones, the present specification will assume that rows and columns of a spreadsheet are numbered with positive integers, and will generally specify the row numbers and column numbers of boundaries of a format zone in terms of decimal values that are halfway between consecutive integers, so as to make it clear which rows and columns are included within the format zone and which are not. For example, a format zone may be said to have a top boundary of 1.5 and a bottom boundary of 3.5, which would mean that the zone includes only cells that are within rows 2 and 3, since 2 and 3 are the only positive integers that fall between 1.5 and 3.5. Those of ordinary skill in the art will understand that row numbers of boundaries can instead be represented in computer memory in terms of integer values, which may be preferable for implementation reasons; for example, a bottom boundary that is referred to herein as a bottom boundary of 3.5 may instead be represented in computer memory by the integer value 4, in which case the row 4 is not considered to fall within a zone that has a bottom boundary that is represented by the value 4, but may fall within a zone that has a top boundary that is represented by the value 4. Additionally, as special cases, when the present specification says that a top boundary or left boundary is 0, or says that a bottom boundary or right boundary is infinity, this means that the zone essentially has no boundary in that direction, in an embodiment.

Flexible Format Zone Boundaries

In an embodiment, each particular boundary of a format zone may or may not be "flexible." When a boundary is not flexible, it may be spoken of as having a "definite row number." When a boundary is flexible, it has two distinct row numbers: a "default row number" and an "alternate row number." The alternate row number has a "probability of alteration." A boundary does not itself constitute an alterable decision, but in certain circumstances the presence of a format zone that has a flexible boundary will cause the interface to make an alterable decision pertaining to that boundary, which is why an alternate row number may be said to have a probability of alteration. When a boundary is flexible, its default row number and alternate row number are "possible row numbers," along with every row number in between those numbers, and its "ambiguous range" is the set of integer row numbers between its smallest possible row number and its largest possible row number. For example, if a boundary has a default row number of 3.5 and an alternate row number of 5.5, then its possible row numbers are 3.5, 4.5, and 5.5, and its ambiguous range is row number 4 and row number 5.

Essentially, in an embodiment, when a format zone has a boundary that is flexible, this means that the interface is uncertain how far the user wants the format zone to extend. For example, if a bold format zone has a bottom boundary with a default row number of 3.5 and an alternate row number of 4.5 with a high probability of alteration, this means that the interface has decided not to apply the bold format to row 4 but believes it is reasonably likely the user will wish to alter this decision at some point.

In the present specification, a boundary of a format zone may be spoken of as though it were entirely synonymous with its row number. For example, rather than saying that a format zone has a bottom boundary with a default row number of 3.5 and an alternate row number of 4.5, the present specification may equivalently say that the format zone has a default bottom boundary of 3.5 and an alternate bottom boundary of 4.5.

In an embodiment, for purposes of the interface behaviors described below, when a format zone has a boundary that is flexible, the "ambiguous region" of the format zone is the set of spreadsheet cells that may either be included within the format zone or excluded from the format zone, depending on which possible row numbers and possible column numbers are used to delineate the extent of the format zone. The "default region" is the set of spreadsheet cells that are included within the format zone if no alternate row numbers or alternate column numbers are used. For example, if a format zone has a definite left boundary of 0.5, a definite right boundary of 1.5, a definite top boundary of 2.5, and a flexible bottom boundary with a default row number of 4.5 and an alternate row number of 3.5, then the ambiguous region of that format zone consists of the cell in row 4 and column 1; the default region of that format zone consists of both the cell in row 4 and column 1 and the cell in row 3 and column 1.

Applying Formats to Cells

In an embodiment, if a user selects a rectangular region that includes one or more cells and then explicitly applies one or more particular format values to that region, rather than merely applying that value or values to every cell within the region, the interface will create a format zone that consists of that region and those format values. In an embodiment, whenever multiple consecutive user actions cause the interface to apply one or more particular format values to the same rectangular region, for each such action after the first, the interface will not create a new format zone, but will instead add those new format values to the format zone it created in response to the first such action, and will delete any format value that was previously present in that format zone that is now contradicted by these new format values. Thus, a sequence of one or more consecutive user actions that causes the interface to apply one or more particular format values to the same rectangular region constitutes a single "format zone creation action." For example, in an embodiment if a user clicks a single cell, then clicks a toolbar button that causes the background color of that cell to become light green and the foreground color to become dark green, and then clicks a toolbar button that causes the foreground color of that cell to become black, then the outcome of these actions will be that a format zone exists that consists of that single cell with a background color of light green and a foreground color of black.

In an embodiment, after a format zone creation action, before the interface responds to the next user action, the interface will analyze the new format zone and may make its boundaries flexible, as follows: for each of the four boundaries of the new format zone, the interface will determine whether the zone could be extended farther in that direction without actually causing any additional cells to express any format value of the format zone, and if so, then the interface will make that boundary's alternate row number be as far as possible in that direction subject to that constraint. In an embodiment, if the interface thus makes a new format zone boundary flexible, then the probability of alteration of its alternate row number will be moderate if the alternate row number is infinity, or very low otherwise. For example, if a spreadsheet contains values in every cell that is within rows 1-10 and within columns 1-3 but does not contain values in any other cells, and a user selects columns 1-3 in row 1 and makes these cells bold, then the new bold format zone will have a definite bottom boundary of 1.5 because extending that boundary any farther down would cause a cell in a row 2 to express the bold attribute. It will have a default right boundary of 3.5 with an alternate right boundary of infinity and a moderate probability of alteration, to reflect the fact that the user may actually prefer for everything in row 1 to be bold, and may have explicitly applied the bold format to only columns 1-3 simply because those were the only columns that contained anything yet. The new bold format zone will also have default top and left boundaries of 0.5, and alternate top and left boundaries of 0 with very low probabilities of alteration.

Row and Column Insertion

In prior art spreadsheet software, when a column is inserted into a worksheet, it will take on all the formatting of the column to its left: that is, the format for the new column will be the format of the column to its left, and format of each individual cell within the new column will be the format of the individual cell immediately to its left. As an exception, when a column is inserted as the new far left column of a worksheet, it cannot take on the formatting of the column to its left because there is no such column, and will instead take on the formatting of the column to its right. Similarly, when a row is inserted into a worksheet, it will take on all the formatting of the row above it, unless it is the top row, in which case it will take on all the formatting of the row below it. In Microsoft Excel, however, immediately after a row is inserted into a worksheet, a small button will appear such that if a user clicks the button before modifying the spreadsheet, then Microsoft Excel will open a small menu with three radio buttons labeled with three options: "Format Same as Above," "Format Same as Below," and "Clear Formatting." The first radio button will be initially selected, corresponding to the fact that the row that was just inserted took on all the formatting of the row above it (if possible). Selecting the second option will cause the row that was just inserted to take on all the formatting of the row below it; selecting the third option will cause the formatting of the entire row that was just inserted and of every cell within it to revert to default formatting. After a row is inserted into a spreadsheet and such a button appears, as soon as the user modifies the spreadsheet other than by clicking the button and selecting a menu option, the button will disappear. In Microsoft Excel, immediately after a column is inserted into a worksheet, no such button appears.

In an embodiment of the present invention, the interface treats column insertion in a spreadsheet in a way that is exactly analogous to the way it treats row insertion, which is explained in the following paragraphs.

For purposes of the following discussion of row insertion, when one or more new rows of a spreadsheet are inserted above a particular previously existing row, the new rows will be spoken of as being inserted at an "insertion row" that has a row number that is 0.5 less than the number of the row that they are inserted above. For example, if a single new row is inserted above row 1 of a spreadsheet, the new row will be spoken of as being inserted at insertion row 0.5, or as having an insertion row number of 0.5. In an embodiment, when new rows are inserted, row numbering will be updated, so if for example a new row is "inserted at row 0.5," the newly inserted row will become the new row 1, and the previous row 1 will become row 2, and so forth.

In an embodiment, when one or more new rows of a spreadsheet are inserted above a previously existing row, row numbers for boundaries of format zones will be updated as follows: Each top boundary row number or bottom boundary row number that is greater than the insertion row number will be increased by the number of rows inserted. If any flexible top boundary or flexible bottom boundary has either a default row number or an alternate row number that is exactly equal to the insertion row number, then that row number will be increased by the number of rows inserted if and only if such an increase will cause the boundary's ambiguous range to include the inserted rows. For example, if a format zone has a default bottom boundary of 3.5 when a user inserts one row at the insertion row number of 3.5, then that default bottom boundary will be increased by 1 if the alternate bottom boundary is 0.5, but not if the alternate bottom boundary is 5.5, so in either case after the insertion the bottom boundary's ambiguous range will include the newly inserted row 4.

In an embodiment, as a special case, when one or more new rows of a spreadsheet are inserted above a previously existing row, if any top boundary or bottom boundary has a definite row number that is exactly equal to the insertion row number, then that boundary will become flexible: either its default row number will equal its former definite row number and its alternate row number will equal that number increased by the number of rows inserted, or vice versa. All the row numbers of the inserted rows will thus be included in the ambiguous range of the newly flexible boundary. Essentially, this means that when a user inserts rows immediately above or immediately below a format zone, the interface's decision whether or not to extend the format zone to include the new rows is a decision that may become alterable.

In an embodiment, when row insertion causes a top or bottom boundary to become flexible as described in the preceding paragraph, its default row number will become greater than its alternate row number. As a result, if a row is inserted that is immediately below one format zone and immediately above another format zone, then by default the cells of the inserted row will be formatted the same way as the cells of the row above. In an embodiment, as an exception, when row insertion causes a bottom boundary to become flexible as described in the preceding paragraph, if the default region of the format zone previously included only one row, then the alternate row number of the bottom boundary of the format zone will become greater than its default row number, so that the default region will still include only one row.

Alterable Cell Format Expression

In an embodiment, when a user action causes one or more cells to debut one or more format attributes, the interface will then determine whether or not at least one of these cells is within the ambiguous region of a format zone that pertains to a debuted attribute. If so, then the interface will make an "alterable format expression decision." The default option of the alterable format expression decision will consist of the result that obtains by ignoring alternate row numbers of flexible boundaries of format zones. The alterable format expression decision will have one alternate option for each distinct possible configuration of format values that could be achieved for those format attributes of those cells by means of replacing one or more default row numbers of flexible boundaries of format zones with alternate row numbers.

In an embodiment, when a user explicitly selects an option of an alterable format expression decision, the decision will cease to be alterable. In an embodiment, when an alterable format expression decision ceases to be alterable, either because a user explicitly selected an option of the decision or for some other reason, the interface will then regard the format values that had previously been alterable as fixed, and will then update the relevant format zone boundaries so that the relevant cell or cells are no longer included in the ambiguous region of any relevant format zone.

For example, suppose that in such an embodiment, all the cells of a spreadsheet have a white background except that there is a format zone that consists of a single row with a green background. A user inserts a new row immediately below that row. The bottom boundary of the format zone becomes flexible so its ambiguous region includes the new row. The cells of the new row immediately debut the background color format attribute. The interface makes an alterable format expression decision such that the default option is that these new cells have a white background color and the alternate option is that they have a green background color. The user alters the decision, so the cells now have a green background color. The user performs some unrelated action; the user has now explicitly selected an option of the alterable format expression decision. The green background color is now a fixed format value. The interface updates the format zone so that its bottom boundary is no longer flexible, and now definitely includes the new row.

As another example, suppose that in such an embodiment, a format zone consists of several rows with a bold font. A user inserts a new row immediately below these rows. The default bottom boundary of the format zone is such that the format zone will include the new row, but the alternate bottom boundary of the format zone is such that the format zone will not include the new row. The cells of the new row are empty and do not yet debut the bold status format attribute. The user then types input in one of the cells and presses Enter. That cell now debuts the bold status format attribute, so the interface will determine every distinct possible configuration of format values that could be achieved for the bold status format attribute of that cell by means of adjusting format zone boundaries: namely, it could have the bold format value or not have the bold format value. The interface thus makes an alterable format expression decision; by default, it causes that cell to have the bold format value. The user alters the decision so the cell does not have the bold format value. Once the user has explicitly selected that option, the interface will update the format zone's bottom boundary, so other cells in the new row will not have the bold format value either.

Figure 24:
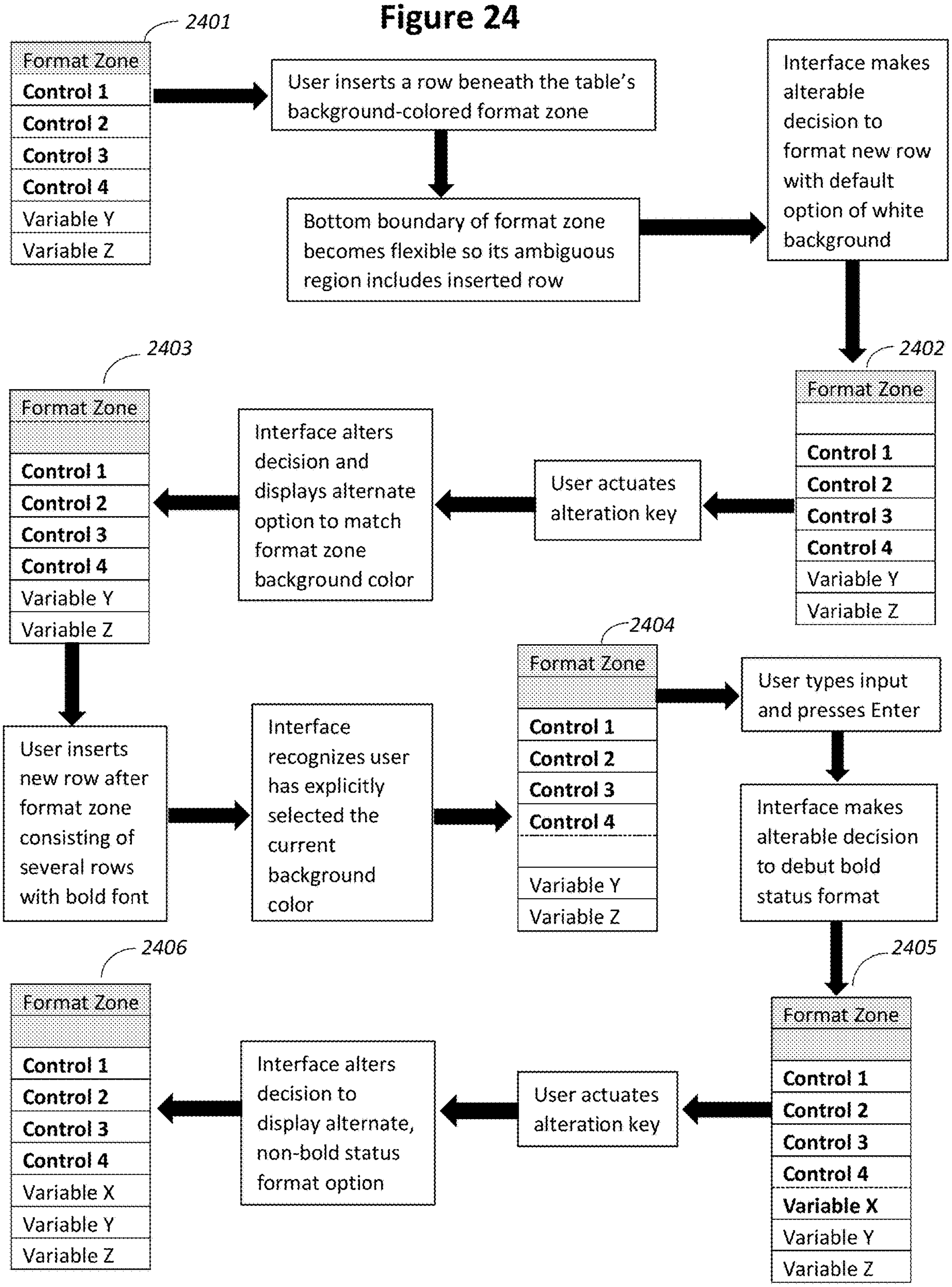
FIG. 24 illustrates alterable format expression decisions in action, according to an embodiment.

FIG. 24 illustrates alterable format expression decisions in action. Block 2401 shows a table featuring an initial format zone consisting of a single row with a nonwhite background color. When the user inserts a row directly beneath Format Zone 1, its bottom boundary becomes flexible so its ambiguous region includes the newly inserted row, and that row's background color is immediately the subject of an alterable format expression decision. Block 2403 shows the same table after the user actuates the alteration key, causing the interface to alter the background format from white to the alternate color option; the bottom boundary remains flexible until Block 2404, when the user performs an unrelated action and the interface recognizes they have explicitly selected the current option of the alterable format expression decision. Block 2404 shows the same table after the user has inserted a row beneath Format Zone 2, which consists of several rows of bold text. At this point, Format Zone 2's bottom boundary becomes flexible so its ambiguous region includes the new row directly beneath, but the interface has not yet made an alterable decision regarding that row since that row has not debuted the bold status attribute. After the user adds input, that cell debuts the bold status attribute as shown in Block 2405, and the interface makes a decision to select the bold formatting option, but Format Zone 2's bottom boundary line remains flexible and that decision is now alterable. When the user actuates the alteration key, it prompts the interface to alter the format expression decision and select the non-bold option, as shown in Block 2406.

Special Cell Formatting

In prior art spreadsheet software, if a user wishes to change the appearance of a border between cells or groups of cells, the user may do so by means of selecting cells that are adjacent to the border and then accessing functionality for editing the borders of selected cells. Accordingly, in an embodiment of the present invention, cell borders are implemented in terms of attributes of cells, and format zones are then applicable to cell borders in essentially the same way that they are applicable to other attributes of cells. For example, in an embodiment, if a user selects the top row of a spreadsheet and then chooses to create a heavy borderline below the selected cells, then the interface will accordingly create a format zone that initially contains only the top row, formatted in such a way that a heavy borderline is always below the bottommost row of the format zone, so if additional rows are later inserted in that format zone, then that heavy borderline will move accordingly.

Number Formatting

In prior art spreadsheet applications, a spreadsheet cell may contain a number rather than containing text; when it does, the cell's "number format" determines the specific sequence of characters that is displayed as the value of the cell. For example, in the prior art Microsoft Excel spreadsheet application, if a spreadsheet cell contains the number −2, then a user may change the cell's number format so that the value of −2 that is stored in the cell is displayed as "−2," or "−2.0," or "($2.00)," or various other possibilities.

In Microsoft Excel, when a spreadsheet cell contains a number, the cell's number format may indicate that the value of the cell is to be displayed as a date, a time of day, or a date-and-time combination. When it does, Excel will interpret the number stored in the spreadsheet cell as a decimal number of 24-hour days that elapsed after midnight on the fictional date of 1/0/1900, and will then display the resulting date and time, or just the date, or just the time of day. For example, if a cell contains the number 42737.4 and then a user changes the cell's number format so that the value is displayed as a date-and-time combination, then Microsoft Excel will display the value of the cell as "1/2/17 9:36 AM" (or as an equivalent date-and-time combination with a slightly different format), because 1/2/2017 is 42737 days later than the beginning of 1900 and 9:36 AM is 0.4 days later than midnight. If the user then changes the cell's number format so that the same value is displayed as only a date or as only a time, then Excel will accordingly display only the date "1/2/17" or only the time "9:36 AM," but the cell will still contain the same underlying numeric value of 42737.4.

Conversely, in Microsoft Excel, if a user inputs a specified date into a cell without specifying a time, then Excel will store this in terms of the number of days between 1/0/1900 and the specified date. For example, if a user inputs the date "1/5/1900" into a cell whose number format indicates that the value of the cell is to be displayed as a numeral and not as a date, then the resulting value will be displayed as "5.00" (or an equivalent numeral). If a user inputs a specified time into a cell without specifying a date, then Excel will store the specified time divided by 24 hours. For example, if a user inputs the time "36:00" into a cell whose number format indicates that the value of the cell is to be displayed as a numeral and not as a time, then the resulting value will be displayed as "1.50"; if that value is displayed as a date-and-time combination, it will be displayed as "1/1/1900 12:00 PM"; if it is displayed as a time, it will be displayed as "12:00 PM" or as "12:00," not as "36:00."

In prior art spreadsheet software, when a user inputs into a spreadsheet cell a sequence of characters that is interpreted as a number, in certain circumstances the cell's number format will determine how the spreadsheet interface interprets that sequence of characters and what value it thus stores in that cell. For example, in Microsoft Excel, if a user types "1/2" in a cell whose number format is "General," Excel will interpret this as a date within the current year, store this in terms of the number of days that elapsed from the beginning of 1900 until that date, and display the resulting value as "2-Jan"; if a user types "1/2" in a cell whose number format is a number format from the category "Currency," Excel may interpret this as a fractional number of dollars, store this as 0.5, and display the resulting value as "0.50"; if a user types "1/2" in a cell whose number format is "Text," Excel will store this as text instead of as a number and display it as "1/2."

In Microsoft Excel, the initial number format for every cell in a new document is "General." In the dialog box for setting a number format, Microsoft Excel says that "General format cells have no specific number format." It would be more accurate to say that when a cell's number format is the default number format "General," in response to the entry of a value in that cell Excel may automatically change the cell's number format to a number format that is suitable for the type of value that was entered, so that the value is displayed appropriately. For example, if a user types "23%" in a cell whose number format was "General," then in addition to storing the value 0.23 in the cell, Excel will automatically change the cell's number format to "Percentage" so that the value is displayed as "23%." After that, if the user then types "2" in the cell, the value 2 will be displayed as "200%" because the cell's number format has become "Percentage."

In Microsoft Excel, when a cell's number format is "General," in response to the entry in that cell of a time, or date, or month and day of the month, Excel will store the entry as a number that can be interpreted as a date-and-time combination, but Excel will change the cell's number format to a format such that only the information that the user explicitly specified will be displayed. For example, if a cell's number format is "General," and a user who wishes to calculate the value of 12 minus 4 mistakenly types "12-4" in the cell, then Excel will interpret this input as a month and day of the month. Excel will assume that the user intends to refer to December 4 in the current year and will store the entry as a number that can be interpreted as midnight on December 4 in the current year, but Excel will change the cell's number format to a date format such that the year and the time of day, which the user did not explicitly specify, will not be displayed: Excel will display the cell's value as "4-Dec." After that, if the user then types "=12−4" in the cell, then Excel will calculate that the resulting value is 8, but it will display this value as the date "8-Jan" rather than displaying it as the number "8" because the cell's number format has become a date format that displays only the month and day of the month.

Alterable Number Formatting

In an embodiment, certain format attributes are "number format attributes," where a number format attribute is a string format attribute that may affect the characters that are displayed in a cell whenever the value contained in the cell is a numeric value (such as an integer or a date). A cell's "number format" is the set of all format values of its number format attributes. In an embodiment, a cell's number format may affect the way input is interpreted for the cell; for example, when a user inputs "1/2" as the value for a cell, the interface may interpret this input as a fraction or as a day of the year, depending on the cell's number format.

In an embodiment, when a user inputs into a value into a cell or when a spreadsheet application calculates the value for a cell, if the cell's number format will affect the characters that are displayed as the resulting value of the cell, then in certain circumstances the interface may make an alterable decision whether or not to change the cell's number format, as is described below. Such an alterable decision is an "alterable number format decision."

In an embodiment, when a user types a sequence of characters in a cell and presses Enter, if the cell's current number format is such that the interface will interpret that sequence of characters as a numeric value and will then display that value in terms of a sequence of characters that is not identical to the sequence of characters the user typed, then the interface's decision not to change the cell's number format to some other number format is an alterable number format decision. Such an alterable number format decision will have at least one alternate option such that selecting that option will cause the interface to change the cell's number format to some other number format and also to reinterpret the sequence of characters the user typed as though that other number format had already been selected before the user pressed Enter, and will thus change the cell's number format in such a way as to cause the value stored in the cell to be displayed in terms of a sequence of characters that is identical to the sequence of characters the user typed. For example, in an embodiment, if a user types "1/2" in a cell and presses Enter, and the interface interprets this as a date and stores a numeric value accordingly, and due to the cell's number format's rules for displaying dates the interface displays this value as "1/2/2017," then an alterable number format decision will exist that has an alternate option such that selecting the alternate option will change the cell's number format so as to cause the interface to display the value as "1/2" instead, such as by changing the cell's number format to a number format that displays the month and day but not the year.

In an embodiment, when a user types a sequence of characters in a cell and presses Enter, if some number format exists other than the cell's current number format such that if that other number format had been the cell's current number format then the interface would have stored a different value as the contents of the cell, then the interface's decision not to change the cell's number format before interpreting the sequence of characters the user typed is an alterable number format decision. Such an alterable number format decision will have at least one alternate option corresponding to each possible value that could have been stored as the contents of the cell other than the value that actually was stored as the contents of the cell, so that selecting such an alternate option will cause the interface to change the cell's number format to some other format and also to reinterpret the sequence of characters the user typed as though that other number format had already been selected before the user pressed Enter, and will thus change the cell's number format in such a way as to cause the value stored in the cell to become that other particular possible value. For example, in an embodiment, if a user types "1/2" in a cell and presses Enter, and the interface interprets this as a date and stores this date in terms of the number of days that elapsed between the beginning of 1900 and this date, then an alterable number format decision will exist that has an alternate option such that selecting the alternate option will cause the interface to interpret "1/2" as a fraction and store the appropriate numeric value, and has another alternate option such that selecting the alternate option will cause the interface to store "1/2" as text rather than a numeric value.

As can be seen from the examples provided in the two preceding paragraphs, in an embodiment, in certain circumstances both of the two preceding paragraphs may simultaneously apply: when a user types a sequence of characters in a cell and presses Enter, the interface may cause an alterable number format decision to exist that includes certain alternate options due to circumstances that are described in the immediately preceding paragraph, and that also includes another alternate option due to circumstances that are described in the paragraph before that.

Smart Year Assumptions

In prior art spreadsheet applications, if a user inputs a month and day of the month into a cell without specifying a year, then the application will interpret this as the month and day of a date within the current year. For example, if an empty cell's number format is the Date format m/d/yyyy when a user inputs "1/2" into the cell, then if the current year is 2017, the application will store in the cell the number of days between 1/01900 and 1/2/2017, and will display that value as "1/2/2017."

In an embodiment, for purposes of the following discussion of smart year assumptions, a "day of the year" is a specific month along with a specific day within the month, but not including a specific year; for example, January 3 is a day of the year. A "date" includes both a day of the year and a specific year; for example, Jan. 3, 2017 is a date. A day of the year and a date "match" one another if and only if the date includes that day of the year; for example, January 3 matches Jan. 3, 2017. A day of the year "combined with" a specific year constitutes the date that matches that day of the year and falls within that year; for example, January 3 combined with 2017 constitutes Jan. 3, 2017.

In an embodiment, when a user types a sequence of characters in a cell that the interface interprets as a day of the year, if the user does not explicitly specify the year, and if the cell's format is such as to store a date instead of just a day of the year, then the interface will "make a year assumption" for that day of the year. When the interface makes a year assumption for a day of the year, it selects a particular year to be combined with that day of the year so as to create a complete date. In an embodiment, when the interface makes a year assumption, the year assumption may be an alterable decision, as is described below.

In an embodiment, when the interface makes an alterable year assumption, if the number format of the cell is such that information regarding the outcome of the interface's assumption is stored immediately but would not be displayed immediately, then the alterable year assumption is treated as a subtle change as defined in Chapter 8 (which may cause the outcome to be displayed immediately after all, within a change flag).

Below, a year assumption may be said to "include as an option" a specified date with "at least" a specified probability of alteration, in certain circumstances. This means that except in the special cases that are described in the present paragraph, the year assumption is an alterable year assumption such that one of its alternate options is that specified date and that option's probability of alteration is the specified probability of alteration. In an embodiment, as a special case, if more than one option of a year assumption would turn out to be the same specified date, then all the duplicates will be deleted, leaving only a single option that is that date, which will have the highest probability of alteration that any of those options would have had. As another special case, if an alternate option of the year assumption would turn out to be the same date as the default option, then that alternate option will be deleted. As another special case, if the year assumption does not have any alternate options (because they all turn out to be the same as the default option), it will not be an alterable year assumption after all. For example, hypothetically, if a year assumption has as its default option 1/3/2017, and the year assumption includes as an option January 3 of the current year with at least a high probability of alteration, and the year assumption also includes as an option the nearest future occurrence of January 3 with at least a medium probability of alteration, then if the current date happens to be 1/2/2017 all these options will turn out to be the same, so the year assumption will not be alterable after all: the outcome will simply be 1/3/2017.

In the following paragraphs, the "current date" is the date on which the interface makes a year assumption, and the "current year" is the year of that date. In the following paragraphs, when the interface is said to select a particular date as the outcome of a year assumption for a particular day of the year, that selected date is always a date that is certain to match that particular day of the year. Thus, although the following paragraphs explain how year assumptions are made in terms of explaining a process by which the interface may select a particular date, each possible date will always include the same day of the year, so essentially the following paragraphs are just explaining a process by which the interface may select a particular year.

Below, various methods are described by which the interface will make your assumptions, in various embodiments. First, three alternative "non-context-sensitive methods" are described, and then a "context-sensitive method" is described. When a non-context-sensitive method makes a year assumption for a day of the year, it will take into account the current date, but will not take into account any dates in adjacent cells; when a context-sensitive method makes a year assumption, it may take into account dates in immediately adjacent cells. The context method that is described below is thus the most sophisticated method; however, even the simplest of the three non-context-sensitive methods described below is more sophisticated than prior art.

In an embodiment, when the interface makes a year assumption for a day of the year, it will use the context-sensitive method, which will in certain circumstances default to using a non-context-sensitive method. In various alternative embodiments, the interface will simply use some particular non-context-sensitive method in every case, and will thus never take into account dates in adjacent cells when making year assumptions.

In an embodiment, when the interface uses a non-context-sensitive method for making a year assumption, it will use the "adjustable proximity method," as follows: The interface will keep track of a "recency threshold" which may range from 0 to 365 inclusive. In an embodiment, the initial value of this recency threshold is 182 (which is approximately half of 365). When the interface makes a year assumption for a day of the year, if that day of the year matches the current date, then the interface will select the current date and this will not be an alterable decision. Otherwise, the interface will determine how many days ago any such day of the year occurred; this is the date's recency score. The interface will then make a threshold decision whether to select the nearest past date that matches that day of the year or whether to select the nearest future date that matches that day of the year. The recency threshold will serve as the threshold of this decision, and the recency score will serve as the decision score, as follows: if the recency score is less or equal to than the recency threshold then the interface will select the nearest past date that matches that day of the year, and if it is greater than the recency threshold then the interface will select the nearest future date that matches that day of the year. In an embodiment, such alterable year assumptions are adaptive threshold decisions. For example, in an embodiment, if on 1/3/2017 a user types "12/31" into a spreadsheet cell and the interface interprets this as the month and day of a date, and if the recency threshold is currently 182, then because 12/31/2016 was only three days ago, the interface will alterably decide to yield the result 12/31/2016, and because the recency score of 3 is much less than the recency threshold of 182, this decision will have a low probability of alteration. If the user alters this decision so that the interface yields the result 12/31/2017, then the recency threshold will be reduced to 2, so the next time the interface makes an alterable year assumption, if the current date is still 1/3/2017, then the interface will definitely select a date in 2017.

In an alternative embodiment, when the interface uses a non-context-sensitive method for making a year assumption, it will use the "simple proximity method," as follows: When the interface makes a year assumption for a day of the year, if that day of the year matches the current date, then the interface will select the current date and this will not be an alterable decision. Otherwise, the interface will select the nearest date that matches that day of the year, and this decision will be an alterable decision that has a probability of alteration that is proportional to how distant that date is from the current date: if that date is very close to the current date then the alterable year assumption will have a very low probability of alteration, but if that date is about six months away (and so there is a different date that matches the same day of the year and is nearly as close to the current date) then the alterable year assumption will have a very high probability of alteration. In other words, the simple proximity method will always yield the same result that the adjustable proximity method described in the preceding paragraph would yield if its recency threshold equaled its initial value of 182.

In another alternative embodiment, when the interface uses a non-context-sensitive method for making a year assumption, it will use the "current-year method," as follows: When the interface makes a year assumption for a day of the year, the interface will in every case initially select the "current-year date," which is the date of that day within the current year. If that day of the year matches the current date, then this will not be an alterable decision. Otherwise, the decision to select the current-year date will be an alterable decision such that altering the decision will cause the interface to instead select the "nearest other date," which is either the occurrence of that day of the year within the previous year or the occurrence of that day of the year within the next year, whichever is closer to the current date. If the current-year date is more than 182 days away from the current date (and so the nearest other date is actually closer to the current date) then the alterable year assumption will have a very high probability of alteration; otherwise, the alterable year assumption will have a probability of alteration that is proportional to how distant the current-year date is from the current date. In other words, whenever the simple proximity method described in the preceding paragraph would yield a date that is in the current year, the current-year method will yield the same result (with the same probability of alteration); whenever the simple proximity method would not yield a date that is in the current year, the current-year method will yield a date that is in the current year but its decision to do so will be an alterable decision with a very high probability of alteration.

In an embodiment, when the interface uses a context-sensitive method for making a year assumption, it will do so as follows: When the interface makes a year assumption for a day of the year for a particular spreadsheet cell, it will first determine the year assumption that the interface would make if it used a non-context-sensitive method for making year assumptions. If the particular spreadsheet cell is neither immediately below a cell that contains a date nor immediately to the right of a cell that contains a date, then that year assumption will be the result, with no modification. However, if that cell is immediately below a cell that contains a date, the interface will modify the year assumption so as to include as an option the earliest date matching that day of the year that occurs on or after the date in the cell above, with at least a high probability of alteration; and if that cell is immediately to the right of a cell that contains a date, the interface will modify the year assumption so as to include as an option the earliest date matching that day of the year that occurs on or after the date in the cell to its left, with at least a high probability of alteration. For example, if on 1/3/2017 a user types "1/3" into a spreadsheet cell that is immediately below a spreadsheet cell containing the date 12/30/2014, then although the interface will yield the date 1/3/2017, its decision to do so will be an alterable year assumption that has 1/3/2015 as an alternate option with a high probability of alteration.

Chapter 37: Smart Navigation

Multi-Monitor Smart Navigation

Certain prior art computing devices can be connected to multiple monitors. The monitors can be configured to either duplicate the same visual output or to display distinct independent portions of the visual output of the computer. When multiple monitors display distinct independent portions of the visual output of a computer, a user can configure the computer to handle mouse cursor movement in accordance with the physical locations of the various monitors, so that if for example a user attempts to move the mouse cursor past the right edge of a monitor, if there is another monitor to the right of that monitor, then the mouse cursor will indeed move off that monitor and onto the left edge of the monitor that is to its right.

Various "smart navigation features" are described in the present chapter. In an embodiment, for purposes of these features, any reference to "multiple display devices" refers only to multiple display devices that are configured to display distinct independent portions of the visual output of the computer; for example, when a computer is connected to two monitors that are configured to display the exact same image at all times, the computer is not connected to multiple display devices for purposes of smart navigation features.

In an embodiment, when the computing device is connected to multiple display devices, in certain circumstances a smart navigation feature will cause the mouse cursor to jump to a different display device, or cause the input cursor to jump to a different display device. Such features are described in detail below.

In an embodiment, when a smart navigation feature causes the mouse cursor to jump to a different display device, the interface will also give the keyboard focus to a window that is visible on that display device if possible, which may cause the input cursor to become visible on that display device. For example, in an embodiment, when a smart navigation feature causes the mouse cursor to jump to a different display device, the input cursor will give the keyboard focus to the particular window that is visible on that display device that had the keyboard focus the most recently. Conversely, in an embodiment, when a smart navigation feature causes the input cursor to jump to a different display device, the interface will also move the mouse cursor to that display device. For example, in an embodiment, when a smart navigation feature causes the input cursor to jump to a different display device, the interface will move the mouse cursor to the location on that display device where it was located most recently; in an alternative embodiment, when a smart navigation feature causes the input cursor to jump to a different display device, the interface will move the mouse cursor to a location that is slightly below the input cursor if possible, or will move the mouse cursor to the same location as the input cursor otherwise.

Mouse Cursor Highlighting

In an embodiment, while a user is moving the mouse faster than a certain minimum threshold speed and the user is detectably not looking at any location within a certain radius of the location of the mouse cursor, the interface will change the appearance of the mouse cursor so that it is more ostentatious. In an embodiment, the minimum threshold speed is quite slow and the radius is quite small, so this behavior will usually be triggered if a user moves the mouse while detectably not looking at the mouse cursor. In an embodiment, when the user stops moving the mouse faster than the minimum threshold speed or is no longer detectably not looking at any location near the mouse cursor, the interface will revert the mouse cursor to its normal appearance. For example, in an embodiment, while a user is moving the mouse and is detectably not looking at the mouse cursor, the interface will double the height and the width of the mouse cursor and will change the color of the mouse cursor to bright pink. Other means of making the mouse cursor more ostentatious will be evident to those of ordinary skill in the art.

Automatic Mouse Cursor Jumping

In an embodiment, for purposes of the automatic mouse cursor jumping feature and the directed mouse cursor jumping feature, "wiggling the mouse" consists of moving the mouse cursor a certain minimum total distance in such a way that the distance from the mouse cursor's initial location to its current location is less than 20% of the total distance that the mouse was moved, while performing no other actions, within a time interval that is less than two seconds, when for at least two seconds prior to wiggling the mouse the user had not moved the mouse. For example, in an embodiment where such a minimum total distance equals 200 pixels, if a user pauses for two full seconds and then within the next two seconds, while performing no other actions, the user moves the mouse cursor 143 pixels almost directly to the right and then moves the mouse cursor 144 pixels almost directly to the left, so that the mouse cursor ends up 14 pixels away from its original location, then the total distance the mouse cursor was moved is at least 287 pixels and the distance from the mouse cursor's initial location to its current location is 14 pixels (which is much less than 20% of the total distance that the mouse was moved), so the user has "wiggled the mouse" even if the user then immediately moves the mouse much farther away from its initial location. Other, similar ways of detecting when a user is "wiggling the mouse" will be evident to those of ordinary skill in the art.

In an embodiment, if a user moves the mouse cursor in such a way as to constitute wiggling the mouse, and if during the time that the user does so the user is detectably not looking at any location within a certain radius of the location of the mouse cursor, then once the user has thus wiggled the mouse, if the user detectably may be looking at some other location on the display of the computing device, then the interface will move the mouse cursor as close as possible to the focal location. This feature will be referred to herein as the "automatic mouse cursor jumping feature," and is a "smart navigation feature."

The automatic mouse cursor jumping feature may be useful even if the interface's eye detection capability is extremely imprecise. In particular, in an embodiment, if a computing device is connected to a plurality of display devices and the interface is capable of determining which of the display devices the user is looking at but is not capable of determining a precise location that the user is looking at, then when a user is looking at one of the display devices but the mouse cursor is currently visible only on another display device, if the user wiggles the mouse, the interface will move the mouse cursor to the display device that the user is looking at.

Directed Mouse Cursor Jumping

In an embodiment, when the computing device is connected to multiple display devices and the interface is not capable of determining which of the display devices the user is looking at, if a user wiggles the mouse, then the interface will enter "monitor selection mode," which is described in the following paragraphs. An embodiment that has a monitor selection mode as described in the following paragraphs will be said to have the "directed mouse cursor jumping feature," which is a smart navigation feature.

In an embodiment, while the interface is in monitor selection mode, everything that was previously visible on any display device is dimmed in brightness, and cannot be interacted with until the interface exits monitor selection mode.

In an embodiment, when the interface enters monitor selection mode, the mouse cursor will disappear from its previous location, and on each display device that the computing device is connected to, a "shared mouse cursor" will appear that is initially located at approximately the center of the display device. While the interface is in monitor selection mode, all these shared mouse cursors will simultaneously be controlled by the mouse. On each display device, a single button that is labeled "Click here" will appear. Each such button will appear at a different location relative to the initial location of the shared mouse cursor on its display device, so that if all the buttons had been placed on a single display device they would not overlap; for example, in an embodiment, when the interface enters monitor selection mode, if the computing device is connected to three display devices, then on one of the display devices a button will appear such that the shared mouse cursor is initially directly on the button, and on another a button will appear a little ways above where the shared mouse cursor appears, and on the other a button will appear a little ways below where the shared mouse cursor appears. Because these buttons that appear are at non-overlapping locations relative to the initial location of the shared mouse cursors, when one of the shared mouse cursors is positioned on one of these buttons, no other shared mouse cursor will be positioned on a button.

In an embodiment, while the interface is in monitor selection mode, if a user presses the Escape key, then the interface will exit monitor selection mode, and each of the shared mouse cursors will disappear except for the one on the display device that had the mouse cursor when the interface entered monitor selection mode.

In an embodiment, while the interface is in monitor selection mode, if a user clicks one of the buttons that is labeled "Click here," then the interface will exit monitor selection mode, and each of the shared mouse cursors will disappear except the one on the display device that had the button the user clicked.

From a user's perspective, the directed mouse cursor jumping feature may be extremely easy to learn to use: to move the mouse cursor onto the monitor that a user is looking at, the user need only wiggle the mouse and then follow the directions; a user may therefore use this feature successfully without even realizing that wiggling the mouse caused a button to appear on each monitor. For example, consider the following scenario: A user has a computer with an interface that has the directed mouse cursor jumping feature. The computer is connected to four monitors. The user takes a phone call, then looks at the monitor that is currently displaying a document that he now intends to edit. No mouse cursor is visible on the monitor the user is looking at, and the user does not stop to remember which monitor he was primarily using before the phone call. Instead, the user wiggles the mouse. On the monitor the user is looking at, the document the user was looking at is dimmed in brightness. A mouse cursor appears, and a button appears that says, "Click here." The button is above and to the left of the mouse cursor. The user does not notice that other buttons are visible on other monitors; the user simply follows directions: he moves the mouse cursor up and to the left and clicks the button. The button disappears, the document returns to normal brightness, and the window for editing the document gains the keyboard focus, so the user can now edit the document normally.

Figure 25A:
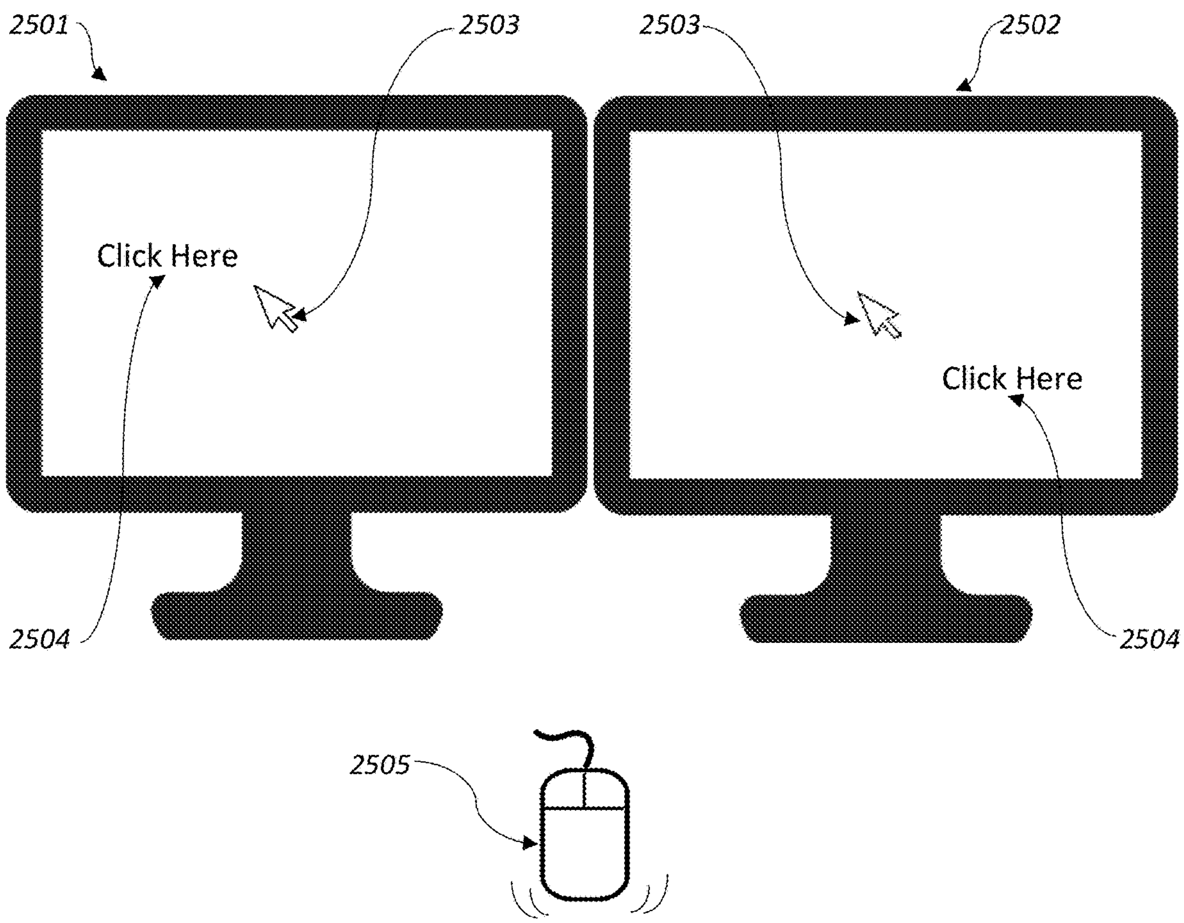
FIG. 25A illustrates a directed input cursor jumping feature in action, according to an embodiment.

FIG. 25A illustrates the directed mouse cursor jumping feature in action. When a user with two monitors (2501 and 2502) is uncertain which monitor is currently active, wiggling the mouse (2505) causes the interface to enter monitor selection mode. This results in both monitors displaying the mouse cursor (2503) in a central location with a "Click Here" button appearing near the cursor (2503). These buttons (2504) are identical in form but occupy distinctly different locations in relation to the cursor (2503), so that when the user moves to click the message in the direction displayed by the desired monitor, it signals the interface to make that monitor active and remove the unselected message and cursor from the other display.

Automatic Explicit Input Cursor Jumping

In an embodiment, for purposes of the input cursor jumping features that are described below, the "quality level" of a potential input cursor location that is at the end of a document is 10; the quality level of a potential input cursor location that is within a sequence of one or more consecutive blank lines is equal to the number of consecutive blank lines, to a maximum of 9; the quality level of any other potential input cursor location is 0. Various other ways of defining a "quality level" will be evident to those of ordinary skill in the art.

In an embodiment, when a user actuates an arrow key, if the input cursor is not currently visible and there is at least one potential input cursor location that is currently visible within the window that currently has the keyboard focus, and either the user detectably may be looking at such a potential input cursor location or the interface has no eye tracking capability, then the interface will determine the highest quality level of all the "eligible input cursor locations" as defined below and will determine the eligible location that has that quality level that is nearest to the "central location" as defined below, and the interface will alterably decide to move the input cursor to that location. Such cursor movement will be referred to herein as a "non-scrolling input cursor jump," and is also an "automatic explicit input cursor jump." This feature will be referred to herein as the "non-scrolling input cursor jumping feature," and is a smart navigation feature.

In an embodiment, for purposes of the non-scrolling input cursor jumping feature, if the interface has eye tracking capability, then the eligible input cursor locations are the input cursor locations that the user detectably may be looking at within the window that currently has the keyboard focus, and the central location is the focal location. In an embodiment, if the interface does not have eye tracking capability, then the eligible input cursor locations are all the input cursor locations that are currently visible within the window that currently has the keyboard focus, and the central location is the center of the left edge of the window that currently has the keyboard focus; in an alternative embodiment, the central location is the visible location that is as close as possible to the location of the input cursor within the current document.

For example, in an embodiment, if a user who was typing at the end of a document scrolls up to view an earlier portion of the document by means of a scrollbar so that the input cursor is no longer visible, and the user subsequently forgets where the input cursor is and presses arrow keys in an effort to see where the input cursor is, then rather than scrolling down so that the input cursor becomes visible, the interface will move the input cursor up to a location that is already visible.

In an embodiment, when a user actuates an arrow key, if the input cursor is currently visible, and if for at least one potential input cursor location, for a certain minimum threshold amount of time (such as, in an embodiment, one full second), it has been the case that the user detectably was not looking at any location within a certain radius of the location of the input cursor and that the user detectably might have been looking at that potential input cursor location, then the interface will determine the highest quality level of all the potential input cursor locations that the user detectably might have been looking at for that amount of time and will determine the location that has that quality level that is nearest to the focal location, and the interface will alterably decide to move the input cursor to that location. Such cursor movement will be referred to herein as an "eye-tracking input cursor jump" and is also an automatic explicit input cursor jump. This feature will be referred to herein as the "eye-tracking input cursor jumping feature," and is a smart navigation feature. The minimum threshold amount of time will be referred to as "the eye-tracking jump threshold."

For example, in an embodiment, if a user has been editing a document that is visible on one monitor and wishes to edit a document that is visible on another monitor, the user can stare at the document he wishes to edit for a couple seconds and then press an arrow key, and the interface will move the input cursor to a location within that document.

In an embodiment, if in response to an actuation of an arrow key the interface makes an alterable decision whether or not to perform an automatic explicit input cursor jump as described above, then as soon as the user performs an action other than an actuation of an arrow key, the decision will no longer be alterable. If the user does alter such a decision while it is still alterable, then when the user alters the decision, the interface will restore the input cursor to the location where it would have been located if the interface had made the opposite decision and then reapply any additional consecutive actuations of arrow keys that occurred before the decision was altered. For example, in an embodiment, if a user presses the up arrow key three consecutive times and then actuates the alteration key, if the interface responded to one of those actuations of the up arrow key with a cursor jump, then the result that obtains after the actuation of the alteration key will be the same result that would have obtained if the cursor jump had never occurred.

In an embodiment, if in response to an actuation of an arrow key the interface makes an alterable decision to perform an automatic explicit input cursor jump and while this decision is still alterable the input cursor becomes located where it was before the automatic explicit input cursor jump, or if in response to an actuation of an arrow key the interface makes an alterable decision not to perform an automatic explicit input cursor jump and while this decision is still alterable the input cursor becomes located where it would have been located if the interface had decided to perform the cursor jump, the decision will be deleted and will be considered to have had a non-beneficial outcome. (Such an embodiment thus essentially has manual alteration detection for automatic explicit input cursor jump decisions.)

Automatic Implicit Input Cursor Jumping

In an embodiment, when a user types a character, actuates the Paste key, dictates text via speech recognition, or performs some other editing action that causes the entry of input at the current location of the input cursor, if actuating an arrow key would have caused the input cursor to jump to an input cursor location that has a quality level greater than zero, then the interface will respond as though the user had actuated an arrow key before responding to the editing action that causes the entry of input. In such circumstances, the cursor jump that occurs is still either a "non-scrolling input cursor jump" or an "eye-tracking input cursor jump," but it is an "automatic implicit input cursor jump" rather than an "automatic explicit input cursor jump."

In an embodiment, in such circumstances the interface's decision to thus move the input cursor before entering the input is an alterable input state decision; altering the decision will cause the interface to move all the input that is in the decision's alterable block, so that after the decision is altered such input is where it would have been had the interface not thus moved the input cursor, and the input cursor itself is where it would have been had the interface not thus moved the input cursor. For example, in an embodiment, if the input cursor is in the middle of a document, and a user scrolls down to the end of the document so that the input cursor is no longer visible and types the word "Next," then in response to the first keystroke of the word "Next" the interface will alterably decide to move the input cursor to the end of the document, so the user will end up typing the word "Next" at the end of the document; if the user finishes typing the word "Next" and then alters that decision, the interface will move the word "Next" from the end of the document up to where it would have been inserted if the interface had not taken the initiative to move the input cursor to the end of the document, and will put the input cursor at the end of the word "Next" in its new location. As another example, in an embodiment, if a user has been working on a computer that has multiple display devices and has eye tracking technology, and the user is editing one document on each display device, then if the user looks at a display device and begins typing, then the interface may move the input cursor into the appropriate window so the user's input will be entered into the document the user is actually looking at.

Altering Automatic Input Cursor Jumping

In an embodiment, the non-scrolling input cursor jumping functionality described above is adaptive and has three distinct settings such that one setting is always selected: either the feature is set to decide to perform non-scrolling input cursor jumps, or it is set to decide to perform non-scrolling input cursor jumps when they are automatic explicit input cursor jumps but not when they would be automatic implicit input cursor jumps, or it is set to decide not to perform non-scrolling input cursor jumps at all.

In an embodiment, the eye-tracking input cursor jumping functionality described above is adaptive and decisions pertaining to eye-tracking input cursor jumps are divided into two distinct adaptive decision classes, each with its own distinct eye-tracking jump threshold: interface decisions whether or not to perform an eye-tracking input cursor jump that is an automatic explicit input cursor jump are adaptive threshold decisions of one decision class, an interface decisions whether or not to perform an eye-tracking input cursor jump that is an automatic implicit input cursor jump are adaptive threshold decisions of another decision class.

Directed Input Cursor Jumping

Prior art Synergy keyboard and mouse sharing software enables a single keyboard and mouse to be used as the keyboard and mouse for multiple computers that are connected via a network, and enables sharing of the copy/paste clipboard between computers, and also enables dragging and dropping of files between computers. In many respects, Synergy is simply a multi-computer implementation of the same interface behaviors that were already typical behaviors for a single computer with multiple monitors connected, but Synergy does have one special advantage: in Synergy, a navigation hotkey may be set up that corresponds to each computer, so a user can instantly cause the mouse cursor to jump to a particular monitor by pressing that computer's hotkey, without the need to manually move the mouse cursor from one screen to another.

In an embodiment, for purposes of the following paragraphs, a display device is "selected" when the input cursor is visible on that display device, or if no input cursor is visible, a display device is "selected" when a window on the display device has the keyboard focus.

In an embodiment, when the computing device is connected to multiple display devices, a user can configure the interface so that a hotkey is assigned to each display device. When a hotkey is assigned to a display device, pressing the hotkey will cause the interface to "select" that display device, which means the interface will give the keyboard focus to a window that is visible on that display device if possible, which may cause the input cursor to become visible on that display device; the interface will also cause the mouse cursor to jump to that display device.

In an embodiment, when a certain minimum amount of time has elapsed since the user's most recent action, on each display device that is not selected, the interface will display a message that explains how to select that display device.

In an embodiment, when the computing device is connected to multiple display devices and the interface is not capable of determining which of the display devices the user is looking at, when a user actuates a key, if the key actuation has a high deliberation score, then the interface will alterably decide not to select one of the display devices that was not currently selected before responding to the key actuation. Such a decision will be referred to as an "alterable directed input cursor jumping decision," and such an embodiment will be said to have the "directed input cursor jumping feature."

In an embodiment, an alterable directed input cursor jumping decision will have a probability of alteration that is initially proportional to the amount by which the deliberation score of the key actuation exceeds the minimum threshold for the invocation of this feature, but is at most a moderately low probability of alteration: if a user pauses for a little while and then actuates a key, the interface will make an alterable directed input cursor jumping decision with a very low probability of alteration; if a user pauses for a very long time and then actuates a key, the interface will make an alterable directed input cursor jumping decision with a moderately low probability of alteration.

In an embodiment, an alterable directed input cursor jumping decision is an alterable input state decision, and altering such a decision may affect keystrokes that were typed after the decision: altering such a decision will essentially cause the interface to undo the key actuation that triggered the decision along with every subsequent key actuation, select a different display device, and reapply the key actuations. For example, in an embodiment, if a user types the letter "N" with a high deliberation score and so the interface makes an alterable directed input cursor jumping decision, and then the user types "ext" (with a low deliberation score for each letter), and then the user alters the alterable directed input cursor jumping decision so that a different display device become selected, then the interface will move the entire word "Next" to that display device.

Figure 25B:
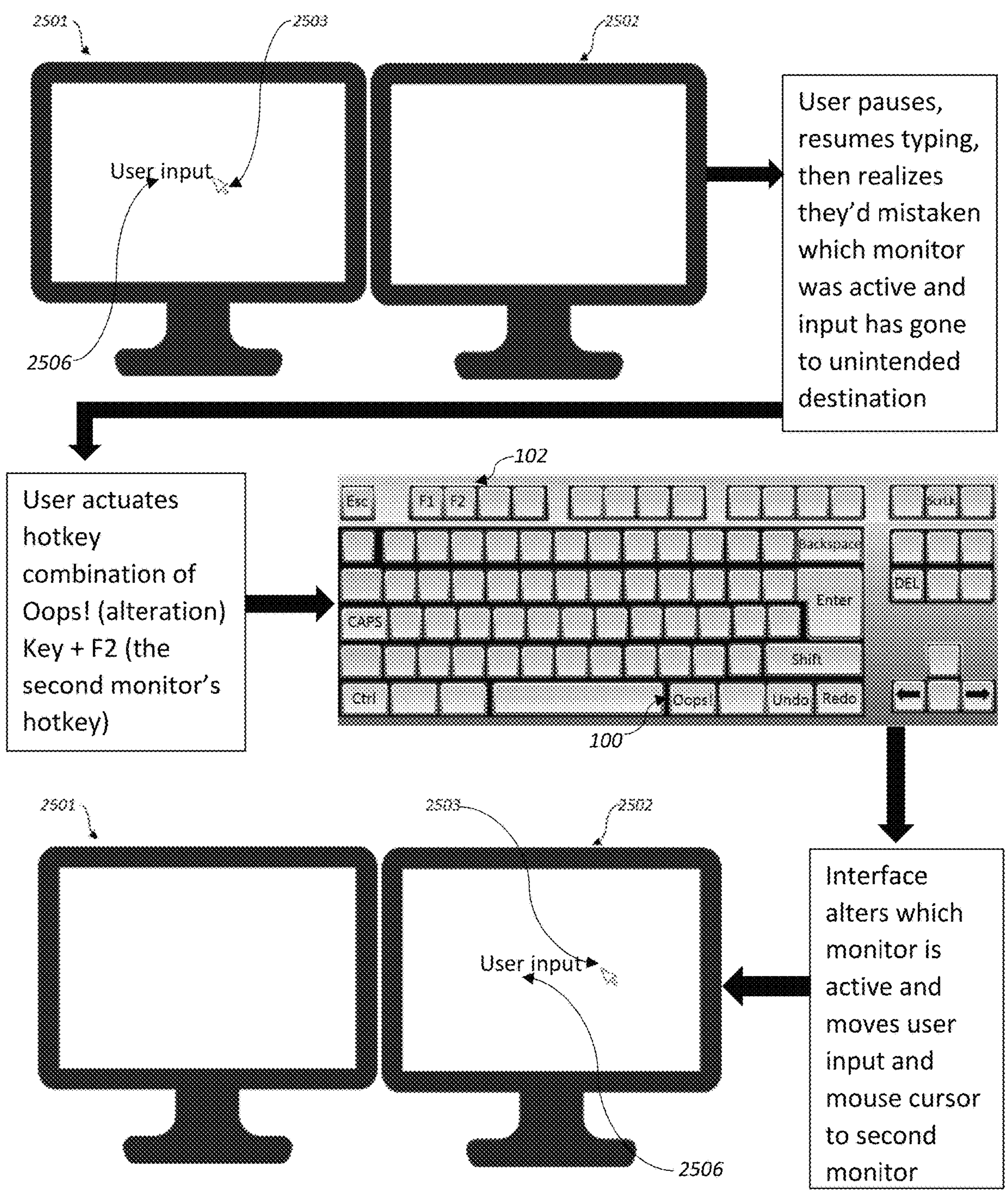
FIG. 25B illustrates advantages associated with some embodiments of a directed mouse cursor jumping feature.

In an embodiment, alterable directed input cursor jumping decisions are hotkey-exclusive alterable decisions: they are not alterable by ordinary means, but instead, while an alterable directed input cursor jumping decision exists, holding down the alteration key and pressing the hotkey that is assigned to a display device will cause the alterable directed input cursor jumping decision to be altered so that display device becomes selected; doing so again will undo that effect. FIG. 25B illustrates the advantages of such an embodiment: in such an embodiment, if a user pauses for a very long time and then types the words "User input" before realizing that they had mistaken which monitor was active, holding down the alteration key and pressing the hotkey corrects their mistake.

In an embodiment, alterable directed input cursor jumping decisions will not be highlighted like other alterable decisions. Instead, while an alterable directed input cursor jumping decision exists, each display device other than the selected display device will display a message that explains how to alter that decision so that display device become selected.

From a user's perspective, the directed input cursor jumping feature may be extremely easy to learn to use; in fact, a user may be able to the use this feature successfully without even realizing how it works. For example, consider the following scenario: A user has a computer with an interface that has the directed input cursor jumping feature. The computer is connected to four monitors. A user takes a phone call, then looks at the monitor that is currently displaying a document that he now intends to edit. The user does not stop to remember which monitor he was primarily using before the phone call. Instead, the user begins typing, starting with the word "Next." The text the user typed does not appear on the monitor the user is looking at, so the user stops typing. A message has appeared on the monitor the user is looking at: it says "Hold down Alter and press F1" (or something similar). When the user follows the directions, the word "Next" appears where the user intended to type it. The user can now edit the document normally.

In an embodiment, when the interface makes an alterable directed input cursor jumping decision, if some other alterable directed input cursor jumping decision already existed, the decisions will be combined into a single multi-alternative decision. In an embodiment, when such a multi-alternative directed input cursor jumping decision exists, holding down the alteration key and repeatedly pressing the hotkey that is assigned to a display device will cause the interface to cycle among various options regarding when that display device could have become selected. For example, in such an embodiment, if a user types "These three things" and each actuation of the letter T has a high deliberation score but no other key actuations have high deliberation scores, then subsequently holding down the alteration key and repeatedly pressing the hotkey that is assigned to one particular display device will cause the interface to first yield an option in which the word "things" is moved to that display device, and then an option in which the two words "three things" are both moved to that display device, and then an option in which the three words "These three things" are all moved to that display device, and finally an option in which none of those words are moved to that display device and that display device is not selected.

Command Redirection

In an embodiment, when a user invokes a command by means of the keyboard, or by means of speech recognition, or by any other means that is not inherently associated with a particular window, if the user detectably has not been looking at the window that has the keyboard focus and the user detectably may be looking at a window in which such a command is valid, then the interface will alterably give the keyboard focus to the window the user is looking at and invoke the command in the new window. This feature is a smart navigation feature. For example, in such an embodiment, if a user has been working on a computer that has multiple display devices and has eye tracking technology and speech recognition, and the user is editing one document on each display device, then if the user looks at one of the display devices and says "Undo that," the interface may decide to undo the last editing action in the document the user is looking at even if that document did not have the keyboard focus; if so, then altering that decision will redo the editing action that was undone in the document the user was looking at, and undo the last editing action in the document that did have the keyboard focus.

Multi-Device Smart Navigation

In an embodiment, the computing device is configured in such a way that it can share a mouse, keyboard, and/or microphone with one or more other computing devices that embody the invention that are connected to the computing device via a network, and will then coordinate its behavior with the other computing device that embody the invention in such a way that the computing devices appear to treat input from these input devices as though they were a single computing device that has the smart navigation features described above. In other words, just as prior art Synergy keyboard and mouse sharing software enables multiple connected computers to essentially behave like a single computer with a prior art interface for navigating between multiple monitors, an embodiment of the present invention may enable multiple connected computers to essentially behave like a single computer with new smart navigation features for navigating between multiple monitors. The following paragraphs explain such behavior in more detail.

In particular, in an embodiment, if the computing device shares a mouse with one or more other computing devices that embody the invention, then at any given time the display of only one of the computing devices will have a mouse cursor visible; if the mouse cursor is visible on the display of one computing device when a user detectably looks at the display of another computing device and wiggles the mouse, then the mouse cursor will disappear from the display of the computing device the user is not looking at and appear on the display of the computing device the user is looking at, just as though both displays were connected to a single computing device that has the mouse cursor jumping feature described above.

Similarly, in an embodiment, if the computing device shares a keyboard with one or more other computing devices that embody the invention, then at any given time only one window on the display of either computing device will have the keyboard focus; if a window that is visible on one computing device has the keyboard focus when a user detectably looks at a window on the display of another computing device and actuates a cursor key or begins typing, then those keystrokes may be alterably redirected to the computing device the user is looking at, just as though both displays were connected to a single computing device that has the input cursor jumping feature, the input redirection feature, and the command redirection feature.

Also, in an embodiment, if the computing device shares a microphone with one or more other computing devices that embody the invention, or if the computing device has a microphone that can hear a particular user and the computing device is in communication with one or more other computing devices that embody the invention and that have separate microphones that can simultaneously hear the same user, then at any given time only one window on the display of either computing device will have the keyboard focus; if a window that is visible on one computing device has the keyboard focus when a user detectably looks at a window on the display of another computing device and dictates text or verbally invokes a command, then the computing devices will respond as though both displays were connected to a single computing device that has the input redirection feature and the command redirection feature.

Alterable Text Field Selection

Certain prior art smartphone text messaging apps have a first input field in which a user may specify recipients for the message and a second input field in which the user may specify the message. In such apps, a user may specify one or more recipients for the text message, then touch the area of the screen where the message will be composed, and then type the message. In certain apps, in order to specify a recipient for a text message, a user may type a few characters of the recipient's name and then select the recipient from a pop-up list of contacts' names that match these few characters.

In an embodiment of the present invention, when a user is preparing to send a text message, after the user selects a recipient from a list of contacts' names, if a first input field is visible in which a user may specify additional recipients for the message and a second input field is visible in which the user may specify the message, if the user does not explicitly touch either input field before typing one or more characters, then the interface's decision whether to add such characters to the input field in which the user specifies recipients for the message or add them to the input field in which the user specifies the message is an alterable decision. Thus, in an embodiment, if a user types a few characters of a first recipient's name, then chooses the first recipient from a list, then begins typing the intended message without realizing that the text messaging app is interpreting the characters that the user is typing as the first few characters of a second recipient's name, and then notices the mistake, then the user may be able to correct the mistake quickly by means of alteration functionality.

In an embodiment, the decision class of such decisions is an adaptive decision class, so if a user typically selects a single recipient for a message and then begins typing the message without remembering to first touch the area of the screen where the message will be composed, the interface will eventually adapt so that selecting a single recipient for message automatically causes the input cursor to move to the input field in which the user specifies the message. In such an embodiment, if a user selects a single recipient for a message and then begins typing characters in an attempt to specify a second recipient for the message without realizing that the text messaging app is interpreting the characters as the beginning of the message, the user may be able to correct the mistake quickly by means of alteration functionality.

Chapter 38: Alterable Interruptions

Interface-Initiated Events

Sometimes, when an interface is in a state where it is ready to respond to user actions, an event may occur such that the event is not an immediate response to a user's action, and such that the event changes the state of the interface in a way that may affect the interface's response to the user's next action. In the present specification, such an event will be referred to as an "interface-initiated event." For example, if a smartphone suddenly displays a "Low Battery" message that changes the state of the interface so that the user must dismiss the message before performing any other action, then the appearance of that message is an interface-initiated event. Occasionally a user will perform some action just a fraction of a second after an interface-initiated event occurs, and due to the occurrence of the interface-initiated event, the interface will respond differently than it would have responded if the same user action had occurred just a fraction of a second earlier; this may cause mistakes.

In the present specification, except as otherwise specified, when the interface is said to "respond in pre-event mode" with respect to an interface-initiated event, this means that the interface responds to user actions as though the interface-initiated event had not occurred, and when the interface is said to "respond in post-event mode" with respect to an interface-initiated event, this means that the interface responds to user actions as though the interface-initiated event did occur.

In certain cases, if a certain first event occurs and then a certain predetermined amount of time elapses during which the user performs no action, then some type of interface-initiated event will occur as a delayed response to that first event. A user may learn to predict when such an interface-initiated event will occur. For example, a user may learn to predict when an interface will change its state from a state such that actuating a key a second consecutive time will have a special multi-click effect to a state such that actuating the key a second consecutive time will have no such special effect. Such predictable interface-initiated events are discussed in the following chapter; in particular, interface behaviors pertaining to multi-click keys are discussed in the following chapter.

Interrupting Events

In the present specification, any interface-initiated event that is not a predictable interface-initiated event will be referred to as an "interrupting interface-initiated event." For example, on many computing devices it is possible for a window to appear at a relatively arbitrary moment for various reasons, such as to inform the user of a low battery, and the sudden appearance of such a window may affect the interface's response to the user's next action.

In an embodiment, when an interrupting interface-initiated event occurs, the perceptible consequence of that event becomes an attention object as defined farther above, and so the interface will assign it an attention score. Such an attention object will be referred to herein as an "interruption attention object." For example, a window that suddenly pops up may become an interruption attention object. In an embodiment, the base attention factor of an interruption attention object is relatively high, due to the fact that a user's attention is rather likely to be drawn to any occurrence that is unexpected.

In an embodiment, the attention score that is initially assigned to an interruption attention object is a slightly negative value, so its attention score will become positive almost immediately but not quite immediately, so that if a user's next action occurs before it would be humanly possible for the user to have consciously perceived the interruption attention object, then the object's attention score will still be negative when that action occurs. In an embodiment, for as long as the attention score of an interruption attention object is negative, its attention factor will not be elevated for any reason, but will equal at most its base attention factor, so for example if the user is detectably looking at the interruption attention object right when it appears, this will not affect its attention factor until a split second later.

Response Scores

In an embodiment, in certain circumstances the interface may calculate an "attention sufficiency score" for an interruption attention object, which will equal the attention score of the interruption attention object unless that attention score exceeds a certain maximum value, in which case the attention sufficiency score will equal that maximum value. The attention sufficiency score is intended to reflect whether the user has had ample opportunity to notice the interruption, insofar as the interface is able to determine this; this is why the attention sufficiency score will initially equal the attention object's attention score, and will for a while continue to equal the attention score as the attention score increases, but once the attention score is sufficiently high that it indicates that the user has definitely had ample opportunity to notice the interruption, the attention sufficiency score will not continue to increase.

In an embodiment, after an interrupting interface-initiated event occurs, while the interface is in an "interruption transition mode" for that interruption as described below, each user action will be assigned a "response score" with respect to that interruption. In an embodiment, such an action's response score equals the action's deliberation score plus the interruption's attention sufficiency score at the time of the action. Thus, if a user is typing quite rapidly and an interruption occurred just a moment ago, each keystroke will have a very low response score with respect to that interruption; if a user pauses a while before pressing a key and an interruption occurred just a moment before that keystroke, then that keystroke will have a moderate response score; if a user is typing quite rapidly and an interruption occurred several seconds ago, each keystroke will have a moderate response score; and if the user pauses a while before pressing a key and an interruption occurred several seconds before that keystroke, then that keystroke will have a very high response score.

In an embodiment, while the interface is in interruption transition mode for an interruption, if a particular user action would have some effect if the interface responded to the action in pre-event mode but would not have any effect if the interface responded to the action in post-event mode, then the action's response score will be reduced, so that its response score will be significantly less than the sum of its deliberation score and the interruption's attention sufficiency score. Conversely, if the action would have some effect if the interface responded in post-event mode but not if it responded in pre-event mode, then the action's response score will be increased.

In an embodiment, while the interface is in interruption transition mode for an interruption, in certain circumstances the interface may calculate a "hypothetical response score" for the interruption transition mode at a given moment, which will equal the hypothetical deliberation score (which is the deliberation score that would be assigned to a typical action if that action were to occur at that moment) plus the interruption's attention sufficiency score at that moment.

Alterable Interruption Response Decisions

In an embodiment, the interface may continue to respond to user actions in pre-event mode for a short while after an interrupting interface-initiated event occurs, and when the interface does begin to respond to user actions in post-event mode, its decision regarding when to start responding in post-event mode may be an alterable decision. Such behavior is explained in detail in the following paragraphs.

In an embodiment, when an interrupting interface-initiated event occurs, the interface will enter an interruption transition mode for that interruption.

In an embodiment, if the user performs at least one action while the interface is in interruption transition mode for an interruption, then the interface will remember an "interruption transition list" for that interruption. The interruption transition list will include all the user actions that occur while the interface is in interruption transition mode, in chronological order, and will also include a single "response transition point" that is either before all user actions in this list, or between two of them, or after all of them. While the interface is in interruption transition mode, until the user performs an action that has a response score that is above a certain "response transition threshold," the interface will respond to each user action in pre-event mode, and the response transition point will be after all the actions in the interruption transition list. When the user performs a first action that has a response score that is above the response transition threshold, the interface will place the response transition point immediately before that action in the interruption transition list, and will then respond to that user action and all subsequent user actions in post-event mode. The response transition point thus separates the user actions that were handled in pre-event mode from those that were handled in post-event mode. In an embodiment, the interface will remember sufficient information about each user action in the interruption transition list and about its responses to those actions that the interface can later move the response transition point and retroactively change its responses to those user actions, so that it then yields the same result as though the interface had responded to every user action that is before the new response transition point in pre-event mode and had responded to every user action that is after the new response transition point in post-event mode.

In an alternative embodiment, the interface will not have a response transition threshold: as soon as an interrupting interface-initiated event occurs, the interface will respond to all subsequent user actions in post-event mode; if the user performs one or more actions while the interface is in interruption transition mode, the interface will place the response transition point before all such user actions. In such an embodiment, unexpected interruptions may introduce mistakes just as readily as they do in prior art, but such mistakes may be easier to fix, due to the interruption alteration functionality described in the following paragraphs.

In an embodiment, while the interface is in interruption transition mode, the first time the user performs an action that does not cause the interface to exit interruption transition mode, the interface will create a potentially alterable decision regarding its response to that action. Such a potentially alterable decision will be referred to herein as an "alterable interruption response decision." The interruption transition list described above is information that is for the use of such an alterable interruption response decision, so as soon as an alterable interruption response decision is deleted, the interface will also forget its interruption transition list.

In an embodiment, while the interface is in interruption transition mode, if the user performs an action that has a response score that is above a certain "response completion threshold," then the interface will exit interruption transition mode. The interface will respond to that user action and all subsequent actions in post-event mode, and will not include that user action in the interruption transition list.

In an embodiment, when a user performs an action that causes the interface to create an alterable interruption response decision as described above, the alterable interruption response decision will not actually become alterable immediately. Instead, it will become alterable as soon as the hypothetical response score is above the response completion threshold, or as soon as the user performs some action that has a response score that is above the response completion threshold (and thus causes the interface to exit interruption transition mode), whichever comes first. If the alterable interruption response decision thus becomes alterable due to the passage of time and not directly in response to a user action, and if the alterable interruption response decision will become the most relevant alterable interface decision when another decision had been the currently alterable decision, then the alterable interruption response decision will not immediately become the currently alterable decision: instead, as soon as the alterable interruption response decision becomes an alterable decision, the decision that was formerly the currently alterable decision will cease to be the currently alterable decision, and then there will be no currently alterable decision until either the user performs an action or a certain fixed additional time interval elapses (such as, in an embodiment, one second), whereupon the most relevant alterable decision will become the currently alterable decision. If a user actuates the alteration key while there is no currently alterable decision, then the only effect of this actuation of the alteration key will be that the interface causes the most relevant alterable decision to become the currently alterable decision without any further delay. Thus, in an embodiment, if immediately after an interrupting interface-initiated event occurs a user immediately types a letter and then immediately presses the alteration key, that actuation of the alteration key may alter some decision other than the alterable interruption response decision; if instead the user immediately types a letter and then pauses a short while before pressing the alteration key, the only effect of that actuation of the alteration key may be that it causes the most relevant alterable decision to become the currently alterable decision without any further delay; if instead the user immediately types a letter and then pauses a little longer before pressing the alteration key, that actuation of the alteration key may alter the alterable interruption response decision.

In an embodiment, the options of an alterable interruption response decision correspond to the locations where the response transition point may become located within its interruption transition list, so that altering such a decision will cause the interface to move the response transition point within the interruption transition list and to then yield the appropriate result, as described above. (An alterable interruption response decision is thus an alterable input state decision, as defined farther above.) In an embodiment, the response transition point may become located between any two user actions that are in the interruption transition list if and only if the response score of the latter of the two actions is above a certain "minimum response threshold"; thus, if a user performs many actions while the interface is in interruption transition mode but nearly all of these actions have a low response score, then the resulting alterable interruption response decision will not have very many options. In an embodiment, for any location between two user actions in the interruption transition list, if the response transition point may become located there, and if the corresponding option of the alterable interruption response decision is an alternate option (as opposed to the default option), then the interface will assign that option a probability of alteration that is proportional to the amount by which the response score of the latter of the two actions exceeds the minimum response threshold. In an embodiment, it is always possible for the response transition point to become located at the start of the interruption transition list; if the corresponding option of the alterable interruption response decision is an alternate option (as opposed to the default option), then the interface will assign that option a probability of alteration that is proportional to the amount by which the response score of the first action in the list exceeds the minimum response threshold if it does exceed the minimum response threshold, or a very low probability of alteration otherwise. In an embodiment, is always possible for the response transition point to become located at the end of the interruption transition list; if the corresponding option of the alterable interruption response decision is an alternate option (as opposed to the default option), then the interface will assign that option a very high probability of alteration.

In an embodiment, the minimum response threshold is sufficiently high that even after the interruption's attention sufficiency score has reached its maximum value, an action with a very low deliberation score will not have a response score that exceeds the minimum response threshold. In an embodiment, the response transition threshold is higher than the minimum response threshold, and is approximately equal to what an action's response score will be if the interruption's attention sufficiency score and the action's deliberation score are both moderately high but not very high. In an embodiment, the response completion threshold is higher than the response transition threshold, and is approximately equal to what an action's response score will be if the interruption's attention sufficiency score has reached its maximum value and the action's deliberation score is moderately high.

For example, suppose that in an embodiment, a user is rapidly typing text in a first window when a second window suddenly pops up and requests the keyboard focus from the operating system. The user types a character just a fraction of a second after the second window pops up; he has not even noticed that window yet. The interface creates an alterable interruption response decision. The next few characters the user types have low response scores, because the interruption just occurred (and so its attention sufficiency score is low) and the user is typing rapidly (so the characters' deliberation scores are low). The interface responds to these keystrokes in pre-event mode, which means these characters are entered into the first window, as though the second window had not yet appeared.

The user hesitates significantly, and then resumes typing rapidly. The user's hesitation is just long enough that the next keystroke's response score exceeds the response transition threshold, so the interface responds to subsequent keystrokes in post-event mode, which means that the interface moves the input cursor into the second window, and these characters are entered into the second window.

As the user continues typing, one keystroke has a medium deliberation score instead of a low deliberation score. By now the interruption's attention sufficiency score is fairly high, so that keystroke has a response score that exceeds the minimum response threshold. It does not exceed the response completion threshold.

A while later, the user stops typing and considers what to do. The alterable interruption response decision now has three alternate options. The user has now paused long enough that his next action will cause the interface to exit interruption transition mode, so no new alternate options will be added to the alterable interruption response decision.

If the user now alters the decision once, then the interface will move all the text that has been entered in the second window into the first window, as though it had not moved the input cursor into the second window until after those characters were entered, because that particular alternate option has the highest probability of alteration. Another alternate option corresponds to the result that would have obtained if the interface had moved the input cursor to the second window as soon as the interruption occurred, and another corresponds to the result that would have obtained if the interface had moved the input cursor to the second window immediately before the particular keystroke mentioned above that had a medium deliberation score instead of a low deliberation score.

In an embodiment, each interrupting interface-initiated event is handled independently, except as otherwise specified; that is, each interruption may be associated with its own independent interruption transition mode, interruption transition list, response transition point, alterable interruption response decision, and so forth. In an embodiment, the time intervals during which the interface is in interruption transition mode for distinct independent interruptions may overlap: that is, after an interrupting interface-initiated event occurs, if the interface is still in interruption transition mode for that interruption when another interrupting interface-initiated event occurs, then the interface will enter interruption transition mode for the new interruption, while still possibly remaining in interruption transition mode for the old interruption. While the interface is simultaneously in interruption transition mode for multiple distinct interruptions, each user action's response score with respect to one interruption may differ from its response score with respect to the other interruption, because the two interruptions may have different attention sufficiency scores.

Visual Interruption Transitions

In an embodiment, from the moment an interface-initiated event occurs, the interface will begin to rapidly and repeatedly calculate the hypothetical response score for the interruption transition mode from moment to moment. In an embodiment, at the moment when an interface-initiated event occurs, rather than immediately displaying the result of the interface-initiated event normally, the interface will if possible display a partially visible version of the result of the interface-initiated event, and will then gradually transition from that partially visible version to the fully visible version. In an embodiment, at each moment until such a transition is completed, the percentage of completion of this transition will equal the ratio of the hypothetical response score to the response transition threshold. In an embodiment, until such a visual transition is complete, the interface will respond to user actions in pre-event mode; once such a transition is complete, the interface will respond to all subsequent user actions in post-event mode. In an embodiment that makes alterable interruption response decisions as described above, once such a visual transition is complete, the interface will place the user's next action after the response transition point in the interruption transition list even if somehow it has a response score that is below the response transition threshold.

Thus, for example, in an embodiment, if a user is rapidly typing text in a first window when a second window suddenly pops up, then at first the second window will be mostly transparent. If the user pauses significantly then this new window will quickly become opaque, but if instead the user continues typing rapidly for a little while, then each time the user presses a key this will cause the hypothetical response score to subsequently decrease, so the second window will become more opaque between keystrokes but will become less opaque in response to each keystroke. As long as the user continues typing rapidly enough, the second window will never quite become fully opaque. When the user pauses long enough, the new window will become fully opaque and the input cursor will actually move into the new window, and from then on, the interface will respond to the user's actions in post-event mode.

The visual interruption transition feature that is described above is complementary to the alterable interruption response decision feature that is described above that: each feature may represent an improvement over prior art, but the two features may work especially well in conjunction with one another.

Expected Interruptions

In some interfaces, in some cases, a certain user action triggers an interface-initiated event that will typically occur immediately after the user action, but may occasionally be delayed and occur a while later. A user may learn to assume that such an interface-initiated event will occur immediately after the triggering user action, so when such an event is delayed and occurs a while later, this may cause mistakes. Such an interface-initiated event may thus be a sort of inverse interruption: instead of causing a mistake by occurring when it is not expected to occur, such an event may cause a mistake by not occurring when it is expected to occur. In fact, such an event may cause a first mistake by not occurring when it is expected to occur, and then cause a second mistake later by interrupting the user when the user has given up waiting for it to occur.

For example, if a user of Windows 7 highlights a file in Windows Explorer and presses the Delete key, typically a dialog box will immediately pop up that requests confirmation, but occasionally that dialog box will not pop up until several seconds later. Generally, when the present writer wishes to delete a file in Windows 7, he highlights the file and presses Delete and then immediately presses Enter on the assumption that pressing Enter will select the "Yes" option of the confirmation dialog box that will appear immediately; however, on several occasions, the confirmation dialog box did not appear immediately, so pressing Enter caused Windows Explorer to open the file, which was not the intended result.

In the following paragraphs, a "quick event" is an interface-initiated event such that a user will typically expect the interface-initiated event to occur immediately after a user action or other triggering event, in the judgment of the interface designer. A "quick event trigger" is the user action that triggers a quick event. For example, pressing the Delete key to delete a file in Windows Explorer in Windows 7 is a quick event trigger, and the subsequent appearance of the dialog box that requests confirmation of the file deletion is the corresponding quick event.

In an embodiment, when a quick event trigger occurs, the interface will treat this as a special type of interrupting interface-initiated event, and will enter interruption transition mode for that event. If the quick event occurs immediately after the quick event trigger then the interface will exit this interruption transition mode without creating an alterable interruption response decision, as is described below; presumably that is what will typically happen. When the quick event does not occur immediately after the quick event trigger, the "interruption" is the unexpected fact that the quick event did not occur immediately after the quick event trigger. If the quick event does not occur immediately after the quick event trigger, then the eventual occurrence of the quick event may also turn out to be an unexpected interruption. In the following paragraphs, the word "delay-oriented" indicates that a term pertains to the interruption transition mode that the interface enters when a quick event trigger occurs; the word "event-oriented" indicates that a term pertains to the interruption transition mode that the interface may enter when the quick event eventually does occur. For example, the term "delay-oriented alterable interruption response decision" refers to an alterable interruption response decision where the so-called "interruption" is the fact that the quick event did not occur immediately after the quick event trigger, and the term "event-oriented alterable interruption response decision" refers to an alteration interruption response decision where the interruption is the eventual occurrence of the quick event.

In an embodiment, when a quick event trigger occurs, the delay-oriented interruption attention object will be the screen location where the consequence of the quick event will become visible when the quick event occurs. In an alternative embodiment, when a quick event trigger occurs, the delay-oriented interruption attention object will be the entire display of the computing device. (In either case, the purpose of measuring user attention to this delay-oriented interruption attention object is to help determine whether it is likely that the user has noticed yet if the quick event did not occur immediately.)

In an embodiment, with respect to delay-oriented interruption transition mode, the terms "pre-event mode" and "post-event mode" have special definitions for purposes of the interface behaviors pertaining to interruption transition mode that are described above. Essentially, when the interface is in delay-oriented interruption transition mode, the "event" that is referred to in the terms "pre-event mode" and "post-event mode" is not the quick event, but is the user's recognition that the quick event did not occur immediately after the quick event trigger. Actions that occur before such a moment of recognition are actions that the user may have originally expected to occur after the quick event occurred, and so the interface will defer its response to those actions until after the quick event does occur. Therefore, in an embodiment, when the interface is in delay-oriented interruption transition mode, for purposes of the interface behaviors pertaining to interruption transition mode that are described above, when the interface is said to "respond in pre-event mode" to user actions this means that the interface defers its response to the actions until after the quick event occurs and then responds as though the quick event had occurred before the actions, and when the interface is said to "respond in post-event mode" to user actions this means that the actions receive no such special treatment. Below, the terms "pre-delay-recognition mode" and "post-delay-recognition mode" will be used in lieu of the terms "pre-event mode" and "post-event mode" when referring to delay-oriented interruption transition mode and delay-oriented alterable interruption response decisions; the terms "pre-quick-event mode" and "post-quick-event mode" will be used when referring to event-oriented interruption transition mode and event-oriented alterable response decisions.

For example, in an embodiment, pressing the Delete key to delete a file is a quick event trigger, and the subsequent appearance of a dialog box that requests confirmation of the file deletion is the corresponding quick event. If a user presses the Delete key to delete a file and then immediately presses the Enter key, but the appearance of the dialog box is delayed just long enough that the user presses the Enter key immediately before the dialog box appears, then the interface will alterably decide to respond to that actuation of the Enter key in pre-delay-recognition mode, and so it will defer its response to that actuation of the Enter key until after the dialog box appears and then respond as though the dialog box had appeared before the user actuated the Enter key; in other words, the interface will alterably decide to behave in such a way as to yield the result the user presumably expected.

In an embodiment, after a quick event trigger occurs, if the quick event occurs before the user's next action and before the delay-oriented hypothetical response score exceeds the response transition threshold, then when the quick event occurs the interface will immediately exit the delay-oriented interruption transition mode and will not treat the quick event as an interrupting interface-initiated event. In such circumstances, the interface will neither make a delay-oriented alterable interruption response decision nor make an event-oriented alterable interruption response decision. This will presumably be the most common scenario, since a quick event will usually occur immediately after its quick event trigger.

In an embodiment, after a quick event trigger occurs, unless the quick event occurs before the user's next action and before the delay-oriented hypothetical response score exceeds the response transition threshold as described in the preceding paragraph, when the quick event does occur the interface will treat it as an interrupting interface-initiated event and will thus enter an event-oriented interruption transition mode. The interface may thus enter an event-oriented interruption transition mode while it is still in the delay-oriented interruption transition mode.

In an embodiment, after a quick event trigger occurs, if the occurrence of the quick event does cause the interface to be simultaneously in delay-oriented interruption transition mode and event-oriented interruption transition mode, and if at least one user action occurs such that the user action is included in both the delay-oriented interruption transition list and the event-oriented interruption transition list, then the delay-oriented alterable interruption response decision and the event-oriented interruption response decision will have a special relationship to each other, as described in the following paragraph. Essentially, in such circumstances, when such a user action occurs, the interface is doubly uncertain whether or not the user expected that action to be handled after the quick event occurred: the interface is uncertain whether or not the user had noticed yet that the quick event occurred shortly before he performed the action, but the interface is also uncertain whether or not the user had even noticed yet that the quick event was delayed in the first place. In such circumstances, the user may have performed one or more actions after realizing that the quick event was delayed and before noticing that the quick event did eventually occur, with the expectation that such actions would be applied before the quick event occurred.

In an embodiment, after a quick event trigger occurs, if the occurrence of the quick event causes the interface to be simultaneously in delay-oriented interruption transition mode and event-oriented interruption transition mode, and at least one user action occurs that is included in both interruption transition lists, as described in the preceding paragraph, then the event-oriented alterable interruption response decision will have the special restriction that its response transition point can never be located before any user action such that the delay-oriented alterable interruption response decision has its response transition point after that same user action; that is, no user action can be handled in both pre-delay-recognition mode and in post-quick-event mode. In other words, the interface will never assume that any user action occurred after the user noticed the eventual occurrence of the quick event and yet occurred before the user noticed the earlier delay. In an embodiment, when at least one user action is in both interruption transition lists, the delay-oriented alterable interruption response decision and the event-oriented alterable interruption response decision will be combined into a single alterable decision. Any redundant duplicate options of this decision will be deleted, which means that this decision will have exactly one option in which every user action that is in either of the interruption transition lists is handled as though it occurred after the quick event occurred (either because it is before the response transition point in the delay-oriented interruption transition list or because it is after the response transition point in the event-oriented interruption transition list).

For example, suppose that in an embodiment, a user performs an action that would typically cause a new window to pop up immediately and request the keyboard focus from the operating system, but on this occasion, that new window is delayed slightly: it appears after the delay-oriented hypothetical response score exceeds the response transition threshold, but before the interface exits delay-oriented interruption transition mode. A split-second after that new window appears, the user presses a key. The user then pauses long enough for the interface to first exit delay-oriented interruption transition mode and then exit event-oriented interruption transition mode. The user's keypress is in both interruption transition lists, and so the interface combines the two alterable interruption response decisions into one. The delay-oriented alterable interruption response decision would independently have two options: handle the keypress in pre-delay-recognition mode and thus automatically handle the keypress in the new window, or handle the keypress in post-delay-recognition mode and thus handle the keypress normally (so that the outcome ultimately depends on the event-oriented alterable interruption response decision). The event-oriented alterable interruption response decision would independently have two options: handle the keypress in pre-quick-event mode as though the new window had not appeared before the keypress occurred, or handle the keypress in post-quick-event mode and thus handle the keypress in the new window. When these alterable decisions are combined into a single decision, the combined decision will not have four options that correspond to all four possible combinations of options, because two of its options will be deleted: the option corresponding to handling the keypress in both pre-delay-recognition mode and post-quick-event mode will be deleted, because the interface will never assume that any user action occurred after the user noticed the eventual occurrence of the quick event and yet occurred before the user noticed the earlier delay, and either the option corresponding to handling the keypress in pre-delay-recognition mode and pre-quick-event mode or the option corresponding to handling the keypress in post-delay-recognition mode and post-quick-event mode will be deleted, because they both have exactly the same effect: selecting either option will cause the interface to handle the keypress in the new window. The combined alterable decision will thus have two options: one option in which the interface handles the keypress as though the new window had not appeared before the keypress occurred, corresponding to the possibility that the user noticed that the new window had been delayed and then attempted to press another key before the new window appeared, and one option in which the interface handles the keypress in the new window, corresponding to the possibility that either the user intentionally waited to press the key until immediately after the new window appeared or the user had not even noticed yet that the new window was delayed in the first place.

Chapter 39: Alterable Multi-Click Decisions

Predictable Interface-Initiated Events

In certain cases, if a certain first event occurs and then a certain predetermined amount of time elapses during which the user performs no action, then some type of interface-initiated event will occur as a delayed response to that first event. A user may learn to predict when such an interface-initiated event will occur. Any such first event will be referred to herein as a "cue event"; such a predetermined amount of time will be referred to as an "interface response gap"; and an interface-initiated event that occurs in response to a cue event will be referred to as a "predictable interface-initiated event." The "predictable event moment" is either the moment when a predictable interface-initiated event does occur or the moment when such an event would have occurred had the user not acted before then. The "user response gap" is the amount of time that elapses after a cue event before the user performs an action.

In an embodiment, after a cue event occurs, whether or not the user's next action occurs before the predictable event moment, the interface's decision whether to respond to the user's next action in pre-event mode or post-event mode is a threshold decision, as follows: The interface will treat the user response gap as the decision score of a threshold decision and will treat the interface response gap as the threshold value of that threshold decision. If the user response gap is less than the interface response gap, then the interface will respond in pre-event mode, but if the user response gap is greater than the interface response gap, then the interface will respond in post-event mode. In other words, in such an embodiment, the interface will respond as though the interface-initiated event did occur if and only if the user waits long enough for the interface-initiated event to actually occur—which is exactly the behavior one would expect. Additionally, though, in an embodiment, if the interface would respond differently in pre-event mode than in post-event mode, then the interface's decision whether to respond in pre-event mode or post-event mode is a conditionally alterable threshold decision, so if for example a user's next action occurs a hundredth of a second after a predictable interface-initiated event occurs then the interface's decision to respond to that action in post-event mode will be an alterable decision with a high probability of alteration.

Multi-Click Alteration

In various interfaces, immediately after a user actuates a special multi-click key, the interface may enter a special multi-click state such that while the interface is in that state, an actuation of that multi-click key will have a special multi-click effect. When the interface is in such a multi-click state, an actuation of any other key will cause the interface to exit the multi-click state. In some cases, once the interface has entered such a multi-click state, if a certain amount of time elapses during which the user does not perform any action, then the interface will exit the multi-click state. Any such exiting of a multi-click state due to time elapsing will be referred to herein as a "multi-click expiration event." The maximum duration of time during which the interface may be in the multi-click state before a multi-click expiration event will occur will be referred to as the "multi-click expiration interval."

In the present specification, if the interface enters a special multi-click state as described in the preceding paragraph, then the interface will be said to be "in a multi-click situation" until the user performs an action, even when a multi-click expiration event has occurred and the interface is no longer in a multi-click state. When the interface is in a multi-click situation, if the user's next action is an actuation of the same multi-click key, then this action will be said to be a "multi-click actuation" even if a multi-click expiration event has occurred and so the actuation does not cause a special multi-click effect. When a user performs a multi-click actuation, the "multi-click interval" is the amount of time during which the interface was in a multi-click situation before the user performed the multi-click actuation. A "multi-click decision" is the interface's decision whether to respond to a multi-click actuation with the key's multi-click effect or with the key's non-multi-click effect.

A multi-click expiration event changes the state of the interface in such a way that the interface's response to the user's next action may be affected, so a multi-click expiration event is an interface-initiated event as defined above, and a multi-click expiration event occurs a certain predetermined amount of time after an actuation of a multi-click key as a delayed response to that actuation of the multi-click key, so a multi-click expiration event is a predictable interface-initiated event as defined above. When the interface responds to a multi-click actuation in pre-event mode, it responds with the key's multi-click effect; when the interface responds to the multi-click actuation in post-event mode, it responds with the key's non-multi-click effect. For a multi-click expiration event, the cue event is the previous key actuation, the interface response gap is the multi-click expiration interval, the predictable event moment is either the moment when the multi-click expiration event occurs or the moment when such an event would have occurred had the user not acted before then, and the user response gap is the multi-click interval.

Two seconds is a fairly long time to pause between consecutive actuations of a key. A user may expect that pausing for two full seconds between consecutive actuations of a key will yield a different result than double-clicking the key rapidly, but a user is quite unlikely to expect that pausing for more than two seconds will make any additional difference. In an embodiment, for purposes of the following paragraph, the "maximum effective multi-click interval" is two seconds or is some other predetermined time interval such that, in the judgment of the interface designer, after a user has waited that amount of time between consecutive actuations of a key, the user is unlikely to expect that waiting any longer will make any difference.

In an embodiment, for purposes of the following paragraph, the "effective multi-click interval" is the multi-click interval unless the multi-click interval is more than the maximum effective multi-click interval, in which case the effective multi-click interval is the maximum effective multi-click interval. In an alternative embodiment, the "effective multi-click interval" is simply the multi-click interval regardless of its duration; in such an alternative embodiment, the behavior described in the following paragraph is exactly the same as an interface behavior described above, but with more specific terms like "effective multi-click interval" replacing generic terms like "user response gap."

In an embodiment, if a user performs a multi-click actuation, whether or not that actuation occurs before a multi-click expiration event occurs, the multi-click decision is a threshold decision: the interface will compare the effective multi-click interval to the multi-click expiration interval, and if the effective multi-click interval is less than the multi-click expiration interval then the interface will respond with the key's multi-click effect, but if the effective multi-click interval is greater than the multi-click expiration interval then the interface will respond with the key's non-multi-click effect. In an embodiment, such a decision is a conditionally alterable threshold decision, so if for example a user double-clicks a hundredth of a second too slowly to invoke a key's multi-click effect then the interface's decision to respond to that actuation with the key's non-multi-click effect will be an alterable decision with a high probability of alteration.

For certain multi-click keys in various interfaces, if the interface enters a special multi-click state such that while the interface is in that state an actuation of that multi-click key will have a special multi-click effect, then the passage of time will not cause the interface to exit that multi-click state. Such a multi-click key will be referred to herein as a "non-time-sensitive multi-click key." In an embodiment of the present invention, a non-time-sensitive multi-click key will be treated as though it has a multi-click expiration interval that is slightly longer than the maximum effective multi-click interval. Therefore, in an embodiment, if a user waits a very long time before performing a multi-click actuation of such a multi-click key, then the interface will respond with the key's multi-click effect even though the user waited a long time between consecutive key actuations, but the interface's decision to respond with the key's multi-click effect will be an alterable decision with a high probability of alteration; if the user performs a multi-click actuation of such a multi-click key very quickly, then the interface's decision to respond with the key's multi-click effect will have a low probability of alteration or will not be alterable at all.

In Chapter 5, an embodiment is described in which any multi-click block is distinctively highlighted, and at a certain time that is a small amount of time before a multi-click expiration event will occur, the interface will cause the distinctive highlighting of the multi-click block to begin to fade. In an embodiment, such fading of the distinctive highlighting of a multi-click block will begin at the first moment such that if the user actuates the multi-click key at that moment then the interface's decision to respond with a special multi-click effect will be an alterable decision.

Multi-Click Adaptation

In an embodiment, multi-click decisions are adaptive threshold decisions: if a multi-click decision has a non-beneficial outcome, then the interface may adjust the multi-click expiration interval for that key. In an embodiment, multi-click keys that are very similar share the same multi-click expiration interval and thus the same multi-click decision class. For example, in an embodiment that is a graphing calculator, the four keys labeled sin, cos, tan, and $x^2$ are all multi-click keys, and multi-click decisions regarding the sin, cos, and tan keys share the same decision class but multi-click decisions regarding the $x^2$ key are in a different decision class, so the multi-click expiration interval for the $x^2$ key may become longer or shorter than the multi-click expiration interval for the sin, cos, and tan keys.

In an embodiment, multi-click decisions are adaptive threshold decisions even for multi-click keys that are initially non-time-sensitive multi-click keys: a non-time-sensitive multi-click key will initially be treated as though it has a multi-click expiration interval that is slightly longer than the maximum effective multi-click interval, but interface adaptation may cause the key's multi-click expiration interval to become shorter than the maximum effective multi-click interval, in which case the key will no longer be non-time-sensitive. Conversely, if interface adaptation causes any multi-click key's multi-click expiration interval to exceed the maximum effective multi-click interval, then that key will become a non-time-sensitive multi-click key.

At the other extreme, in an embodiment, if interface adaptation would cause the multi-click expiration interval for a key to drop below a certain minimum value (such as, in an embodiment, 0.2 seconds), then that key's multi-click expiration interval will instead be reduced to 0; in such an embodiment, if repeatedly and consistently a user multi-clicks a certain key quite rapidly and yet the key's multi-click effect is a non-beneficial outcome, eventually the interface will adapt so that the initial outcome of a multi-click decision for that key will be the key's non-multi-click effect no matter how rapidly the user multi-clicks that key. (In that case, it will still be possible for the user to invoke the key's multi-click effect by multi-clicking the key and then altering the multi-click decision.)

Triple-Click Alteration and Beyond

In some cases, if a user actuates a special multi-click key three or more consecutive times, each actuation after the first may be a multi-click actuation, and so the interface may make more than one consecutive multi-click decision. In an embodiment, if the interface makes more than one consecutive multi-click decision regarding the same multi-click key, the interface will combine all such decisions into a single alterable decision.

It may be advantageous to simply combine consecutive multi-click decisions into a single alterable decision according to the usual procedure for combining related alterable decisions that is described in Chapter 4. However, it may be slightly more advantageous to assign probabilities of alteration to the options of such a combined multi-click decision by a method that is customized for these types of decisions; such a method is described in the following paragraphs.

In the present specification, a "triple-click decision" is defined to be a combined alterable decision regarding two or more consecutive multi-click decisions. (By this definition, a so-called "triple-click decision" may actually involve more than three consecutive clicks.) A "click-sequence decision" is either an alterable multi-click decision or a triple-click decision.

In an embodiment, when a user performs a multi-click actuation, if the user's previous action was a multi-click actuation of the same key and the interface's multi-click decision in response to that multi-click actuation is alterable and is thus part of a click-sequence decision, then the interface will combine the new multi-click decision with the previous click-sequence decision to create a new triple-click decision and will assign option decision scores to the possible outcomes of this combined decision before deciding on the outcome of the new multi-click decision, so that certain details of the previous multi-click decision or decisions may affect the outcome of the new multi-click decision.

As defined above, a triple-click decision is composed of two or more multi-click decisions, where each multi-click decision is in response to a multi-click actuation that had an effective multi-click interval. A triple-click decision thus will always be associated with two or more effective multi-click intervals. In an embodiment, when a user performs a multi-click actuation, the interface will continue to remember what the effective multi-click interval was for that multi-click actuation at least until the user performs an action that is not a multi-click actuation of the same key. In an embodiment, in order to assign option decision scores to the possible outcomes of a triple-click decision, first the interface will assign each option an initial default score, and then the interface will analyze the effective multi-click intervals associated with that triple-click decision and will assign certain penalties to some or all of the possible outcomes of the triple-click decision, as is explained in detail in the following paragraphs.

For each possible outcome of a triple-click decision, each component decision's effective multi-click interval will constitute either a "connecting interval" or a "separating interval" for that outcome, and will have a "behavior gap" for that outcome. In particular, for each possible outcome of a triple-click decision, for each component multi-click decision in the triple-click decision, if that multi-click decision's outcome is the key's multi-click effect then that decision's effective multi-click interval constitutes a "connecting interval" for that outcome, or if that multi-click decision's outcome is the key's non-multi-click effect then that decision's effective multi-click interval constitutes a "separating interval" for that outcome. For example, if a triple-click decision is composed of two component multi-click decisions, then for the outcome in which the interface decides to respond to both multi-click actuations with the key's non-multi-click effect, both multi-click intervals are separating intervals. For each possible outcome of a triple-click decision, the "behavior gap" of a connecting interval equals zero if the connecting interval is shorter than the multi-click expiration interval; otherwise, it equals the amount by which the connecting interval exceeds the multi-click expiration interval. The "behavior gap" of a separating interval equals zero if the separating interval is longer than the multi-click expiration interval; otherwise, it equals the amount by which the separating interval is less than the multi-click expiration interval.

In an embodiment, for each possible outcome of a triple-click decision, the outcome's option decision score will be reduced by an amount that is proportional to the greatest behavior gap of an effective multi-click interval for that outcome. (Every triple-click decision will have exactly one possible outcome whose option decision score's amount of reduction for this reason will be zero reduction, because every triple-click decision will have one outcome such that the interface responds with a key's multi-click effect when and only when the effective multi-click interval is less than the multi-click expiration interval, which means that outcome's behavior gaps will all be zero.)

In an embodiment, for each possible outcome of a triple-click decision that has at least one separating interval and at least one connecting interval, the interface will compare each separating interval to each connecting interval, and for each combination of a separating interval and a connecting interval such that the ratio of the separating interval's duration to the connecting interval's duration is not at least 1.2, the outcome's option decision score will be reduced by an amount that is proportional to the amount by which the ratio is less than 1.2.

In an embodiment, for each possible outcome of a triple-click decision that has at least two connecting intervals and that has at least one connecting interval that is at least 0.5 seconds, the interface will compare the longest connecting interval to the shortest connecting interval, and if the ratio of the longest connecting interval to the shortest connecting interval is greater than 2.0, the outcome's option decision score will be reduced by an amount that is proportional to the amount by which the ratio exceeds 2.0. Likewise, in an embodiment, for each possible outcome of a triple-click decision that has at least two separating intervals and that has at least one separating interval that is at least 0.5 seconds, the interface will compare the longest separating interval to the shortest separating interval, and if the ratio of the longest separating interval to the shortest separating interval is greater than 2.0, the outcome's option decision score will be reduced by an amount that is proportional to the amount by which the ratio exceeds 2.0.

In an alternative embodiment, rather than analyzing the ratios of effective multi-click intervals as described in the preceding two paragraphs, the interface will simply delete each possible outcome of a triple-click decision that has a separating interval and a connecting interval such that the separating interval is shorter than the connecting interval.

After the interface thus assigns option decision scores to the possible outcomes of a new triple-click decision, the interface will select an outcome for the decision. The new triple-click decision consists of a previously existing click-sequence decision that already had some particular option selected, combined with a new multi-click decision that has two possible outcomes; therefore, this new triple-click decision has two possible outcomes that do not involve changing the outcome of the previously existing click-sequence decision: one in which the interface responds to the most recent key actuation with the key's multi-click effect, and one in which it responds with the key's non-multi-click effect. In an embodiment, the interface will select from among those two outcomes the one with the higher option decision score as the initial outcome of the new triple-click decision, and will then determine probabilities of alteration for the other outcomes of the decision based on how their option decision scores compare to the selected outcome's option decision score, as described in Chapter 3. In an embodiment, the interface will delete every alternate option that would have a probability of alteration that is below a certain threshold.

As an example, consider a multi-click key with a multi-click expiration interval of 1.0 seconds. Suppose a user clicks this key three consecutive times; the first multi-click interval is 0.2 seconds, and the second multi-click interval is 0.9 seconds. In an embodiment, the second time the user clicks the key, the interface will alterably respond with the key's multi-click effect. In an embodiment, the third time the user clicks the key, the interface will create a new triple-click decision and assign option decision scores to its possible outcomes. The outcome that has two consecutive multi-click effects (and thus treats the user's actions as a triple click) will have its option decision score greatly reduced because the ratio of its longest connecting interval to its shortest connecting interval is 4.5. The outcome that has a multi-click effect followed by a non-multi-click effect (and thus treats the user's actions as a double click followed by a single click) will have its option decision score slightly reduced because its behavior gap equals 0.1 seconds. The interface will select from among these two outcomes the one with the higher option decision score; in an embodiment, that will be the outcome that has a multi-click effect followed by a non-multi-click effect. In other words, if a user clicks a key twice quite rapidly and then pauses a while before the third click, the interface may decide that the longer pause indicates that the user wishes to invoke the key's non-multi-click effect even if that pause was slightly shorter than the multi-click expiration interval. Similarly, if a user pauses a very long time between two consecutive actuations of a multi-click key and then actuates the key again relatively soon thereafter, the interface may decide that the shorter pause indicates that the user wishes to invoke the key's multi-click effect even if that pause was slightly longer than the multi-click expiration interval.

In an embodiment that makes triple-click decisions as described above, the outcome the interface initially selects for a triple-click decision may not necessarily have the highest option decision score. Whenever an outcome that the interface does not select has a higher option decision score than the outcome the interface does select, the alternate option corresponding to the outcome with the higher option decision score will be assigned an extremely high probability of alteration. If the embodiment has the automatic alteration feature, then an alternate option may even be assigned such a high probability of alteration that the interface will automatically alter the decision, in which case that alternate option will instead become the initially selected option and the interface will recalculate the probabilities of alteration of the other options of that decision based on how their decision scores compare to the decision score of that option; in essence, in such circumstances the interface alters the previously existing click-sequence decision when it makes the new multi-click decision. In an embodiment, when the interface thus recalculates the probabilities of alteration of a triple-click decision because such an automatic alteration occurs, the interface will add a bonus to the probabilities of alteration of the two alternate options that would not have involved changing the outcome of the previously existing click-sequence decision (but not such a large bonus that a second automatic alteration will occur immediately).

As an example, consider a multi-click key with a multi-click expiration interval of 1.0 seconds. Suppose a user clicks this key three consecutive times; the first multi-click interval is 0.9 seconds, and the second multi-click interval is 0.2 seconds. In an embodiment, the second time the user clicks the key the interface will alterably respond with the key's multi-click effect. The third time the user clicks the key, the interface will create a new triple-click decision. In an embodiment, the outcome of the triple-click decision that has a non-multi-click effect followed by a multi-click effect will have the highest option decision score, but that option will become the initially selected option of the new triple-click decision only if the embodiment has the automatic alteration feature, because selecting that option entails altering the previously existing multi-click decision.

For certain multi-click keys, a key's non-multi-click effect will cause the entry of new input, but a key's multi-click effect will modify previously typed input. For example, on certain prior art cell phones, if a user presses the 2 key once when composing a text message, the interface will enter the letter "a"; if the user then presses the 2 key a second consecutive time, the interface will enter the letter "a" again if the user paused long enough between keypresses, or convert the previously typed "a" to "b" if the user double-clicked the 2 key sufficiently rapidly. In an embodiment of the present invention, for any triple-click decision regarding that kind of multi-click key, whenever that decision includes any interval that is a separating interval in every remaining option of the triple-click decision, the multi-click decision regarding that separating interval will be deleted from the triple-click decision. If such a multi-click decision was both preceded by and followed by other multi-click decisions that are components of the triple-click decision, then the triple-click decision will be divided into two distinct click-sequence decisions, including one click-sequence decision composed of the multi-click decision or decisions that preceded the deleted decision and another click-sequence decision composed of the multi-click decision or decisions that followed the deleted decision. When a triple-click decision is thus divided into two distinct click-sequence decisions, if either or both of the two distinct click-sequence decisions then contain any duplicate options, duplicates will be deleted as necessary so that each option of each click-sequence decision is unique; if this causes a click-sequence decision to contain no alternate options, then that decision will be deleted.

As an example, consider a multi-click 2 key like the cell phone key described above. Suppose a user clicks this 2 key four consecutive times so that the interface makes a triple-click decision that consists of three consecutive multi-click decisions, and the interface selects the outcome "bb," which consists of a multi-click effect followed by a non-multi-click effect followed by another multi-click effect. Suppose the interface assigns such a low probability of alteration to various alternate options that they are deleted, and the only remaining alternate option of the decision is the outcome "baa," which consists of a multi-click effect followed by a non-multi-click effect followed by another non-multi-click effect. In that case, the interface will delete the second of the three component multi-click decisions because the second interval is a separating interval in every option of the decision; the triple-click decision will then be divided into a first multi-click decision (whose alterable block is the first letter "b" of the output) and a last multi-click decision (whose alterable block is the subsequent letter or letters). Both options of the first multi-click decision will then consist of the key's multi-click effect, and because these options are identical the alternate option will be deleted and then that first multi-click decision itself will be deleted, leaving only an alterable multi-click decision regarding the interface's response to the last of the four consecutive clicks. Thus, in the end, the first letter "b," which would not change if the decision were altered, will no longer be part of the alterable block of a click-sequence decision.

Chapter 40: Alterable Hotkey Invocation

Alterable Hotkey Invocation

In various prior art software applications that interact with interface functionality at the level of the operating system of the desktop computer, users can configure hotkeys to serve certain purposes. For example, prior art Dragon NaturallySpeaking speech recognition software can be configured so that a certain hotkey toggles sleep mode. As another example, prior art Synergy keyboard and mouse sharing software can be configured so that a navigation hotkey corresponds to each shared computer, so a user can instantly cause the mouse cursor to jump to a particular monitor by pressing that computer's hotkey.

Generally, when such a hotkey is configured to serve a particular purpose for a particular software application, it overrides the default function of the key or key combination that constitutes the hotkey, so that it can no longer be used for its default purpose. Such hotkeys are generally chosen in such a way as to avoid interfering with commonly used functions, but may occasionally interfere nevertheless. For example, the present writer configured Dragon NaturallySpeaking so that the Scroll Lock key on his keyboard served a special purpose, but then occasionally entered Scroll Lock mode by mistake when the key was not serving as a hotkey, and then was unable to exit the Scroll Lock mode later when the key was serving as a hotkey, because then actuating the Scroll Lock key invoked its special hotkey function rather than its default function of toggling Scroll Lock mode.

In an embodiment of the present invention, when a hotkey is actuated, the interface's decision to invoke the special hotkey function rather than invoking the default function of the hotkey is an alterable interface decision with a very low probability of alteration, and altering such a decision will cause the interface to undo the invocation of the special hotkey function and to invoke the default function of the hotkey. For example, in an embodiment where the Scroll Lock key by default serves the function of toggling Scroll Lock mode, if the Scroll Lock key is configured to serve as a hotkey that toggles sleep mode for speech recognition software, then actuating the Scroll Lock key will toggle sleep mode, but altering that decision immediately thereafter will undo that effect and instead toggle Scroll Lock mode.

Chapter 41: Math Interface Features

Math Interfaces

Interfaces that allow input of mathematical expressions in standard mathematical notation are typically relatively complicated, because mathematical notation often requires special symbols that are not common to ordinary text, and often requires special formatting that is not common to ordinary text. A skilled typist can type ordinary text faster than he can write text by hand, but even for an experienced user, entering a mathematical expression into a calculator or word processor may often be slower than writing the same expression by hand. Additionally, interfaces that allow output of results of mathematical calculations may be relatively complicated, in order to allow users to select various options pertaining to the format of the output. Complex interfaces tend to slow users down and also tend to lead to interface mistakes.

The present disclosure will now describe various features that may facilitate input of mathematical expressions. In particular, after describing various miscellaneous features that facilitate input of mathematical expressions, the present disclosure will describe features that facilitate input and editing of mathematical structures such as fractions, square roots, exponents, and so forth, and then the present disclosure will describe several features that facilitate input of trigonometric expressions. After that, the present disclosure will describe features that may facilitate solving a math problem by a desired method, and features that may facilitate displaying the result of a calculation in a desired form. Some of the features pertaining to mathematical input or output that are described below may not be applicable in some embodiments: for example, an embodiment that is a computer with a word processing application may include features that facilitate input of mathematical expressions without necessarily including features that pertain to performing calculations or solving math problems.

In an embodiment, in circumstances that are described below, the interface may make various alterable decisions pertaining to mathematical input. In an embodiment, alterable decisions pertaining to mathematical input may sometimes be alterable even after a user has pressed Enter and the interface has displayed an answer, in which case altering the user's input may immediately cause the displayed answer to change. In an embodiment, as is described in Chapter 5, when an animated alteration of input has the potential to cause dependent output to change, the interface will cause that output to disappear before the animated change occurs, and will cause that output to reappear with its updated value after the animated change occurs. For example, in an embodiment, if the interface has displayed the answer to sin 2.4° and then an actuation of the alteration key occurs that will cause the degree symbol to be deleted, then first the answer to sin 2.4° will disappear, and then the degree symbol will be deleted, and then the answer to sin 2.4 will appear.

The following description of various math interface improvements will include improvements that are applicable to various features that were previously disclosed in U.S. Pat. No. 8,788,548 (Multimode mathematical user interface) and U.S. Pat. No. 8,504,600 (Mathematical expression entry).

In the present specification, a "fraction creation key" is a key such that when the key is actuated, the interface will create a fraction in standard mathematical notation, with its numerator above its denominator. A "fraction bar key" is a fraction creation key such that when the key is actuated, the interface may move previously typed mathematical text into the numerator of the fraction it creates; for example, in an interface with a fraction creation key that is a fraction bar key, the keystroke sequence 2/3 will yield $$\frac{2}{3}.$$

Whenever an example of a keystroke sequence includes a forward slash character, that character represents an actuation of the fraction bar key; for example, in the preceding sentence the phrase "the keystroke sequence 2/3" refers to the keystroke sequence consisting of first an actuation of the 2 key, then an actuation of the fraction bar key, and then an actuation of the 3 key. A "fraction initialization key" is a special type of fraction bar key such that repeated consecutive actuations of the key may have a special effect; such a key is described in detail in Chapter 44.

In the present specification, a "function identifier" is an abbreviation that denotes a mathematical function in a mathematical expression, such as "cos" or "ln."

In the present specification, the term "calculator" may refer to a computing device that is exclusively for use as a calculator, and may also refer to a general-purpose computing device that has a calculator application or other calculator functionality. The term "numeric calculator" refers to a calculator or other computing device that can perform numeric calculations but not algebraic calculations, as is explained in more detail in Chapter 51.

Automatic Math Formatting

In prior art Microsoft Word word processing software, a user may choose the menu option "Insert New Equation" in order to insert an empty equation region into a document. When a new equation region is thus inserted into a document, or when the input cursor is moved into an equation region that already existed, Microsoft Word becomes a math input interface such that various special math input actions are accessible. For example, when the input cursor is in an equation region, a user can access a fraction template button such that clicking the button causes Microsoft Word to insert an empty fraction template. When the input cursor is moved out of an equation region, such special math input actions become inaccessible again. Such equation regions are useful not only because special math input actions are accessible when the input cursor is located in such a region, but also because by default any text within an equation region is formatted in a way that is appropriate for mathematical text. For example, in Microsoft Word, if an equation region contains only the letter x, then this letter is by default displayed in italics and in a font that has serifs, as is customary when the letter x represents a mathematical variable.

In an embodiment of the present invention, a user may explicitly choose to insert an empty equation region into a document. In an embodiment, when a user does so, or when the input cursor is moved into an equation region that already existed, the interface will become a math input interface: that is, various special math input actions will become readily accessible. For example, in an embodiment, if a user chooses the menu option "Insert New Equation," then the interface will insert an empty equation region into the current document and will cause a window to appear that includes a virtual keyboard that resembles the keyboard of a typical scientific calculator, in order to facilitate the input of various types of mathematical expressions. In an embodiment, by default any text within an equation region is formatted in a way that is appropriate for mathematical text.

In an embodiment, in certain circumstances the interface will automatically convert ordinary text that a user has typed into mathematical text. In particular, in an embodiment, in certain circumstances the interface will automatically create an equation region that includes certain text a user has typed, so that the text will then become formatted in a way that is appropriate for mathematical text. For example, in an embodiment, if a user types (x,y) and then presses the space bar, then the interface will automatically create an equation region that includes that text, so that it will appear as (x, y) instead of (x,y).

In an embodiment, when the interface automatically converts text that is immediately to the left of the current input cursor location into mathematical text, the interface may also cause the new equation region to contain the input cursor, so that various special math input actions will immediately become readily accessible. For example, in an embodiment, if a user types the letter x followed by a plus sign, then the interface will automatically create an equation region that includes that text and includes the input cursor, so that the text will appear as x+ instead of x+, and a window will appear that includes a calculator-like virtual keyboard.

In an embodiment, when the interface decides to automatically convert ordinary text that a user has typed into mathematical text, this will be an alterable decision. Additionally, in an embodiment, in certain circumstances the interface may alterably decide not to convert ordinary text that a user has typed into mathematical text, so that altering this decision will cause the interface to convert the text into mathematical text.

For example, in an embodiment, whenever a user types a plus sign or an equals sign, the interface will make an alterable decision whether or not to convert that character into mathematical text, along with everything between that character and the nearest preceding whitespace character, as follows: if the current document already included at least one equation region, then the interface will alterably decide to convert the text into mathematical text; if not, then the interface will alterably decide not to convert the text into mathematical text. Thus, in such an embodiment, if a user types the letter x followed by a plus sign, and the current document did not already include an equation region, then the interface will alterably decide not to convert that text into mathematical text; the user can then convert that text into mathematical text by altering this decision.

The preceding paragraph gives one example of an algorithm that determines when to alterably decide whether or not to convert ordinary text into mathematical text, and which outcome to select as the default outcome of the alterable decision. Other such algorithms that are more complex can be created by those of ordinary skill in the art. For example, in an embodiment, not only will the interface behave as described in the preceding paragraph, but also, when the document a user is editing includes trigonometric terminology (such as the word “trigonometry” itself), if the user types the word “sin” and presses the space bar key, then the interface will alterably decide to automatically convert the word “sin” and the following space character into mathematical text and will also cause the new equation region to contain the input cursor.

In an embodiment, when the input cursor is within and at the end of an equation region, if a user presses the space bar, then instead of inserting the space character within the equation region, the interface will exit the equation region and insert the space character outside the equation region. In an embodiment, as an exception, when the input cursor is within and at the end of an equation region, if the input cursor is immediately after a mathematical function identifier such that it is commonplace for a space character to be present between that particular mathematical function identifier and its operand (such as the identifier cos, the identifier ln, and so forth), then if the user presses the space bar, the interface will insert the space character within the equation region.

Alterable Multi-Click Math Keys

U.S. Pat. No. 8,788,548 disclosed an interface with various multi-click keys, including a multi-click $x^2$ key such that double-clicking the key yields an exponent of 3, triple-clicking the key yields an exponent of 4, and so forth; a multi-click square root key such that double-clicking the key yields a cube root, triple clicking the key yields a 4th root, and so forth; and a variable shortcut key such that clicking the key once yields a particular variable, double-clicking the key yields a different variable, and so forth. In an embodiment, various features that are described farther above that may pertain to multi-click keys are applicable to these particular multi-click keys; for example, in an embodiment, when it is possible for a user's next action to cause a multi-click change to occur that pertains to one of these multi-click keys, the multi-click block will be distinctively highlighted; in an embodiment, the interface's decision whether or not to respond to a consecutive actuation of one of these multi-click keys with the key's multi-click effect is an alterable threshold decision that is an adaptive decision; and so forth.

In an embodiment, multi-click changes pertaining to the variable shortcut key are side-sliding changes as described in Chapter 8, so after a user has clicked the variable shortcut key a single time, the user will then be able to see in advance what other variables can be accessed by multi-clicking the variable shortcut key. In an embodiment, if a user holds down the variable shortcut key, a list of recently used variables will appear so that the user can select a variable from that list.

In addition to the multi-click keys previously disclosed in U.S. Pat. No. 8,788,548, new multi-click keys that may facilitate input of mathematical expressions are described below.

Alterable Automatic Exponents

U.S. Pat. No. 8,788,548 disclosed an interface with an automatic exponents feature such that if a user types a digit that is immediately after a variable, then the digit becomes an exponent, and if a user types a digit that is immediately after an exponent such that the exponent is a numeral and the exponent is immediately after a variable, then the digit is appended to the exponent. For example, in such an interface, if a user types the letter x and then the numeral 4, the interface will yield $x^4$ instead of x4. If the user then types the digit 2 after the expression $x^4$, the interface will yield $x^{42}$.

In an embodiment of the present invention, any interface decision to automatically convert a numeral after a variable into an exponent is an alterable decision such that altering this decision converts the exponent into a numeral that is not in an exponent. For example, in such an embodiment, after a user types the letter x and then the numeral 4, if the user alters the interface's decision to convert the numeral after the variable into an exponent, the result will be x4. As another example, in such an embodiment, after a user types the letter x and then the numeral 4 so that the interface has made an alterable decision to convert the numeral 4 into an exponent, if the user then types the digit 2, then the result thus far will be $x^{42}$ and the alterable block of the alterable decision will now include the entire numeral 42, so if the user then alters the decision, the result will be x42.

In an embodiment, such a decision has a low probability of alteration. In an embodiment, the alterable block of such a decision will consist of the variable followed by the numeral. In an alternative embodiment, the alterable block of such a decision will consist of only the numeral. In an embodiment, for purposes of the automatic decision variation feature, such a decision will have two distinct alterable blocks: one that consists of the variable followed by the numeral, and another that consists of only the numeral.

Interpolation of Differentials and Parentheses

In an embodiment, if the user's input includes an integral symbol that does not yet have a corresponding differential such as dx, then when a user types a plus sign or minus sign, if interpolating a differential before the plus sign or minus sign would cause the differential to appropriately correspond to such an integral symbol, then the interface will accordingly interpolate a differential. For example, if a user types ∫3+ then the interface will interpolate a differential because in the expression ∫ 3 dx+ the differential appropriately corresponds to the integral symbol, but if a user types ∫(3+ then the interface will not yet interpolate a differential because in the expression ∫(3 dx+ the differential does not appropriately correspond to the integral symbol.

In an embodiment, the interface will have a list of "common integration variables," which are variables that are commonly used as variables of integration; for example, such a list may include x, y, z, t, r, and θ. When the interface interpolates a differential as described in the preceding paragraph, if only one common integration variable is present in the user's input between the integral symbol and the input cursor location where the plus sign or minus sign will be inserted, then the interface will interpolate the "corresponding differential" for that variable, which is the differential that consists of the letter d immediately followed by the variable; for example, if a user types ∫ r+, then the interface will interpolate dr. If more than one common integration variable is between the integral symbol and the cursor location, then the interface will interpolate the corresponding differential for one of them, and its decision which corresponding differential to interpolate will be alterable; for example, if a user types ∫tx+, then the interface will alterably decide whether to interpolate dx or dt. If none of the common integration variables is between the integral symbol and the cursor location, the interface will alterably decide between corresponding differentials for all of the common integration variables, along with corresponding differentials for any and all variables that are between the integral symbol and the cursor location; for example, in an embodiment, if a user types ∫ n+, then the interface will alterably decide to interpolate dx by default, and this decision will have numerous alternate options corresponding to other differentials such as dn, dy, dz, and so forth.

In an embodiment, if the user's input includes multiple consecutive integral symbols such that none of them are yet followed by corresponding differentials, then when a user types a plus sign or minus sign, if interpolating multiple consecutive differentials before the plus sign or minus sign would cause them to appropriately correspond to these integral symbols, and if there are variables present in the user's input between the integral symbol and the input cursor location where the plus or minus symbol will be inserted such that the interface is able to recognize a commonly used set of the appropriate number of variables of integration, then the interface will accordingly interpolate an appropriate set of corresponding differentials. For example, in an embodiment, if a user types ∫∫$r^2$ sin θ+, then the interface will interpolate dr dθ, because dr dθ is a commonly used set of two consecutive differentials. If instead a user types ∫∫n+, then the interface will not interpolate multiple consecutive differentials because it does not recognize a commonly used set of two variables of integration.

In an embodiment, whenever actuating the plus key would cause the interface to interpolate one or more differentials as described above, those differentials constitute a pending optional interpolation for purposes of certain interface behaviors that are described in Chapter 8.

In an embodiment, when a user actuates the Enter key or any other key that indicates the user has finished typing mathematical input, if actuating the plus key would have caused the interface to interpolate one or more differentials as described above, then the interface will interpolate one or more differentials as though the user had actuated the plus key (but will not insert a plus sign). For example, in an embodiment, if a user types ∫ r and presses Enter, then the interface will convert this to ∫ r dr.

In an embodiment, when the interface interpolates one or more differentials as described above, its decision to do so is an alterable decision. In an embodiment, such a decision will have an alternate option such that instead of interpolating a differential the interface will insert a left parenthesis immediately after the integral symbol. In an embodiment, such a decision will also have an alternate option with a very low probability of alteration that corresponds to not interpolating anything. For example, in an embodiment, for example, if a user types ∫r+, then the interface will alterably decide to convert this to ∫r dr+, and altering the decision will yield ∫(r+, and altering it again will yield ∫ r+(which is syntactically invalid, but is exactly what the user typed).

In an embodiment, when the interface interpolates one or more differentials, if its decision to do so is an alterable decision as described in the preceding paragraph, and its decision regarding what differential or differentials to interpolate is also alterable as described above, then these decisions will be combined into a single alterable decision. For example, in an embodiment, if a user types ∫ tx+, then the interface will make an alterable decision with the default option ∫tx dx+ and the three alternate options ∫tx dt+, ∫(tx+, and ∫ tx+.

In an embodiment, if an integral symbol in the user's input has no corresponding differential, but there is a differential in the user's input such that if everything between the integral symbol and the differential were enclosed in parentheses then the differential would correspond to the integral symbol, then the interface will accordingly insert such parentheses, as an autocorrection. For example, if a user types ∫x+$e^x$ dx, the interface will convert this to ∫(x+$e^x$) dx, as an autocorrection. In an embodiment, such autocorrection decisions are alterable.

In an embodiment, when a user actuates the Enter key or any other key that indicates the user has finished typing mathematical input, if a Sigma symbol in the user's input is not immediately followed by a left parenthesis, and the user's input includes more than one term that is after the Sigma symbol, and one or more terms after the first such term include the index of summation, then the interface will insert a left parenthesis immediately after the Sigma symbol and a right parenthesis immediately after the last term that includes the index of summation, as an autocorrection. For example, if a user types $$\sum_{i=1}^{5} i^2 + i,$$

and presses Enter, then the interface will convert this to $$\sum_{i=1}^{5} (i^2 + i),$$

as an autocorrection. In an embodiment, such autocorrection decisions are alterable.

Ans Input Shortcuts

Certain prior art graphing calculators have an Ans key that causes the token "Ans" to be entered into the user's input, and when an expression containing the token Ans is evaluated, the token Ans is evaluated as equal to the value that resulted from the evaluation of the previous expression. For example, if a user enters 2+2 as a first expression to evaluate, then the result of evaluating this first expression is 4, and so if the user then enters Ans+3 as a second expression to evaluate, Ans will be evaluated as 4 and the result of evaluating this second expression will thus be 7.

In the interface of certain prior art graphing calculators, if a user starts a line of input by actuating an operator key that represents an operator that requires an operand on its left side, then the interface will respond as though the user pressed the Ans key before pressing the operator key. For example, if a user starts a line of input by actuating the plus key, the calculator will yield Ans+ instead of merely +. This feature is referred to herein as "the prior art Ans prefixing feature." The prior art HP Prime graphing calculator has a division key that causes a fraction to be created rather than causing the entry of an actual division sign operator, but for purposes of the prior art Ans prefixing feature the HP Prime treats this key as though it required an operand on its left side, so if a user starts a line of input by actuating the division key then the HP Prime will respond as though the user pressed the Ans key before pressing the division key, and will thus yield $$\frac{Ans}{\square}$$

instead of an empty fraction template.

In most math textbooks, negative signs and minus signs appear identical. For example, the negative sign at the beginning of the expression −2 −3 appears identical to the minus sign that is between the number −2 and the number 3. Even though negative signs and minus signs appear identical in textbooks, most prior art graphing calculators use distinct symbols for negative signs and minus signs, and have a negative key that is distinct from the minus key. As far as the present writer is aware, on such calculators, the major advantage of having a negative key that is distinct from the minus key pertains to the prior art Ans prefixing feature: on such calculators, a user who wishes to input Ans −3 may begin by pressing the minus key, and the calculator will respond as though the user pressed the Ans key before pressing the minus key; a user who wishes to input −2 −3 may instead begin by pressing the negative key, and then the calculator will not interpolate Ans.

Below, "the double-click Ans prefixing feature" is the interface behavior described in the following paragraph. Both the prior art Ans prefixing feature and the double-click Ans prefixing feature are "Ans prefixing features."

In an embodiment of the present invention, the interface does not have the prior art Ans prefixing feature, but if a user starts a line of input by twice consecutively actuating one of the four basic arithmetic operator keys (+, −, ×, or ÷) or any key that represents an operator that requires an operand on its left side, then the interface will respond as though the user actuated the Ans key once and then actuated the operator key once. For example, if a user starts a line of input by pressing the minus key twice, the resulting input will be Ans − instead of − −. In such an embodiment, it is thus possible for a user to rapidly input either −7 or Ans −7, for example, without any need for the interface to have a negative key that is distinct from the minus key. In an embodiment, if a user starts a line of input by actuating the fraction bar key once, then the interface will yield an empty fraction template $$\frac{\square}{\square}$$

with the cursor in its numerator; if the user then actuates the fraction bar key a second consecutive time, then the interface will convert the empty fraction template to $$\frac{Ans}{\square}$$

and move the cursor into the fraction's denominator.

In an embodiment, when a key actuation causes an Ans prefixing feature to be invoked, the interface's decision to invoke the Ans prefixing feature is an alterable decision such that altering this decision will cause the user's input to appear as though the key actuation had been processed without invoking the Ans prefixing feature. For example, if such an embodiment has the prior art Ans prefixing feature (and not the double-click Ans prefixing feature), then if a user starts a line of input by actuating the fraction bar key once, the interface will yield $$\frac{Ans}{\square};$$

if the user then actuates the alteration key, the interface will delete Ans and move the cursor into the fraction's empty numerator.

In an embodiment, when a key actuation causes an Ans prefixing feature to be invoked, if the user's next action is an actuation of the same key, then the interface will not handle this next key actuation normally, but will instead change the user's input to undo the invocation of the Ans prefixing feature caused by the previous keystroke. For example, if such an embodiment has the prior art Ans prefixing feature (and not the double-click Ans prefixing feature), then if a user starts a line of input by actuating the fraction bar key once, the interface will yield $$\frac{Ans}{\square};$$

if the user then actuates the fraction bar key a second consecutive time, the interface will delete Ans and move the cursor into the fraction's empty numerator.

In an embodiment, if a user starts a line of input by actuating the Enter key, then the interface will respond as though the user actuated the Ans key instead. For example, if such an embodiment is a calculator interface, and a user of this calculator interface types 2+2 as a first expression to evaluate and then actuates the Enter key twice consecutively, then the first actuation of the Enter key will cause the calculator to yield the answer 4 and move on to the next line, and the second actuation of the Enter key will cause the token Ans to be entered at the start of the next line of input. Such a feature may serve as a replacement for the prior art Ans prefixing feature or the double-click Ans prefixing feature, or may be in addition to an Ans prefixing feature.

In an embodiment, if the interface has a variable shortcut key as disclosed in U.S. Pat. No. 8,788,548, then the token Ans will be treated like a variable for purposes of the variable shortcut key. In such an embodiment, a user may input Ans by actuating the variable shortcut key a certain number of consecutive times rapidly, and when the token Ans is already present somewhere in the current expression and there are only a few other variables present in the current expression, a user may input Ans by actuating the variable shortcut key a certain number of consecutive times rapidly that will be no more than a few consecutive times.

Rapid Logarithm Base Input

Many prior art calculator interfaces that allow logarithm input have an ln key or key combination that is distinct from the log key or key combination. Some prior art calculator interfaces do not allow users to input a logarithm that has an explicitly specified base (such as $\log_2 8$); others allow users to input such a logarithm by choosing the $\log_{\square} \square$ template and filling in the blanks. The prior art TI-36X Pro has a special "multitouch" logarithm input key such that pressing the key once yields ln(, pressing the key a second consecutive time replaces ln(with log(, and pressing the key a third consecutive time replaces log(with $\log_{\square}(\square)$.

Prior art Zoom Math calculator apps do not have a special template for inputting a logarithm with an explicitly specified base. Instead, in certain Zoom Math apps it is always possible by various means to position the input cursor at the location after any occurrence of the identifier "log" where a subscript would belong, so a user may always cause a previously typed logarithm to have an explicitly specified base simply by inputting a subscript in the appropriate location. Conversely, in Zoom Math apps, if a user deletes any subscript after an occurrence of the identifier "log" and moves the cursor away from the location where the subscript was, the logarithm will become a common logarithm without an explicitly specified base, with no empty box and no other indication that a subscript is missing. Similarly, in an embodiment of the present invention, when the identifier "log" is not followed by a subscript, if the input cursor becomes positioned between the identifier "log" and the following space character, then an empty subscript will be created at that location and the input cursor will be moved into the subscript; and whenever the input cursor is moved out of a subscript that is still empty, the empty subscript will be deleted.

In the present specification, a "base-specific logarithm identifier" consists of either the identifier log along with an optional following subscript or the identifier ln (natural logarithm). In an embodiment, the interface will maintain in memory a list of the base-specific logarithm identifiers that were used most recently, arranged in a sequence from the most recently used to the least recently used, up to a maximum number of base-specific logarithm identifiers, such as five. In an embodiment, any base-specific logarithm identifier will be removed from such a list when it has not been used sufficiently recently; for example, in an embodiment, a base-specific logarithm identifier will be removed from such a list when it both has not been used within the past 10 lines of input and has not been used within the past 24 hours. As an exception, in an embodiment, both the identifier log with no following subscript and the identifier ln will initially be included in such a list and will never be removed from such a list even when they have not been used recently, so when they have not been used recently, they will be included at the end of the list.

In an embodiment, in response to a first actuation of the log key, the interface will enter into the user's input the first base-specific logarithm identifier from the list of recently used base-specific logarithm identifiers, along with a trailing space. For example, in such an embodiment, if a user wishes to type the expression $\log_2 32+\log_2 8$ and has already typed $\log_2 32+$, then the user can finish typing the expression by actuating the log key and then the 8 key, without any need to type the subscript 2 again.

In an embodiment, after a first actuation of the log key, the interface's decision to respond with the first base-specific logarithm identifier from the list of recently used base-specific logarithm identifiers is an alterable interface decision, and each of the other base-specific logarithm identifiers in that list is an alternate option of that decision. For example, in an embodiment, if a user has recently typed $\log_2$, and the user has not recently typed any other base-specific logarithm identifiers, then in response to a first actuation of the log key the interface will alterably decide to yield $\log_2$, and the alternate options of that decision will be log and ln.

In an embodiment, in response to a second consecutive actuation of the log key, the interface will delete the base-specific logarithm identifier that was entered in response to the first actuation of the log key, and will delete the corresponding alterable interface decision, and will enter into the user's input the identifier log followed by an empty subscript with the input cursor in the subscript. In other words, in such an embodiment, double-clicking the log key will yield the identifier log with the input cursor in its subscript. In an embodiment, the interface's decision to respond to the log key with this special double-click effect is an alterable decision such that altering this decision will yield two consecutive occurrences of the identifier "log"; in an embodiment, such a decision has a very low probability of alteration.

In an embodiment, additional consecutive actuations of the log key after the second consecutive actuation will cause the interface to cycle through base-specific logarithm identifiers from the list of recently used base-specific logarithm identifiers: actuating the log key three times consecutively will yield the second base-specific logarithm identifier from the list, actuating the log key four times consecutively will yield the third base-specific logarithm identifier from the list if the list includes at least three items or the first one otherwise, and so on.

In an embodiment, whenever a user inputs an exponential expression whose base is e or any positive integer, the base-specific logarithm identifier corresponding to that exponential expression's base will be added to the list of recently used base-specific logarithm identifiers. For example, when a user types $e^x$, In will be added to the list of recently used base-specific logarithm identifiers; when a user types $2^n$, $\log_2$ will be added to the list. Additionally, in an embodiment, whenever a user inputs an expression that the interface identifies as a calculus-related expression (such as, in an embodiment, any expression that contains an integral symbol), In will be added to the list of recently used base-specific logarithm identifiers.

In light of the above discussion of embodiments such that logarithm input can take advantage of both multi-click functionality and alteration functionality, other similar ways of configuring an interface to facilitate logarithm input may become evident to those of ordinary skill in the art. For example, in an alternative embodiment, a log key behavior interface setting determines whether the log key is configured so that actuating the log key repeatedly cycles through recently used base-specific logarithm identifiers as described above, or whether the log key is instead configured so that actuating the log key once, twice, or three times consecutively yields ln, log, or $\log_{\square}$ □ (respectively), and the interface's response to a first actuation of the log key is an alterable decision such that altering the decision will change the log key behavior interface setting and will accordingly retroactively change the result yielded by that first actuation of the log key.

In an embodiment, if a user manually inputs $\log_e$, then as soon as the input cursor is not in the logarithm's subscript the interface will replace $\log_e$ with ln. In an embodiment, the interface's decision to thus replace $\log_e$ with ln will be an alterable decision with a very low probability of alteration. In an embodiment, if the input cursor becomes positioned between the identifier "ln" and the following space character, then the interface will replace In with $\log_e$ and the input cursor will be positioned in that subscript, after the letter e.

Alterable Automatic Logarithm Base Exiting

In certain prior art Zoom Math calculator apps, when the input cursor is in a subscript after the identifier "log," if the user types a letter or a digit other than 1, then the interface will place that character in the logarithm's subscript and then automatically move the input cursor out of the subscript. If instead the user types the digit 1 in the subscript, the interface will place that digit in the logarithm's subscript and will enter a bipositional entry mode, so that if the next key the user presses is a digit then the interface will also place that digit in the logarithm subscript and then automatically move the input cursor out of the subscript, but if the next key the user presses is any other character then the interface will first automatically exit the subscript and then place that character after the subscript.

In an embodiment of the present invention, after a user types a character in a subscript of a logarithm, if the subscript then consists of a single letter or a positive integer between 2 and 19 inclusive, then the interface will automatically move the input cursor out of the subscript of the logarithm. In an embodiment, after a user types a character in a subscript of a logarithm, if the subscript then consists of a single digit followed by a forward slash character followed by a single letter or a positive integer between 2 and 19 inclusive, then the interface will automatically move the input cursor out of the subscript of the logarithm. For example, in an embodiment, if the input cursor is in an empty subscript of a logarithm and a user types 1/2, then after the user types the digit 2 the interface will automatically move the input cursor out of the subscript of the logarithm.

In an embodiment, the interface's decision to automatically move the input cursor out of the subscript of a logarithm is a potentially alterable decision: initially, while the decision has had no effect on the user's input, it is not an alterable decision and has no alternate options, but whenever the decision has any alternate options as described in the following paragraphs, it is an alterable decision. Such a potentially alterable decision will be referred to as a "base exiting decision." In an embodiment, when the interface automatically moves the input cursor out of a subscript of a logarithm, the interface enters "base exiting re-examination mode." While the interface is in base exiting re-examination mode, alternate options may be added to a base exiting decision; when the interface is not in base exiting re-examination mode, if a base exiting decision has no alternate options, then that decision will be deleted.

In the following paragraphs, a "typical log base" consists of either a positive integer or a fraction whose numerator and denominator are both positive integers (such as 1/2). A "transitional log base" consists of a fraction whose numerator is a positive integer and whose denominator is empty (such as 1/). An "atypical log operand" consists of any operand of a logarithm that either begins with the digit 0 immediately followed by another digit or begins with an atypical log operand first character. In the preceding sentence, an "atypical log operand first character" is any character that is very rarely the first character of the operand of a logarithm: in particular, a plus sign is an atypical log operand first character and a minus sign is an atypical log operand first character; other atypical log operand first characters will be evident to those of ordinary skill in the art.

In an embodiment, while the interface is in base exiting re-examination mode, when the user actuates a key, if the sequence of all keystrokes after the interface automatically moved the input cursor out of the subscript of the logarithm is such that had the interface not moved the input cursor out of the subscript then the logarithm's base would now be a typical log base or a transitional log base, then an alternate option will be added to the base exiting decision such that the alternate option corresponds to the result that would have obtained had the interface not moved the input cursor out of the subscript until after the most recent keystroke (unless the base exiting decision already has such an alternate option). Otherwise, the interface will exit base exiting re-examination mode. For example, if the input cursor is in an empty subscript of a logarithm and a user types 248, then the result will be $\log_2 48$ and the base exiting decision will now have the alternate options $\log_{24} 8$ and $\log_{248}$, and the interface will still be in base exiting re-examination mode.

In an embodiment, whenever selecting an alternate option of a base exiting decision would cause the operand of a logarithm to become an atypical log operand, that alternate option will be deleted. For example, if the input cursor is in an empty subscript of a logarithm and a user types 24, then the result will be $\log_2 4$ and the base exiting decision will then have the alternate option $\log_{24}$, but if the user then types a plus sign so that the result is $\log_2 4+$ then that alternate option will be deleted.

In an embodiment, whenever an operand of a logarithm is an atypical log operand, if altering a base exiting decision could cause that operand to no longer be an atypical log operand, then the interface will automatically alter the base exiting decision accordingly. In an embodiment, as an exception to the behavior described in the preceding paragraph, if the interface automatically alters a base exiting decision so that the option that was formerly the default option is now an alternate option of the base exiting decision, the interface will not delete that option even if selecting that option would cause the operand of a logarithm to become an atypical log operand. For example, in an embodiment, if the input cursor is in an empty subscript of a logarithm and a user types 204, then the result will be $\log_{20} 4$ and the base exiting decision will then have the alternate options $\log_2 04$ and $\log_{204}$.

In an embodiment, while the interface is in base exiting re-examination mode, if a user actuates the right arrow key in circumstances such that this actuation of the right arrow key would ordinarily have no effect, and if the previous keystroke added an alternate option to the base exiting decision, then the interface will automatically alter that decision so as to select that alternate option. For example, if the input cursor is in an empty subscript of a logarithm and a user types 24, then the result will be $\log_2 4$, but if the user's next action is an actuation of the right arrow key that would otherwise have no effect then the interface will automatically alter the base exiting decision, yielding the result $\log_{24}$.

In an embodiment, if after the interface enters base exiting re-examination mode the user's next action is an actuation of the fraction bar key that causes the interface to create an empty fraction template with the input cursor in its numerator, then if the input cursor subsequently becomes located in that fraction's denominator, then the interface will delete every alternate option of the base exiting decision such that the logarithm's base would include a fraction or forward slash character. For example, if the input cursor is in an empty subscript of a logarithm and a user types the keystroke sequence 2/3, then at that point the result will be $$\log_2 \frac{3}{\square}$$

and the base exiting decision will have the alternate option $\log_{2/3}$; If the user's next action is an actuation of the down arrow key, then that alternate option will be deleted and so the base exiting decision will be deleted.

In an embodiment, if after the user actuates the fraction bar key the interface is in base exiting re-examination mode and then the next keystroke is another actuation of the fraction bar key, then the interface will exit base exiting re-examination mode and will alter the base exiting decision so that the alternate option that was added to the base exiting decision in response to that actuation of the fraction bar key becomes selected. For example, if the input cursor is in an empty subscript of a logarithm and a user types 2//, then after the first actuation of the fraction bar key the result will be $$\log_2 \frac{\square}{\square},$$

and after the second actuation of the fraction bar key the result will be $\log_{2/}$. In an embodiment, after such an alteration occurs, if the next keystroke is yet another actuation of the fraction bar key, then the interface will undo the effect of the keystroke that occurred just before that keystroke; thus, in such an embodiment, a user can toggle between two alternatives by repeatedly actuating the fraction bar key.

In an embodiment, if after the user actuates the fraction bar key the interface is in base exiting re-examination mode and then the next keystroke causes the interface to exit base exiting re-examination mode, and that keystroke is not another actuation of the fraction bar key, then the interface will delete any alternate option that was added to the base exiting decision in response to that actuation of the fraction bar key. For example, if the input cursor is in an empty subscript of a logarithm and a user types 2/x, then after the actuation of the fraction bar key the base exiting decision will have the alternate option $\log_{2/}$, but after the actuation of the x key the interface will exit base exiting re-examination mode and that alternate option will be deleted and so the base exiting decision will be deleted.

In an embodiment, if a base exiting decision is altered so that an option becomes selected such that the logarithm's base is a fraction that has an empty denominator, then as a side effect of that alteration, the interface will move the input cursor into the empty denominator; then if the user's next action causes the same decision to be altered so that option is no longer selected, the interface will restore the input cursor to its previous location. For example, if the input cursor is in an empty subscript of a logarithm and a user types 2/ so that the base exiting decision has the alternate option $\log_{2/}$, and the user then alters the base exiting decision so that option becomes selected, then the interface will move the input cursor back into the logarithm's base so the user can type the denominator.

In an embodiment, the probability of alteration of a base exiting decision will be low. In an embodiment, for each alternate option of a base exiting decision, the more characters are in the logarithm's base in that alternate option, the lower its probability of alteration will be; that is, if a user repeatedly alters a base exiting decision, the alternate option with the fewest characters in the logarithm's base will be selected first and the alternate option with the most characters in the logarithm's base will be selected last.

Chapter 42: Mathematical Structures

Mathematical Structures

In the present specification, "textbook notation" refers to mathematical notation as it is typically found in mathematical textbooks in the United States. Specifically, when a fraction is written in "textbook notation," the fraction consists of a horizontal fraction bar, a numerator that is above the horizontal fraction bar, and a denominator that is below the horizontal fraction bar. When a square root is written in "textbook notation," the square root symbol includes a horizontal vinculum that extends above the radicand of the square root. When an exponent is written in "textbook notation," it is written with superscript formatting. For example, the expression $$\frac{x+1}{x+2} - \sqrt{x+2} - x^2$$

includes a Traction, a square root, and an exponent that are all written in textbook notation. Those of ordinary skill in the art will also be familiar with the way in which other mathematical expressions are written in textbook notation, such as mathematical expressions that include integrals, summations, etc.

Many mathematical expressions, when written in textbook notation, have characteristics that are not common to most non-mathematical printed English text. Typically, a portion of non-mathematical printed English text is written as a sequence of characters arranged in lines from left to right. Typically, if a character of non-mathematical English text is directly above another character of non-mathematical English text, there is no close relationship between these two characters: each character is a portion of a distinct line of text, and their proximity is of no significance. Many mathematical expressions, on the other hand, when written in textbook notation, include characters and symbols that are directly above or below other characters or symbols that they are closely related to. For example, the fraction one half, when written as the English text "one half," is expressed as a sequence of characters arranged from left to right; but the same fraction, when written in textbook notation as $$\frac{1}{2},$$

is expressed as a numeral 1 that is directly above a fraction bar that is directly above a numeral 2. Thus, this fraction, when written in textbook notation, does not merely consist of a sequence of characters arranged in lines from left to right: its characters are arranged vertically. In addition to fractions, many other types of mathematical expressions, when written in textbook notation, make use of vertical relationships between characters and symbols. For example, the two distinct mathematical expressions $\sqrt{x+2}$ and $\sqrt{x}+2$ are visually distinguished by the fact that the plus sign and the numeral 2 in the former expression are vertically below the vinculum of the square root symbol, but the plus sign and the numeral 2 in the latter expression are not vertically below the vinculum of the square root symbol.

In the present specification, a "mathematical structure" is a portion of a mathematical expression that has special formatting that has syntactic significance. For example, an exponent that is written in textbook notation is delineated by superscript formatting, and so an exponent that is written in textbook notation is a mathematical structure. Fractions and square roots are also mathematical structures when written in textbook notation.

Mathematical Structure Input

Some prior art interfaces that allow users to input mathematical expressions do not allow users to do so in the standard mathematical notation that is typically encountered in textbooks. For example, in some interfaces, rather than inputting a $$\frac{1}{2}+x^2+\sqrt{2}+\log_2 8,$$

user would be required to input 1/2+x^2+√(2)+log 2(8). Other prior art interfaces have special functionality to facilitate inputting mathematical expressions in textbook notation. In particular, various prior art calculator interfaces allow users to input mathematical expressions such as $$\frac{1}{2}+x^2+\sqrt{2}+\log_2 8$$

in textbook notation.

Many prior art math input interfaces rely heavily on templates for input of mathematical structures. For example, the equation entry interface within Microsoft Word relies heavily on templates for input of mathematical structures, and so do the interfaces of various graphing calculators. Generally, in such interfaces, in order to input a particular mathematical structure and its contents, a user must insert the appropriate empty mathematical structure template, then input its contents, and then move the input cursor out of the template if the user wishes to type anything else after the mathematical structure. Also, in some prior art math input interfaces, in order to input a fraction mathematical structure with its contents, a user must insert an empty fraction template, then input the numerator, then move the input cursor into the empty denominator, then input the denominator, and then move the input cursor out of the denominator if the user wishes to type anything else after the fraction.

In some prior art math input interfaces (including the multimode math input interface mentioned in the following paragraph), when a user presses the fraction creation key and the interface creates a new fraction, the new fraction will not necessarily be an empty fraction template. Instead, before creating the new fraction, the interface will determine what if anything would constitute the dividend of the division operator if a division operator were inserted into the user's input at the input cursor location, and if such a potential dividend exists then the interface will include that potential dividend in the numerator of the new fraction and will move the input cursor into the denominator of the new fraction. In such an interface, in many cases, in order to input a fraction mathematical structure with its contents, a user may input the numerator, then press the fraction creation key, then input the denominator, and then move the input cursor out of the denominator if the user wishes to type anything else after the fraction.

A multimode math input interface is disclosed in U.S. Pat. No. 8,788,548. In a multimode math input interface, when the input cursor is within and at the end of a mathematical structure, in certain circumstances the interface may be in a special bipositional entry mode such that if the user types a digit while the interface is in the bipositional entry mode then the digit will be included within the mathematical structure, but if the user types a plus sign or minus sign while the interface is in the bipositional entry mode then the interface will automatically exit the mathematical structure and put the plus sign or minus sign that was typed outside of the mathematical structure, to the right of the mathematical structure. If the user types some other character while the interface is in a bipositional entry mode, the interface may or may not automatically exit the mathematical structure, depending both on the character that the user typed and the particular bipositional entry mode that the interface is in. For example, the keystroke sequence consisting of the 3 key, the exponent creation key, the 1 key, the 0 key, and then the plus key will yield the result $3^{10}$+. In a multimode math input interface, in many cases, in order to input a fraction mathematical structure with its contents, a user may input the numerator, then press the fraction creation key, and then input the denominator, with no need to perform any explicit cursor navigation actions even if the user wishes to type something else after the fraction. For example, in such an interface, a user may type $$\frac{1}{2}+\frac{1}{3}$$

using just seven keystrokes, without ever using an arrow key to move the input cursor.

When a multimode math input interface is in a bipositional entry mode, the input cursor may be placed in a special location, such as partly within the mathematical structure, in order to visually indicate that the next character that is entered may or may not be placed within the mathematical structure. For example, in a certain embodiment of a multimode math input interface, if a user types the keystroke sequence 1/2, then the interface will display the mathematical structure $$\frac{1}{2}$$

and the input cursor will be located to the right of the fraction and vertically aligned with the fraction's denominator in order to visually indicate that the next character that is entered may either be appended in the fraction's denominator or be appended to the right of the fraction. If the user then actuates the plus key, the interface will move the cursor so that it is fully and unambiguously outside of the fraction's denominator and will append the plus sign after the fraction.

Mathematical Structure Mistakes

In some cases, a user of a math input interface may forget a particular keystroke that is necessary in order to distinguish the boundaries of a particular mathematical structure. In an interface that is not a multimode math input interface, a user may forget to explicitly move the input cursor to exit a mathematical structure when necessary, so for example a user who wishes to type $\sqrt{4}+5$ may accidentally type $\sqrt{4+5}$ instead. Conversely, in an interface that is a multimode math input interface, a user may forget to prevent the interface from automatically exiting a mathematical structure, so for example a user who wishes to type $\sqrt{4+5}$ may accidentally type $\sqrt{4}+5$ instead.

On a prior art TI-84 Plus Silver Edition C graphing calculator running OS 4.0, when the input cursor is at the end of a non-empty denominator, a non-empty square root, or a non-empty exponent, the input cursor changes from a blinking solid black rectangle to a blinking black rectangle that has a white right arrow symbol superimposed on it. This modified cursor serves as a reminder to the user that the user must actuate the right arrow key in order to exit the mathematical structure if the user wishes to type anything else after the mathematical structure. This modified cursor may reduce the probability that a user will neglect to actuate the right arrow key when necessary, but will not entirely eliminate the possibility that a user will neglect to actuate the right arrow key when necessary.

In an interface that has a fraction creation key that is not a fraction bar key as defined in Chapter 41, a user may forget that it is necessary to create an empty fraction template before typing a fraction's numerator. For example, a user who wishes to type $$\frac{1}{2}$$

may press the 1 key first rather than pressing the fraction creation key first. In an interface that has a fraction bar key, a user may type an expression that includes multiple terms that the user intends to become the numerator of a new fraction, and then the user may press the fraction bar key with the expectation that the newly created fraction will have that entire expression as its numerator, but when the user presses the fraction bar key the interface will move only the term that immediately precedes the input cursor into the new fraction's numerator. For example, a user who wishes to type $$\frac{x+1}{2}$$

may type x+1 and then press the fraction bar key with the expectation that the result thus far will be $$\frac{x+1}{\square},$$

but instead the result will be $$x+\frac{1}{\square}.$$

In various embodiments, the present invention will include one or more features that facilitate modifying mathematical structures so as to efficiently correct the kinds of mathematical structure mistakes that are described in the preceding two paragraphs. Below, the present specification will define specific terms pertaining to structure modifications; after that, the present specification will explain various features that facilitate structure modifications, along with other features that facilitate inputting mathematical structures.

Mathematical Structure Terminology

In an embodiment, for purposes of the interface behaviors described herein, the terms "mathematical text," "mathematical expression," and "expression" may refer to any contiguous portion of mathematical input entered by a user of a math input interface, whether or not such a contiguous portion of mathematical input is syntactically valid when considered in isolation. For example, if the user has typed "3+4," then the text 3+ is a mathematical expression. In an embodiment, for purposes of the interface behaviors described herein, the term "mathematical expression" may refer to a single character, but will not refer to empty text.

In an embodiment, the "first portion of a mathematical structure" consists of the portion of that structure that a user may type before pressing the key that causes the mathematical structure to be created and that may then automatically become part of the mathematical structure when the mathematical structure is created, if any such portion exists. In particular, in a math input interface that has a fraction bar key, the first portion of a fraction consists of the fraction's numerator, because when a user presses the fraction bar key, a mathematical expression that the user typed before pressing the fraction bar key may automatically become the new fraction's numerator. Many mathematical structures do not have first portions; for example, square roots and exponents do not have first portions.

In an embodiment, the "last portion of a mathematical structure" consists of the portion of that structure that a user will typically type after creating the mathematical structure, and after any cursor navigation that involves moving between different portions of the mathematical structure, if any such portion exists. For example, the last portion of a fraction is its denominator. The last portion of a square root consists of the entire radicand (but does not include the square root symbol itself); the last portion of the exponent 2 consists of the entire numeral 2.

In an embodiment, a "portion of a mathematical structure" is a first portion of a mathematical structure, or a last portion of a mathematical structure, or any similar distinct subsection of a mathematical structure within which a user can input mathematical text.

Below, the present specification discusses various means of expediting the entry and editing of fractions that are written in textbook notation, in some embodiments. Generally, except as otherwise specified, any reference to a "fraction" refers to a fraction that is written in textbook notation, and is thus a mathematical structure according to the definition used in the present specification. Thus, except as otherwise specified, a "fraction" consists of a horizontal fraction bar along with its numerator and denominator. A "numerator" is the mathematical expression immediately above a fraction bar if such an expression is present, or the space above the fraction bar if no mathematical expression is immediately above the fraction bar. If no mathematical expression is immediately above the fraction bar, the fraction will be said to have an "empty numerator." A "denominator" is the mathematical expression immediately below the fraction bar if such an expression is present, or the space below the fraction bar if no mathematical expression is immediately below the fraction bar. If no mathematical expression is immediately below the fraction bar, the fraction will be said to have an "empty denominator." However, Chapter 45 specifies circumstances where a "fraction" is not written in textbook notation and is not a mathematical structure, in an embodiment.

In the present specification, when an example is given of a fraction that has an empty numerator or empty denominator, the empty numerator or denominator will be visually indicated by an empty box, as in this example:

$$\frac{1}{\square}.$$

Such empty boxes are included in the present specification for clarity. It is to be understood that in various embodiments, the interface may actually use such an empty box as a visual indicator of an empty numerator or empty denominator, or may provide a different visual indicator for an empty numerator or empty denominator, or may leave an empty numerator or empty denominator entirely blank with no visual indicator at all.

Below, in descriptions of structure modification features, when any character, symbol, structure, or location is said to be "before" or "after" some other character, symbol, structure, or location, or when a character, symbol, structure, or location is said to be "between" two other characters, symbols, structures, or locations, it is to be understood that in an embodiment, for purposes of structure modification features, the characters, symbols, structures, and locations within a mathematical expression are considered to be in the sequence in which they would typically be written by hand. Therefore, a character that is said to be "before" some other character is not necessarily to the left of that other character. In particular, a fraction's numerator is considered to be before its fraction bar, which is before its denominator. A square root symbol is considered to be before the square root's radicand. For example, even though a portion of the square root symbol in the expression $\sqrt{x+1}-2$ extends farther to the right than the letter x, the square root symbol is still considered to be before the letter x. In an embodiment, for purposes of structure modification features, when a mathematical expression is displayed on multiple lines due to wordwrap or an analogous feature, everything on an upper line is considered to be before everything on a lower line. For example, even if a line break occurs between the square root and the minus sign in the expression $\sqrt{x+1}-2$ and so the minus sign is farther to the left than the square root, the minus sign is still considered to be after the square root, and is still considered to be between the square root and the numeral 2.

In an embodiment, for purposes of structure modification features, distinct mathematical expressions that are included within the same larger mathematical expression are said to be "separated" from each other if and only if one of the expressions is within a portion of a mathematical structure that the other expression is not within. For example, in the expression $\sqrt{(5}-6)$ the parentheses are separated from each other because the left parenthesis is within a radicand that the right parenthesis is not within. If a structure modification is said to "separate" two or more mathematical expressions, this means that the structure modification moves one or more of these expressions into or out of a portion of a mathematical structure without moving all of them into or out of that portion of a mathematical structure.

Chapter 43: Structure Modifications

Application to Other Types of Mathematical Structures

Below, in the explanation of various means of structure modification, numerous examples will be provided of structure modifications that move mathematical text into or out of fractions, square roots, and exponents, in some embodiments. Fractions, square roots, and exponents are used in these examples because fractions, square roots, and exponents are among the most commonly encountered types of mathematical structures. Previously, in the specification of U.S. Pat. No. 8,788,548, a feature was described that may cause an interface to automatically exit a fraction, square root, or exponent in certain circumstances; a nearly identical feature will be referred to as "the automatic structure exiting feature" in the present specification.

In light of the following explanation of various means of structure modification, those of ordinary skill in the art will understand how to generalize any means of structure modification that can move mathematical text into or out of fractions, square roots, and exponents so as to also be able to move mathematical text into or out of other types of mathematical structures that are not fractions, square roots, or exponents. For example, cube roots are very similar to square roots, and any example of a structure modification that moves mathematical text into or out of a square root is obviously analagous to an example that moves mathematical text into or out of a cube root. Likewise, any example of a structure modification that moves mathematical text into or out of an exponent is obviously analagous to an example that moves mathematical text into or out of a subscript. Furthermore, those of ordinary skill in the art will understand that the automatic structure exiting feature may also be applied to other types of mathematical structures that are not fractions, square roots, or exponents.

For many types of mathematical structures, including square roots, each mathematical structure of that type will consist of a special symbol denoting the mathematical structure and a "last portion of the mathematical structure" as defined above, and nothing else. For any such type of mathematical structure, each means of structure modification described herein may be useful if it moves mathematical text into or out of a last portion of a mathematical structure. For any such type of mathematical structure, the automatic structure exiting feature may be applicable, in an embodiment.

For a few types of mathematical structures, most notably including fractions, each mathematical structure of that type will have a "first portion of the mathematical structure" as defined above. Below, various means of structure modification are described that move mathematical text into or out of a numerator, in some embodiments. Such means of structure modification are described herein in terms of moving mathematical text into or out of a numerator because numerators are the most common type of "first portion of a mathematical structure." However, those of ordinary skill in the art will understand how to generalize any such means of structure modification so as to also be able to move mathematical text into or out of any first portion of a mathematical structure, not just a numerator. For example, ${}_5C_2$ can be verbally described as "5 choose 2." In an embodiment, the expression ${}_5C_2$ is treated as a single mathematical structure such that the numeral 5 is its first portion and the numeral 2 is its last portion, and for each means of structure modification described herein that can move mathematical text into or out of a numerator, the same means of structure modification or an analogous means of structure modification can move mathematical text into or out of the subscript that precedes the letter C in an expression such as ${}_5C_2$.

Even in an embodiment that has structure modification features that are described herein, a type of mathematical structure may exist that does not have a first portion or a last portion as defined above, and even for any type of mathematical structure that does have a first portion and/or last portion, the structure modification features that are described herein do not necessarily need to be applied to that type of mathematical structure, and the automatic structure exiting feature does not necessarily need to be applied to that type of mathematical structure either. For example, in an embodiment, the expression ${}_5C_2$ is a mathematical structure that has a first portion and a last portion, but none of the structure modification features described herein apply to that type of mathematical structure, and the interface does not automatically exit that type of mathematical structure.

Structure Modification Nomenclature

Farther below, various features are described that may move mathematical text into and/or out of mathematical structures, in some embodiments. Specifically, such features may cause the interface to perform "structure modifications" as defined herein. Specific terms that are used for structure modifications may indicate the target, direction, complexity, desirability, and size of the structure modifications, as explained in the following paragraphs.

In an embodiment, the target of a structure modification is either a first portion of a mathematical structure (usually a numerator) or a last portion of a mathematical structure. The direction of a structure modification is either expansion or contraction: that is, a structure modification eithers moves mathematical text into the target portion of a mathematical structure or moves mathematical text out of the target portion of a mathematical structure. Therefore, every structure modification may be classified as a "numerator expansion" which moves mathematical text into the first portion of a mathematical structure, a "numerator contraction" which moves mathematical text out of the first portion of a mathematical structure, a "structure expansion" which moves mathematical text into the last portion of a mathematical structure, or a "structure contraction" which moves mathematical text out of the last portion of a mathematical structure.

(Although a numerator expansion may be referred to in the present specification as a "structure modification," a numerator expansion generally will not be referred to as a "structure expansion," because a "structure expansion" is defined to be a structure modification that expands the last portion of a mathematical structure, and a numerator is not a last portion of a mathematical structure. Likewise, a numerator contraction generally will not be referred to as a "structure contraction.")

In an embodiment, in some cases, a structure modification will affect another mathematical structure in addition to its primary target. In some cases, a structure modification that affects two mathematical structures may be classified as either a numerator expansion or a structure contraction depending on which of the two mathematical structures is viewed as the primary target of the structure modification. In other cases, a structure modification that affects two mathematical structures may be classified as either a structure expansion or numerator contraction depending on which of the two mathematical structures is viewed as the primary target of the structure modification.

Some structure modifications change the contents of only a single mathematical structure; other structure modifications are more complex. In an embodiment, every structure modification will be classified as a "simple structure modification," "interchanging structure modification," "compound structure modification," or "improper structure modification." These terms are defined below. In an embodiment, any change that does not fit into any of these four classifications as described below does not constitute a "structure modification" for purposes of the structure modification functionality that is described herein, even if it is a change that could be achieved by performing consecutive structure modifications. For example, in an embodiment, converting $$\sqrt{1+2}+\frac{3}{4} \text{ to } \sqrt{1}+\frac{2+3}{4}$$

is not a structure modification of any kind, even though it could be achieved by performing a simple structure contraction and then a simple numerator expansion.

In an embodiment, a structure modification that is possible may still produce a result that a user is relatively unlikely to desire, such as if the structure modification introduces a mathematical syntax error. Farther below, criteria are defined for classifying possible structure modifications as either "valid" or "invalid"; valid structure modifications are further classified as "normal" or "abnormal."

Sorting Structure Modifications by Size

In some cases, a larger structure modification may be described herein as consisting of a sequence of smaller structure modifications. When a larger structure modification is described in this way, this means that in an embodiment, the larger structure modification achieves the result that would be achieved if each of the smaller structure modifications were performed in sequence, regardless of whether the larger structure modification achieves this result by means of actually performing each of the smaller structure modifications in sequence or whether it achieves this result by a more direct means. For example, after the present specification explains how moving a single character from before a fraction into the fraction's numerator constitutes a "simple numerator expansion," the present specification says, "Any sequence of two or more simple numerator expansions of the same numerator is itself a simple numerator expansion." This means that in an embodiment, moving two or more characters from before a fraction into the fraction's numerator is a simple numerator expansion, regardless of whether this result is achieved by moving the characters one at a time in sequence or by moving the characters simultaneously.

Below, the "smallest possible numerator expansion" is defined for various circumstances. Generally, in an embodiment, every possible expansion of a given numerator in any given circumstances that is not the smallest possible expansion of that numerator consists of performing a smallest possible expansion of that numerator some particular number of consecutive times. (However, as is explained in the preceding paragraph, an expansion of a given numerator that is not the smallest possible expansion of that numerator need not necessarily be achieved by means of actually performing these smallest possible numerator expansions one at a time.)

In an embodiment, a possible expansion of a numerator is considered to be "smaller" than another possible expansion of that numerator if it consists of fewer consecutive smallest possible expansions of that numerator. For example, the numerator expansion that converts $$-1+\frac{3}{4} \text{ to } -\frac{1+3}{4}$$

consists of two consecutive smallest possible numerator expansions, and the numerator expansion that converts $$-1+\frac{3}{4} \text{ to } \frac{-1+3}{4}$$

consists of three consecutive smallest possible numerator expansions, so the former numerator expansion is smaller than the latter.

In an embodiment, for any two distinct possible expansions of the same numerator, it will be the case that one of the possible numerator expansions is considered to be smaller than the other. This means that expansions of a particular numerator can be sorted by size, and it is thus possible to determine the "smallest" expansion of a particular numerator that fits certain criteria. Similarly, it will also be possible to determine the smallest contraction of a particular numerator that fits certain criteria, or the smallest expansion of a particular structure that fits certain criteria, or the smallest contraction of a particular structure that fits certain criteria. Various features that perform structure modifications will be described in such terms: for example, a numerator initialization key is described in Chapter 44 such that in certain circumstances an actuation of the numerator initialization key causes the interface to perform the smallest expansion of a particular numerator that is a "valid" structure modification as defined below.

In an embodiment, in order to determine the smallest numerator expansion of a particular numerator that fits certain criteria, the interface will first determine whether or not the smallest possible numerator expansion fits the criteria, and if it does not then the interface will determine whether or not the numerator expansion that consists of twice consecutively performing the smallest possible numerator expansion fits the criteria, and then it will check the numerator expansion that consists of three times consecutively performing the smallest possible numerator expansion, and so on, until either the interface finds a possible numerator expansion that fits the criteria, or until no more numerator expansions are possible. For example, in order to determine the smallest valid numerator expansion of the numerator in the expression $$(1+2)+\frac{3}{4},$$

the interface may first determine that the numerator expansion that would convert the expression to $$(1+2)\frac{+3}{4}$$

is not valid, and then determine that the numerator expansion that would convert the expression to $$\left(1+2\frac{)+3}{4}\right.$$

is not valid, and so on, until eventually it determines that the numerator expansion that would convert the expression to $$\frac{(1+2)+3}{4}$$

is valid; since no smaller numerator expansion was valid, this is the smallest valid numerator expansion. Those of ordinary skill in the art will understand that various other means are possible for determining the smallest numerator expansion that fits certain criteria; for example, an algorithm that determines the smallest valid numerator expansion can be made more efficient by causing it to skip any numerator expansion that would move a right parenthesis into a numerator without moving its corresponding left parenthesis, since any such numerator expansion would be invalid anyway. Similarly, those of ordinary skill in the art will understand that the interface can determine the smallest structure expansion of a particular last portion of a mathematical structure that fits certain criteria by means of checking possible structure expansions one at a time beginning with the smallest to see whether they fit the criteria, or by some other means.

In an embodiment, in some cases repeatedly performing the smallest possible numerator contraction will never yield the emptying numerator contraction. (The term "emptying numerator contraction" is defined below.) However, in such cases, repeatedly performing the smallest possible numerator contraction will yield each numerator contraction that is possible that is not the emptying numerator contraction, and the emptying numerator contraction is considered to be the largest possible numerator contraction, so numerator contractions can still be arranged in sequence from smallest to largest and it is still possible to determine the smallest numerator contraction of a particular numerator that fits certain criteria by means of checking possible numerator contractions one at a time beginning with the smallest to see whether they fit the criteria, or by some other means. Likewise, even though in some cases consecutively performing the smallest possible structure contraction repeatedly will never yield the emptying structure contraction, structure contractions can still be arranged in sequence from smallest to largest and it is still possible to determine the smallest structure contraction of a particular last portion of a mathematical structure that fits certain criteria by means of checking possible structure contractions one at a time beginning with the smallest to see whether they fit the criteria, or by some other means.

Simple Structure Modifications

Essentially, a "simple structure modification" moves mathematical text into or out of a mathematical structure without modifying any other mathematical structure. For example, converting $$1+\frac{2}{\square} \text{ to } \frac{1+2}{\square}$$

is a "simple numerator expansion": it moves two characters into the fraction's numerator, without changing anything else. Simple structure modifications are defined more precisely in the following paragraphs.

In an embodiment, for purposes of the present discussion of structure modifications, the input cursor counts as a character. Throughout the present discussion of structure modifications, when examples are provided that do not explicitly specify the location of the input cursor, it is to be understood that the input cursor is located somewhere where it will have no effect. For example, if the input cursor were located immediately before the fraction in the expression $$\sqrt{1+2}+\frac{3}{4},$$

then the smallest possible numerator expansion of the numerator in that expression would consist of simply moving the input cursor into the numerator, but the following paragraph asserts that the smallest possible numerator expansion of the numerator in this expression consists of something else; the example in the following paragraph thus includes the implicit assumption that the input cursor is located somewhere else, where it will have no effect.

In an embodiment, when a fraction is immediately preceded by a character or a mathematical structure and the fraction is not separated from the character or structure, the smallest possible numerator expansion consists of moving that character or that mathematical structure with all its contents into the fraction's numerator, at the beginning. Such a numerator expansion is a "simple numerator expansion." For example, the smallest possible numerator expansion of the numerator in the expression $$\sqrt{1+2}+\frac{3}{4}$$

is a simple numerator expansion that converts the expression to $$\sqrt{1+2}\frac{+3}{4}.$$

if that numerator expansion occurs, then subsequently the smallest possible numerator expansion of the numerator in the resulting expression $$\sqrt{1+2}\frac{+3}{4}$$

is a simple numerator expansion that converts the expression to $$\frac{\sqrt{1+2}+3}{4}.$$

In an embodiment, any sequence of two or more simple numerator expansions of the same numerator is itself a simple numerator expansion. For example, converting $$\sqrt{1+2}+\frac{3}{4}$$

directly to $$\frac{\sqrt{1+2}+3}{4}$$

is a simple numerator expansion.

In an embodiment, a simple numerator expansion cannot for example convert $$\sqrt{1+2}+\frac{3}{4}$$

to $$\sqrt{1+}\frac{2+3}{4},$$

because a simple numerator expansion cannot move the numeral 2 out of the square root mathematical structure that it was within. There is no single structure modification that converts $$\sqrt{1+2}+\frac{3}{4} \text{ to } \sqrt{1+\frac{2+3}{4}}.$$

Likewise, in an embodiment, when a first mathematical structure that has a last portion is immediately followed by a character or a second mathematical structure and the first mathematical structure is not separated from the character or second mathematical structure, the smallest possible structure expansion consists of moving that character or that second mathematical structure with all its contents into the last portion of the first mathematical structure, at the end. Such a structure expansion is a "simple structure expansion." Also, any sequence of two or more simple structure expansions of the same last portion of a mathematical structure is itself a simple structure expansion.

In an embodiment, when a fraction's numerator is not empty, a simple numerator contraction is possible that moves the first character or mathematical structure that is in the fraction's numerator to immediately before the fraction, without moving that character or structure into or out of any mathematical structure other than the fraction. In most cases, the simple numerator contraction that moves the first character or mathematical structure out of a fraction's numerator is the smallest possible numerator contraction; however, in some cases the smallest possible numerator contraction is instead an interchanging numerator contraction, as explained below. Any sequence of two or more simple numerator contractions of the same numerator is itself a simple numerator contraction.

Likewise, in an embodiment, when the last portion of a mathematical structure is not empty, a simple structure contraction is possible that moves the last character or mathematical structure that is in the last portion of the mathematical structure to immediately after the mathematical structure, without moving the character or structure into or out of any other mathematical structure. In most cases, that simple structure contraction is the smallest possible structure contraction; however, in some cases the smallest possible structure contraction is instead an interchanging structure contraction, as explained below. Any sequence of two or more simple structure contractions of the same last portion of a mathematical structure is itself a simple structure contraction.

In an embodiment, an "emptying numerator contraction" is a simple numerator contraction that moves everything out of a fraction's numerator to immediately before the fraction. A "non-emptying numerator contraction" is any numerator contraction that is not an emptying numerator contraction. For any given numerator, an emptying numerator contraction is always considered to be a larger numerator contraction than any non-emptying numerator contraction. An "emptying structure contraction" is a simple structure contraction that moves everything out of the last portion of a mathematical structure to immediately after the mathematical structure. A "non-emptying structure contraction" is any structure contraction that is not an emptying structure contraction. For any given last portion of a mathematical structure, an emptying structure contraction is always considered to be a larger structure contraction than any non-emptying structure contraction.

In some math input interfaces, a mathematical identifier that actually consists of multiple characters may be treated like a single character for editing purposes. For example, on some graphing calculators, when a user presses the cosine key the interface will yield "cos(", and although this result includes four distinct text characters it is treated like a single character for editing purposes, so for example it is not possible to delete any of these four characters without deleting all four. In an embodiment, for purposes of the present discussion of structure modifications, any reference to a "character" should be understood to refer to either a single character or a mathematical identifier that actually consists of multiple characters but is treated like a single character for editing purposes. For example, the above explanation of simple numerator expansions should also be understood to mean that in an embodiment where "cos(" is treated like a single character, the smallest possible numerator expansion of $$\cos(\frac{3}{\square}$$

converts it to $$\frac{\cos(3}{\square},$$

and is a simple numerator expansion.

Interchanging Structure Modifications

In an embodiment, if a portion of mathematical text is both within the first portion of one mathematical structure and within the last portion of another mathematical structure, then it must be the case that either that first portion is itself contained within that last portion, or vice versa. Essentially, an "interchanging structure modification" interchanges the relationship of such a first portion and such a last portion: if the first portion was contained within the last portion, then the last portion becomes contained within the first portion; if the last portion was contained within the first portion, then the first portion becomes contained within the last portion. For example, in the expression $$\sqrt{\frac{3}{4}},$$

the numeral 3 is within a numerator (which is the first portion of a fraction) that is itself contained within a radicand (which is the last portion of a square root); in the expression $$\frac{\sqrt{3}}{4},$$

the numeral 3 is within a radicand that is itself contained within a numerator. Converting $$\sqrt{\frac{3}{4}}$$

to $$\frac{\sqrt{3}}{4}$$

or vice versa constitutes an interchanging structure modification. Interchanging structure modifications are defined more precisely in the following paragraphs.

In the following paragraphs, an "outer structure" is a mathematical structure that contains some other mathematical structure before a structure modification occurs; in describing the results of a structure modification, such a structure will still be referred to as "the outer structure" even after the structure modification causes it to no longer contain that other mathematical structure. Similarly, an "inner structure" is a mathematical structure that is contained within some other mathematical structure before a structure modification occurs, and such a structure will be still be referred to as "the inner structure" even after the structure modification causes it to no longer be contained within that other mathematical structure.

In an embodiment, for purposes of the present explanation of interchanging structure modifications, if the last portion of an outer structure contains nothing except an inner structure, and that inner structure has a first portion, then the contents of that first portion of an inner structure constitute "the doubly enclosed expression." For example, in the expression $$\sqrt{\frac{3}{4}},$$

the last portion of the square root (the radicand) contains nothing except an inner fraction, and the fraction has a first portion (the numerator), so the contents of that numerator (the numeral 3) constitute "the doubly enclosed expression." In such circumstances, an "interchanging structure modification" consists of causing the last portion of the outer structure to contain only the doubly enclosed expression (rather than containing the entire inner structure) and causing the first portion of the inner structure to contain the entire outer structure (rather than containing only the doubly enclosed expression). Such an interchanging structure modification may be classified as an "interchanging numerator expansion" and may also be classified as an "interchanging structure contraction." Such an interchanging structure modification is both the smallest possible expansion of that numerator and the smallest possible contraction of that last portion of the outer structure. For example, an interchanging structure modification that modifies the expression $$\sqrt{\frac{3}{4}}$$

consists of causing the radicand to contain the numeral 3 (rather than containing the fraction) and causing the numerator to contain the entire square root (rather than containing only the numeral 3), thus yielding the result $$\frac{\sqrt{3}}{4}.$$

As another example, in the expression $$\frac{\frac{1}{2}}{3},$$

the last portion of the outer structure (its denominator) contains nothing except the inner structure $$\frac{2}{3},$$

which has a first portion (its numerator 2), so the contents of that numerator (the numeral 2) constitute "the doubly enclosed expression." An interchanging structure modification that modifies this expression consists of causing the outer structure's denominator to contain only the numeral 2 (rather than containing the entire fraction $$\frac{2}{3})$$

and causing the inner structure's numerator to contain the entire outer structure (rather than containing only the numeral 2), thus yielding the result $$\frac{\frac{1}{2}}{3}.$$

In an embodiment, if the first portion of an outer structure contains nothing except an inner structure, and that inner structure has a last portion, then the contents of that last portion of an inner structure constitute "the doubly enclosed expression." In such circumstances, an "interchanging structure modification" consists of causing the first portion of the outer structure to contain only the doubly enclosed expression (rather than containing the entire inner structure) and causing the last portion of the inner structure to contain the entire outer structure (rather than containing only the doubly enclosed expression). Such an interchanging structure modification may be classified as an "interchanging structure expansion" and also may be classified as an "interchanging numerator contraction," and is the smallest possible expansion of that last portion of the inner structure and the smallest possible contraction of that numerator. For example, an interchanging structure modification that modifies the expression $$\frac{\sqrt{3}}{4}$$

consists of causing the numerator to contain only the numeral 3 (rather than containing the entire square root) and causing the radicand to contain the entire fraction (rather than containing only the numeral 3), thus yielding the result $$\sqrt{\frac{3}{4}}.$$

As another example, an interchanging structure modification that modifies the expression $$\frac{\frac{1}{2}}{3}$$

yields the result $$\frac{1}{\frac{2}{3}}.$$

Compound Structure Modifications in an embodiment, a "proper structure modification" is a simple structure modification, interchanging structure modification, or compound structure modification. A "compound structure modification" is essentially a combination of consecutive simple and interchanging structure modifications.

In an embodiment, a "compound numerator expansion" is a single structure modification that consists of two or more consecutive expansions of the same numerator such that each of the consecutive expansions is a simple numerator expansion or an interchanging numerator expansion, and such that at least one of the consecutive expansions is an interchanging numerator expansion. For example, after a user has entered $$\sqrt{3+\sqrt{\frac{4}{\square}}},$$

three consecutive expansions of the same numerator could convert the user's input to $$\sqrt{3+\frac{\sqrt{4}}{\square}},$$

then $$\sqrt{\frac{3+\sqrt{4}}{\square}},$$

and then $$\frac{\sqrt{3+\sqrt{4}}}{\square},$$

and so a single compound numerator expansion can directly convert the user's input to $$\frac{\sqrt{3+\sqrt{4}}}{\square}.$$

Similarly, in an embodiment, a "compound numerator contraction" is a single structure modification that consists of two or more consecutive contractions of the same numerator such that each is a non-emptying simple numerator contraction or an interchanging numerator contraction and at least one is an interchanging numerator contraction. For example, converting $$\frac{\sqrt{3+\sqrt{4}}}{\square}$$

to $$\sqrt{3+\sqrt{\frac{4}{\square}}}$$

is a compound numerator contraction. Likewise, a "compound structure expansion" is a single structure modification that consists of two or more consecutive expansions of the same last portion of a mathematical structure such that each is a simple or interchanging structure expansion and at least one is an interchanging structure expansion, and a "compound structure contraction" is a single structure modification that consists of two or more consecutive contractions of the same last portion of a mathematical structure such that each is a non-emptying simple structure contraction or interchanging structure contraction and at least one is an interchanging structure contraction.

Improper Structure Modifications in an embodiment, a "proper structure modification" is a simple structure modification, interchanging structure modification, or compound structure modification.

In an embodiment that behaves as described above, when an inner fraction is within an outer mathematical structure, unless the fraction is at the end of the last portion of the outer structure so that an interchanging or compound numerator expansion may cause the fraction to no longer be contained in the outer structure, the outer structure will constrain the expansion of the fraction's numerator so that no proper numerator expansion can cause the fraction to contain the outer structure or anything outside the outer structure. Similarly, when an inner mathematical structure that has a last portion is within an outer mathematical structure, unless the inner structure is a fraction that is at the beginning of the first portion of the outer structure so that an interchanging or compound structure expansion may cause the inner structure to no longer be contained in the outer structure, the outer structure will constrain the expansion of the last portion of the inner structure so that no proper structure expansion can cause the inner structure to contain the outer structure or anything outside the outer structure.

In an embodiment, even when no proper numerator expansion is possible for a particular numerator, in certain circumstances an improper numerator expansion will be possible that consists of a “prerequisite component modification” that modifies an outer structure in such a way that a proper numerator expansion becomes possible, followed by an “unblocked component modification” that is a proper numerator expansion. Similarly, in an embodiment, even when no proper structure expansion is possible for a particular last portion of a mathematical structure, in certain circumstances an improper structure expansion will be possible that consists of a “prerequisite component modification” that modifies an outer structure in such a way that a proper structure expansion becomes possible, followed by an “unblocked component modification” that is a proper structure expansion. Improper numerator expansions and improper structure expansions are explained in detail in the following paragraphs.

In an embodiment, when an inner fraction is at the beginning of the last portion of an outer mathematical structure, if that last portion of an outer mathematical structure contains more than just the inner fraction, then the smallest possible numerator expansion of the inner fraction’s numerator consists of a simple structure contraction of the outer mathematical structure that causes the last portion of the outer mathematical structure to contain only the inner fraction, followed by an interchanging numerator expansion. Such a numerator expansion is an improper numerator expansion. The “prerequisite component modification” of such a numerator expansion is the simple structure contraction of the outer mathematical structure that causes the last portion of the outer mathematical structure to contain only the inner fraction, and the unblocked component modification is the subsequent interchanging numerator expansion. For example, to perform a numerator expansion of the numerator in the expression $$\sqrt{\frac{3}{4}+5},$$

the prerequisite component modification would be a simple structure contraction that causes the square root to contain only the fraction, which would yield the result $$\sqrt{\frac{3}{4}}+5;$$

after the prerequisite component modification occurred, an interchanging numerator expansion would yield $$\frac{\sqrt{3}}{4}+5.$$

Therefore, the smallest possible numerator expansion of the numerator in the expression $$\sqrt{\frac{3}{4}+5}$$

is an improper numerator expansion that converts the result directly to $$\frac{\sqrt{3}}{4}+5.$$

(Such an improper numerator expansion may also be classified as a compound structure contraction; for example, converting $$\sqrt{\frac{3}{4}+5}$$

to $$\frac{\sqrt{3}}{4}+5$$

may be classified as an improper numerator expansion or as a compound structure contraction of the square root.)

In an embodiment, when an inner mathematical structure is at the end of the numerator of an outer fraction, if that numerator contains more than just the inner mathematical structure, then no structure expansion of the last portion of the inner mathematical structure is possible.

In an alternative embodiment, when an inner mathematical structure is at the end of the numerator of an outer fraction, if that numerator contains more than just the inner mathematical structure, then a structure expansion of the last portion of the inner mathematical structure is possible; the smallest such structure expansion consists of a simple numerator contraction of the outer fraction that causes the numerator to contain only the inner structure, followed by an interchanging structure expansion. Such a structure expansion is an improper structure expansion. The prerequisite component modification of such a structure expansion is the simple numerator contraction of the outer fraction that causes the numerator of the outer fraction to contain only the inner structure, and the unblocked component modification is the subsequent interchanging structure expansion. For example, in such an embodiment, an improper structure expansion of the square root converts $$\frac{5+\sqrt{4}}{3}$$

to $$5+\sqrt{\frac{4}{3}}.$$

(Such an improper structure expansion may also be classified as a compound numerator contraction.)

In an embodiment, when an inner fraction is at the beginning of the numerator of an outer fraction, the only possible numerator expansions of the inner fraction's numerator are improper numerator expansions. Each such numerator expansion consists of a numerator expansion of the outer fraction's numerator followed by the largest possible proper numerator expansion of the inner fraction's numerator, so that the inner fraction still ends up at the beginning of the numerator of the outer fraction. In other words, when an inner fraction is at the beginning of the numerator of an outer fraction, the only possible numerator expansions of the inner fraction's numerator move mathematical text from outside the outer fraction directly into the inner fraction's numerator. The prerequisite component modification of any such numerator expansion is the numerator expansion of the outer fraction's numerator, and the unblocked component modification is the subsequent expansion of the inner fraction's numerator. For example, to perform the smallest possible numerator expansion of the inner fraction's numerator in the expression $$-\frac{\frac{1}{2}}{3},$$

the prerequisite component modification would be the smallest possible numerator expansion of the outer fraction's numerator, which causes the outer fraction's numerator to contain the negative sign, yielding the result $$\frac{\frac{-1}{2}}{3};$$

after the prerequisite component modification occurred, the largest possible proper numerator expansion of the inner fraction's numerator would yield $$\frac{\frac{-1}{2}}{3}.$$

Therefore, converting $$-\frac{\frac{1}{2}}{3}$$

directly to $$\frac{-\frac{1}{2}}{3}$$

is an improper numerator expansion of the inner fraction's numerator.

Similarly, in an embodiment, when an inner mathematical structure is at the end of the last portion of an outer mathematical structure, the only possible structure expansions of the last portion of the inner structure are improper structure expansions. Each such structure expansion consists of a structure expansion of the last portion of the outer structure followed by the largest possible proper expansion of the last portion of the inner structure, so that the inner structure still ends up at the end of the last portion of the outer structure. In other words, when an inner structure is at the end of the last portion of an outer structure, the only possible structure expansions of the last portion of the inner structure move mathematical text from outside the outer structure directly into the inner structure. The prerequisite component modification of such a structure expansion is the structure expansion of the last portion of the outer structure, and the unblocked component modification is the subsequent expansion of the last portion of the inner structure. For example, in such an embodiment, the smallest possible structure expansion of the inner square root in the expression $$\sqrt{5-\sqrt{2}}\ +2$$

is an improper structure expansion that yields the result $$\sqrt{5-\sqrt{2+}\ 2};$$

a larger possible structure expansion of the inner square root is an improper structure expansion that yields the result $$\sqrt{5+\sqrt{2+2}}\ .$$

Any numerator expansion that consists of a sequence of consecutive expansions of the same numerator is an improper numerator expansion if any of its components is an improper numerator expansion. For example, a numerator expansion that converts 2+

$$\sqrt{\frac{3}{4}+5}$$

directly to $$\frac{2+\sqrt{3}}{4}+5$$

is an improper numerator expansion. Similarly, any structure expansion that consists of a sequence of consecutive expansions of the same last portion of a mathematical structure is an improper structure expansion if any of its components is an improper structure expansion.

Reversing Structure Modifications

Below, various features are described that may cause the interface to perform structure modifications, in some embodiments. In an embodiment, whenever a user performs a sequence of consecutive actions such that each of the consecutive actions invokes the same feature that causes the interface to perform a structure modification that has the same target, if one of the consecutive actions is an improper numerator expansion or improper structure expansion, then if a later one of the consecutive actions is a numerator contraction of the same numerator or a structure contraction of the same last portion of a mathematical structure, and if that numerator contraction or structure contraction reverses the effect of the unblocked component modification that was a component of the earlier improper numerator expansion or improper structure expansion, then the interface will also reverse the prerequisite component modification that was a component of that earlier improper numerator expansion or improper structure expansion.

For example, in an embodiment, if by means of the structure handle dragging feature that is described in Chapter 46 a user causes the interface to expand the inner square root in the expression $$\sqrt{\sqrt{1}+3}+5$$

to the greatest extent possible, thus yielding the result $$\sqrt{\sqrt{1+3+5}},$$

then if the user's next action is to contract that inner square root by means of the structure handle dragging feature so that the mathematical text +3+5 is moved back out of that square root, then rather than just moving those four characters out of the inner square root, the interface will then also move the last two characters out of the outer square root, thus yielding $$\sqrt{\sqrt{1}+3}+5$$

instead of $$\sqrt{\sqrt{1}+3+5}.$$

In an embodiment, whenever a user performs a sequence of consecutive actions such that each of the consecutive actions invokes the same feature that causes the interface to perform a structure modification that has the same target, any structure modification that would restore that target to the state it was in before the user performed the first of these consecutive actions is a valid and normal structure modification, even if it would be invalid or abnormal according to the rules that are specified below.

Valid and Invalid Structure Modifications

In the present specification, a structure modification is said to be "valid" for purposes of the structure modification functionality that is disclosed herein if and only if it is a possible structure modification and it is not "invalid." In the following paragraphs, various circumstances are specified in which a structure modification is invalid in some embodiments.

In an embodiment, a structure modification that moves nothing but the input cursor is invalid, so that whenever the interface performs the smallest valid structure modification that fits certain criteria (such as when it performs the smallest valid numerator expansion of a particular numerator), it will do more than just move the input cursor.

In an embodiment, a structure modification is invalid if the structure modification separates the digits of a numeral from each other. In an embodiment, a structure modification is invalid if the structure modification separates the letters of a mathematical identifier such as "cos" from each other. In an embodiment, a structure modification is invalid if the structure modification separates the whole number part of a mixed fraction from the fractional part of the mixed fraction.

In an embodiment, when an exponent is immediately preceded by its base, a structure modification is invalid if it separates the first character of the exponent from the exponent's base. In an embodiment, when a variable has a subscript, a structure modification is invalid if it separates the variable from the first character of its subscript. In an embodiment, when the identifier log is immediately followed by a subscript, a structure modification is invalid if it separates the identifier log from the first character of its subscript.

In an embodiment, a structure modification is invalid if the structure modification moves a numeral into or out of a mathematical structure in such a way that the numeral ceases to be identifiable as a distinct numeral. For example, a structure modification that converts $$1\frac{2}{3}$$

to $$\frac{12}{3}$$

is invalid.

In an embodiment, a structure modification is invalid if it causes a mathematical expression to contain a new syntax error. In the following paragraphs, certain such structure modifications are explicitly identified as invalid in some embodiments.

In mathematical notation, it is syntactically valid for an integral symbol to correspond to a differential that is within a numerator that the integral symbol is not within; for example, in the expression $$\int\frac{dx}{2}$$

it is syntactically valid for the integral symbol to correspond to the differential dx even though the differential is within a numerator that the integral symbol is not within. Other than that, in most cases, when it is syntactically necessary for a portion of mathematical text to correspond to some other portion of mathematical text, two portions of mathematical text do not correspond to each other if they are separated from each other. In an embodiment, for purposes the following paragraph, two portions of mathematical text will not be considered to correspond to each other if they are separated from each other, except in any special case where it is syntactically valid for the two portions to correspond to each other while separated; in particular, a left parenthesis and right parenthesis will not be considered to correspond to each other if they are separated from each other.

In an embodiment, if two portions of mathematical text (such as, for example, a left parenthesis and a right parenthesis) correspond to each other, then a structure modification is invalid if it separates these portions of mathematical text from each other in such a way as to cause these two portions of mathematical text to no longer correspond to each other. For example, a structure modification that converts $\sqrt{4}+(5-6)$ to $\sqrt{4+(5}-6)$ is invalid. In an embodiment, if an expression contains a syntax error because some portion of mathematical text fails to correspond to an appropriate later portion of mathematical text, then a structure modification is invalid if it moves that portion of mathematical text into a numerator, unless by doing so it causes that portion of mathematical text to correspond to an appropriate later portion of mathematical text. For example, a structure modification that converts $$(\frac{1}{2} \text{ to } \frac{(1}{2}$$

is invalid, but a structure modification that converts $$(\frac{1)}{2} \text{ to } \frac{(1)}{2}$$

is valid.

In an embodiment, if the function identifier of a multivariable function is followed by a left parenthesis, and a comma is present later in the expression that would be parsed as a separator of the parameters of the multivariable function, then a structure modification is invalid if it separates the comma from the left parenthesis of the multivariable function. For example, a structure modification that converts $$f\left(x, \frac{y}{2}\right) \text{ to } \left(\frac{x, y}{2}\right)$$

is invalid.

According to the rules of mathematical parsing, in order for a mathematical expression to constitute the operand of a mathematical operator or function, that mathematical expression must not be separated from the mathematical operator or function identifier. For example, in the expression $\sqrt{4}+5$, the operand that immediately precedes the plus sign is not the numeral 4, because the numeral 4 is within a square root that the plus sign is not within; the operand that immediately precedes the plus sign is the expression $\sqrt{4}$, which is itself a mathematical structure but is not within a mathematical structure that the plus sign is not within. As another example, in the expression $\sqrt{4+}5$, the plus sign is not immediately followed by any operand of the plus sign: the numeral 5 is not an operand of the plus sign because the numeral 5 is not within a square root that the plus sign is within. Similarly, in the expression $\sqrt{\sin}$ x, the sin function identifier is not immediately followed by any operand of the sine function. For purposes of the present specification, an empty fraction or other empty structure template may constitute the operand of a mathematical operator or function.

In an embodiment, when a mathematical operator is immediately preceded by an operand of the operator, a structure modification is invalid if it moves the operator into or out of a mathematical structure in such a way that the operator is no longer immediately preceded by an operand. In an embodiment, as an exception to the rule described in the preceding sentence, when a minus sign is immediately preceded by an operand that ends with a right parenthesis, a structure modification that moves the minus sign into a fraction's numerator without moving the operand that preceded the minus sign is not necessarily invalid. (However, even if such a structure modification is valid, it may be "abnormal," as discussed below.)

In an embodiment, when a mathematical operator or function identifier is immediately followed by an operand of the operator or function, a structure modification is invalid if it moves the operator or function identifier into or out of a mathematical structure in such a way that the operator or function identifier is no longer immediately followed by an operand. For example, a structure modification that converts $\sqrt{4}+5$ to $\sqrt{4+}5$ is invalid because prior to the modification the plus sign is immediately followed by the operand 5 but after the modification the numeral 5 no longer constitutes an operand of the plus sign and so the plus sign is no longer immediately followed by an operand. However, a structure modification that converts $\sqrt{4}+$ to $\sqrt{4+}$ is valid, because in such a case the plus sign is not immediately followed by an operand even when the structure modification has not occurred. As another example, a structure modification that converts $$\log \frac{\square}{\square}$$

to $$\frac{\log}{\square}$$

is invalid because prior to the modification the log function identifier is immediately followed by an empty fraction, which constitutes an operand of the logarithm function, but after the modification the log function identifier is no longer immediately followed by an operand.

In an embodiment, for purposes of the rule described in the preceding paragraph, an operator is considered to be "immediately followed by an operand" if either the operator is immediately followed by an operand according to the ordinary rules of mathematical parsing or else the operator is immediately followed by the input cursor (and the operator is not separated from the input cursor). In such an embodiment, whether a particular structure modification is valid or invalid may depend on whether or not it moves the input cursor in addition to moving other mathematical text. For example, in such an embodiment, if the input cursor is at the end of the expression $\sqrt{4}+$, then a structure modification that converts this expression to $\sqrt{4+}$ is valid if and only if it moves the input cursor into the square root in addition to moving the plus sign into the square root.

In an embodiment, a structure modification is invalid if it causes a portion of a mathematical structure to become completely empty, so that it does not contain any mathematical text and does not contain the input cursor.

In an embodiment, when a relational operator such as = or < is not within any mathematical structure, a structure modification is invalid if it moves the relational operator into a mathematical structure.

Figure 26A:
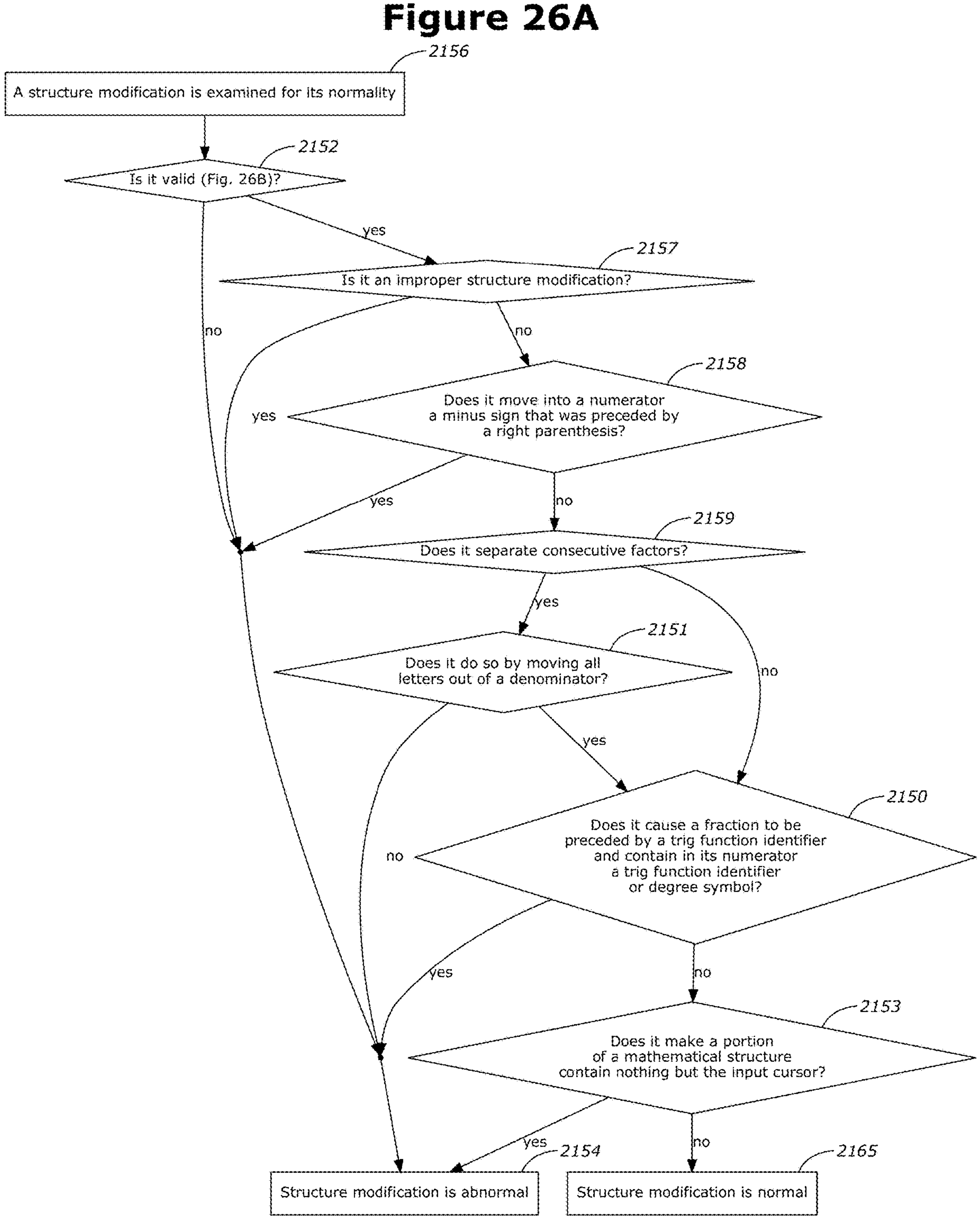
FIG. 26A is a flowchart that illustrates the process of evaluating a structure modification, according to an embodiment.
Figure 26B:
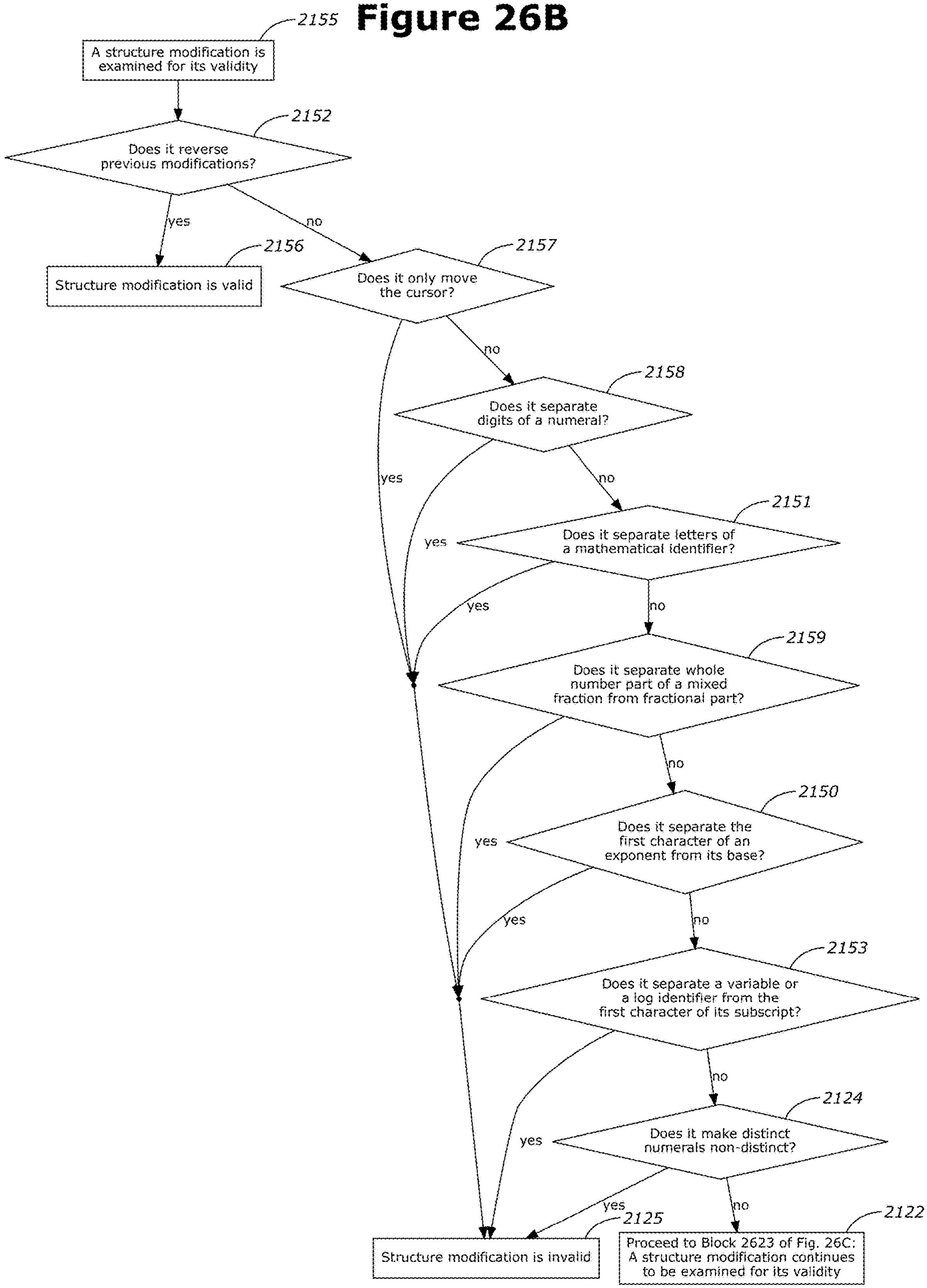
FIGS. 26B and 26C are flowcharts that together illustrate evaluating a structure modification's validity, according to an embodiment.
Figure 26C:
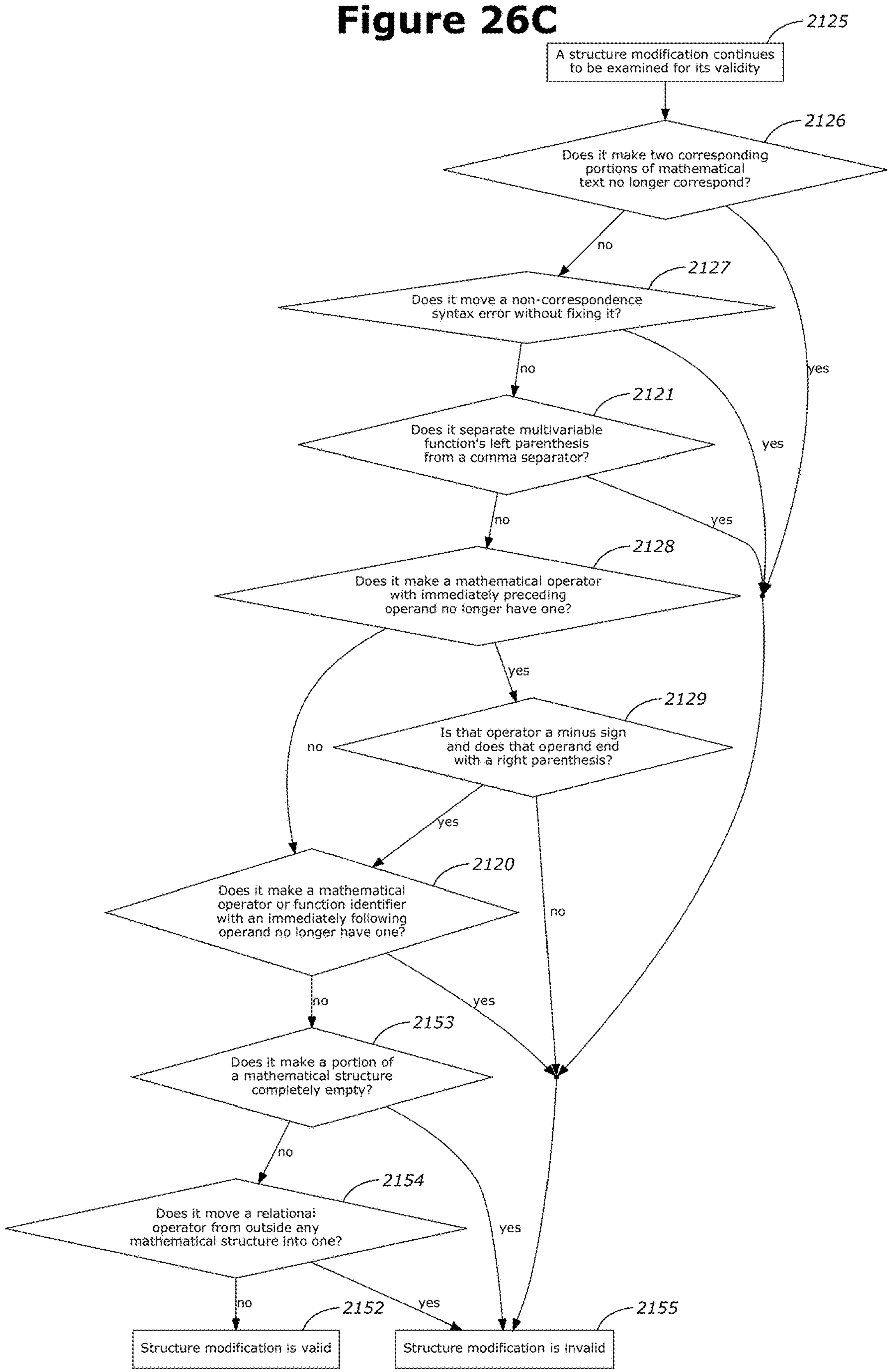

FIGS. 26B and 26C are flowchart that together illustrate the above-described process of evaluating a structure modification's validity. The process begins in Block 2611 of FIG. 26B, which states, "A structure modification is examined for its validity" and proceeds to Block 2612, which asks, "Does it reverse previous modifications?" If the answer is yes, then the structure modification is valid (Block 2613). If the answer is no, the evaluation process continues with a series of seven questions. In each case, if the answer to the question is yes, then the structure modification is invalid (Block 2621). If the answer is no, the process continues with the next question until all questions have been answered (Blocks 2614-2620). If the answer to all seven questions is no, then the evaluation process continues with Block 2623 of FIG. 26C (Block 2622).

FIG. 26C begins at Block 2623, which states, "A structure modification continues to be examined for its validity." The evaluation process continues with a series of three questions. In each case, if the answer to the question is yes, then the structure modification is invalid (Block 2633). If the answer is no, the process continues with the next question (Blocks 2624-2626). If the answer to all three questions is no, then the evaluation process continues with Block 2627, which asks, "Does it make a mathematical operator with immediately preceding operand no longer have one?" If the answer to the question in Block 2627 is yes, then the process continues with Block 2628, which asks, "Is that operator a minus sign and does that operand end with a right parenthesis?" If the answer is no, then the structure modification is invalid (Block 2633). But if either the answer to the question in Block 2627 is no or if the answer to the question in Block 2628 is yes, then the process continues a series of three questions starting in Block 2629 (Blocks 2629-2631). In each case, if the answer to the question is yes, then the structure modification is invalid (Block 2633). If the answer to all three questions is no, then the structure modification is valid (Block 2632).

Other structure modifications that cause a mathematical expression to contain a new syntax error, and that may thus be invalid in some embodiments, may be evident to those of ordinary skill in the art.

Normal and Abnormal Structure Modifications

In the present specification, a structure modification is said to be "normal" if and only if it is a valid structure modification and it is not "abnormal" according to any of the criteria specified in the following paragraphs.

In an embodiment, a structure modification that is an improper structure modification as defined above is abnormal. For example, in an embodiment, a numerator expansion that converts $$\sqrt{\frac{3}{4}+5}$$

to $$\frac{\sqrt{3}}{4}+5$$

is abnormal (although a structure contraction that has the same effect is normal).

In an embodiment, when a minus sign is immediately preceded by an operand that ends with a right parenthesis, a structure modification is abnormal if it moves the minus sign into a fraction's numerator without moving the operand that preceded the minus sign.

For purposes of the following paragraph, "consecutive factors" are any two or more expressions such that the expressions are adjacent to one another with no intervening operators in such a way that the rules of mathematical parsing dictate that the expressions are to be multiplied by each other, except that for purposes of the following paragraph, a mathematical structure does not count as a consecutive factor for purposes of a structure modification that moves mathematical text into or out of that mathematical structure. For example, in the expression $\sqrt{2}x(y-4)\cdot z$, the three expressions $\sqrt{2}$, x, and (y−4) are all consecutive factors, except that the expression $\sqrt{2}$ does not count as a consecutive factor for purposes of a structure modification that moves mathematical text into or out of that square root; the expression z is not a consecutive factor under any circumstances because it is separated from the other expressions by an intervening dot operator.

In an embodiment, a structure modification is abnormal if it splits up a set of two or more consecutive factors by moving one or more of the consecutive factors into or out of a fraction or a square root or other radical without moving the entire set of consecutive factors into or out of the mathematical structure. For example, in such an embodiment, a structure modification that converts $\sqrt{2}x(y-4)\cdot z$ to $\sqrt{2}x(y-4)\cdot z$ is abnormal because it splits up the two consecutive factors x and (y−4) by moving one of them into a square root without moving both of them into the square root. As another example, a structure modification that converts $\sqrt{2x}$ to $\sqrt{2}x$ is abnormal. In an embodiment, as an exception, a structure modification is normal if it splits up a set of two or more consecutive factors by moving one or more of the consecutive factors out of a fraction's denominator without moving the entire set of consecutive factors out of the fraction's denominator if the result is that the fraction contains no letters and the fraction is immediately followed by a letter; for example, in an embodiment, a structure modification that converts $$\frac{1}{2x} \text{ to } \frac{1}{2}x$$

is normal.

In an embodiment, a structure modification is abnormal if it moves mathematical text into or out of a fraction's numerator in such a way that the resulting fraction is immediately preceded by a trigonometric function identifier and the resulting fraction contains in its numerator a trigonometric function identifier or a degree symbol or both. For example, in such an embodiment, a structure modification that converts $$\sin x+\frac{\sin y}{z}$$

to $$\sin\frac{x+\sin y}{2}$$

is abnormal.

In an embodiment, a structure modification is abnormal if by moving mathematical text out of a portion of a mathematical structure it causes the portion of a mathematical structure to contain nothing except the input cursor.

FIG. 26A is a flowchart that illustrates the process of evaluating a structure modification that is described above. The process begins in Block 2601, which states, "A structure modification is examined for its normality" and proceeds to Block 2602, which asks, "Is it valid?" (See FIG. 26B for an illustration of the process of evaluating a structure modification's validity.) If the answer is no, the structure modification is abnormal (Block 2609). If the answer is yes, the evaluation process continues with Block 2603, which asks, "Is it an improper structure modification?" If the answer is yes, the structure modification is abnormal (Block 2609). If the answer is no, the evaluation process continues with Block 2604, which asks, "Does it move into a numerator a minus sign that was preceded by a right parenthesis?" Once again, if the answer is yes, then the structure modification is abnormal (Block 2609). If the answer is no, the evaluation process continues with Block 2605, which asks, "Does it separate consecutive factors?" If the answer is yes, the process continues with Block 2606, which asks, "Does it do so by moving all letters out of a denominator?" If the answer to the question in Block 2606 is no, then then the structure modification is abnormal (Block 2609).

Continuing with the explanation of FIG. 26A, if the answer to the question in Block 2605 is no or if the answer to the question in Block 2606 is yes, then the evaluation process continues with Block 2607, which asks, "Does it cause a fraction to be preceded by a trig function identifier and contain in its numerator a trig function identifier or degree symbol?" If the answer is yes, then the structure modification is abnormal (Block 2609). If the answer is no, the last evaluation question is asked in Block 2608, "Does it make a portion of a mathematical structure contain nothing but the input cursor?" If the answer to this question is yes, then the structure modification is abnormal (Block 2609). If the answer is no, then the structure modification is normal (Block 2610).

Prefix Structures and Fractions

In an embodiment, for purposes of structure modification features described herein, a "prefix structure" is a mathematical structure such that it is syntactically invalid for the mathematical structure to be at the end of a numerator. In particular, the base of a logarithm is a prefix structure, because an expression such as $$\frac{\log_2}{2}$$

is syntactically invalid: to be syntactically valid, the logarithm function identifier must be immediately followed by an operand. For similar reasons, the three letters lim with appropriate mathematical text below them constitute a prefix structure, a definite integral symbol with its accompanying limits constitutes a prefix structure, and a Sigma mathematical structure constitutes a prefix structure. Other prefix structures will be evident to those of ordinary skill in the art.

In an embodiment, when the last portion of a prefix structure contains nothing except a single fraction, if an interchanging structure contraction of the prefix structure occurs or if an interchanging numerator expansion of the fraction occurs, then immediately after applying the usual effects of the interchanging structure modification, the interface will move the prefix structure out of the fraction's numerator, to the left of the fraction. For example, in an embodiment, an interchanging structure contraction or interchanging numerator expansion in the expression $$\log_{\frac{2}{\square}}$$

will yield $$\log_2\frac{\square}{\square}.$$

In an embodiment, this is a valid structure modification. After such a structure modification, no further numerator expansion of that fraction's numerator is valid, since any further numerator expansion would cause the prefix structure to be at the end of a numerator, which is syntactically invalid. In an embodiment, immediately after such an interchanging structure modification, for purposes of the user's next action a second interchanging structure modification may reverse the effects of the first interchanging structure modification as though the prefix structure had not been moved out of the fraction's numerator, and such an interchanging structure modification is valid and normal; for example, after an interchanging numerator expansion of the fraction in the expression $$\log_{\frac{2}{\square}}$$

yields $$\log_2\frac{\square}{\square},$$

the user's next action may cause a numerator contraction that yields $$\log_{\frac{2}{\square}}.$$

Chapter 44: Structure Editing Improvements

Expelling Characters from Structures

In an embodiment, when a user types a character that is the last character within the last portion of a mathematical structure, if moving that character out of the mathematical structure would constitute a normal structure modification as defined above, then that character is "expulsion-eligible" for purposes of the interface behaviors described below.

Similarly, in an embodiment, if the input cursor is within and at the end of the last portion of a mathematical structure when a user actuates the fraction bar key, and if expanding the numerator of the new fraction so as to cause it to contain the mathematical structure would constitute a valid numerator expansion, then this actuation of the fraction bar key constitutes "typing an expulsion-eligible fraction bar" for purposes of the interface behaviors described below. For example, in an embodiment, if the input cursor is within the square root and after the 4 in the expression $\sqrt{4}$ when a user actuates the fraction bar key, then this constitutes typing an expulsion-eligible fraction bar, but if the input cursor is within the square root and after the plus sign in the expression $\sqrt{4+}$ when the user actuates the fraction bar key, then this does not constitute typing an expulsion-eligible fraction bar, because when a user has typed the expression $$\sqrt{4+\frac{\square}{\square}},$$

there is no valid numerator expansion that expands the numerator of the new fraction so as to cause it to contain the square root.

In an embodiment, when a character is expulsion-eligible, if it is syntactically invalid for that character to be included in the mathematical structure (and would be even if it were followed by an operand) and it would be syntactically valid for that character to be immediately after the mathematical structure, then that character is also "expulsion-mandatory." For example, in an embodiment, an equals sign that is the last character within the last portion of a square root mathematical structure is expulsion-mandatory, because it is not syntactically valid for an equals sign to be included in a square root (if it is not within a Sigma mathematical structure that is within the square root, or within some other similar type of mathematical structure that is within the square root). As another example, in an embodiment, if the input cursor is within the square root and after the 4 in the expression $(1+\sqrt{4}$ when the user types a right parenthesis, that right parenthesis is expulsion-mandatory because it is not syntactically valid for the right parenthesis to be in the square root where it would not be considered to correspond to the left parenthesis, and it would be syntactically valid for that right parenthesis to be immediately after the square root.

In an embodiment, in certain circumstances that are described below, an actuation of the fraction bar key may constitute "typing an expulsion-mandatory fraction bar."

In an embodiment, when a user types an expulsion-eligible character within the last portion of a mathematical structure, in certain circumstances the interface may decide to immediately "expel" that character, which means that the interface moves the character out of the mathematical structure so that it is the first character after the mathematical structure. Because the interface will as usual position the input cursor immediately after the character the user just typed, expelling the character will also cause the interface to move the input cursor out of the mathematical structure. The circumstances in which the interface will expel an expulsion-eligible character are explained below.

Similarly, in an embodiment, when a user types an expulsion-eligible fraction bar, in certain circumstances the interface may decide to immediately "expel the fraction bar," which means that the interface performs the smallest normal numerator expansion that would cause the new fraction's numerator to contain the mathematical structure. For example, if the input cursor is within the square root and after the 4 in the expression $\sqrt{4}$ when a user actuates the fraction bar key, and if the interface decides to immediately expel the fraction bar, then the interface will immediately convert the result from $$\sqrt{\frac{4}{\square}}$$

to $$\frac{\sqrt{4}}{\square}.$$

The circumstances in which the interface will decide to expel a fraction bar are explained below.

In an embodiment, when a user types an expulsion-eligible character that the interface automatically expels as described above, the interface will not show an intermediate result in which the expulsion-eligible character is included within the mathematical structure, but will only show the result in which the expulsion-eligible character is after the mathematical structure. In such an embodiment, when a user types an expulsion-eligible character that the interface immediately expels, it may seem to the user that the interface exited the mathematical structure before processing the character the user typed. Similarly, in an embodiment, when a user types an expulsion-eligible fraction bar that the interface automatically expels as described above, the interface will not show an intermediate result, and it may seem to the user that the interface exited the mathematical structure before creating the new fraction.

In fact, although the interface behavior that constitutes expelling a character from a mathematical structure is described above in terms of first inserting a character at the input cursor location and then moving both the character and the input cursor out of the mathematical structure, the exact same behavior may instead be implemented in terms of first moving the input cursor out of the mathematical structure and then inserting the character of the input cursor location, which is how such behavior is described in U.S. Pat. No. 8,788,548. In some places, such behavior is referred to herein in terms of "automatically exiting" a mathematical structure rather than in terms of expelling a character. Likewise, in some places the interface behavior that constitutes expelling a fraction bar is referred to herein in terms of automatically exiting a mathematical structure. The reason that this behavior is described above in terms of expelling a character or fraction bar is that such an explanation makes it more clear that undoing or altering the decision to expel a character or fraction bar may move the character or fraction bar back into the mathematical structure.

In an embodiment, when the interface expels a character or fraction bar, its decision to do so constitutes an interface intervention as defined in Chapter 11, so if the user's next action is an actuation of the Undo key then the interface may return the character or fraction bar to within the mathematical structure, as explained in Chapter 11. In an alternative embodiment, when a user types an expulsion-eligible character and the interface immediately expels that character, for purposes of undo functionality this will actually be treated as though the interface first made the decision to automatically move the input cursor out of the mathematical structure and then inserted the character into the user's input at the new cursor location, which means that if the user's next action is an actuation of the Undo key then the interface may undo the entry of the character rather than undoing its expulsion from the mathematical structure.

Automatic Structure Exiting

In an embodiment, when a user types a character or actuates the fraction bar key, if prior to that the user's most recent action was a cursor navigation action, then the interface will not expel the character or fraction bar. In particular, if the interface is in a bipositional entry mode as described below when a user actuates the left arrow key in order to cause the interface to exit the bipositional entry mode, and if the user's next action is typing a character, then the interface will not expel that character even if it is an expulsion-mandatory character.

In an embodiment, except as specified in the preceding paragraph, when a user types a character or fraction bar that is expulsion-mandatory, the interface will decide to expel that character or fraction bar. In an embodiment, this decision will be an alterable decision with a very low probability of alteration.

In an embodiment, when a user performs an action that causes the interface to create a new mathematical structure, if the same action also causes the input cursor to become located in the last portion of the new mathematical structure, then the new mathematical structure becomes "expulsion-eligible." Such an embodiment will be said to have the "automatic structure exiting feature." For example, if an actuation of the fraction initialization key causes the interface to create a new fraction and to move the cursor into the denominator of the new fraction, then the new fraction becomes expulsion-eligible. In an embodiment, whenever the input cursor is fully outside of the last portion of a mathematical structure that was expulsion-eligible, the structure ceases to be expulsion-eligible.

In an alternative embodiment that does not have the automatic structure exiting feature, for purposes of the interface behaviors that are described below, mathematical structures are never expulsion-eligible.

In an embodiment, except as specified above, when a user types a character that is expulsion-eligible within a mathematical structure that is expulsion-eligible, the interface will decide to expel that character. For example, in an embodiment, when a user has typed $\sqrt{(1+3)}$, the input cursor is within and at the end of the square root, the square root is expulsion-eligible, and the user's most recent action was not a cursor navigation action, if the user's next action is an actuation of the plus key then the plus sign character is expulsion-eligible because moving the plus sign out of $\sqrt{(1+3)+}$ would constitute a normal structure modification, so the interface will expel the plus sign, yielding $\sqrt{(1+3)}+$.

Similarly, in an embodiment, except as specified above, when a user types an expulsion-eligible fraction bar, if the input cursor is within and at the end of the last portion of a mathematical structure that is expulsion-eligible, then the interface will (after creating the new fraction) immediately decide to expel the fraction bar as described above. For example, in an embodiment, when a user has typed $\sqrt{(1+3)}$, the input cursor is within and at the end of the square root, the square root is expulsion-eligible, and the user's most recent action was not a cursor navigation action, if the user's next action is an actuation of the fraction bar key, then the interface will first create a new fraction, at which point the result will be $$\sqrt{\frac{(1+3)}{\square}},$$

and then the interface will immediately decide to expel the fraction bar, yielding $$\frac{\sqrt{(1+3)}}{\square}.$$

In an embodiment, whenever the input cursor is within the last portion of an expulsion-eligible mathematical structure and it is the case that typing a plus sign would cause the interface to expel the plus sign as described above, the interface will be in a "bipositional entry mode," and the interface will display the input cursor in a special location in order to visually indicate that the next character that is entered may or may not be placed within a mathematical structure, just as the multimode math input interface described in U.S. Pat. No. 8,788,548 does when that interface is in a bipositional entry mode. However, when the interface is in a bipositional entry mode, if this causes the interface to display the input cursor in such a way that the cursor appears to be only partially within the expulsion-eligible mathematical structure, then the input cursor will still be considered to be entirely within the last portion of the expulsion-eligible mathematical structure for purposes of the behaviors that are described herein. In an embodiment, if a user actuates the left arrow key when the input cursor is displayed in such a special location, then the mathematical structure will cease to be expulsion-eligible and the interface will exit bipositional entry mode, so it will no longer be the case that typing a plus sign would cause the interface to automatically exit the mathematical structure, and so the input cursor will no longer be displayed in a special location; pressing the left arrow key in such circumstances will have no other effect.

The multimode math input interface that is disclosed in U.S. Pat. No. 8,788,548 has a feature such that when the input cursor is within and at the end of the last portion of a mathematical structure, in certain circumstances the interface will enter a special bipositional entry mode such that if the user's next action is typing a character, depending on the particular bipositional entry mode that the interface is in and the particular character the user types, the interface may or may not automatically move the input cursor out of the mathematical structure before inserting the character into the user's input. The automatic structure exiting feature described above causes the same interface behavior as that previously described feature in most circumstances, but causes different behavior in certain circumstances, and is described above using different terminology than was used in U.S. Pat. No. 8,788,548 so as to facilitate explaining other interface improvements that are described herein.

Alterable Structure Exiting

In an embodiment, whenever a user types a character or fraction bar that is expulsion-eligible but not expulsion-mandatory within a mathematical structure, the interface's decision whether or not to expel the character from the mathematical structure will be an alterable decision. Such an embodiment will be said to have "the alterable structure exiting feature." When such an alterable decision is in response to typing a character that is expulsion-eligible but not expulsion-mandatory, it is an "alterable structure exiting decision." When it is in response to typing a fraction bar that is expulsion-eligible but not expulsion-mandatory, it is an "alterable fraction initialization decision" that is an "alterable fraction bar expulsion decision"; other types of alterable fraction initialization decisions are explained farther below.

In an embodiment, as an exception, when a user types a character or fraction bar that is expulsion-eligible within a mathematical structure, if the user's most recent previous action either was a cursor navigation action that moved the input cursor into the mathematical structure or was an actuation of the left arrow key that caused the mathematical structure to cease to be expulsion-eligible, then the interface's decision not to expel the character from the mathematical structure will not be an alterable decision unless the character is expulsion-mandatory.

In an embodiment, if the input cursor is at the end of the alterable block of an alterable structure exiting decision when altering the decision causes the interface to move that alterable block into the last portion of the relevant mathematical structure, the interface will move the input cursor itself into the mathematical structure also if this is necessary in order for the movement of the alterable block to constitute a valid structure modification, but will not move the input cursor into the mathematical structure otherwise. An example of this distinction is given in the following paragraph.

In an embodiment, the alterable block of an alterable structure exiting decision will initially contain only the expulsion-eligible character the user typed, but such a decision is an alterable input state decision as defined farther above and so in certain circumstances its alterable block may continue to grow. For example, in an embodiment, the keystroke sequence [square root] 4+ yields $\sqrt{4}$+. At this point, the alterable block of the alterable structure exiting decision contains only the plus sign. If the user alters the decision at this point, the interface will move the plus sign into the square root, and it will also move the input cursor into the square root because this is necessary in order for the movement of the alterable block to constitute a valid structure modification. If the user does not alter the decision at this point but instead presses the 5 key, then the result will be $\sqrt{4}$+5, and the numeral 5 will also become contained in the alterable block. Altering the alterable structure exiting decision at this point will yield $\sqrt{4+5}$, and will not cause the interface to move the input cursor into the square root because the movement of the alterable block constitutes a valid structure modification regardless.

In an embodiment, an alterable structure exiting decision may become a multi-alternative alterable input state decision, as follows: if the input cursor is at the end of the alterable block of an alterable structure exiting decision when a user types a character that then becomes contained in the alterable block, then if that character would be expulsion-eligible but not expulsion-mandatory if it were the last character in the relevant mathematical structure, then the alterable structure exiting decision will gain an alternate option such that if the option becomes selected then everything in the alterable block before that character will be included in the mathematical structure, but that character and everything after it will not be included in the mathematical structure. For example, in an embodiment that has the automatic structure exiting feature, if a user types the keystroke sequence [square root] 1+3+5, the interface will yield $\sqrt{1}$+3+5. During that keystroke sequence, the first time the user presses the plus key the interface makes an alterable structure exiting decision that initially has a single alternate option; later, the alterable block of the decision grows, so that first alternate option eventually becomes $\sqrt{1+3+5}$. The second time the user presses the plus key, the resulting plus sign character would have been expulsion-eligible but not expulsion-mandatory if it had been the last character in the square root, so the alterable structure exiting decision gains a second alternate option, which eventually becomes $\sqrt{1+3}$+5. Similarly, in an embodiment that does not have the automatic structure exiting feature, if a user types the keystroke sequence [square root] 1+3+5, the interface will yield $\sqrt{1+3+5}$, and an alterable structure exiting decision will exist that has the two alternate options $\sqrt{1}$+3+5 and $\sqrt{1+3}$+5. (Chapter 14 explains features that may facilitate selecting a particular desired option of a multi-alternative alterable input state decision, and in that explanation, a multi-alternative alterable input state decision with the three options $\sqrt{1}$+3+5, $\sqrt{1+3+5}$, and $\sqrt{1+3}$+5 is used as an example in several places.)

In an embodiment, if the input cursor is at the end of the alterable block of an alterable structure exiting decision when a user types a character that would be expulsion-mandatory if it were the last character in the relevant mathematical structure, then that character will not be included in the alterable block of the alterable structure exiting decision and so that alterable block will permanently cease to grow (if it had not already ceased to grow). For example, in an embodiment, the keystroke sequence [square root] 1+234=will yield $\sqrt{1}$+234=, and the alterable block of the alterable structure exiting decision will include the plus sign and the numeral 234 but not include the equals sign.

If an embodiment with the alterable structure exiting feature also has the automatic structure exiting feature as described above, then the interface will be quite similar to the multimode math input interface described in U.S. Pat. No. 8,788,548, but when the interface automatically exits the mathematical structure, its decision to do so will in most cases be alterable. Conversely, if an embodiment with the alterable structure exiting feature does not have the automatic structure exiting feature as described above, then the interface will not automatically exit a mathematical structure unless a user types a character that is expulsion-mandatory, but in many cases its decision to not automatically exit a mathematical structure will be alterable. For example, in an embodiment that has the alterable structure exiting feature, the keystroke sequence [square root] 4+5 will initially yield $\sqrt{4}$+5 if the interface has the automatic structure exiting feature or will initially yield $\sqrt{4+5}$ if it does not, but in either case an alterable structure exiting decision will exist such that the two options of the decision are $\sqrt{4}$+5 and $\sqrt{4+5}$. The alterable structure exiting feature may thus be a useful mistake correction feature whether or not the interface also has the automatic structure exiting feature.

The Fraction Initialization Key

In various interfaces, including the multimode math input interface disclosed in U.S. Pat. No. 8,788,548, actuating a certain key will cause the interface to create a new fraction and may also cause the interface to move previously typed input into the new fraction's numerator. Such a fraction creation key is a "fraction bar key" as defined in Chapter 41. Typically, in an interface that has a fraction bar key, when the fraction bar key is actuated, the interface will determine what if anything would constitute the dividend of the division operator if a division operator were inserted into the user's input at the input cursor location, and if such a potential dividend exists, then the interface will include that potential dividend in the numerator of the new fraction, and will move the input cursor into the denominator of the new fraction. For example, in various interfaces the keystroke sequence 1/ will yield the result $$\frac{1}{\square}.$$

(In the preceding sentence, and throughout the present specification, a forward slash character in a keystroke sequence represents the fraction bar key.)

In an embodiment of the present invention, the computing device has a fraction initialization key such that a first actuation of the key will cause the interface to create a new fraction, but in certain circumstances multiple consecutive actuations of the key will cause the interface to create only one fraction: each consecutive actuation of the fraction initialization key after the first actuation will if possible modify the numerator of the fraction that was created in response to the first actuation, as described below.

In an embodiment, when the interface creates a new fraction in response to an actuation of the fraction initialization key, the interface will initialize the new fraction as follows: First, the interface will insert an empty fraction template at the input cursor location and move the input cursor into the new fraction's numerator. Second, the interface will determine whether a normal simple expansion of the new fraction's numerator is possible, and if a normal simple expansion of the new fraction's numerator is possible then the interface will perform the smallest normal simple numerator expansion. In an embodiment, after thus initializing the new fraction, in certain circumstances the interface may expel the fraction bar, as is described above.

In an embodiment, when in response to an actuation of the fraction initialization key the interface creates a fraction and performs the smallest normal simple numerator expansion, the result that would have obtained if the interface had left the new fraction's numerator empty (rather than performing the smallest normal simple numerator expansion) will constitute a "skipped expansion result" for purposes of the alterable fraction initialization decisions that are described below. Also, in such circumstances, the interface will remember as a skipped expansion result any result that would have obtained if it had performed a smaller numerator expansion of the fraction's numerator that would have been a valid but abnormal numerator expansion. For example, the keystroke sequence x+yz/ will yield the result $$x+\frac{yz}{\square};$$

after such a keystroke sequence, the interface will remember the skipped expansion result $$x+yz\frac{\square}{\square}$$

and the skipped expansion result $$x+y\frac{z}{\square}.$$

As another example, the keystroke sequence x+/ will yield the result $$x+\frac{\square}{\square}$$

because no normal simple expansion of the fraction's numerator in the expression $$x+\frac{\square}{\square}$$

is possible, and after such a keystroke sequence the interface will not remember any skipped expansion result.

In an embodiment, as an exception, when the interface creates a fraction, if the mathematical expression the user has typed thus far includes a space character that is not immediately after a function identifier, then after the interface inserts an empty fraction template at the input cursor location, if moving everything between the space character and the empty fraction template into the new fraction's numerator would constitute a valid simple numerator expansion, then the interface will do so, rather than creating a fraction as described in the preceding paragraph. In an embodiment, when the interface does so, it will remember as a skipped expansion result any result that would have obtained if it had performed a smaller numerator expansion of the fraction's numerator that would have been a valid numerator expansion. In an embodiment, the interface will then delete the space character. For example, in an embodiment, the keystroke sequence x+y+z/ will yield $$x+\frac{y+z}{\square};$$

the keystroke sequence 2¾ will yield $$2\frac{3}{4}.$$

In an embodiment, if the input cursor is in the numerator of an empty fraction template when a numerator expansion causes that numerator to become nonempty, then the interface will move the input cursor into the fraction's denominator. Subsequently, until the user performs an action that does not cause a numerator expansion or numerator contraction of that particular numerator, any action that causes a numerator contraction that makes that numerator empty again will also cause the interface to move the input cursor back into the fraction's numerator. For example, in an embodiment, if the user types 2 and then actuates the fraction initialization key, the interface will create a new empty fraction template and immediately move the numeral 2 into its numerator, so the interface will move the input cursor into the fraction's denominator. If the user then immediately alters an alterable fraction initialization decision so as to cause the newly created fraction to have an empty numerator, then the interface will move the input cursor back into the fraction's numerator.

Numerator Cycling

In an embodiment, as a special case, after a first actuation of the fraction initialization key causes the interface to expel a fraction bar, if the user's next action is a second consecutive actuation of the fraction initialization key, then in response to that actuation of the fraction initialization key, rather than creating a new fraction, the interface will undo the expulsion of the fraction bar. Further consecutive actuations of the fraction initialization key may then cause the interface to cycle the numerator as described below. For example, in an embodiment, if the input cursor is within the square root and after the 4 in the expression 2+$\sqrt{4}$ when a user actuates the fraction initialization key, and the interface decides to expel the fraction bar and so this yields the result $$2+\frac{\sqrt{4}}{\square},$$

then if the user then actuates the fraction initialization key a second consecutive time this will yield the result $$2+\sqrt{\frac{4}{\square}}.$$

If the user then actuates the fraction initialization key a third and fourth consecutive time, these additional consecutive actuations will cause the interface to cycle the numerator as described below, yielding $$2+\frac{\sqrt{4}}{\square}$$

again and then yielding $$\frac{2+\sqrt{4}}{\square}.$$

In an embodiment, except in the circumstances described in the preceding paragraph, in response to an actuation of the fraction initialization key that is at least the second consecutive actuation of that key, rather than creating a new fraction, the interface will "cycle the numerator" of the fraction that was created the first consecutive time the fraction initialization key was actuated.

In an embodiment, when the interface cycles the numerator of a fraction, the interface will determine whether a normal expansion of the fraction's numerator is possible, and if so, then the interface will perform the smallest such numerator expansion, and the interface will remember as a skipped expansion result any result that would have obtained if it had performed a smaller numerator expansion of the fraction's numerator that would have been a valid but abnormal numerator expansion. For example, in an embodiment, after the keystroke sequence x+y+z/ yields the result $$x+y+\frac{z}{\square},$$

a second consecutive actuation of the fraction initialization key will convert the result to $$x+\frac{y+z}{\square},$$

and a third consecutive actuation of the fraction initialization key will convert it to $$\frac{x+y+z}{\square}.$$

In an embodiment, when the interface cycles the numerator of a fraction, if a normal expansion of the fraction's numerator is not possible, then the interface will determine whether a valid contraction of the fraction's numerator is possible, and if so, then the interface will perform the largest such valid numerator contraction, and the interface will remember as a skipped expansion result any result that would have obtained if it had performed a valid but abnormal numerator expansion. For example, cycling the numerator of the fraction in the expression $$\frac{x+y+z}{\square}$$

will yield the result $$x+y+\frac{z}{\square}.$$

In an embodiment, when the interface cycles the numerator of a fraction, if the interface performs a numerator contraction as described in the preceding paragraph, then the interface will enter a special slower numerator cycling mode for that fraction. As soon as the user performs any action that does not cause the interface to cycle the numerator of the same fraction, the interface will exit this special mode. While the interface is in this special mode, when the interface cycles the numerator of the fraction, the interface will determine whether a valid expansion of the fraction's numerator is possible, and if so, then the interface will perform the smallest such numerator expansion even if it is an abnormal numerator expansion: it will not skip any valid but abnormal numerator expansion. If a valid expansion of the fraction's numerator is not possible, then the interface will perform the largest valid contraction of the fraction's numerator, as described in the preceding paragraph. For example, in an embodiment, the keystroke sequence a+bcd/ will yield $$a+\frac{bcd}{\square},$$

after which a second consecutive actuation of the fraction initialization key will yield $$\frac{a+bcd}{\square},$$

a third consecutive actuation of the fraction initialization key will yield $$a + bc\frac{d}{\square},$$

and a fourth consecutive actuation of the fraction initialization key will yield $$a + b\frac{cd}{\square}.$$

Essentially, in such an embodiment, a user can pull into a new fraction's numerator as much or as little of the previously typed mathematical input as desired by actuating the fraction initialization key a certain number of times consecutively, provided that the desired result is syntactically valid.

In an embodiment, if a user actuates the fraction initialization key when the input cursor is positioned on a fraction bar, the interface will cycle the numerator of that fraction. For example, in an embodiment, the keystroke sequence x+y+z/w will yield $$x + y + \frac{z}{w},$$

and if the user then positions the input cursor on the fraction bar of the fraction $$\frac{z}{w}$$

and actuates the fraction initialization key twice, the result will be $$\frac{x + y + z}{w}.$$

In an embodiment, after one or more consecutive actuations of the fraction initialization key that cause the interface to cycle the numerator of a fraction, if the user's next action is an actuation of the Escape key, then in response to that action, the interface will return the user's input to the state it was in immediately prior to the first of the consecutive actuations of the fraction initialization key that caused the interface to cycle the numerator of the fraction. Thus, if a user actuates the fraction initialization key two or more consecutive times and the first of these consecutive actuations causes the interface to create a new fraction and all the other consecutive actuations cause the interface to cycle that fraction's numerator, then if the user's next action is an actuation of the Escape key, the interface will return the user's input to the state it was in immediately after the actuation that caused the fraction to be created. If a user positions the input cursor on a fraction bar and actuates the fraction initialization key one or more consecutive times, and each of these actuations of the fraction initialization key cause the interface to cycle the fraction's numerator as described in the preceding paragraph, then if the user's next action is an actuation of the Escape key, the interface will return the user's input to the state it was in immediately before these actuations of the fraction initialization key.

Figure 27:
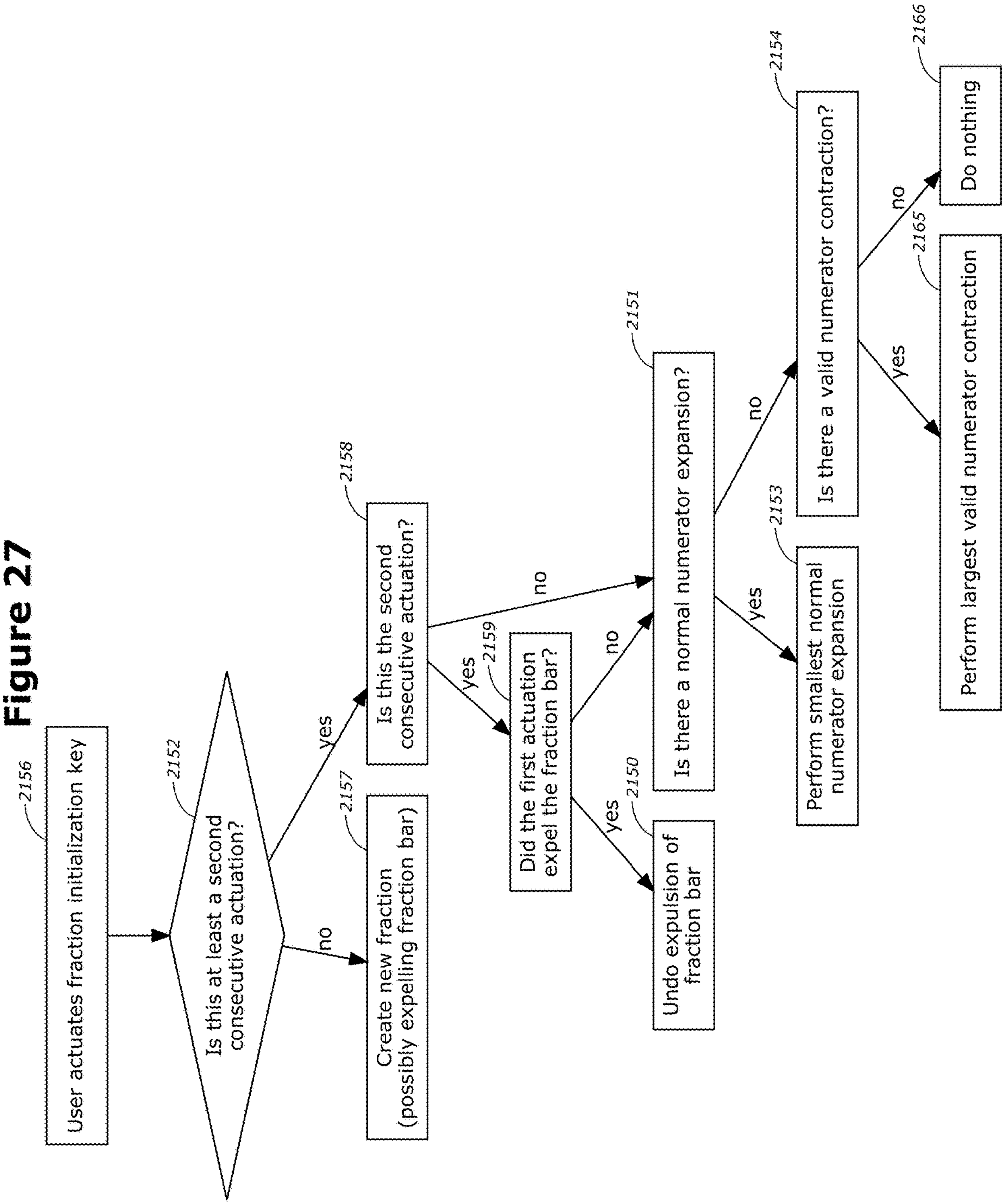
FIG. 27 is a flowchart that illustrates the results that occur when the user presses the fraction initialization key, in an embodiment that has a relatively simple version of the fraction initialization key, according to an embodiment.

FIG. 27 is a flowchart that illustrates the results that occur when the user presses the fraction initialization key, in an embodiment that has a relatively simple version of the fraction initialization key. The process beings with Block 2701, which says, "User actuates fraction initialization key" and proceeds to Block 2702, which asks, "Is this at least a second consecutive actuation?" If the answer is no, the interface creates a new fraction, which may cause the interface to move previously typed input into the new fraction's numerator, and may even cause the interface to expel the fraction bar as described above, thus moving a previously typed structure into the new fraction's numerator. If the answer is yes, the process continues with Block 2704, which asks, "Is this the second consecutive actuation?" If the answer is yes, the next question is in Block 2705, "Did the first actuation expel the fraction bar?" If the answer to this question is yes, then the interface will undo the expulsion of the fraction bar (Block 2706). If the answer to the question in Block 2704 or in Block 2705 is no, the process will continue with Block 2707, which asks, "Is there a normal numerator expansion?" If the answer is yes, then the interface will perform the smallest normal numerator expansion (Block 2708). If the answer is no, the process continues with Block 2709, which asks, "Is there a valid numerator contraction?" If the answer is yes, then the interface will perform the largest valid numerator contraction (Block 2710). If the answer is no, than the interface will do nothing (Block 2711).

Altering Fraction Initialization

In an embodiment, as is described above, when the interface makes an alterable decision whether or not to expel a fraction bar, such a decision is an "alterable fraction initialization decision" that is an "alterable fraction bar expulsion decision."

In an embodiment, after one or more consecutive actuations of the fraction initialization key, if the most recent of these actuations of the fraction initialization key caused the interface to remember one or more skipped expansion results as explained above, then the interface's decision to skip such expansion results is an alterable decision such that each of the skipped expansion results is an alternate option of this decision. Such a decision is an "alterable fraction initialization decision" that is an "alterable expansion decision." In an embodiment, any alternate option that consists of a skipped expansion result such that the newly created fraction would have an empty numerator will have a very low probability of alteration, lower than any other skipped expansion result. For example, in an embodiment, the keystroke sequence x+yz/ will yield the result to $$x + \frac{yz}{\square},$$

and then an immediate actuation of the alteration key will convert the result to $$x + y\frac{z}{\square};$$

a second consecutive actuation of the alteration key will convert the result to $$x+yz\frac{\square}{\square}.$$

Because consecutive actuations of the fraction initialization key have a special effect, the fraction initialization key is a multi-click key. In an embodiment, after two or more consecutive actuations of the fraction initialization key, the interface's decision to respond to the last of the consecutive actuations of the fraction initialization key with its special multi-click effect is an alterable decision with a low probability of alteration. Such a decision is an "alterable fraction initialization decision" that is an "alterable multi-click decision." Altering such a decision will undo the key's special multi-click effect, which was a structure modification, and invoke the key's non-multi-click effect, which is the creation of a new fraction at the input cursor location. For example, in an embodiment, the keystroke sequence x+yz// will yield the result $$\frac{x+yz}{\square},$$

and then altering the multi-click decision will convert the result to $$x+\frac{\frac{yz}{\square}}{\square}.$$

In an embodiment, three different types of alterable fraction initialization decisions are possible as described in the three preceding paragraphs. A first actuation of the fraction initialization key may cause the interface to make both an alterable fraction bar expulsion decision and an alterable expansion decision; an actuation of the fraction initialization key that is at least a second consecutive actuation may cause the interface to make both an alterable multi-click decision and an alterable expansion decision. In an embodiment, if in response to an actuation of the fraction initialization key the interface makes two types of alterable fraction initialization decisions, then the interface will combine these two alterable decisions into a single multi-alternative alterable decision. For example, in an embodiment, after a user types $\sqrt{4}$ and then actuates the fraction bar key, and the interface expels the fraction bar and so yields the result $$\frac{\sqrt{4}}{\square},$$

th alternate options of the combined fraction initialization decision are $$\sqrt{\frac{4}{\square}}$$

(which was the alternate option of an alterable fraction bar expulsion decision) and $$\sqrt{4\frac{\square}{\square}}$$

(which was the alternate option of an alterable expansion decision). As another example, in an embodiment, after the keystroke sequence xy+z// yields the result $$\frac{xy+z}{\square},$$

the alternate options of the combined fraction initialization decision are $$x\frac{y+z}{\square}$$

(which was the alternate option of an alterable expansion decision) and $$xy+\frac{\frac{z}{\square}}{\square}$$

(which was the alternate option of an alterable multi-click decision).

In an embodiment, after one or more consecutive actuations of the fraction initialization key cause an alterable fraction initialization decision to exist, if the user's next action is another consecutive actuation of the fraction initialization key, then the previously existing alterable fraction initialization decision will cease to exist. In other words, after any sequence of two or more consecutive actuations of the fraction initialization key, if any alterable fraction initialization decision exists, then it will pertain to the last of those consecutive actuations of the fraction initialization key. For example, in an embodiment, after a user inputs $$x+\frac{yz}{\square}$$

by means of the keystroke sequence x+yz/ an alterable fraction initialization decision will exist such that altering the decision would yield the result $$x+y\frac{z}{\square},$$

but if the user does not alter that decision and instead presses the fraction initialization key a second consecutive time, then that decision will be deleted; the result will be $$\frac{x+yz}{\square},$$

and a new alterable fraction initialization decision will exist such that altering the decision would yield the result $$x+\frac{\frac{yz}{\square}}{\square}.$$

In an embodiment, after one or more consecutive actuations of the fraction creation key, as soon as the user performs an action that is not an actuation of the fraction creation key and does not pertain to alteration functionality, the interface will create an alterable fraction initialization decision that has one alternate option corresponding to each distinct result that can be obtained by continuing to repeatedly cycle the fraction's numerator. Such interface behavior may be advantageous whether or not the fraction creation key is a fraction initialization key as described above. For example, in an embodiment, the keystroke sequence x+y+z/w will yield $$x+y+\frac{z}{w},$$

and then by altering the fraction initialization decision the user can achieve the result $$x+\frac{y+z}{w}$$

or the result $$\frac{x+y+z}{w}.$$

If no new result can be obtained by cycling the fraction's numerator, then the interface will not cause such an alterable fraction initialization decision to exist; for example, when the user has typed only the keystroke sequence 1/2, no alterable fraction initialization decision will exist.

In an embodiment, after one or more consecutive actuations of the fraction initialization key, if the user's next action is a destructive action, then for purposes of the automatic decision variation feature, the interface may still cause an alterable fraction initialization decision to exist that is as described in the preceding paragraph before processing the destructive action and possibly causing the decision to be immediately deleted. For example, in an embodiment, the keystroke sequence x+y+z/ will yield $$x+y+\frac{z}{\square},$$

and if the user then deletes the fraction bar, then the interface will cause an alterable fraction initialization decision to exist that has the alternate options $$x+\frac{y+z}{\square}$$

and $$\frac{x+y+z}{\square}$$

before processing the destructive action and deleting the alterable decision; the alterable decision may then become a remembered alterable decision for purposes of the automatic decision variation feature. Therefore, in an embodiment that has option-specific alterable blocks for purposes of the automatic decision variation feature, if a user causes the interface to initialize a fraction that has a different numerator than the user intended, the user may be able to correct such a mistake by deleting and retyping the portion of input that does not match what the user intended. For example, in an embodiment, if a user intends to type $$x+\frac{y+z}{\square}$$

but uses the keystroke sequence x+y+z/ and thus receives the result $$x+y+\frac{z}{\square},$$

then the user may be able to correct this mistake by backspacing until all that remains is x+ and then again typing the keystroke sequence y+z/, whereupon the automatic decision variation feature may cause the interface to yield the desired result instead of repeating the same undesired result.

In an embodiment, after one or more consecutive actuations of the fraction initialization key, as soon as the user performs an action that is not an actuation of the fraction initialization key and does not pertain to alteration functionality, if an alterable fraction initialization decision already existed as a result of the last of the consecutive actuations of the fraction initialization key, then rather than creating a new alterable fraction initialization decision, the interface will add any additional alternate options to the alterable fraction initialization decision that already existed. For example, in an embodiment, after a user inputs $$x+\frac{yz}{\square}$$

by means of the keystroke sequence x+yz/ an alterable fraction initialization decision will exist such that altering the decision would yield the result $$x+y\frac{z}{\square};$$

is the user's next keystroke is w, then that alterable fraction initialization decision will still have an alternate option such that selecting the option would cause the interface to move the letter y out of the fraction's numerator (which would now yield the result $$x+y\frac{z}{w}),$$

and it will now also have an alternate option such that selecting the option would cause the interface to cycle the fraction's numerator, yielding the result $$\frac{x+yz}{w}.$$

However, in an embodiment, after two or more consecutive actuations of the fraction initialization key, as soon as the user performs an action that is not an actuation of the fraction initialization key and does not pertain to alteration functionality, the interface will reduce the probability of alteration of any alterable fraction initialization decision pertaining to those consecutive actuations of the fraction initialization key; in an embodiment, it will reduce such a probability of alteration quite substantially unless the deliberation score of the last of the consecutive actuations of the fraction initialization key was very low. Essentially, in such an embodiment, the interface will assume that a second consecutive actuation of the fraction initialization key typically indicates that a user is paying careful attention to the numerator of the new fraction, and probably will not need to correct it later. However, in such an embodiment, if a user actuates the fraction initialization key only once and then the user's next action is not another consecutive actuation of the fraction initialization key and does not pertain to alteration functionality, then the interface will not perform any such special reduction of the probability of alteration of any alterable fraction initialization decision pertaining to that single actuation of the fraction initialization key.

Smart Fraction Initialization

In an embodiment, if a user actuates the fraction bar key when the input cursor is at the end of a subscript that is immediately after the letter C or the letter P in an expression that represents combinations or permutations, then that constitutes typing an expulsion-mandatory fraction bar. Therefore, for example, if the input cursor is within the subscript and immediately to the right of the numeral 2 in the expression ${}_5C_2$ when a user actuates the fraction bar key, the result will be a fraction with ${}_5C_2$ as its numerator.

In an embodiment, if a user actuates the fraction bar key when the input cursor is at the end of any portion of a Sigma mathematical structure, then that portion of the Sigma mathematical structure will be treated as the last portion of the Sigma mathematical structure and the user's action will constitute typing an expulsion-mandatory fraction bar. In an embodiment, the Sigma mathematical structure is a prefix structure as defined in the preceding chapter, so expelling the fraction bar will also cause the interface to move the Sigma mathematical structure out of the fraction's numerator. Therefore, for example, if the input cursor is immediately to the right of either the numeral 1 or the numeral 5 in the expression $$\sum_{i=1}^{5}$$

when a user actuates the fraction bar key, the result will be $$\sum_{i=1}^{5}\frac{\square}{\square}.$$

In certain math textbooks, a "stacked fraction" is defined to be a fraction that contains another fraction in its numerator or denominator. For example, $$\frac{\frac{1}{2}}{3}$$

is a fraction that contains $$\frac{1}{2}$$

in its numerator, and is thus a stacked fraction. In math textbooks, it is not unusual to encounter a stacked fraction such as $$\frac{\frac{1}{2}}{3}$$

that contains a fraction in its numerator or denominator, and it is not unusual to encounter a stacked fraction such as $$\frac{\frac{1}{2}}{\frac{3}{4}}$$

that contains both a fraction in its numerator and a fraction in its denominator, but it is relatively unusual to encounter a fraction such as $$\frac{\frac{\frac{1}{2}}{3}}{4}$$

that contains another stacked fraction in its numerator or denominator.

In an embodiment, if a user actuates the fraction bar key when the input cursor is in the denominator of a fraction that contains a fraction in its numerator, then even if the fraction is an expulsion-eligible mathematical structure and the interface is in a bipositional entry mode as defined above, the interface will respond as though the fraction were not an expulsion-eligible mathematical structure. Therefore, for example, in such an embodiment, if the keystroke sequence 1/2/3 has yielded $$\frac{\frac{1}{2}}{3}$$

and the interface is in a bipositional entry mode such that the next key actuation could cause the interface to automatically exit the stacked fraction's denominator, then actuating the fraction bar key nevertheless will not cause the interface to expel the fraction bar; the result of such an actuation will be $$\frac{\frac{\frac{1}{2}}{3}}{\square}.$$

In such an embodiment, if the keystroke sequence 1/2/3 yields the result $$\frac{\frac{1}{2}}{3},$$

then the keystroke sequence 1/2/3/4 will yield the result $$\frac{\frac{\frac{1}{2}}{3}}{4}.$$

Animating Numerator Changes

In various math input interfaces, when a fraction bar key (as defined farther above) is actuated, the interface will create a new fraction and will either leave the new fraction's numerator empty or will move previously typed input into the new fraction's numerator. In an embodiment of the present invention, when a user actuates a fraction bar key, if the interface will move previously typed input into the new fraction's numerator, then the interface will not do so instantaneously: instead, the interface will first insert an empty fraction template into the user's input and then move previously typed input into the new fraction's numerator, and the movement of previously typed input will be animated, as explained farther above. In an embodiment, if the interface distinctively highlights different types of interface-specified changes in different ways, then such movement of previously typed input will be highlighted as a multi-click change if the fraction bar key is a fraction initialization key as defined above, or will be highlighted as an autocorrection change otherwise.

In an embodiment, when an actuation of the fraction initialization key causes the interface to move input into or out of a previously existing fraction's numerator, this movement will be animated. In an embodiment, if the interface distinctively highlights different types of interface-specified changes in different ways, then such movement will be highlighted as a multi-click change.

Structure Inclusion Toggling

The interface behaviors described in the following paragraph are referred to as "the structure inclusion toggling feature" in the present specification.

In an embodiment, if a user actuates the plus key when the input cursor is immediately after a plus sign operator, or if a user actuates the minus key when the input cursor is immediately after a minus sign operator, and if the sign operator that was already present is either the last character within a mathematical structure or the first character after a mathematical structure, then rather than inserting a second consecutive sign operator into the user's input, the interface will respond to the key actuation by moving the sign operator that was already present: if that sign operator was the last character within a mathematical structure, then the interface will move that sign operator out of the mathematical structure so that it is the first character after the mathematical structure; if that sign operator was the first character after a mathematical structure, the interface will move that sign operator into the mathematical structure so that it is the last character within the mathematical structure. When the interface thus moves a character, it will also move the input cursor so that the cursor will then be positioned immediately after the character in its new location. For example, if a user has typed $\sqrt{4}+$ and the cursor is immediately after the plus sign operator, then if the user actuates the plus key, the input will be converted from $\sqrt{4}+$ to $\sqrt{4+}$. If the user then actuates the plus key again, the input will be converted from $\sqrt{4+}$ back to $\sqrt{4}+$.

In an embodiment that has the automatic structure exiting feature that is explained farther above, it will frequently be the case that the input cursor will be within the last portion of an expulsion-eligible mathematical structure and at the end of the mathematical structure and that the interface will thus be in a bipositional entry mode, and that the user will then actuate either the plus key or the minus key, and that this actuation of the plus key or the minus key will cause the interface to expel the plus sign or minus sign, and will additionally cause the interface to exit the special bipositional entry mode and return to default entry mode. In an embodiment, if such an event occurs, and if an immediately subsequent consecutive actuation of the same sign operator key causes the interface to move the sign operator back into the mathematical structure that it was just expelled from (as described in the preceding paragraph), then in addition to moving the sign operator back into the mathematical structure, the interface will also make the mathematical structure expulsion-eligible again and will thus re-enter the special bipositional entry mode that the interface was in before the initial actuation of the sign operator key. If the embodiment is one where a bipositional entry mode is associated with a special cursor location, such as partly within a mathematical structure, then the interface will thus also return the cursor to the appropriate special location. For example, in an embodiment, if a user types the keystroke sequence 1/2 and the interface is in a bipositional entry mode, and the user then actuates the plus key once, then the interface will expel the plus sign from the denominator and the result will be $$\frac{1}{2}+;$$

if the user then actuates the plus key a second time, the result will be $$\frac{1}{2+}$$

and the interface will again be in a bipositional entry mode such that a subsequent actuation of the plus key will cause the interface to expel a plus sign from the denominator again. Thus, in such an embodiment, a user can input the expression $$\frac{1}{2+3}+4$$

by means of the keystroke sequence 1/2++3+4, without ever actuating an arrow key or parenthesis key.

In an embodiment, as an exception, if a user presses an arrow key to move the input cursor into or out of a mathematical structure and then actuates the plus key twice consecutively or actuates the minus key twice consecutively, then the mathematical structure that the input cursor just moved into or out of will not exist for purposes of the structure inclusion toggling feature. In other words, if a user presses the right arrow key to move the input cursor out of a mathematical structure and then actuates the plus key twice consecutively or actuates the minus key twice consecutively, then the interface will not move the sign operator into that mathematical structure in response to the second consecutive actuation of the sign operator key; if a user presses the left arrow key to move the input cursor into a mathematical structure and then actuates the plus key twice consecutively or actuates the minus key twice consecutively, then the interface will not move the sign operator out of that mathematical structure in response to the second consecutive actuation of the sign operator key.

If a user actuates the plus key when the input cursor is immediately after a plus sign operator, or if the user actuates the minus key when the input cursor is immediately after a minus sign operator, it is possible that the sign operator that was already present may simultaneously be both the last character within a mathematical structure and the first character after a mathematical structure. For example, the plus sign in the expression $$\frac{1}{\sqrt{2}\,+}$$

is both the last character within a fraction mathematical structure and the first character after a square root mathematical structure. In such a case, it is not possible for the interface simultaneously to move the sign operator out of the mathematical structure that it was in (thus moving the operator to the right) and to move the sign operator into the mathematical structure that it was after (thus moving the operator to the left). Such a case will be referred to in the following paragraphs as "an ambiguous case." In an embodiment, the structure inclusion toggling feature will still take effect in an ambiguous case, and will either move the sign operator to the right (out of the mathematical structure that it was in) or to the left (into the mathematical structure that it was after).

In an embodiment, if a user actuates either the left arrow key or the right arrow key and then actuates a sign operator key twice consecutively so that the first actuation of the sign operator key causes the entry of a sign operator into the user's input and the second actuation of the sign operator key invokes the structure inclusion toggling feature in an ambiguous case, then the mathematical structure that the input cursor just moved into or out of will not exist for purposes of the structure inclusion toggling feature, so the interface will move the sign operator in the same direction as the direction of the most recently actuated arrow key. For example, if the user's input is $$\frac{1}{\sqrt{2}}$$

and the input cursor is immediately after the fraction, and the user then actuates the left arrow key to move the cursor into the fraction's denominator and then actuates the plus key twice, then the second actuation of the plus key will cause the interface to move the plus sign left (into the square root), not right (out of the fraction's denominator).

In an embodiment, if a user invokes the structure inclusion toggling feature in an ambiguous case and this invocation of the structure inclusion toggling feature is at least the second consecutive invocation of the structure inclusion toggling feature, then this invocation of the structure inclusion toggling feature will cause the interface to move the sign operator in the same direction that the immediately prior invocation did, rather than causing the interface to reverse the effect of the immediately prior invocation; thus, for example, a user can convert the expression $$\frac{1}{\sqrt{2}}+$$

into the expression $$\frac{1}{\sqrt{2+}}$$

or vice versa by invoking the structure inclusion toggling feature twice consecutively. In an embodiment, otherwise, if the structure inclusion toggling feature is invoked in an ambiguous case, then the interface will move the sign operator to the right by default; in an alternative embodiment, otherwise, if the structure inclusion toggling feature is invoked in an ambiguous case, the interface will move the sign operator to the left by default.

In an embodiment, when an actuation of the plus key or the minus key causes the structure inclusion toggling feature to be invoked, the invocation of the structure inclusion toggling feature is implemented as an alterable interface decision such that altering this decision will cause the user's input to appear as though that key actuation had been processed without causing the structure inclusion toggling feature to be invoked. For example, in an embodiment, if a user types the fraction $$\frac{1}{2}$$

and then actuates the minus key once, the interface will yield the expression $$\frac{1}{2}-;$$

if the user then actuates the minus key a second consecutive time, the structure inclusion toggling feature will be invoked and the interface will yield the expression $$\frac{1}{2-};$$

and if the user then actuates the alteration key, the interface will yield the expression $$\frac{1}{2}--.$$

In an alternative embodiment, in addition to or instead of behaving as described in the preceding paragraph, the interface will allow a user to actually input two consecutive sign operators by means of actuating the plus key or the minus key sufficiently many times consecutively. In particular, in an embodiment, when a user actuates the plus key or the minus key sufficiently many consecutive times that an invocation of the structure inclusion toggling feature would cause the user's input to return to the state it was in after the first of the consecutive actuations of that key, the interface will return to that state and will then immediately append an additional plus sign or minus sign, and will thus yield the same result as though the user had actuated the plus key or the minus key exactly twice consecutively without invoking the structure inclusion toggling feature. In an embodiment, after this occurs, if the user actuates the same key another consecutive time, then the interface will delete the plus sign or minus sign that was just appended and so the user's input will return to the state that it was in after the first of the consecutive actuations of that key. For example, in an embodiment, if a user types the fraction $$\frac{1}{2}$$

and then actuates the minus key once, the interface will yield the expression $$\frac{1}{2}-;$$

if the user then actuates the minus key a second consecutive time, the structure inclusion toggling feature will be invoked and the interface will yield the expression $$\frac{1}{2-};$$

if the user then actuates the minus key a third consecutive time, the interface will yield the expression $$\frac{1}{2}--;$$

if the user then actuates the minus key a fourth consecutive time, the interface will again yield the expression $$\frac{1}{2}-;$$

and so on.

In an embodiment, the structure inclusion toggling feature also applies to certain other operators in addition to the plus sign operator and the minus sign operator, such as the division operator ÷ and the multiplication operators · and ×. Other possible operators to which the structure inclusion toggling feature may be applied will be evident to those of ordinary skill in the art.

Figure 28A:
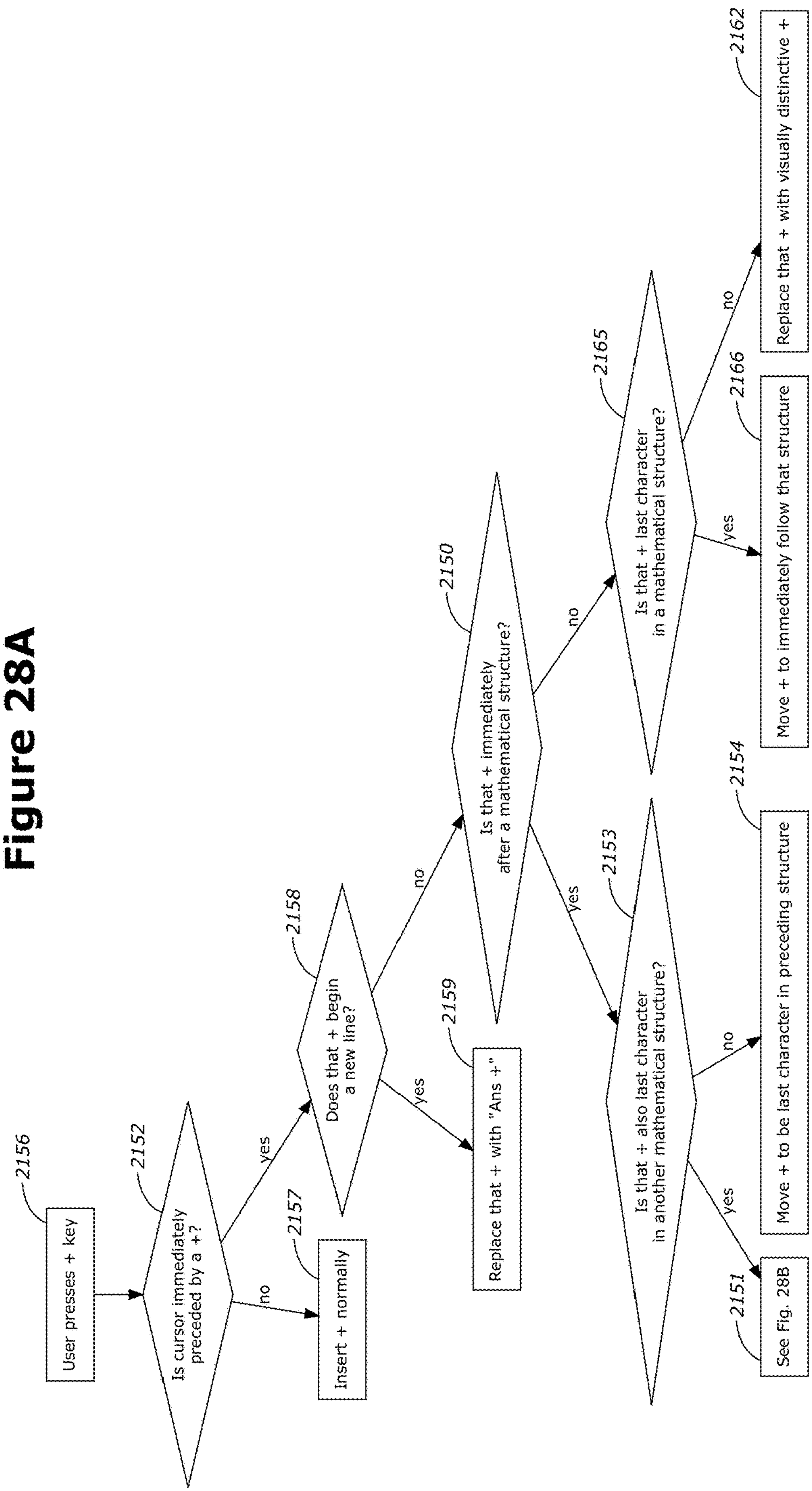
FIG. 28A is a flowchart that illustrates various features that may be invoked when a user double-clicks the plus key, according to an embodiment.

FIG. 28A is a flowchart that illustrates various features that may be invoked when a user double-clicks the plus key, in an embodiment. It is to be understood that in an embodiment, parallel behaviors are applicable when a user double-clicks the minus key instead of the plus key. For the plus key, the process starts with Block 2801, which states, "User presses + key" and proceeds to Block 2802, which asks, "Is cursor immediately preceded by a +?" If the answer is no, then the interface will insert a plus sign as normal (Block 2803). If the answer is yes, the process continues with Block 2804, which asks, "Does that + begin a new line?" If the answer is yes, the interface will replace that plus sign with "Ans +" (Block 2805), as described in Chapter 41 in the explanation of the double-click Ans prefixing feature. If the answer is no, then the process will continue with Block 2806, which asks, "Is that + immediately after a mathematical structure?"

Figure 28B:
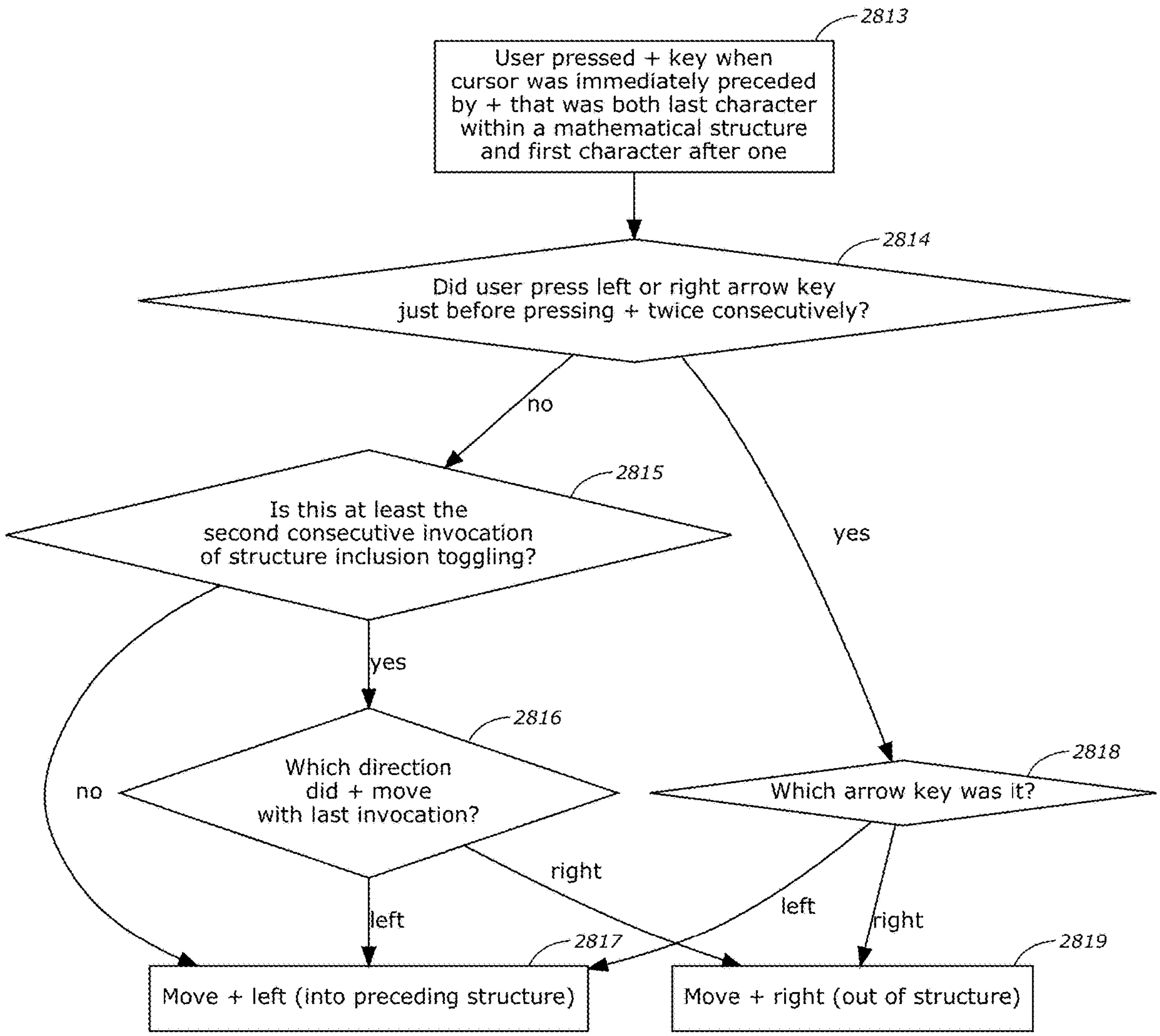
FIG. 28B is a flowchart that illustrates an example process that occurs in an ambiguous case where a previously typed plus sign is both the last character within a mathematical structure and the first character after a mathematical structure.

If the answer to the question in Block 2806 is yes, then the process continues with Block 2807, which asks, "Is that + also last character in another mathematical structure?" If the answer is yes, then the process continues in FIG. 28B, beginning at Block 2808. If the answer is no, then the interface moves the plus sign to be the last character in the preceding mathematical structure (Block 2809).

If the answer to the question in Block 2806 is no, then the process continues with Block 2810, which asks, "Is that + last character in a mathematical structure?" If the answer is yes, then interface moves the plus sign to immediately follow the structure (Block 2811). If the answer is no, then the interface replaces that plus sign with a visually distinctive plus sign (Block 2812) as described below.

FIG. 28B is a flowchart that illustrates the process that occurs in the ambiguous case where the previously typed plus sign is both the last character within a mathematical structure and the first character after a mathematical structure. The process starts with Block 2813, which states, "User pressed + key when cursor was immediately preceded by + that was both last character within a mathematical structure and first character after one" and proceeds with Block 2814, which asks, "Did user press left or right arrow key just before pressing + twice consecutively?" If the answer is yes, the interface will determine which arrow key it was (Block 2818) and move the plus sign left into the preceding structure (Block 2817) if the left arrow key was pushed or right out of the structure (Block 2819) if the right arrow key was pushed.

If the answer to the question in Block 2814 is no, then the process continues with Block 2815, which asks, "Is this at least the second consecutive invocation of structure inclusion toggling?" If the answer is no, then the interface will move the plus sign left, into the preceding structure (Block 2817). If the answer is yes, then the process continues with Block 2816, which asks, "Which direction did + move with last invocation?" Subsequently, the interface will move the plus sign left into the preceding structure again (Block 2817) if the left arrow key was pushed the previous time or right out of the structure again (Block 2819) if the right arrow key was pushed the previous time.

High-Precedence Sign Operators

In the present specification, any embodiment that implements either the interface behavior described in the following paragraph or the interface behavior described in the paragraph after that will be said to have "the high-precedence sign operators feature."

In an embodiment, when the fraction bar key is actuated, if the new fraction that is created would otherwise be immediately preceded by two consecutive plus signs or by two consecutive minus signs, then instead, the interface will delete one of the two consecutive signs from the user's input and will move the other sign into the new fraction's numerator along with the operand that preceded the plus signs or minus signs if such an operand exists. When a sign and operand are thus moved into a new fraction's numerator, if the resulting fraction would still be immediately preceded by two consecutive plus signs or two consecutive minus signs, then again one of the two consecutive signs will be deleted and the other sign will be moved into the new fraction's numerator along with any operand that preceded the plus signs or minus signs; this will be repeated as necessary until the resulting fraction is not immediately preceded by two consecutive plus signs or two consecutive minus signs. For example, in such an embodiment, if a user types a++b and then actuates the fraction bar key once, the interface will yield the result $$\frac{a+b}{\square}$$

instead of the result $$a{+}{+}\frac{b}{\square};$$

if a user types a++b++c and then actuates the fraction bar key once, the interface will yield the result $$\frac{a+b+c}{\square};$$

if a user types a++b++c++d and then actuates the fraction bar key once, the interface will yield the result $$\frac{a+b+c+d}{\square};$$

and so on.

In an alternative embodiment, when a user enters two consecutive plus signs or two consecutive minus signs and the structure inclusion toggling feature is not invoked, the interface will immediately replace the two consecutive signs with a single sign that is displayed in a distinctive manner so that an experienced user of the interface can readily determine that this sign was created by means of entering two consecutive signs. For example, this sign may be displayed with less spacing around it (in order to visually imply that this sign and its operands will not readily be separated from one another), or this sign may be displayed in a bold font, or this sign may be displayed in a different color font. Other means of displaying a sign in a visually distinctive manner will be evident to those of ordinary skill in the art. In such an embodiment, when the fraction bar key is actuated, if the new fraction's numerator would be immediately preceded by such a distinctive sign, then instead the distinctive sign will be replaced with an ordinary sign that is moved into the new fraction's numerator along with the operand that preceded the distinctive sign if such an operand exists, and this will be repeated as necessary until the resulting fraction is not immediately preceded by such a distinctive sign. In such an embodiment, the keystroke sequence a-H-b followed by an actuation of the fraction bar key will yield the result $$\frac{a+b}{\square}.$$

The functionality described in the present paragraph thus serves much the same purpose as the functionality described in the preceding paragraph, and has the additional advantage that it provides the user with an immediate visual indication that two consecutive plus signs or two consecutive minus signs are associated with special functionality.

In an embodiment, the interface's replacement of two consecutive sign operators with a single visually distinctive sign operator as described in the preceding paragraph is an alterable interface decision, and altering this decision will cause the single visually distinctive sign operator to be replaced with two consecutive ordinary sign operators.

In an embodiment, if the structure inclusion toggling feature is invoked by two consecutive actuations of the plus key or two consecutive actuations of the minus key, then the invocation of the structure inclusion toggling feature is implemented as an alterable interface decision (which, in an embodiment, may be a multi-alternative decision), and one possible result of altering this decision is that the input will appear as though the structure inclusion toggling feature had not been invoked and the high-precedence sign operators feature had been invoked instead. Additionally, in an embodiment, continuing to repeatedly actuate the plus key or the minus key after the structure inclusion toggling feature has been invoked will cause the interface to cycle between various possibilities that will include one possibility in which the input appears as though the structure inclusion toggling feature had not been invoked and the high-precedence sign operators feature had been invoked instead. (Other possibilities that the interface could cycle through in such circumstances, such as a possibility in which the input appears as though no special interface feature had been invoked, are described above in the discussion of structure inclusion toggling.)

Similarly, in an embodiment, if the interface has an Ans prefixing feature as defined farther above, and if a user starts a line of input by two consecutive actuations of the plus key or two consecutive actuations of the minus key, then the high-precedence sign operators feature will not be invoked. However, in an embodiment, in such circumstances, the interface's decision not to invoke the high-precedence sign operators feature is alterable. In particular, in an embodiment, if the double-click Ans prefixing feature is invoked by two consecutive actuations of the plus key or two consecutive actuations of the minus key, then the interface's alterable decision to invoke the double-click Ans prefixing feature is a multi-alternative decision with two alternate options such that selecting one of the alternate options will cause the user's input to appear as though the high-precedence sign operators feature had been invoked instead of the double-click Ans prefixing feature, and selecting the other will cause the user's input to appear as though neither feature had been invoked. For example, in such an embodiment, if a user starts a line of input by twice consecutively actuating the minus key, the interface will make an alterable decision with a default option of Ans − and with one alternate option consisting of a minus sign displayed in a distinctive manner (as described in the explanation of the high-precedence sign operators feature) and with another alternate option consisting of two consecutive ordinary minus signs. Also, in an embodiment, if a user starts a line of input by twice consecutively actuating the plus key or the minus key and the high-precedence sign operators feature is not invoked, then if the user then actuates the same key a third consecutive time, the interface will replace the user's input with a distinctive plus sign or distinctive minus sign as though the high-precedence sign operators feature had been invoked. If the user then actuates the same key a fourth consecutive time, the interface will replace that distinctive plus sign or distinctive minus sign with two consecutive ordinary plus signs or two consecutive ordinary minus signs.

Alterable Removal of Parentheses

In an embodiment, if a structure modification causes a portion of a mathematical structure to be entirely enclosed in a pair of corresponding parentheses when it previously was not the case that that portion of a mathematical structure was entirely enclosed in a pair of corresponding parentheses, then the interface will remove the outermost pair of parentheses. For example, in an embodiment, if a user actuates the fraction initialization key when the input cursor is immediately after a right parenthesis, and as a result the interface moves an expression that is entirely enclosed in corresponding parentheses into the numerator of the new fraction it creates, then the interface will remove the outermost pair of parentheses from that expression. As another example, in an embodiment, if a user types the keystroke sequence 1+(2+3)/(3+2)+1, then in response to the actuation of the fraction initialization key a pair of parentheses will be deleted from the new fraction's numerator, and in response to the last actuation of the plus key a pair of parentheses will be deleted from the fraction's denominator; the result will be $$1+\frac{2+3}{3+2}+1.$$

In an embodiment, after the interface automatically removes a pair of corresponding parentheses from a portion of a mathematical structure as described in either of the two preceding paragraphs, the interface will remember that parentheses have been removed from that portion of the mathematical structure. Subsequently, for purposes of determining whether a structure modification is valid, the interface will regard that portion of the mathematical structure as though the parentheses were still present, and if a subsequent structure modification does occur that affects that portion of the mathematical structure then the interface will restore the parentheses before applying that structure modification. For example, in an embodiment, if a user types 1+(2+3) and then actuates the fraction initialization key once, then the interface will create a new fraction and move (2+3) into the new fraction's numerator, so the interface will remove the pair of parentheses, yielding 1+

$$\frac{2+3}{\square}.$$

At this point, a numerator contraction that moves 2+ out of the fraction's numerator without also moving the numeral 3 out of the fraction's numerator would not be valid, because the interface regards the parentheses as still present for purposes of determining whether any numerator contraction is valid. If the user's next action is another actuation of the fraction initialization key, then the interface will expand the fraction's numerator again, and the interface will restore the parentheses before performing that structure modification, so the result will be $$\frac{1+(2+3)}{\square}.$$

In an embodiment, when the interface automatically removes a pair of corresponding parentheses as described above, its decision to do so is an alterable decision with a low probability of alteration.

In an embodiment, if a user action that causes the interface to make an alterable fraction initialization decision also causes the interface to automatically remove a pair of corresponding parentheses, then the alterable decision to remove the pair of corresponding parentheses will be combined with the alterable fraction initialization decision. For example, in an embodiment, if a user types (2+3) and then actuates the fraction initialization key once, the interface will create a new fraction, move (2+3) into the new fraction's numerator, and remove the pair of parentheses, yielding $$\frac{2+3}{\square};$$

both the decision to move (2+3) into the new fraction's numerator and the decision to remove the pair of parentheses are alterable decisions, and the interface will combine these decisions, so a single alterable decision will exist that has the alternate options $$\frac{(2+3)}{\square}$$

and $$(2+3)\frac{\square}{\square}.$$

Similarly, in an embodiment, if a user action causes the interface to make an alterable structure exiting decision such that if the interface decides to automatically exit a mathematical structure then the interface will make a contingent alterable decision whether or not to remove a pair of corresponding parentheses, then the alterable decision whether or not to remove the pair of corresponding parentheses will be combined with the alterable structure exiting decision. For example, in an embodiment, the keystroke sequence [square root] (1+2)+3 will yield $\sqrt{1+2}+3$ if the interface has the automatic structure exiting feature or yield $\sqrt{(1+2)+3}$ if it does not, but in either case an alterable structure exiting decision will exist that has one of the two expressions $\sqrt{1+2}+3$ or $\sqrt{(1+2)+3}$ as the default option and the other as an alternate option, and also has the expression $\sqrt{(1+2)}+3$ as an additional alternate option that has a low probability of alteration.

Combining Structure-Related Alterations

In an embodiment, whenever an alterable fraction initialization decision exists that pertains to a certain fraction's numerator and an alterable structure exiting decision exists that pertains to the same fraction's denominator, these two decisions will be combined alterable decisions as defined farther above, so that a user can cycle through the combinations of options of these decisions by actuating the alteration key repeatedly, without the need to actuate the Yes key. For example, in an embodiment, it is possible for a user to input $$\frac{x+1}{x+2}$$

by means of typing $$x+\frac{1}{x}+2$$

and then actuating the alteration key repeatedly.

Furthermore, in an embodiment, a user can eventually correct any particular combination of mathematical structure mistakes by means of actuating the alteration key sufficiently many times consecutively, without any need to actuate the Yes key or any other key. That is, in an embodiment, an algorithm will systematically determine every syntactically valid outcome that could result from changing where fractions start and/or changing where mathematical structures end, with the exception that the algorithm will not include outcomes that would involve changing where a fraction starts if no alterable fraction initialization decision pertains to that fraction's numerator and the algorithm will not include outcomes that would involve changing where a mathematical structure ends if no alterable structure exiting decision pertains to that mathematical structure; in such an embodiment, if a user actuates the alteration key sufficiently many times consecutively, the interface will eventually present the user with each such syntactically valid outcome.

For example, in an embodiment, if a user types the keystroke sequence [square root] 2+3/4, the interface will initially yield $$\sqrt{2}+\frac{3}{4}.$$

If the user then actuates the alteration key sufficiently many times consecutively to complete review of every individual alterable interface decision that is in the alteration cycle, then during the course of these consecutive actuations of the alteration key the user will see the alternate option $$\frac{\sqrt{2}+3}{4}$$

of the alterable fraction initialization decision, and the user will see the alternate options $$\sqrt{2+\frac{3}{4}}$$

and $$\frac{\sqrt{2+3}}{4}$$

of the alterable structure exiting decision, but there is another expression that a user might incorrectly think of as "root two plus three over four" that the user will not yet see: namely, $$\sqrt{\frac{2+3}{4}}.$$

Therefore, in the embodiment described in the preceding paragraph, in such circumstances, after the user has actuated the alteration key sufficiently many times consecutively to complete review of every individual alterable interface decision, if the interface continues to actuate the alteration key consecutively, then the interface will present the user with the additional outcome $$\sqrt{\frac{2+3}{4}}.$$

Chapter 45: Linear Equivalent Features

Linear Fractions

A fraction that is written as a sequence of characters from left to right, such as 1/2, will be referred to herein as a fraction in "linear notation."

The present specification has said that a fraction is in "textbook notation" only when it is written with the numerator above the denominator. By this definition, a fraction in linear notation is not in textbook notation. Nevertheless, in many mathematical textbooks, some fractions are written in linear notation. In particular, it is common for a mathematical textbook to express a fraction in linear notation when the fraction is in an exponent, because an expression such as $x^{1/2}$ may be easier to read than an expression such as $$x^{\frac{1}{2}}.$$

It is also common for a mathematical textbook to express a fraction in linear notation when the fraction is in a subscript or in a limit of integration.

In an embodiment, for purposes of the features that are described below, a "linear notation region" is an exponent or a subscript or a limit of integration. Other portions of mathematical structures that may be treated as linear notation regions for purposes of the features that are described below may be evident to those of ordinary skill in the art.

In some embodiments that are discussed above, if a user actuates the fraction bar key when the input cursor is in an exponent or other linear notation region, in certain circumstances the automatic structure exiting feature may expel the fraction bar, or in certain circumstances even if the interface does not have the automatic structure exiting feature per se the interface may nevertheless expel the fraction bar. Thus, in some embodiments that are discussed above, in certain circumstances, if a user actuates the fraction bar key when the input cursor is in a linear notation region, the resulting fraction will not be contained in that linear notation region.

In an embodiment, if a user actuates the fraction bar key when the input cursor is in a linear notation region, then unless circumstances are such that the resulting fraction will not be contained in that linear notation region (as discussed in the preceding paragraph), the interface will insert a forward slash character in the user's input rather than creating a new fraction mathematical structure in response to the actuation of the fraction bar key.

In an embodiment, when the interface decides to respond to the fraction bar key by inserting a forward slash character, this decision is an alterable interface decision such that altering the decision will cause the interface to convert the fraction that includes that forward slash character into a fraction that is in textbook notation. For example, in such an embodiment, if the user inputs $x_{1/}$ and then alters the interface's decision to insert a forward slash character, the result will be $$x^{\frac{1}{\square}}.$$

Furthermore, in an embodiment, the interface's decision to respond to the fraction bar key normally (by creating a fraction mathematical structure) when the input cursor is not in a linear notation region is an alterable interface decision such that altering this decision will cause the interface to convert the fraction that was created (which is in textbook notation) into a fraction that is in linear notation. In an embodiment, such an alterable interface decision will be assigned a very low probability of alteration.

In an embodiment, the interface's decision whether to respond to the fraction bar key normally (by creating a fraction mathematical structure) or respond to the fraction bar key by inserting a forward slash character is an adaptive decision, and that decision class has three settings: a structured setting, a smart setting, and a linear setting. When the interface makes a decision whether to respond to the fraction bar key normally or respond to the fraction bar key by inserting a forward slash character, it will decide to respond to the fraction bar key normally if either the smart setting is selected and the input cursor is not in a linear notation region or the structured setting is selected; it will decide to respond to the fraction bar key by inserting a forward slash character if either the smart setting is selected and the input cursor is in a linear notation region or the linear setting is selected. Such an embodiment has the advantage that it may adapt to a user's preferences, so if for instance the user consistently causes every fraction to be displayed in textbook notation even when the fraction is in a linear notation region, then the interface will adapt so that it always responds to the fraction bar key by creating a fraction that is displayed in textbook notation.

In an embodiment, if the interface moves a fraction bar into a linear notation region by some means (such as by numerator contraction), then the interface will immediately convert the fraction from a fraction in textbook notation to a fraction in linear notation. For example, in an embodiment, if the user types $$\frac{e^x}{2}$$

and then performs an action that causes the smallest valid numerator contraction to occur, then the result will be $e^{x/2}$ instead of $$e^{\frac{x}{2}}.$$

Similarly, in an embodiment, if the interface moves a forward slash character out of a linear notation region by some means (such as by means of numerator expansion), then the interface will immediately convert the fraction from a fraction in linear notation to a fraction in textbook notation. In an embodiment, any such conversion is an alterable decision.

Linear Equivalent Input

Users who become familiar with certain features that are described in the present specification, such as the fraction initialization key feature and the structure inclusion toggling feature, may first learn to use such features in the context of correcting mistakes. However, these features are so efficient that users who do become familiar with these features may then begin to use these features deliberately as shortcut features. For example, if a user wishes to input $$\frac{1}{x+2}$$

in an embodiment that has the automatic structure exiting feature and the structure inclusion toggling feature, then the structure inclusion toggling feature may be useful to an inexperienced user who mistakenly neglects to prevent the automatic exiting of the fraction's denominator when the plus key is actuated, and the structure inclusion toggling feature may also be useful to an experienced user who prefers to deliberately use the keystroke sequence 1/x++2 in order to input $$\frac{1}{x+2}.$$

When a fraction is not written in textbook notation, if a user fails to correctly input the fraction's numerator and the fraction's denominator, the user is relatively unlikely to notice the mistake. For example, if a user intends to input a fraction that is equivalent to $$\frac{1}{x+2}$$

in a linear math input interface, and the user types the keystroke sequence 1/x+2, then the user is relatively unlikely to realize that the resulting expression 1/x+2 is not equivalent to $$\frac{1}{x+2}.$$

Thus, when a fraction is not written in textbook notation, immediate mistake recovery features may not be especially helpful. However, even when a fraction is not written in textbook notation, a user who is familiar with features such as the fraction initialization key feature, the structure inclusion toggling feature, and the high-precedence sign operators feature may still wish to use these features deliberately as shortcut features, or may simply attempt to use these features out of habit. Therefore, in an embodiment, various features that have been described above in terms of how they interact with fraction mathematical structures that the user has created will also interact with fractions in linear notation in an analagous way. Such an embodiment will be said to have "linear equivalent features."

Even in an embodiment that does not accept as input mathematical expressions that contain mathematical structures, linear equivalent features may be useful as shortcut features. For example, in an embodiment, the interface will never display any fractions in textbook notation, and the keystroke sequence 1/x++2 Enter will yield the same result as the keystroke sequence 1/(x+2) Enter, with fewer total keystrokes.

For the most part, in an embodiment that has linear equivalent features, previously described features such as the fraction initialization key, structure inclusion toggling, and high-precedence sign operators will operate as previously described except that certain terms are redefined to have a broader meaning than was previously specified: every reference to a "fraction" in a description of a feature will now be understood to also refer to any fraction in linear notation; every reference to a "mathematical structure" in a description of a feature will be understood to also refer to any fraction in linear notation; every reference to "the last portion of a mathematical structure" will be understood to also refer to any denominator of a fraction in linear notation; and every reference to a "fraction bar" will be understood to also refer to any forward slash character of a fraction in linear notation.

Additional details of the behavior of an embodiment that has linear equivalent features are explained below.

Parentheses in Linear Notation

When a fraction is in textbook notation, its numerator consists of everything above its fraction bar. When a fraction is in linear notation, its numerator may not consist of everything to the left of its forward slash character: the rules of mathematical parsing determine the extent of the fraction's numerator. Therefore, when a fraction is in linear notation, the interface may need to insert parentheses around its numerator in order to delineate the extent of its numerator. Likewise, when a fraction is in linear notation, the interface may need to insert parentheses around its denominator in order to delineate the extent of its denominator.

In an embodiment, when converting a fraction from textbook notation to linear notation, the interface will if necessary automatically insert parentheses around the fraction's numerator or denominator or both. For example, when converting $$\frac{x+1}{2}$$

into linear notation, the interface will insert parentheses around the fraction's numerator, yielding (x+1)/2.

In an embodiment, when moving a mathematical expression into a fraction's numerator or into a fraction's denominator when the fraction is in linear notation, the interface will if necessary automatically insert parentheses around the fraction's numerator or denominator. For example, given the expression −y+½, in order for the interface to move the mathematical expression "y+" into the fraction's numerator, it is necessary for the interface to insert parentheses around the fraction's numerator: the result of moving "y+" into the fraction's numerator will be −(y+1)/2.

(In order to implement linear equivalent features, a programmer may find it useful to configure the interface so that in response to each keystroke, first the interface converts the internal representation of a fraction in linear notation to a representation that closely resembles the representation of a fraction mathematical structure, and then the interface handles the keystroke normally, and then the interface converts the internal representation of the fraction back to an ordinary representation of a fraction in linear notation, inserting parentheses around the fraction's numerator or denominator if they are now necessary in order to delineate its extent. Other means of implementing linear equivalent features will be evident to those of ordinary skill in the art.)

In an embodiment, after parentheses are automatically inserted around the numerator or denominator of a fraction in linear notation, the parentheses are distinctively marked in the memory of the computing device, and although the parentheses delineate the extent of a fraction's numerator or denominator they will be treated as though they themselves are not part of the fraction's numerator or denominator for the purpose of features such as the numerator expansion key and structure inclusion toggling. For example, after the interface has moved the mathematical expression "y+" into the numerator of the fraction in the expression −y+½, yielding −(y+1)/2, if the numerator subsequently expands the fraction's numerator by "moving the character immediately preceding the fraction to the position at the beginning of the fraction's numerator" (as described above), then the position at the beginning of the fraction's numerator is after the left parenthesis because the left parenthesis itself is not considered to be part of the fraction's numerator; the result will be (−y+1)/2.

In an embodiment, after parentheses are automatically inserted around the numerator or denominator of a fraction in linear notation, such parentheses will have a distinctive appearance to distinguish them from parentheses the user explicitly typed. For example, such parentheses may be gray rather than black.

In an embodiment, after parentheses are automatically inserted around the numerator or denominator of a fraction in linear notation, if at any subsequent time the input cursor is not between the parentheses and the parentheses do not actually affect the extent of the numerator or denominator, then the interface will delete the parentheses. For example, in such an embodiment, if parentheses had been automatically inserted around the denominator of 1/(x+) and the interface subsequently moves the plus sign out of the denominator so that the result is 1/(x)+, then with or without the parentheses the fraction's denominator would include the letter x and would not include the plus sign, so the interface will delete the parentheses if the input cursor is not between the parentheses.

Linear Fraction Template Creation

In an embodiment, when the interface responds to the fraction bar key by inserting a forward slash character, if the forward slash character is not preceded by a numerator for the newly created fraction, then the interface will automatically insert a pair of parentheses before the forward slash character and a pair of parentheses after the forward slash character, and will position the input cursor between the parentheses that then precede the forward slash character. In an embodiment, if a user actuates the down arrow key while the input cursor is between the parentheses that delineate the extent of the numerator of a fraction in linear notation and that fraction's forward slash character is immediately followed by an empty pair of parentheses, then the interface will move the input cursor to between that empty pair of parentheses. For example, in an embodiment, if the input cursor is in an empty exponent with a base of e when the user actuates the fraction bar key, the result will be $e^{( )/( )}$ with the input cursor between the first pair of parentheses; if the user then types x+1 and presses the down arrow key, the result will be $e^{(x+1)/( )}$ with the input cursor between the second pair of parentheses. Thus, in such an embodiment, a user can type the exponent (x+1)/(x+2) by means of the same keystroke sequence that would yield the equivalent exponent $$\frac{x+1}{x+2}$$

in an embodiment where fractions are always in textbook notation.

Exiting Parentheses Manually

In certain math input interfaces, when the interface responds to the fraction bar key by creating a fraction mathematical structure and putting the input cursor in the new fraction's denominator, all subsequent input the user types is entered into the fraction's denominator until the user explicitly exits the fraction's denominator. An embodiment of the present invention that does not have the automatic structure exiting feature may behave the same way. If such an embodiment of the present invention has linear equivalent features, then when the interface responds to the fraction bar key by inserting a forward slash character, a user may still expect that all subsequent input the user types will be entered into the fraction's denominator until the user explicitly exits the fraction's denominator. For that reason, in an embodiment, when the interface responds to the fraction bar key by inserting a forward slash character, if the forward slash character is preceded by a numerator for the newly created fraction and is not yet followed by a denominator for the newly created fraction, then the interface will automatically insert a pair of parentheses after the forward slash character and position the input cursor between the parentheses. For example, in such an embodiment, if the user has entered $e^1$ and the user now actuates the fraction bar key and the interface responds by inserting a forward slash character, then the result will be $e^{1/( )}$ with the input cursor between the two parentheses. If the user subsequently types x+2, the result will be $e^{1/(x+2)}$; thus, in such an embodiment, a user can type the exponent 1/(x+2) by means of the same keystroke sequence that would yield the equivalent exponent $$\frac{1}{x+2}$$

in an embodiment where fractions are always in textbook notation. Also, when the result thus far is $e^{1/( )}$ with the input cursor between the two parentheses, if the user subsequently types x++2 and the embodiment has the structure inclusion toggling feature, then the structure inclusion toggling feature will be invoked by the second actuation of the plus key and the interface will move the plus sign out of the denominator; if the interface at that time deletes the parentheses that were inserted because the input cursor is not between the parentheses and the parentheses do not affect the extent of the denominator, then the eventual result will be $e^{1/x+2}$; thus, in such an embodiment, a user can type the exponent 1/x+2 by means of the same keystroke sequence that would yield the equivalent exponent $$\frac{1}{x}+2$$

in an embodiment where fractions are always in textbook notation.

The prior art interface of the HP Prime graphing calculator does not have individual left parenthesis and right parenthesis keys: instead of individual parenthesis keys, the HP Prime has a paired parentheses key that inserts a matching pair of parentheses and positions the input cursor between the parentheses. Thus, in order to type (1−2)+3 on the HP Prime, a user will first press the paired parentheses key, then type 1−2, then press the right arrow key in order to move the input cursor past the right parenthesis that was already inserted, and then type +3. This is an unusual approach to entry of parentheses and some users may not like such an approach; however, for a user who has become accustomed to such a paired parentheses key, the interface behavior described in the preceding paragraph may be relatively intuitive.

In an embodiment, in an interface that has a paired parentheses key like that of the prior art HP Prime graphing calculator discussed in the preceding paragraph, in order to facilitate more rapid input, the structure inclusion toggling feature will treat any expression enclosed in parentheses as a mathematical structure. Thus, for example, if a user actuates the plus key when the input cursor is immediately after a plus sign that had previously been entered, and if the plus sign that was previously entered is the last character within an expression enclosed in parentheses, then rather than inserting a second consecutive plus sign into the user's input, the interface will respond to the key actuation by moving the previously entered plus sign out of the enclosing parentheses so that it is the first character after the right parenthesis. In such an embodiment, in order to type (1−2)+3, a user could first press the paired parentheses key and then type 1−2++3. This may not be a very intuitive keystroke sequence, but it is potentially an ever faster keystroke sequence than the intuitive keystroke sequence (1−2)+3 because it includes fewer non-repeated keystrokes, and a user may be able to acclimate to such a keystroke sequence if the user has learned to use the structure inclusion toggling feature in other circumstances.

Denominators of Linear Fractions in a Multimode Interface

In a multimode math input interface that has the structure inclusion toggling feature, the keystroke sequence 1/2++3 will yield the expression $$\frac{1}{2+3},$$

and the interface will be in a bipositional entry mode such that if the next character typed is a digit it will be appended within the denominator, but if the next character typed is a plus sign it will be appended after the fraction. In such an interface, a user may input the expression $$\frac{1}{2+3}+4$$

by means of the keystroke sequence 1/2++3+4. It may be desirable for the same keystroke sequences to yield equivalent expressions in circumstances where the interface responds to the fraction bar key by inserting a forward slash character.

Therefore, in an embodiment that is a multimode math input interface, when the interface responds to the fraction bar key by inserting a forward slash character, if the forward slash character is preceded by a numerator for the newly created fraction, then the interface will enter a new structure entry mode, just as it does when a multimode math input interface responds to the fraction bar key by creating a new fraction mathematical structure. After a multimode math input interface enters a new structure entry mode, subsequent keystrokes may cause the interface to enter a bipositional entry mode; specific details about how various keystrokes affect the entry mode of a multimode math input interface are disclosed in U.S. Pat. No. 8,788,548. In that patent, it is disclosed that when the multimode interface is in a bipositional entry mode, it places the input cursor in a special position to indicate that the next character the user enters can be inserted either inside or outside the last portion of a mathematical structure. An embodiment of the present invention, when the interface is in a bipositional mode and the input cursor is at the end of the denominator of a fraction in linear notation that is not enclosed in parentheses that were automatically inserted, it is not necessary to place the input cursor in a special position: the next character the user types may be inserted at the cursor location as a character that is inside the fraction's denominator, or it may be inserted at the cursor location as a character that is outside the fraction's denominator, but in either case it is inserted at the same location so no special cursor position is necessary. However, when the interface is in a bipositional mode and the input cursor is at the end of the denominator of a fraction in linear notation that is enclosed in parentheses that were automatically inserted, it is necessary to place the input cursor in a special position or to otherwise indicate that special circumstances obtain, because the location where the next character will be inserted depends on whether the character is inserted inside the fraction's denominator or outside the fraction's denominator: if it is inserted inside the fraction's denominator, it will be inserted before the right parenthesis that delineates the extent of the fraction's denominator, but if it is inserted outside the fraction's denominator, it will be inserted after that right parenthesis. Therefore, in an embodiment, in such circumstances, the input cursor will be placed directly on the right parenthesis, or the right parenthesis will be lightened in color so that it appears faded out, or both. Other means of visually indicating that a special bipositional entry mode obtains in such circumstances will be evident to those of ordinary skill in the art; for example, the right parenthesis may temporarily disappear entirely.

For example, in such an embodiment, in circumstances where the interface responds to the fraction bar key by inserting a forward slash character, the keystroke sequence 1/2 will yield the result 1/2, and the interface will be in a bipositional entry mode but with no special cursor position or other indication that special circumstances obtain. If the user then actuates the plus key twice consecutively and the structure inclusion toggling feature is invoked, and the user then actuates the 3 key, the result will be 1/(2+3) and the interface will again be in a special bipositional entry mode, and now in these circumstances the fact that the interface is in a bipositional entry mode will be visually indicated by some means, such as by means of placing the input cursor on the right parenthesis and lightening the color of the right parenthesis. If the user then types +4, the expression +4 will be inserted outside the fraction's denominator, after the right parenthesis. Thus, in such an embodiment, in circumstances where the interface responds to the fraction bar key by inserting a forward slash character, the interface will respond to the keystroke sequence 1/2++3+4 by yielding the expression 1/(2+3)+4, which is equivalent to the expression $$\frac{1}{2+3}+4.$$

Linear Exponents and Linear Square Roots

An exponent that is written as a sequence of unformatted characters from left to right, such as ^2, will be referred to herein as an exponent in "linear notation"; similarly, a square root that is written as a sequence of characters from left to right, such as √2, will be referred to herein as a square root in "linear notation."

In most cases a well-designed math input interface will accept exponents and square roots as input in textbook notation if possible, and need not then accept exponents and square roots as input in any other form of notation in most circumstances. However, in certain circumstances it may not be possible for a math input interface to accept exponents and square roots as input in textbook notation; for example, the display limitations of a computing device may prevent an interface from displaying square roots in textbook notation on that computing device. In such circumstances, a math input interface may accept exponents and square roots (as well as fractions) as input in linear notation. In such circumstances, it may be desirable to enable a user to use the same keystroke sequences to enter exponents and square roots that would be used if the exponents and square roots were in textbook notation. In particular, in an embodiment that has linear equivalent features, it may be desirable for the structure inclusion toggling feature to also apply to exponents and square roots that are in linear notation.

Therefore, in an embodiment, the structure inclusion toggling feature, which has been described above in terms of how it interacts with mathematical structures that the user has created, will also interact with exponents and square roots in linear notation in an analogous way. In such an embodiment, the structure inclusion toggling feature will operate as previously described except that every reference to a "mathematical structure" or to "the last portion of a mathematical structure" in the description of that feature should be understood to also refer to any exponent or square root in linear notation. Such an embodiment can be further understood by reviewing the above discussion of linear equivalent features with the understanding that the above discussion may be applied to exponents and square roots in linear notation, and not only to fractions in linear notation, except that any detail that pertains explicitly to a fraction's numerator is not applicable to exponents and square roots. For example, it can be understood from the above discussion that when moving a mathematical expression into an exponent or square root that is in linear notation, the interface will if necessary automatically insert parentheses around the exponent or radicand; thus, in a certain embodiment that has the automatic structure exiting feature and the structure inclusion toggling feature, the keystroke sequence e^x++2 will yield e$^{\rightarrow}$(x+2). As another example, it can be understood from the above discussion that in a certain embodiment that does not have the automatic structure exiting feature, when the user types the A character or the √ character, the interface will automatically insert a pair of parentheses after that character and position the input cursor between the parentheses; for example, in such an embodiment, the keystroke sequence e^x+2 will yield e^(x+2).

Linear Equivalent Parsing

In certain circumstances, when a programmer creates or modifies software that accepts mathematical expressions as input, it may be undesirable or impossible for the programmer to cause the interface to accept as input mathematical expressions that contain mathematical structures. For example, a programmer may create software that receives mathematical expressions as input exclusively through a text messaging service. In such circumstances, a programmer may still be able to modify the software's parser so that character sequences can be accepted as input that correspond to keystroke sequences that would be used when typing mathematical structures using various structure modification features that are described above. Such a modified parser may make it easier for a user who is familiar with such structure modification features to input mathematical expressions that are equivalent to expressions that contain mathematical structures.

For example, in an embodiment that has a modified parser, two consecutive plus sign operators or two consecutive minus sign operators are treated like a single sign operator that has a very high operator precedence, so the input 1++2/3 is parsed as equivalent to (1+2)/3, and the input e^x++2 is parsed as equivalent to e^(x+2). In an embodiment that has a modified parser, when a quantity of two or more consecutive division operators is preceded by at least an equal quantity of terms, the consecutive division operators are treated like a single ordinary division operator except that the dividend of the division consists of that quantity of preceding terms instead of consisting of only the single term that immediately precedes the consecutive division operators; for example, when two consecutive division operators are preceded by two terms, the dividend of the division consists of both the preceding terms, so that for example the input 1+2//3 is parsed as equivalent to (1+2)/3.

Chapter 46: Structure Handle Dragging

Structure Handles

In an embodiment, each mathematical structure will have one or more associated "structure handles." Each structure handle may be either a "left structure handle" or a "right structure handle." The "initial location" of a structure handle is the structure handle's location before a user interacts with it.

In an embodiment, structure handles will by default not be visible most of the time: the interface will display a structure handle only in certain circumstances. In an embodiment, when a structure handle is displayed, it will appear as a small black circle.

In an alternative embodiment, a structure handle will never be displayed, but may still be interacted with as though it were displayed: for example, in such an embodiment, touching the left end of a fraction bar and sliding the touch to the left before releasing the touch will have the effect of dragging that fraction bar's left structure handle to the left as described below, even though the user will never see any such left structure handle.

In an embodiment, each fraction mathematical structure will have a left structure handle with an initial location on the left endpoint of its fraction bar and a right structure handle with an initial location on the right endpoint of its fraction bar. In an embodiment, each square root mathematical structure will have a right structure handle with an initial location on the right endpoint of the vinculum of its square root symbol. In an embodiment, each exponent will have a right structure handle with an initial location immediately to the right of the exponent and vertically centered between the top and bottom of the exponent. Possible locations for structure handles for other types of mathematical structures will be evident to those of ordinary skill in the art.

In the present specification, the "associated portion of a mathematical structure" for a fraction's left structure handle is the fraction's numerator, and the "associated portion of a mathematical structure" for any right structure handle is the last portion of the mathematical structure that the structure handle is associated with.

Making Structure Handles Visible

In an embodiment that is a computing device that has a mouse, while the mouse cursor is positioned immediately over the initial location of a structure handle or within a certain radius of that location, the interface will display the structure handle. In an embodiment, such a radius will be very small, so that a structure handle will appear only when the mouse cursor is very close to the structure handle.

The means for causing the interface to display a structure handle that is described in the preceding paragraph may be quite intuitive, but is not usable in an embodiment that is a computing device that does not have a mouse cursor or any equivalent means of detecting when a user is pointing to a location without yet touching or clicking on the location. The following paragraphs describe a means for causing the interface to display a structure handle that does not require a mouse.

In an embodiment, for purposes of the following two paragraphs, the input cursor is "adjacent to" the initial location of a left structure handle if the input cursor is at the beginning of the associated portion of a mathematical structure or is immediately before the structure, and the input cursor is "adjacent to" the initial location of a right structure handle if the input cursor is at the end of the associated portion of a mathematical structure or is immediately after the structure. For example, if the input cursor is within the square root and to the right of the fraction in the expression $$\sqrt{\frac{3}{4}},$$

then the input cursor is adjacent to the right structure handle of the fraction because the input cursor is immediately after the fraction, and it is also adjacent to the right structure handle of the square root because it is at the end of the last portion of the square root.

In an embodiment, when the user's last action was a cursor navigation action and the input cursor is adjacent to the initial location of a structure handle, the interface will display a structure handle that the input cursor is adjacent to, except that the interface will not display a structure handle if there is no valid structure modification that expands or contracts the associated portion of a mathematical structure. For example, if the user's last action was an actuation of the right arrow key, then the interface will display the right structure handle of the square root if the input cursor is to the right of the square root in the expression $\sqrt{2}+3$, but not if the input cursor is to the right of the square root in the expression $\sqrt{2}$.

In some cases the input cursor may be adjacent to two initial locations of structure handles: the cursor may be adjacent to one initial location of a structure handle that is to the left of the cursor and adjacent to another initial location of a structure handle that is to the right of the cursor. In an embodiment, when the user's last action is a cursor navigation action and the input cursor is adjacent to the initial locations of two structure handles, the interface will display only one of the structure handles that the input cursor is immediately adjacent to. In an embodiment, in such circumstances, if for exactly one of the two structure handles there is no valid structure modification that expands or contracts the associated portion of a mathematical structure, then the interface will display the other structure handle; otherwise, if exactly one of the two structure handles was visible immediately prior to the user's last action, then the interface will display the other structure handle; otherwise, if the input cursor was adjacent to the initial location of exactly one of the two structure handles immediately prior to the user's last action but that structure handle was not visible immediately prior to the user's last action, then the interface will display that structure handle; otherwise, if the structure handle that is to the right of the input cursor is a left structure handle, the interface will display that left structure handle; otherwise, the interface will display the structure handle that is to the left of the input cursor.

Effects of Structure Handle Dragging

The following paragraphs explain what effects occur after a user has dragged a structure handle from its initial location to a new location, when the user releases the structure handle. After the following explanation of the effects of releasing a structure handle at a new location, the present disclosure will then explain various means of dragging a structure handle to a new location in various embodiments.

In the following explanation of structure handle dragging, when any character, symbol, structure, or location is said to be "before" or "after" some other character, symbol, structure, or location, it is to be understood that for purposes of structure handle dragging, the characters, symbols, structures, and locations within a mathematical expression are considered to be in the sequence in which they would typically be written by hand. Additionally, a left structure handle's initial location is considered to be immediately before its associated portion of a mathematical structure, and a right structure handle's initial location is considered to be immediately after its associated portion of a mathematical structure. A character, symbol, structure, or location is considered to be "between" two locations if it is before one of them and after the other. For example, in the expression $$\frac{\frac{2}{3}}{4},$$

the upper fraction bar's right structure handle is considered to be after that fraction's denominator, which means that it is after the numeral 4 even though it is above the numeral 4, and so the numeral 4 is considered to be between the lower fraction bar and the right structure handle of the upper fraction bar even though it is not visually between them.

In the following explanation of structure handle dragging, "traversed text" consists of all the mathematical text between the initial location of a structure handle and the location where a user releases the structure handle, unless otherwise specified. In an embodiment, for purposes of determining what is included in traversed text, the input cursor is treated as a character of mathematical text; for example, in an embodiment, if a user has entered $\sqrt{x}+2$ and the cursor is to the right of the numeral 2, and the user then releases the square root's right structure handle at a location between the numeral 2 and the input cursor, then the result will be $\sqrt{x+2}$ with the input cursor outside the square root; if instead the user releases the square root's right structure handle at a location all the way past the input cursor, then the result will be $\sqrt{x+2}$ with the input cursor inside the square root.

In an embodiment, if a user releases a left structure handle at a location before its initial location, or if a user releases a right structure handle at a location after its initial location, then the interface will perform the smallest possible structure modification that will move all the traversed text into the associated portion of a mathematical structure, if any such structure modification is possible. For example, if a user has entered $$x+\frac{1}{x}-2$$

and the user drags a structure handle from the left endpoint of the fraction bar to the beginning of the expression and releases it there, the result will be $$\frac{x+1}{x}-2;$$

if the user then drags a structure handle from the right endpoint of the fraction bar to the end of the expression and releases it there, the result will be $$\frac{x+1}{x-2}.$$

As another example, ii a user has entered $$\frac{\frac{2}{3}}{4}$$

and the user releases the lower fraction bar's left structure handle at the beginning of the expression, the traversed text will include the numeral 2 and the upper fraction bar, so the result will be $$\frac{\frac{2}{3}}{4}.$$

As another example, if a user has entered $$\sqrt{\frac{3}{4}}$$

and the user releases the fraction bar's left structure handle at the beginning of the expression, the result will be $$\frac{\sqrt{3}}{4}.$$

In an embodiment, if a user releases a structure handle at a location within the corresponding portion of a mathematical structure, then the interface will perform the smallest possible structure modification that will move all the traversed text out of the mathematical structure. For example, if a user has entered $$\frac{x+1}{x-2}$$

and the user drags a structure handle from the left endpoint of the fraction bar into the numerator between the plus sign and the numeral 1 and releases it there, the result will be $$x+\frac{1}{x-2}.$$

As another example, it a user has entered $$\sqrt{\frac{3}{4}}$$

and the user releases the square root's right structure handle between the numeral 3 and the fraction bar, the result will be $$\frac{\sqrt{3}}{4}.$$

In an embodiment, if a user releases a left structure handle at a location after the corresponding portion of a mathematical structure, or if a user releases a right structure handle at a location before the corresponding portion of a mathematical structure, no traversed text will exist and no effect will occur. For example, if a user has entered $1-\sqrt{x}+2$ and the user drags the square root's right structure handle to before the minus sign and releases it there, no traversed text will exist and no effect will occur.

Structure Handle Dragging Via Touch or Mouse

In an embodiment, when a structure handle is visible, a user may press the structure handle, such as by pressing it with a finger or by positioning the mouse cursor on the structure handle and pressing a mouse button, and then the user may drag the structure handle to a new location and release the structure handle at the new location, which may cause a structure modification to occur as described above.

In an alternative embodiment, even when a structure handle is not visible a user may press the structure handle, and the structure handle will then become visible and the user may then drag the structure handle to a new location and release it there. Such behavior may make it easier for a user to drag a structure handle, but may also make it easy for a user to drag a structure handle accidentally, so it may or may not confer a net advantage.

In an embodiment, while a user is dragging a structure handle, actuating the Escape key will cause the interface to release the structure handle without causing any structure modification to occur.

In an embodiment, when a user drags a structure handle onto a character or symbol via touch or via mouse and releases the structure handle on that character or symbol, for purposes of the structure handle dragging feature, the "traversed text" includes that character or symbol, along with everything between that character or symbol and the structure handle's initial location.

In an embodiment, when a user drags a structure handle directly left or directly right via touch or via mouse, if the user releases the structure handle at a location that is slightly too high or slightly too low to be a location where releasing the structure handle would cause any traversed text to exist, the interface will respond as though the user dragged the structure handle to a slightly lower or slightly higher location so that traversed text does exist. For example, in an embodiment, if a user drags the left structure handle in the expression $$\frac{x+1}{y}$$

to where it is directly underneath but not touching the plus sign and releases the structure handle there, the interface will respond as though the user dragged the left structure handle onto the plus sign. In an embodiment, a structure handle's location is considered to be "directly left" or "directly right" of its initial location if the angle between the two locations is less than 20 degrees from horizontal, for example. In an embodiment, a location is considered to be "slightly too high" or "slightly too low" to cause traversed text to exist when no traversed text will exist if the structure handle is released at that location, but either moving the location downward a distance that is less than or equal to the height of the lowercase letter e would cause traversed text to exist or moving the location upward such a distance would cause traversed text to exist. However, in an embodiment, if a user releases a structure handle at a location that is simultaneously slightly too high and slightly too low to cause traversed text to exist, then the interface will not make any such adjustment: no traversed text will exist and no structure modification will occur.

In an embodiment, when a user drags a structure handle to a new location via touch or via mouse and releases the structure handle at that location, if moving the traversed text as described above would cause the interface to perform a structure modification that is not a valid structure modification, then the interface will instead perform the smallest valid structure modification that is larger than that structure modification, if any such valid structure modification exists. For example, in an embodiment, if a user has entered $$x-y+\frac{1}{2}$$

and the user drags a structure handle from the left endpoint of the fraction bar onto the plus sign and releases it there so that the traversed text only includes the plus sign, then because moving only the plus sign into the numerator would not be a valid structure modification, the interface will instead move y+into the numerator, yielding $$x-\frac{y+1}{2}.$$

In an embodiment, while a user is dragging a structure handle and has not yet released the structure handle, the interface will highlight everything that will be contained in the associated portion of the mathematical structure if the structure handle is released at its present location. For example, in an embodiment, if a user has entered $$x-y+\frac{1}{2}$$

and the user slowly drags a structure handle from the left endpoint of the fraction bar to the left of the letter x, then before the user moves the structure handle a significant amount, the numeral 1 will be highlighted; when the user has moved the structure handle past the letter y, the letter y and the plus sign and the numeral 1 will be highlighted; and when the user has moved the structure handle all the way past the letter x, the entire expression will be highlighted except the fraction bar and the numeral 2.

In an embodiment, while a user is dragging a structure handle by means of the mouse and has not yet released the structure handle, if the user pauses for a certain amount of time (such as, in an embodiment, for one second), then the interface will display the change that will occur if the user releases the structure handle at its current location, and the interface will move the mouse cursor to the new location of the structure handle so that the user may continue to drag the structure handle as before. For example, in an embodiment, if a user has entered $$x-y+\frac{1}{2}$$

and the user drags a structure handle from the left endpoint of the fraction bar to the left of the letter y and pauses there for a certain amount of time without releasing the mouse button, then the interface will convert the result to $$x-\frac{y+1}{2}$$

and will move the mouse cursor slightly if necessary so that the mouse cursor is again positioned on the structure handle at the left endpoint of the fraction bar; the user may then release the structure handle to achieve the result $$x-\frac{y+1}{2},$$

or may continue to drag the structure handle to achieve some other result, or may press the Escape key to revert to $$x-y+\frac{1}{2}.$$

Structure Handle Dragging Via Keyboard

In the following paragraphs, a structure handle dragging mode is described such that while the interface is in structure handle dragging mode, actuating the left arrow key or the right arrow key will cause a structure handle to move "in the corresponding direction." However, each reference to "the corresponding direction" should be understood to not necessarily refer to the directions left and right; rather, in an embodiment, actuating the left arrow key while the interface is in structure handle dragging mode will cause the structure handle to move to a location that is before its previous location, and actuating the right arrow key while the interface is in structure handle dragging mode will cause the structure handle to move to a location that is after its previous location (according to the definitions of "before" and "after" that are provided in Chapter 42). For example, if a user actuates the right arrow key while the interface is in structure handle dragging mode for a structure handle that is located on the right endpoint of the fraction bar in the expression $$\frac{x+1}{y}-2,$$

then this actuation of the right arrow key may cause the structure handle to move to the end of the expression even if there is a line break between the fraction and the minus sign so that the end of the expression is not displayed to the right of the fraction.

In an embodiment, the computing device has a "grab key" such that actuating the grab key when exactly one structure handle is visible will cause the interface to enter structure handle dragging mode for that structure handle, and while the interface is in structure handle dragging mode, actuating the left arrow key or the right arrow key will cause that structure handle to move in the corresponding direction. In an embodiment, while the interface is in structure handle dragging mode, the structure handle that the user is dragging will take on a distinctive appearance and no structure handle will appear other than the structure handle that the user is dragging. In an embodiment, while the interface is in structure handle dragging mode, actuating the Escape key will cause the interface to exit structure handle dragging mode without causing any structure modification to occur. In an embodiment, while the interface is in structure handle dragging mode, actuating the Enter key or the grab key will cause the interface to release the structure handle at its current location, which may cause a structure modification to occur as described above. For example, in an embodiment, if a user has entered $$x + \frac{1}{y},$$

the user can convert this expression to $$\frac{x+1}{y}$$

by moving the input cursor to the left of the fraction so that a left structure handle appears at the left endpoint of the fraction bar, then pressing the grab key, then pressing the left arrow key sufficiently many times for the left structure handle to become located to the left of the letter x, and then pressing the Enter key in order to release the structure handle, thus causing a structure modification to occur. Such a means of dragging a structure handle may be particularly advantageous on a computing device that does not have a mouse or touchscreen, such as a graphing calculator.

In an embodiment, for purposes of the following paragraph, while the interface is in structure handle dragging mode, a "quality location" is a location such that a structure modification will occur if the structure handle is released at that location, and such that the structure modification that will occur if the structure handle is released at that location is not the same one that will occur if the structure handle is released at its current location. For example, in such an embodiment, when the user has typed $$\frac{\sqrt{3}}{4} + 5$$

and the interface is in structure handle dragging mode for the right structure handle of the square root and the right structure handle is immediately after the numeral 4 within the fraction's denominator, the location immediately after the fraction is not currently a quality location because the structure modification that will occur if the right structure handle is released at that location is the same structure modification that will occur if the structure handle is released at its current location. For purposes of the following paragraph, the "quality level" of a quality location is 1 if the structure modification that will occur if the structure handle is released at that location is an invalid structure modification, or 2 if that structure modification is a valid structure modification but not a normal structure modification, or 3 if that structure modification is a normal structure modification.

In an embodiment, while the interface is in structure handle dragging mode, in response to an actuation of the left arrow key or the right arrow key, except in the circumstances specified in the following sentence, the interface will move the structure handle to the nearest quality location in that direction that has the maximum possible quality level, and may thus move the structure handle past quality locations that have a lower quality level without stopping. However, after an actuation of the left arrow key or the right arrow key that causes the interface to move a structure handle past one or more quality locations that have a lower quality level, if the user's next action or actions consist of one or more consecutive actuations of the opposite arrow key, then in response to each such actuation the interface will move the structure handle to one of those skipped locations that has the highest quality level among those skipped locations, until the interface has consecutively moved the structure handle to all of those skipped locations that have the highest quality level among those skipped locations or until the user performs some action other than an actuation of the opposite arrow key. For example, a single actuation of the left arrow key may cause the interface to move a structure handle past two locations that have a quality level of 2 and a location that has a quality level of 1 in order to reach the nearest quality location that has a quality level of 3; if so, then subsequently, two consecutive actuations of the right arrow key will cause the interface to consecutively move the structure handle to each of the skipped locations that has a quality level of 2; subsequently, if the most recent actuation of the right arrow key caused the interface to move the structure handle past the location that has a quality level of 1, then an actuation of the left arrow key will cause the interface to move the structure handle to that location.

For example, in an embodiment, if a user inputs $$a + b - \frac{c}{2}$$

and then causes the interface to enter structure handle dragging mode for the left structure handle of the fraction, then a first actuation of the left arrow key will not only move the left structure handle past the minus sign but will also move the left structure handle past the letter b, because a structure modification that converts $$a + b - \frac{c}{2}$$

to $$a + \frac{b-c}{2}$$

is valid but a structure modification that converts $$a+b-\frac{c}{2}$$

to $$a+b\frac{-c}{2}$$

is not, and so the position immediately to the left of the letter b has a higher quality level than the position immediately to its right. If after such a first actuation of the left arrow key the user's next action is an actuation of the right arrow key, the interface will then move the left structure handle to the skipped location between the letter b and the minus sign.

In an embodiment, while the interface is in structure handle dragging mode, after each actuation of the left arrow key or the right arrow key, the interface will display the result that will obtain if the structure handle is released at its new location. For example, in an embodiment, if a user inputs $$a+b-\frac{c}{2}$$

and then causes the interface to enter structure handle dragging mode for the left structure handle of the fraction and then actuates the left arrow key, then rather than merely moving the left structure handle, the interface will immediately display the result $$a+\frac{b-c}{2};$$

if the user then actuates the right arrow key, then the interface will immediately display the new result $$a+b\frac{-c}{2};$$

if the user then actuates the Escape key, then the interface will exit structure handle dragging mode and revert to $$a+b-\frac{c}{2}.$$

Chapter 47: Other Structure Editing Features

Structure Modification by Matching Parentheses

In an embodiment, in certain circumstances that are described below, if a left parenthesis and a right parenthesis constitute a "matchable pair of parentheses" as defined below, then the interface may "match the parentheses" as explained below.

In an embodiment, when a mathematical expression includes a right parenthesis that is the last character of the numerator of a fraction, and the expression also includes a left parenthesis that is before that fraction, then if the interface matches the parentheses, the interface will move the left parenthesis and everything that is between it and the fraction's numerator into the numerator. When a mathematical expression includes a left parenthesis that is the first character of the last portion of a mathematical structure, and the expression also includes a right parenthesis that is after the mathematical structure, then if the interface matches the parentheses, the interface will move the right parenthesis and everything that is between it and the end of the mathematical structure into the last portion of the mathematical structure.

In an embodiment, when a mathematical expression includes a right parenthesis that is the last character of the numerator of a fraction, and the expression also includes a left parenthesis that is within that numerator, then if the interface matches the parentheses, the interface will move everything in the numerator that precedes that left parenthesis out of the numerator. When a mathematical expression includes a left parenthesis that is the first character of the last portion of a mathematical structure, and the expression also includes a right parenthesis that is within that last portion of the mathematical structure, then if the interface matches the parentheses, the interface will move everything in the mathematical structure that is after that right parenthesis out of the mathematical structure.

The preceding two paragraphs explain four specific structure modifications that the interface will perform if it matches parentheses in four specific situations. In an embodiment, a left parenthesis and a right parenthesis constitute a matchable pair of parentheses whenever it is the case that at least one of those specific situations obtains and that the structure modification that will occur if the interface matches the parentheses as described for that situation is a valid structure modification. For example, the parentheses in the expression $$(1+\frac{2)}{3}$$

are a matchable pair of parentheses because moving (1+ into the fraction's numerator is a valid structure modification in this expression, but the parentheses in the expression $$\sqrt{(1}+\frac{2)}{3}$$

are not a matchable pair of parentheses because moving (1+ into the fraction's numerator is not a valid structure modification in this expression, and moving +2) into the square root is not a valid structure modification either.

In an embodiment, after the interface matches a pair of parentheses as explained above, it will delete the parentheses.

Matching Unbalanced Parentheses

According to the standard rules of mathematical parsing, if a completed expression has a left parenthesis that has no corresponding right parenthesis, or vice versa, this constitutes a syntax error. According to the standard rules of mathematical parsing, a left parenthesis and right parenthesis cannot correspond to each other if one of the parentheses is contained in a portion of a mathematical structure and the other parenthesis is not contained in that portion of a mathematical structure. Any left parenthesis that has no corresponding right parenthesis, or any right parenthesis that has no corresponding left parenthesis, will be referred to herein as an "unbalanced parenthesis."

In an embodiment, when the user inserts a parenthesis into a mathematical expression, if the most recent previous editing action the user performed also consisted of inserting a parenthesis into a mathematical expression, and the two parentheses that the user inserted are both unbalanced parentheses and are a matchable pair of parentheses, then the interface will match the unbalanced parentheses. (Cursor navigation does not constitute an "editing action" for this purpose.) Thus, in such an embodiment, a user can correct certain mathematical structure mistakes by going back and inserting parentheses where the user had previously neglected to type parentheses. For example, in an embodiment, if a user types $\sqrt{4}+5$, and then as the next two consecutive editing actions the user inserts parentheses in such a way as to yield $\sqrt{4}+5$ then the interface will convert the result to $\sqrt{4+5}$. As another example, if a user types $$\frac{\sqrt{3}}{4}$$

and then as the next two consecutive editing actions the user inserts parentheses in such a way as to yield $$\frac{\sqrt{(3}}{4)} \text{ or } \left.\frac{\sqrt{(3}}{4}\right),$$

in either case the interface will convert the result to $$\sqrt{\frac{3}{4}}.$$

In various alternative embodiments, other circumstances will cause the interface to match unbalanced parentheses: for example, in one alternative embodiment, the interface will match unbalanced parentheses whenever possible; in another alternative embodiment, the interface will match unbalanced parentheses only when the user actuates the Enter key or some other key that indicates the user has finished typing a mathematical expression.

In an embodiment, when the interface matches unbalanced parentheses, its decision to do so is an alterable interface decision with a low probability of alteration.

Moving Parenthesis Mode

The following section describes circumstances in which the interface will insert either a "left anchor parenthesis" or a "right anchor parenthesis" in the user's input, in some embodiments. In an embodiment, whenever the interface inserts either a left anchor parenthesis or right anchor parenthesis as described below, the interface will enter "moving parenthesis mode."

In an embodiment, while the interface is in moving parenthesis mode, the anchor parenthesis will be displayed in a distinctive manner, such as, in an embodiment, in a bold font. In an embodiment, while the interface is in moving parenthesis mode, the input cursor will no longer appear as a blinking slender vertical rectangle, but will instead appear as a blinking parenthesis character that is complementary to the anchor parenthesis: that is, when the interface inserts an anchor parenthesis that is a left parenthesis, the input cursor will become a blinking right parenthesis; when it inserts an anchor parenthesis that is a right parenthesis, the input cursor will become a blinking left parenthesis.

In an embodiment, while the interface is in moving parenthesis mode, if a user presses either the Enter key or the parenthesis key that matches the current appearance of the input cursor, the interface will insert a parenthesis character that matches the current appearance of the input cursor at the current location of the input cursor. The interface will then exit moving parenthesis mode and revert the input cursor to its normal appearance and, in an embodiment, will move the input cursor to where it was located before the interface entered moving parenthesis mode. If the newly inserted parenthesis character and the anchor parenthesis are a matchable pair of parentheses, the interface will match the parentheses. After that, whether or not the parenthesis character and the anchor parenthesis were a matchable pair of parentheses, if the anchor parenthesis still exists, it will cease to be an anchor parenthesis and will no longer be displayed in a distinctive manner.

In an embodiment, while the interface is in moving parenthesis mode, if a user presses the Escape key, the interface will exit moving parenthesis mode and delete the anchor parenthesis.

In an embodiment, while the interface is in moving parenthesis mode, if the anchor parenthesis is a left parenthesis and the input cursor becomes located before the anchor parenthesis, or if the anchor parenthesis is a right parenthesis and the input cursor becomes located after the anchor parenthesis, then the interface will exit moving parenthesis mode and delete the anchor parenthesis. In an embodiment, as an exception, while the interface is in moving parenthesis mode, if the user had caused the interface to enter moving parenthesis mode by means of actuating the generic anchor parenthesis key, then if the anchor parenthesis is a left parenthesis and the input cursor becomes located before the anchor parenthesis, the anchor parenthesis will turn into a right parenthesis and the input cursor will change its appearance to a left parenthesis; if the anchor parenthesis is a right parenthesis and the input cursor becomes located after the anchor parenthesis, the anchor cursor will switch from a right parenthesis to a left parenthesis and the input cursor will change its appearance to a right parenthesis.

In an embodiment, while the interface is in moving parenthesis mode, if a user presses a key other than Enter, Escape, a cursor movement key, or the parenthesis key that matches the current appearance of the input cursor, then the interface will exit moving parenthesis mode and delete the anchor parenthesis, and then handle the key normally; in an alternative embodiment, if a user presses such a key while the interface is in moving parenthesis mode, then the key will have no effect.

In an embodiment, while the interface is in moving parenthesis mode, if a user actuates the left arrow key, the interface will if possible move the input cursor to the nearest location that is before its current location such that if the user presses the Enter key when the input cursor is at that location then the parenthesis character that will be inserted and the anchor parenthesis will be a matchable pair of parentheses; if this is not possible, the interface will respond to the actuation of the left arrow key normally. Similarly, while the interface is in moving parenthesis mode, if a user actuates the right arrow key, the interface will if possible move the input cursor to the nearest location that is after its current location such that if the user presses the Enter key when the input cursor is at that location than the parenthesis character that will be inserted and the anchor parenthesis will be a matchable pair of parenthesis; if this is not possible, the interface will respond to the actuation of the right arrow key normally.

Typing Anchor Parentheses

In an embodiment, the interface has a "left anchor parenthesis key" such that actuating the left anchor parenthesis key will cause the interface to insert a left anchor parenthesis, except as specified below, and the interface has a "right anchor parenthesis key" such that actuating the right anchor parenthesis key will cause the interface to insert a right anchor parenthesis, except as specified below.

In particular, in an embodiment, if a user presses and holds the ordinary left parenthesis key or the ordinary right parenthesis key for at least a certain minimum amount of time (such as, in an embodiment, for at least one full second), then after that time has elapsed, the interface will replace the parenthesis that was inserted in response to that actuation of the parenthesis key with an anchor parenthesis. In such an embodiment, holding down the left parenthesis key for a sufficiently long amount of time constitutes "actuating the left anchor parenthesis key," and holding down the right parenthesis key for a sufficiently long amount of time constitutes "actuating the right anchor parenthesis key," even if the embodiment does not actually have individual physical keys that have insertion of anchor parentheses as their primary purpose. In an alternative embodiment, a user may actuate an anchor parenthesis key by some other means, such as by means of holding down a particular modifier key while pressing a parenthesis key. In another alternative embodiment, the interface does not have an anchor parenthesis key, but a user can still cause the interface to insert anchor parentheses by various other means that are described below.

In an alternative embodiment, in addition to or instead of having a left anchor parenthesis key and a right anchor parenthesis key, the interface has a "generic anchor parenthesis key." For example, in an embodiment that is a graphing calculator that does not have individual left parenthesis and right parenthesis keys but instead has a paired parentheses key, holding down the paired parentheses key for a sufficiently long amount of time constitutes "actuating the generic anchor parenthesis key."

In an embodiment, when the input cursor is on a symbol that denotes a mathematical structure that has a last portion but does not have a first portion, if a user presses any parenthesis key or anchor parenthesis key then the interface will insert a left anchor parenthesis at the beginning of the last portion of the mathematical structure. In particular, when the input cursor is on a square root symbol, if a user presses a parenthesis key then the interface will insert a left anchor parenthesis at the beginning of the radicand.

In an embodiment, when the input cursor is on a fraction bar, if a user presses the left parenthesis key or left anchor parenthesis key then the interface will insert a left anchor parenthesis at the beginning of the fraction's denominator, or if a user presses the right parenthesis key or right anchor parenthesis key then the interface will insert a right anchor parenthesis at the end of the fraction's numerator. In an alternative embodiment, these behaviors are swapped: when the input cursor is on a fraction bar, if a user presses the right parenthesis key or right anchor parenthesis key then the interface will insert a left anchor parenthesis at the beginning of the fraction's denominator, or if a user presses the left parenthesis key or left anchor parenthesis key then the interface will insert a right anchor parenthesis at the end of the fraction's numerator.

In an embodiment, when the input cursor is on a fraction bar, if a user presses the generic anchor parenthesis key then this will have no immediate effect, but if the user's next action is an actuation of the left arrow key then the interface will insert a right anchor parenthesis at the end of the fraction's numerator, or if the user's next action is an actuation of the right arrow key then the interface will insert a left anchor parenthesis at the beginning of the fraction's denominator.

In the present section, a "valid anchor parenthesis" is an anchor parenthesis such that when the anchor parenthesis is present in the user's input and the interface is in moving parenthesis mode as described above, there is at least one location in the user's input such that positioning the input cursor at that location and pressing Enter would cause the interface to perform a valid structure modification. An "invalid anchor parenthesis" is an anchor parenthesis such that there is no such location. (Generally, anchor parentheses are used to facilitate structure modifications, so it is not usually desirable to input an invalid anchor parenthesis.)

For purposes of the following paragraph, when a user actuates an anchor parenthesis key, "default anchor insertion is invalid" if the corresponding anchor parenthesis inserted at the current location of the input cursor would be an invalid anchor parenthesis. For example, if the input cursor is at the end of the expression $\sqrt{4+5}$ when a user actuates the right anchor parenthesis key, then default anchor insertion is invalid, because if a right anchor parenthesis were inserted after that square root then there would be no location in the user's input such that positioning the input cursor at that location and pressing Enter would cause the interface to perform a valid structure modification.

In an embodiment, as an exception to the behavior described above, when a user actuates the left anchor parenthesis key, if default anchor insertion is invalid and either the input cursor is at the beginning of a fraction's numerator or the input cursor is not at the beginning of a numerator but is immediately before a fraction, then the interface will not insert a left anchor parenthesis at the current location of the input cursor but will instead insert a right anchor parenthesis at the end of the fraction's numerator, without moving the input cursor. When a user actuates the right anchor parenthesis key, if default anchor insertion is invalid and either the input cursor is at the end of the last portion of a mathematical structure or the input cursor is not at the end of the last portion of a mathematical structure but is immediately after a mathematical structure that has a last portion, then the interface will not insert a right anchor parenthesis at the current location of the input cursor but will instead insert a left anchor parenthesis at the beginning of the last portion of the mathematical structure, without moving the input cursor. For example, in an embodiment, if the input cursor is at the end of the expression $\sqrt{4+5}$ when a user actuates the right anchor parenthesis key, then the interface will insert a left parenthesis at the beginning of the radicand, so the result thus far will be $\sqrt{4+5}$; if the user then moves the input cursor to immediately after the numeral 4 and presses Enter, the result will be $\sqrt{4}+5$.

In an embodiment, when a user actuates the generic anchor parenthesis key, the interface will determine whether to insert a left anchor parenthesis or right anchor parenthesis as follows: If the input cursor is at the beginning or end of a numerator, the interface will insert a right anchor parenthesis at the end of the numerator. If the input cursor is at the beginning or end of the last portion of a mathematical structure, the interface will insert a left anchor parenthesis at the beginning of the last portion of the mathematical structure. Otherwise, if the input cursor is immediately before a fraction and is not immediately after a mathematical structure that has a last portion, the interface will insert a right anchor parenthesis at the end of the fraction's numerator; if the input cursor is immediately after the last portion of a mathematical structure and is not immediately before a fraction, the interface will insert a left anchor parenthesis at the beginning of the last portion of the mathematical structure. Otherwise, if a left anchor parenthesis inserted at the current location of the input cursor would be a valid anchor parenthesis but a right anchor parenthesis would not, then the interface will insert a left anchor parenthesis; if a right anchor parenthesis inserted at the current location of the input cursor would be a valid anchor parenthesis but a left anchor parenthesis would not, then the interface will insert a right anchor parenthesis. Otherwise, in an embodiment, the interface will insert a left anchor parenthesis (as a more or less arbitrary choice). For example, in an embodiment, if a user types $\sqrt{4}+5$ and then actuates the generic anchor parenthesis key, then the interface will insert a right anchor parenthesis because the input cursor is not within or immediately before or after a mathematical structure and a right anchor parenthesis will be a valid anchor parenthesis but a left anchor parenthesis would not.

In an embodiment, when the interface enters moving parenthesis mode and inserts an anchor parenthesis that is a left parenthesis, it will move the input cursor to the nearest location after that anchor parenthesis such that if the user presses the Enter key when the input cursor is at that location then the interface will perform a numerator expansion or structure expansion, if such a location exists. When the interface enters moving parenthesis mode and inserts an anchor parenthesis that is a right parenthesis, it will move the input cursor to the nearest location before that anchor parenthesis such that if the user presses the Enter key when the input cursor is at that location than the interface will perform a numerator expansion or structure expansion, if such a location exists.

For example, in an embodiment, if a user types $\sqrt{4}+5$ and then actuates the right anchor parenthesis key, then the result thus far will be $\sqrt{4}+5)$, and the interface will move the input cursor to immediately before the numeral 4 within the square root because that is the nearest location such that if the user presses the Enter key when the input cursor is at that location then the interface will perform a numerator expansion or structure expansion. If the user then presses Enter, the result will be $\sqrt{4+5}$ and the input cursor will return to the end of the expression. In such an embodiment, it thus may be possible to belatedly correct a mathematical structure mistake relatively quickly even without the use of alteration functionality.

Large Structure Creation

In an embodiment, when a user presses a key that causes the interface to create a new mathematical structure, if the user holds down the key longer than a certain threshold amount of time, then the interface will begin to increase the size of the the symbol that denotes the mathematical structure, and will continue to gradually increase its size until the user releases the key. For example, in an embodiment, if a user presses and holds the fraction creation key, then after one full second, the fraction bar of the new fraction will grow until the user releases the key. In an embodiment, if a user presses and holds the square root key, then after one full second, the square root symbol will grow until the user releases the key.

In an embodiment, when a user presses the exponentiation key, if the user holds down the key longer than a certain threshold amount of time, then the interface will create an empty rectangle that denotes the extent of the exponent and will begin to increase its size, and will continue to gradually increase its size until the user releases the key.

In an embodiment, if a user causes the interface to increase the size of a mathematical structure symbol as described in the preceding paragraphs, then the interface will shrink the mathematical structure symbol if appropriate to fit its contents when the input cursor is no longer located within the mathematical structure, but not until then, except as specified below. For example, in an embodiment, if a user holds down the square root key a very long time and thus creates a square root symbol with a very long vinculum, then types the numeral 1 within the square root, and then presses the right arrow key to move the input cursor out of the square root, then the interface will shrink the square root symbol to the usual size for Vi as soon as the user moves the input cursor out of the square root, but not until then. Similarly, in an embodiment, if a user causes the interface to create an empty rectangle that denotes the extent of an exponent as described in the preceding paragraph, then the interface will cause that rectangle to disappear when the input cursor is no longer located within the exponent, but not before then.

In an embodiment, when no other mathematical text is after a mathematical structure, a user may increase the size of the symbol that denotes that mathematical structure by dragging its right structure handle to the right.

In an embodiment, after a user has caused the interface to increase the size of a mathematical structure symbol as described above, when the interface has not shrunk the mathematical structure symbol to fit its contents, and when the input cursor is in the last portion of the mathematical structure, if circumstances are such that the interface would ordinarily enter a bipositional entry mode such that typing a plus sign or minus sign would cause the interface to automatically move the input cursor out of the mathematical structure before inserting that plus sign or minus sign into the user's input, then if the mathematical structure symbol is already sufficiently large that a plus sign could be entered within the last portion of the mathematical structure without causing the mathematical structure symbol to increase in size, the interface will not enter a bipositional entry mode: if the user's next action is typing a character than that character will be included within the last portion of the mathematical structure even if it is a plus sign or minus sign. Instead, the interface will enter a bipositional entry mode only when there is insufficient room within the mathematical structure for a plus sign to be inserted, and when it would be syntactically valid to move a plus sign out of the mathematical structure. For example, in an embodiment, if a user holds down the square root key long enough to create a square root symbol $\sqrt{\quad}$ with an unusually long vinculum, and if the square root symbol is sufficiently large for 1+3+5 to fit beneath the vinculum but not large enough for 1+3+5+ to fit beneath the vinculum, then if the user types the keystroke sequence 1+3+5+7, the interface will not enter a bipositional entry mode until after the user has typed 1+3+5, so the first two times the user types a plus sign the interface will not automatically exit the square root, but the third time the user types a plus sign the interface will automatically exit the square root. The result will be $\sqrt{1+3+3+5}+7$.

In an embodiment, after a user has caused the interface to increase the size of a mathematical structure symbol as described above, when the interface has not shrunk the mathematical structure symbol to fit its contents, whenever a user enters additional mathematical input within the mathematical structure without causing the width of the contents of the last portion of the mathematical structure to increase, the interface will decrease the width of the mathematical structure symbol somewhat. For example, if a user creates a square root symbol with a vinculum that is slightly longer than usual, and then within the square root the user types the fraction $$\frac{1}{4}$$

by means of the keystroke sequence 1/4, then when the user presses the fraction bar key and the 4 key the width of the radicand will not increase, but the length of the vinculum will decrease. In other words, in such an embodiment, an enlarged mathematical structure will generally tend to fit a certain number of additional characters before automatic structure exiting can occur, regardless of whether those additional characters make the expression contained within the last portion of the mathematical structure wider or taller or both.

In the preceding paragraphs, an interface behavior is described such that holding down a mathematical structure creation key may cause the interface to create a mathematical structure that is initially larger than usual. In Chapter 44, an interface behavior is described such that additional consecutive actuations of the fraction creation key may pull additional mathematical text into a new fraction's numerator. In U.S. Pat. No. 8,788,548, an interface behavior is described such that additional consecutive actuations of the square root key may replace the new square root with a cube root, then a 4th root, and so on. In various alternative embodiments, holding down a mathematical structure creation key may instead yield the effect that was described as resulting from repeated consecutive actuations of the key, or repeated consecutive actuations of a mathematical structure creation key may instead cause the interface to create a mathematical structure that is initially larger than usual, or both. For example, in an alternative embodiment, double-clicking the square root key will cause the interface to create a mathematical structure that is initially larger than usual, and holding down the square root key will cause the interface to replace the new square root with a cube root, then a 4th root, and so on.

Chapter 48: Trigonometric Input Shortcuts

The Gradian Symbol

Gradians are not as commonly used as degrees or radians, especially in education; millions of prior art TI-84 Plus graphing calculators that are used in classrooms do not have a gradian evaluation mode or a gradian symbol. However, some prior art calculators do have a gradian evaluation mode in addition to a degree evaluation mode and a radian evaluation mode. Also, on some prior art calculators, the user can invoke an interface function that appends a gradian symbol, which denotes that the preceding quantity is to be interpreted as a quantity of gradians regardless of the calculator's current mode settings. The gradian symbol typically looks like a superscripted non-italic lowercase g. For example, on some calculators, a user who wishes to evaluate the sine of 50 gradians may input $\sin(50^{\mathrm{g}})$. Although this symbol appears quite similar to an exponent consisting of the letter g, it is a distinct symbol: if a user inputs an actual exponent consisting of the letter g by means of an exponent creation key, then such an exponent will not be interpreted as a gradian symbol.

In an embodiment of the present invention, when a user inputs an exponent consisting of the lowercase letter g, as soon as the input cursor is not in the exponent, the interface will make an alterable decision whether to interpret this exponent as a gradian symbol or as a variable. In an embodiment, such an alterable decision constitutes a subtle change for purposes of interface behaviors described in Chapter 8; when the interface displays a block descriptor for such a change, the interface will describe the options of the decision as "gradians" and "to the power of g." In an embodiment, an exponent consisting of the lowercase letter g will be italicized when and only when the interface is interpreting this exponent as a variable.

In an embodiment, when a user inputs an exponent of g and the interface makes an alterable decision whether to interpret this exponent as a gradian symbol or as a variable, the interface will make the alterable decision according to the following rules: First, if the variable g is unambiguously present elsewhere in the user's input, then the interface will interpret the exponent as a variable, and this decision's probability of alteration will be very low. Otherwise, if the exponent is at the end of a trigonometric function operand, then the interface will interpret the exponent as a gradian symbol, and this decision's probability of alteration will be very low. Otherwise, if the interface is an interface of a numeric calculator as defined in Chapter 51 and no value has been defined for the variable g, then the interface will interpret the exponent as a gradian symbol. Otherwise, the interface will interpret the exponent as a variable. (For purposes of the present paragraph, a "numeric calculator" is a calculator that evaluates all expressions as constant specific constant numeric values, and thus may be able to determine that the equation 2x+2x=4x is true for the particular value of x that is currently stored in the calculator's memory, but cannot evaluate the expression 2x+2x and yield the answer 4x. Traditionally, such calculators are often referred to as "non-CAS" calculators, where "CAS" stands for "Computer Algebra System.")

In an embodiment, if the interface has made an alterable decision to interpret an exponent of g as a gradian symbol and that decision's probability of alteration is not extremely low when the variable g becomes unambiguously present elsewhere in the user's input, then the interface will automatically alter that decision and interpret the exponent of g as a variable instead.

Parsing Trigonometric Operands

Some math input interfaces are configured so that any trigonometric function identifier that the user types will be automatically followed by a left parenthesis that remains attached to the trigonometric function identifier. In the present specification, any such math input interface will be referred to as a "calculator notation trigonometric interface."

In a calculator notation trigonometric interface, for example, if a user actuates the sine key, then the corresponding input that appears on the display of the computing device will be "sin(" and not merely "sin"; the user cannot then delete the attached left parenthesis without also deleting the three letters of the "sin" function identifier. In such an interface, the algorithm for determining what constitutes a trigonometric function's operand is quite simple: once the user has typed a right parenthesis that corresponds to a trigonometric function's attached left parenthesis, the operand of the trigonometric function consists of everything between the attached left parenthesis and its corresponding right parenthesis.

Other math input interfaces are configured so that a user can input an expression such as $\sin^2 30°$ the same way it appears in a typical mathematical textbook, without additional parentheses. In the present specification, a math input interface will be referred to as a "textbook notation trigonometric interface" if it fits the following criteria: it permits the entry of a trigonometric function identifier such as sin without automatically attaching a parenthesis; it permits such a trigonometric function identifier to be immediately followed by an exponent, as in $\sin^2$, or by a superscripted −1, as in $\sin^{-1}$; and it permits the entry of a degree symbol.

(It is possible for a math input interface to be neither a textbook notation trigonometric interface nor a calculator notation trigonometric interface according to the definitions given in the preceding paragraphs. For example, the interface of the Casio fx-CG10 graphing calculator does not permit a trigonometric function identifier to be immediately followed by an exponent, as in $\sin^2$, and it does not automatically attach a left parenthesis to every trigonometric function identifier either; thus, on such a calculator, a user who wishes to input $\sin^2 x$ will instead input the equivalent expression $(\sin x)^2$. However, most prior art math input interfaces are either calculator notation trigonometric interfaces or textbook notation trigonometric interfaces.)

At least one prior art textbook notation trigonometric interface exists that is embodied in software applications that run on graphing calculators: namely, the interface of the software applications Zoom Math 400 and Zoom Math 500, which run on TI-84 Plus graphing calculators, is a textbook notation trigonometric interface. In certain circumstances, these applications evaluate the user's mathematical input; therefore, it is important for these applications to be able to determine what constitutes a trigonometric function's operand.

Those of ordinary skill in the art will understand algorithms for the parsing of mathematical expressions; some details of how to determine what constitutes a trigonometric function's operand in a textbook notation trigonometric interface are reviewed briefly in the following paragraphs.

If a trigonometric function identifier is immediately followed by a superscripted numeral, then the superscripted numeral is not part of the trigonometric function's operand and is ignored when determining what constitutes the trigonometric function's operand. For example, in each of the three expressions $\sin x$, $\sin^2 x$, and $\sin^{-1} x$, the operand of the trigonometric function is x.

Although a textbook notation trigonometric interface does not require a trigonometric function's operand to be entirely enclosed in parentheses, it remains possible for a user to explicitly type parentheses in a textbook notation trigonometric interface and to thus entirely enclose a trigonometric function's operand in parentheses. In accordance with the rules of mathematical parsing, any section of mathematical text that is enclosed in balanced parentheses will be parsed as a unit; thus, if a trigonometric function identifier is immediately followed by a left parenthesis, the trigonometric function's operand will include at least all the mathematical text between that left parenthesis and the corresponding right parenthesis. Similarly, if a trigonometric function identifier is immediately followed by a fraction, the trigonometric function's operand will include at least the entire fraction; it will not, for instance, include only the fraction's numerator. Other similar considerations will be evident to those of ordinary skill in the art.

Subject to the considerations mentioned above, when a trigonometric function's operand is not enclosed in parentheses, its operand will consist of the single term that immediately follows the trigonometric function identifier, where the term may consist of one numeral or one variable or a plurality of numerals and/or variables that are multiplied together, but will not include any operator of lower precedence than multiplication. For example, because the plus operator has lower precedence than multiplication, the operand of the sine function in the expression $\sin 2x+1$ is 2x.

Ordinarily, if a numeral is adjacent to and immediately followed by a trigonometric function identifier, the rules of mathematical parsing dictate that the numeral is to be multiplied by the value of the trigonometric function. For example, in the expression $2 \sin x+3$, the numeral 2 is to be multiplied by the value of sin x, and 2 sin x constitutes a single term. However, if a numeral that is itself an operand of a trigonometric function is adjacent to and immediately followed by a trigonometric function identifier, then the numeral is not to be multiplied by the value of the trigonometric function; instead, the trigonometric function of which the numeral is an operand is to be evaluated, and the resulting value is to be multiplied by the value of the following trigonometric function. For example, in the expression $\sin 2 \sin x$, the numeral 2 is not to be multiplied by the value of sin x; instead, the value of sin 2 is to be multiplied by the value of sin x. Thus, in such an expression, 2 sin x does not constitute a single term. Similarly, in the expression $\sin 2x \cos 2x$, the term 2*x* is not to be multiplied by the value of cos 2x; instead, the value of sin 2x is to be multiplied by the value of cos 2x. Thus, it may be observed that in a textbook notation math input interface, the single term that immediately follows the trigonometric function identifier does not include any trigonometric functions that are after numerals and/or variables. Other similar considerations will be evident to those of ordinary skill in the art. For example, although the expression sin x log x does not commonly occur, those of ordinary skill in the art who consider such an expression will determine that it is reasonable to parse this expression similarly to sin x cos x, so that the operand of the sine function will be determined to be x.

Whether or not a trigonometric function's operand is enclosed in parentheses, a degree symbol that immediately follows a trigonometric function's operand will itself be considered to be part of the trigonometric function's operand, as will any other similar symbol that indicates a unit of angle measurement that immediately follows a trigonometric function's operand.

Determining when a Trigonometric Operand is Finished

In an embodiment, for purposes of the trigonometric operand supplementation behaviors that are described below, unless otherwise specified, the operand of a power of a basic trigonometric function (such as $\sin^2$) counts as "the operand of a trigonometric function." In particular, in an embodiment, the interface not only will determine when a user has finished typing the operand of a trigonometric function (as is stated in the following paragraph), but also will determine when a user has finished typing the operand of a power of a trigonometric function. In an embodiment, however, for purposes of trigonometric operand supplementation behaviors, the operand of an inverse trigonometric function such as arcsin or $\sin^{-1}$ does not constitute "the operand of a trigonometric function."

In an embodiment, the interface will determine when a user has finished typing the operand of a trigonometric function. Various means for doing so are described below.

In an embodiment that is a calculator notation trigonometric interface, any trigonometric function identifier that the user types will automatically be followed by an attached left parenthesis. In such an embodiment, the interface can determine when a user has finished typing the operand of a trigonometric function by checking, after each keystroke, whether a right parenthesis has yet been typed that corresponds to the left parenthesis that immediately follows the trigonometric function identifier; when such a right parenthesis has been typed, the user has finished typing the operand of the trigonometric function.

In an embodiment that is not a calculator notation trigonometric interface, the interface cannot necessarily determine when a user has finished typing the operand of a trigonometric function merely by checking for a corresponding right parenthesis. Instead, in an embodiment, the interface determines when a user has finished typing the operand of a trigonometric function by, until the user has finished typing the operand, performing the following sequence of actions after each keystroke: first, internally creating a copy of the user's input; second, inserting a distinctive character at a position in the copy of the user's input that corresponds to the position of the input cursor in the user's actual input; third, parsing the copy of the user's input, with the distinctive character that was inserted parsed according to rules akin to the standard rules for parsing a variable such as x; and fourth, determining whether, when the copy of the user's input was parsed, the distinctive character either was within an exponent immediately following the trigonometric function identifier or was determined by the parser to be within the trigonometric function's operand. If the distinctive character that was parsed was within an exponent immediately following the trigonometric function identifier or was within the trigonometric function's operand, then the user has not finished typing the operand; if the distinctive character was not within an exponent immediately following the trigonometric function identifier and was not within the trigonometric function's operand, then the user has finished typing the operand. For example, in an embodiment, if the user has typed sin 30 and the cursor is positioned at the end of the user's input, then the interface will determine that the operand of the sine function in sin 30@ does include the symbol @ if that symbol is parsed according to the same rules as the letter x, and so the interface will determine that the user has not yet finished typing the operand of the sine function. If the user has typed sin 30+ and the cursor is positioned at the end of the user's input, then the interface will determine that the operand of the sine function in sin 30+@ includes only the numeral 30 and does not include the symbol @, and so the interface will determine that the user has finished typing the operand of the sine function.

Various other means of determining when a user has finished typing the operand of a trigonometric function will be obvious to those of ordinary skill in the art. For example, those of ordinary skill in the art will understand that a modified parser algorithm can be constructed such that, without actually creating an internal copy of the user's input or inserting a distinctive character into the input, the modified parser algorithm can still determine whether or not a distinctive character inserted at the current cursor position would be part of a particular trigonometric function's operand.

In an embodiment, if a user actuates the Enter key when the interface has not yet determined that the user has finished typing the operand of a trigonometric function, or if the user actuates any other key that indicates the user has finished typing mathematical input when the interface has not yet determined that the user has finished typing the operand of a trigonometric function, then the actuation of the Enter key or other key will cause the interface to determine that the user has finished typing the operand of the trigonometric function.

In an alternative embodiment, the interface will not determine that a user has finished typing any operand of a trigonometric function until the user has finished an entire line of input and has actuated the Enter key or some other key that indicates the user has finished typing mathematical input, whereupon the interface will determine that the user has finished typing every operand of every trigonometric function throughout the line of input. For example, in such an embodiment, if a user types sin 30+cos 60 and then presses Enter, then the interface will determine that the user has finished typing the operand of the sine function only when the user presses Enter, at which time the interface will also determine that the user has finished typing the operand of the cosine function.

In an embodiment, in some circumstances the interface may determine that "a user has finished typing the operand of a trigonometric function" when the user clearly has not typed any operand for the trigonometric function; in such cases, in determining that the user has finished typing the operand of the trigonometric function, the interface actually is determining that the user has entirely omitted the operand of the trigonometric function. For example, in an embodiment, if a user actuates the sine key and then immediately actuates the Enter key, then the interface will determine that the user has finished typing the operand of the sine function, and that the user has thus entirely omitted the operand of the sine function.

Trigonometric Operand Supplementation

In an embodiment, once the user has finished typing the operand of a trigonometric function, the interface will determine whether or not to supplement the operand that the user typed with additional mathematical input that the user did not type. Various methods for determining whether to supplement the operand that the user typed are described below.

In an embodiment, for each trigonometric function that the user types, the interface will determine that the user has finished typing the operand of that trigonometric function on only one occasion. For example, in such an embodiment, if a user types sin 30+ and the interface determines that the user has finished typing the operand of the sine function when the plus key is actuated, and the user then deletes and retypes the plus sign in the same location, the interface will not determine a second time that the user has finished typing the operand of the sine function, and thus will not determine a second time whether or not to supplement the operand that the user typed.

Ensuring that the interface will determine that the user has finished typing the operand of any particular trigonometric function on only one occasion can be achieved by various means. For example, in an embodiment, the interface is configured so that when the user actuates a trigonometric function key and a corresponding trigonometric function identifier is accordingly inserted into the memory buffer that stores the user's input, a particular additional identifier is also inserted into the memory buffer immediately before the trigonometric function identifier, where this additional identifier denotes that the interface has not yet determined that the user has finished typing the operand of the following trigonometric function; this additional identifier is not displayed and is not editable; and this additional identifier remains present in the memory buffer until either the trigonometric function identifier is deleted from the memory buffer or the interface determines that the user has finished typing the operand of the trigonometric function, whereupon this additional identifier is deleted from the memory buffer. In such an embodiment, any trigonometric function identifier in the memory buffer that is not preceded by the particular additional identifier denotes a trigonometric function such that the interface has already determined that the user has finished typing the operand of that trigonometric function; the interface will not determine a second time that the user has finished typing the operand of such a trigonometric function.

Other means of ensuring that the interface will determine that the user has finished typing the operand of any particular trigonometric function on only one occasion will be evident to those of skill in the art.

In the present specification, the phrase "when operand supplementation is triggered" refers to the moment in which the interface has just determined that the user has finished typing the operand of a trigonometric function and the interface is now determining whether or not to supplement the operand that the user typed. In such a situation, the interface will not necessarily always supplement the operand that the user typed; thus, the phrase "when operand supplementation is triggered" may sometimes refer to a moment in which the interface is determining that no supplementation will occur.

Degree Supplementation

In an embodiment of the present invention, the interface is configured to have a "degree input mode" that is distinct from a "radian input mode," and when operand supplementation is triggered, if the interface is in degree input mode and the operand that the user typed did not include a degree symbol or a radian symbol (or a gradian symbol), then the interface will automatically insert a degree symbol at the end of the operand the user typed.

In prior art, certain "modal calculators" exist that have a "degree evaluation mode" and a "radian evaluation mode." Modal calculators are explained in more detail in Chapter 51. The degree input mode described herein is different than the degree evaluation mode of prior art modal calculators: A prior art modal calculator will not automatically insert any degree symbols into the input that a user types, but when evaluation of the user's input is triggered, the prior art modal calculator may treat the operand of a trigonometric function as though it were in units of degrees even when the operand contains no degree symbol. An interface that has a degree input mode as disclosed herein may automatically insert degree symbols into the input that a user types, but when evaluation of the user's input is triggered, the operand of a trigonometric function will be treated as though it is in units of degrees only if a degree symbol is explicitly present in the user's input (either because the user typed a degree symbol or because the interface inserted a degree symbol).

In an embodiment, when operand supplementation is triggered, if the operand that the user typed consisted of a single term enclosed in parentheses without a degree symbol, and if the interface decides to automatically insert a degree symbol, then the interface will insert the degree symbol immediately before the closing parenthesis rather than immediately after the closing parenthesis. For example, in such an embodiment, if the interface is in degree mode when a user types cos(−2), the interface will convert the user's input to) cos(−2° rather than cos(−2°).

In an embodiment, when operand supplementation is triggered, in certain circumstances the interface may decide to automatically switch from degree input mode to radian input mode or vice versa when it decides whether or not to automatically insert a degree symbol at the end of the operand the user typed. In an embodiment, when the interface decides whether or not to automatically insert a degree symbol at the end of the operand the user typed, this decision may be an alterable decision, in which case altering the decision may additionally cause the interface to switch from degree input mode to radian input mode or vice versa. Such behavior is described in more detail below, after the discussion of the trigonometric mode intervention feature.

In an embodiment, when the interface makes an alterable decision whether or not to insert a degree symbol after a trigonometric operand or portion thereof, the alterable block of the decision will include that trigonometric operand or portion thereof for purposes of highlighting. For example, in an embodiment, if the interface is in radian mode when a user types cos(−2) and the interface alterably decides not to convert the user's input to cos(−2°), the alterable block of this decision will be the numeral −2 for purposes of highlighting.

In an embodiment, in any circumstances where actuating the plus key would cause the interface to automatically insert a degree symbol, the insertion of the degree symbol is a pending autocorrection change for purposes of certain interface behaviors that are described in Chapter 8. In any circumstances where actuating the plus key would cause the interface to make an alterable decision to not automatically insert a degree symbol, but this decision would have at least a moderately high probability of alteration, the insertion of the degree symbol is a pending optional interpolation for purposes of certain interface behaviors that are described in Chapter 8. In such an embodiment, by means of certain features that are described in Chapter 8, a user may be able to explicitly accept or reject the insertion of a degree symbol before operand supplementation is actually triggered, in which case the later triggering of operand supplementation will have no additional effect. For example, in an embodiment, once a user types sin 2, a degree symbol may appear in a faded color such that actuating the Yes key will cause the degree symbol to actually become included in the user's input in the normal color, or actuating the No key will cause the degree symbol to disappear completely; if the user does actuate the Yes key or the No key in such circumstances, and then the user actuates the plus key, then actuating the plus key at that point will not cause the interface to make any additional decision whether or not to insert a degree symbol.

In an embodiment, the interface also has a "gradian input mode," and when operand supplementation is triggered, if the interface is in gradian input mode and the operand that the user typed did not include a degree symbol or a radian symbol or a gradian symbol, then the interface will automatically insert a gradian symbol at the end of the operand the user typed. Various behaviors that are described above with respect to degree input mode are also applicable to gradian input mode; for example, in an embodiment, in any circumstances where actuating the plus key would cause the interface to automatically insert a gradian symbol, the insertion of the gradian symbol is a pending optional interpolation.

Classifying Trigonometric Operands

In an embodiment, for purposes of the interface behaviors that are described below, the interface will categorize trigonometric operands as follows: A trigonometric operand that contains a degree symbol that the user actually typed is "degree-explicit." Likewise, a trigonometric operand that contains a radian symbol that the user actually typed is "radian-explicit," and a trigonometric operand that contains a gradian symbol that the user actually typed is "gradian-explicit." A trigonometric operand is "measure-explicit" if it is degree-explicit, radian-explicit, or gradian-explicit. A trigonometric operand is "supplementable" unless it is measure-explicit or it contains a variable (or both), in which case it is "unsupplementable." For example, if a user explicitly types the degree symbol in the expression sin 30°, then the trigonometric operand 30° is degree-explicit, measure-explicit, and unsupplementable.

In an embodiment, if a supplementable trigonometric operand contains the symbol $\pi$, it is "radian-implicit" for purposes of the interface behaviors described below. If a supplementable trigonometric operand is a nonzero multiple of 15, it is "degree-implicit." If a supplementable trigonometric operand is not radian-implicit and not degree-implicit, then it is "measure-ambiguous." A measure-ambiguous trigonometric operand is "degree-favoring" if it has an absolute value greater than $2\pi$; otherwise, it is "measure-neutral." For example, the trigonometric operand in the expression sin 30 is degree-implicit; the trigonometric operand in the expression sin 2.4 is measure-ambiguous and measure-neutral.

It will be evident to those of ordinary skill in the art that various alternative embodiments can be constructed that have slightly different rules for categorizing trigonometric operands than the rules that are described in the preceding two paragraphs. For example, in an alternative embodiment, for purposes of the behaviors that are described below, a supplementable trigonometric operand is degree-implicit if it is a nonzero integer, even if it is not a multiple of 15.

Trigonometric Mode Intervention

The interface behaviors described in the following paragraph will be referred to in the present specification as "the trigonometric mode intervention feature."

In an embodiment, if the interface is in radian mode and a user inputs a trigonometric operand that is degree-implicit as defined above, then the interface will intervene to seek confirmation that the user wishes to remain in radian mode, and will offer the user an opportunity to switch to degree mode instead. For example, in an embodiment, if a user enters cos 30, the interface will open a dialog box that asks, "Are you sure you wish to remain in radian mode?" and offers the two options "Remain in radian mode" and "Switch to degree mode." Similarly, in an embodiment, if the interface is in degree mode and the user inputs a trigonometric operand that is radian-implicit, then the interface will intervene to seek confirmation that the user wishes to remain in degree mode, and will offer the user an opportunity to switch to radian mode instead.

In an embodiment, the trigonometric mode intervention feature pertains to a degree input mode and a radian input mode, and the interface will intervene as soon as the interface determines that the user has finished typing an operand that is degree-implicit if the interface is in radian input mode, or as soon as the interface determines that the user has finished typing an operand that is radian-implicit if the interface is in degree input mode; if the user then chooses to switch to a new mode, a degree symbol will be inserted only if the new mode is degree input mode. In an alternative embodiment that is a modal calculator interface, the trigonometric mode intervention feature pertains to a degree evaluation mode and a radian evaluation mode, and the interface will intervene after the user actuates the Enter key but before evaluating the expression that was entered, so if the user then chooses to switch to a new mode, the expression will be evaluated in the new mode. Other embodiments will be evident to those of ordinary skill in the art; for example, an embodiment that is a modal calculator interface could nevertheless decide whether to intervene as soon as the interface determines that the user has finished typing a trigonometric operand, rather than waiting for the user to actuate the Enter key.

An embodiment in which the interface may automatically switch from degree mode to radian mode or vice versa without even seeking confirmation, as described below, may have advantages that are similar to the advantages of the trigonometric mode intervention feature; therefore, the trigonometric mode intervention feature may be redundant in such an embodiment.

Smart Angle Measure Mode

Figure 29A:
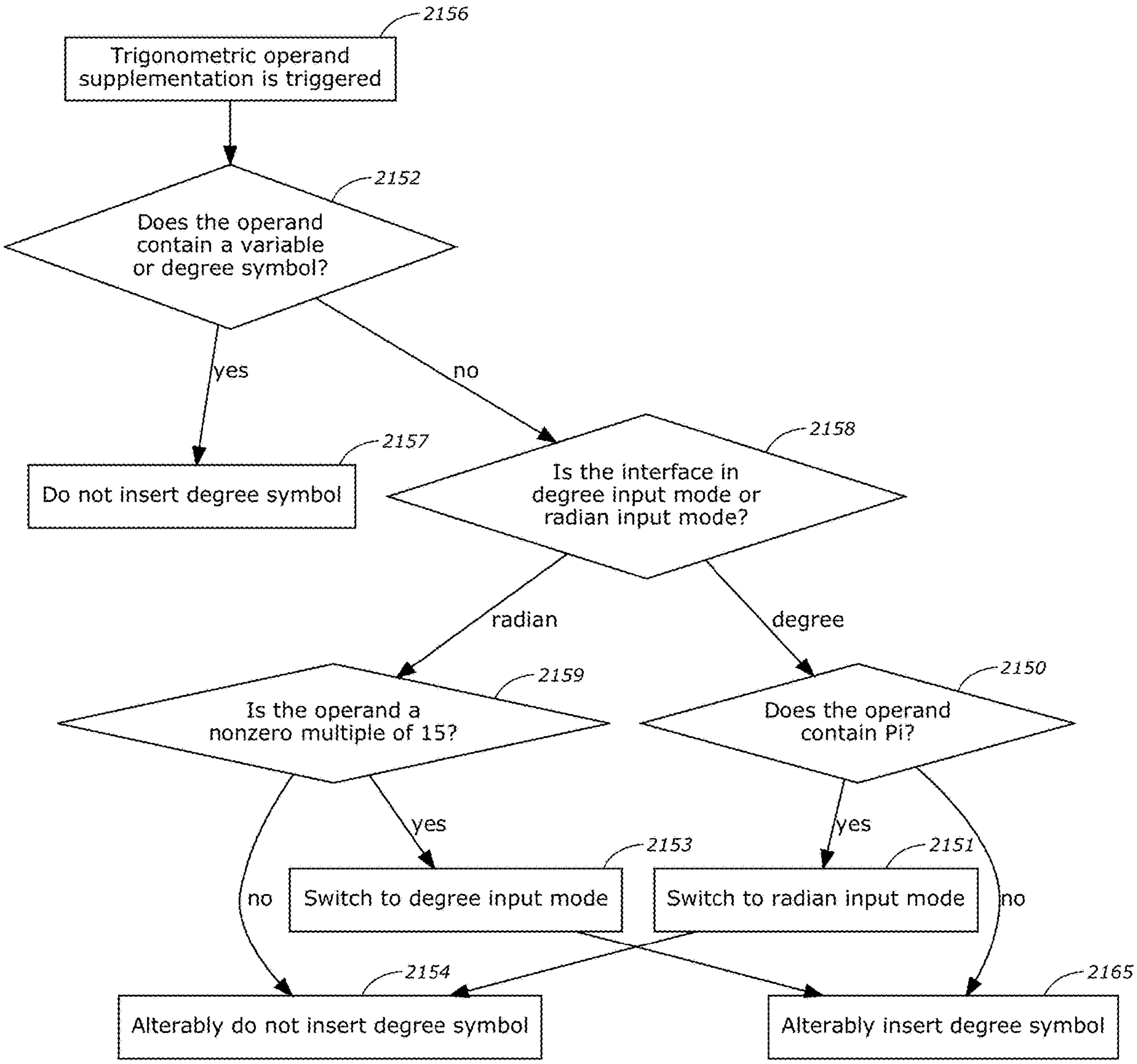
FIG. 29A is a flowchart that illustrates an example method for making smart adaptive angle measure mode decisions.

FIG. 29A is a flowchart that illustrates a method for making smart adaptive angle measure mode decisions. When trigonometric operand supplementation is triggered (Block 2901), the interface will check whether the trigonometric operand contains a variable or a degree symbol or both (Block 2902). If it does, the interface will not insert a degree symbol at the end of the trigonometric operand, and this will not be an alterable decision. Otherwise, the interface may behave differently depending on whether it is in degree input mode or in radian input mode. If it is in radian mode it will alterably decide not to insert a degree symbol, unless the operand is a nonzero multiple of 15, in which case it will switch to degree input mode and alterably decide to insert a degree symbol. If it is in degree mode it will alterably decide to insert a degree symbol, unless the operand contains it, in which case it will switch to radian input mode and alterably decide not to insert a degree symbol. The interface behavior illustrated in FIG. 29A may be quite advantageous; however, a more complex version of smart angle measure mode that may be even more advantageous is described below.

In an embodiment, the interface has an "angle measure mode" which has four possible settings: degree input mode with high confidence, degree input mode with low confidence, radian input mode with high confidence, and radian input mode with low confidence.

In an embodiment, the angle measure mode is initially degree input mode with low confidence. In an embodiment, whenever a user proceeds to input a new mathematical expression, such as by means of pressing Enter to proceed to the next calculation or by means of pressing Clear to delete previously typed input, the interface will set the angle measure mode to low confidence (without changing from degree mode to radian mode or vice versa).

In an embodiment, whenever a user inputs a mathematical expression that includes an element that clearly pertains to calculus, the interface will set the angle measure mode to radian input mode with high confidence. For example, in an embodiment, if a user inputs an integral symbol, or the limit identifier "lira," or the fraction $$\frac{d}{dx},$$

then the interface will set the angle measure mode to radian input mode with high confidence.

In an embodiment, when trigonometric operand supplementation is triggered, if the operand that the user typed is degree-explicit, then the interface will set the angle measure mode to degree input mode, and will not insert an additional degree symbol, and this will not be an alterable decision. Likewise, if the operand that the user typed is radian-explicit, then the interface will set the angle measure mode to radian input mode, and will not insert a degree symbol, and this will not be an alterable decision. In an embodiment, when trigonometric operand supplementation is triggered, if the operand that the user typed is not measure-explicit but contains a variable, then the interface will not change the angle measure mode, and regardless of the angle measure mode the interface will not insert a degree symbol, and this will not be an alterable decision.

In an embodiment, when trigonometric operand supplementation is triggered, if the trigonometric operand is supplementable as defined above, then the interface will analyze the trigonometric operand the user typed in light of the current angle measure mode setting, and will make an alterable decision whether or not to insert a degree symbol at the end of the operand the user typed, according to the following rules: If the operand that the user typed is radian-implicit, then the interface will alterably decide not to insert a degree symbol, and the probability of alteration of this decision will be very low unless the angle measure mode was degree input mode with high confidence, in which case the probability of alteration will be moderately low. If the operand that the user typed is degree-implicit, then the interface will alterably decide to insert a degree symbol, and the probability of alteration will be very low unless the angle measure mode was radian input mode with high confidence, in which case the probability of alteration will be moderately low. If the operand is measure-ambiguous and degree-favoring, then the interface will alterably decide to insert a degree symbol unless the angle measure mode was radian input mode with high confidence, in which case it will alterably decide not to insert a degree symbol; the probability of alteration of this decision will be moderately low unless the angle measure mode was degree input mode with high confidence, in which case the probability of alteration will be very low. If the operand is measure-neutral, the interface will decide to insert a degree symbol if and only if the angle measure mode is degree input mode, and the probability of alteration of this decision will be high if the angle measure mode is a mode with low confidence, or will be very low if it is a mode with high confidence.

In an embodiment, whenever the interface makes an alterable decision whether or not to insert a degree symbol, or whenever the interface alters such a decision, or whenever the interface recognizes that a user has manually altered such a decision (such as by manually deleting a degree symbol that the interface automatically inserted), if the selected option of the decision includes a degree symbol, the angle measure mode will become degree mode (if it was not already degree mode); otherwise, the angle measure mode will become radian mode (if it was not already radian mode).

In an embodiment, once the current line of input includes at least one trigonometric operand such that operand supplementation has been triggered for the operand and the operand does not include a variable, when all such operands have a degree symbol, the angle measure mode will be degree input mode with high confidence. When at least one such operand exists and no such operand has a degree symbol, the angle measure mode will be radian input mode with high confidence. When at least two such operands exist and at least one of them has a degree symbol and at least one of them does not have a degree symbol, the angle measure mode may be either degree input mode with low confidence or radian input mode with low confidence. In an embodiment, the rules described in the present paragraph override all other rules described herein; for example, in an embodiment, if a user types $$\sin 30^{\circ} + \frac{d}{dx},$$

then the angle measure mode will be degree input mode with high confidence even if typing $$\frac{d}{dx}$$

would ordinarily cause the interface to switch to radian input mode.

For example, consider the following scenario: The interface is in degree input mode with high confidence when a user presses Enter to perform a calculation. In response, the interface displays an answer and then proceeds to the next line for the user to input a new mathematical expression. The interface automatically switches to degree input mode with low confidence. The user then begins the new line of input by typing sin 2.4+. When the user actuates the plus key, operand supplementation is triggered. The operand does not contain the symbol π, is not a nonzero multiple of 15, and does not have an absolute value greater than 2π, so it is measure-neutral and the interface's decision whether or not to insert a degree symbol is based on the current angle measure mode, which is degree input mode with low confidence. The interface decides to insert a degree symbol, yielding sin 2.4°+; this decision is an alterable decision, and because the angle measure mode was at low confidence, this decision has a high probability of alteration. Now there is exactly one trigonometric operand such that operand supplementation has been triggered for the operand and the operand does not include a variable; all such operands now have a degree symbol, so the interface now sets the angle measure mode to degree input mode with high confidence. If the user continues to type more trigonometric functions, then because the angle measure mode is now degree input mode with high confidence, the interface will continue to insert a degree symbol after each trigonometric operand unless the user types an operand that is unsupplementable or radian-implicit. However, because the decision to insert a degree symbol has a high probability of alteration, the user can delete that degree symbol by means of a single actuation of the alteration key, which at this point would cause the interface to switch to radian input mode with high confidence; if the user does so and then subsequently types more trigonometric functions, the interface will not automatically insert a degree symbol after any subsequent trigonometric operand unless the user types an operand that is degree-implicit.

In an embodiment, when operand supplementation is triggered, if the operand that the user typed consisted of multiple terms enclosed in parentheses, the interface will determine separately for each term whether or not to insert a degree symbol after that term, rather than determining for the entire operand whether or not to insert a degree symbol after the closing parenthesis. For example, in an embodiment, if a user types cos(90−x) and presses Enter, then the interface will interpolate a degree symbol after the numeral 90, causing the input to become cos(90°−x). In an embodiment, when the user is typing an operand that will apparently consist of multiple terms enclosed in parentheses, the interface will determine separately for each term whether or not to insert a degree symbol after that particular term as soon as the interface is able to determine that the user has finished typing that particular term, even if the user has not finished typing the entire trigonometric operand yet. For example, in an embodiment, as soon as a user types cos(90−, the interface will recognize that the user has finished typing the term 90, and the interface will insert a degree symbol after the numeral 90, even though the user has not finished typing the cosine function's entire operand yet.

In an alternative embodiment, the angle measure mode of the interface has two more possible settings in addition to the four that are described above; these additional settings are gradian input mode with high confidence and gradian input mode with low confidence. When the interface is in gradian input mode, typing an angle measure that is degree-implicit will not cause the interface to automatically switch to degree input mode nor cause the interface to insert degree symbols. The interface will never switch to gradian input mode except when a user types a gradian symbol or alters a decision so as to insert a gradian symbol. Whenever the interface would make an alterable decision whether or not to automatically insert a degree symbol, the decision will instead be a multi-alternative decision that has one option corresponding to inserting a gradian symbol, another option corresponding to inserting a degree symbol, and another option (the radian option) corresponding to not inserting either one. When the gradian option of such a decision is an alternate option, that option will have a very low probability of alteration. When the gradian option of such a decision is the default option, the degree option of the decision will have a high probability of alteration, and the probability of alteration of the radian option will be whatever it would be if the interface had been in degree input mode instead and had decided to insert a degree symbol; for example, if a user types there is no need for further + and the interface inserts a gradian symbol after the numeral 30 then the radian option of the decision will have a very low probability of alteration, but if a user types sin 2.4+ and the interface inserts a gradian symbol after the numeral 2.4 then the radian option of the decision will have a high probability of alteration.

Simultaneous Angle Measure Decisions

Farther above, an alternative embodiment is described in which the interface does not determine that a user has finished typing the operand of any trigonometric function until the user has actuated the Enter key or some other key that indicates the user has finished typing mathematical input. In such an embodiment, a single key actuation may trigger operand supplementation for more than one trigonometric operand, so in such an embodiment, it may be useful for the interface to simultaneously make a single alterable decision that pertains to whether or not to insert degree symbols at the ends of multiple operands simultaneously, as is described in the following paragraphs.

In an embodiment, as a special case, if a single key actuation triggers operand supplementation for more than one trigonometric operand that is supplementable, then the interface will make a single alterable decision pertaining to whether or not to insert degree symbols at the ends of the supplementable operands, according to the following rules:

The alterable decision will have one option that corresponds to inserting a degree symbol after each of the supplementable operands and another option that corresponds to not inserting a degree symbol after any of them. Except in the unusual circumstances that are described below, these will be the only two options of the alterable decision: one will be its default option and the other will be its only alternate option.

If at least one of the supplementable operands is radian-implicit and none is degree-implicit, then the interface will alterably decide to not insert degree symbols, and this decision will have a very low probability of alteration. If at least one of the supplementable operands is degree-implicit and none is radian-implicit, then the interface will alterably decide to insert degree symbols, and this decision will have a very low probability of alteration. If all of the supplementable operands are measure-ambiguous but at least one of them is degree-favoring, then the interface will alterably decide to insert degree symbols, and this decision will have a moderately low probability of alteration. If all of the supplementable operands are measure-neutral, then the interface will alterably decide to insert degree symbols if it is in degree input mode and will alterably decide not to insert degree symbols if it is in radian input mode; in either case, this decision will have a high probability of alteration.

In the unusual circumstances where at least one of the supplementable operands is degree-implicit and at least one is radian-implicit, the alterable decision pertaining to whether or not to insert degree symbols will have more than two options. The two options mentioned in the preceding paragraphs—the one that corresponds to inserting a degree symbol after each of the supplementable operands and the one that corresponds to not inserting a degree symbol after any of them—will both be alternate options that have moderately low probabilities of alteration. If none of the supplementable operands are measure-ambiguous, then the alterable decision will have just one additional option that corresponds to inserting degree symbols after the degree-implicit operands but not after the radian-implicit operands, and this will be its default option. If at least one of the supplementable operands is measure-ambiguous, then the alterable decision will have two additional options that both include degree symbols after the degree-implicit operands but not after the radian-implicit operands; one of these options will include degree symbols after all of the measure-ambiguous operands, and the other will include degree symbols after none of the measure-ambiguous operands, and the interface will determine which of these two options is the default option and determine what probability of alteration to assign to the other of these two options as though the degree-implicit and radian-implicit operands were not involved at all.

For example, if the interface makes a single alterable decision that pertains to the three supplementable operands 30, 2.4, and π, then the decision will have four options. These four options correspond to inserting degree symbols after all of the operands, or after none of the operands, or after 30 and 2.4 but not after π, or after 30 only. The two options that correspond to inserting degree symbols after all or none of the operands will both be alternate options that have moderately low probabilities of alteration. The interface will decide between the other two options based on what it would decide if neither 30 nor π were involved, so for example if circumstances are such that if the interface were only making an alterable decision about the supplementable operand 2.4 then it would decide to insert a degree symbol and this decision would have a high probability of alteration, then that means that the default option will be the one that corresponds to inserting degree symbols after 30 and 2.4 but not after π, and the alternate option that corresponds to inserting a degree symbol after 30 only will have a high probability of alteration.

Trigonometric Identity Entry Mode

In an embodiment, a user can by some means set the interface to operate in a trigonometric identity entry mode. When the user actuates a trigonometric function key and the interface accordingly enters the appropriate trigonometric function identifier into the user's input, if the interface is in trigonometric identity entry mode, then the interface will also insert a previously specified operand immediately after the trigonometric function identifier. For example, if such an embodiment is in trigonometric identity entry mode with a previously specified operand of x, then when a user actuates the sine key once, the result will be sin x or sin(x) instead of just sin.

In an embodiment, when the interface is in trigonometric identity entry mode and the user actuates a trigonometric function key, the interface's decision to insert the previously specified operand after the appropriate trigonometric function identifier is an alterable interface decision, and altering this decision will delete the operand that was inserted (but will not delete the trigonometric function identifier) and will also cause the interface to exit trigonometric identity entry mode.

Additionally, in an embodiment, when the interface is not in trigonometric identity entry mode and the user actuates a trigonometric function key, the interface's decision to not insert any previously specified operand after the appropriate trigonometric function identifier is an alterable interface decision, and altering this decision will cause the interface to insert an operand after the trigonometric function identifier and will also cause the interface to enter trigonometric identity entry mode. In such an embodiment, when the interface enters trigonometric identity entry mode by such a means, the interface determines by some method what operand to insert after each trigonometric function identifier: In an embodiment, the operand that is inserted when the interface enters trigonometric identity entry mode by such a means is the same operand that was used the last time the interface was in trigonometric identity entry mode, or a default trigonometric operand such as x if the interface was never previously in trigonometric identity entry mode. In an alternative embodiment, the operand that is inserted when the interface enters trigonometric identity entry mode by such a means is the previously entered trigonometric operand that was entered most recently if any such previously entered trigonometric operand exists, or a default trigonometric operand such as x if no previously entered trigonometric operand exists. In an embodiment, the interface's decision of which trigonometric operand to insert when the interface enters trigonometric identity entry mode by such a means is an alterable decision that may include multiple alternate options such as the same operand that was used the last time the interface was in trigonometric identity entry mode, a default trigonometric operand such as x, the previously entered trigonometric operand that was entered most recently, and so forth; other possible alternate options of such an alterable decision will be evident to those of ordinary skill in the art, particularly in light of the following discussion of the trigonometric operand interpolation feature.

Various other means of enabling a user to cause the interface to enter trigonometric identity entry mode will be evident to those of ordinary skill in the art, and various other means of enabling a user to exit trigonometric identity entry mode will be evident to those of ordinary skill in the art. Various means of enabling a user to explicitly specify the operand that is used in trigonometric identity entry mode will be evident to those of ordinary skill in the art. For example, an interface menu option may open a dialog box that contains options pertaining to trigonometric identity entry mode.

In an embodiment, while the interface is in trigonometric identity entry mode, if a user actuates the same trigonometric function key more than once consecutively, then for each such actuation after the first, the interface will alterably decide to increment the power of the previously entered trigonometric expression instead of entering a trigonometric function identifier and an operand into the user's input. In an embodiment, such an alterable decision will have a low probability of alteration. For example, in a textbook notation trigonometric interface that is in trigonometric identity entry mode with a previously specified operand of x, if a user actuates the sine key twice consecutively, the result will be $\sin^e x$; altering this result will yield sin x sin x. In a calculator notation trigonometric interface that is in trigonometric identity entry mode with a previously specified operand of x, if the user actuates the sine key twice consecutively, the result will be $(\sin(x))^2$; altering this result will yield sin(x) sin(x).

Trigonometric Operand Interpolation

The interface behavior described in the following paragraph is referred to as "the trigonometric operand interpolation feature" in the present specification.

In an embodiment, when operand supplementation is triggered, if the user has entirely omitted the operand of the relevant trigonometric function, then the interface will interpolate as the operand of the trigonometric function either the previously entered operand of the previously entered trigonometric function that was entered most recently, if any such previously entered operand of a previously entered trigonometric function exists, or a default trigonometric operand such as x, if no previously entered operand of a previously entered trigonometric function exists. Thus, in a certain embodiment, if a user wishes to enter the equation $$\frac{\tan^3\alpha - 1}{\tan\alpha - 1} = \tan^2\alpha + \tan\alpha + 1,$$

then the user need only actuate the α key once, when entering the operand of the first trigonometric function; subsequently, when entering the rest of the equation, the user may repeatedly omit the α key and the interface will repeatedly interpolate the operand α.

In an embodiment, when the trigonometric operand interpolation feature is invoked, if the user has previously entered more than one distinct trigonometric function operand in the current line of input, then the interpolation of the trigonometric function operand that was entered most recently is an alterable interface decision such that altering this decision will cause the interface to replace the operand that was interpolated with a different previously entered trigonometric function operand that the user entered less recently. For example, if a user types sin α cos β+cos and then actuates the sine key, and the most recently entered operand β is interpolated so that the interface now displays sin α cos β+cos β sin, and then the user actuates the alteration key, then the interpolated will be replaced with α, yielding sin α cos β+cos α sin.

In an embodiment, for purposes of the preceding two paragraphs, in order for the interface to determine what trigonometric function operand was entered most recently or determine what trigonometric function operands were entered less recently, the interface will actually keep track of trigonometric function operands that a user inputs in chronological order. In an alternative embodiment, the interface will instead look at the user's input and assume that the user's input was entered in the usual order, so that if for example a user has typed sin α cos β+cos then the interface will regard the trigonometric operand β as having been entered more recently then the trigonometric operand α for purposes of the preceding two paragraphs, whether or not the user actually typed sin α cos β+cos in order from left to right.

In an embodiment, when the trigonometric operand interpolation feature is invoked, if the user has not previously entered a trigonometric function operand and so a default trigonometric operand such as x is interpolated, then the interpolation of that particular trigonometric operand is implemented as an alterable interface decision, and altering this decision will cause the interface to replace the operand that was interpolated with some other common trigonometric operand. In an embodiment, such an alterable decision is a multi-alternative decision, so repeatedly actuating the alteration key may cause the interface to cycle between various common trigonometric operands, such as x, θ, α, etc.

More generally, in various embodiments, when the trigonometric operand interpolation feature is invoked, a multi-alternative decision is created such that repeatedly altering the decision will cause the interface to cycle between various trigonometric operands that were previously entered in the current line of input, trigonometric operands that were previously entered in prior lines of input, and/or common trigonometric operands such as x, θ, α, etc. Those of ordinary skill in the art will understand various ways to create an algorithm that determines what operands are to be included in such a cycle of possible trigonometric operands; for example, in an embodiment, trigonometric operands that were previously entered in prior lines of input will be included in this cycle of possible trigonometric operands only if they were entered within, say, the last ten lines of input.

In an embodiment, if an actuation of a trigonometric function key is immediately followed by an actuation of the left parenthesis key, then the interface's decision to not trigger operand supplementation yet is an alterable interface decision such that altering the decision will cause the interface to interpolate an operand between the trigonometric function and the left parenthesis. For example, in such an embodiment, if a user wishes to input $\tan^2 x(\csc^2 x-1)$ and begins by inputting $\tan^2$ (under the mistaken assumption that the interface will automatically interpolate x, then the user can correct this mistake by means of alteration functionality. In an embodiment, such a decision will be assigned a very low probability of alteration.

In an embodiment, whenever the interface decides to interpolate a trigonometric operand, this decision is an alterable interface decision such that altering the decision will cause the interface to delete the interpolated operand. In an alternative embodiment, whenever the interface decides to interpolate a trigonometric operand, this decision is a multi-alternative decision such that one of the options will cause the interface to delete the interpolated operand, and the other option or options will cause the interface to replace the operand that was interpolated with a different operand, as described above.

In an embodiment, not only will the interface interpolate an operand if the interface determines that the user has entirely omitted a trigonometric function's operand, but also the interface will similarly interpolate an operand within a portion of a trigonometric function's operand if the user supplied as a trigonometric function's operand an expression that includes an operator that is itself missing an operand, as determined by the ordinary rules of mathematical parsing. For example, in such an embodiment, if a trigonometric function's operand that the user supplied is (180°−), then according to the ordinary rules of mathematical parsing, the trigonometric function's operand includes a minus sign that is itself missing an operand, and so the interface will interpolate an operand such as x after the minus sign. Thus, such an embodiment facilitates more rapid entry of an expression such as cos(180°−x). Those of ordinary skill in the art will realize that this behavior may be combined with other behaviors that have been discussed in connection with trigonometric operand interpolation, such as use of alteration functionality to replace the operand that was interpolated with some other operand, use of alteration functionality to entirely delete the operand that was interpolated, and so forth.

Rapid Trigonometric Power Entry

The interface behaviors described in the two following paragraphs will collectively be referred to as "the rapid trigonometric power entry feature" in the present specification.

In an embodiment, when a trigonometric function key is actuated, the interface will determine whether a previously entered copy of the same trigonometric function identifier immediately precedes the input cursor location (ignoring any space character) so that entering the trigonometric function identifier into the user's input as normal would cause the same trigonometric function identifier to appear twice consecutively in the user's input, and if so, then instead of entering the trigonometric function identifier into the user's input as normal (and possibly triggering operand interpolation) the interface will append an exponent of 2 to the previously entered copy of the same trigonometric function identifier. For example, if a user actuates the sine key twice consecutively, then the second actuation of the sine key will cause the user's input to become $\sin^2$, not sin sin (and not sin x sin).

In an embodiment, when a trigonometric function key is actuated, the interface will determine whether a previously entered copy of the same trigonometric function identifier is immediately followed by a positive integer exponent that immediately precedes the input cursor location (ignoring any space character) so that entering the trigonometric function identifier into the user's input as normal would cause a power of a trigonometric function identifier to be immediately followed by the same trigonometric function identifier in the user's input, and if so, then instead of entering the trigonometric function identifier into the user's input as normal (and possibly triggering operand interpolation) the interface will increment the exponent that immediately precedes the input cursor location. For example, if a user enters $\sin^2$ and then actuates the sine key, then this actuation of the sine key will cause the user's input to become $\sin^3$, not $\sin^2$ sin.

In an embodiment, the rapid trigonometric power entry feature only takes effect when a user actuates the same trigonometric function key more than once consecutively. For example, in such an embodiment, if a user actuates the sine key and then actuates some other key that has no effect and then actuates the sine key again, the interface will not yield the result $\sin^2$. In an alternative embodiment, the rapid trigonometric power entry feature only takes effect when a user actuates the same trigonometric function key more than once consecutively within a certain specified amount of time. For example, in such an embodiment, if a user double-clicks the sine key sufficiently rapidly, the interface will yield the result $\sin^2$, but if a user actuates the sine key twice with a sufficiently long pause between the two actuations, the interface will not yield the result $\sin^2$.

In an embodiment that has the rhe rapid trigonometric power entry feature, trigonometric function keys such as the sine key are special multi-click keys; in an embodiment, the interface's decision whether or not to invoke the rapid trigonometric power entry feature in response to a consecutive actuation of such a key is an alterable multi-click decision, as defined in Chapter 39. For example, in an embodiment, actuating the sine key twice consecutively will yield the result $\sin^2$ (as the key's multi-click effect), and then immediately actuating the alteration key will yield a result such as sin x sin (as the key's non-multi-click effect). Additional behaviors that are explained in Chapter 39 may be applied to trigonometric function keys in an embodiment that has the rapid trigonometric power entry feature; for example, the interface may combine consecutive multi-click decisions regarding the same trigonometric function key into a single triple-click decision.

A prior art math input interface exists such that the cosecant key is actuated by means of first pressing the 2nd key and then pressing the sin key; thus, in that interface, a user must press two physical keys in order to "actuate the cosecant key." Similarly, in that interface, the secant key is actuated by pressing 2nd and then cos, and the cotangent key is actuated by pressing 2nd and then tan. It may be desirable to facilitate the rapid entry of $\csc^2$ in a similar math input interface. Therefore, in an embodiment of the present invention, when a user presses a trigonometric function key, if the user's most recent previous keypress was the same trigonometric function key, and if the rapid trigonometric power entry feature would have taken effect if the 2nd key or some other similar modifier key had been pressed in between the two consecutive keypresses, then the interface will respond as though the 2nd key or other modifier key had been pressed in between the two consecutive keypresses. For example, in such an embodiment, if the cosecant key is actuated by means of first pressing 2nd and then pressing sin, then pressing 2nd once and then pressing sin twice consecutively will yield the result $\csc^2$.

In an embodiment, when the interface responds as though the 2nd key or other modifier key had been pressed in between two consecutive presses of a trigonometric function key as described in the preceding paragraph, the interface's decision to do so is an alterable interface decision. In an embodiment, the behavior described in the preceding paragraph only takes effect when a user presses the same key more than once consecutively within a certain specified amount of time; thus, for example, in an embodiment, if a user actuates the cosecant key by means of first pressing the 2nd key and then pressing the sin key and the user then presses the sin key again sufficiently rapidly, then the interface will yield the result $\csc^2$, but if the user actuates the cosecant key by means of first pressing the 2nd key and then pressing the sin key and then pauses a sufficiently long time before pressing the sin key again, then the interface will not yield the result $\csc^2$. (Such an embodiment need not necessarily also have the property that the rapid trigonometric power entry feature only takes effect when a user actuates the same trigonometric function key more than once consecutively within a certain specified amount of time; in other words, an embodiment may be sensitive to double-click speed when it is determining whether to handle a particular trigonometric function key actuation like a different trigonometric function key actuation, and not be sensitive to double-click speed in other circumstances.)

The rapid trigonometric power entry feature is described above as a feature of a textbook notation trigonometric interface. Those of ordinary skill in the art will understand how to modify the above description of the rapid trigonometric power entry feature so that the rapid trigonometric power entry feature can instead be implemented as a feature of a calculator notation trigonometric interface or other trigonometric interface. For example, an HP Prime graphing calculator exists such that pressing the SIN key once while in the calculator's home screen yields SIN( ) with the input cursor between the two parentheses, and so pressing the SIN key twice consecutively yields SIN(SIN( )); those of ordinary skill in the art will understand that the rapid trigonometric power entry feature can be implemented in such a way that pressing the SIN key twice consecutively will yield SIN( $)^2$ instead of SIN(SIN( )), and pressing the SIN key three times consecutively will yield SIN( $)^3$ instead of SIN(SIN(SIN( ))).

In an embodiment that has both the rapid trigonometric power entry feature and the trigonometric operand interpolation feature, it may be possible for an invocation of the rapid trigonometric power entry feature to prevent the interface from making an alterable interface decision regarding what trigonometric operand should be interpolated (if any). Therefore, in an embodiment, the interface's alterable decision to invoke the rapid trigonometric power entry feature is an antecedent decision such that altering the decision may cause a contingent alterable decision to exist regarding what operand to interpolate. For example, in an embodiment, if a user actuates the sine key twice consecutively and the interface yields the result $\sin^2$, then the user may first alter the decision regarding whether to invoke the rapid trigonometric power entry feature, yielding a result such as sin x sin, and then after the user accepts the alternate option of that decision by some means, the user may then alter the decision regarding what trigonometric operand to interpolate, yielding a different result such as sin θ sin.

The combination of the trigonometric operand interpolation feature with the rapid trigonometric power entry feature serves a similar purpose to the trigonometric identity entry mode described farther above: in many cases, the combination of the trigonometric operand interpolation feature with the rapid trigonometric power entry feature will enable a user to type trigonometric expressions with the same keystroke sequence as though the interface were in trigonometric identity entry mode, but without the need to actually set the interface to operate in trigonometric identity entry mode or in any other special mode.

Trigonometric Fraction Initialization

In an embodiment, as is explained in Chapter 43, moving a function identifier into a numerator in such a way that the function identifier is no longer followed by an operand is an invalid structure modification. In particular, this means that when a trigonometric function identifier is immediately followed by a fraction that has an empty numerator, moving the trigonometric function identifier into the numerator would be an invalid structure modification per Chapter 43.

However, in an embodiment, as an exception, if the interface has the trigonometric operand interpolation feature, then when a trigonometric function identifier for which trigonometric operand supplementation has not yet been triggered immediately precedes a fraction that has an empty numerator, moving that trigonometric function identifier into that numerator is a valid and normal numerator expansion. If such a numerator expansion occurs, then operand supplementation will be triggered for that trigonometric function identifier, and so the expansion will not actually cause the trigonometric function identifier to no longer be followed by an operand. Subsequently, in an embodiment, if a numerator contraction causes that numerator to become empty again before the user performs any action that does not cause a numerator expansion or numerator contraction of that particular numerator, then the interface will entirely undo that trigonometric operand supplementation, and so that trigonometric function identifier will then be regarded as though operand supplementation had never been triggered for that trigonometric function identifier. (This may thus create an exception to the rule that the interface will determine that the user has finished typing the operand of a trigonometric function on only one occasion.) For example, in an embodiment, a numerator expansion of the numerator in the expression $$\sin\frac{\square}{\square}$$

will yield an expression such as $$\frac{\sin x}{\square},$$

and an immediately subsequent numerator contraction will cause the result to revert to $$\sin\frac{\square}{\square}.$$

In an embodiment, as a special case, when the input cursor is immediately after a trigonometric function identifier for which trigonometric operand supplementation has not been triggered, after a first actuation of the fraction initialization key causes a numerator expansion to occur such as is described in the preceding paragraph, if the user's next action is a second consecutive actuation of the fraction initialization key, then in response to that actuation of the fraction initialization key the interface will undo that numerator expansion rather than cycling the fraction's numerator as described in Chapter 44; further consecutive actuations of the fraction initialization key may then cause the interface to cycle the numerator as described in Chapter 44. For example, in an embodiment, when the input cursor is immediately after the trigonometric function identifier in the expression 2+sin, a first actuation of the fraction initialization key will yield $$2+\frac{\sin x}{\square},$$

and a second consecutive actuation of the fraction initialization key will yield $$2+\sin\frac{\square}{\square}.$$

If the user then actuates the fraction initialization key a third and fourth consecutive time, these additional consecutive actuations will cause the interface to cycle the numerator as described in Chapter 44, yielding $$2+\frac{\sin x}{\square}$$

again and then yielding $$\frac{2+\sin x}{\square}.$$

Input Shortcuts for Other Function Identifiers

In mathematical textbooks, the arcsine of x is sometimes written in the form $\sin^{-1} x$ and sometimes in the form arcsin x. In an embodiment, if the interface has a key or key combination that directly enables input of inverse trigonometric functions in one form but not the other, then whenever a user actuates such a key or key combination and thus inputs an inverse trigonometric function identifier, the interface will make an alterable decision whether or not to automatically change the form in which the identifier is written from the one form to the other. In an embodiment, all such decisions belong to the same adaptive decision class. In an embodiment, such decisions initially have a low probability of alteration. For example, in an embodiment, if a user presses the 2nd key and then the tangent key, then by default the interface will yield $\tan^{-1}$. If the user then actuates the alteration key, then the interface will change this result to arctan, and the interface will also adjust the relevant setting so that if on the next line the user presses the 2nd key and then the cosine key, the interface will yield arccos.

In an embodiment, after a user actuates a trigonometric function key that corresponds to one of the six basic trigonometric functions sin, cos, tan, csc, sec, and cot, if the user's next action is an actuation of the h key, then the interface will make an alterable decision whether or not to attach the letter h to the previously typed trigonometric function identifier so as to yield a hyperbolic function identifier. In an embodiment, all such decisions belong to the same adaptive decision class, and this decision class has three distinct settings: one setting in which the interface will attach the letter h to the previously typed trigonometric function identifier in such circumstances, one in which it will not, and one in which it will unless the letter h was already present in the user's input as a distinct variable. In an embodiment, that third setting is the default setting. For example, in an embodiment, if a user begins a line of input by actuating the sine key and then the h key and then the x key, then by default the interface will yield sin h x, but if the user types sin(x+h)− and then actuates the sine key and then the h key and then the x key, then by default the interface will yield sin(x+h)−sin hx.

Chapter 49: Alterable Calculations

Ambiguous Mathematical Input

Mathematical notation is occasionally ambiguous. For example, in the expression (j+i)(j−i) the letter i may represent a variable, and in the expression (x+i)(x−i) the letter i may represent $\sqrt{-1}$. If an expression that includes the letter i is taken out of context and typed into a calculator, there is no universally applicable rule that reliably determines whether or not the letter i represents $\sqrt{-1}$. Various calculators resolve this ambiguity and other ambiguities in various ways.

Some prior art calculators have a special key combination for inputting the letter i such that any letter i that is input by such means has a distinctive appearance and is always interpreted to mean $\sqrt{-1}$. Likewise, some prior art calculators have a special key combination for inputting the letter e such that any letter e that is input by such means has a distinctive appearance and is interpreted to mean the base of the natural logarithm.

The prior art online math problem solver Wolfram Alpha always interprets the letter e to mean the base of the natural logarithm. Wolfram Alpha interprets the letter i to mean $\sqrt{-1}$ by default, and when it does, it displays the message, "Assuming i is the imaginary unit | Use i as a variable instead"; in this message "a variable" is a hyperlink such that clicking the link causes Wolfram Alpha to reinterpret the user's input accordingly and display a different solution. Wolfram Alpha interprets a letter followed by a second letter in parentheses followed by an equals sign to be the left side of a function definition, so for example Wolfram Alpha interprets ƒ(x)=2x to be a function definition and also interprets x(ƒ)=2(ƒ) to be a function definition.

Prior art Zoom Math calculator apps sometimes interpret the letter i to mean $\sqrt{-1}$ and sometimes do not, depending on context. Zoom Math apps sometimes interpret a letter followed by a second letter in parentheses followed by an equals sign to be the left side of a function definition and sometimes do not.

Alterable Calculation Assumptions

In an embodiment that performs calculations, in certain circumstances the interface will make a decision regarding how to interpret the user's input for purposes of calculation. For example, in an embodiment, if a user inputs i=3, then the interface will decide to interpret the letter i to be a variable, as opposed to interpreting the letter i to denote $\sqrt{-1}$. In an embodiment that performs calculations, in certain circumstances the interface will make a decision regarding whether to make an additional mathematical assumption for purposes of calculation. In an embodiment that performs calculations, in certain circumstances the interface will make a decision regarding what type of calculation to perform in response to a user's input.

In an embodiment, for each type of decision mentioned in the preceding paragraph, when the interface makes such a decision, the interface will also decide how confident it is in that decision, and if it is less than fully confident in a particular decision then that decision will be an alterable decision with an appropriate probability of alteration. For example, in an embodiment, if a user inputs i=3, the interface will decide to interpret the letter i to be a variable as an alterable decision with a low probability of alteration. Any such alterable decision will be referred to herein as an "alterable calculation assumption."

In an embodiment, an alterable calculation assumption is a subtle change for purposes of Chapter 8, and its block descriptor is a message specifying the decision the interface made, such as "(assuming i=$\sqrt{-1}$)"; altering the alterable calculation assumption will cause the interface to alter this message appropriately. In an embodiment, such a block descriptor is displayed below the user's input when it is visible, and other output will move if necessary in order to make room to display the block descriptor. For example, in an embodiment, if a user types (2+i)(2−i) and presses Enter, by default the interface will display the answer 5 but will not display the message "(assuming i=$\sqrt{-1}$)" until the user causes that alterable decision to become highlighted, whereupon it will move the answer down to make room for that message.

Altering an alterable calculation assumption after the interface has displayed the output of any calculations that depended on the assumption will thus change that output in accordance with the new decision regarding what to do with the user's input. Therefore, in an embodiment, when an alterable calculation assumption is altered, the interface will first cause any dependent output to instantaneously disappear, and then animate the alteration, and then cause the dependent output to instantaneously reappear, as is explained in Chapter 5.

The following paragraphs describe in detail the behavior of certain interface decision functions that decide how to interpret the user's input or whether to make additional mathematical assumptions for purposes of calculation. Whenever these decision functions make decisions that are alterable, the alterable decisions are alterable calculation assumptions as defined above.

In an embodiment, when the interface simplifies an expression that includes a square root, if the result would include an absolute value symbol that will not be needed if all variables are known to have positive values, then the interface will alterably assume that all variables have positive values, and this decision will be alterable with a moderate probability of alteration. For example, in an embodiment, if a user inputs $\sqrt{x^2+2x+1}$ then the interface will display the message "(assuming all variables have positive values)" and the answer x+1, and then if the user alters that alterable calculation assumption then the interface will instead display the message "(not assuming all variables have positive values)" and the answer |x+1|.

Alterable Letter Interpretation

In the following paragraphs, decisions regarding how letters are interpreted are applicable only to letters that are not within a multi-letter identifier; for example, the interface's decision regarding how to interpret the letter i is not applicable to the letter i that is within the trigonometric function identifier "sin."

In an embodiment, if a user types a mathematical expression that includes the letter i, the interface will decide whether to interpret that letter as a variable or as $\sqrt{-1}$. In an embodiment, if the letter i is an index of summation in a sigma-notation expression, it will be interpreted as a variable and this decision will not be alterable. Otherwise, if the letter i is in an equation or inequality that has no other letters, it will be interpreted as a variable and this decision will be alterable with a low probability of alteration. Otherwise, if the letter i is in an expression that includes any lowercase variable other than e or i that alphabetically precedes p, it will be interpreted as a variable and this decision will be alterable with a high probability of alteration, except that if the expression includes j or k the probability of alteration will be moderate. In other circumstances, the letter i will be interpreted to represent $\sqrt{-1}$ and this decision will be alterable with a low probability of alteration.

In an embodiment, if a user types a mathematical expression that includes the letter e, the interface will decide whether to interpret that letter as a variable or as the base of the natural logarithm. In an embodiment, if the letter e is within the base of an exponential expression or is in any expression that includes logarithms or calculus-specific notation (such as $$\frac{d}{dx}ex),$$

the letter e will be interpreted as the base of the natural logarithm and this decision will be alterable with a low probability of alteration, except that if the letter e is the base of an exponential expression and its exponent includes a variable, such an alterable decision will have a very low probability of alteration. Otherwise, if the letter e is in an equation or inequality that has no other letters, it will be interpreted as a variable and this decision will be alterable with a low probability of alteration. Otherwise, if the letter e is in an expression that includes any lowercase variable other than e or i that alphabetically precedes p, it will be interpreted as a variable and this decision will be alterable with a moderate probability of alteration. In other circumstances, the letter e will be interpreted to represent the base of the natural logarithm and this decision will be alterable with a moderate probability of alteration.

In an embodiment, if a user types a mathematical expression that includes a letter other than e or i, the interface will decide whether to interpret that letter as a variable or as a function. In an embodiment, when the interface decides not to interpret the letter e as the base of the natural logarithm, or when the interface decides not to interpret the letter i as, rather than necessarily interpreting the letter as a variable, the interface will decide whether to interpret the letter as a variable or as a function.

In an embodiment, when the interface is determining whether to interpret a letter as a variable or as a function, the interface will interpret every occurrence of any particular letter within a particular mathematical expression the same way. In an embodiment, if a letter was previously defined as a function and that definition is still relevant, that letter will be interpreted as a function and this decision will not be alterable; for example, in an embodiment, if a user has typed $f(x)=3x$ on the previous line and this was interpreted as a function definition, and then the user types $f(2)$ on the next line, then if the interface interprets these two lines to be part of the same problem, the interface will interpret the letter $f$ in the second line as a function. In an embodiment, if two letters are separated by the function composition symbol $\circ$, both letters will be interpreted as functions, and this decision will not be alterable.

In an embodiment, when the interface is determining whether to interpret a letter as a variable or as a function, except as specified in the preceding paragraph, each occurrence of a letter within a mathematical expression will be assigned a certain "function score," and the interface's decision whether to interpret that letter as a variable or as a function will be a conditionally alterable threshold decision: the interface will determine the lowest function score of any occurrence of that letter within the expression, and if that lowest function score is greater than 1½, then the interface will interpret that letter as a function; otherwise, the interface will interpret that letter as a variable. In an embodiment, if that lowest function score is 1 or 2, the decision will be alterable with a moderate probability of alteration; if it is 3, the decision will be alterable with a low probability of alteration; if it is anything else, the decision will not be alterable. In an embodiment, a function score for an occurrence of a letter will equal 0 plus or minus any of the bonuses or penalties specified in the following paragraphs.

In an embodiment, a function score for an occurrence of a letter will be increased by 1 if that letter is on the left side of an equation and that left side of an equation entirely consists of that letter followed by a different letter in parentheses, in which case the letter in parentheses constitutes a "potential parameter," and if the right side of the equation includes another occurrence of the potential parameter then the function score will be increased by an additional 1, and if the right side of the equation includes no letters that may be variables or functions that are not the potential parameter then the function score will be increased by an additional 1. For example, in an embodiment, the letter a in the expression a(b)=3b will have a function score of 3.

In an embodiment, a function score will be increased by 1 or 2 if the interface recognizes that the particular letter is a letter that is commonly used to denote a function, or that the potential parameter (if any) is commonly used to denote a function parameter, or that the combination of the letter and any potential parameter is a combination that is commonly used to denote a function and its parameter. For example, in an embodiment, the function score of every occurrence of the letter $f$ will be increased by 1, and the function score of an occurrence of any of the letters x, y, z, r, or $\theta$ will be increased by 1 if its potential parameter is t, and the function score of an occurrence of the letter r will be increased by 1 if its potential parameter is $\theta$, and the function score of any letter (including $f$ and the other previously mentioned letters) will be increased by an additional 1 if its potential parameter is x or t or $\theta$. For example, in an embodiment, the letter x in the expression x(t)=3t will have a function score of 5, which includes a bonus of 3 for reasons described in the preceding paragraph and a bonus of 2 for reasons described in the present paragraph.

In an embodiment, if the left side of an equation consists of a letter followed by a very simple expression in parentheses, and the expression in parentheses contains only one letter but includes more mathematical text than just that letter, then the function score of the letter preceding the parentheses will equal at least 2 less than the value that would be its function score if the expression in parentheses included only the letter that is within the parentheses. In an embodiment, for purposes of the preceding sentence, a "very simple" expression is defined to be an expression that includes fewer than five characters; other possible ways of determining whether an expression constitutes a very simple expression for purposes of this interface behavior will be evident to those of ordinary skill in the art. For example, in an embodiment, because the letter ƒ in the expression ƒ(x)=3x would have a function score of 5, the letter ƒ in the expression ƒ(x+2)=3x will have a function score of 3.

The above descriptions of specific decision functions that may make alterable calculation assumptions serve as examples of such decision functions. It will be clear to those of ordinary skill in the art how to make similar decision functions that are simpler in various ways, and in some cases it will also be clear to those of ordinary skill in the art how to make similar decision functions that are more complex and potentially smarter in various ways. For example, those of ordinary skill in the art could modify a decision function that decides whether to interpret a letter as a variable or as a function so that it becomes slightly more likely to interpret a letter as a function in circumstances where the user recently typed other problems that definitely included function definitions.

In addition to the decision functions that are described above that may make alterable calculation assumptions, the decision function described in Chapter 48 that determines whether to interpret an exponent of g as a variable or as a gradian symbol is also a decision function that makes an alterable calculation assumption. It will also be clear to those of ordinary skill in the art how to create various other decision functions that may make alterable calculation assumptions. For example, an interface may make an alterable calculation assumption regarding whether or not to restrict the domain of the sine function when solving the equation sin x=1.

Alterable Solution Method Selection

In an embodiment, if the interface is displaying the individual steps of the solution to a math problem that can be solved by a plurality of methods, then at the first point where the next step of the solution will vary depending on what particular solution method is used, the interface will make an alterable calculation assumption regarding what solution method to use before proceeding to display that next step.

For example, in an embodiment that has algebra functionality that can solve a quadratic equation by means of factoring, by means of completing the square, and by means of the quadratic formula, if a user inputs $x^2+4x=-6+3$ and presses the Trace key to view a step of the solution then the interface will show that the first step of the solution of this quadratic equation is $x^2+4x=-3$, because that is the first step regardless of which of these three methods is being used; but if the user then presses the Trace key again in order to see the second step of the solution, the interface may, for example, display a block descriptor that says "(solving by factoring)," in which case the the second step that is displayed will be $x^2+4x+3=0$; if the user then alters this alterable calculation assumption, the block descriptor may then say "(solving by completing the square)," and the second step that is displayed may change to $x^2+4x+4=-3+4$.

In an embodiment, when a user types a mathematical expression and presses Enter, if it is not entirely clear what is to be done with the expression the user typed, and a plurality of objectives are reasonable, then the interface will make an alterable calculation assumption regarding what to do with the mathematical expression the user typed. For example, in an embodiment, if a user types x(x−3)+2(x−3) and presses Enter, then the interface will display a block descriptor that says "(factoring)" and yield the answer (x+2)(x−3); altering this alterable calculation assumption will cause the block descriptor to say "(expanding)" and change the answer to $x^2-x-6$.

Chapter 50: Alterable Answer Forms

Alterable Answer Form Decisions

U.S. Pat. No. 8,504,600 disclosed an interface with a MODE key such that immediately after the answer to a calculation is displayed, repeatedly actuating the MODE key will cause the interface to cycle between all possible forms of the answer "including, such as, for example proper fraction, mixed fraction, improper fraction, percentage, scientific notation, decimal, and so forth."

In an embodiment of the present invention, when the interface displays the answer to a calculation, the interface's decision regarding what form of the answer to display is an alterable decision. Such a decision will be referred to herein as an "alterable answer form decision." Typically such a decision will be the most relevant alterable interface decision immediately after the answer to a calculation is displayed, so in an embodiment, immediately after the answer to a calculation is displayed, repeatedly actuating the alteration key will cause the interface to cycle between various possible forms of the answer, unless and until some other decision becomes the most relevant alterable interface decision. Thus, in such an embodiment, the alteration key serves the same purpose as the MODE key that is described in U.S. Pat. No. 8,504,600 whenever the answer form is the currently alterable decision, as well as serving other purposes in other circumstances.

In various alternative embodiments, immediately after the answer to a calculation is displayed, repeatedly actuating some key other than the alteration key will cause the interface to cycle between various possible forms of the answer, whether or not the embodiment also has an alteration key that in certain circumstances causes the interface to cycle between various possible forms of the answer. For example, in one alternative embodiment, the computing device has a MODE key that is not an alteration key, and immediately after the answer to a calculation is displayed, repeatedly actuating the MODE key will cause the interface to cycle between various possible forms of the answer, as is explicitly described in U.S. Pat. No. 8,504,600; in another alternative embodiment, the computing device has an ENTER key such that immediately after the answer to a calculation is displayed, repeatedly actuating the ENTER key will cause the interface to cycle between various possible forms of the answer; and so forth.

Rapid Answer Form Selection

In an embodiment, the computing device has various answer form keys such that each particular answer form key corresponds to one or more particular answer forms. Immediately after the answer to a calculation is displayed, if a user actuates an answer form key while holding down the alteration key, then the interface will change the answer to one of the answer forms that the answer form key corresponds to. If the answer form key corresponds to more than one answer form, then repeatedly actuating the answer form key while holding down the alteration key will cause the interface to cycle between the various answer forms that the answer form key corresponds to. In an embodiment, in certain cases a user may even be able to select an answer form by such means when the answer form is not included as an alternate option of an alterable answer form decision; for example, in an embodiment, if the answer to a calculation is 3, then the alterable answer form decision will not include any alternate options where that answer is expressed as a complex number, but nevertheless if the user holds down the alteration key and presses the i key then the interface will express the answer as 3+0i.

In an embodiment, various keys that ordinarily serve other purposes double as answer form keys for purposes of the interface behavior described in the preceding paragraph. In particular, in an embodiment, the decimal point key is an answer form key that corresponds to decimal answer form. When the answer can be expressed as a fraction, the fraction creation key or division key is an answer form key that corresponds to every distinct fraction answer form that is possible for the answer, such as, for example, improper fraction form and mixed fraction form. The percent sign key corresponds to percentage answer form. The exponentiation key and/or the $10^x$ key each correspond to both scientific notation form and engineering notation form. When an answer can be expressed as an irrational number in exact terms that includes a square root symbol, the square root key is an answer form key that corresponds to this form. Likewise, when an answer can be expressed as an irrational number in exact terms that includes the symbol π, the π key is an answer form key that corresponds to this form. The degree symbol key corresponds to every possible degree answer form, such as a degrees-minutes-seconds form and a degree form in which minutes and seconds are not used. The i key corresponds to every possible complex answer form.

Composite Answer Form Decisions

In an embodiment, when the interface makes an alterable answer form decision, it will take into account various factors in order to determine what answer forms are included as options of the alterable decision, which answer form is the default option, and what probabilities of alteration are assigned to the alternate options. Such behavior is described in detail below. Because a wide variety of answer forms may be possible in some embodiments, it may be quite advantageous for the interface to intelligently assign probabilities of alteration to various answer forms, so that a user can usually select a desired answer form quickly, without the need to cycle past numerous undesirable answer forms.

In an embodiment, when the interface makes an alterable answer form decision, the decision is a composite decision, and each of its component decisions is an adaptive threshold decision. (Dividing answer form decisions into component decisions may make it easier to optimize answer form decisions, both by making it easier for an interface designer to carefully design each component decision to intelligently take various factors into account, and by making it possible for each component decision class to be a distinct adaptive decision class as is discussed in Part II, so that automatic interface adaptation may tend to yield more advantageous results.)

In an embodiment, to determine the probability of alteration of each alternate option of an alterable answer form decision, the interface will first calculate the "total score gap" for each alternate option. To do so, the interface will calculate the decision score for each component decision in the sequence of component decision outcomes that would have led to selecting that option, and then the interface will calculate the total of the amounts by which these component decision scores would need to have been modified in order for the interface to have initially selected that option; this total will be the total score gap for that option. The interface will assign a probability of alteration to each option that is inversely related to the option's total score gap. For example, if the component decision score regarding whether or not to display a particular answer as a fraction is 3.5 below the threshold for that decision, and so the interface decides to display the answer as a decimal, and the component decision score regarding whether to display that answer as a mixed fraction or as an improper fraction would have been 0.5 below the threshold for that decision (and so even if the interface had decided to display the answer as a fraction it would have displayed it as an improper fraction, not a mixed fraction), then the total score gap for the improper fraction outcome is 3.5, and the total score gap for the mixed fraction outcome is 4.0 (which equals 3.5 for the first component decision plus 0.5 for the second component decision); therefore, in an embodiment, the improper fraction option of the alterable answer form decision will be assigned a moderate probability of alteration and the mixed fraction option will be assigned a somewhat lower probability of alteration.

In an embodiment, if it would be quite uninformative to display the answer to a calculation in a certain form, such as because the user's input was that exact value in that exact form, then the interface will calculate the decision score for each component decision regarding what form to display the answer in as described above, and then the interface will calculate the total score gap for every option of the decision as described in the preceding paragraph—including the total score gap for the default option, which of course will be 0. Next, the interface will add 5 to the total score gap of the option that would be uninformative. If as a result no option has a total score gap equal to 0, then the interface will reduce all the total score gaps by an amount equal to the lowest total score gap, so the lowest total score gap will then be 0, and the interface will then select an option that has a total score gap of 0 as the default option.

For example, consider a situation in which the interface decides what form to use when displaying an answer after evaluating the user input "24.2." Suppose that initially, the total score gap of the decimal outcome is 0, the total score gap of the improper fraction outcome is 3.5, and the total score gap of the mixed fraction outcome is 4.0. However, the user's input was 24.2, so it would be quite uninformative to display the answer in the decimal form of 24.2. The interface then increases the total score gap of the decimal outcome from 0 to 5. No option has a total score gap equal to zero, so the interface reduces all the total score gaps by an amount equal to the lowest total score gap, which is 3.5. As a result, the total score gap of the decimal outcome is 1.5, the total score gap of the improper fraction outcome is 0, and the total score gap of the mixed fraction outcome is 0.5. The interface selects the improper fraction outcome as the default option of its alterable answer form decision; the mixed fraction outcome has a high probability of alteration, and the decimal outcome has a moderate probability of alteration.

Intelligent Answer Form Decision Principles

In the following paragraphs, terminology is defined that will facilitate explaining how the interface makes individual component threshold decisions between various answer forms, in some embodiments. After that, the present specification describes various methods for making various component answer form decisions that are intelligent threshold decisions between answer forms or groups of answer forms for answers that are real numbers. It is to be understood that in various alternative embodiments, the interface may use much simpler methods to make such decisions, or the interface may use even more complex methods to make such decisions even more intelligently. After that, the present specification enumerates additional component answer form decisions for certain specific types of answers; it is to be understood that these additional component answer form decisions may be made by relatively simple methods or may be made by relatively complex and intelligent methods such as methods that are similar to the methods that are explained in more detail below.

In an embodiment, after a user inputs a mathematical expression that the computing device evaluates, in order for the interface to make a decision between various answer forms, it may take into account the nature of the mathematical expression that the user typed, and in particular may take into account whether numbers in the relevant form are included in the user's input, so that if for example the user's input includes several numbers in scientific notation then the interface may be more likely to decide to display the answer in scientific notation. Any adjustment to the decision score of an answer form decision due to the presence of numbers in the user's input that are in a specific form will be referred to herein as a "weighted average usage bonus." In an embodiment, a weighted average usage bonus is determined by averaging the usage bonuses of the numbers in the user's input, except that for each distinct nonzero usage bonus, the first occurrence of a number in the user's input that has that particular usage bonus has triple weight for purposes of calculating such an average. For example, if a user's input includes four numbers that have usage bonuses of −2, 0, −2, and +2 respectively, then the first occurrence of a number that has a usage bonus of −2 will have triple weight and the first occurrence of a number that has a usage bonus of +2 will also have triple weight, so the weighted average usage bonus will equal the average of the numbers −2, −2, −2, 0, −2, +2, +2, and +2.

In an embodiment, in order for the interface to make a decision between various answer forms, in certain circumstances the interface may assign a "form penalty" to a particular numeric value expressed in a particular form. When a given value in a given form has a nonzero form penalty, this represents the fact that it is relatively unusual to express such a value in that form. For example, in an embodiment, in certain circumstances the number 1 expressed in scientific notation will be assigned a nonzero scientific notation form penalty because it is relatively unusual to express a small positive integer in scientific notation rather than simply expressing it as an integer. In an embodiment, an "answer form penalty" does not necessarily equal the form penalty for the value of an answer expressed in a particular form: Instead, in order to calculate an answer form penalty, the interface will first check each numeral in that form that is in the the user's input, and determine the greatest form penalty of any such numeral. The answer form penalty will then equal the form penalty for the value of the answer expressed in that form reduced by half as much as the greatest form penalty of any numeral in that form in the user's input (but not reduced below zero). If no numeral in that form is in the user's input, the answer form penalty will equal the form penalty for the value of the answer in that form. For example, in an embodiment, if the answer to a calculation is 1, then the answer form penalty for that value expressed in scientific notation will be nonzero, but if the user's input also happened to include the number 1 expressed in scientific notation, then the answer form penalty will be half as much as it would be if the user's input included no numbers expressed in scientific notation. In an alternative embodiment, an "answer form penalty" will always simply equal the form penalty for the value of the answer expressed in that form.

In an embodiment, for each component decision class that pertains to answer forms, the maximum outcome repetition bias is 3. In an embodiment, each time the interface makes a decision between various answer forms, that decision constitutes a context break for any particular component decision between answer forms that has a neutral outcome or is otherwise not relevant; in an embodiment, this means that the current outcome repetition bias of any such component decision class is reduced by 1. For example, if first the interface makes a decision to express an answer as a mixed fraction rather than as an improper fraction and so that component decision class has a current outcome repetition bias of 3, and then the interface calculates an answer that is an integer so that the component decision regarding whether to express the answer as a mixed fraction or as an improper fraction is not relevant, then the current outcome repetition bias of that component decision class will be reduced to 2.

Real Number Answer Form Decisions

In an embodiment, when the answer to a calculation is a real number, by default the interface will make a "real number answer form decision" in order to determine what form to display the answer in, as is explained in the following paragraphs. Various exceptions to this behavior are described farther below; for example, in an embodiment that is described farther below, when the answer to a calculation is a real number that the interface determines may be an angle measure, the interface will first make a component decision whether or not to express the answer as an angle measure, and then if it decides not to express the answer as an angle measure it will make a real number answer form decision.

In an embodiment, when the interface makes a real number answer form decision, the decision will be a composite decision between various answer forms that proceeds as follows: First, the interface will make a component decision whether or not to express the answer as a fraction. (For purposes of this decision, a mixed fraction constitutes a fraction.) If it does, then it will express the answer as a proper fraction if its absolute value is less than 1; otherwise, it will make a component decision whether to express the answer as a mixed fraction or as an improper fraction. If the interface decides not to express the answer as a fraction, then it will make a component decision whether or not to express the answer as a percentage. If it decides not to express the answer as a percentage, then it will make a component decision whether to express the answer as an ordinary decimal, or as a number in either scientific notation or engineering notation. If it decides to express the answer in either scientific notation or engineering notation, then it will make a component decision which of these two forms to express the answer in.

In an embodiment, in order to determine whether or not to express an answer as a fraction, if it is possible to display the answer as a fraction, then the interface will make a threshold decision whether or not to express the answer as a fraction: the interface will calculate a decision score and will then express the answer as a fraction if the decision score is above the threshold value of −0.5, or as a non-fraction otherwise. In an embodiment, the decision score for such a decision equals its outcome repetition bias, plus the weighted average of the usage bonuses of the numerals in the user's input (if any), minus the answer form penalty of the answer as a fraction in lowest terms. In an embodiment, for purposes of such a decision, the usage bonus of any numeral that is a fraction or mixed fraction is +2; the usage bonus of any integer is 0; and the usage bonus of any numeral that includes a decimal point or percent sign is −2. In an embodiment, for purposes of such a decision, the fraction form penalty of a proper fraction equals the number of digits in the fraction's denominator, minus 1. The fraction form penalty of a mixed fraction equals the number of digits in the denominator of the fraction portion of the mixed fraction plus the number of digits in the whole number portion of the mixed fraction, minus 1. The fraction form penalty of an improper fraction equals the fraction form penalty it would have if it were converted to a mixed fraction.

In an embodiment, if the interface decides to express an answer as a fraction, then the interface will make a threshold decision whether to express the answer as a mixed fraction or as an improper fraction: the interface will calculate a decision score and will then express the answer as a mixed fraction if the decision score is above the threshold value of 1.5, or as an improper fraction otherwise. In an embodiment, the decision score for such a decision equals its outcome repetition bias plus the weighted average of the usage bonuses of the numerals in the user's input (if any), plus the answer form penalty of the answer as an improper fraction, minus 2 if the user's input included anything that the interface identifies as pertaining to algebra or a more advanced mathematical subject (such as a variable, trigonometric function, integral symbol, etc.). In an embodiment, the maximum outcome repetition bias of such a decision is 3. In an embodiment, for purposes of such a decision, the usage bonus of any numeral that is a mixed fraction is +2; the usage bonus of any numeral that is an improper fraction is −2; and the usage bonus of any other numeral is 0. In an embodiment, for purposes of such a decision, the improper fraction form penalty of an improper fraction equals the number of digits in the fraction's numerator minus the number of digits in its denominator, divided by 2; for example, the improper fraction form penalty of $$\frac{100}{3}$$

equals 1.

In an embodiment, if the interface decides not to express an answer as a fraction, then the interface will will make a component decision whether or not to express the answer as a percentage. In an embodiment, in certain circumstances that are described below, the interface may make a real number answer form decision regarding how to express certain real number portions of an answer even when the answer itself is not a real number; in an embodiment, in such circumstances the interface will always decide not to express an answer as a percentage, and such a decision will not be alterable, so for example 2+3i will never be expressed as 200%+300% i. In an embodiment, when an answer is a real number and the interface makes a component decision whether or not to express the answer as percentage, it will be a threshold decision: the interface will calculate a decision score and will then express the answer as a percentage if the decision score is above the threshold value of 3.5. In an embodiment, the decision score for such a decision equals its outcome repetition bias, plus a bonus of 2.0 if the last operation that was applied in evaluating the problem the user typed was division, minus the answer form penalty of the answer as a percentage. In an embodiment, the percentage form penalty of a percentage equals 0, plus 1 if it is negative, plus 1 if its absolute value is not between 0.1% and 100% inclusive, plus 1 more if its absolute value is not less than 200%, plus twice the exponent of the power of 10 that the number would have if it were expressed in scientific notation (rather than as a percentage) if this exponent would be a positive number; for example, the percentage form penalty of −130% equals 0, plus 1 because it is negative, plus 1 because its absolute value is more than 100%, plus nothing else (because its absolute value is less than 200% and the exponent of its power of 10 would be 0 if it were expressed in scientific notation), for a total of 2.

In an embodiment, if the interface decides not to express an answer as a percentage, then the interface will make a threshold decision whether to express the answer as an ordinary decimal, or in either scientific notation or engineering notation: the interface will calculate a decision score and will then express the answer in either scientific notation or engineering notation if the decision score is above the threshold value of 3.5, or as an ordinary decimal otherwise. In an embodiment, the decision score for such a decision equals its outcome repetition bias plus the weighted average of the usage bonuses of the numerals in the user's input (if any), plus the answer form penalty of the answer as a decimal, minus the answer form penalty of the answer in scientific notation. In an embodiment, for purposes of such a decision, the usage bonus of any numeral that is in scientific notation is +2, and the usage bonus of any other numeral is 0. In an embodiment, for purposes of such a decision, if a decimal has an absolute value that is between 0 and 1 exclusive then its decimal form penalty equals twice the number of zeros that it has after the decimal point before it has any other digit; otherwise, its decimal form penalty equals the number of digits in its integer portion in excess of 7; for example, the decimal form penalty of 0.004 is 4, and the decimal form penalty of 1700 is 0. In an embodiment, for purposes of such a decision, for a number that is in scientific notation, its scientific notation form penalty equals 0 if the exponent of its power of 10 is more than 5 or less than 0, and equals 6 minus the exponent of its power of 10 otherwise; for example, the scientific notation form penalty of $2.04\times10^3$ is 3.

In an embodiment, if the interface decides to express an answer in either scientific notation or engineering notation, and if there is any difference between the answer expressed in scientific notation and the answer expressed in engineering notation, then the interface will make a threshold decision whether to express the answer in scientific notation or in engineering notation: the decision score will be 0, and the interface will express the answer in engineering notation if the decision score is above the threshold value of 2.0, or in scientific notation otherwise. Of course, this means that initially the interface will always prefer scientific notation over engineering notation, since the decision score of 0 is less than the threshold value of 2.0; however, in an embodiment, interface adaptation as described in Part II may cause the threshold value for this decision to change from its initial value.

Specialized Answer Form Decisions

What answer forms are possible may depend on what type of calculations a computing device can perform, so in certain embodiments, certain answer forms may never be possible, which may mean that certain component answer form decisions that are described below are never relevant to such embodiments. For example, in an embodiment that is a calculator that does not have the capability to display irrational numbers in exact terms, the interface will never make a component answer form decision whether or not to express an answer as an irrational number in exact terms as described in the following paragraph. As another example, in an embodiment that is a calculator that does not have the capability to perform algebraic calculations, it may never be the case that an answer consists of a value for x and a value for y, in which case the interface will never make a component answer form decision whether to display such an answer as a solution set or as the coordinates of a point.

In an embodiment, if the answer to a calculation is an irrational number and the interface is able to express the answer in exact terms, then the interface will first make a component decision whether or not to express the answer as an irrational number in exact terms. If it decides not to express it as an irrational number in exact terms, then it will make a real number answer form decision as described above. If it decides to express it as an irrational number in exact terms, it may additionally make a real number answer form decision regarding the form in which to display some portion of the answer; for example, if the interface decides to display the answer to $$\frac{2\pi}{4}$$

as an irrational number in exact terms, it may decide to display the coefficient of π in the answer as either a fraction or a decimal, thus yielding either 0.5π or $$\frac{\pi}{2}.$$

In an embodiment, if the answer to a calculation is a complex number, then if the problem that was entered included only real numbers, the interface will first make a component decision whether or not to yield an error because the answer is not a real number; if the problem included at least one complex number, then the interface will not yield an error. If the interface does not yield an error, then the interface will make a component decision whether or not to express the answer in the rectangular form a +bi. If the interface decides not to express the answer in rectangular form, then it will make a component decision whether or not to express it in the exponential form $re^{i\theta}$. If it decides not to express the answer in exponential form, then it will make a component decision whether to express it in the full polar form r(cos θ+i sin θ) or in the compact polar form r cis θ. Also, when the interface decides how to express a complex number, it will make a real number answer form decision regarding how to express the real number values a and b if it chooses to express the complex number in rectangular form, or regarding how to express the real number values r and θ if it chooses to express the complex number in exponential form or in polar form.

In an embodiment, when an answer is an algebraic expression that will be expressed in such a way as to include either fractions with integer denominators, or non-integer decimal values, or both, the interface will make a component decision whether to favor fractional or decimal representations. If the interface favors fractional representations, then if a variable has a fractional coefficient, and it is possible to express the answer in such a way that no denominator contains a variable, then the interface will make a component decision whether to favor expressing the product of a variable and a fractional coefficient as the fractional coefficient followed by the variable, or whether to favor expressing it with the variable in the numerator of a fraction. For example, in an embodiment, when the interface makes a decision how to express the answer to x÷2, three possible forms of the answer will be 0.5x, $$\frac{1}{2}x,$$

and $$\frac{x}{2}.$$

In an embodiment, when an answer is an inequality such that the solution set is a real interval, the interface will make a component decision whether to display the answer as an inequality or whether to display the answer in terms of its solution set, and if the interface decides to display the answer in terms of its solution set then the interface will make a component decision whether to display the answer in interval notation or in set-builder notation. Additionally, the interface may make a real number answer form decision regarding how to express the boundary values of such a solution set. For example, in an embodiment, when the interface makes a decision how to express the answer to 1<x+1<4, three possible forms of the answer will be 0<x<3, (0, 3), and {x|0<x<3}.

In an embodiment, when an answer consists of a value for x and a value for y, the interface will make a decision whether to display the answer as a solution set or as the coordinates of a point; the interface may also make a real number answer form decision regarding how to express the values of x and y. For example, in an embodiment, when the interface solves a system of equations and determines that x=1 and y=2, two possible forms of the answer will be x=1, y=2 and (1, 2).

In Chapter 51, the present specification describes a special method by which calculations can be performed in order to enable the interface to intelligently classify an answer to a calculation as extremely likely to be an angle measure, or moderately likely to be an angle measure, or moderately unlikely to be an angle measure, or extremely unlikely to be an angle measure. After that, the present specification explains how, in an embodiment, the interface will make a component answer form decision regarding whether or not to display the answer to a calculation as an angle measure, and what additional component answer form decisions the interface will make if it does decide to display the answer as an angle measure. In an embodiment, if the interface decides not to express the answer to a calculation as an angle measure, it will make a real number answer form decision as described above.

Chapter 51: Alterable Angle Measure Answer Forms

Numeric Calculators

Certain prior art calculators exist that can perform operations on mathematical expressions other than just specific constant numeric values. For example, certain calculators can perform operations on expressions that include the letter x without the need to convert that letter to a specific constant numeric value, so they can evaluate 2x+2x and yield the answer 4x. Such calculators are often referred to as "CAS" calculators, where CAS stands for "Computer Algebra System." Certain prior art CAS calculators can also perform operations on mathematical expressions that are explicitly identified as quantities of degrees, so they can directly calculate that 2°+2°=4°.

Non-CAS calculators exist that evaluate all mathematical expressions as specific constant numeric values, stored in calculator memory in floating-point decimal format. Rather than referring to such calculators as "non-CAS calculators," the present specification will refer to them as "numeric calculators." Certain numeric calculators can store specific values for variables, so for example if the value 10 is stored for the variable x in a numeric calculator, then the calculator can calculate that 2x+2x=40, or can even evaluate the expression 2x+2x=4x and determine that this equation is currently true for the value of x that is stored, but a numeric calculator cannot evaluate the expression 2x+2x and yield the answer 4x.

Prior Art Degree Symbol Evaluation

Various prior art numeric calculators have a degree evaluation mode and a radian evaluation mode. Such calculators are referred to herein as "modal calculators." When a modal calculator is in radian evaluation mode, it will by default interpret a parameter that is supplied to a trigonometric function as a quantity of radians. When it is in degree evaluation mode, it will by default interpret a parameter that is supplied to a trigonometric function as a quantity of degrees, even if the parameter does not include a degree symbol or any other explicit indication that the parameter is a quantity of degrees. For example, in prior art, a calculator exists such that with the calculator in degree evaluation mode, typing sin(30) into the calculator and pressing Enter will yield the result 0.5, because the calculator will interpret this input as sin 30°. When the same calculator is in radian evaluation mode, typing sin(30) into the calculator and pressing Enter will instead yield the result −0.9880316241.

On some prior art modal calculators, it is possible for a user to explicitly type a degree symbol, and the calculator is configured so that if the parameter supplied to a trigonometric function ends with a degree symbol, the calculator will interpret that parameter as a quantity of degrees even if the calculator is in radian evaluation mode. For example, typing sin(30°) into such a calculator will yield the result 0.5 whether the calculator is in degree evaluation mode or radian evaluation mode. However, it is often relatively inconvenient for a user of a modal calculator to explicitly input a degree symbol; it is generally preferable to set the calculator to operate in degree evaluation mode instead. Conversely, on some prior art modal calculators, it is possible for a user to explicitly type a symbol that denotes that the preceding quantity is to be interpreted as a quantity of radians even if the calculator is in degree evaluation mode. For example, a prior art calculator exists such that the superscripted lowercase letter r denotes that the preceding quantity is to be interpreted as a quantity of radians, so typing sin($30^r$) into such a calculator yields the result −0.9880316241 whether the calculator is in degree evaluation mode or radian evaluation mode.

On prior art numeric calculators, even the value of 30° must be evaluated as a plain constant numeric value stored in calculator memory in floating-point decimal format in order for the calculator to proceed with calculations that involve 30°. For example, 30° may be converted to the number 30, or 30° may be converted to the number that represents an equivalent angle measure in radians.

On a modal calculator, the output of the sine function will vary depending on whether the calculator is in degree evaluation mode or in radian evaluation mode. When a modal calculator evaluates sin(30), the answer will be 0.5 only if the calculator is in degree evaluation mode. However, on a modal calculator that enables a user to explicitly type a degree symbol, sin(30°) must always yield the answer 0.5 whether the calculator is in degree evaluation mode or in radian evaluation mode.

TI-84 Plus graphing calculators, non-CAS TI-Nspire graphing calculators, and Casio fx-CG10 graphing calculators ensure that sin(30°) will always yield the answer 0.5 by evaluating the expression 30° differently depending on whether the calculator is in degree mode or in radian mode, in exactly such a way as to compensate for the differing operation of the sine function. When such a calculator is in degree mode, the input 30° yields the answer 30, and when it is in degree mode sin(30) yields 0.5, so when such a calculator is in degree mode sin(30°) yields 0.5. When such a calculator is in radian mode, 30° yields approximately 0.5235987756 (which is the equivalent angle measure in radians), and when it is in radian mode sin(0.5235987756) yields 0.5, so when such a calculator is in radian mode sin(30°) still yields 0.5.

Thus, in order to give consistent results when evaluating sin(30°), TI-84 Plus graphing calculators, non-CAS TI-Nspire graphing calculators, and Casio fx-CG10 graphing calculators are configured to give inconsistent results when evaluating 30°. In radian mode, inputting 30° yields 0.5235987756, which is helpful and correct. In degree mode, inputting 30° yields 30, which is uninformative and is technically a wrong answer: 30° does not equal the number 30. As a result, when such a calculator is in degree mode, it will yield a wrong answer to calculations such as $$\frac{360°}{2\pi},$$

which is a conversion factor that should always yield the answer 1.

Prior Art Degrees-Minutes-Seconds Evaluation

Prior art HP Prime graphing calculators ensure that SIN (30°) will always yield the answer 0.5 by a different means than TI-84 Plus, TI-Nspire and Casio fx-CG10 graphing calculators. While in its home screen mode, the HP Prime graphing calculator will act like a numeric calculator in most respects; however, instead of merely evaluating all expressions as plain constant numeric values stored in floating-point decimal format, the HP Prime can evaluate an expression as either a plain numeric value or as a numeric value that is internally marked as representing a quantity of degrees that is to be displayed in degrees-minutes-seconds form. Such a value will be referred to herein as a "DMS number." For example, if a user inputs 30°, the HP Prime will evaluate that as a DMS number and will thus output 30°00'00". (In fact, if a user inputs 30°, then when the user presses Enter the HP Prime will transform the region where the user's input is displayed so it appears as though the user typed 30°00'00" instead of merely 30°.)

On the HP Prime graphing calculator, the degree symbol always indicates a number in degrees-minutes-seconds form, and attempting to evaluate 30.5° will yield a syntax error: on the HP Prime, when a numeral is in degrees-minutes-seconds form, the quantity of seconds may be a decimal quantity, but the quantity of degrees may not.

When the HP Prime evaluates a trigonometric function with a DMS number as its operand, the HP Prime recognizes that because that number represents a quantity of degrees, the trigonometric function must be evaluated as though the calculator is in degree evaluation mode even if it is actually in radian evaluation mode. Thus, whether the HP Prime is in degree mode or radian mode, SIN(30°) yields 0.5.

When the HP Prime evaluates an expression that is not a trigonometric function, if one of the expression's operands is a DMS number, then the HP Prime will first perform the calculation without regard to the fact that an operand is a DMS number and will then mark the result as a DMS number if and only if the original expression's first operand was a DMS number. This can lead to some problematic results. On the HP Prime, 30°+60 yields the result 90°00'00", but 60+30° yields the result 90; because 30°+60 yields a slightly different result than 60+30°, when the calculator is in radian mode SIN(30°+60) will yield a drastically different answer than SIN(60+30°). Also, on the HP Prime, $$\frac{60^\circ}{30^\circ}$$

will yield the answer 2°00'00", an answer which is expressed as a quantity of degrees even though it clearly should not be expressed as a quantity of degrees. Similarly, on the HP Prime, $$\frac{360^\circ}{2\pi}$$

will not yield the correct answer of 1.

Casio fx-CG10 graphing calculators, like HP Prime graphing calculators, allow entry of expressions in degrees-minutes-seconds form. However, on the Casio fx-CG10, in order to input an expression in degrees-minutes-seconds form, a user must input a square that resembles a degree symbol in place of each degree symbol, single quote, or double quote: for example, instead of inputting 30°30'00", a user would input 30°30°00°. Thus, on the Casio ƒx-CG10, a user may input 30 degrees by typing either 30° or 30°.

The Casio fx-CG10 is an ordinary numeric calculator: it evaluates all expressions as plain constant numeric values, including expressions that are entered in degrees-minutes-seconds form. When the Casio fx-CG10 evaluates an expression that was entered in degrees-minutes-seconds form, the result it yields is always the number that is the equivalent quantity of degrees, but without a degree symbol or any other indication that the result is anything other than a plain number. For example, whether the Casio fx-CG10 is in degree evaluation mode or in radian evaluation mode, 30°30°00° will always yield 30.5, which is the equivalent decimal quantity of degrees, without a degree symbol. This behavior has a disadvantageous side effect. As was mentioned above, the Casio fx-CG10 ensures that sin 30° will always yield the answer 0.5 by evaluating the expression 30° differently depending on whether the calculator is in degree mode or in radian mode, in exactly such a way as to compensate for the differing operation of the sine function; but because the Casio fx-CG10 does not evaluate the expression 30° differently depending on whether the calculator is in degree mode or radian mode, it will yield a wrong answer to sin 30° when the calculator is in radian mode: it will evaluate 30° as the decimal quantity 30 and will then yield the sine of 30 radians, even though the user clearly wished to evaluate the sine of 30 degrees.

Angle Measure Answer Forms

Although prior art numeric calculators evaluate all expressions as plain constant numeric values that are internally stored as floating-point decimals for purposes of calculation, many such calculators are able to recognize when certain numeric values that are internally stored as floating-point decimals can be usefully displayed in forms other than decimal form, and can change the displayed version of an answer to some form other than decimal form, without changing the version of the answer that is internally stored for purposes of calculation.

(Below, whenever the present specification refers to "the answer stored in memory," it is referring to the answer that is stored in the memory of a computing device as a floating-point decimal that may be used in future calculations, and not to the displayed version of the answer, even though the displayed version of the answer is of course stored in memory too.)

Many prior art numeric calculators have a key that will cause the displayed version of an answer to toggle between two forms. For example, a user of a Casio fx-CG10 graphing calculator or a TI-36X Pro scientific calculator can convert an answer from 3.5 to $$\frac{7}{2}$$

with a single keystroke, or can even convert an answer from 0.523598776 to either $$\frac{\pi}{6}$$

(on the TI-36X Pro) or $$\frac{1}{6}\pi$$

(on the Casio fx-CG10) with a single keystroke. Thus in many cases, the Casio fx-CG10 and the TI-36X Pro can display an answer that is a quantity of radians as either a decimal or as a fraction multiplied by π.

However, none of these prior art calculators can toggle answers between a quantity of degrees and a quantity of radians. On the TI-84 Plus, the non-CAS TI-Nspire, the Casio fx-CG10, and the TI-36X Pro, calculating $\sin^{-1}(0.5)$ will yield 30 when the calculator is in degree evaluation mode, or 0.523598776 when the calculator is in radian mode. The Casio fx-CG10 and the TI-36X Pro can recognize 0.523598776 as equivalent to $$\frac{\pi}{6},$$

but none of these calculators will recognize the number 30 as equivalent to 0.523598776 or equivalent to $$\frac{\pi}{6}$$

because they store the number in memory as simply the numeric value 30, not as 30 degrees. Because 30 is not equal to 0.523598776, it is not possible to convert between the answer 30 and the answer 0.523598776 on any of these calculators. Similarly, on the HP Prime, the equivalent calculation A SIN(0.5) will yield 30 when the calculator is in degree evaluation mode, or 0.523598775598 when the calculator is in radian mode. When in degree evaluation mode, the HP Prime does not evaluate A SIN(0.5) as 30°00'00": it evaluates A SIN(0.5) as the plain numeric value 30, like ordinary numeric calculators.

The Casio fx-CG10 and the HP Prime can convert the displayed version of an answer that is a number that represents a quantity of degrees into degrees-minutes-seconds form. For example, when the Casio fx-CG10 is in degree evaluation mode, $\sin^{-1}$ 0.7 yields 44.427004, and then invoking a certain command replaces this answer with 44°25'37.21". However, neither the Casio fx-CG10 nor the HP Prime has any way to actually confirm that an answer represents a quantity of degrees before converting the displayed version of the answer into degrees-minutes-seconds form, so if a user attempts to convert an answer that is a number that actually represents a quantity of radians into degrees-minutes-seconds form, the Casio fx-CG10 or the HP Prime will assume that the answer is instead a number that represents a quantity of degrees, and will thus yield a wrong answer. For example, when the HP Prime is in radian evaluation mode, A SIN(0.5) yields 0.523598775598, and converting this answer to degrees-minutes-seconds form yields the wrong answer 0°31'24.95559" rather than the right answer 30°00'00". Similarly, when the Casio fx-CG10 is in radian evaluation mode, $\sin^{-1}$ 0.5 yields an answer that can be converted to the wrong answer 0°31'24.96". Additionally, when the Casio fx-CG10 is in radian evaluation mode, simply inputting a quantity of degrees that explicitly includes a degree symbol and then converting the resulting answer to degrees-minutes-seconds form will yield a wrong answer: for example, inputting 30° yields an answer that can be converted to 0°31'24.96".

When the non-CAS TI-Nspire is instructed to convert a number into degrees-minutes-seconds form, it will assume the number is a quantity of degrees if the calculator is in degree evaluation mode, and it will assume the number is a quantity of radians if the calculator is in radian evaluation mode. This approach can also lead to wrong answers: for example, π▶DMS should always yield 180°, but when the calculator is in degree mode, π▶DMS yields 3°8'29.7336" instead.

Thus, prior art numeric calculators made by three different manufacturers all are unable to easily convert answers between degrees and radians, and all may yield wrong answers in certain circumstances.

Radian-Only Evaluation

In the present chapter, a "numeric calculator" is an application or calculator or computing device that evaluates all expressions as specific constant numeric values, and thus may be able to determine whether the equation 2x+2x=4x is true for the particular value of x that is currently stored in the calculator's memory, but cannot evaluate the expression 2x+2x and yield the answer 4x. Traditionally, such calculators are often referred to as "non-CAS" calculators, where "CAS" stands for "Computer Algebra System." In education, it is relatively common for CAS calculators to be banned from tests, so that students are only permitted to use numeric calculators.

In an embodiment of the present invention that is a numeric calculator, any angle measure that is evaluated will be stored in memory as a quantity of radians, never as a quantity of degrees. Such an embodiment will not have a degree evaluation mode per se. For example, in such an embodiment, the input 30° will always be evaluated as the numeral 0.523598776, never as the numeral 30. In such an embodiment, the input 30°00'00" will also always be evaluated as the numeral 0.523598776, never as the numeral 30. In such an embodiment, when a parameter of a trigonometric function is evaluated it will be stored in memory as a quantity of radians, so when the sine function is applied to a parameter that has been evaluated and stored in memory, the sine function will always assume the parameter has been stored as a quantity of radians, not a quantity of degrees; the output of the sine function will thus depend only on its input parameter, and will not depend on a mode setting. In an embodiment, a user may select an option to convert the displayed version of an answer into degree form, and in order to perform such a conversion the interface will assume that the answer was evaluated in terms of radians, not degrees. In an embodiment, a user may select an option to convert the displayed version of an answer into degrees-minutes-seconds form, and in order to perform such a conversion the interface will assume that the answer was evaluated in terms of radians, not degrees.

Above, circumstances are described in which various prior art numeric calculators that are modal calculators yield wrong answers. A numeric calculator as described in the preceding paragraph that does not have a degree evaluation mode will not yield wrong answers in any of those circumstances. However, this approach to evaluating trigonometric expressions may have potential disadvantages: On such a calculator, sin(30) will never yield 0.5, so if a user wishes to calculate the sine of 30 degrees, a degree symbol must be explicitly present in the user's input. Similarly, on such a calculator, $\sin^{-1}(0.5)$ will never yield 30, so if a user wishes to calculate the arcsine of 0.5 as a quantity of degrees, the displayed version of the answer must be explicitly converted to degree form. Users may wish to perform multiple consecutive trigonometric calculations that involve degrees, and may not wish to explicitly type a degree symbol or explicitly convert an answer to degree form over and over again. That may be why so many prior art calculators have a degree evaluation mode: to enable a user to work with angle measures that are in degrees without the need to always explicitly type a degree symbol or explicitly convert an answer to degree form.

In Chapter 48, a degree input mode is described that makes it possible, in an embodiment, for a degree symbol to be explicitly present in the user's input even if the user does not explicitly type the degree symbol, and thus may make it equally convenient to calculate the sine of 30 degrees (for example) on a calculator even if the calculator does not have a degree evaluation mode. Below, a method is described that makes it possible, in an embodiment, for the interface to recognize when to convert an answer to degree form in certain circumstances even if the user does not explicitly choose to convert the answer to degree form, so that it may be equally convenient to calculate the arcsine of 0.5 as a quantity of degrees (for example) on a calculator even if the calculator does not have a degree evaluation mode. With such a method, and with a degree input mode as described in Chapter 48, a calculator that does not have a degree evaluation mode may be able to have most of the advantages of prior art modal numeric calculators without most of the disadvantages.

Calculating Angle Factors

In an embodiment of the present invention that is a numeric calculator, when any internal calculation is performed, the calculation's input and output are numerals that are associated with additional information: each numeral is associated with an integer that will be referred to herein as the numeral's "primary angle factor" and an integer that will be referred to as the numeral's "secondary angle factor." For each numeral, each of these angle factors may be represented as an additional byte of data that is stored along with the numeral in the memory of the computing device. Other methods of representing these angle factors in the memory of a computing device will be evident to those of ordinary skill in the art; for example, each of these angle factors may be represented as four bits of data rather than a full byte, since it will be quite rare for an angle factor to have a value greater than 15.

In an embodiment, when any constant integer or decimal the user inputs is evaluated and stored in memory, the corresponding numeral has a primary angle factor of 0; any other simple constant also has a primary angle factor of 0, except the constant π, which has a primary angle factor of 1. Any expression in degree format or degrees-minutes-seconds format has a primary angle factor of 1. The output of any inverse trigonometric function has a primary angle factor of 1; the output of any other trigonometric function has a primary angle factor of 0. When two numerals are multiplied, the primary angle factor of the product equals the sum of the primary angle factors of the two factors. When two numerals are divided, the primary angle factor of the quotient equals the primary angle factor of the dividend minus the primary angle factor of the divisor. When two numerals are added or subtracted, if both operands have an equal primary angle factor, the primary angle factor of the resulting sum or difference is also equal to that primary angle factor. When a numeral is calculated such that the preceding rules do not specify its primary angle factor (such as when a numeral is calculated that is the sum or difference of two operands that do not both have an equal primary angle factor), the numeral's primary angle factor equals some special constant number that is not close to 0 or 1, such as 128.

In an embodiment, the same rules that are described above with reference to primary angle factors are also applicable to secondary angle factors—that is, the paragraph that would result if every occurrence of the word "primary" in the preceding paragraph were replaced with the word "secondary" would accurately describe such an embodiment—except that the constant π has a secondary angle factor of 0 even though it has a primary angle factor of 1.

Figure 29B:
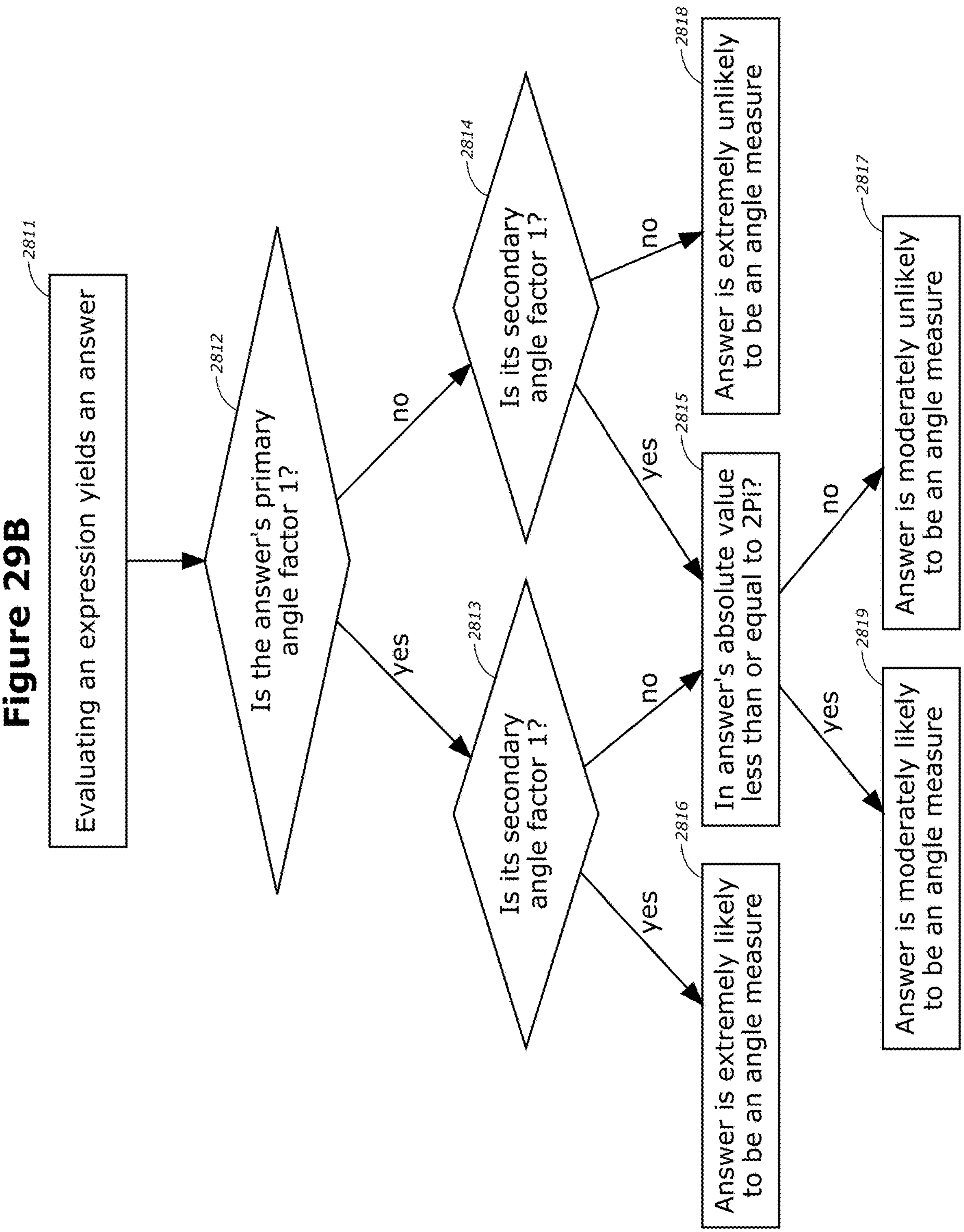
FIG. 29B illustrates an example classification system.
Figure 29C:
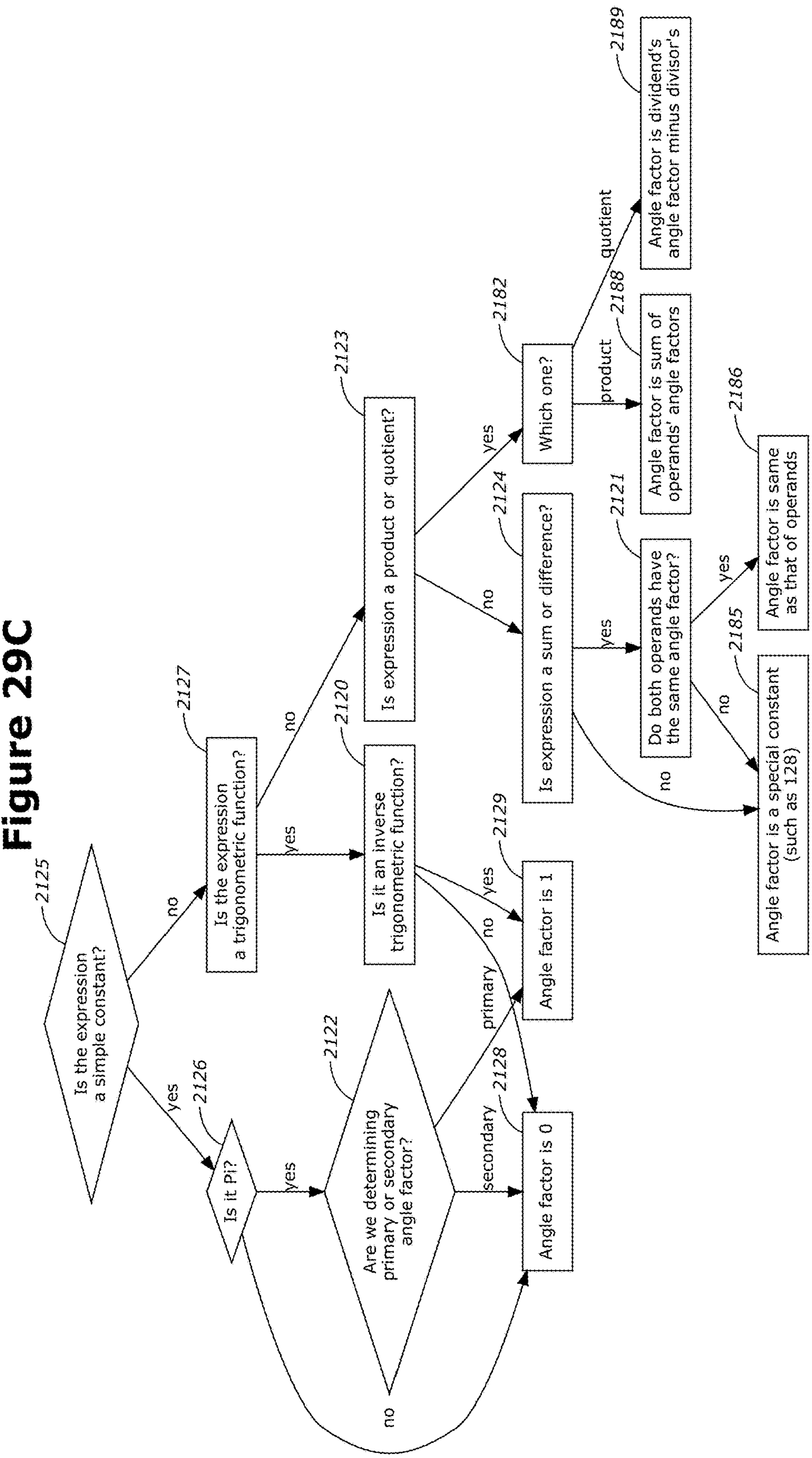
FIG. 29C is a flowchart that illustrates an algorithm that determines, for a mathematical expression, an angle factor, which may be either a primary angle factor or a secondary angle factor, according to an embodiment.

FIG. 29C is a flowchart that illustrates an algorithm that determines for a mathematical expression an angle factor, which may be either a primary angle factor or a secondary angle factor, according to the rules specified in the preceding paragraphs.

For example, in an embodiment, when the computing device evaluates $$\frac{\pi}{6}\times\frac{180°}{\pi},$$

the primary angle factor of π is 1 and the primary angle factor of 6 is 0, so the primary angle factor of $$\frac{\pi}{6}$$

is 1; the primary angle factor of 180° is 1 and the primary angle factor of π is 1, so the primary angle factor of $$\frac{180°}{\pi}$$

is 0; and because the primary angle factor of $$\frac{\pi}{6}$$

is 1 and the primary angle factor of $$\frac{180°}{\pi}$$

is 0, the primary angle factor of the product $$\frac{\pi}{6}\times\frac{180°}{\pi},$$

is 1. Similarly, the secondary angle factor of π is 0 and the secondary angle factor of 6 is 0, so the secondary angle factor of $$\frac{\pi}{6}$$

is 0, the secondary angle factor of 180° is 1 and the secondary angle factor of π is 0, so the secondary angle factor of $$\frac{180°}{\pi}$$

is 1; and because the secondary angle factor of $$\frac{\pi}{6}$$

is 0 and the secondary angle factor of $$\frac{180°}{\pi}$$

is 1, the secondary angle factor of the product $$\frac{\pi}{6} \times \frac{180°}{\pi}$$

is 1. Thus, for that expression, both the primary angle factor and the secondary angle factor turn out to equal 1.

In an embodiment, such angle factors do not affect the value of any numeral that is calculated, and such angle factors do not even indicate what form a numeral should be displayed in, but such angle factors may facilitate an intelligent decision regarding what form the numeral should be displayed in, as described below.

In an embodiment, for purposes of the component answer form decision described below regarding whether or not to display an answer as an angle measure, if the answer to a calculation is a numeral that has both a primary angle factor of 1 and a secondary angle factor of 1, then the answer is classified as extremely likely to be an angle measure. If the answer has neither a primary angle factor of 1 nor a secondary angle factor of 1, then the answer is classified as extremely unlikely to be an angle measure. If either the primary angle factor is 1 or the secondary angle factor is 1 but not both, then if the absolute value of the answer is less than or equal to 2π then the answer is classified as moderately likely to be an angle measure, and if not then the answer is classified as moderately unlikely to be an angle measure; for example, in an embodiment, when the computing device evaluates $$\frac{\pi}{6},$$

the answer is classified as moderately likely to be an angle measure, but when it evaluates $\pi(4)^2$, the answer is classified as moderately unlikely to be an angle measure. This system of classification is illustrated in the flowchart of FIG. 29B.

In an alternative embodiment, the computing device will calculate either primary angle factors or secondary angle factors but not both, and for purposes of the component answer form decision described below regarding whether or not to display an answer as an angle measure, the answer will be classified as extremely likely to be an angle measure if the angle factor that is calculated is 1 or will be classified as extremely unlikely to be an angle measure otherwise.

Angle Measure Answer Form Decisions

In an embodiment, when the answer to a calculation is extremely unlikely to be an angle measure, the interface will not express the answer as an angle measure, and this decision will not be alterable. In an embodiment, in other circumstances, the interface will make an alterable decision whether or not to express the answer as an angle measure. In an embodiment, the interface's decision whether or not to express an answer as an angle measure is an adaptive threshold decision such that initially the interface will express an answer as an angle measure if and only if the answer is at least moderately likely to be an angle measure, but if for example a user repeatedly and consistently causes answers that are moderately likely to be angle measures to be expressed as ordinary decimals, while still allowing answers that are extremely likely to be angle measures to be expressed as angle measures, then the interface will adjust the relevant threshold so that it will express an answer as an angle measure if and only if the answer is extremely likely to be an angle measure.

If an embodiment, if the interface decides to express the answer to a calculation as an angle measure, then it will make a component decision whether to express the answer in radians or in degrees. In an embodiment, the outcome of such a decision is determined by the angle measure mode that is described in Chapter 48, so for example when the angle measure mode is degree input mode with high confidence, the interface will decide to express the answer in degrees and this decision will have a low probability of alteration. Conversely, if the user alters such a decision, the interface will accordingly alter the angle measure mode so that the appropriate mode become selected, with low confidence.

In an alternative embodiment that has a degree input mode as described in Chapter 48 but does not have an angle measure mode with confidence levels, the interface will decide to express an answer in degrees rather than radians if and only if it is currently in degree input mode, and this decision will have a high probability of alteration. Conversely, if the user alters such a decision, the interface will accordingly switch from degree input mode to radian input mode or vice versa.

In an embodiment, when the interface decides to express an answer in radians, it will express the answer in terms of a real number coefficient multiplied by it. If such a coefficient can be expressed as a fraction, then the interface will express the answer in terms of a proper fraction or an improper fraction with it in its numerator. In an embodiment, when the interface decides to express an answer in degrees, if the answer is not a whole number quantity of degrees, then the interface will make a component decision whether to express the number of degrees as a decimal or whether to express it in degrees-minutes-seconds form.

In an embodiment where the interface also has a gradian input mode, when the interface makes a component decision whether to express the answer in radians or in degrees, such a decision will also include the option of expressing the answer in gradians, and the interface will initially select this option if and only if the interface is in gradian input mode. When the interface is not in gradian input mode, the alternate option corresponding to expressing the answer in gradians will have an extremely low probability of alteration; if the user then selects that option, the interface will accordingly alter the angle measure mode so that gradian input mode becomes selected, with low confidence.

Chapter 52: Other Alterable Decisions

Alteration of Input Shortcuts

When it is easy for a user to perform a particular sequence of input actions and it is rare for a user to wish to use that sequence of input actions for its obvious purpose, that sequence of input actions is a good candidate for use as a special input shortcut: an interface can be configured so that such a sequence of input actions yields a special result that a user cannot achieve as quickly by other means. Such input shortcuts are common in various interfaces. However, such an input shortcut may occasionally cause a mistake when a user wishes to use such a sequence of input actions for its obvious purpose, and momentarily forgets that the sequence of input actions will instead invoke an input shortcut. For example, a prior art iPhone is configured so that in certain circumstances rapidly pressing the space bar twice consecutively will yield a period followed by a space character; the present writer finds this shortcut very advantageous, but has often invoked this shortcut by mistake when intending to type two consecutive space characters. In some cases, an input shortcut may also cause mistakes when a user intends to invoke the shortcut and fails to do so. For example, on several occasions the present writer has pressed the space bar twice consecutively on an iPhone in the expectation that this would yield a period followed by a space character, but circumstances were such that this yielded two consecutive space characters instead.

In an embodiment, for any input shortcut that is invoked by a sequence of input actions that could occasionally have a useful effect even if the input shortcut did not exist, when a user invokes the input shortcut, the interface's decision to yield the result of the input shortcut is an alterable decision such that altering this decision will replace the result of the input shortcut with the result that would have obtained due to that sequence of input actions if the input shortcut had not been invoked. In an embodiment, the probability of alteration of such an alterable decision will be approximately proportional to the probability that a user who performs that sequence of input actions will not wish to invoke the input shortcut (in the judgment of the interface designer). For example, in an embodiment where pressing the space bar twice consecutively yields a period followed by a space character, the interface's decision to thus yield a period followed by a space character is an alterable decision such that altering the decision replaces the result with two consecutive space characters; in an embodiment, this decision has a very low probability of alteration, because a typical user who actuates the space bar twice consecutively will nearly always intend to input a period followed by a space character.

In an embodiment, for an input shortcut that may or may not be invoked by a particular sequence of input actions depending on circumstances, if the user performs that sequence of input actions and the interface decides not to invoke the input shortcut, then the interface's decision not to invoke the input shortcut is an alterable decision such that altering this decision will yield the result that would have obtained if the input shortcut had been invoked. For example, in an embodiment where pressing the space bar twice consecutively sometimes yields a period followed by a space character but sometimes yields two consecutive space characters, when the interface decides to yield two consecutive space characters, this decision is an alterable decision such that altering the decision will replace the two consecutive space characters with a period followed by a space character.

Alteration as a Postfix Command Modifier

In various interfaces, modifier keys such as Shift, Ctrl, Alt, 2nd and so forth are sometimes used to distinguish the key combination that invokes one interface command from the key combination that invokes a related command. For example, in Microsoft Office, the key combination Ctrl-V invokes the Paste command, and the the key combination Ctrl-Shift-V invokes the Paste Special command. When modifier keys are used this way, a user must determine in advance whether or not to hold down the modifier key in order to invoke the correct command.

In an embodiment of the present invention that has an alteration key, the alteration key may serve as a sort of postfix modifier key: if a key combination invokes an interface command, then the decision to invoke that command instead of a related command may be an alterable decision, so that the same key combination followed by an actuation of the alteration key may invoke the related interface command.

In some embodiments, the alteration key as a postfix modifier key may have several advantages over traditional modifier keys. It may allow a user to work faster, because the user will not need to determine in advance whether or not to use the alteration key in order to invoke the correct command: instead, a user may actuate the key combination without the alteration key, then check whether this yields the desired result, and then actuate the alteration key if necessary. Also, if a user fails to immediately check whether a key combination without the alteration key yielded the desired result, then the user may be able to retroactively correct any resulting mistake relatively quickly. Because a user may not need to be able to figure out in advance which command will be invoked by a key combination, the interface's determination of which command to initially invoke can then be made more complicated. For example, if a calculator has a log key such that pressing the Shift key and then the log key yields "ln" then it is probably undesirable for that interface behavior to ever change, but if instead a calculator has a log key that is initially configured so that pressing the log key and then the alteration key yields "in," then it could be advantageous for the interface to adapt in certain circumstances so that simply pressing the log key alone yields "ln," provided that the decision is alterable so that any resulting mistake will be easy to correct.

Alteration of Command Details

In certain prior art interfaces, whenever a particular command is invoked, the command will have its normal effect and will also cause a button to appear such that clicking the button opens a menu of options for modifying the effect of the command. Such buttons are referred to below as "command modification buttons." After a command modification button appears, as soon as the user performs any editing action other than selecting an option from such a menu, the command modification button will disappear. For example, in Microsoft Word, when a user invokes the Paste command, a small button that says "(Ctrl)" appears near the input cursor, and then either clicking the button or pressing the Ctrl key will cause a "Paste Options" menu to appear. In Microsoft Excel, when a user invokes the Insert Row command, a small button with a paintbrush icon appears near the left edge of the newly inserted row, and clicking the button will cause a menu to appear that has the options "Format Same As Above," "Format Same As Below," and "Clear Formatting."

In some embodiments of the present invention, in various circumstances where it may be desirable to be able to modify the effect of a command immediately after the command has been invoked, the effect of the command is an alterable decision such that altering the decision will modify the effect of the command. For example, in an embodiment that is described in Chapter 34, after a user invokes the Paste command, in certain circumstances the user may be able to change the format of the pasted text by means of altering an alterable decision. In an embodiment that is described in Chapter 36, when a user inserts a row in a spreadsheet, in certain circumstances the user may be able to change the row's formatting so that it matches the row below rather than the row above by means of altering an alterable decision. Other embodiments in which altering a decision will modify the effect of a recent command may be evident to those of ordinary skill in the art.

In some embodiments, alteration functionality as described in the preceding paragraph may have several advantages over command modification buttons. The command modification buttons that are described above may appear even when their options are irrelevant, and may thus be pointless distractions: for example, when a user invokes the Insert Row command in Microsoft Excel the small button with a paintbrush icon will appear even when clicking any of its menu's three options will have no effect; but in an embodiment, an alterable decisions is automatically deleted whenever its alternate options are identical to its default option, and so alteration functionality will have no visible effect and cause no distraction in circumstances where a command modification button would be irrelevant. In an embodiment, alteration functionality may be used for many purposes, so it may be easier for a user to quickly recognize the general significance of a highlighted alterable block pertaining to a recently executed command than it is for a user to quickly recognize the general significance of a command modification button that appears only in response to the execution of one specific command. Perhaps most importantly, in an embodiment, alteration functionality may be able to modify the effect of a recently executed command even when the user has performed a few additional actions since executing the command; for example, in an embodiment, a user can insert a row in a spreadsheet and then actually type some text in the new row and notice that the text is not formatted as desired before then altering a decision so as to change the format of the inserted row.

Alteration of Setting-Controlled Decisions

In an embodiment, for various interface decisions such that the outcome of the decision may be affected by the current status of some interface setting, each such decision may be implemented as an alterable interface decision that has one alternate option corresponding to each outcome the decision would have had if the interface setting had been different. Such an embodiment may have the advantage that a user who forgets the current value of a relevant interface setting may be able to retroactively correct the resulting mistake relatively quickly. Other possible advantages of such an embodiment are described in the following chapter.

Other Decisions May be Made Alterable

Above, the present specification has explained in detail various circumstances in which the interface will make various types of alterable interface decisions, in some embodiments. However, the above enumeration of various types of alterable interface decisions is by no means exhaustive. It will be obvious to those of ordinary skill in the art that interfaces for other specific tasks may also be improved by making certain interface decisions to be alterable interface decisions. For example, it may be advantageous to make certain interface decisions that are specific to tasks such as video editing or computer-aided design to be alterable interface decisions.

The specific types of alterable interface decisions that are described above may serve as examples of how to take advantage of alteration functionality. After those of ordinary skill in the art become familiar with the uses of alteration functionality that are specified herein, additional uses of alteration functionality may become obvious to them. In particular, it will be obvious to those of ordinary skill in the art how to make some other types of interface decisions be alterable interface decisions in addition to those that are enumerated herein. It may also be possible for a particularly innovative practitioner to think of additional uses of alteration functionality that are not obvious to those of ordinary skill in the art.

Chapter 53: Advantages of Various Embodiments

Various Embodiments have Various Advantages

In various embodiments, the interface will have various advantages.

Generally, wherever the present specification has described a particular feature of an embodiment, the present specification has provided enough information that it is clear that the feature may be advantageous in certain circumstances. In particular, the present specification has provided numerous specific examples of how certain embodiments will behave in certain situations. In some cases, after such an example, the present specification explicitly mentions a possible advantage of an interface behavior. In other cases, after such an example, the present specification does not explicitly point out any advantages of an interface behavior, but certain possible advantages are evident simply from the example itself. For example, in Chapter 41 the present specification says, "For example, in an embodiment, if a user types (x,y) and then presses the space bar, then the interface will automatically create an equation region that includes that text, so that it will appear as (x, y) instead of (x,y)." It is obvious that for any user who frequently wishes to input (x, y) and rarely wishes to input (x,y), such interface behavior will generally make it possible to achieve desired results more efficiently.

Above, in various places, the present specification also has explicitly pointed out certain synergies between various specific features that are present in some embodiments. In Chapter 16, the present specification has explained that there may be a synergy between features that decrease the frustration caused by interface mistakes and features that increase the complexity of the interface. In various embodiments, the present invention may have various other advantages that are not discussed above. Certain other advantages are summarized in the following paragraph, and are then discussed in more detail below.

Generally, mistake mitigation features may reduce user frustration, and may cause users to feel comfortable working faster, and may cause users to become reluctant to use interfaces that lack such features. In some embodiments, certain features that are described herein may give interface designers more flexibility. In particular, an interface designer may be able to minimize any potential disadvantages of new features without much diminishing their potential advantages. Such flexibility may be convenient for an interface designer who is introducing any new features that are described herein; it may also be convenient for an interface designer who is introducing other new features. In an embodiment where various setting-controlled decisions are alterable decisions as described above, a user may be able to achieve desired results without the need to navigate menus to adjust a relevant setting, and even without being previously aware that a relevant setting exists, which may be convenient. Even an embodiment where only one type of interface decision is alterable may have significant advantages over prior art; however, in an embodiment where a wide variety of interface decisions are alterable interface decisions, in some cases a user may immediately understand how to correct a particular type of interface mistake the very first time the user encounters that type of mistake, which may be advantageous. These possible advantages are discussed in more detail below.

In addition to all these advantages, other advantages that are not explicitly discussed in the present specification may be apparent to those of ordinary skill in the art in light of the present disclosure. Furthermore, once a practitioner has actually used an embodiment of the present invention, the relative importance of the advantages of such an embodiment may become more apparent to the practitioner, and other advantages may become apparent to the practitioner.

Advantages of Mistake Mitigation Features

Many features that are described in the present specification are designed either to enable more efficient recovery from interface mistakes or to prevent interface mistakes altogether. Even when such features directly save a user only a small amount of time, such features may be disproportionately advantageous: in addition to directly saving time that would have been spent dealing with mistakes, they also may reduce user frustration, and may indirectly save additional time by enabling users to feel comfortable working faster, and may cause users to become reluctant to use interfaces that lack such features. Such advantages are further explained in the following paragraphs.

When an interface mistake wastes even a small amount of time, a user may become disproportionately frustrated. A user who spends an extra five seconds correcting an interface mistake may be far more frustrated than a user who spends an extra five seconds doing some other type of work. For example, the present writer attempted to dictate the preceding sentence by means of voice recognition software, and when the voice recognition software omitted the word "an" in one place, he felt unhappy and thought to himself that nothing was going smoothly that day. Such pessimistic thinking illustrates how interface mistakes may cause disproportionate frustration: an interface mistake not only may cost a user a small amount of time, but also may increase a user's subconscious tally of things that went wrong recently. Conversely, an interface feature that prevents mistakes or enables more efficient recovery from mistakes may be disproportionately advantageous even if it directly saves only a small amount of time. For example, if a user of a prior art smartphone mistakenly types the word "somethibg" and the smartphone's autocorrection functionality automatically converts this to "something," such automatic mistake correction functionality not only saves the user some time, but also may prevent the user from feeling that he made a mistake at all: a user who relies on AutoCorrect may not particularly intend to type every letter correctly, and may not perceive a single incorrectly typed letter to be a mistake if AutoCorrect takes care of it. Similarly, if a user makes a "mistake" that could have been prevented with a single keystroke, and then the user corrects the mistake with a single actuation of the alteration key, the alteration key not only saves the user some time, but also may prevent the user from feeling that he made a mistake at all: a user who relies on alteration functionality may not particularly intend to prevent alterable decisions from initially having undesirable outcomes, and may not perceive a single undesirable initial outcome to be a mistake if a single actuation of the alteration key takes care of it.

In an interface where interface mistakes waste significant amounts of time, or where interface mistakes cause significant frustration, a user may learn to work slowly and carefully in order to prevent such mistakes. For example, on many occasions the present writer has typed the word "its" into his smartphone rather slowly and then paused to see whether or not autocorrection functionality would insert an undesired apostrophe, so as to correct such a mistake immediately if it occurred; this cautiousness slowed him down even when the interface did not actually make a mistake. Conversely, in an interface that prevents mistakes or enables more efficient recovery from mistakes, a user may learn to work faster, which may be advantageous even when none of the interface's mistake mitigation features have any direct effect. For example, on many occasions the present writer has typed a long word into his prior art smartphone very rapidly, expecting to make a typographical error that the smartphone's autocorrection functionality would correct, and was surprised to notice that he typed the word correctly, unassisted. In such situations, the smartphone's autocorrection functionality was advantageous even though it had no direct effect: if the user had not known that the autocorrection functionality was present then he would have typed the exact same letters and would have achieved the exact same result, but he would have typed more slowly and would have taken longer to achieve the result. Similarly, if a user becomes accustomed to an embodiment where alteration functionality enables him to recover from the insertion of an undesired apostrophe quite efficiently even if he does not notice the mistake immediately, then he may learn to type the word "its" quickly and without especial caution, and this may be advantageous even when the interface does not actually insert an undesired apostrophe. Thus, in addition to saving time directly, mistake mitigation features may also save time indirectly by enabling users to work faster.

If a user spends much time using any particular interface, the user may become accustomed to that interface. In fact, in some cases a user will be able to achieve desired results more efficiently and with less frustration in a familiar interface than in an unfamiliar interface even if the unfamiliar interface is actually better designed, because the user does not yet know how to use the unfamiliar interface to its full potential. For such reasons, among other reasons, it is often difficult to convince a PC user to switch to a Mac, or vice versa, for example. Generally, for a company that wishes to convince existing customers to remain loyal to its particular brand of software or hardware, it is advantageous if users who are accustomed to the interface of the company's brand will find it quite frustrating to switch to the interface of a competing brand. An interface that has superior mistake mitigation features may be especially advantageous in this regard. For example, suppose that one interface has superior mistake recovery features as described herein, and some other interface has, say, superior features for inputting emojis. If a user becomes accustomed to the interface with superior emoji input features and then uses the interface with superior mistake recovery features, then the user is likely to feel additional frustration whenever the user wishes to input an emoji; but if a user becomes accustomed to the interface with superior mistake recovery features and then uses the other interface, then the user is likely to feel additional frustration whenever the user wishes to recover from a mistake—and that is exactly when the user is the most likely to already be frustrated, so this greatly increases the chance that the user's accumulated level of frustration will then exceed the amount of frustration that the user is willing to tolerate. For such reasons, among other reasons, users who become accustomed to mistake mitigation features that are described herein may become quite reluctant to use interfaces that lack such features.

Design Flexibility

Different approaches to interface design may lead to interface mistakes for different reasons. If an interface is complex and attempts to take some responsibility to determine what outcome a user wants, then when the interface fails to correctly determine the desired outcome, this may cause an interface mistake. If an interface is simple and it is entirely the user's responsibility to explicitly indicate the desired outcome, then when the user is impatient or careless, this may cause an interface mistake.

In some embodiments, the interface has various features that in various ways may reduce the frustration caused by interface mistakes. For example, in some embodiments, in certain circumstances the interface enables a user to recover from an interface mistake with a single keystroke even if the user does not notice the mistake right away. In some embodiments, the interface may recognize when an interface mistake has occurred and adapt its behavior to reduce the likelihood that such a mistake will occur again in the future.

By reducing the frustration caused by interface mistakes, in some embodiments, the present invention may give interface designers more flexibility. If an embodiment of the present invention is relatively complex then the complexity may lead to interface mistakes, but if such mistakes are not especially frustrating then an interface designer may feel free to make an embodiment that is relatively complex. If an embodiment is relatively simple then the simplicity may lead to interface mistakes, but if such mistakes are not especially frustrating then an interface designer may feel free to make an embodiment that is relatively simple. Generally, the better an embodiment does at reducing the frustration caused by interface mistakes, the more latitude an interface designer will have: it may be acceptable for an interface to be imperfect, provided that the resulting interface mistakes do not cause much frustration.

In particular, the present invention may enable interface designers to introduce new features while carefully minimizing potential disadvantages of the new features, as is discussed below.

Embodiments with Minimal Disadvantages

In certain circumstances, rather than necessarily maximizing the advantages of new interface features, an interface designer may wish to minimize potential disadvantages of new interface features, so as to virtually guarantee that such features will not yield a net disadvantage. For example, if an interface designer wishes to create an embodiment of the present invention by means of modifying a previously existing interface so as to incorporate features that are described herein, then the interface designer may wish to minimize any potential disadvantages of incorporating such features, so that users who have experience with the previously existing interface will have no cause for complaint. Generally, in an embodiment, it may be possible to deploy new interface features in a very conservative way so as to minimize potential disadvantages. This may be advantageous for an interface designer who is deploying new interface features that are described herein, or other new interface features, or both.

In the following paragraphs, an "implicitly invocable feature" is an interface feature that is reasonably likely to be invoked even if a user is not aware of the feature; an "explicitly invoked feature" is a interface feature that a user will probably never invoke unintentionally. For example, autocorrection functionality on a typical smartphone is implicitly invocable, because a user who is not aware of such functionality will probably invoke it unintentionally during the course of ordinary typing. The undo functionality on a typical computer is explicitly invoked, because such functionality is invoked only by means of explicit commands pertaining to undo functionality.

Generally, new interface features that are explicitly invoked features will not have significant new disadvantages, because whenever such features will not yield advantages, a user can simply ignore them. New interface features that are implicitly invocable may yield significant new disadvantages, though: they may get in the way even if a user attempts to ignore them. For example, if a user who is unfamiliar with autocorrection functionality types carefully enough to never make mistakes, then the only effect of autocorrection functionality will be to introduce undesired changes.

In an embodiment, for some or all new features that would otherwise be implicitly invocable features, the interface will initially be configured so that whenever such a feature would be invoked, the interface will instead alterably decide not to invoke the feature. Essentially, this converts such a feature to an explicitly invoked feature: a user who finds the feature convenient will be able to access the feature by means of explicitly invoking alteration functionality, but a user who does not find the feature convenient will be able to ignore it. For example, if an interface designer wishes to add autocorrection functionality to an interface that did not already have autocorrection functionality without the risk of introducing unexpected mistakes, the interface designer may create an interface that will initially be configured so that whenever autocorrection would change a word the user typed, the interface will instead alterably decide not to change the word the user typed. This way, such autocorrection functionality could be convenient for a user in circumstances where altering the decision would require less effort than manually correcting a typo, but would never be especially inconvenient for a user.

Furthermore, in an embodiment, if the interface repeatedly and consistently determines that its decision not to invoke a new feature has a non-beneficial outcome, then the interface may adjust its settings so that it will decide to invoke the feature in the future. For example, if an interface is initially configured so that it never changes words a user types, but the interface subsequently determines that autocorrection functionality would fix user mistakes far more often than it would introduce unexpected mistakes, then the interface may adjust its settings so that it will sometimes change words a user types in the future.

Thus, if an interface designer wishes to minimize any potential disadvantages of new interface features, then in some embodiments, alteration functionality may help the interface designer to do so, as described above. However, this should not be taken to mean that it is necessary for an interface designer to minimize disadvantages of new features. To the contrary: if instead an interface designer wishes to aggressively maximize potential advantages of new interface features, and the interface designer does not make a particular effort to prevent these new features from introducing unexpected mistakes, then in some embodiments, alteration functionality may help the interface designer to reduce any frustration that such an approach could otherwise cause. Generally, the better an embodiment does at reducing the frustration caused by interface mistakes, the more latitude an interface designer will have.

Flexibility of New Features that are Described Herein

As is discussed above, by reducing the frustration caused by interface mistakes, in some embodiments, the present invention may give interface designers more flexibility. In particular, interface designers may have flexibility in deploying the new features that are described herein.

Also, as is discussed above, if an interface designer wishes to minimize any potential disadvantages of new interface features, then in some embodiments, alteration functionality may help the interface designer to do so. In particular, an interface designer may be able to minimize any potential disadvantages of various new interface features that are described herein. Some of the features that are described herein are explicitly invoked features that inherently will not have significant disadvantages over prior art; for example, an alteration key will never cause much inconvenience for a user who simply does not use alteration functionality. In some embodiments, the touch alteration feature can easily be invoked by mistake, but if an interface designer wishes to minimize any potential disadvantages of the touch alteration feature, the interface designer may instead configure the touch alteration feature so that it is invoked by means of a sufficiently complex touch gesture that it will seldom be invoked by mistake, as is discussed in Chapter 6. Some of the features that are described herein are implicitly invocable features that can easily be invoked by mistake, but if an interface designer wishes to minimize any potential disadvantages over prior art, the interface designer may instead cause the interface to initially be configured so that whenever such a feature would be invoked, the interface will instead alterably decide not to invoke the feature, as is discussed above. It is thus possible to deploy many features that are described herein in such a way that they may yield significant new advantages with very little risk that they will introduce new interface mistakes.

In some embodiments, because it may be possible to deploy new interface features in such a way that they are relatively unlikely to introduce new interface mistakes, and because it may be possible to reduce the frustration caused by any interface mistakes that are introduced by new interface features, an interface designer may have a great deal of latitude in deploying the new interface features that are described herein.

Those of ordinary skill in the art will understand that a wide variety of alternative embodiments may be created that have slightly different versions of the features that are described herein. As is discussed above, in some embodiments, the present invention has functionality that may give interface designers a great deal of latitude in deploying new features. Therefore, although the present specification describes certain details of certain features quite precisely, it is to be understood that the present invention is generally intended to reduce the need for perfection: not only is it possible to create various alternative embodiments that have slightly different versions of the features that are described herein, but it may also be relatively easy to cause such alternative embodiments to yield net advantages over prior art.

In particular, throughout the present specification, where numbers pertaining to interface features are explicitly specified, it is to be understood that those of ordinary skill in the art will be able to adjust or replace these numbers and still achieve good results. Where features are described that implicitly involve numbers but these numbers are not explicitly specified, those of ordinary skill in the art will be able to come up with specific numbers that will achieve good results, using only routine skills. In most such cases, if an interface designer wishes to cause the interface to behave the same way as prior art most of the time, then the interface can do so either by selecting a number that is extremely large or by selecting a number that is extremely small; this may usually cause the interface to behave the same as prior art, but may still occasionally cause the interface to behave differently when it is relatively clear that this is likely to yield better results than prior art.

In order to illustrate how easy it may be to configure new interface features to occasionally yield better results than prior art, consider the following example of prior art behavior: On several occasions, the present writer has decided to type two consecutive space characters on a prior art iPhone. He double-clicked the space bar, but this yielded a period followed by a space character. He immediately deleted these two characters and immediately double-clicked the space bar, again intending to type two consecutive space characters. This time, the iPhone yielded the desired result.

On other occasions, the present writer decided to end a sentence, and double-clicked the space bar, intending to type a period followed by a space character. The iPhone yielded the desired result. He changed his mind about ending the sentence at that point, and backspaced those two characters. He paused. He changed his mind again, and he double-clicked the space bar, again intending to type a period followed by a space character. This time, the iPhone did not yield the desired result: it yielded two consecutive space characters.

Now consider an embodiment that has the automatic decision variation feature as described in Chapter 17. In an embodiment, if double-clicking the space bar causes the interface to alterably decide to yield a period followed by a space character rather than yielding two consecutive space characters, then deleting those two characters and double-clicking the space bar again may cause the interface to yield two consecutive space characters the second time, or may cause the interface to yield a period followed by a space character the second time, depending, among other things, on whether or not the user pauses for a while after deleting the two characters before double-clicking the space bar again. Theoretically, such an embodiment could yield the result the present writer desired in each of the scenarios described in the preceding two paragraphs.

The description of the automatic decision variation feature in Chapter 17 does not explicitly specify all the numbers that are involved. In particular, it does not explicitly specify how long a user would have to pause after deleting an alterable block of an alterable decision that had a very low probability of alteration before retyping the alterable block in order to cause the interface to yield the same result as the first time. However, those of ordinary skill in the art can come up with specific numbers that will achieve good results, using only routine skills; furthermore, it will be easy for those of ordinary skill in the art to select numbers that will usually cause the interface to behave the same as prior art.

For example, in an embodiment with the automatic decision variation feature, although it could be difficult or impossible to configure the feature to always yield the result the present writer desired in both of the scenarios described above, it would certainly be easy to configure the feature to always yield the desired result in the first scenario (which always involved no pause or a very short pause) and to potentially yield the desired result in the second scenario, but only if the pause was quite long. Such behavior would thus sometimes yield better results than the prior art iPhone behavior, and would almost never yield worse results.

Furthermore, even if the automatic decision variation feature were configured in such a way as to occasionally yield worse results than prior art, alteration functionality could make it relatively easy to correct any resulting mistakes. Also, in an embodiment where the automatic decision variation feature is adaptive, even if an interface designer initially selects numbers that consistently lead to non-beneficial outcomes, the interface may adjust such numbers so that eventually they will tend to lead to beneficial outcomes.

Therefore, for various reasons, an interface designer may have a great deal of latitude in deploying the new interface features that are described herein.

Flexibility of Other New Features

As is discussed above, in some embodiments, the present invention may give an interface designer more flexibility in deploying new interface features, and may help an interface designer to minimize any potential disadvantages of new interface features. This is true not only for new interface features that are described herein as features of embodiments of the present invention, but also for any other new interface features that may be deployed, as is explained in the following paragraphs. In other words, in some embodiments, the present invention may generally facilitate deployment of future features, and in particular may facilitate deploying future features in such a way as to yield significant new benefits without causing significant new problems.

To illustrate how some embodiments of the present invention may facilitate deployment of new features, consider the problem faced by a hypothetical interface designer who has been asked to design a modification of a previously existing simple easy-to-use messaging app so that in the new version of the app, it will be possible to send messages that include bold and italic fonts. It is not difficult to add such a capability, but it may be difficult to add such a capability without causing significant disadvantages: If the interface designer adds readily visible buttons for bold and italics, this may make the interface look more complicated. If the interface designer adds buttons for bold and italics that are relatively difficult to access, this may make the new fonts difficult to access. Either way, the messaging app will no longer be as simple and easy to use.

Instead, the interface designer could create an input shortcut that modifies the effect of previously existing input actions that are easy to access so that in certain circumstances these actions invoke the bold and italic fonts. In particular, the interface could cause the app to automatically convert words between asterisks to bold text and automatically convert words between underline characters to italic text. Such interface behavior is already known in prior art. This may be an especially helpful way to access bold and italic fonts: already, many users put asterisks around text when a bold font is not available, and put underline characters around text when an italic font is not available; in many cases, such users would be pleasantly surprised if such text were actually converted to an appropriate font. However, a disadvantage of such an input shortcut is that it may yield an undesirable result for a user who does not wish to invoke the shortcut: in some circumstances, a user may actually intend to type a word between underline characters and may be frustrated if such a word is converted to italics. For that reason, if the interface designer creates such a shortcut, then the interface designer may also wish to add a means of disabling the shortcut.

If the interface designer chooses to use such an input shortcut so as to avoid adding new buttons to the interface, and then the interface designer chooses to add a means of disabling the shortcut, then it may seem that the interface designer has not made much progress: the interface designer avoided adding new buttons, but must now add a new control anyway. The typical prior art means of enabling or disabling such a shortcut is to have an autoformatting menu somewhere that has a checkbox next to a description of the shortcut, so deselecting the checkbox will cause the shortcut to be deactivated. For example, Microsoft Word has such an input shortcut, and in a particular dialog box that has various AutoFormat replacement options, it has a checkbox next to "*Bold* and _italic_ with real formatting." However, such a means of disabling a shortcut may not be desirable for a simple easy-to-use messaging app: interfaces that include lots of option menus, dialog boxes, and checkboxes are not generally considered to be especially simple or easy to use.

Thus, it may seem that every approach that is available to the interface designer has substantial disadvantages: He can add bold and italic buttons somewhere obvious, but that clutters the interface. He can hide those buttons somewhere less obvious, but that makes the new fonts difficult to access. He can create a input shortcut for the bold and italic fonts, but such a shortcut may sometimes frustrate users. He can hide an option somewhere for enabling or disabling such an input shortcut, but that makes the option difficult to access. Each of these approaches appears to have substantial disadvantages. Perhaps for this reason, certain popular smart phone messaging apps do not have the capability to send messages that include bold and italic fonts, as far as the present writer is aware.

However, if the messaging app is one that includes certain features that are present in some embodiments of the present invention, then a different approach may be available to the interface designer: create a shortcut for the bold and italic fonts, and enable or disable such an input shortcut by means of alteration and adaptation functionality. Such an approach may not have the disadvantages of the previously mentioned approaches.

Suppose that an interface designer does modify such a previously existing messaging app so that it includes the shortcuts described above for invoking the bold and italic fonts, but its decision whether or not to invoke such a shortcut in the relevant circumstances is an alterable decision. The first time it makes such a decision, it will alterably decide not to invoke the shortcut, and this decision will have a very high probability of alteration. This is an adaptive decision class, so the interface's behavior will eventually change depending on whether or not such decisions have beneficial outcomes.

Consider the experience of a hypothetical user who has become familiar with a previous version of such an app that included alteration functionality but did not include bold and italic fonts, and is now using a version of the app that includes bold and italic fonts. Suppose that the user is already familiar with alteration functionality; for example, the user may have learned to use the touch alteration feature to quickly alter the interface's autocorrection decisions when they are highlighted. Suppose that the user now types "_Titanic_" between underline characters, and this becomes highlighted as an alterable decision. The interface may display a preview descriptor that clearly indicates that altering this decision will convert "_Titanic_" to Titanic, but even if it does not, the user may correctly guess that the reason the word "_Titanic_" is highlighted is because it can be converted to italics. If the user generally does not wish to take advantage of this new feature, the user can ignore it, and eventually, due to interface adaptation, such alterable decisions will cease to be highlighted. If the user generally does wish to use this new interface feature, then soon, due to interface adaptation, the interface will alterably decide to invoke the shortcut in the relevant circumstances, so the user will no longer have to actually use alteration functionality in order to access the bold and italic fonts.

Thus, in general, in some embodiments, not only does the present invention have many potential advantages over prior art, but it may also make it easier to add new features that may have further advantages, with a reduced risk of causing new problems by doing so. New interface features can be added that are accessed by means of intuitive input shortcuts and thus do not clutter the interface. When such a new input shortcut is added, if the interface is initially configured to alterably decide not to invoke the new input shortcut, and this is an adaptive decision, then a user who wishes to take advantage of the new input shortcut may find it easy to do so, and a user who does not wish to take advantage of the new input shortcut may be able to ignore it and not be substantially inconvenienced by it.

Similarly, in some embodiments, the present invention may make it easier to convert more simple interface decision functions to complex and intelligent functions that may generally help users to achieve desired results more quickly, with a reduced risk of causing new problems by doing so. When a simple interface decision function is converted to a complex and intelligent function, if the interface is initially configured to alterably decide to yield the same result that the previously existing simple version of the function would have yielded, then a user who wishes to begin to rely on the complex version of the function may find it easy to do so, and a user who does not wish to take advantage of the new functionality may be able to ignore it and not be substantially inconvenienced by it.

Embodiments with Alterable Adaptive Settings

Various prior art interfaces have dozens or even hundreds of settings that can be accessed and modified through various menus. In particular, many desktop computer applications have an "Options . . . " or "Settings . . . " menu option, or a button with a gear icon, that allows access to numerous settings. Such settings make it possible for a skilled user to customize interface behavior to yield better results. However, when a prior art interface includes numerous settings, each such additional setting may yield diminishing advantages for casual users, because the casual user will not want to search through all these settings to see whether any particular setting is worth customizing: the casual user will research customizable settings only if a particular default interface behavior is extremely annoying. In prior art, if an interface setting affects a particular type of interface decision, then in some cases, in order to achieve a desired outcome for such a decision, a user may need to know that the setting exists, realize that it is necessary to adjust the setting, and adjust the setting, all before causing the interface to make the decision. Even a skilled user may find it inconvenient to navigate setting menus in order to adjust such a setting, or may occasionally forget that it is necessary to adjust such a setting until after making a mistake; a novice user may be entirely unaware that such a setting exists.

In some embodiments of the present invention, if one or more interface decision classes that are affected by interface settings are alterable decision classes, then in order to achieve a desired outcome for such a decision, the user may not even need to know that a relevant setting exists: after such a decision has an undesired outcome, if the decision is then a highlighted alterable decision, the user may accordingly recognize that the outcome can be altered and may then alter the decision in order to achieve the desired result. Furthermore, if the decision class is an adaptive decision class, then altering the decision may also cause the interface to adjust the relevant setting, with no need to navigate setting menus. This may be advantageous not only because it may be a relatively efficient way to adjust a setting, but also because it may help a novice user to discover relevant interface settings that the user would otherwise never learn to adjust, which may increase the advantageousness of adding customizable settings to an interface.

For example, the present writer has seen an Amazon.com review of an HP graphing calculator where the reviewer complained that the calculator gave an error message in response to a relatively simple calculation that should have had an answer that was a complex number. The reviewer later edited the review to say that he had failed to realize that a particular calculator setting determined whether the calculator would yield a complex number as an answer or whether it would instead give an error message. But in a graphing calculator embodiment of the present invention, if the calculator gives an error message in response to a calculation that would have a complex number answer, then that error message will be the alterable block of a highlighted alterable decision, so if a user who expected to receive a complex number as an answer instead receives such an error message, then if the user understands how to alter a highlighted alterable decision, it will be evident to the user that the error message can be replaced with the desired complex number answer by means of altering the decision.

Embodiments with Minimal Alteration Functionality

Various features that are described herein may have a great deal of synergy with one another. In particular, the more interface decisions are alterable decisions, the more useful it will be to add functionality pertaining to such decisions, and conversely, the more functionality an embodiment has pertaining to alterable interface decisions, the more useful it will be to make interface decisions be alterable decisions.

Nevertheless, the ability to retroactively correct an interface mistake may be so advantageous that an embodiment can have significant advantages over prior art even if it has only one type of alterable interface decision and only one feature for altering such a decision. For example, one of the inventors of the present invention also invented the automatic structure exiting feature that is described in U.S. Pat. No. 8,788,548 (although it is not called "the automatic structure exiting feature" therein). He found this feature was frequently convenient, but also caused interface mistakes on occasion. He worked on a calculator application prototype such that at one point, the prototype had the property that whenever the input cursor was located after a mathematical structure and mathematical text was between the mathematical structure and the location of the input cursor, actuating a particular key would cause the interface to move that mathematical text into the mathematical structure. Essentially, this particular key thus acted as an alteration key that would retroactively alter the most recent decision to automatically exit a mathematical structure, and would not alter anything else. The inventor found this particular key to be extremely helpful even though it served only one purpose. In other words, an undesired interface decision to automatically exit a mathematical structure may be so frustrating and the alteration key may be so helpful that an embodiment can have significant advantages over prior art even if automatic structure exiting decisions are the only alterable interface decisions and the alteration key is the only feature for altering such decisions. Likewise, certain other specific types of interface mistakes may be so frustrating and certain other features for altering decisions may be so helpful that other embodiments may have significant advantages over prior art even with only one type of alterable interface decision and only one feature for altering such a decision.

Embodiments with Diverse Alterable Decisions

In prior art, even when functionality exists that can facilitate correcting a few slightly different types of mistakes, such functionality may work differently for different types of mistakes. For example, suppose that a user of a prior art iPhone attempts to type "Omw. Its current location is Washington.", but due to a combination of two user mistakes and two undesired interface interventions, the user instead receives the result "On my way! It's current location is Washingtom". In such circumstances, on the prior art iPhone, only the third mistake is underlined to call attention to the potential mistake, and only the first mistake cannot be corrected by backspacing and retyping the incorrect text. In some embodiments of the present invention, a more cohesive system of alteration functionality may make it easier for users to learn to use functionality that facilitates correcting different types of mistakes.

In an embodiment where a wide variety of potential mistakes can be efficiently corrected by means of certain alteration features that are described herein, if a user learns to use such alteration functionality in order to correct one particular type of mistake, then when the user later encounters a very different type of mistake in a very different context, the user may nevertheless find it easy to efficiently correct the mistake by means of the same alteration functionality.

For example, suppose that a user becomes familiar with a graphing calculator embodiment. The graphing calculator has a green alteration key. Whenever the calculator displays an answer in fraction form, if the answer has a light green shimmering highlight, then pressing the alteration key will change the answer to decimal form or some other form. The user becomes familiar with this interface behavior. Later, the same user types sin 2.4 and presses Enter, and then notices that the interface converted this to sin 2.4° even though he intended to calculate sin 2.4 radians. The trigonometric operand 2.4° is highlighted with a light green shimmering highlight. Because of his previous experience altering the form of an answer, the user may quickly realize that pressing the green alteration key will convert 2.4° back to 2.4 (radians), even if he has never encountered this type of mistake before.

Similarly, if two distinct embodiments are created such that in one embodiment one set of potential mistakes can be efficiently corrected by means of certain alteration features that are described herein, and in another embodiment a completely different set of potential mistakes can be efficiently corrected by means of certain alteration features that are described herein, then as long as the alteration features included in the two embodiments are sufficiently similar, if a user learns to efficiently correct mistakes in one of these two embodiments, then when the user later uses the other embodiment, the user may find it easy to efficiently correct mistakes.

For example, suppose that a user becomes familiar with a graphing calculator embodiment; the graphing calculator has a green alteration key and sometimes highlights input or output with a light green shimmering highlight, as described above. Later, the same user purchases a notebook computer embodiment. The computer also has a green alteration key. One day, while editing a document, the user moves the input cursor to immediately after a word that is italicized, presses the space bar, and types another word. The word the user just typed is also italicized, but the user did not wish it to be italicized. The word is highlighted with a light green shimmering highlight. Because of his previous experience with a graphing calculator embodiment, the user may quickly realize that pressing the green alteration key will fix his mistake, even if he has never encountered this type of mistake before.

Thus, in an embodiment or embodiments where a wide variety of potential mistakes can be corrected by means of similar alteration features, even when a user encounters a particular type of mistake for the first time, the user may immediately understand how to correct that mistake due to previous experience with other types of mistakes.

If an embodiment makes it easy for a user to correct a mistake that the user has never encountered before, this may be extremely advantageous. It is always advantageous to make it easy for a user to correct a mistake, but it is especially advantageous in circumstances where a user is especially likely to be confused or frustrated by the mistake. Generally, when a user is working with unfamiliar technology, the user may find it easy to become somewhat confused and frustrated, and particularly, when any user encounters a particular type of interface mistake for the first time, the user is quite likely to be more confused than when the user encounters the mistake for the tenth time. At such a moment, when a user is especially likely to be confused or frustrated by encountering an unfamiliar mistake, familiar and efficient mistake correction technology may drastically reduce the user's frustration.

For such reasons, if a wide variety of potential mistakes can be corrected by means of similar alteration features, then this may be very helpful for a user who is learning to use a new feature, new application, or new computing device. A user may therefore come to expect new features to be less frustrating to learn within an interface that has alteration functionality, so when the user is contemplating purchasing a new application or new computing device that will inevitably have new features, the user may prefer to purchase an application or computing device that has alteration functionality. This may create a market advantage for certain embodiments. For example, if a user has become familiar with a graphing calculator that has a green alteration key as described above, and the user has found that key to be quite convenient when correcting various types of mistakes, then when the user is shopping for a notebook computer, the user may prefer to purchase a notebook computer that has a similar green alteration key.

Other Embodiments Will be Evident

Various other embodiments will be apparent to those of ordinary skill in the art in view of the disclosure herein. In particular, various combinations, omissions, substitutions and modifications will be apparent to the skilled artisan in view of the disclosure herein. It is contemplated that various aspects and features of the invention described can be practiced separately, combined together, or substituted for one another, and that a variety of combination and subcombinations of the features and aspects can be made and still fall within the scope of the invention. Furthermore, the systems described above need not include all of the modules and functions described in the preferred embodiments. In fact, those of ordinary skill in the art will recognize that numerous embodiments can be constructed that use only a small minority of the novel features that are disclosed herein, and yet still fall within the scope of the invention and still represent a potentially significant advantage over prior art. Accordingly, the present invention is not intended to be limited by the recitation of the embodiments that are explicitly described herein, but is to be defined by reference to the appended claims.

In some embodiments, the systems, devices, and methods described herein are implemented using a computing system. In some embodiments, the systems, devices, and methods described herein can be embodied in hardware or firmware, or to a collection of software instructions, possibly having entry and exit points, written in a programming language, such as, for example, Java, C, or C++, among others. A software module may be compiled and linked into an executable program, installed in a dynamic link library, or may be written in an interpreted programming language such as, for example, BASIC, Perl, or Python, among others. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In some embodiments, the computing system may comprise a central processing unit ("CPU"), which may comprise a microprocessor. The computing system may comprise a computer readable medium, such as a memory, for example, random access memory ("RAM") for temporary storage of information and/or a read only memory ("ROM") for permanent storage of information, and a mass storage device, such as a hard drive, diskette, or optical media storage device. Typically, the modules of the computing system are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system may comprise one or more commonly available input/output (I/O) devices and interfaces, such as a keyboard, mouse, touchpad, touchscreen, and printer. In one embodiment, the I/O devices and interfaces comprise one or more display devices, such as a screen or monitor, that allows the visual presentation of data to a user. More particularly, a display device provides for the presentation of GUIs, application software data, and multimedia presentations, for example. In one or more embodiments, the I/O devices and interfaces comprise a microphone and/or motion sensor that allow a user to generate input to the computing system using sounds, voice, motion, gestures, or the like. In some embodiments, the I/O devices and interfaces also provide a communications interface to various external devices. The computing system may also comprise one or more multimedia devices, such as speakers, video cards, graphics accelerators, and microphones, for example.

The computing system may run on a variety of computing devices, such as, for example, a personal computer, a laptop computer, a tablet computer, a cell phone, a smartphone, a personal digital assistant, a kiosk, an audio player, an e-reader device, and so forth. The computing system is generally controlled and coordinated by operating system software, such as Windows, Linux, BSD, SunOS, Solaris, Android, iOS, BlackBerry OS, or other compatible operating systems. In Macintosh systems, the operating system may be any available operating system, such as MAC OS X. In other embodiments, the computing system may be controlled by a proprietary operating system. Conventional operating systems control and schedule computer processes for execution, perform memory management, provide file system, networking, and I/O services, and provide a user interface, such as a graphical user interface ("GUI"), among other things.

In some embodiments, the computing system is coupled to a network, such as a LAN, WAN, or the Internet, for example, via a wired, wireless, or combination of wired and wireless, communication link. The network communicates with various computing devices and/or other electronic devices via wired or wireless communication links. In some embodiments, the network is communicating with one or more computing systems and/or one or more data sources.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Any methods disclosed herein need not be performed in the order recited. Thus, it is intended that the scope of the invention herein disclosed should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Further, while the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present.

What is claimed is:

1. A system having a smart interface, the system comprising:
- an input device configured to receive user input from a user, the input device comprising an alteration key;
- a display configured to display information to the user;
- at least one non-transitory computer readable medium having stored thereon executable instructions; and
- at least one processor in communication with the at least one non-transitory computer readable medium and configured to execute the instructions to cause the system to at least:
  - identify one or more portions of the user input as one or more alterable decisions;
  - determine alteration probabilities for at least some of the one or more alterable decisions, wherein an alteration probability comprises a probability that the user will alter an associated alterable decision;
  - for each of the one or more alterable decisions, store, in a memory, information about one or more alternative options for the alterable decision;
  - identify one of the one or more alterable decisions as the currently alterable decision based on the determined alteration probabilities, wherein the alterable decision with the highest alteration probability is identified as the currently alterable decision;
  - upon receiving an input indicative of an actuation of the alteration key, alter the currently alterable decision to another of the one or more alternative options based on the stored information; and
  - display, on the display, the altered currently alterable decision to the user.

2. The system of claim 1, wherein the processor is further configured to execute the instructions to cause the system to, upon each successive actuation of the alteration key:
- alter the currently alterable decision to another of the one or more alternative options based on the stored information until the system has cycled through all of the one or more alternative options for the currently alterable decision; and
- after the system has cycled through all of the one or more alternative options for the currently alterable decision, identify another of the one or more alterable decisions as the currently alterable decision.

3. The system of claim 1, wherein the alteration probability of an alterable decision decreases over time.

4. The system of claim 1, wherein the processor is further configured to execute the instructions to cause the system to highlight, on the display, the currently alterable decision when the alteration probability associated with the currently alterable decision exceeds a threshold.

5. The system of claim 1, wherein the processor is further configured to execute the instructions to cause the system to highlight a plurality of alterable decisions, wherein the plurality of alterable decisions have associated alteration probabilities exceeding a threshold.

6. The system of claim 5, wherein the currently alterable decision is highlighted in a manner distinct from the remainder of the alterable decisions.

7. The system of claim 1, wherein the alterable decision comprises a speech recognition interpretation and the alternate alternative options of the alterable decision comprise alternate ways of interpreting spoken words.

8. The system of claim 1, wherein the alterable decision comprises an autocorrection and the alternative options of the alterable decision comprise an alternative option of a word or sequence of letters that the user typed and one or more additional alternative options are words that are similar to the word or sequence of letters that the user typed.

9. The system of claim 1, wherein the alterable decision comprises a capitalization decision and the alternative options of the alterable decision comprise an alternative option of a word beginning with an uppercase letter and an alternative option of the same word beginning with a lowercase letter.

10. The system of claim 1, wherein the alterable decision pertains to text formatting and the alternative options of the decision comprise the same text but with diverse formats.

11. A system having a smart interface, the system comprising:

a touchscreen display configured to display information to the user and receive user input;

at least one non-transitory computer readable medium having stored thereon executable instructions; and at least one processor in communication with the at least one non-transitory computer readable medium and configured to execute the instructions to cause the system to at least:

identify one or more portions of the user input as one or more alterable decisions, for each of the one or more alterable decisions, store, in a memory, information about one or more alternative options for the alterable decision;

determine an alteration probability for the one or more alterable decisions, wherein an alteration probability comprises a probability that the user will alter an associated alterable decision, and the alteration probability of an alterable decision decreases over time;

highlighting one or more of the one or more alterable decisions having an alteration probability exceeding a threshold;

upon receiving a touch input on a highlighted alterable decision, altering the alterable decision to another of the one or more alternative options based on the stored information; and displaying, on the display, the altered alterable decision to the user.

12. The system of claim 11, wherein the processor is further configured to execute the instructions to cause the system to, upon each receipt of a touch input on an alterable decision, alter the alterable decision to another of the one or more alternative options based on the stored information until the system has cycled through all of the one or more alternative options for the currently alterable decision.

13. The system of claim 11, wherein the alterable decision comprises a speech recognition interpretation and the alternative options of the alterable decision comprise alternate ways of interpreting spoken words.

14. The system of claim 11, wherein the alterable decision comprises an autocorrection and the alternative options of the alterable decision comprise an alternative option of a word or sequence of letters that the user typed and one or more additional alternative options are words that are similar to the word or sequence of letters that the user typed.

15. The system of claim 11, wherein the alterable decision comprises a capitalization decision and the alternative options of the alterable decision comprise an alternative option of a word beginning with an uppercase letter and an alternative option of the same word beginning with a lowercase letter.

16. The system of claim 11, wherein the alterable decision pertains to text formatting and the alternative options of the decision comprise the same text but with diverse formats.

17. A system having a smart interface, the system comprising:

an input device configured to receive user input from a user, the input device comprising an alteration key;

a display configured to display information to the user;

at least one non-transitory computer readable medium having stored thereon executable instructions; and at least one processor in communication with the at least one non-transitory computer readable medium and configured to execute the instructions to cause the system to at least:

identify one or more portions of the user input as one or more alterable decisions;

determine alteration probabilities for at least some of the one or more alterable decisions, wherein an alteration probability comprises a probability that the user will alter an associated alterable decision, and wherein the alteration probability of an alterable decision decreases over time;

for each of the one or more alterable decisions, store, in a memory, information about one or more alternative options for the alterable decision;

identify one of the one or more alterable decisions as the currently alterable decision based on the determined alteration probabilities;

upon receiving an input indicative of an actuation of the alteration key, alter the currently alterable decision to another of the one or more alternative options based on the stored information; and display, on the display, the altered currently alterable decision to the user.

18. The system of claim 17, wherein the alterable decision comprises a speech recognition interpretation and the alternative options of the alterable decision comprise alternate ways of interpreting spoken words.

19. The system of claim 17, wherein the alterable decision comprises an autocorrection and the alternative options of the alterable decision comprise an alternative option of a word or sequence of letters that the user typed and one or more additional alternative options are words that are similar to the word or sequence of letters that the user typed.

20. The system of claim 17, wherein the alterable decision comprises a capitalization decision and the alternative options of the alterable decision comprise an alternative option of a word beginning with an uppercase letter and an alternative option of the same word beginning with a lowercase letter.

* * * * *